US012750178B2

(12) United States Patent
Murakami

(10) Patent No.: US 12,750,178 B2
(45) Date of Patent: Sep. 29, 2026

(54) WIRELESS COMMUNICATION SYSTEM, WIRELESS COMMUNICATION DEVICE, AND WIRELESS COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 590 days.

(21) Appl. No.: 18/003,091

(22) PCT Filed: Jun. 29, 2021

(86) PCT No.: PCT/JP2021/024470

§ 371 (c)(1), (2) Date: Dec. 22, 2022

(87) PCT Pub. No.: WO2022/004694

PCT Pub. Date: Jan. 6, 2022

(65) Prior Publication Data

US 2023/0261821 A1 Aug. 17, 2023

(30) Foreign Application Priority Data

Jun. 30, 2020 (JP) ................................ 2020-112820
Sep. 18, 2020 (JP) ................................ 2020-157453

(51) Int. Cl.
*H04L 5/00* (2006.01)

(52) U.S. Cl.
CPC .......... *H04L 5/0048* (2013.01); *H04L 5/0007* (2013.01); *H04L 5/006* (2013.01)

(58) Field of Classification Search
CPC ..... H04L 5/0048; H04L 5/0007; H04L 5/006; H04L 5/005; H04L 27/26; H04B 7/06; H04W 16/28; H04W 72/04
See application file for complete search history.

(56) References Cited

U.S. PATENT DOCUMENTS

2016/0323755 A1 11/2016 Cordeiro et al.
2019/0052327 A1 2/2019 Motozuka et al.
(Continued)

FOREIGN PATENT DOCUMENTS

CN 109983796 A 7/2019
EP 3373636 A1 9/2018
(Continued)

OTHER PUBLICATIONS

International Search Report, mailed Aug. 17, 2021, for International Patent Application No. PCT/JP2021/024470. (5 pages).
(Continued)

*Primary Examiner* — Sharmin Chowdhury
(74) *Attorney, Agent, or Firm* — Seed Intellectual Property Law Group LLP

(57) ABSTRACT

This wireless communication system comprises: a first wireless communication device that transmits a plurality of first reference signals having controlled directivity by the orthogonal frequency division multiple access (OFDMA) method in a first period; and a second wireless communication device that transmits a plurality of second reference signals having controlled directivity to the first wireless communication device in a second period, the second reference signals including information relating to directivity and corresponding to any one or more of the first reference signals received from the first wireless communication device.

12 Claims, 156 Drawing Sheets

(56) References Cited

U.S. PATENT DOCUMENTS

| | | | | |
|---|---|---|---|---|
| 2020/0107341 | A1 | 4/2020 | Zhang et al. | |
| 2020/0128586 | A1 | 4/2020 | Takahashi et al. | |
| 2021/0258065 | A1* | 8/2021 | Wang | H04W 56/001 |
| 2023/0052449 | A1* | 2/2023 | Yuan | H04B 7/0404 |
| 2023/0122357 | A1* | 4/2023 | Yuan | H04W 52/146 455/522 |
| 2023/0127731 | A1* | 4/2023 | Yuan | H04W 72/23 370/329 |
| 2023/0171763 | A1* | 6/2023 | Gao | H04W 52/08 370/329 |
| 2023/0208568 | A1* | 6/2023 | Yuan | H04L 5/0025 714/726 |
| 2024/0214041 | A1* | 6/2024 | Yuan | H04B 7/0473 |

FOREIGN PATENT DOCUMENTS

| | | | |
|---|---|---|---|
| JP | 2018029317 | A | 2/2018 |
| JP | 2018518855 | A | 7/2018 |

OTHER PUBLICATIONS

Indian Examination Report, mailed Apr. 21, 2026, for Indian Application No. 202247075407. (6 pgs) (with English Translation).

* cited by examiner

FIG. 88
051
RADIO COMMUNICATION DEVICE
001
RADIO COMMUNICATION DEVICE

WIRELESS COMMUNICATION SYSTEM, WIRELESS COMMUNICATION DEVICE, AND WIRELESS COMMUNICATION METHOD

TECHNICAL FIELD

The present disclosure relates to a radio communication system, a radio communication apparatus, and a radio communication method.

BACKGROUND ART

An exemplary system using a frequency equal to or higher than 52.6 GHz is a communication system using a 60 GHz band.

A scheme disclosed in Patent Literature 1 is one of a communication method for extending a communication distance. FIG. 88 illustrates an exemplary communication state of a radio communication device disclosed in Patent Literature 1.

For example, radio communication device 001 transmits a sector sweep signal. After that, radio communication device 051 transmits a sector sweep signal. Then, radio communication device 051 transmits a signal including feedback information on the sector sweep to radio communication device 001.

Following this procedure, radio communication device 001 determines a method of "transmission beamforming and/or reception beamforming", and radio communication device 051 also determines a method of "transmission beamforming and/or reception beamforming". This extends the communication distance between radio communication device 001 and radio communication device 051; however, in an environment where a plurality of radio communication devices are present, challenges remain in improving the data transmission efficiency of the entire communication system composed of the plurality of radio communication devices.

CITATION LIST

Patent Literature

PTL 1

Japanese Unexamined Patent Application Publication (Translation of PCT Application) No. 2018-518855

SUMMARY OF INVENTION

One non-limiting and exemplary embodiment facilitates providing a technique for improving a data transmission rate in a case where a plurality of radio communication apparatuses are present.

A radio communication method according to an embodiment of the present disclosure includes: a first radio communication apparatus that transmits a plurality of first reference signals in a first period in accordance with an orthogonal frequency division multiple access (OFDMA) scheme, the plurality of first reference signals being subjected to directivity control; and a second radio communication apparatus that transmits a plurality of second reference signals in a second period to the first radio communication apparatus, the plurality of second reference signals being subjected to directivity control and including information on a directivity corresponding to at least any one of the plurality of first reference signals received from the first radio communication apparatus.

A radio communication apparatus according to an embodiment of the present disclosure includes: a reception processor that receives a plurality of first reference signals in a first period in accordance with an orthogonal frequency division multiple access (OFDMA) scheme, the plurality of first reference signals being subjected to directivity control by another radio communication apparatus; and a transmission processor that transmits a plurality of second reference signals in a second period to the another radio communication apparatus, the plurality of second reference signals being subjected to directivity control and including information on a directivity corresponding to any one of the plurality of first reference signals.

A radio communication apparatus according to an embodiment of the present disclosure includes: a transmission processor that transmits a plurality of first reference signals in a first period in accordance with an orthogonal frequency division multiple access (OFDMA) scheme, the plurality of first reference signals being subjected to directivity control; and a reception processor that receives, in a second period, at least one of a plurality of second reference signals including information on a directivity corresponding to any one of the plurality of first reference signals and subjected to directivity control by another radio communication apparatus that has received the plurality of first reference signals.

A radio communication method according to an embodiment of the present disclosure includes: transmitting, by a first radio communication apparatus, a plurality of first reference signals in a first period in accordance with an orthogonal frequency division multiple access (OFDMA) scheme, the plurality of first reference signals being subjected to directivity control; and transmitting, by a second radio communication apparatus, a plurality of second reference signals in a second period to the first radio communication apparatus, the plurality of second reference signals being subjected to directivity control and including information on a directivity corresponding to any one of the plurality of first reference signals received from the first radio communication apparatus.

It should be noted that general or specific embodiments may be implemented as a system, an apparatus, a method, an integrated circuit, a computer program, a storage medium, or any selective combination thereof.

According to a non-limiting and exemplary embodiment of the present disclosure, it is possible to improve a data transmission rate in a case where a plurality of radio communication apparatuses are present.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 78A illustrates an exemplary configuration of the feedback signal that is present in the time period from t2 to t3 in FIG. 10 and transmitted by base station #1;

FIG. 78B illustrates an exemplary configuration of the feedback signal transmission periods in transmission panel antenna X for frequency $X in FIG. 78A;

FIG. 78C illustrates exemplary specific feedback signal assignment for the feedback signal illustrated in FIGS. 78A and 78B;

FIG. 78D illustrates exemplary specific feedback signal assignment for the feedback signal illustrated in FIGS. 78A and 788;

FIG. 79A illustrates an exemplary configuration of the data-symbol-included frame that is present in the time period from t4 to t5 in FIG. 10 and transmitted by base station #1;

FIG. 79B illustrates an exemplary configuration of the modulation signal (slot) transmission periods in transmission panel antenna X for frequency $X in FIG. 79A;

FIG. 79C illustrates exemplary specific modulation signal (slot) assignment for the data-symbol-included frame illustrated in FIGS. 79A and 79B;

FIG. 79D illustrates exemplary specific modulation signal (slot) assignment for the data-symbol-included frame illustrated in FIGS. 79A and 79B;

FIG. 80A illustrates an exemplary configuration of a "data-symbol-included frame" transmitted by terminal #1;

FIG. 80B illustrates an exemplary configuration of a "data-symbol-included frame" transmitted by terminal #2;

FIG. 80C illustrates an exemplary configuration of a "data-symbol-included frame" transmitted by terminal #3;

FIG. 80D illustrates an exemplary configuration of a "data-symbol-included frame" transmitted by terminal #4;

Figure 10:
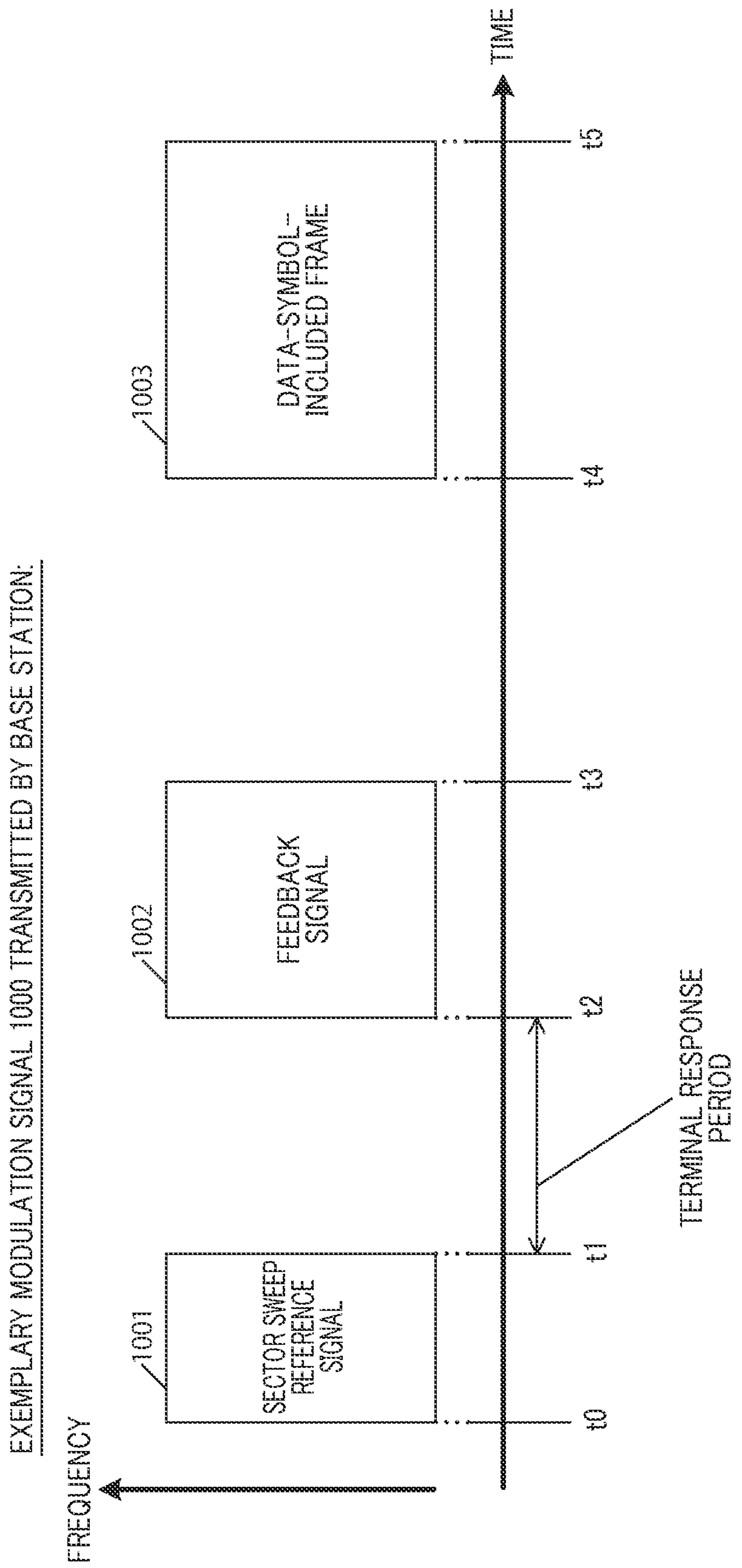
FIG. 10 illustrates an exemplary modulation signal transmitted by base station #1 in FIG. 9.
Figure 13:
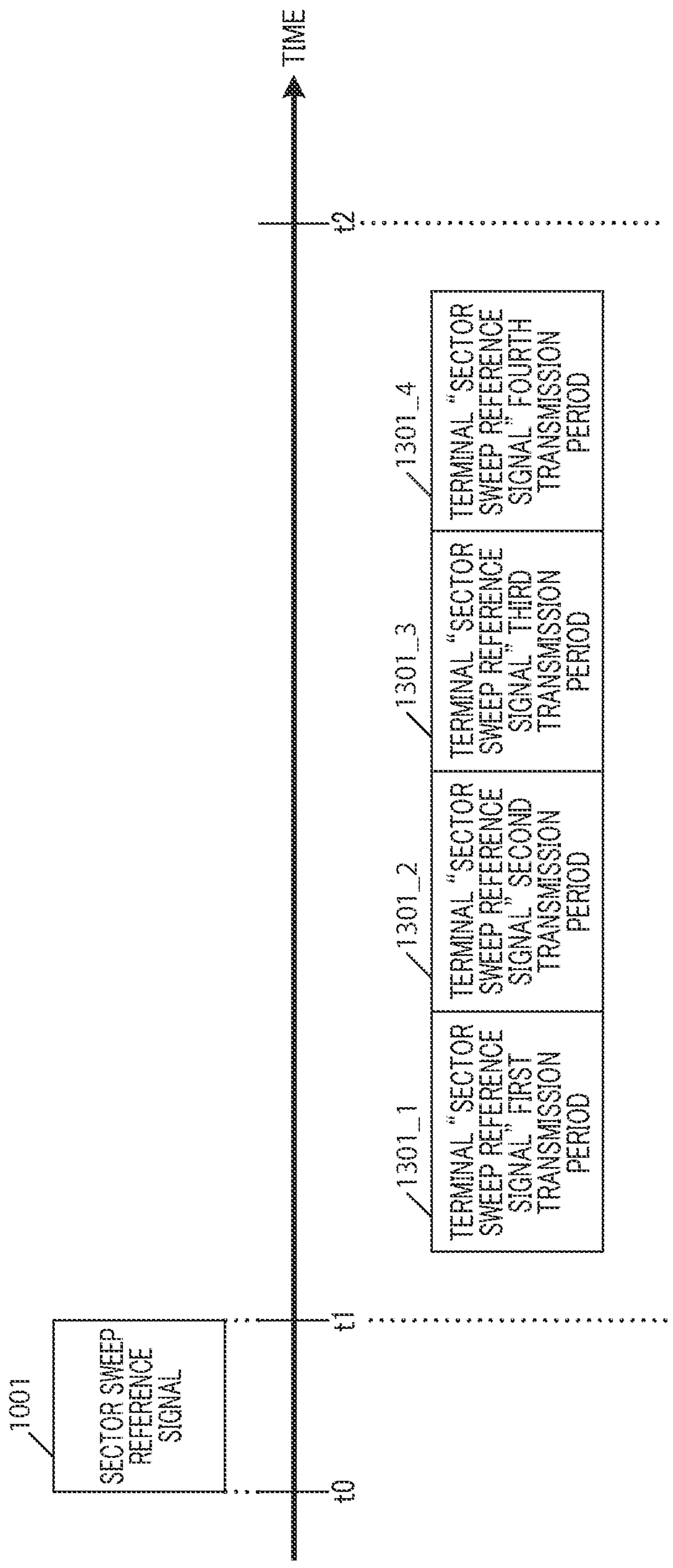
FIG. 13 illustrates an exemplary operation in the time period from time t1 to t2, which is a terminal response period.
Figure 58:
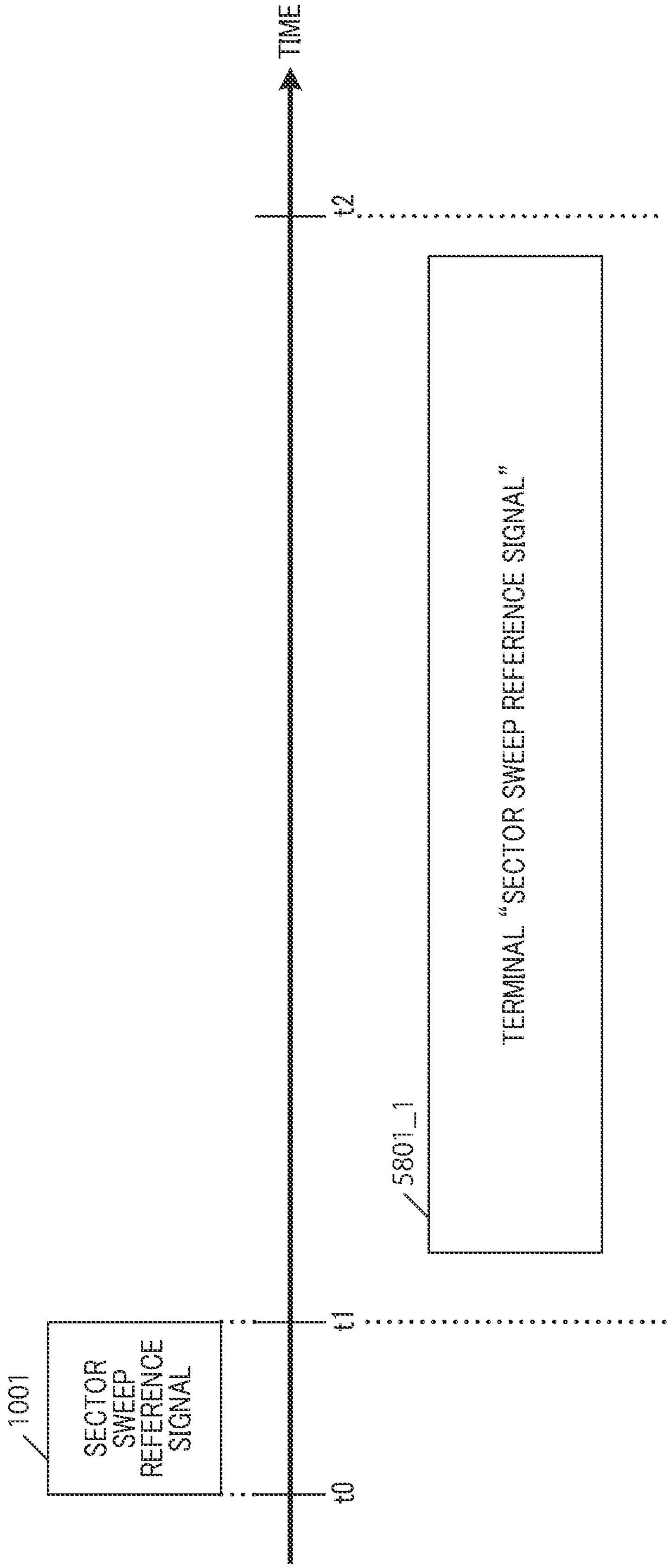
FIG. 58 illustrates an exemplary operation in the time period from time t1 to t2, which is a terminal response period.
Figure 77A:
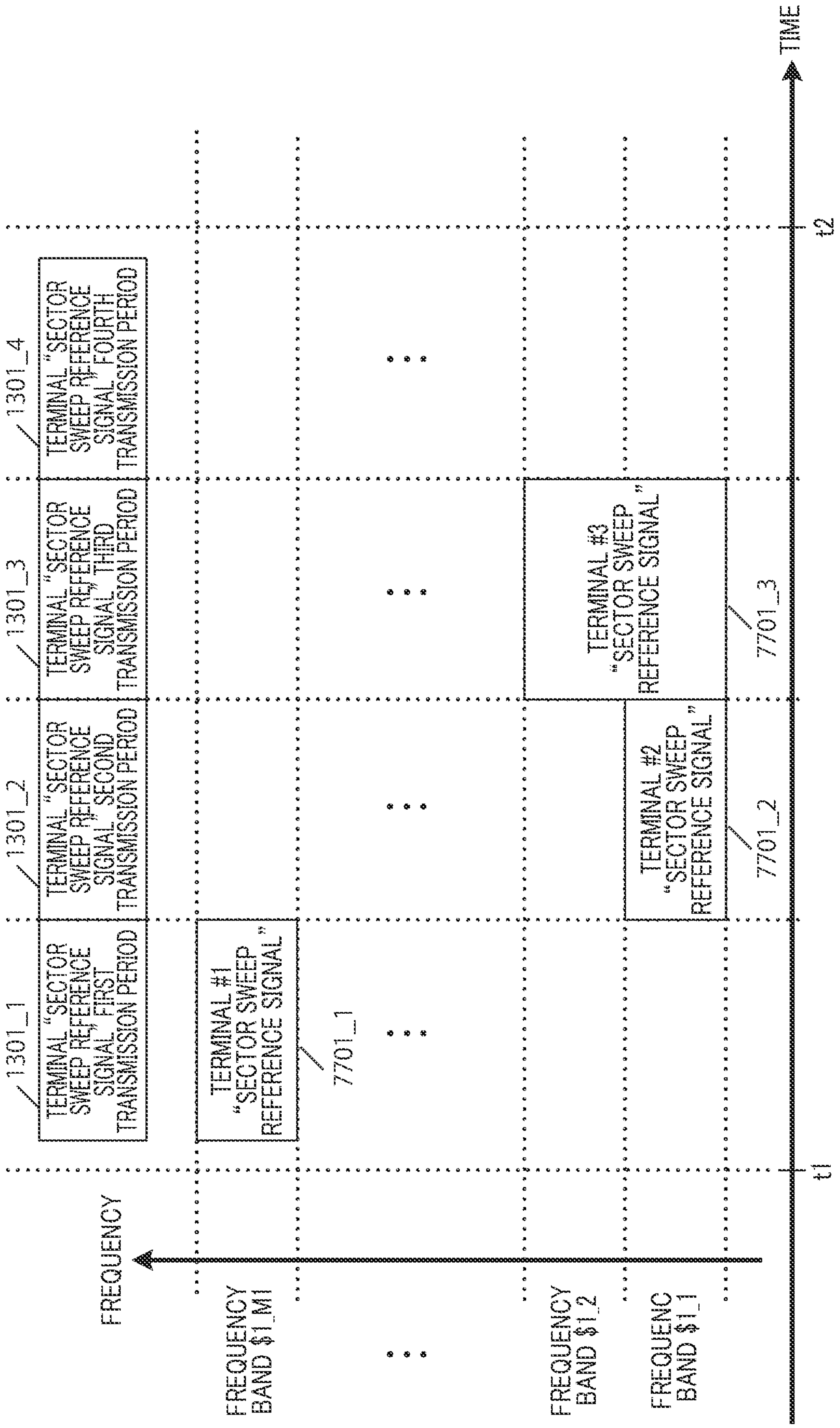
FIG. 77A illustrates exemplary occupation by the terminals in the terminal "sector sweep reference signal" transmission periods illustrated in FIG. 13.
Figure 80A:
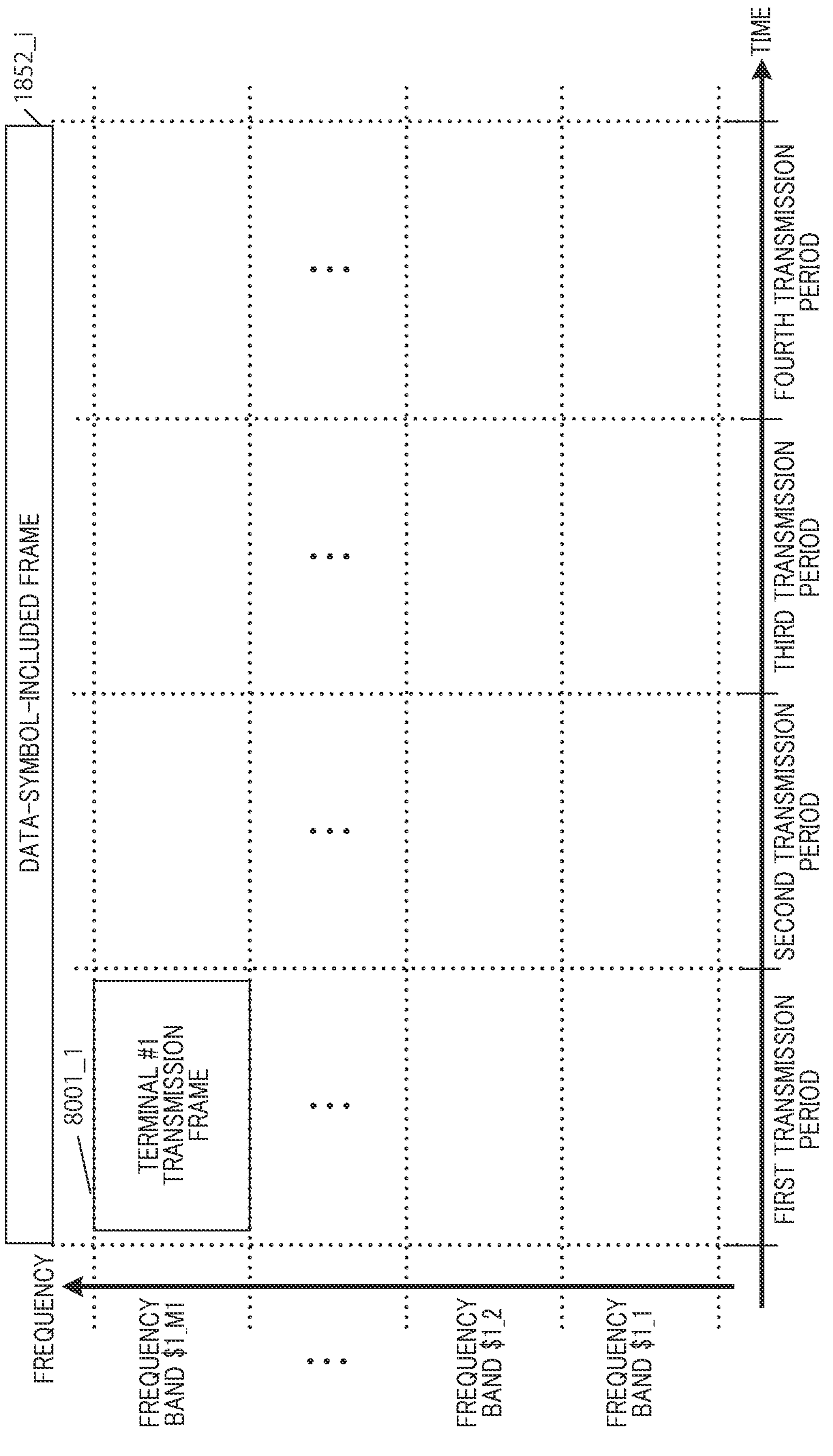
Figure 80B:
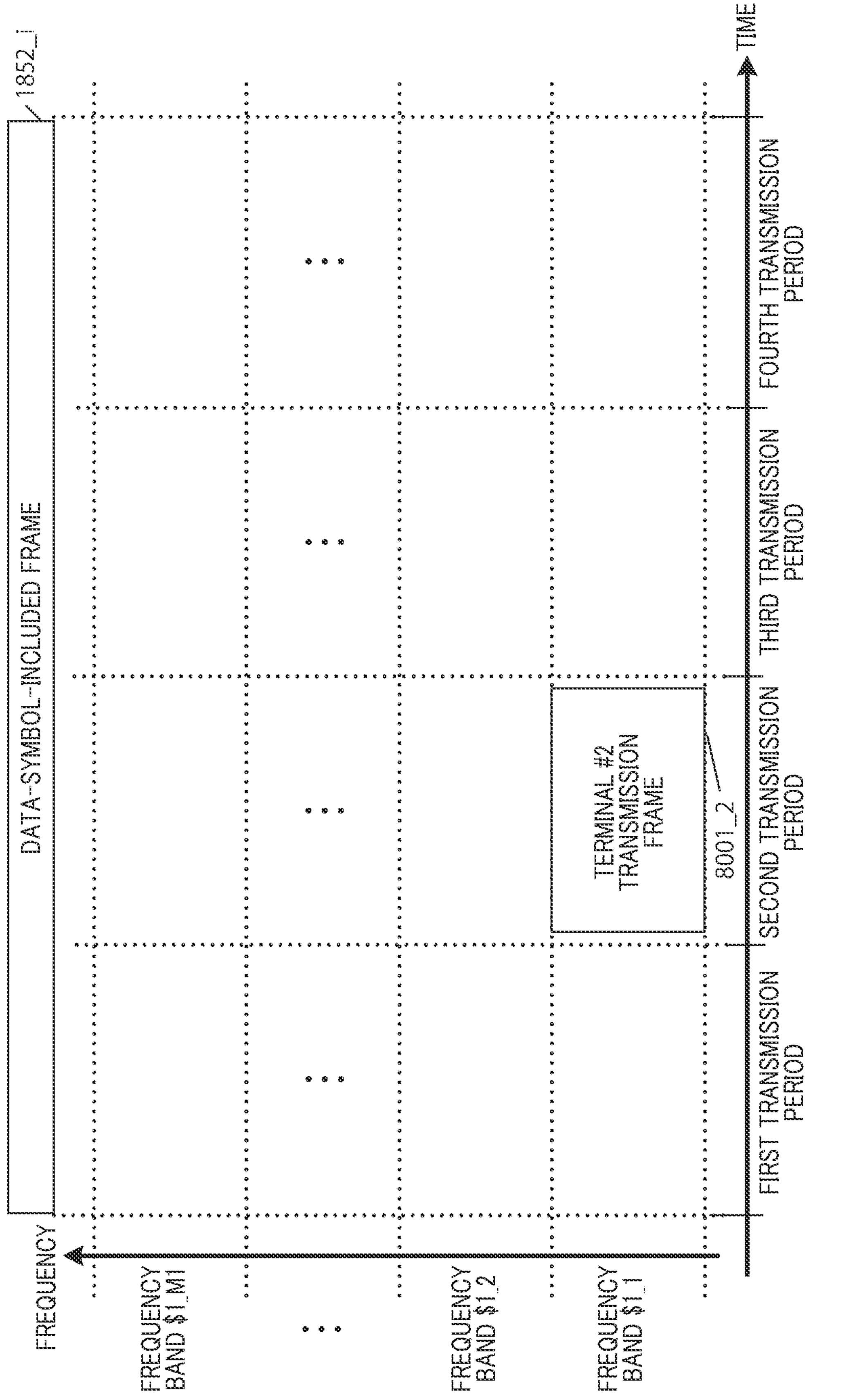
Figure 80C:
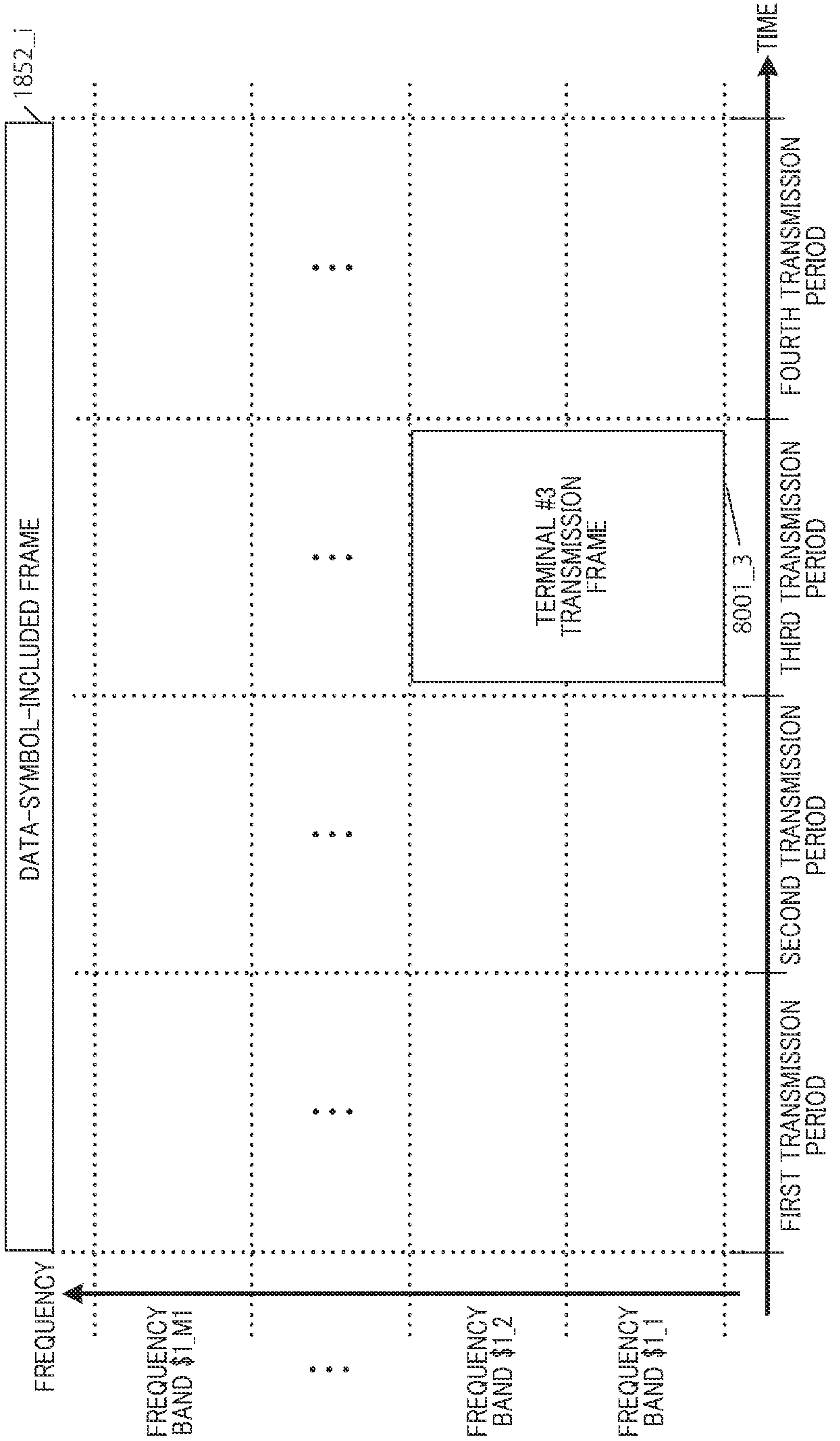
Figure 80D:
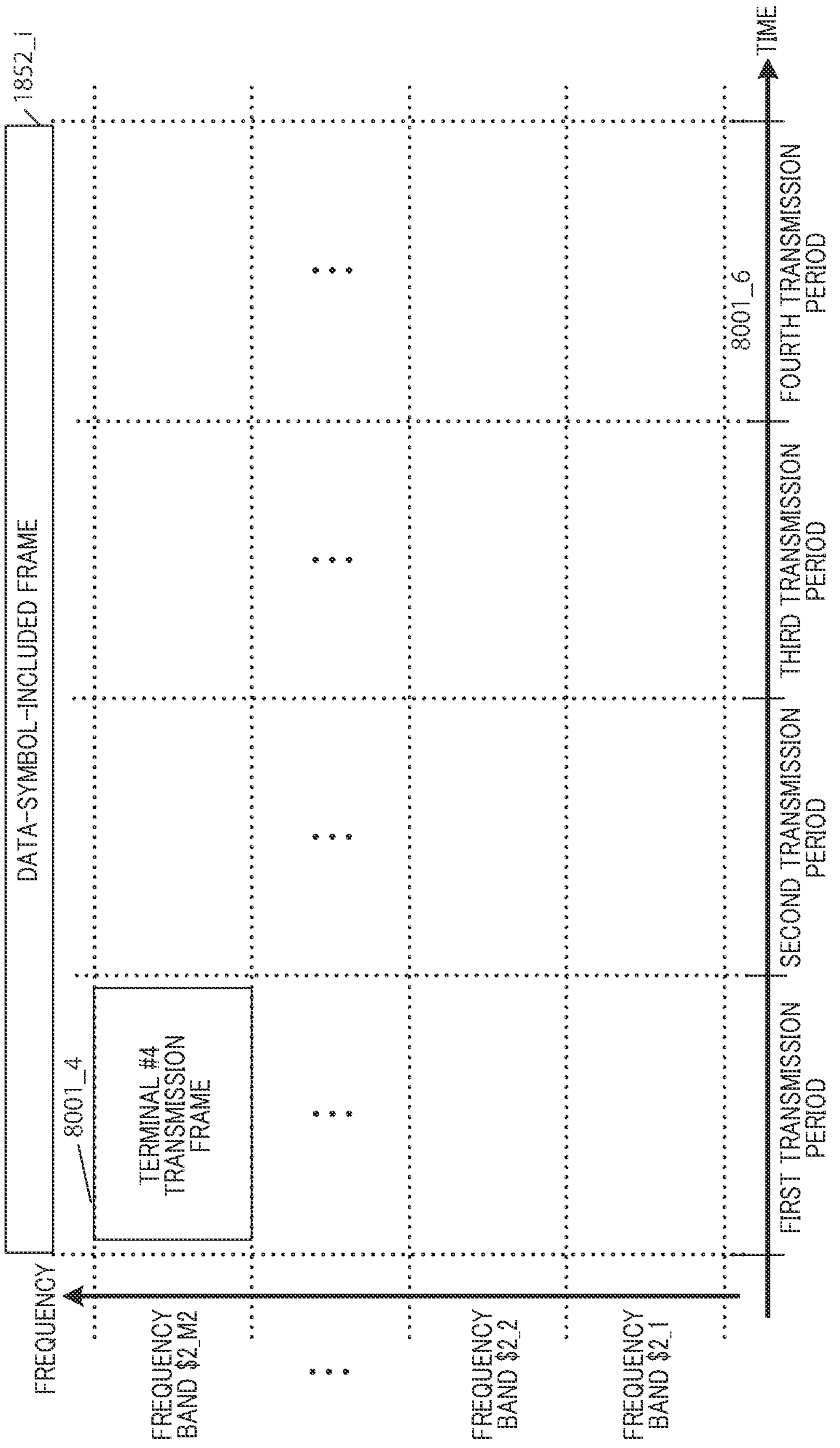
Figure 80E:
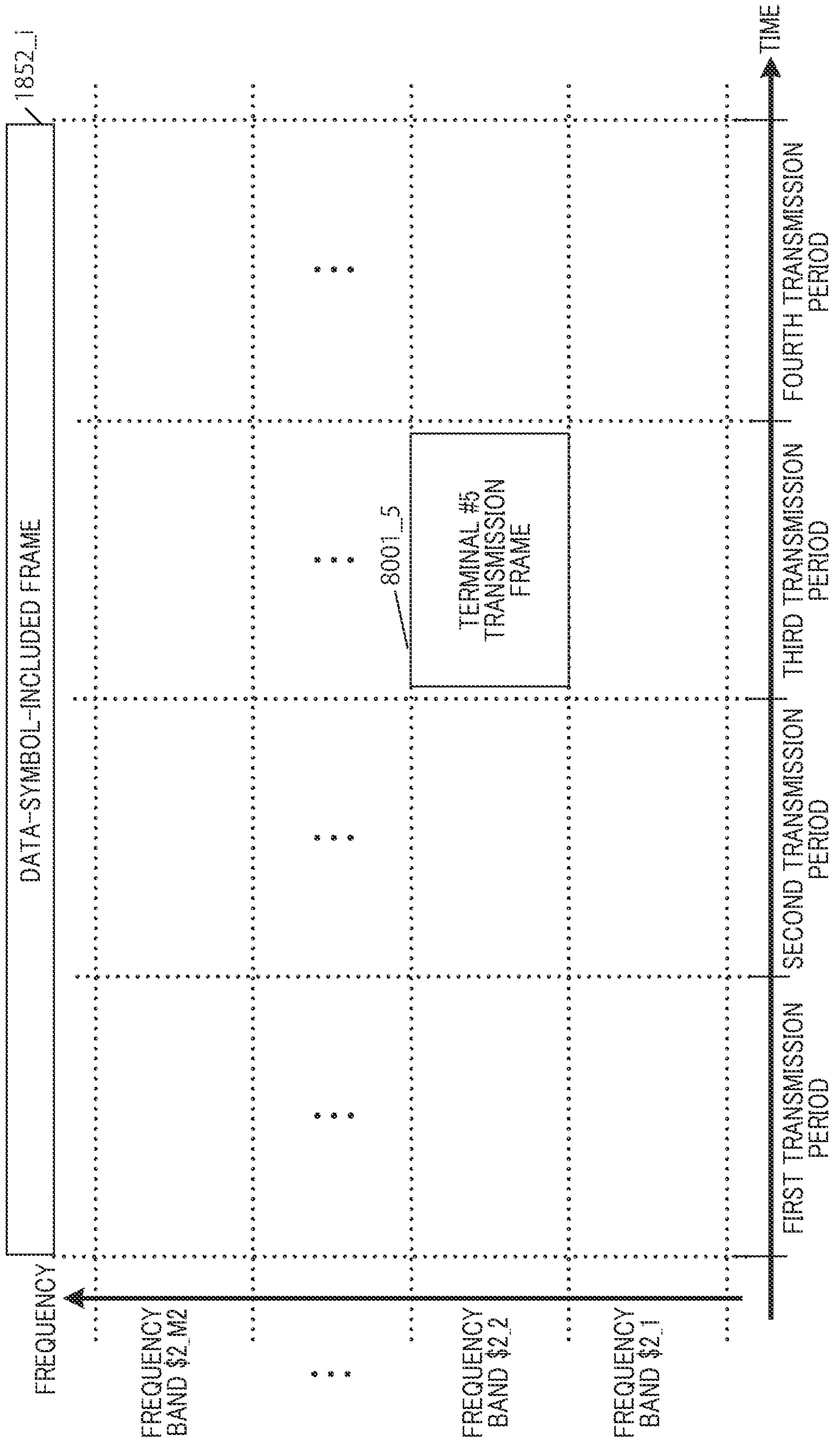
Figure 80F:
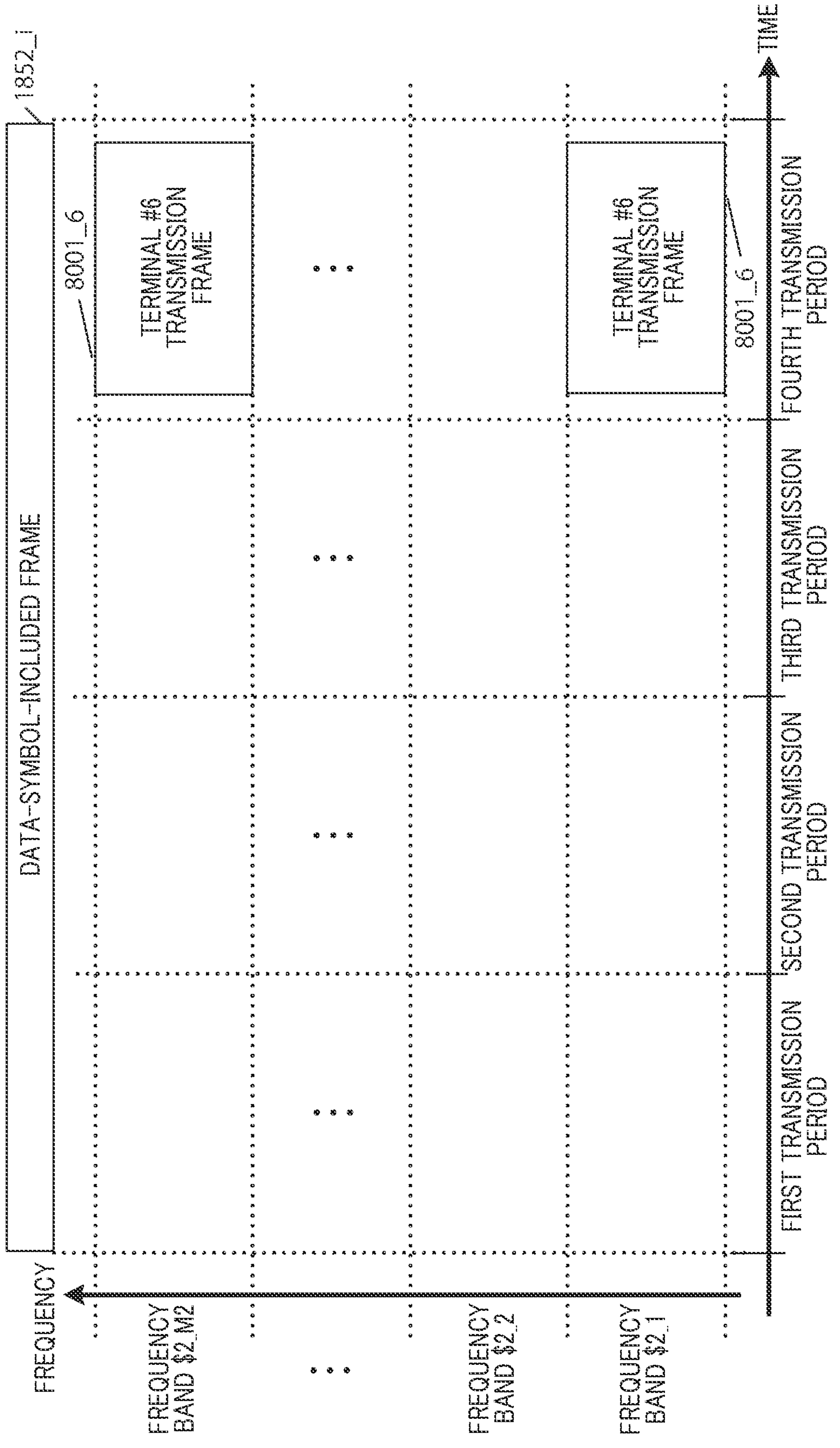
Figure 81A:
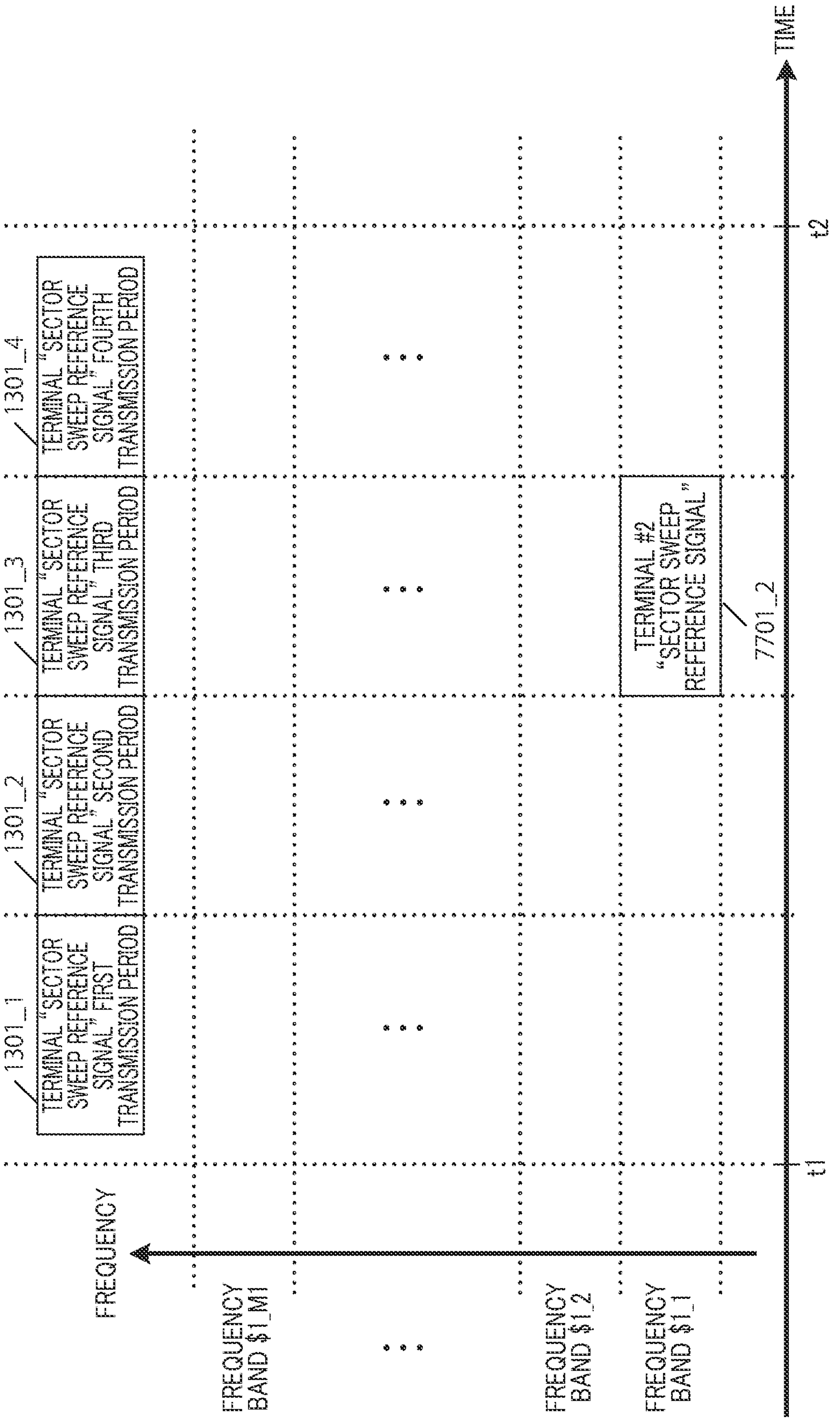
Figure 81B:
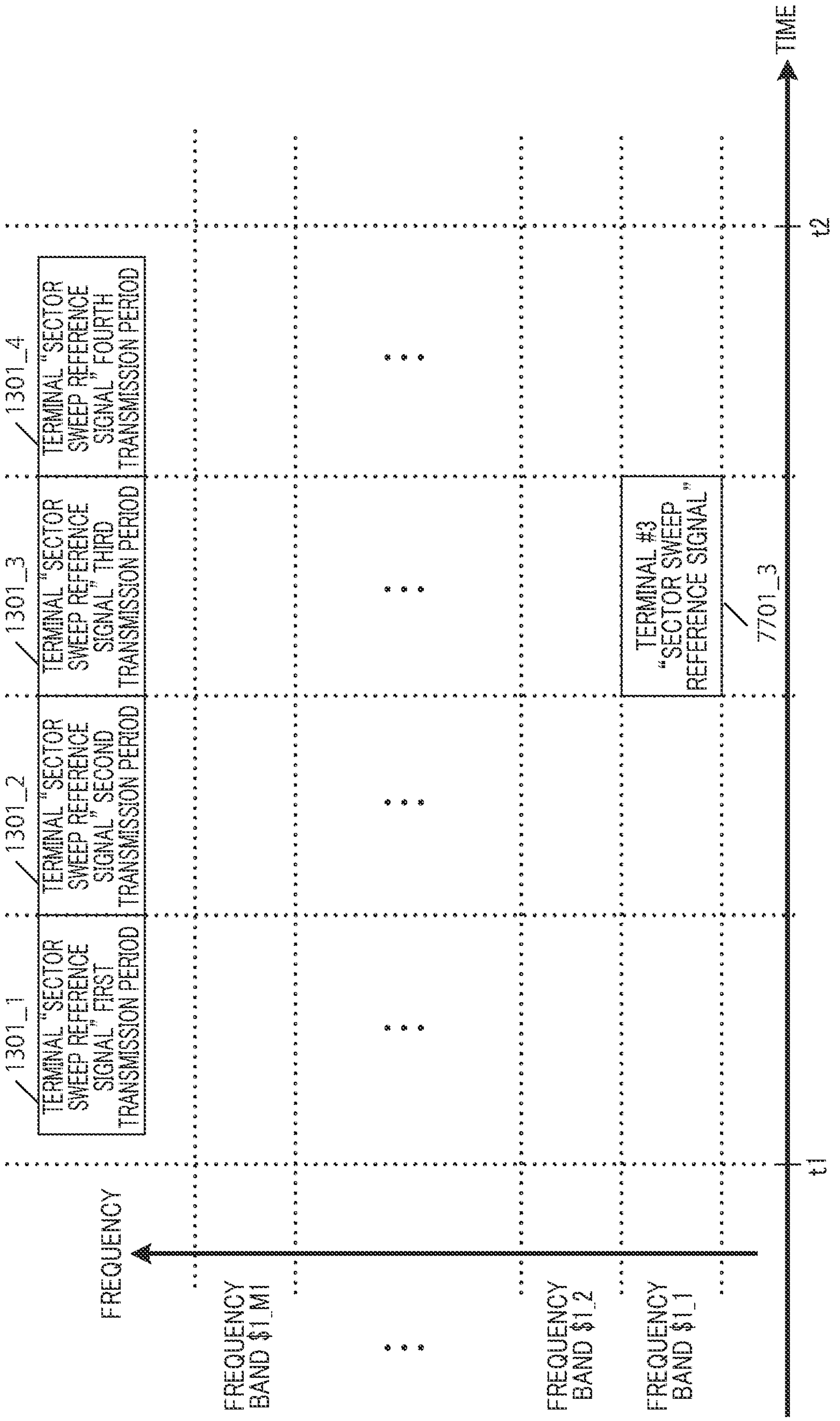
Figure 82A:
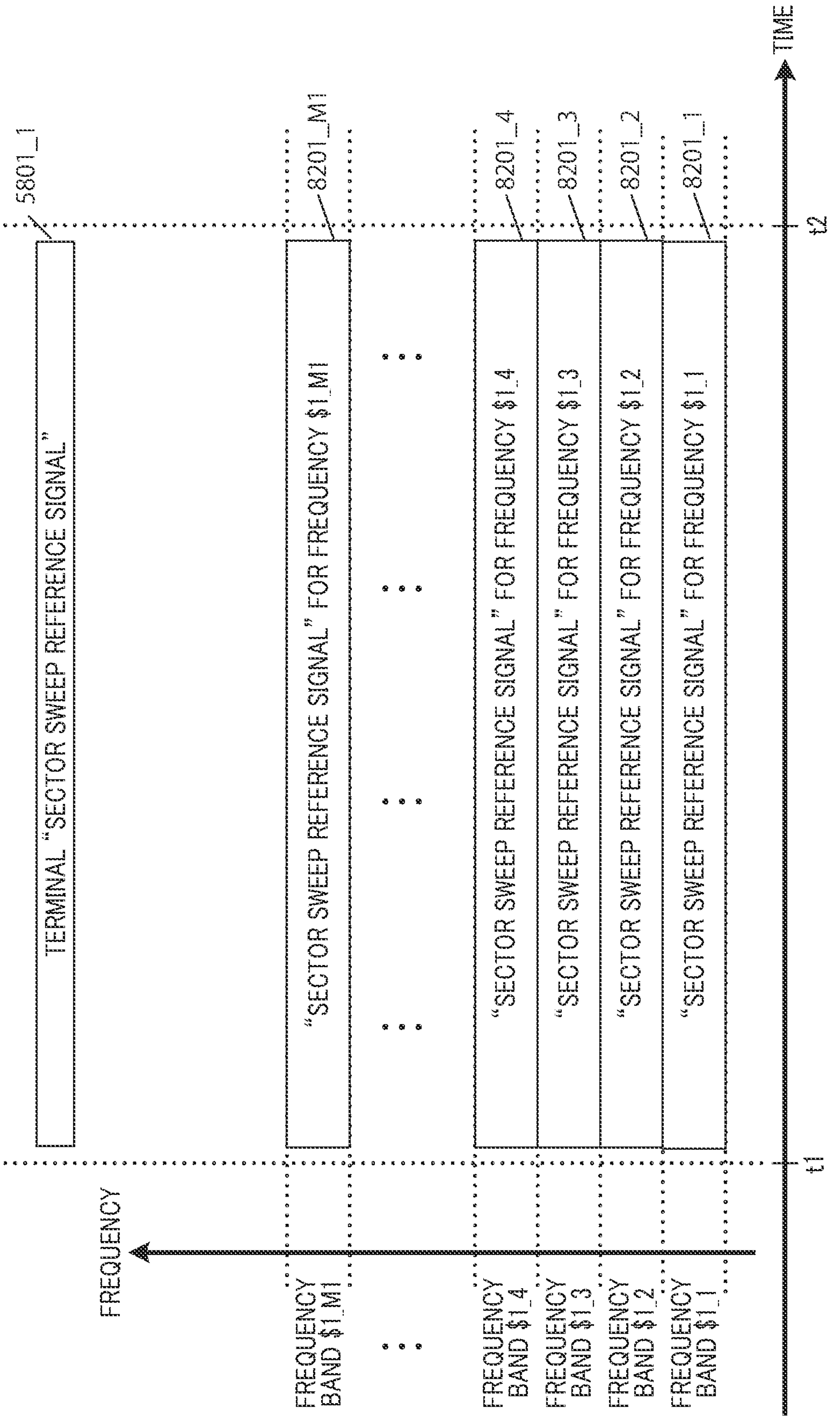
Figure 82B:
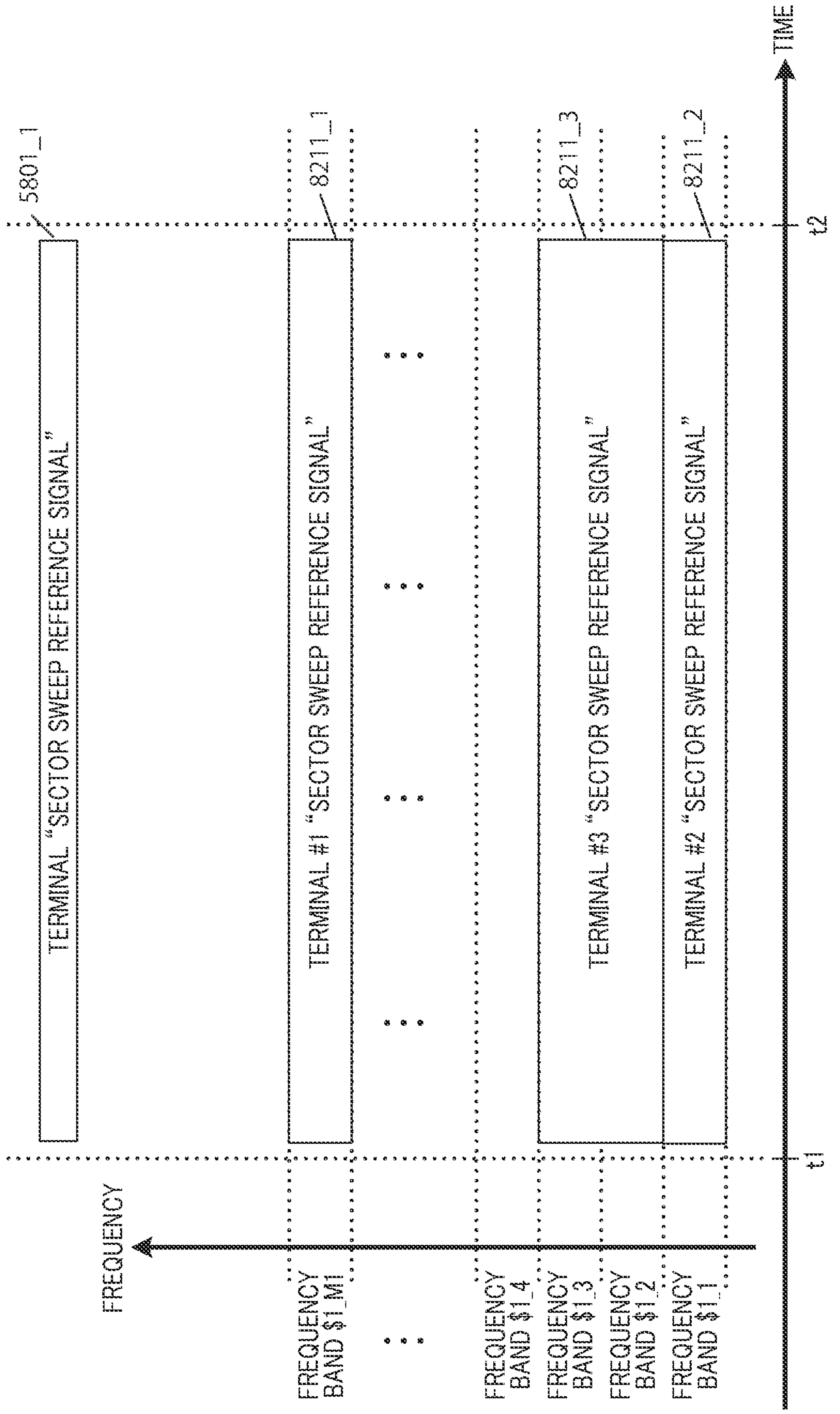
Figure 83A:
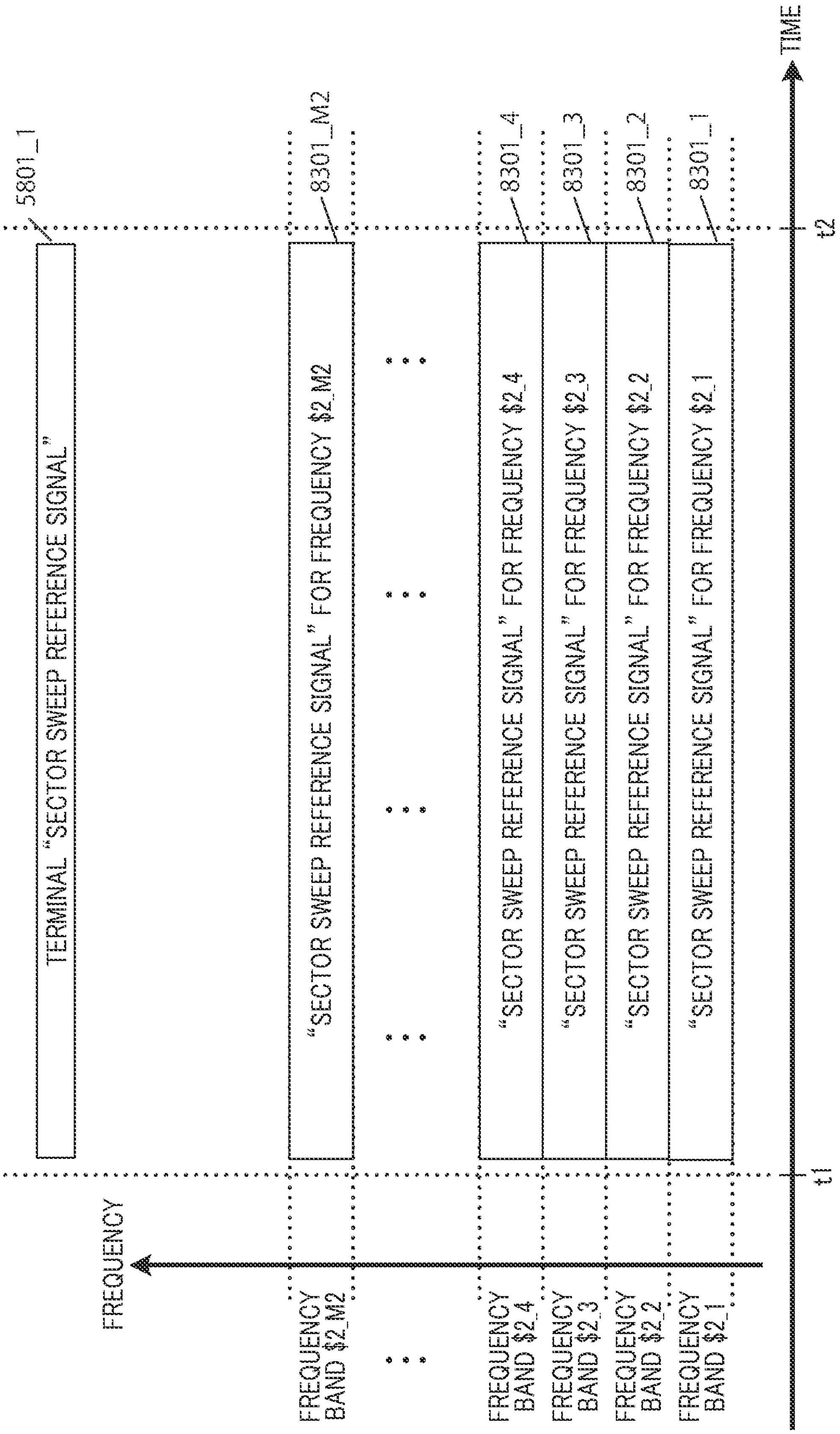
Figure 83B:
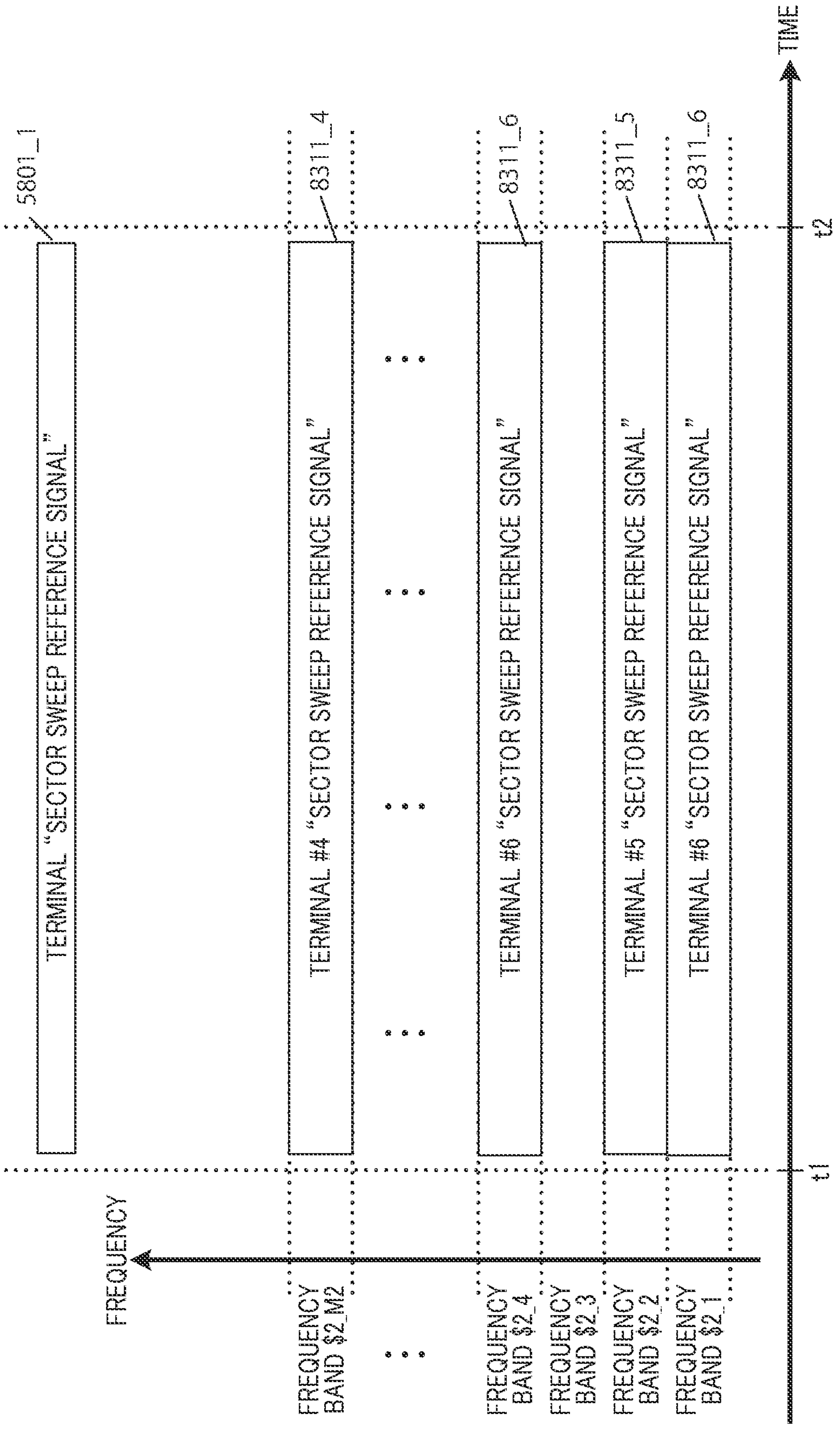
Figure 84A:
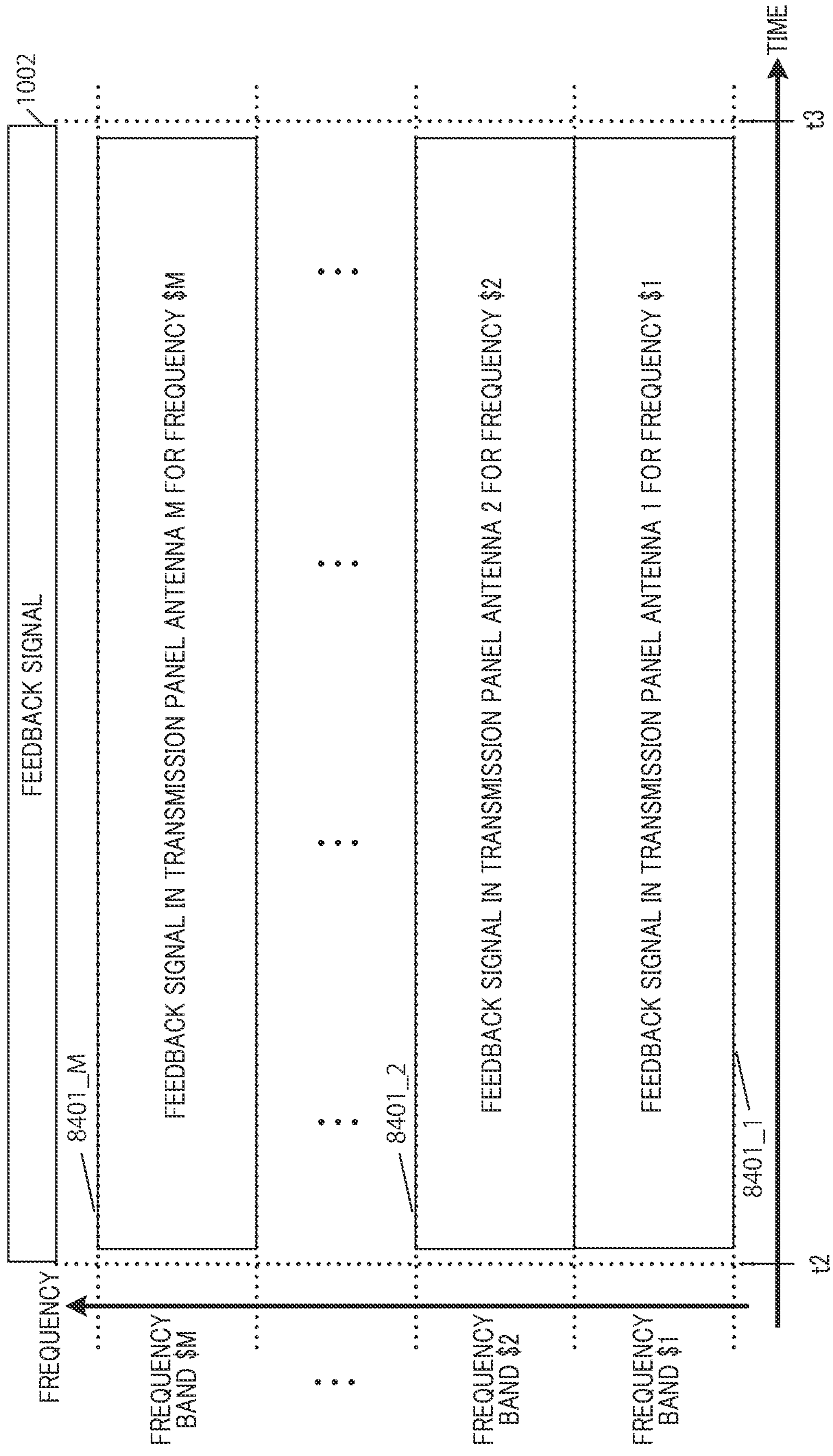
Figure 84B:
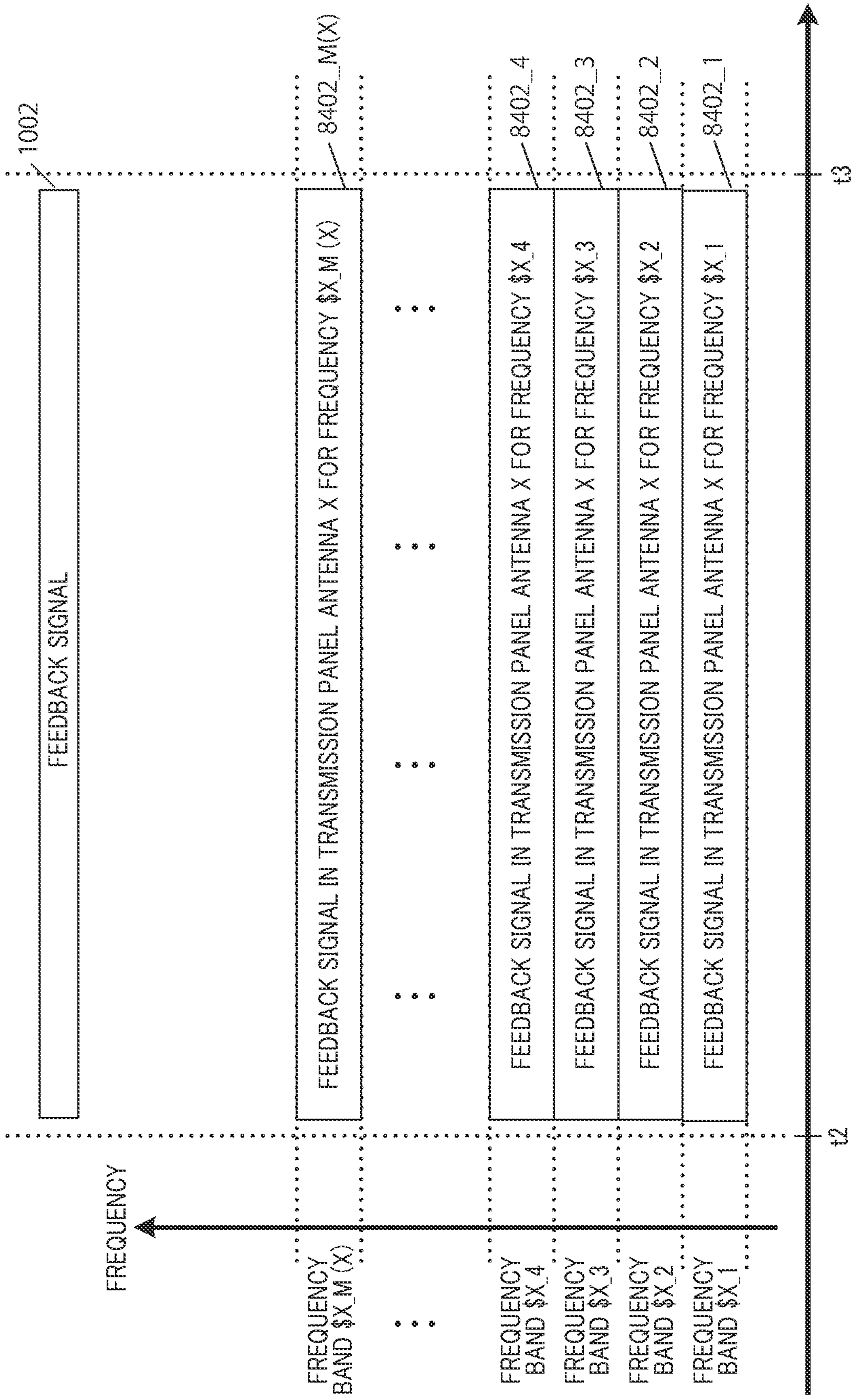
Figure 84C:
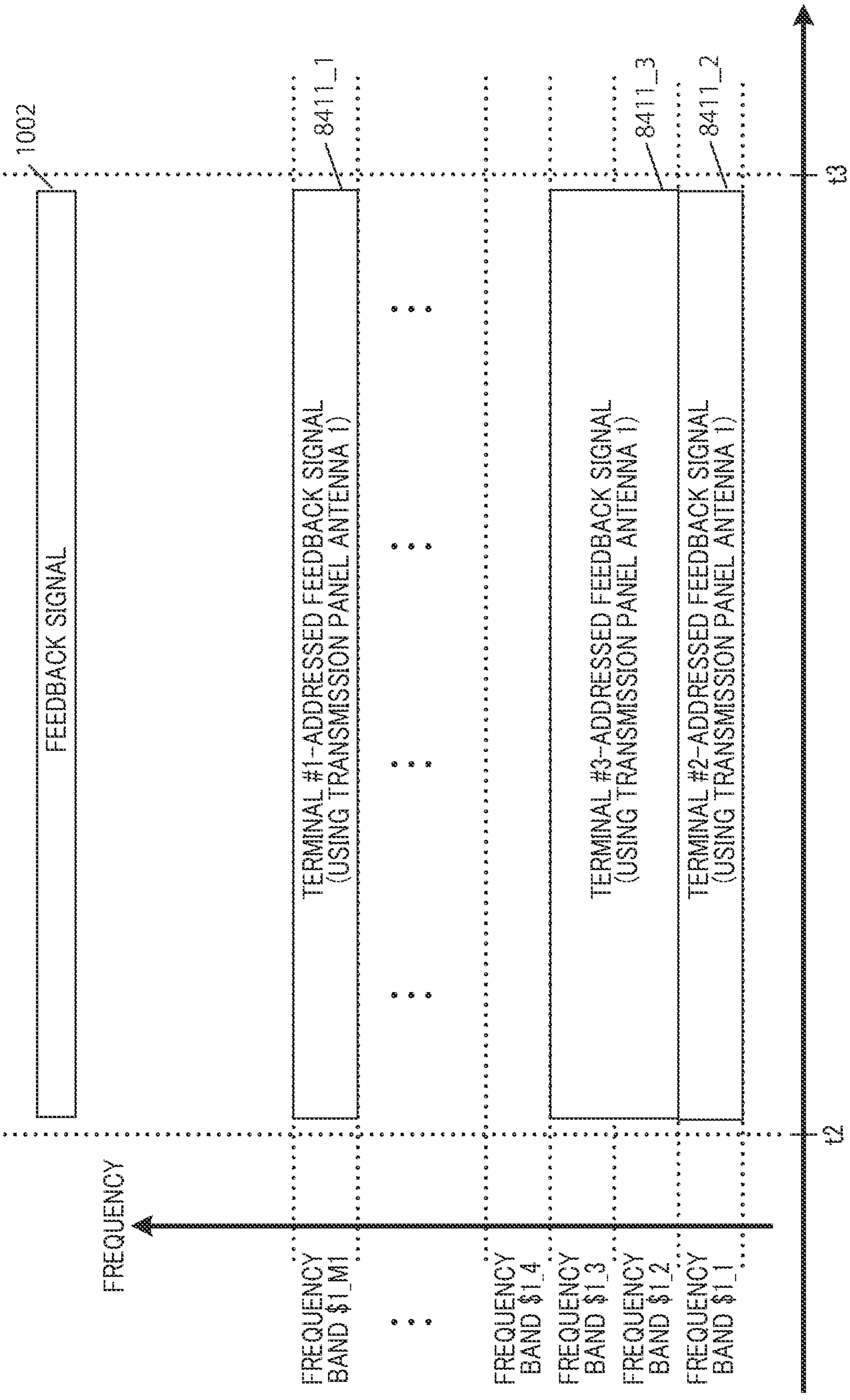
Figure 84D:
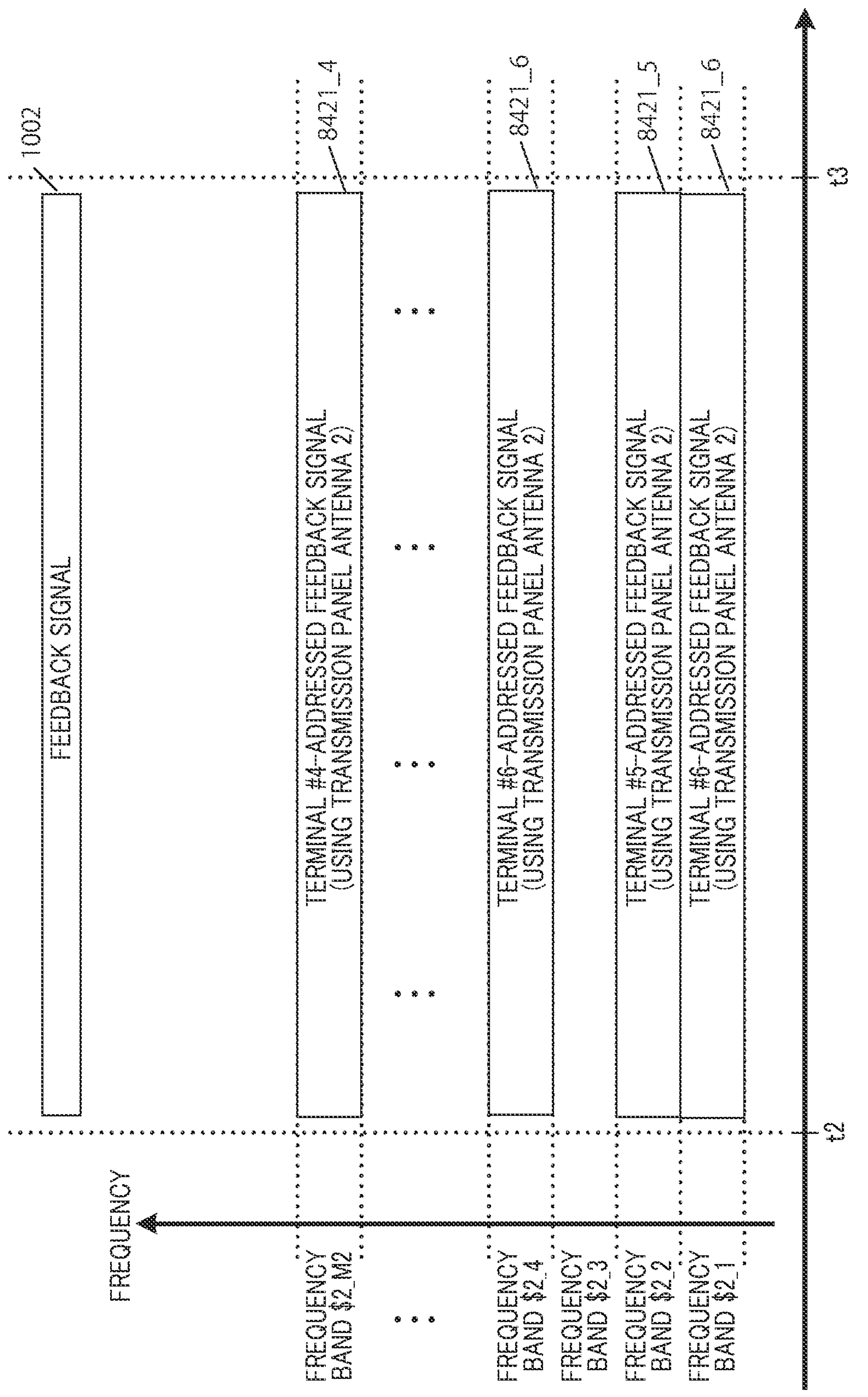
Figure 85A:
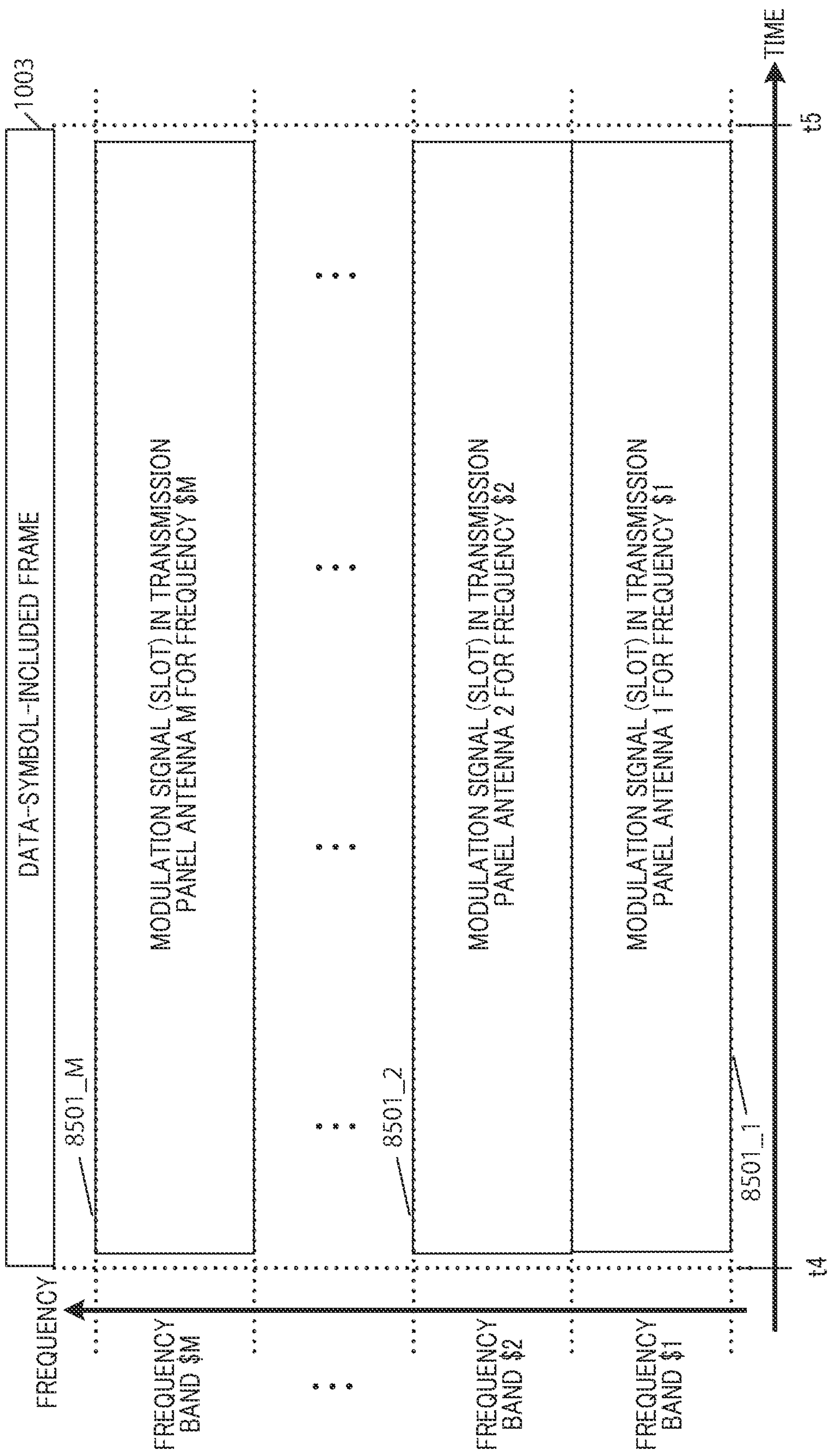
Figure 85B:
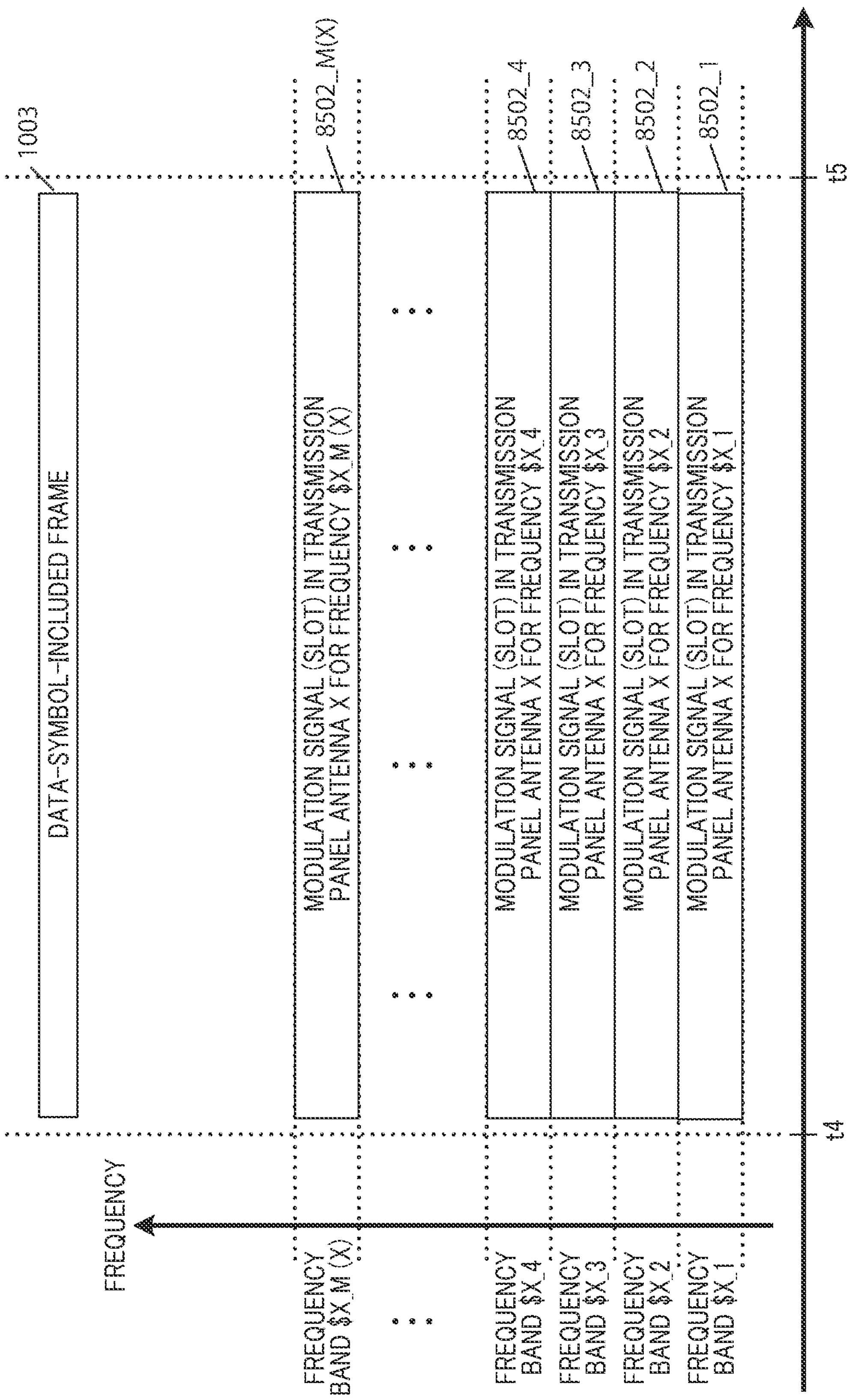
Figure 85C:
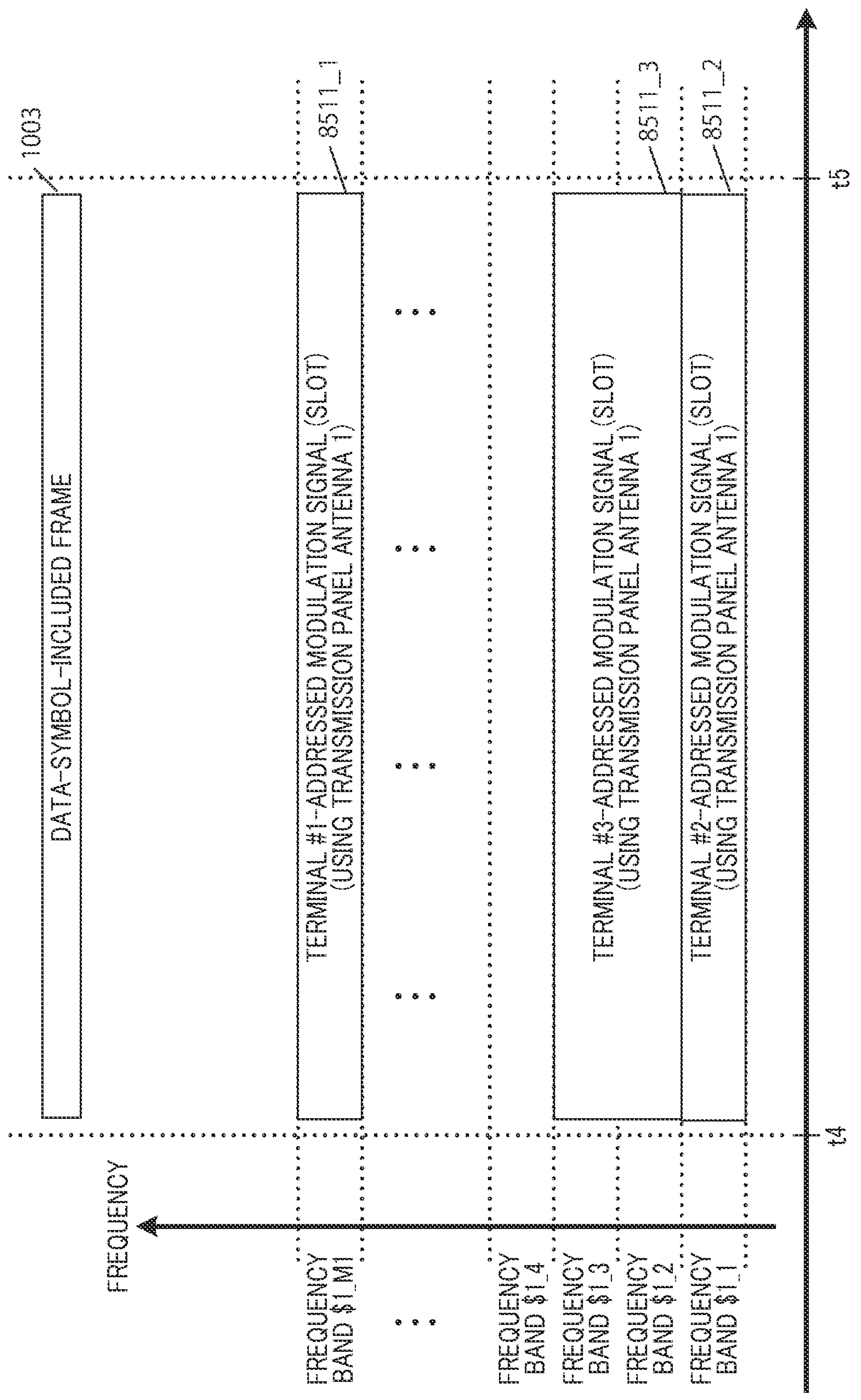
Figure 85D:
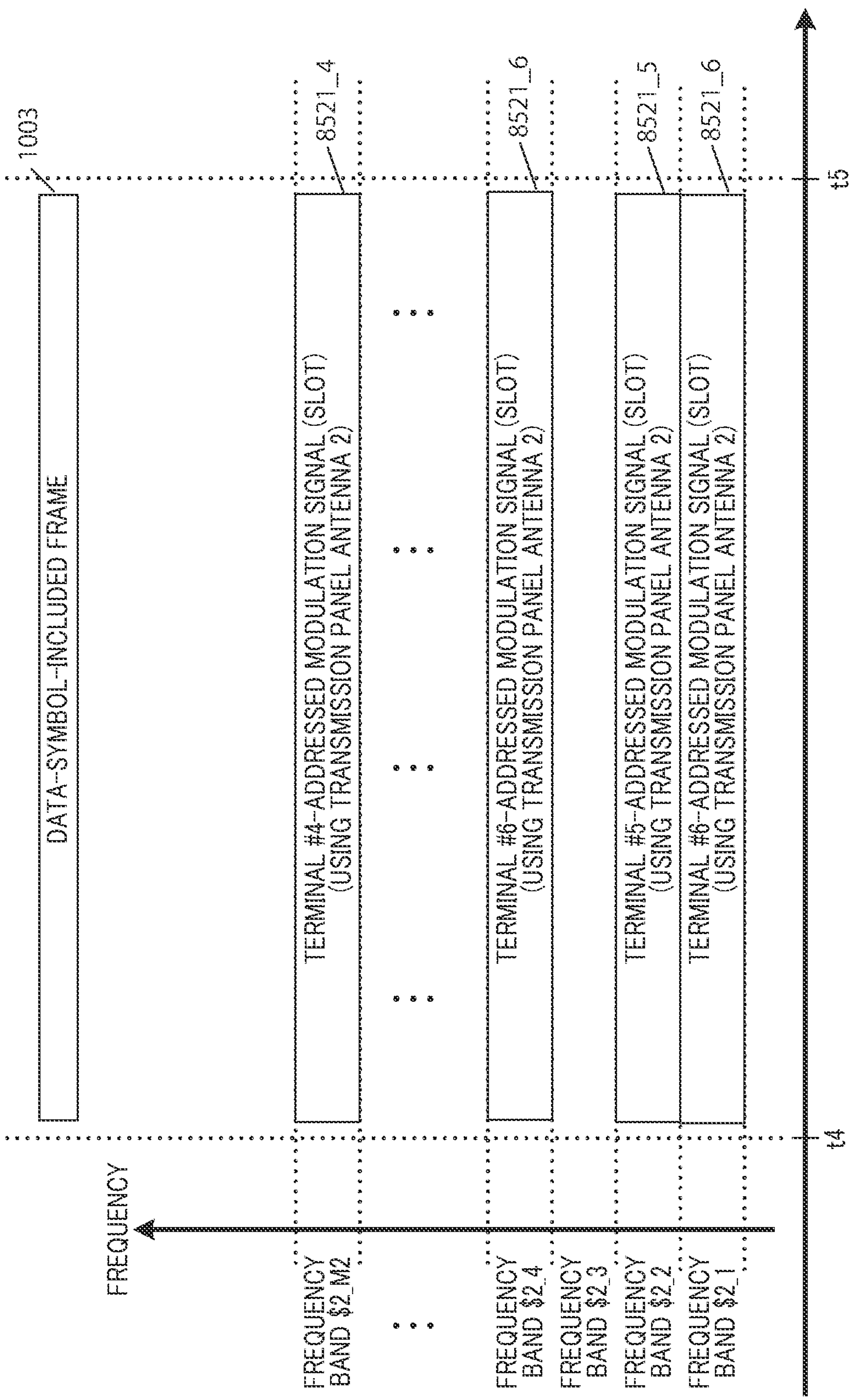
Figure 86A:
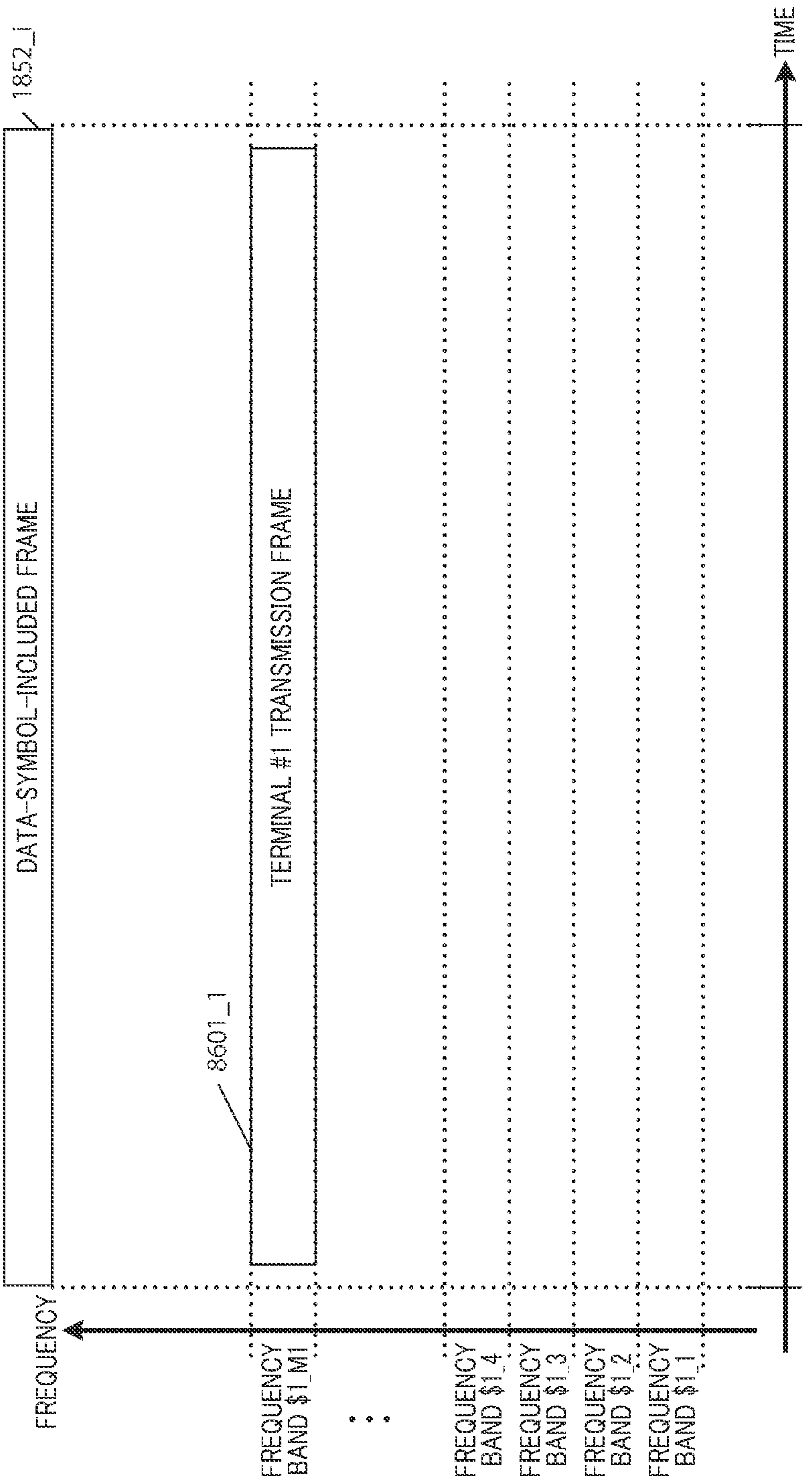
Figure 86B:
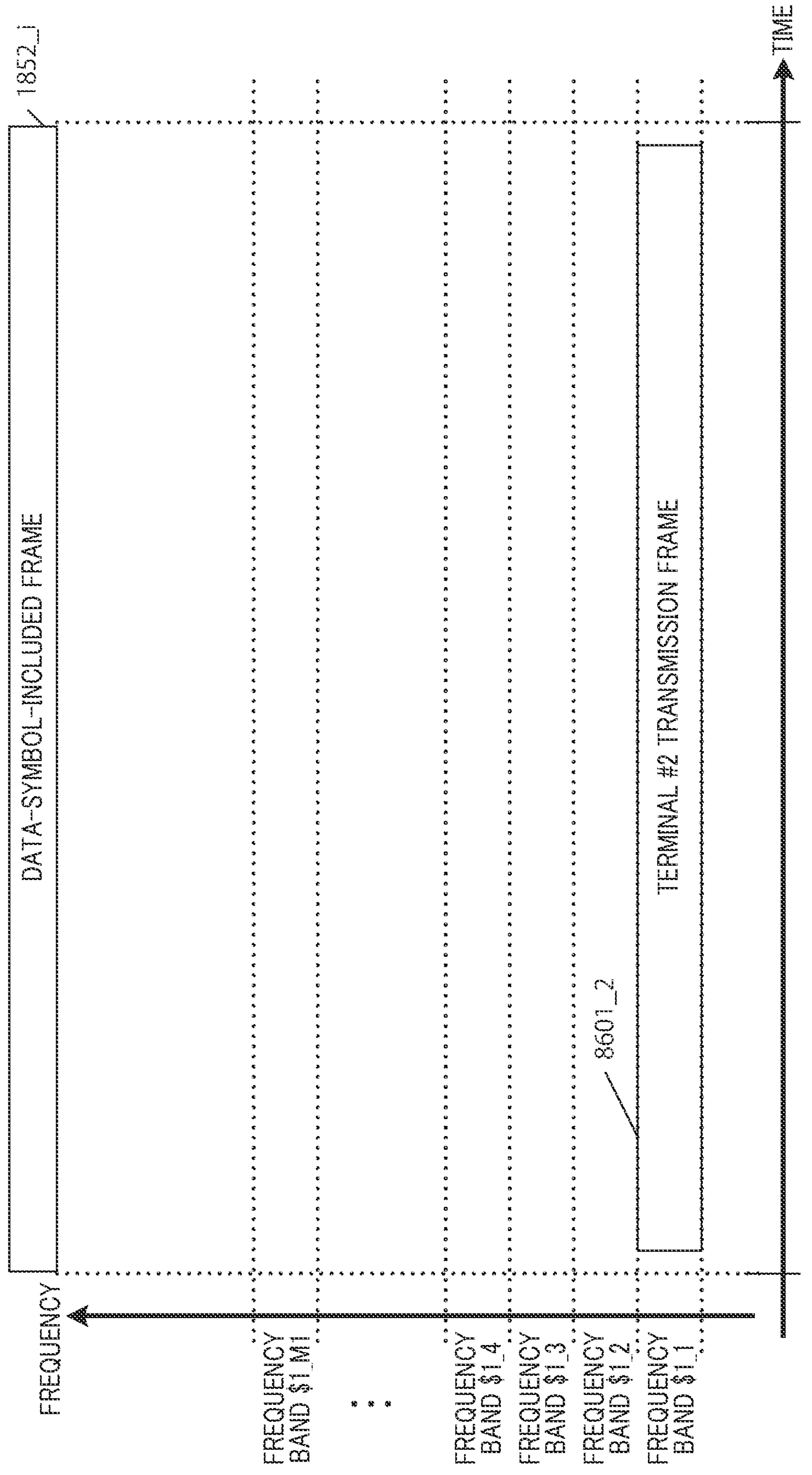
Figure 86C:
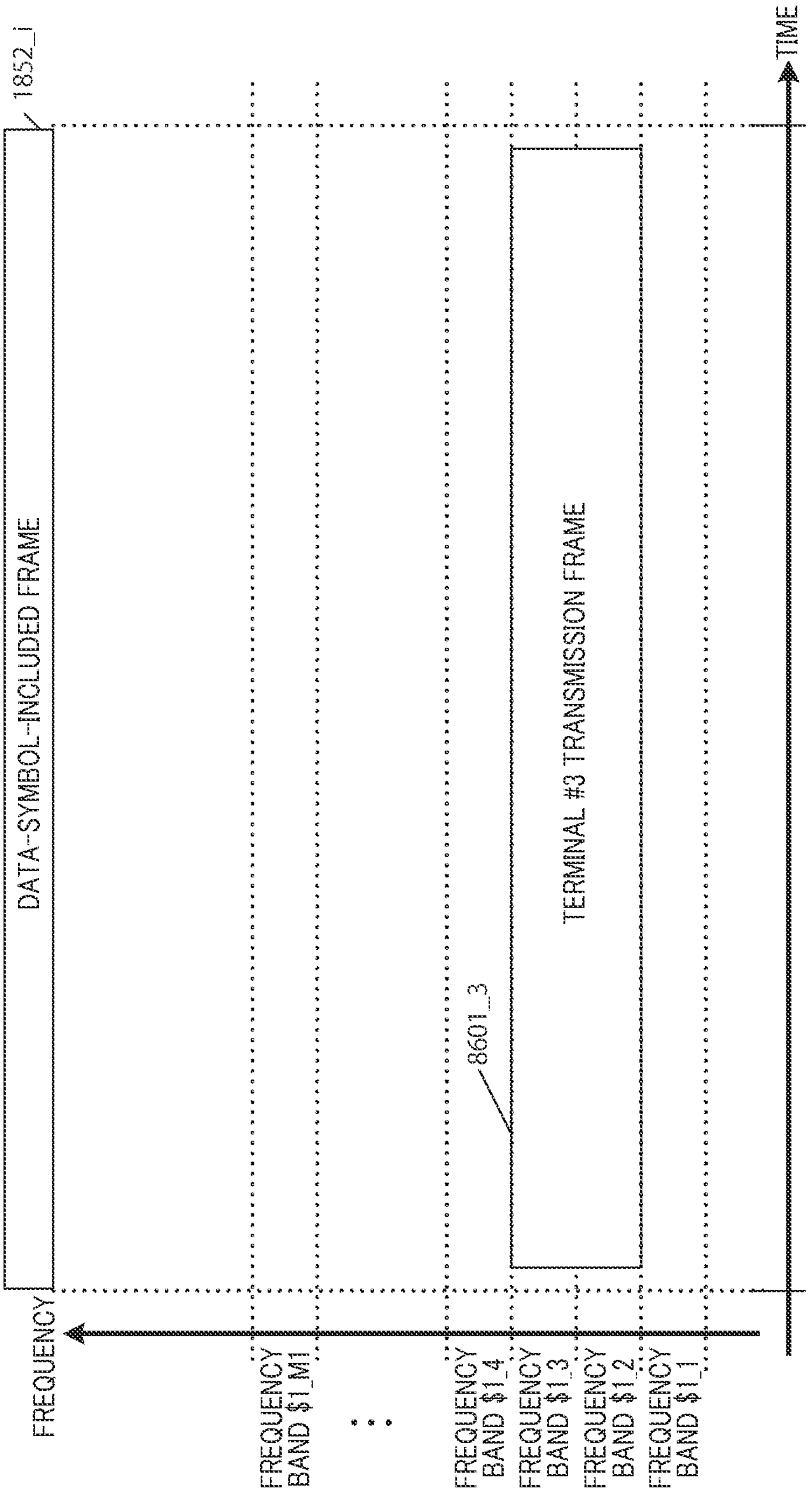
Figure 86D:
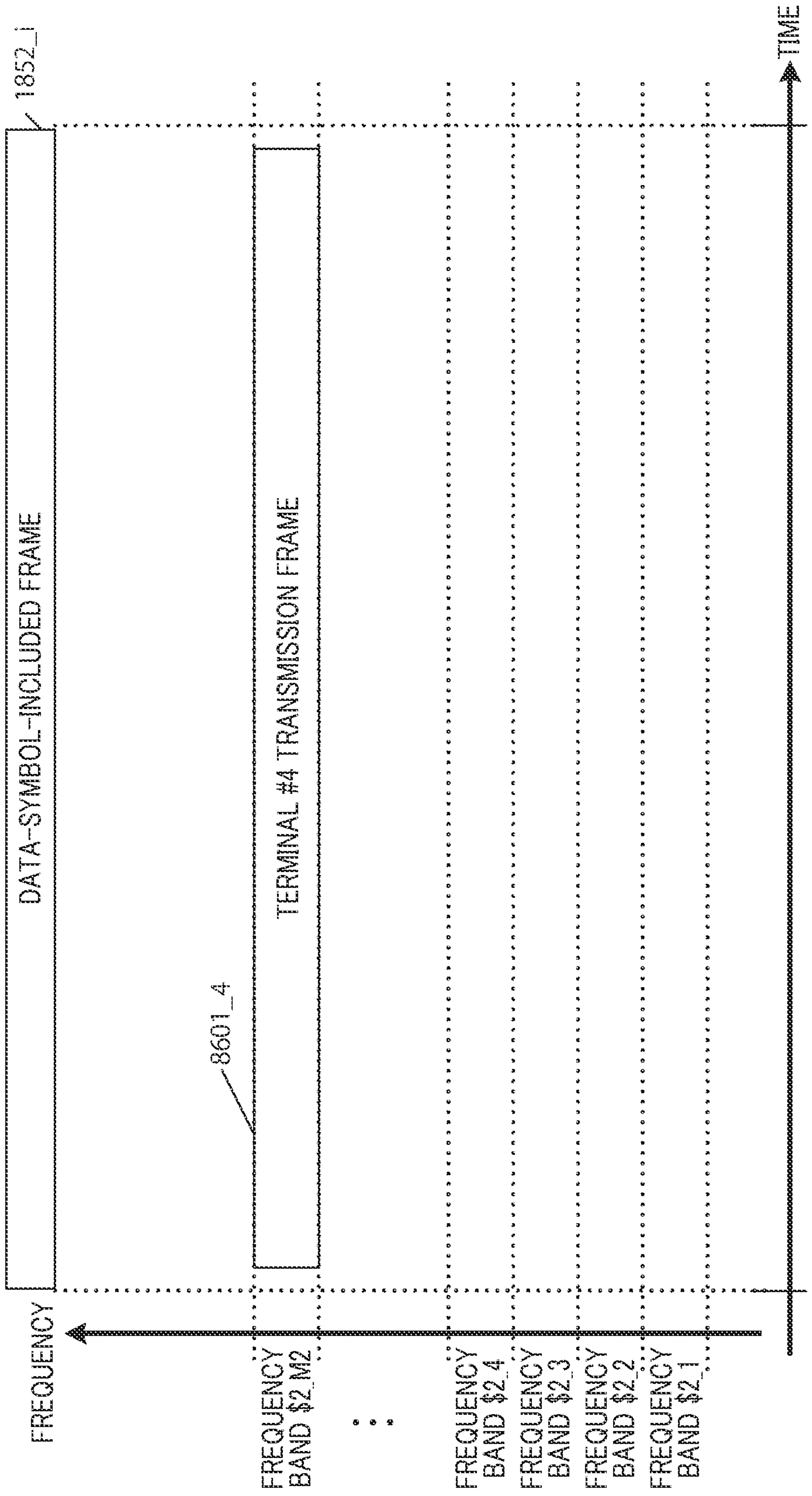
Figure 86E:
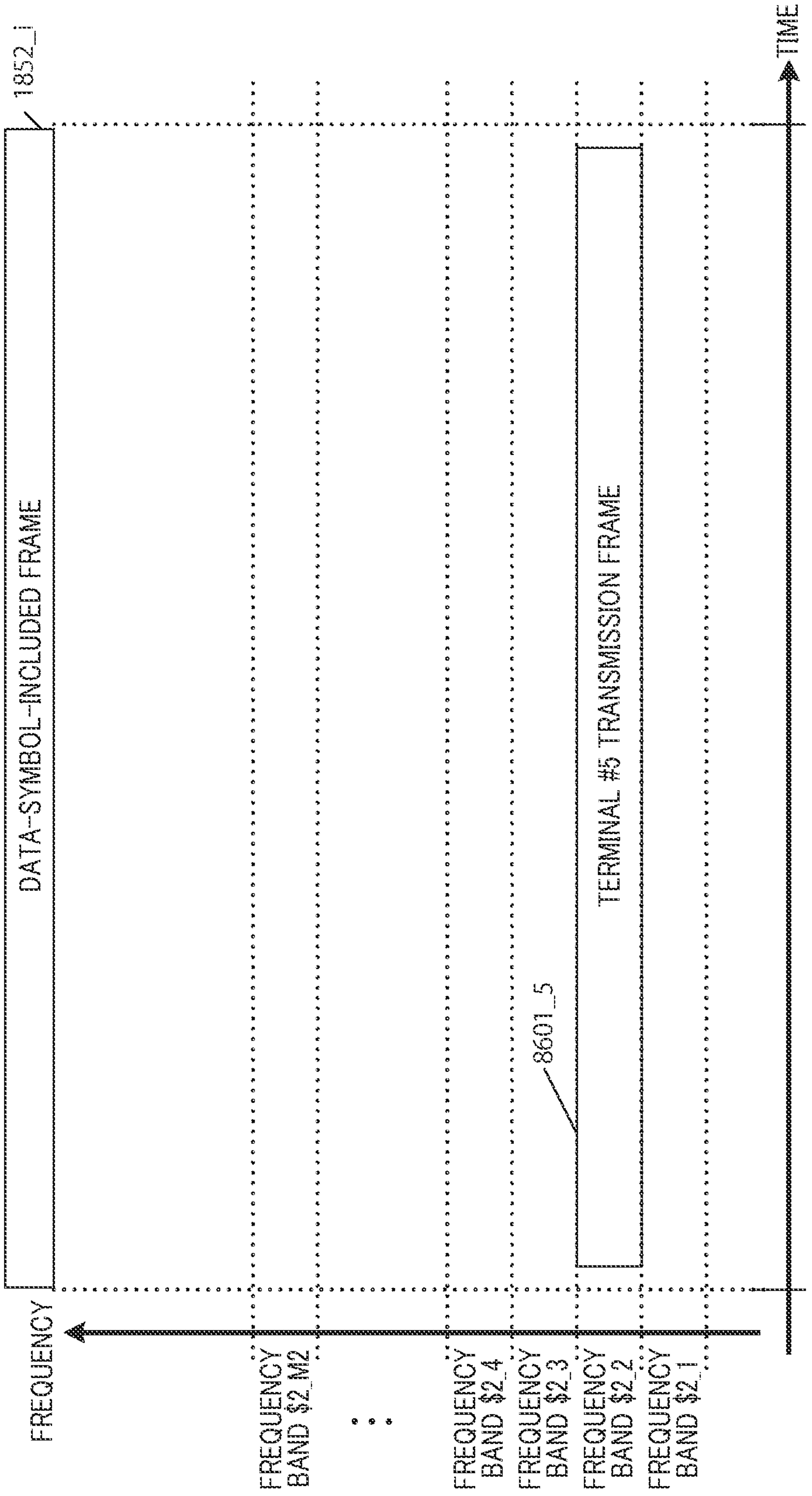
Figure 86F:
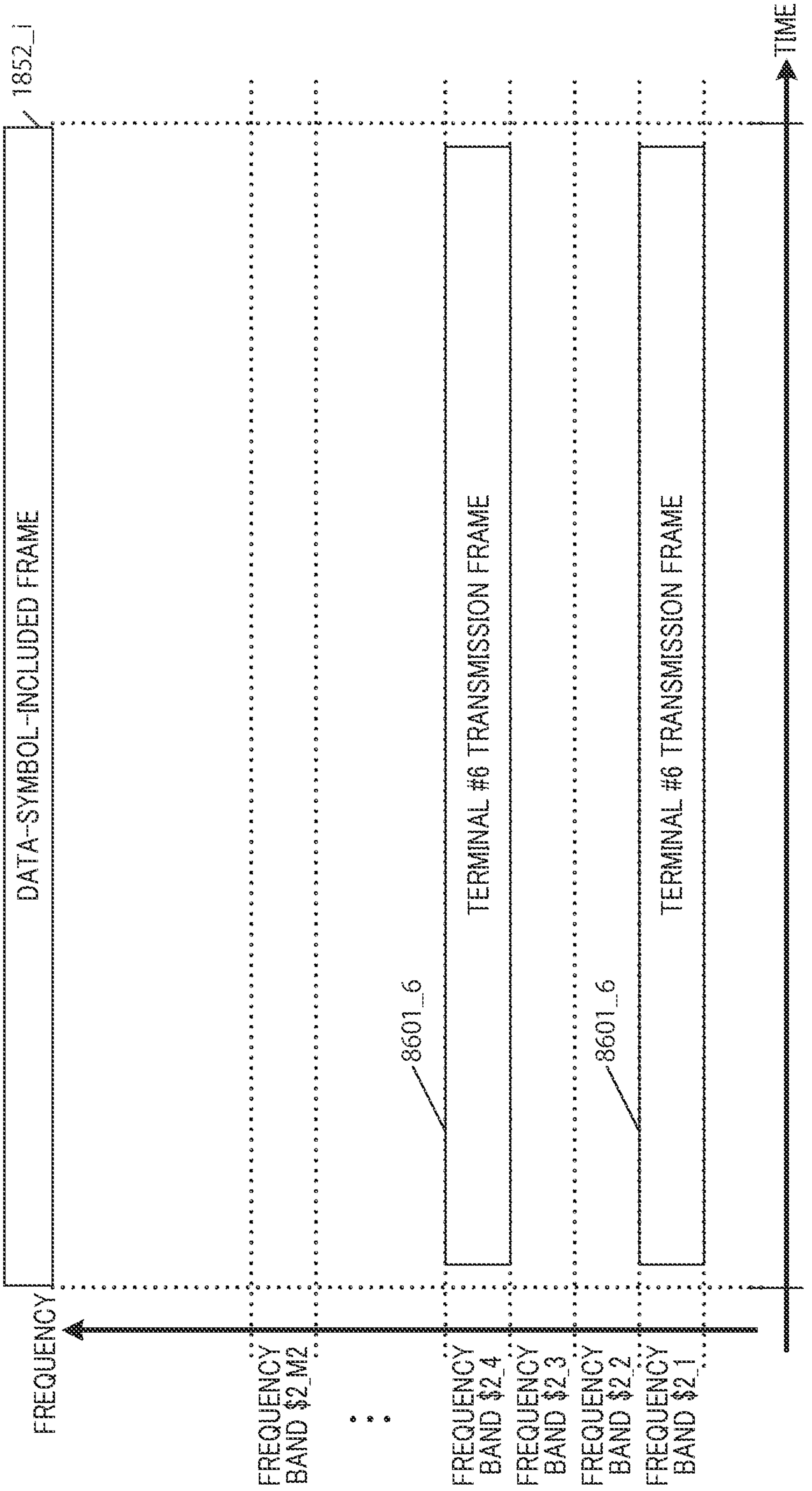
Figure 87A:
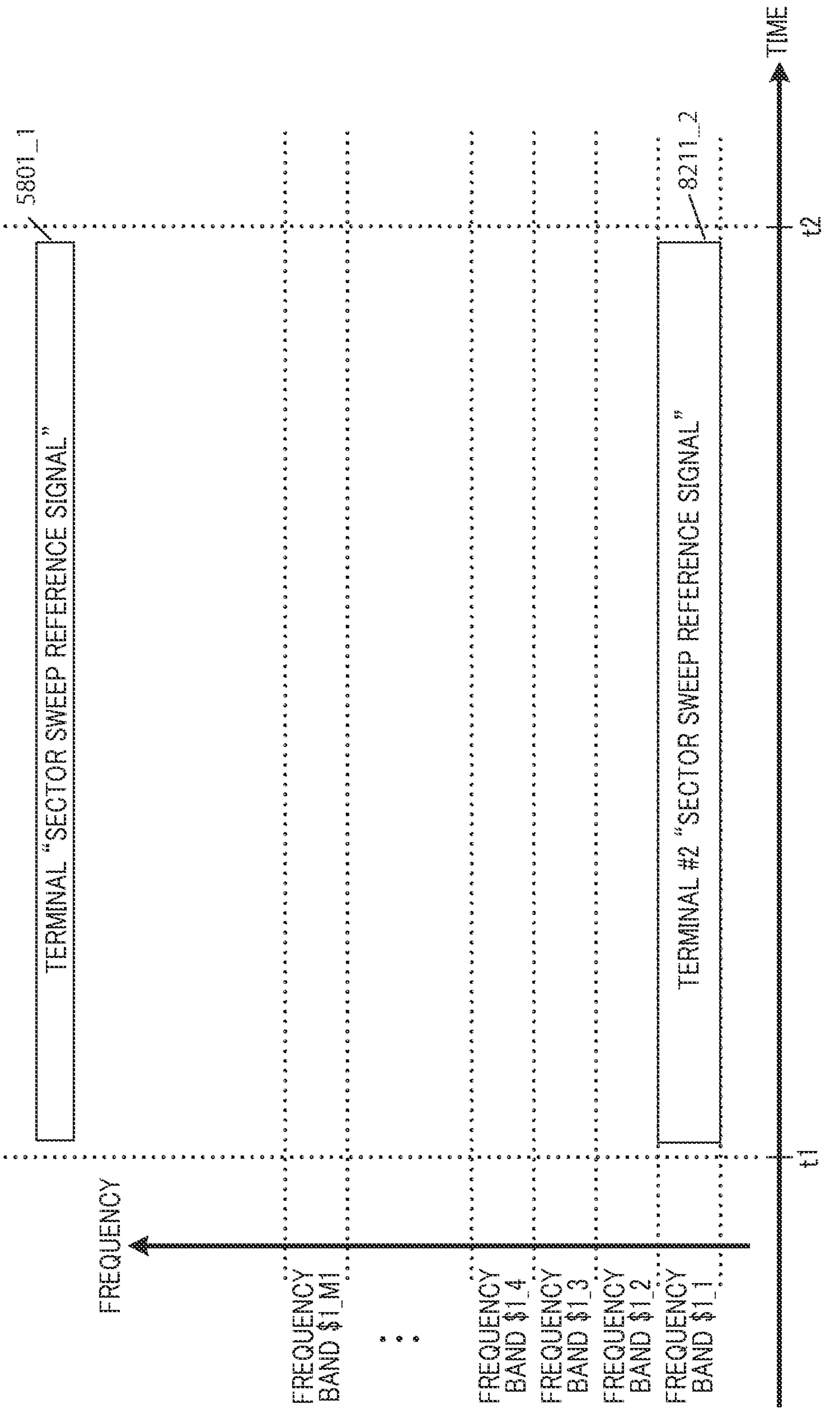
Figure 87B:
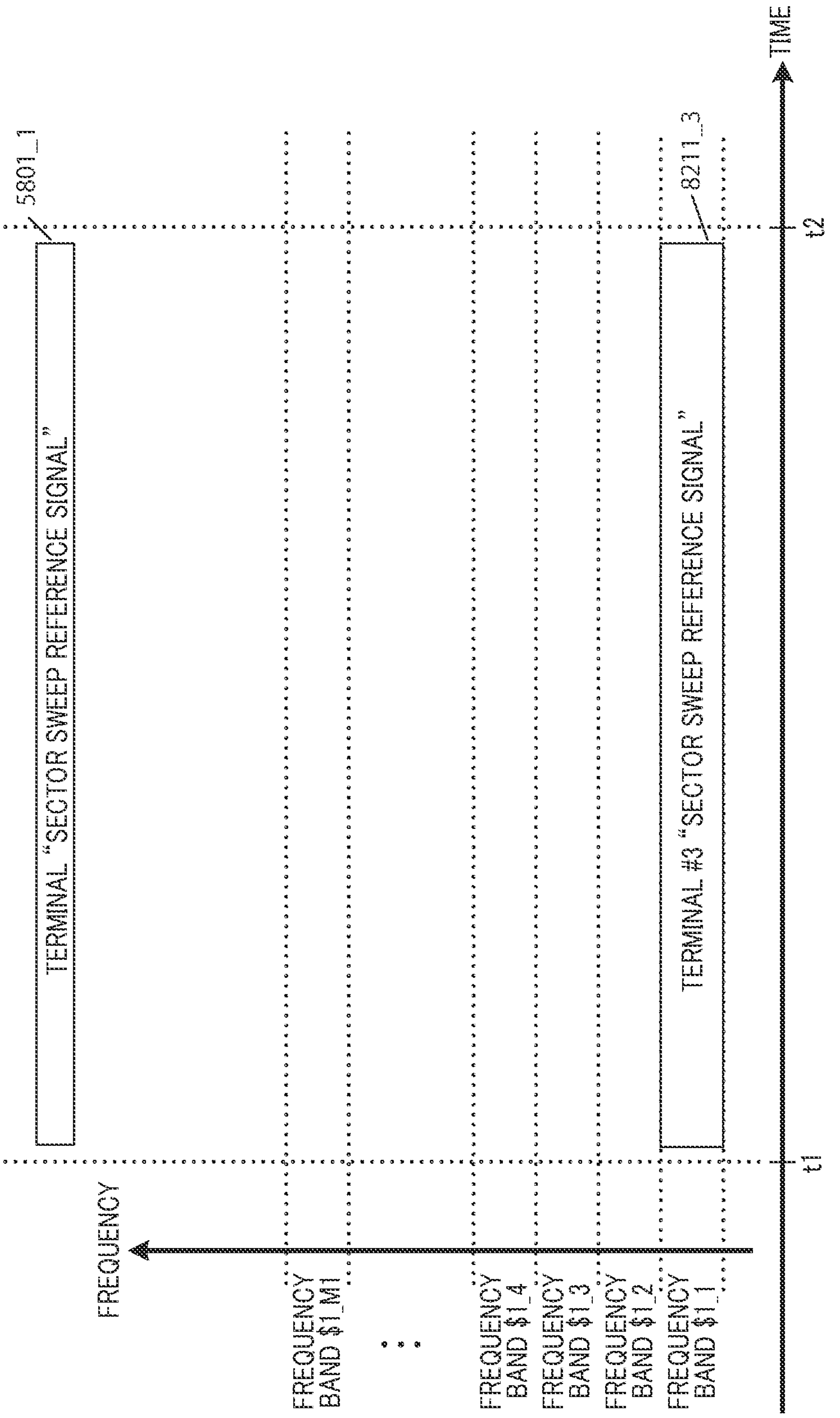
Figure 88:

FIG. 80E illustrates an exemplary configuration of a "data-symbol-included frame" transmitted by terminal #5;

FIG. 80F illustrates an exemplary configuration of a "data-symbol-included frame" transmitted by terminal #6;

FIG. 81A illustrates exemplary occupation by the terminals different from that in FIG. 77A in the terminal "sector sweep reference signal" transmission periods illustrated in FIG. 13;

FIG. 81B illustrates exemplary occupation by the terminals different from that in FIG. 77A in the terminal "sector sweep reference signal" transmission periods illustrated in FIG. 13;

FIG. 82A illustrates an exemplary configuration, in time and frequency, of the terminal "sector sweep reference signal" illustrated in FIG. 58;

FIG. 82B illustrates exemplary occupation by the terminals in the terminal "sector sweep reference signal" illustrated in FIG. 82A;

FIG. 83A illustrates an exemplary configuration, in time and frequency, of the terminal "sector sweep reference signal" illustrated in FIG. 58;

FIG. 83B illustrates exemplary occupation by the terminals in the terminal "sector sweep reference signal" illustrated in FIG. 83A;

FIG. 84A illustrates an exemplary configuration of the feedback signal that is present in the time period from t2 to t3 in FIG. 10 and transmitted by base station #1;

FIG. 84B illustrates an exemplary configuration of the "feedback signal in transmission panel antenna X for frequency $X" in FIG. 84A;

FIG. 84C illustrates exemplary specific feedback signal assignment for the feedback signal illustrated in FIGS. 84A and 84B;

FIG. 84D illustrates exemplary specific feedback signal assignment for the feedback signal illustrated in FIGS. 84A and 84B;

FIG. 85A illustrates an exemplary configuration of the data-symbol-included frame that is present in the time period from t4 to t5 in FIG. 10 and transmitted by base station #1;

FIG. 85B illustrates an exemplary configuration of the "modulation signal (slot) in transmission panel antenna X for frequency $X" in FIG. 85A;

FIG. 85C illustrates exemplary specific modulation signal (slot) assignment for the data-symbol-included frame illustrated in FIGS. 85A and 85B;

FIG. 85D illustrates exemplary specific modulation signal (slot) assignment for the data-symbol-included frame illustrated in FIGS. 85A and 85B;

FIG. 86A illustrates an exemplary configuration of a "data-symbol-included frame" transmitted by terminal #1;

FIG. 86B illustrates an exemplary configuration of a "data-symbol-included frame" transmitted by terminal #2;

FIG. 86C illustrates an exemplary configuration of a "data-symbol-included frame" transmitted by terminal #3;

FIG. 86D illustrates an exemplary configuration of a "data-symbol-included frame" transmitted by terminal #4;

FIG. 86E illustrates an exemplary configuration of a "data-symbol-included frame" transmitted by terminal #5;

FIG. 86F illustrates an exemplary configuration of a "data-symbol-included frame" transmitted by terminal #6;

FIG. 87A illustrates exemplary occupation by the terminals different from that in FIG. 82B in the terminal "sector sweep reference signal" illustrated in FIG. 58;

FIG. 87B illustrates exemplary occupation by the terminals different from that in FIG. 82B in the terminal "sector sweep reference signal" illustrated in FIG. 58; and FIG. 88 illustrates an exemplary communication state of a radio communication device according to a conventional technique.

DESCRIPTION OF EMBODIMENTS

Hereinafter, embodiments of the present invention will be described in detail with reference to the accompanying drawings.

Embodiment 1

A communication system, a communication apparatus, and a communication method of Embodiment 1 will be described in detail.

Figure 1A:
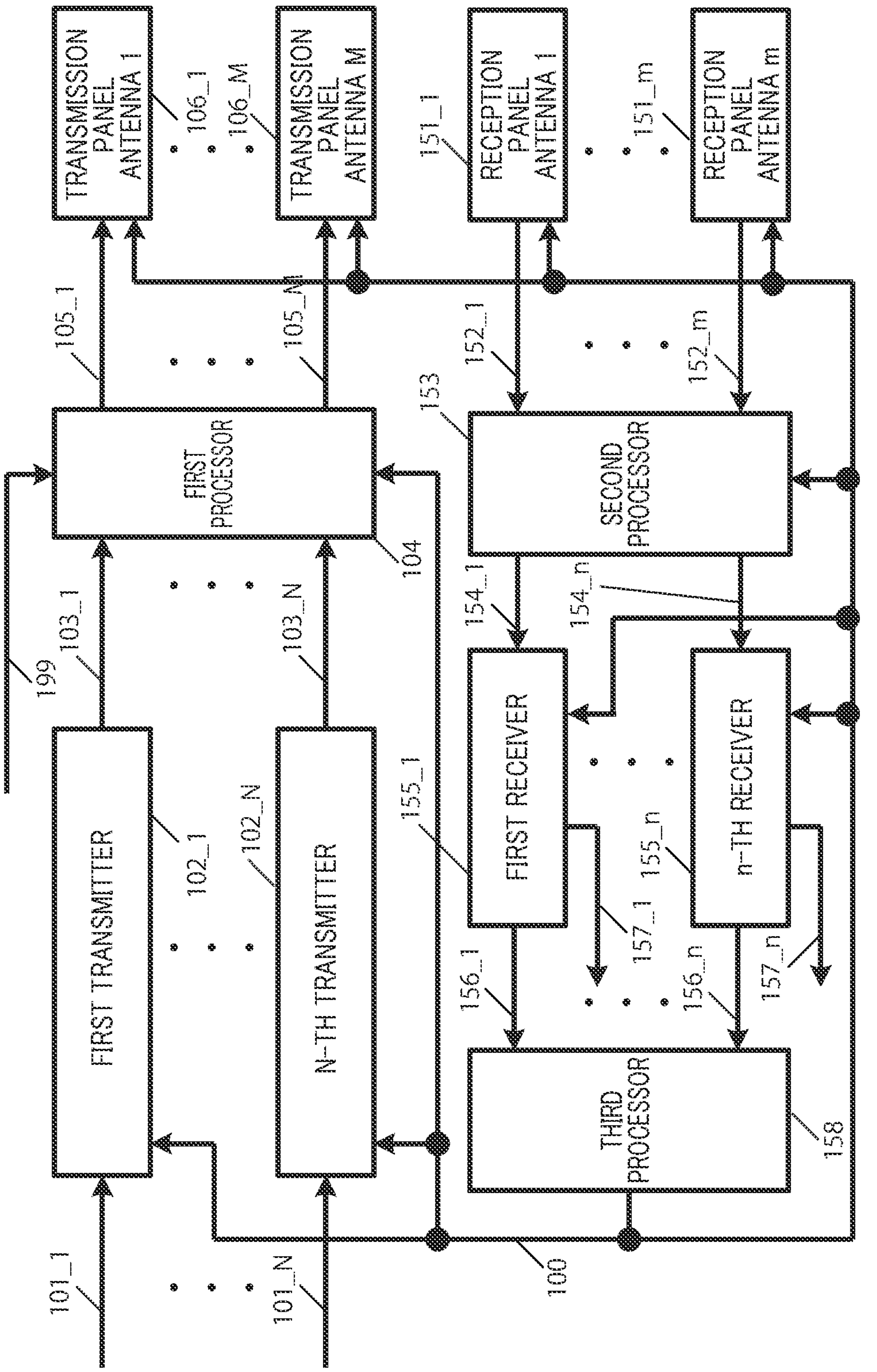
FIG. 1A illustrates an exemplary configuration of a communication apparatus in Embodiment 1.

FIG. 1A illustrates an exemplary configuration of a communication apparatus, such as a base station, an access point, a terminal, and a repeater, in Embodiment 1.

The communication apparatus in FIG. 1A includes N transmitters, which are "first transmitter 102_1 to N-th transmitter 102_N". Note that N is an integer equal to or greater than 1 or an integer equal to or greater than 2.

The communication apparatus in FIG. 1A also includes M transmission panel antennas, which are "transmission panel antenna 1 labeled 106_1 to transmission panel antenna M labeled 106_M", for transmission. Note that M is an integer equal to or greater than 1 or an integer equal to or greater than 2.

The communication apparatus in FIG. 1A includes n receivers, which are "first receiver 155_1 to n-th receiver 155_*n*". Note that n is an integer equal to or greater than 1 or an integer equal to or greater than 2.

The communication apparatus in FIG. 1A includes m reception panel antennas, which are "reception panel antenna 1 labeled 151_1 to reception panel antenna m labeled 151_*m*", for reception. Note that m is an integer equal to or greater than 1 or an integer equal to or greater than 2.

The i-th transmitter 102_*i* takes control signal 100 and i-th data 101_*i* as input, performs processing such as error correction coding and mapping based on a modulation scheme, and outputs i-th modulation signal 103_*i*. Note that i is an integer from 1 to N (both inclusive).

Note that i-th data 101_*i* may be configured to include data of one or more users. In this case, an error correction code, a modulation scheme, and a transmission method may be configured for each user.

First processor 104 takes i-th modulation signal 103_*i* (i is an integer from 1 to N (both inclusive)), control signal 100, and reference signal 199 as input and outputs j-th transmission signal 105_*j* (j is an integer from 1 to M (both inclusive)) based on frame configuration information included in control signal 100. Note that some of i-th modulation signals 103_*i* may include no signal, and some of j-th transmission signals 105_*j* may include no signal.

Then, j-th transmission signal 105_*j* is outputted as a radio wave from transmission panel antenna j labeled 106_*j*. Note that transmission panel antenna j labeled 106_*j* may perform beamforming and change the transmission directivity taking control signal 100 as input. In addition, transmission panel antenna j labeled 106_*j* may be switched by control signal 100 in transmitting a modulation signal to a communication counterpart. This will be described later.

Reception panel antenna i labeled 151_*i* receives i-th received signal 152_*i*. Note that reception panel antenna i labeled 151_*i* may perform beamforming and change the reception directivity taking control signal 100 as input. This will be described later.

Second processor 153 performs processing such as frequency conversion taking i-th received signal 152_*i* and control signal 100 as input, and outputs j-th signal-processing-subjected signal (i.e., j-th signal that has been subjected to signal processing) 154_*j*. Note that some of i-th received signals 152_*i* may include no signal, and some of j-th signal-processing-subjected signals 154_*j* may include no signal.

Then, j-th receiver 155_*j* takes j-th signal-processing-subjected signal 154_*j* and control signal 100 as input, performs processing such as demodulation and error correction decoding on j-th signal-processing-subjected signal 154_*j* based on control signal 100, and outputs j-th control data 156_*j* and *j*-th data 157_*j*.

Note that j-th control data 156_*j* may be configured to include control data of one or more users, and j-th data 157_*j* may be configured to include data of one or more users.

Third processor 158 takes j-th control data 156_*j* as input, generates control signal 100 based on information obtained from the communication counterpart, and outputs generated control signal 100.

Incidentally, first processor 104 of the communication apparatus in FIG. 1A may perform processing for transmission beamforming (transmission directivity control), for example, preceding processing. Meanwhile, second processor 153 may perform processing for reception directivity control. As another example, first processor 104 may perform processing of outputting first modulation signal 103_1 as first transmission signal 105_1, second modulation signal 103_2 as second transmission signal 105_2, and third modulation signal 103_3 as third transmission signal 105_3, for example. Alternatively, first processor 104 may perform processing of outputting second modulation signal 103_2 as first transmission signal 105_1. In addition, second processor 153 may perform processing of outputting first received signal 152_1 as first signal-processing-subjected signal 154_1, second received signal 152_2 as second signal-processing-subjected signal 154_2, and third received signal 152_3 as third signal-processing-subjected signal 154_3. Alternatively, the second processor may perform processing of outputting first received signal 152_1 as second signal-processing-subjected signal 154_2.

The configuration in FIG. 1A may include a processor not illustrated in FIG. 1A. For example, an interleaver for sorting symbols and/or data, a padder for padding, and the like may be included in the communication apparatus. Moreover, the communication apparatus in FIG. 1A (also in FIG. 1B and FIG. 1C) may perform transmission and/or reception corresponding to multiple input multiple output (MIMO) transmission for transmitting a plurality of modulation signals (a plurality of streams), using a plurality of antennas. Further, the communication apparatus in FIG. 1A (also in FIG. 1B and FIG. 1C) may perform transmission corresponding to multi-user MIMO transmission for transmitting, using a first frequency (band), modulation signals to a plurality of terminals in a first time period at least.

Figure 1B:
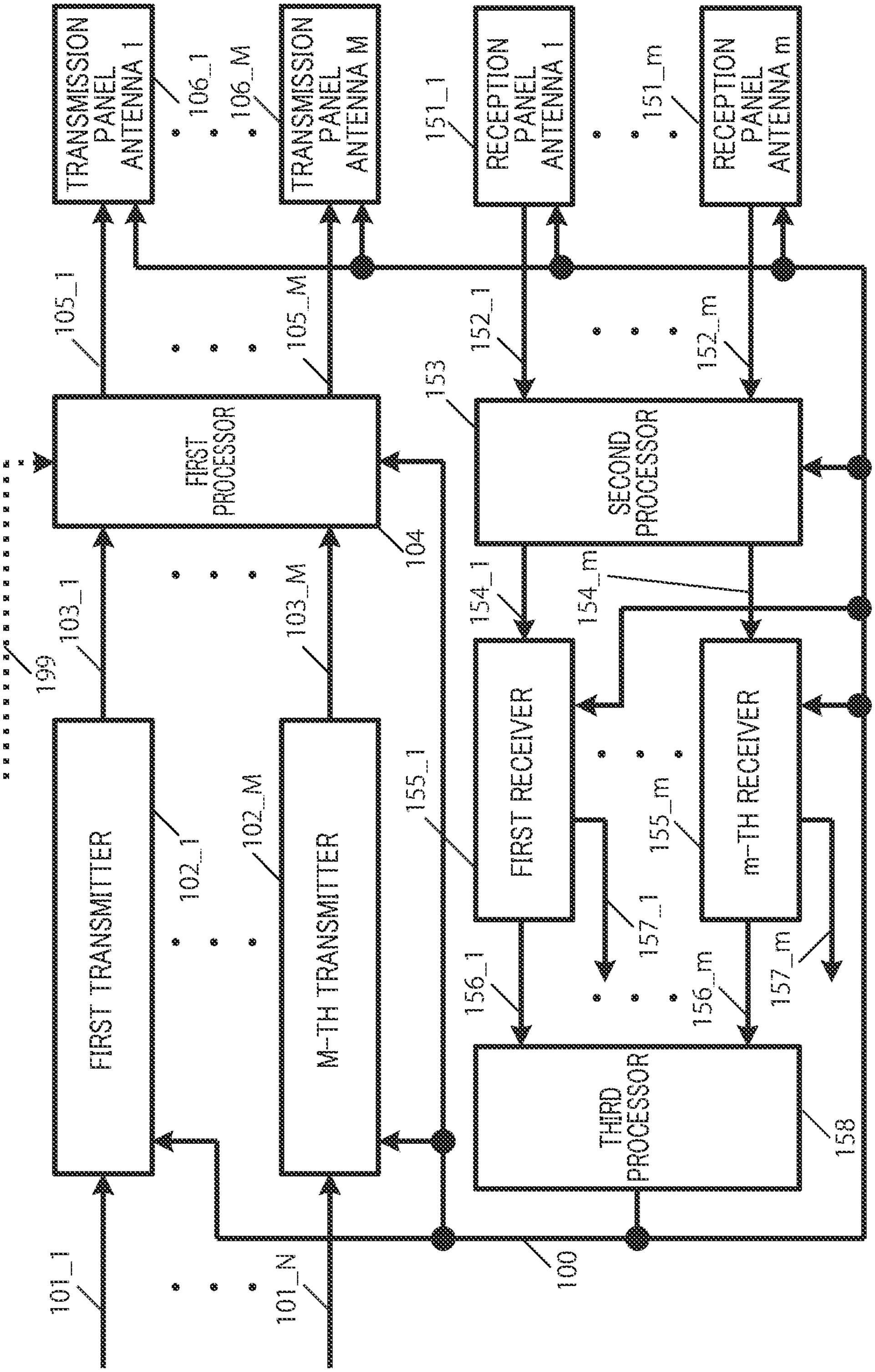
FIG. 1B illustrates an exemplary configuration of the communication apparatus different from the configuration in FIG. 1A in Embodiment 1.

FIG. 1B illustrates an exemplary configuration of the communication apparatus in Embodiment 1, such as a base station, an access point, a terminal, a repeater, etc., different from the configuration in FIG. 1A. In FIG. 1B, the components that operate in the same manner as in FIG. 1A are denoted by the same reference signs, and detailed descriptions thereof will be omitted.

The configuration in FIG. 1B is characterized in that the number of transmitters and the number of transmission panel antennas are the same. In this case, first processor 104 may perform processing for transmission beamforming (transmission directivity control), for example, precoding processing. First processor 104 may output y-th modulation signal 103_*y* as x-th transmission signal 105_*x*. Note that x is an integer from 1 to M (both inclusive), and y is an integer from 1 to M (both inclusive).

In addition, the number of receivers and the number of reception panel antennas are the same. In this case, second processor 153 may perform processing for the reception directivity control. Second processor 153 may output y-th received signal 152_*y* as x-th signal-processing-subjected signal 154_*x*. Note that x is an integer from 1 to m (both inclusive), and y is an integer from 1 to m (both inclusive).

Figure 1C:
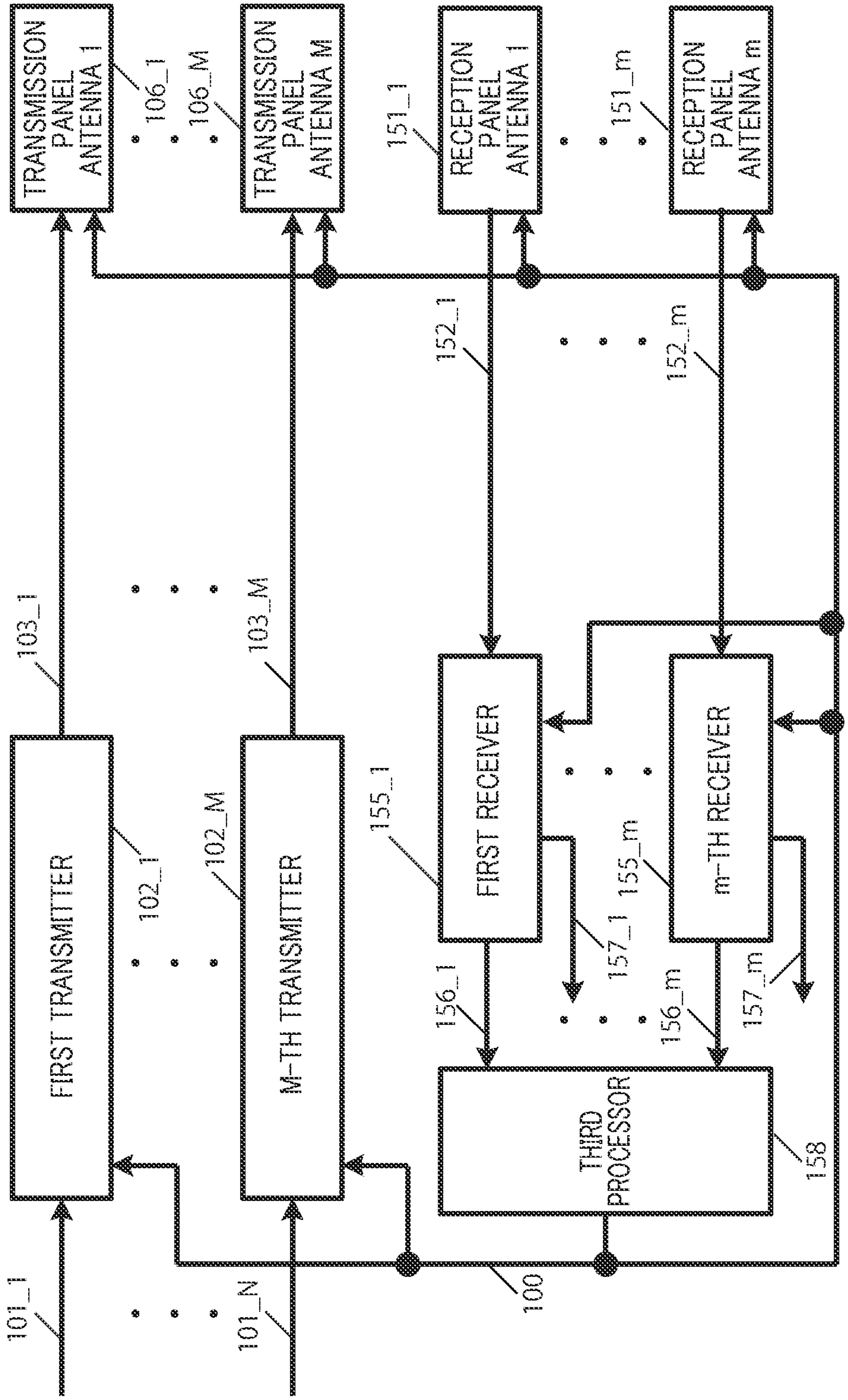
FIG. 1C illustrates an exemplary configuration of the communication apparatus different from the configurations in FIGS. 1A and 1B in Embodiment 1.

FIG. 1C illustrates an exemplary configuration of the communication apparatus in Embodiment 1, such as a base station, an access point, a terminal, a repeater, etc., different from the configurations in FIGS. 1A and 1B. In FIG. 1C, the components that operate in the same manner as in FIG. 1A are denoted by the same reference signs, and detailed descriptions thereof will be omitted.

The configuration in FIG. 1C is characterized in that the number of transmitters and the number of transmission panel antennas are the same and the first processor is not present. In addition, the number of receivers and the number of reception panel antennas are the same and the second processor is not present.

Note that FIGS. 1A, 1B, and 1C illustrate exemplary configurations of the communication apparatus, such as a base station, an access point, a terminal, a repeater, etc., and the configuration of the communication apparatus is not limited to these examples.

Figure 2:
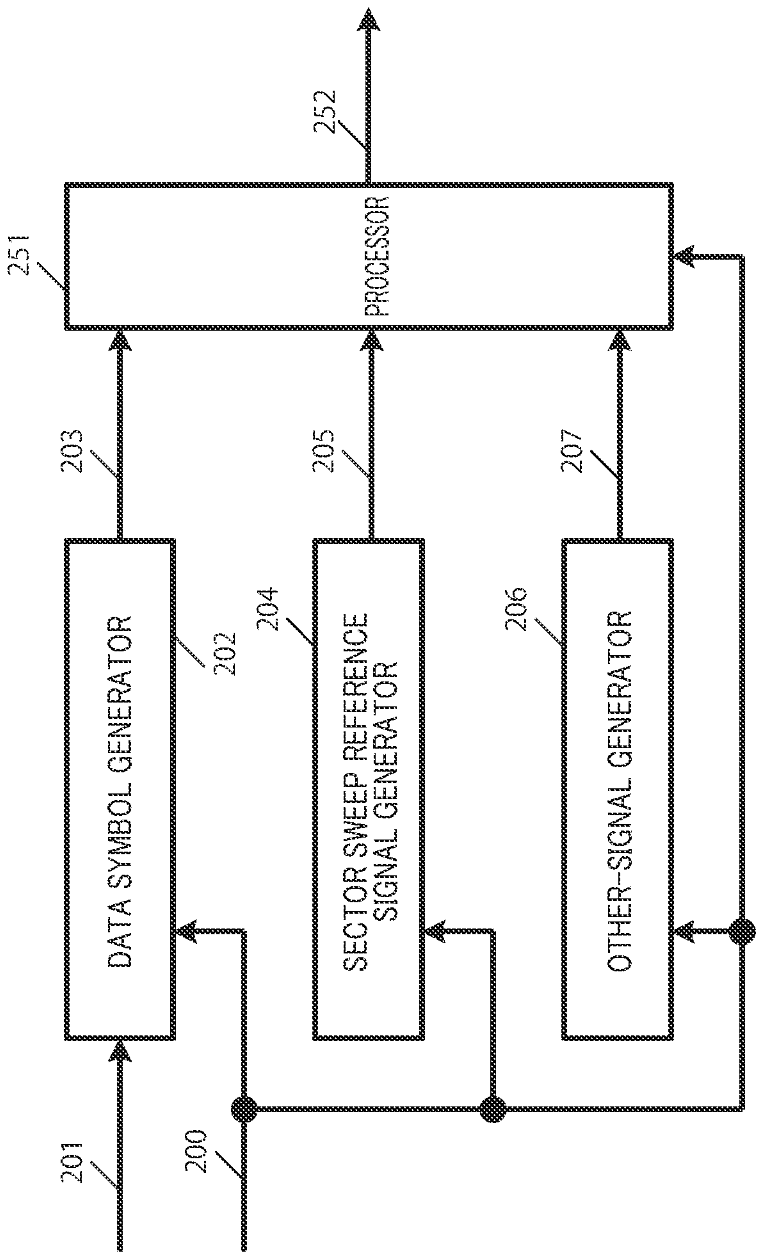
FIG. 2 illustrates an exemplary configuration of an i-th transmitter.

FIG. 2 illustrates an exemplary configuration of i-th transmitter 102_*i*. Note that i is "an integer from 1 to N (both inclusive)" or "an integer from 1 to M (both inclusive)".

Data symbol generator 202 takes data 201 and control signal 200 as input, performs error correction coding, mapping, signal processing for transmission, etc. on the basis of information on an error correction coding method, information on a modulation scheme, information on a transmission method, information on a frame configuration method, etc. included in control signal 200, and outputs data symbol modulation signal 203. Note that data 201 corresponds to i-th data 101_*i*, and control signal 200 corresponds to control signal 100. Thus, data 201 may include data of one or more users.

Sector sweep reference signal (i.e., reference signal for sector sweep) generator 204 takes control signal 200 as input, generates sector sweep reference signal 205 based on the frame configuration information included in control signal 200, and outputs the generated signal. Note that specific configuration methods and transmission methods for sector sweep reference signal 205 will be described later in detail.

Other-signal generator 206 takes control signal 200 as input, generates other signals 207 based on the control signal, and outputs the generated signals.

Processor 251 takes data symbol modulation signal 203, sector sweep reference signal 205, other signals 207, and control signal 200 as input, generates frame configuration-based modulation signal (i.e., modulation signal in accordance with frame configuration) 252 based on the frame configuration information included in control signal 200, and outputs the generated signal. Note that frame configuration-based modulation signal 252 corresponds to i-th modulation signal 103_*i*, and specific examples of the frame configuration will be described later in detail.

Figure 3:
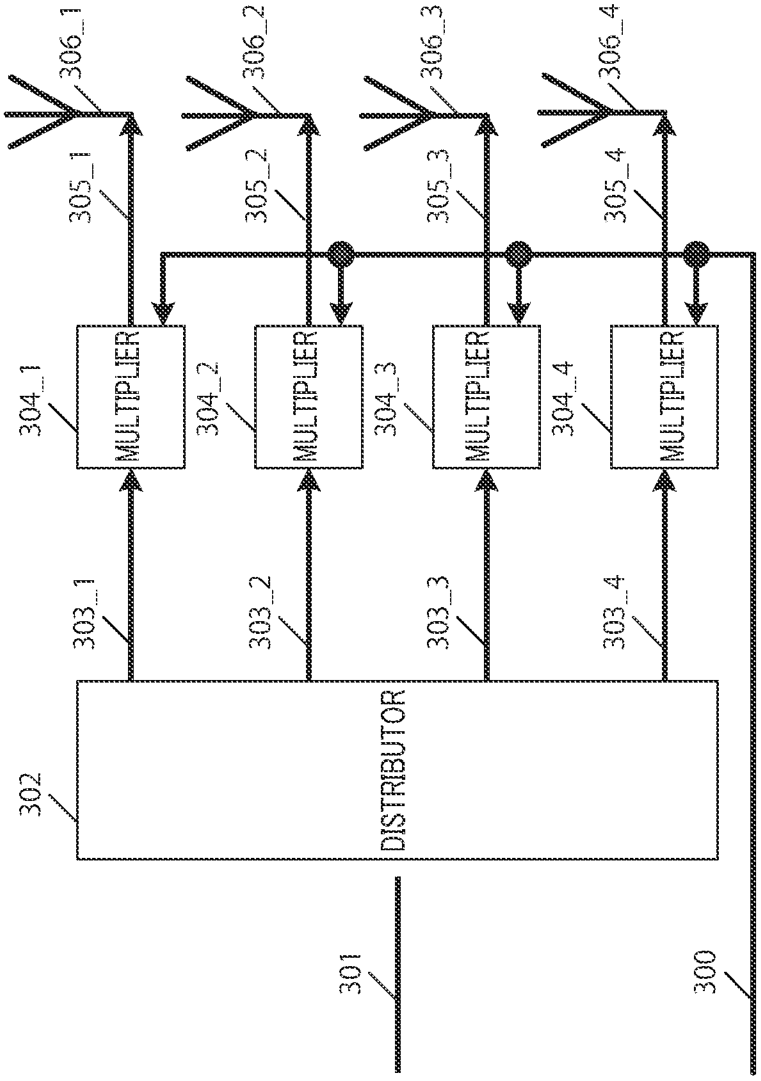
FIG. 3 illustrates an exemplary configuration of transmission panel antenna i in FIGS. 1A, 1B, and 1C.

FIG. 3 illustrates an exemplary configuration of transmission panel antenna i labeled 106_*i* in FIGS. 1A, 1B, and 1C. Note that i is "an integer from 1 to M (both inclusive)". Distributor 302 takes transmission signal 301 as input, performs distribution, and outputs first transmission signal 303_1, second transmission signal 303_2, third transmission signal 303_3, and fourth transmission signal 303_4. Note that transmission signal 301 corresponds to "i-th transmission signal 105_*i* in FIGS. 1A and 1B" or "i-th modulation signal 103_*i* in FIG. 1C".

Multiplier 304_1 takes first transmission signal 303_1 and control signal 300 as input, multiplies first transmission signal 303_1 by a multiplication coefficient based on control signal 300, generates and outputs coefficient-multiplication-subjected first transmission signal (i.e., first transmission signal that has been subjected to the coefficient multiplication) 305_1. Then, coefficient-multiplication-subjected first transmission signal 305_1 is outputted from antenna 306_1 as a radio wave. Note that control signal 300 corresponds to control signal 100.

A specific description follows. First transmission signal 303_1 is represented by tx1(t). Note that t represents time. When the multiplication coefficient is w1, coefficient-multiplication-subjected first transmission signal 305_1 can be expressed as tx1(t)×w1. Note that tx1(t) can be represented by a complex number, and thus, it may be a real number. Likewise, w1 can be represented by a complex number, and thus, it may be a real number.

Multiplier 304_2 takes second transmission signal 303_2 and control signal 300 as input, multiplies second transmission signal 303_2 by a multiplication coefficient based on control signal 300, generates and outputs coefficient-multiplication-subjected second transmission signal 305_2. Then, coefficient-multiplication-subjected second transmission signal 305_2 is outputted from antenna 306_2 as a radio wave.

A specific description follows. Second transmission signal 303_2 is represented by tx2(t). Note that t represents time. When the multiplication coefficient is w2, coefficient-multiplication-subjected second transmission signal 305_2 can be expressed as tx2(t)×w2. Note that tx2(t) can be represented by a complex number, and thus, it may be a real number. Likewise, w2 can be represented by a complex number, and thus, it may be a real number.

Multiplier 304_3 takes third transmission signal 303_3 and control signal 300 as input, multiplies third transmission signal 303_3 by a multiplication coefficient based on control signal 300, generates and outputs coefficient-multiplication-subjected third transmission signal 305_3. Then, coefficient-multiplication-subjected third transmission signal 305_3 is outputted from antenna 306_3 as a radio wave.

A specific description follows. Third transmission signal 303_3 is represented by tx3(t). Note that t represents time. When the multiplication coefficient is w3, coefficient-multiplication-subjected third transmission signal 305_3 can be expressed as tx3(t)×w3. Note that tx3(t) can be represented by a complex number, and thus, it may be a real number. Likewise, w3 can be represented by a complex number, and thus, it may be a real number.

Multiplier 304_4 takes fourth transmission signal 303_4 and control signal 300 as input, multiplies fourth transmission signal 303_4 by a multiplication coefficient based on control signal 300, generates and outputs coefficient-multiplication-subjected fourth transmission signal 305_4. Then, coefficient-multiplication-subjected fourth transmission signal 305_4 is outputted from antenna 306_4 as a radio wave.

A specific description follows. Fourth transmission signal 303_4 is represented by tx4(t). Note that t represents time. When the multiplication coefficient is w4, coefficient-multiplication-subjected fourth transmission signal 305_4 can be expressed as tx4(t)×w4. Note that tx4(t) can be represented by a complex number, and thus, it may be a real number. Likewise, w4 can be represented by a complex number, and thus, it may be a real number.

Note that "an absolute value of w1, an absolute value of w2, an absolute value of w3, and an absolute value of w4 may be equal to each other". This corresponds to a case where a phase change has been performed. It is needless to say that the absolute value of w1, the absolute value of w2, the absolute value of w3, and the absolute value of w4 need not be equal to each other.

The respective values of w1, w2, w3, and w4 may be switched for each frame, each slot, each mini-slot, each multiple-symbols, or each symbol. The switch timings of the respective values of w1, w2, w3, and w4 are not limited to the above examples.

Further, FIG. 3 illustrates an example of the transmission panel antenna composed of four antennas (and four multipliers), but the number of antennas is not limited to four and the transmission panel antenna only needs to be composed of two or more antennas.

Note that transmission panel antenna i labeled 106_*i* in FIGS. 1A, 1B, and 1C may perform directivity control by changing the characteristics of the antenna itself, and in this case, transmission panel antenna i labeled 106_*i* may be composed of one or more antennas.

Figure 4:
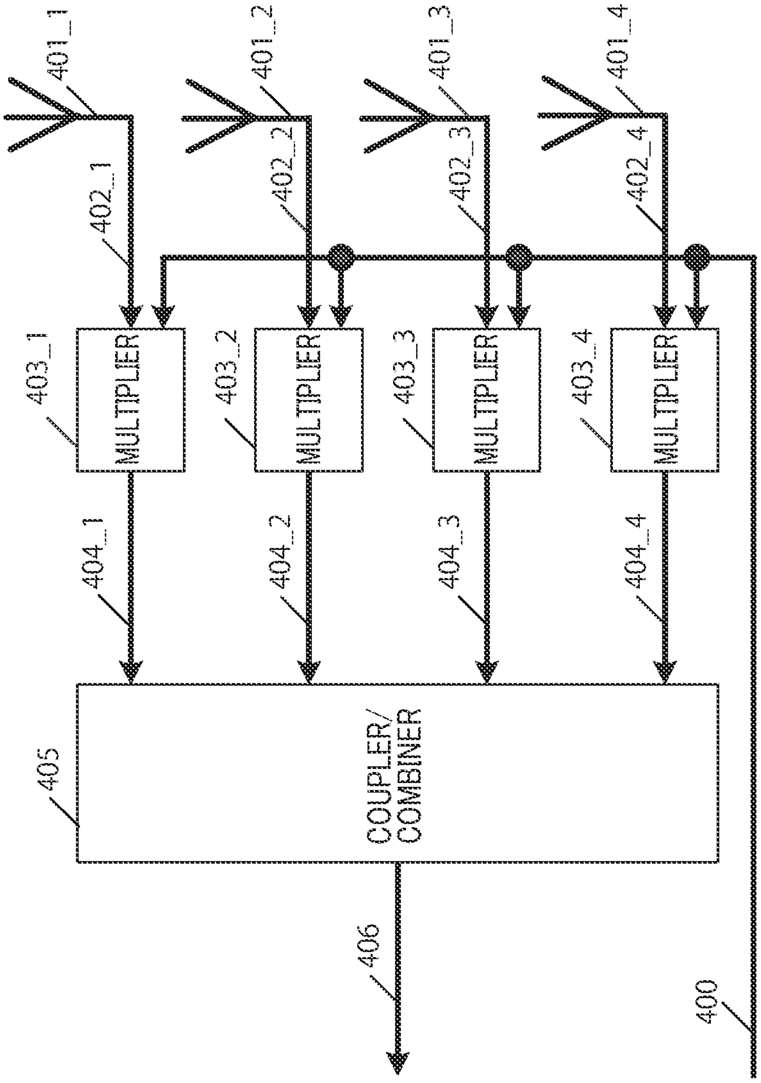
FIG. 4 illustrates an exemplary configuration of reception panel antenna i in FIGS. 1A, 1B, and 1C.

FIG. 4 illustrates an exemplary configuration of reception panel antenna i labeled 151_*i* in FIGS. 1A, 1B, and 1C. Note that i is "an integer from 1 to m (both inclusive)".

Multiplier 403_1 takes first received signal 402_1 received at antenna 401_1 and control signal 400 as input, multiplies first received signal 402_1 by a multiplication coefficient based on control signal 400, and outputs coefficient-multiplication-subjected first received signal 404_1.

A specific description follows. First received signal 402_1 is represented by rx1(t). Note that t represents time. When the multiplication coefficient is d1, coefficient-multiplication-subjected first received signal 404_1 can be expressed as rx1(t)×d1. Note that rx1(t) can be represented by a complex number, and thus, it may be a real number. Likewise, d1 can be represented by a complex number, and thus, it may be a real number.

Multiplier 403_2 takes second received signal 402_2 received at antenna 401_2 and control signal 400 as input, multiplies second received signal 402_2 by a multiplication coefficient based on control signal 400, and outputs coefficient-multiplication-subjected second received signal 404_2.

A specific description follows. Second received signal 402_2 is represented by rx2(t). Note that t represents time. When the multiplication coefficient is d2, coefficient-multiplication-subjected second received signal 404_2 can be expressed as rx2(t)×d2. Note that rx2(t) can be represented by a complex number, and thus, it may be a real number. Likewise, d2 can be represented by a complex number, and thus, it may be a real number.

Multiplier 403_3 takes third received signal 402_3 received at antenna 401_3 and control signal 400 as input, multiplies third received signal 402_3 by a multiplication coefficient based on control signal 400, and outputs coefficient-multiplication-subjected third received signal 404_3.

A specific description follows. Third received signal 402_3 is represented by rx3(t). Note that t represents time. When the multiplication coefficient is d3, coefficient-multiplication-subjected third received signal 404_3 can be expressed as rx3(t)×d3. Note that rx3(t) can be represented by a complex number, and thus, it may be a real number. Likewise, d3 can be represented by a complex number, and thus, it may be a real number.

Multiplier 403_4 takes fourth received signal 402_4 received at antenna 401_4 and control signal 400 as input, multiplies fourth received signal 402_4 by a multiplication coefficient based on control signal 400, and outputs coefficient-multiplication-subjected fourth received signal 404_4.

A specific description follows. Fourth received signal 402_4 is represented by rx4(t). Note that t represents time. When the multiplication coefficient is d4, coefficient-multiplication-subjected fourth received signal 404_4 can be expressed as rx4(t)×d4. Note that rx4(t) can be represented by a complex number, and thus, it may be a real number. Likewise, d4 can be represented by a complex number, and thus, it may be a real number.

Coupler/combiner 405 takes coefficient-multiplication-subjected first received signal 404_1, coefficient-multiplication-subjected second received signal 404_2, coefficient-multiplication-subjected third received signal 404_3, and coefficient-multiplication-subjected fourth received signal 404_4 as input, combines coefficient-multiplication-subjected first received signal 404_1, coefficient-multiplication-subjected second received signal 404_2, coefficient-multiplication-subjected third received signal 404_3, and coefficient-multiplication-subjected fourth received signal 404_4, and outputs modulation signal 406. Note that modulation signal 406 is expressed as rx1(t)×d1+rx2(t)×d2+rx3(t)×d3+rx4(t)×d4.

Note that control signal 400 corresponds to control signal 100, and modulation signal 406 corresponds to i-th received signal 152_*i*.

In addition, "an absolute value of d1, an absolute value of d2, an absolute value of d3, and an absolute value of d4 may be equal to each other". This corresponds to a case where a phase change has been performed. It is needless to say that the absolute value of d1, the absolute value of d2, the absolute value of d3, and the absolute value of d4 need not be equal to each other.

The respective values of d1, d2, d3, and d4 may be switched for each frame, each slot, each mini-slot, each multiple-symbols, or each symbol. The switch timings of the respective values of d1, d2, d3, and d4 are not limited to the above examples.

Further, FIG. 4 illustrates an example of the reception panel antenna composed of four antennas (and four multipliers), but the number of antennas is not limited to four and the reception panel antenna only needs to be composed of two or more antennas.

Note that reception panel antenna i labeled 151__i in FIGS. 1A, 1B, and 1C may perform directivity control by changing the characteristics of the antenna itself, and in this case, reception panel antenna i labeled 151_*i* may be composed of one or more antennas.

In the present embodiment, in a case where the communication apparatus in FIGS. 1A, 1B, and 1C is a base station or g Node B (gNB), for example, it supports multi-carrier transmission such as orthogonal frequency division multiplexing (OFDM). The base station or gNB in FIGS. 1A, 1B, and 1C may also support orthogonal frequency division multiple access (OFDMA).

Figure 5:
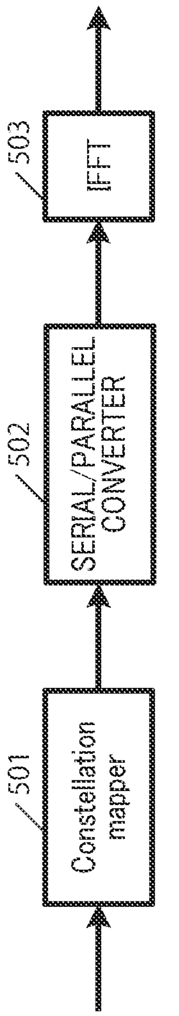
FIG. 5 illustrates an exemplary configuration of a transmission apparatus in a case of using an OFDM scheme.

FIG. 5 illustrates an exemplary configuration of a transmission apparatus in a case of using an OFDM scheme. As illustrated in FIG. 5, the transmission apparatus is composed of, for example, constellation mapper 501, serial/parallel convener 502, and inverse fast Fourier transform (IFFT) 503.

Constellation mapper 501, for example, takes data as input, performs mapping based on the configured modulation scheme, and outputs the modulation signal.

Serial/parallel converter 502 converts serial signals into parallel signals. Note that serial/parallel converter 502 need not be present when parallel signals are already obtained.

IFFT 503 performs IFFT processing on an input signal, and outputs the modulation signal based on the OFDM scheme. Note that IFFT 503 may be an inverse Fourier transformer performing inverse Fourier transform.

The transmission apparatus in a case of using the OFDM scheme may include another processor (e.g., error correction coder, interleaver, etc.), and the configuration is not limited to that in FIG. 5.

In the present embodiment, in a case where the communication apparatus in FIGS. 1A, 1B, and 1C is a base station or gNB, for example, it may support multi-carrier reception such as in the OFDM scheme or may support single-carrier reception such as in a single-carrier scheme based on discrete Fourier transform (DFT), for example. The following description is about an exemplary configuration of a reception part in a single-carrier scheme.

Figure 6:
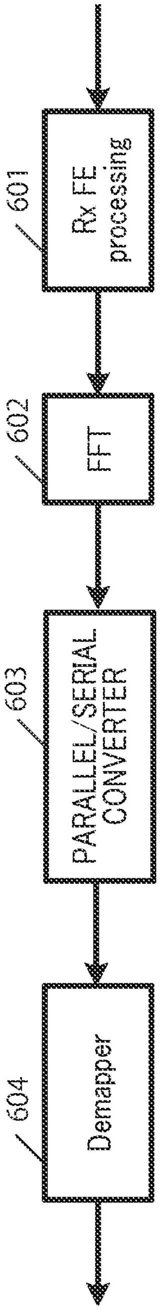
FIG. 6 illustrates an exemplary configuration of a reception apparatus in a case of using an OFDM scheme.

FIG. 6 illustrates an exemplary configuration of a reception apparatus in a case of using the OFDM scheme. As illustrated in FIG. 6, the reception apparatus in a case of using the OFDM scheme is composed of receiver (Rx) front end (FE) processing 601, fast Fourier transform 602, parallel/serial converter 603, and demapper 604.

Rx FE processing 601 performs processing of a reception front end.

FFT 602 performs FFT processing on the input signal.

Parallel/serial converter 603 converts parallel signals into serial signals. Note that parallel/serial converter 603 need not be present when serial signals are already obtained.

Demapper 604 performs demodulation processing based on the transmission method and modulation scheme.

Note that the reception apparatus may include another processor (e.g., de-interleaver, decoder for error correction coding, etc.), and the configuration is not limited to that in FIG. 6.

Figure 7:
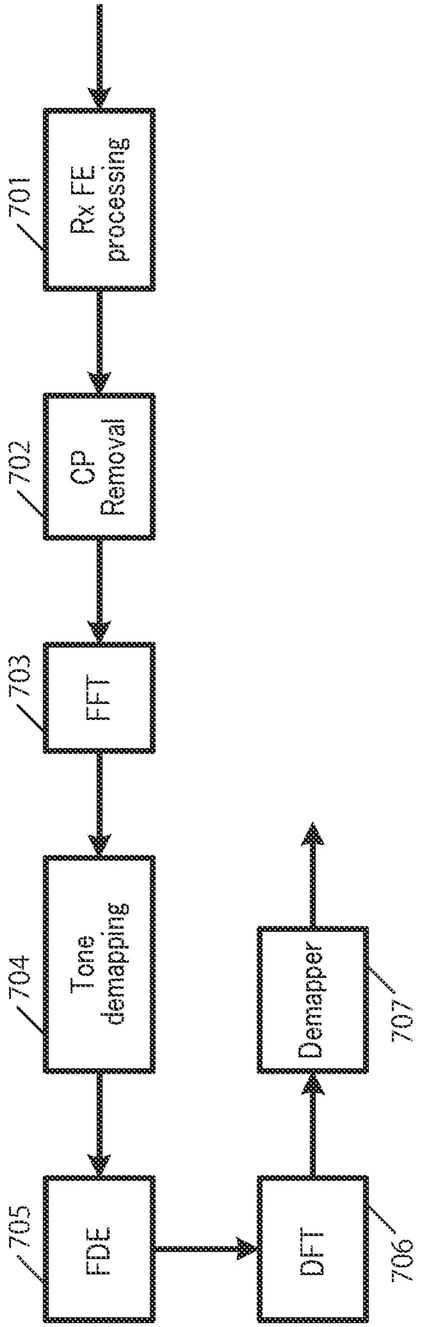
FIG. 7 illustrates an exemplary configuration of the reception apparatus in a case of using a single-carrier scheme based on DFT.

FIG. 7 illustrates an exemplary configuration of the reception apparatus in a case of using a single-carrier scheme based on DFT. As illustrated in FIG. 7, the reception apparatus is composed of receiver (Rx) FE processing 701, CP removal 702, fast Fourier transform 703, tone demapping 704, frequency domain equalization (FDE) 705, DFT 706, and demapper 707. Note that the reception apparatus may include a processor other than the above.

Figure 8:
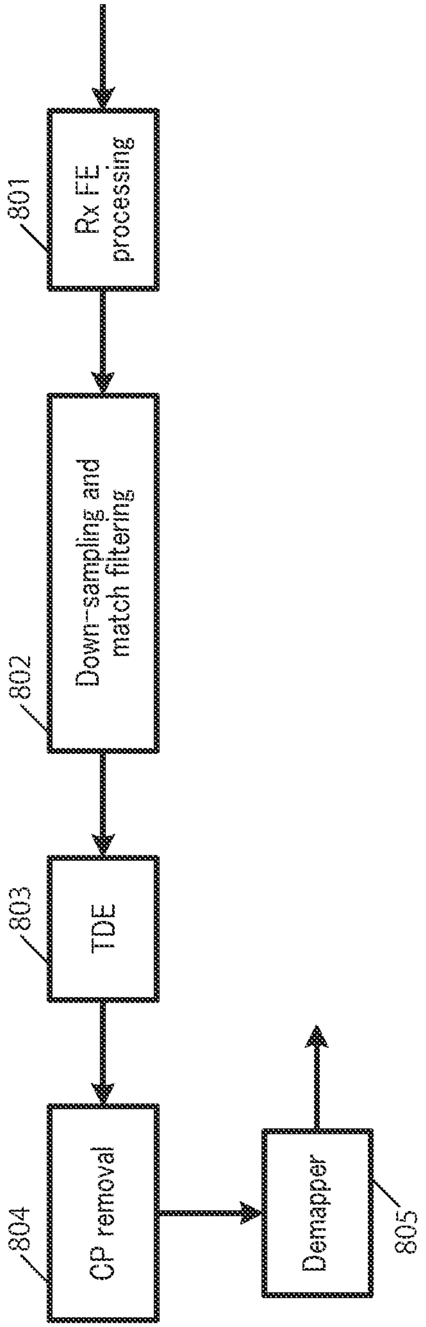
FIG. 8 illustrates an exemplary configuration of the reception apparatus in a case of using a single-carrier scheme based on time domain.

FIG. 8 illustrates an exemplary configuration of the reception apparatus in a case of using a single-carrier scheme based on time domain. As illustrated in FIG. 8, the reception apparatus is composed of receiver (Rx) FE processing 801, down-sampling and match filtering 802, time domain equalization (TDE) 803, CP removal 804, and demapper 805. Note that the reception apparatus may include a processor other than the above.

Although exemplary reception methods in single-carrier schemes and exemplary configurations of the reception apparatus have been described above, the reception method in a single-carrier scheme and the reception apparatus are not limited to these. For example, examples of the single-carrier scheme include "discrete Fourier transform (DFT)-spread orthogonal frequency division multiplexing (OFDM)" (DFT-S OFDM), "trajectory constrained DFT-spread OFDM", "constrained DFT-spread OFDM" (constrained DFT-S OFDM), "OFDM based single carrier (SC)", "single carrier (SC)-frequency division multiple access (FDMA)", "guard interval DFT-spread OFDM", a time-domain implementation single carrier scheme (e.g., single carrier (SC)-QAM), and the like.

Figure 9:
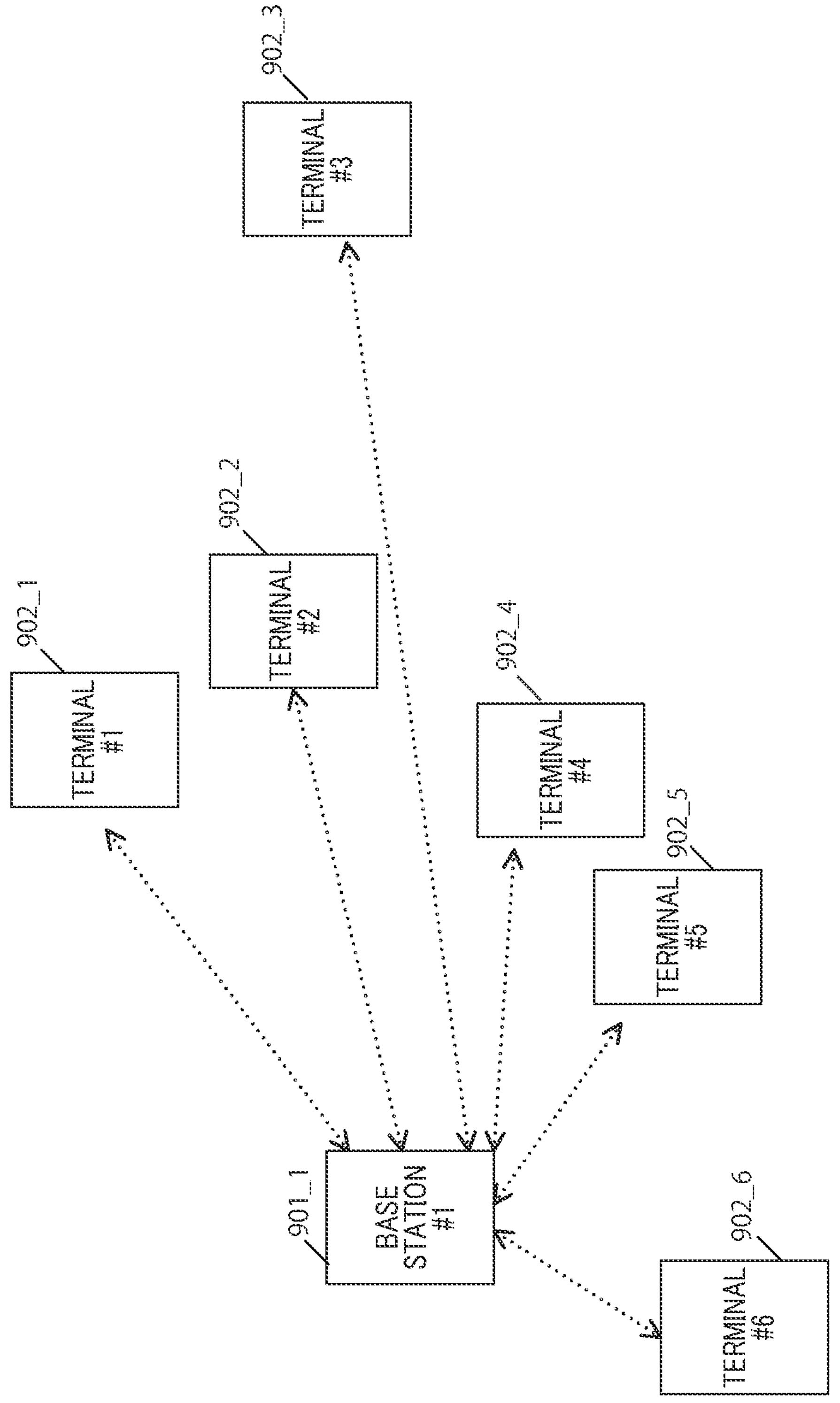
FIG. 9 illustrates an exemplary communication state in Embodiment 1.

FIG. 9 illustrates an exemplary communication state in Embodiment 1. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

Figure 11:
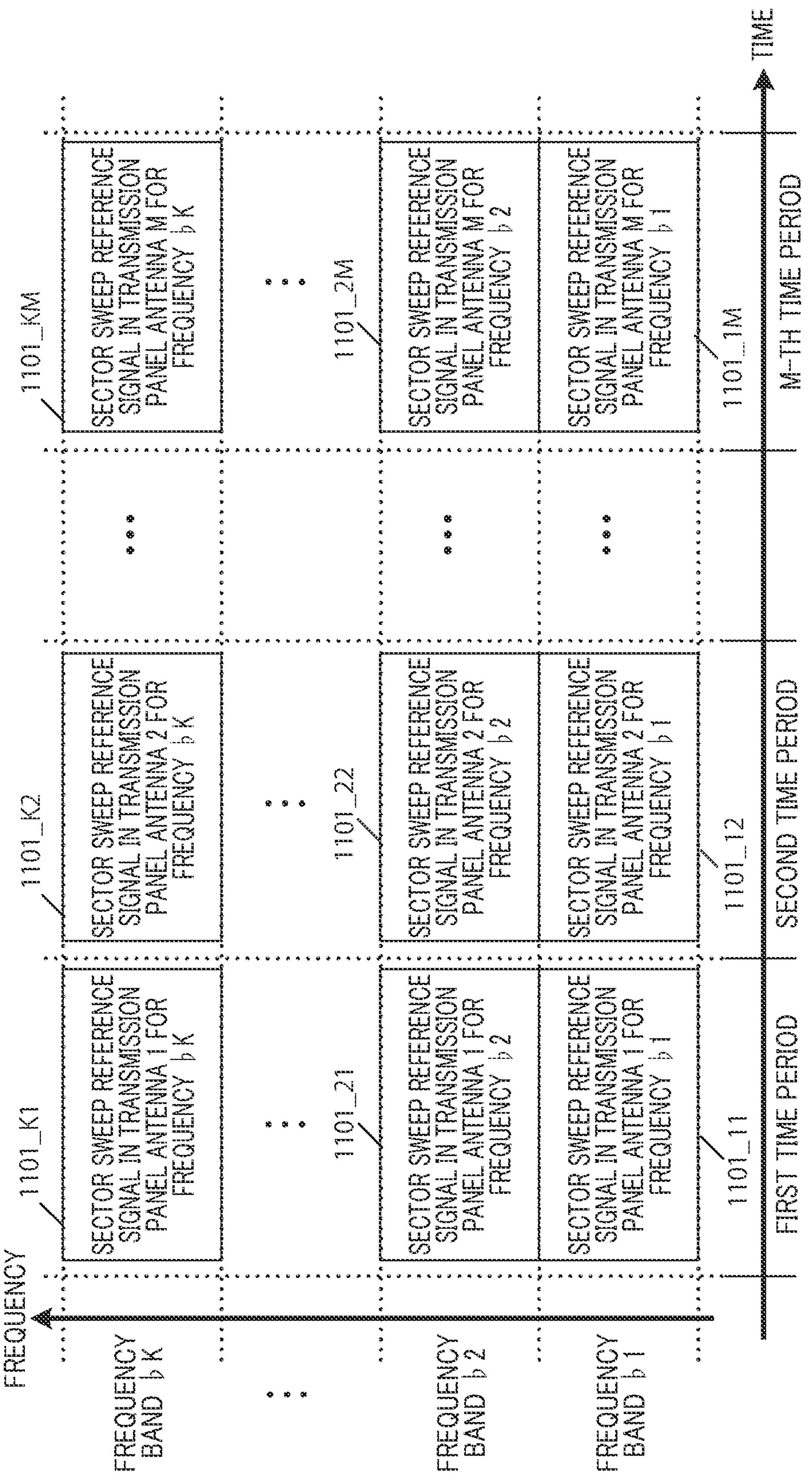
FIG. 11 illustrates exemplary sector sweep reference signals in FIG. 10 transmitted by base station #1 in FIG. 9 with the configuration in FIG. 1A, 1B, or 1C.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2. Note that, in a case of using OFDM(A), for example, a single frequency band includes one or more (sub)carriers or includes two or more (sub)carriers. This may apply to the other drawings and embodiments.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band ♭i, sector sweep reference signal 1101_*i*1 in transmission panel antenna 1 for frequency ♭i is present in the first time period, sector sweep reference signal 1101_*i*2 in transmission panel antenna 2 for frequency ♭i is present in the second time period, . . . , sector sweep reference signal 1101_iM in transmission panel antenna M for frequency ♭i is present in the M-th time period. Note that i is an integer from 1 to K (both inclusive).

Note that sector sweep reference signal 1101_*ij* in transmission panel antenna j for frequency ♭i is transmitted from transmission panel antenna j labeled 106_*j* of base station #1 labeled 901_1 with the configuration in FIG. 1A, 1B, or 1C. In this case, j is an integer from 1 to M (both inclusive).

One feature is that "sector sweep reference signals are transmitted from the same transmission panel antenna in the i-th time period regardless of the frequency band in FIG. 11". At this time, the same beamforming parameter is used in a first period of time regardless of the frequency band. Note that the beamforming will be described later.

Figure 12:
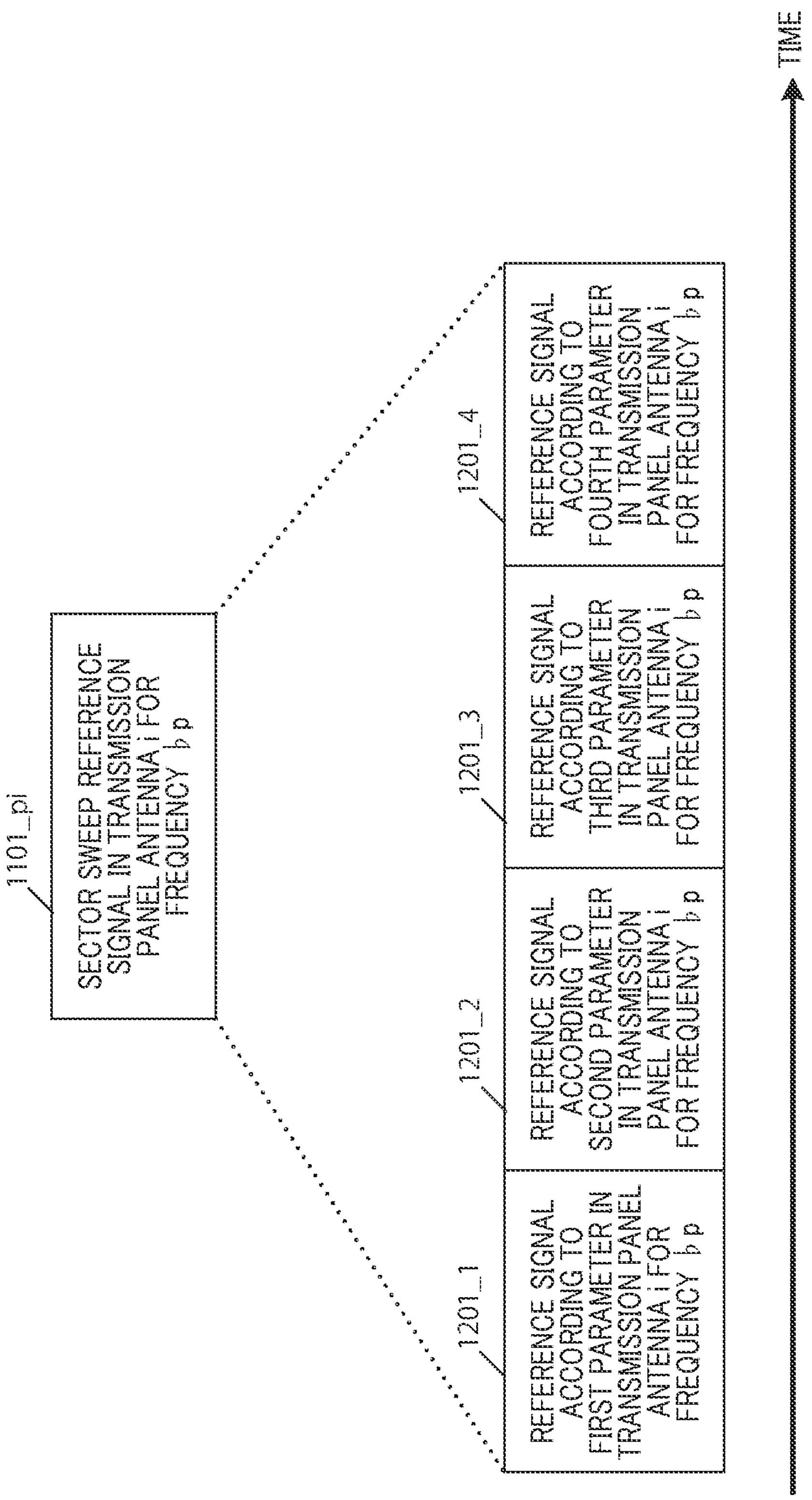
FIG. 12 illustrates an exemplary configuration of a "sector sweep reference signal in transmission panel antenna i for frequency ♭p" in FIG. 11.

FIG. 12 illustrates an exemplary configuration of "sector sweep reference signal 1101_*pi* in transmission panel antenna i for frequency ♭p" in FIG. 11. Note that the horizontal axis represents time in FIG. 12. Note that p is an integer from 1 to K (both inclusive) and i is an integer from 1 to M (both inclusive).

For example, base station #1 labeled 901_1 with the configuration in FIG. 1A, 1B, or 1C includes the configuration in FIG. 3 as transmission panel antenna i labeled 106_*i*.

A description will be given of "reference signal 1201_1 according to first parameter in transmission panel antenna i for frequency ♭p".

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_1 in transmission panel antenna i labeled 106_*i* as w1(i, 1). When first transmission signal 303_1 of "reference signal 1201_1 according to first parameter in transmission panel antenna i for frequency ♭p" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_2 in transmission panel antenna i labeled 106_*i* as w2(i, 1). When second transmission signal 303_2 of "reference signal 1201_1 according to first parameter in transmission panel antenna i for frequency ♭p" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_3 in transmission panel antenna i labeled 106_*i* as w3(i, 1). When third transmission signal 303_3 of "reference signal 1201_1 according to first parameter in transmission panel antenna i for frequency ♭p" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_4 in transmission panel antenna i labeled 106_*i* as w4(i, 1). When fourth transmission signal 303_4 of "reference signal 1201_1 according to first parameter in transmission panel antenna i for frequency ♭p" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 1201_*j* according to j-th parameter in transmission panel antenna i for frequency ♭p".

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_1 in transmission panel antenna i labeled 106_*i* as w1(i, j). When first transmission signal 303_1 of "reference signal 1201_*j* according to j-th parameter in transmission panel antenna i for frequency ♭p" is tx1refj(t), multiplier 304_1 obtains tx1refj(t)×w1(i, j). Then, base station #1 labeled 901_1 transmits tx1trefj(t)×w1(i, j) from antenna 306_1 in FIG. 3. Note that t represents time.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_2 in transmission panel antenna i labeled 106_*i* as w2(i, j). When second transmission signal 303_2 of "reference signal 1201_*j* according to j-th parameter in transmission panel antenna i for frequency ♭p" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_3 in transmission panel antenna i labeled 106_*i* as w3(i, j). When third transmission signal 303_3 of "reference signal 1201_*j* according to j-th parameter in transmission panel antenna i for frequency ♭p" is tx3refj(t), multiplier 304_3 obtains tx3refj(t)×w3(i, j). Then, base station #1 labeled 901_1 transmits tx3refj(t)×w3(i, j) from antenna 306_3 in FIG. 3.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_4 in transmission panel antenna i labeled 106_*i* as w4(i, j). When fourth transmission signal 303_4 of "reference signal 1201_*j* according to j-th parameter in transmission panel antenna i for frequency ♭p" is tx4refj(t), multiplier 304_4 obtains tx4refj(t)×w4(i, j). Then, base station #1 labeled 901_1 transmits tx4refj(t)×w4(i, j) from antenna 306_4 in FIG. 3.

Note that j is an integer from 1 to 4 (both inclusive) in the case of FIG. 12. The number Z of parameter changes is four in FIG. 12, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 11 and 12, when base station #1 labeled 901_1 transmits "sector sweep reference signal 1101_*i* in transmission panel antenna i for frequency ♭p", "reference signal 1201_*j* according to j-th parameter in transmission panel antenna i for frequency ♭p" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal 1201_*j* according to j-th parameter in transmission panel antenna i for frequency ♭p";

- Information on the frequency band and/or frequency ♭p (information of the number of frequency divisions may also be included), which will be described later.

Transmission of the "identification number (ID) of the transmission panel antenna for frequency ♭p" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of time divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency ♭p" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 1, the description is based on a case where the terminals use OFDM and frequency (bands) used by the base station and frequency (bands) used by the terminals partially overlap each other.

FIG. 13 illustrates an exemplary operation in the time period from time t1 to t2, which is the terminal response period. Note that the horizontal axis represents time in FIG. 13. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period.

As illustrated in FIGS. 10 and 13, for example, base station #1 labeled 901_1 transmits sector sweep reference signals in the time period from time t0 to t1. After that, the terminal response period, which is the time period from time t1 to t2, includes terminal "sector sweep reference signal" first transmission period (i.e., first transmission period for terminals to transmit sector sweep reference signals) 1301_1, terminal "sector sweep reference signal" second transmission period 1301_2, terminal "sector sweep reference signal" third transmission period 1301_3, and terminal "sector sweep reference signal" fourth transmission period 1301_4, as illustrated in FIG. 13.

Thus, in the case of FIG. 13, "the number of time divisions in which sector sweep reference signals can be transmitted when the terminals transmit the sector sweep reference signals" is set to four by base station #1 labeled 901_1.

Figure 14:
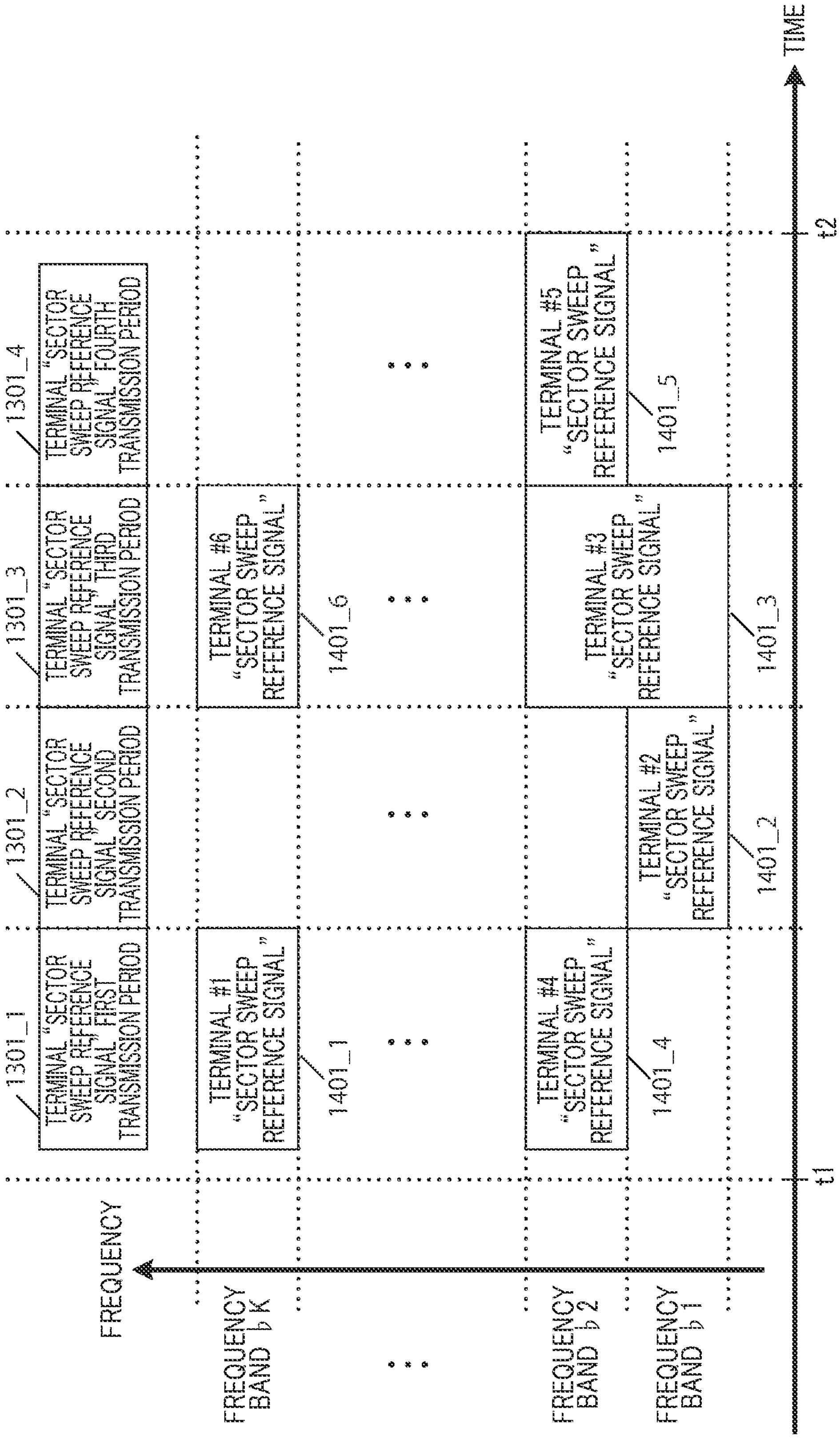
FIG. 14 illustrates exemplary occupation by terminals in terminal "sector sweep reference signal" transmission periods illustrated in FIG. 13.

FIG. 14 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13. Note that the horizontal axis represents time and the vertical axis represents frequency in FIG. 14.

Terminal #1 labeled 902_1 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #1 labeled 902_1 estimates, for example, "transmission panel antenna a1 and parameter b1" as the "transmission panel antenna and parameter" with high reception quality. Terminal #1 labeled 902_1 also estimates frequency band ♭K as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 14, terminal #1 labeled 902_1 obtains information indicating that "the number of time divisions in which sector sweep reference signals can be transmitted when the terminals transmit the sector sweep reference signals" is four.

In this case, terminal #1 labeled 902_1 obtains, for example, any one of the values "0", "1", "2", and "3" using a random number. For example, terminal #1 labeled 902_1 obtains "0" using a random number. In this case, since "0"+1=1, terminal #1 labeled 902_1 transmits terminal #1 "sector sweep reference signal" 1401_1 using "terminal "sector sweep reference signal" first (="0"+1) transmission period 1301_1" in FIG. 14. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 1401_1 includes information of the "transmission panel antenna and parameter" with high reception quality obtained by terminal #1 labeled 902_1, that is, information of "transmission panel antenna a1 and parameter b1". Terminal #1 "sector sweep reference signal" 1401_1 may also include information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 14, terminal #2 labeled 902_2 obtains information indicating that "the number of time divisions in which sector sweep reference signals can be transmitted when the terminals transmit the sector sweep reference signals" is four.

In this case, terminal #2 labeled 902_2 obtains, for example, any one of the values "0", "1", "2", and "3" using a random number. For example, terminal #2 labeled 902_2 obtains "1" using a random number. In this case, since "1"+1=2, terminal #2 labeled 902_2 transmits terminal #2 "sector sweep reference signal" 1401_2 using "terminal "sector sweep reference signal" second (="1"+1) transmission period 1301_2" in FIG. 14.

Note that terminal #2 "sector sweep reference signal 1401_2" includes information of the "transmission panel antenna and parameter" with high reception quality obtained by terminal #2 labeled 902_2, that is, information of "transmission panel antenna a2 and parameter b2". Terminal #2 "sector sweep reference signal" 1401_2 may also include information of the "frequency domain", for example, information of "frequency band ♭1". This will be described later.

Thus, terminal #i labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001** may be used for this estimation.

Terminal #i labeled **902_*i* estimates, for example, "transmission panel antenna ai and parameter bi" as the "transmission panel antenna and parameter" with high reception quality. Terminal #i labeled 902_*i*** also estimates frequency band ♭zi as the "frequency domain" with high reception quality.

In addition, while estimating the "transmission panel antenna and parameter" with high reception quality, terminal #i labeled **902_*i* simultaneously obtains information of "the number of time divisions in which sector sweep reference signals can be transmitted when the terminals transmit the sector sweep reference signals". In the case of FIG. 14, terminal #i labeled 902_*i*** obtains information indicating that "the number of time divisions in which sector sweep reference signals can be transmitted when the terminals transmit the sector sweep reference signals" is four.

In this case, terminal #i labeled **902_*i* obtains, for example, any one of the values "0", "1", "2", and "3" using a random number. For example, terminal #i labeled 902_*i* obtains "yi" using a random number. Note that yi is any one of the values "0", "1", "2", and "3". In this case, terminal #i labeled 902_*i* transmits terminal #i "sector sweep reference signal" 1401_*i* using terminal "sector sweep reference signal" ("yi"+1)-th transmission period 1301_("yi"+1) in FIG. 14**.

Note that terminal #i "sector sweep reference signal" 1401_i includes information of the "transmission panel antenna and parameter" with high reception quality obtained by terminal #i labeled 902_i, that is, information of "transmission panel antenna ai and parameter bi". Terminal #i "sector sweep reference signal" 1401_i may also include information of the "frequency domain", for example, information of "frequency band ♭p". This will be described later.

Note that terminal #i "sector sweep reference signal" 1401_i may be assigned to a plurality of frequency bands as illustrated in FIG. 14. For example, terminal #3 "sector sweep reference signal" 1401_3 is assigned to frequency band ♭1 and frequency band ♭2. As another example, terminal #i "sector sweep reference signal" 1401_i may be assigned to frequency bands discretely. For example, terminal #i "sector sweep reference signal" 1401_i may be assigned to frequency band ♭1 and frequency band ♭K. (As a result, terminal #i "sector sweep reference signal" 1401_i is assigned to one or more frequency bands.)

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" 1401_i transmitted by terminal #i labeled 902_i described with reference to FIG. 14. To simplify the description, terminal #i labeled 902_i has the configuration in FIG. 1A, 1B, or 1C, and terminal #i labeled 902_i with the configuration in FIG. 1A, 1B, or 1C includes the configuration in FIG. 3 as transmission panel antenna xi labeled 106_xi. Note that the configuration of terminal #i labeled 902_i is not limited to the configuration in FIG. 1A, 1B, or 1C, and the configuration of transmission panel antenna xi labeled 106_xi included in terminal #i labeled 902_i with the configuration in FIG. 1A, 1B, or 1C is not limited to the configuration in FIG. 3.

Figure 15A:
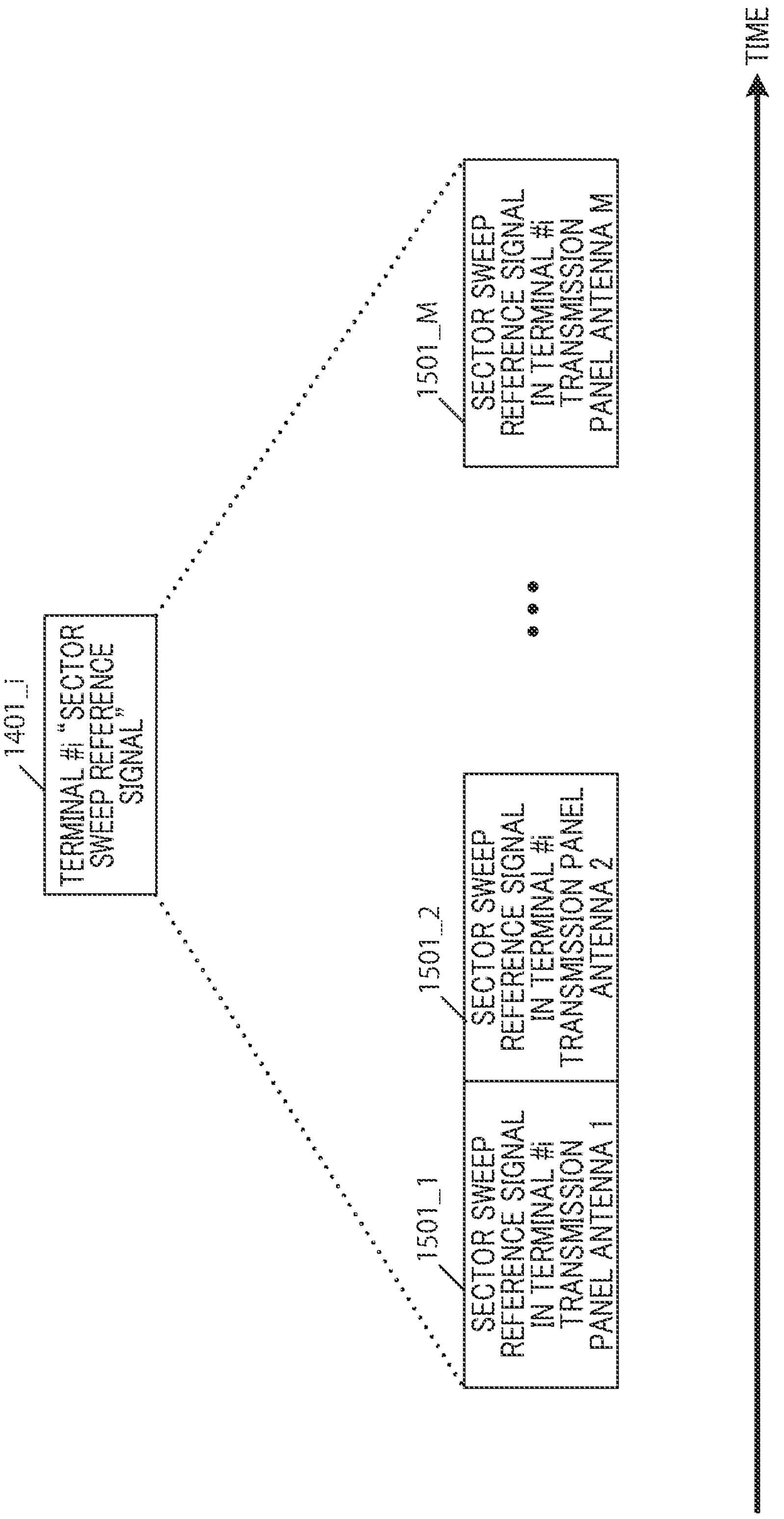
FIG. 15A illustrates an exemplary configuration of a terminal #i "sector sweep reference signal"

Terminal #i labeled 902_i transmits terminal #i "sector sweep reference signal" 1401_i as illustrated in FIG. 14. FIG. 15A illustrates an exemplary configuration of terminal #i "sector sweep reference signal" 1401_i. Note that the horizontal axis represents time in FIG. 15A.

As illustrated in FIG. 15A, terminal #i "sector sweep reference signal" 1401_i of terminal #i labeled 902_i is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_i with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_i with the configuration in FIG. 1A, 1B, or 1C transmits "sector sweep reference signal 1501_k in terminal #i transmission panel antenna k" using transmission panel antenna k labeled 106_k. Note that k is an integer from 1 to M (both inclusive).

Note that the number of transmission panel antennas included in terminal #i labeled 902_i is M in FIG. 15A, but the number of transmission panel antennas is not limited to this and may be N, where N is an integer equal to or greater than 1.

Figure 15B:
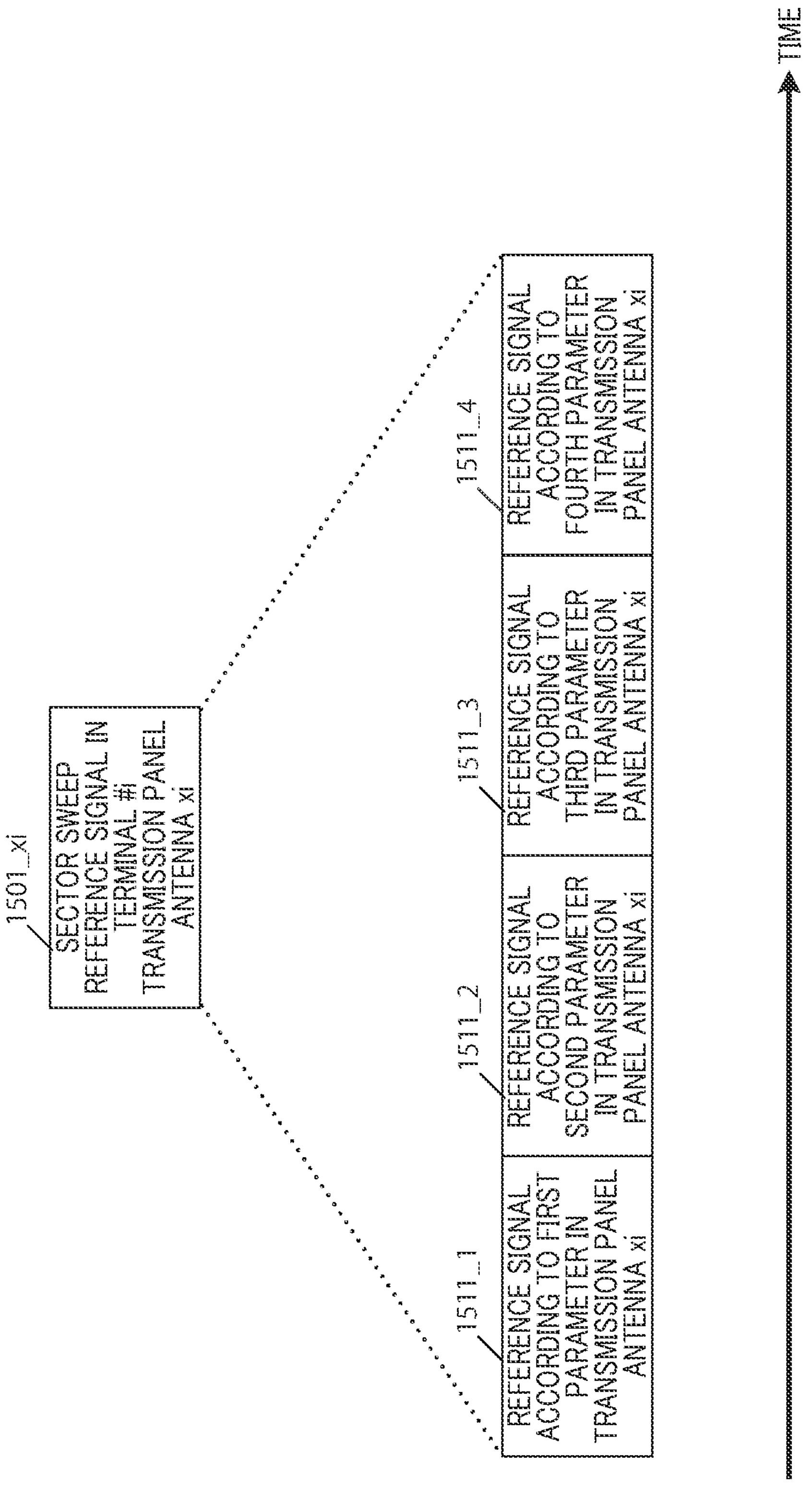
FIG. 15B illustrates an exemplary configuration of a "sector sweep reference signal in terminal #i transmission panel antenna xi" in FIG. 15A.

FIG. 15B illustrates an exemplary configuration of "sector sweep reference signal 1501_xi in terminal #i transmission panel antenna xi" in FIG. 15A. Note that the horizontal axis represents time in FIG. 15.

As illustrated in FIG. 15B, "sector sweep reference signal 1501_xi in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_i with the configuration in FIG. 1A, 1B, or 1C includes the configuration in FIG. 3 as transmission panel antenna xi labeled 106_xi.

A description will be given of "reference signal 1511_1 according to first parameter in transmission panel antenna xi".

When terminal #i labeled 902_i transmits "reference signal 1511_1 according to first parameter in transmission panel antenna xi" illustrated in FIG. 15B, terminal #i labeled 902_i sets the multiplication coefficient in multiplier 304_1 in transmission panel antenna xi labeled 106_xi as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_i transmits tx1ref1(t)×w1(xi, 1) from antenna 306_1 in FIG. 3. Note that t represents time.

When terminal #i labeled 902_i transmits "reference signal 1511_1 according to first parameter in transmission panel antenna xi" illustrated in FIG. 15B, terminal #i labeled 902_i sets the multiplication coefficient in multiplier 304_2 in transmission panel antenna xi labeled 106_xi as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_i transmits tx2ref1(t)×w2(xi, 1) from antenna 306_2 in FIG. 3.

When terminal #i labeled 902_i transmits "reference signal 1511_1 according to first parameter in transmission panel antenna xi" illustrated in FIG. 15B, terminal #i labeled 902_i sets the multiplication coefficient in multiplier 304_3 in transmission panel antenna xi labeled 106_xi as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_i transmits tx3ref1(t)×w3(xi, 1) from antenna 306_3 in FIG. 3.

When terminal #i labeled 902_i transmits "reference signal 1511_1 according to first parameter in transmission panel antenna xi" illustrated in FIG. 15B, terminal #i labeled 902_i sets the multiplication coefficient in multiplier 304_4 in transmission panel antenna xi labeled 106_xi as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_i transmits tx4ref1(t)×w4(xi, 1) from antenna 306_4 in FIG. 3.

A description will be given of "reference signal 1511_j according to j-th parameter in transmission panel antenna xi".

When terminal #i labeled 902_i transmits "reference signal 1511_j according to j-th parameter in transmission panel antenna xi" illustrated in FIG. 15B, terminal #i labeled 902_i sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx3refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 14, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces an effect of enhancing data reception quality.

Further, as illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency ♭p" that has been used for transmission by terminal #i labeled 902_*i* or that terminal #i labeled 902_*i* desires base station #1 labeled 901_1 to use.

Transmission of the "information on the frequency band and/or frequency ♭p" by terminal #i labeled 902_*i* allows base station #1 labeled 901_1 to recognize the "information on the frequency band and/or frequency ♭p"; accordingly, terminal #i labeled 902_*i* and base station #1 labeled 901_1 can perform appropriate control. This produces an effect of enhancing data reception quality.

In a case where base station #1 labeled 901_1 and terminal #i labeled 902_*i* perform communication using the same frequency band, however, they can recognize the "information on the frequency band and/or frequency ♭p" by detecting modulation signals transmitted from each other without the transmission of the "information on the frequency band and/or frequency ♭p".

Figure 16A:
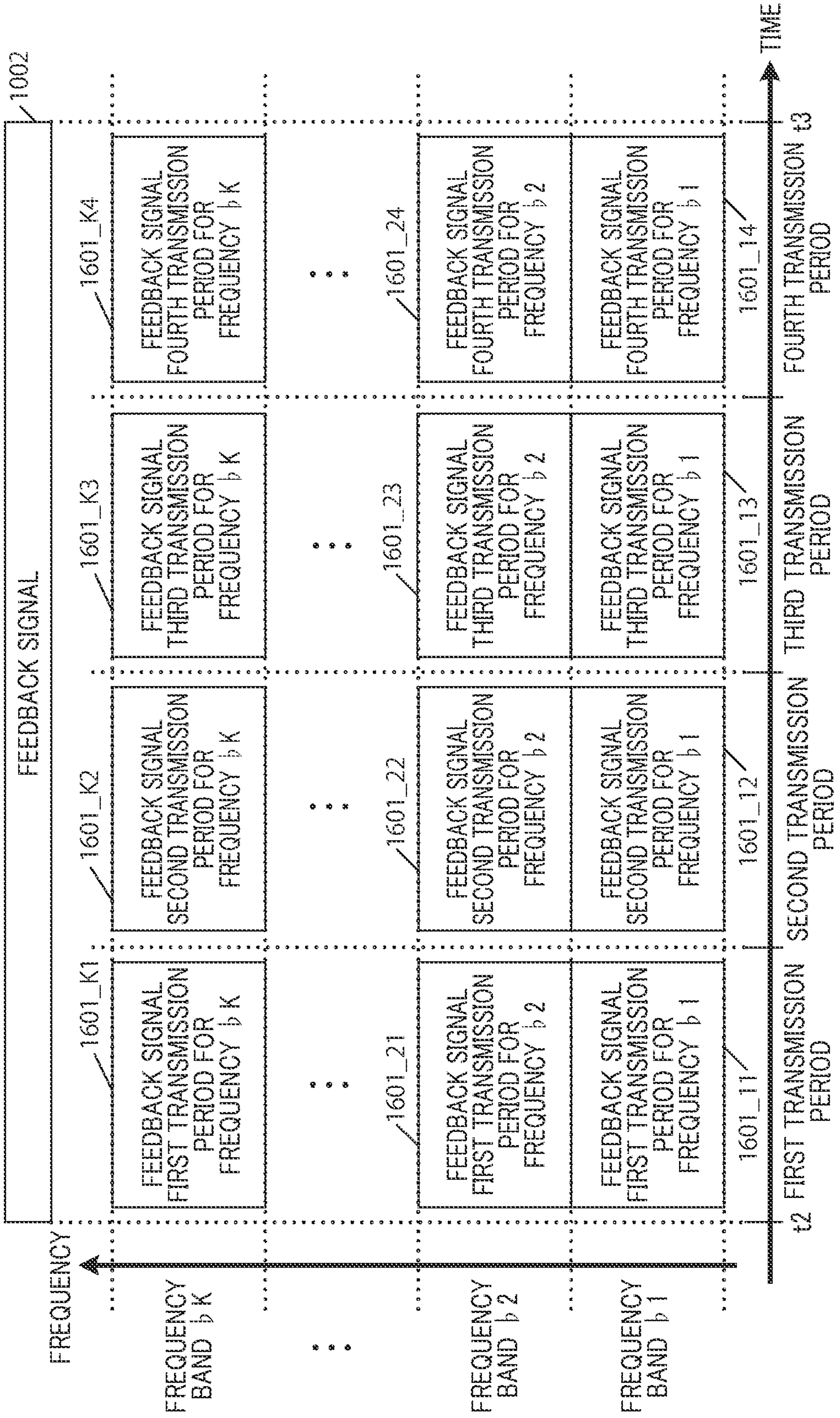
FIG. 16A illustrates an exemplary configuration of a feedback signal that is present in the time period from t2 to t3 in FIG. 10 and transmitted by base station #1.

FIG. 16A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 16A. In this example, since "the number of time divisions in which sector sweep reference signals can be transmitted when the terminals transmit the sector sweep reference signals" is four, there are a first transmission period, a second transmission period, a third transmission period, and a fourth transmission period for feedback signal 1002 as illustrated in FIG. 16A. Note that, in a case where "the number of time divisions in which sector sweep reference signals can be transmitted when the terminals transmit the sector sweep reference signals" is Ω, for example, Ω transmission periods may be configured to be present for feedback signal 1002, where Ω is an integer equal to or greater than 1 or an integer equal to or greater than 2.

In addition, there are frequency band ♭1, frequency band ♭2, . . . , frequency band ♭K for feedback signal 1002 in FIG. 16A.

Thus, the first transmission period includes feedback signal first transmission period 1601_11 for frequency ♭1, feedback signal first transmission period 1601_21 for frequency ♭2, . . . , feedback signal first transmission period 1601_K1 for frequency ♭K. Likewise, the second transmission period includes feedback signal second transmission period 1601_12 for frequency ♭1, feedback signal second transmission period 1601_22 for frequency ♭2, . . . , feedback signal second transmission period 1601_K2 for frequency ♭K. The third transmission period includes feedback signal third transmission period 1601_13 for frequency ♭1, feedback signal third transmission period 1601_23 for frequency ♭2, . . . , feedback signal third transmission period 1601_K3 for frequency ♭K. The fourth transmission period includes feedback signal fourth transmission period 1601_14 for frequency ♭1, feedback signal fourth transmission period 1601_24 for frequency ♭2, . . . , feedback signal fourth transmission period 1601_K4 for frequency ♭K.

One feature is that "feedback signals are transmitted from the same transmission panel antenna in the i-th time period regardless of the frequency band in FIG. 16A".

Figure 16B:
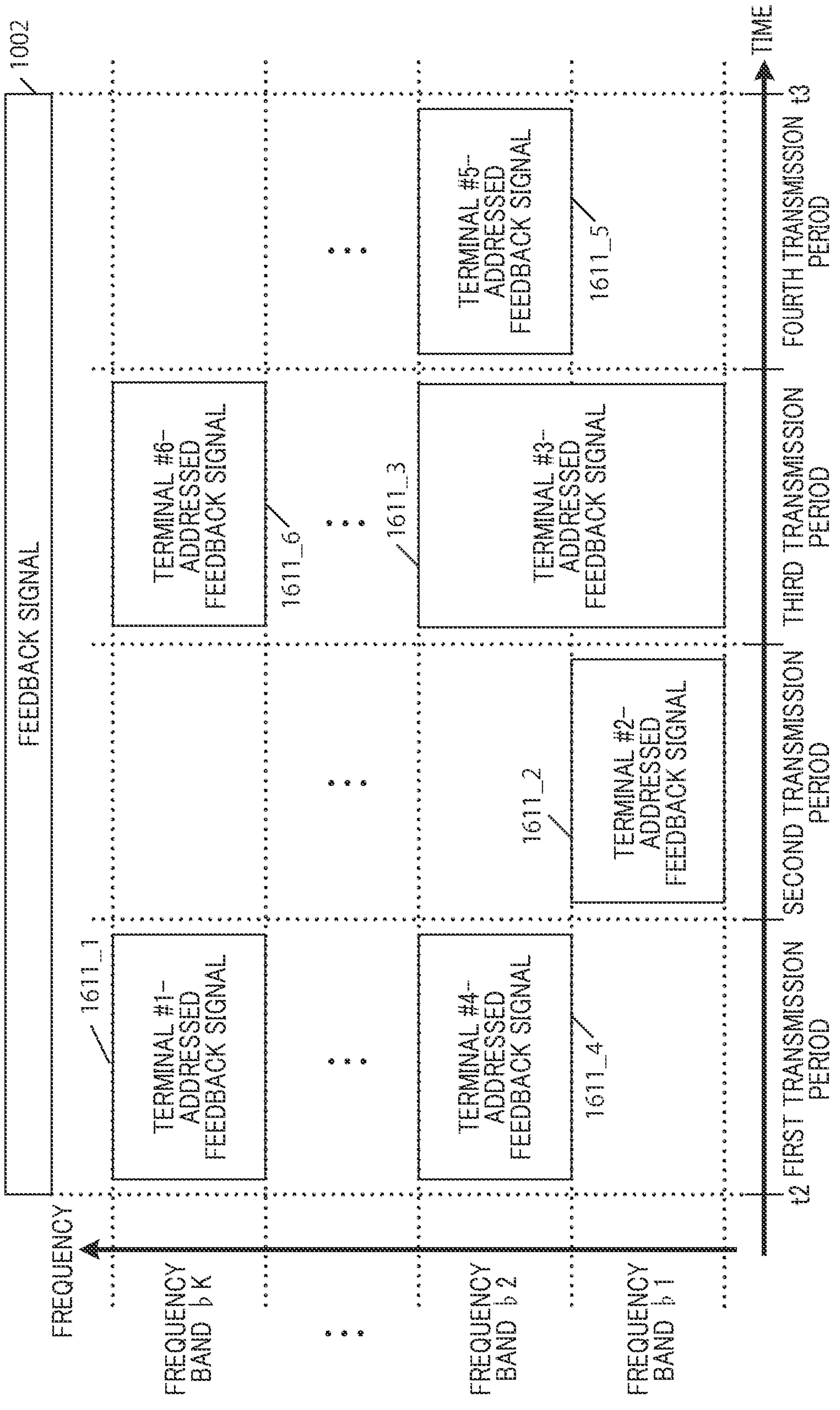
FIG. 16B illustrates exemplary specific feedback signal assignment for the feedback signal illustrated in FIG. 16A.

FIG. 16B illustrates exemplary specific feedback signal assignment for feedback signal 1002 illustrated in FIG. 16A.

As in FIG. 14, for example, terminal #1 labeled 902_1 transmits terminal #1 "sector sweep reference signal" 1401_1, terminal #2 labeled 902_2 transmits terminal #2 "sector sweep reference signal" 1401_2, terminal #3 labeled 902_3 transmits terminal #3 "sector sweep reference signal" 1401_3, terminal #4 labeled 902_4 transmits terminal #4 "sector sweep reference signal" 1401_4, terminal #5 labeled 902_5 transmits terminal #5 "sector sweep reference signal" 1401_5, and terminal #6 labeled 902_6 transmits terminal #6 "sector sweep reference signal" 1401_6.

Since terminal #1 "sector sweep reference signal" 1401_1 is present in frequency band ♭K as in FIG. 14, terminal #1-addressed feedback signal (i.e., feedback signal addressed to terminal #1) 1611_1 is present in frequency band ♭K in FIG. 16B.

Since terminal #2 "sector sweep reference signal" 1401_2 is present in frequency band ♭1 as in FIG. 14, terminal #2-addressed feedback signal 1611_2 is present in frequency band ♭1 in FIG. 16B.

Since terminal #3 "sector sweep reference signal" 1401_3 is present in frequency bands ♭1 and ♭2 as in FIG. 14, terminal #3-addressed feedback signal 1611_3 is present in frequency bands ♭1 and ♭2 in FIG. 16B.

Since terminal #4 "sector sweep reference signal" 1401_4 is present in frequency band ♭2 as in FIG. 14, terminal #4-addressed feedback signal 1611_4 is present in frequency band ♭2 in FIG. 16B.

Since terminal #5 "sector sweep reference signal" 1401_5 is present in frequency band ♭2 as in FIG. 14, terminal #5-addressed feedback signal 1611_5 is present in frequency band ♭2 in FIG. 16B.

Since terminal #6 "sector sweep reference signal" 1401_6 is present in frequency band ♭K as in FIG. 14, terminal #6-addressed feedback signal 1611_6 is present in frequency band ♭K in FIG. 16B.

In this manner, obtaining terminal #i-addressed feedback signal 1611_*i* allows terminal #i labeled 902_*i* to know that communication with base station #1 labeled 901_1 is available and to know the frequency band to be used. Note that FIG. 16B is merely an example. In a case where there is no terminal #1-addressed feedback signal 1611_1 as feedback signal 1002, for example, terminal #1 labeled 902_1 recognizes that the communication with base station #1 labeled 901_1 has not been established.

At this time, terminal #i-addressed feedback signal 1611_*i* includes, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed feedback signal 1611_*i*.

Figure 17A:
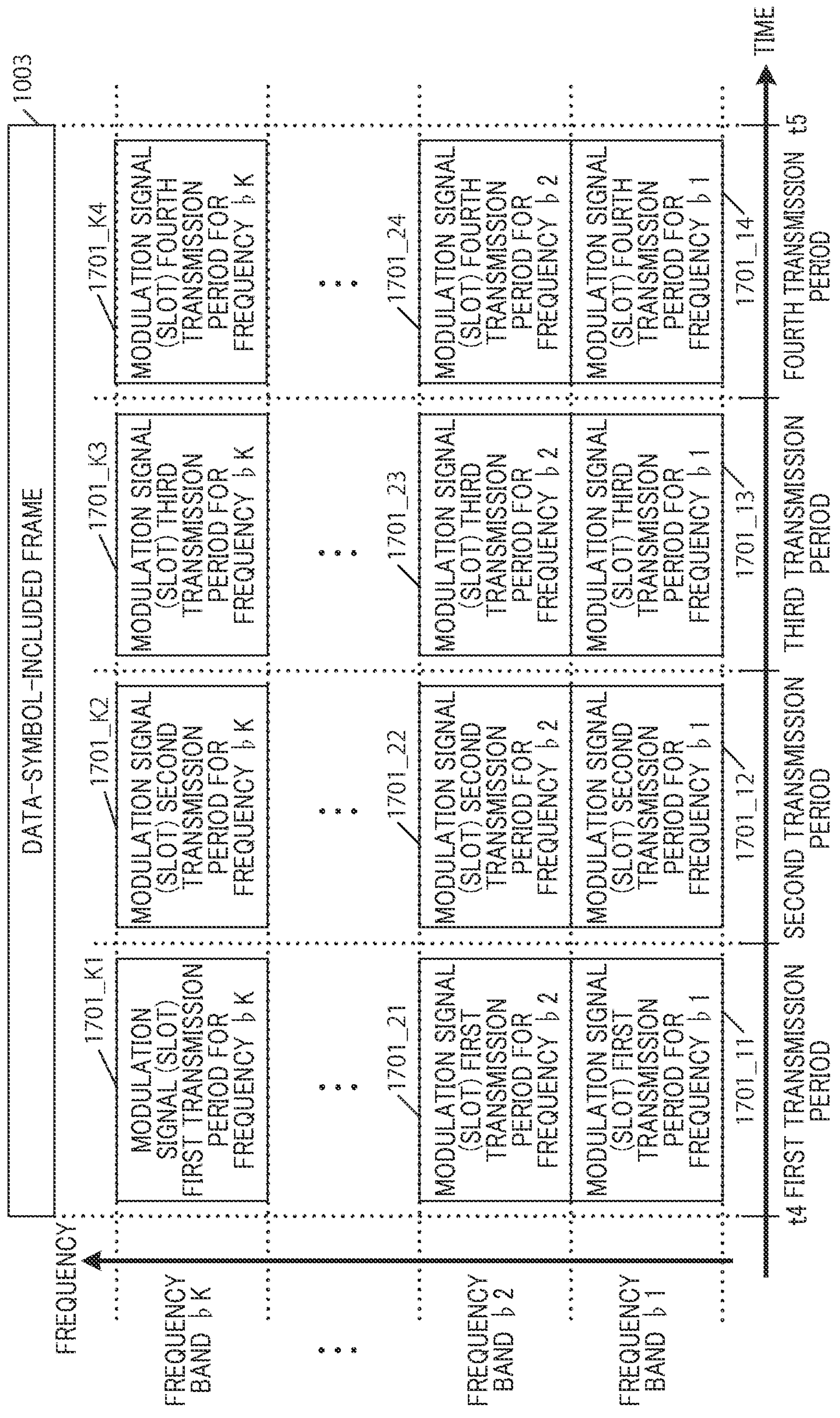
FIG. 17A illustrates an exemplary configuration of a data-symbol-included frame that is present in the time period from t4 to t5 in FIG. 10 and transmitted by base station #1.

FIG. 17A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 17A. In this example, since "the number of time divisions in which sector sweep reference signals can be transmitted when the terminals transmit the sector sweep reference signals" is four, there are a first transmission period, a second transmission period, a third transmission period, and a fourth transmission period for data-symbol-included frame 1003 as illustrated in FIG. 17A. Note that, in a case where "the number of time divisions in which sector sweep reference signals can be transmitted when the terminals transmit the sector sweep reference signals" is Ω, for example, Ω transmission periods may be configured to be present for data-symbol-included frame 1003, where Ω is an integer equal to or greater than 1 or an integer equal to or greater than 2.

In addition, there are frequency band ♭1, frequency band ♭2, . . . , frequency band ♭K for data-symbol-included frame 1003 in FIG. 17A.

Thus, the first transmission period includes modulation signal (slot) first transmission period 1701_11 for frequency ♭1, modulation signal (slot) first transmission period 1701_21 for frequency ♭2, . . . , modulation signal (slot) first transmission period 1701_K1 for frequency ♭K. Likewise, the second transmission period includes modulation signal (slot) second transmission period 1701_12 for frequency ♭1, modulation signal (slot) second transmission period 1701_22 for frequency ♭2, . . . , modulation signal (slot) second transmission period 1701_K2 for frequency ♭K. The third transmission period includes modulation signal (slot) third transmission period 1701_13 for frequency ♭1, modulation signal (slot) third transmission period 1701_23 for frequency ♭2, . . . , modulation signal (slot) third transmission period 1701_K3 for frequency ♭K. The fourth transmission period includes modulation signal (slot) fourth transmission period 1701_14 for frequency ♭1, modulation signal (slot) fourth transmission period 1701_24 for frequency ♭2, . . . , modulation signal (slot) fourth transmission period 1701_K4 for frequency ♭K.

Figure 17B:
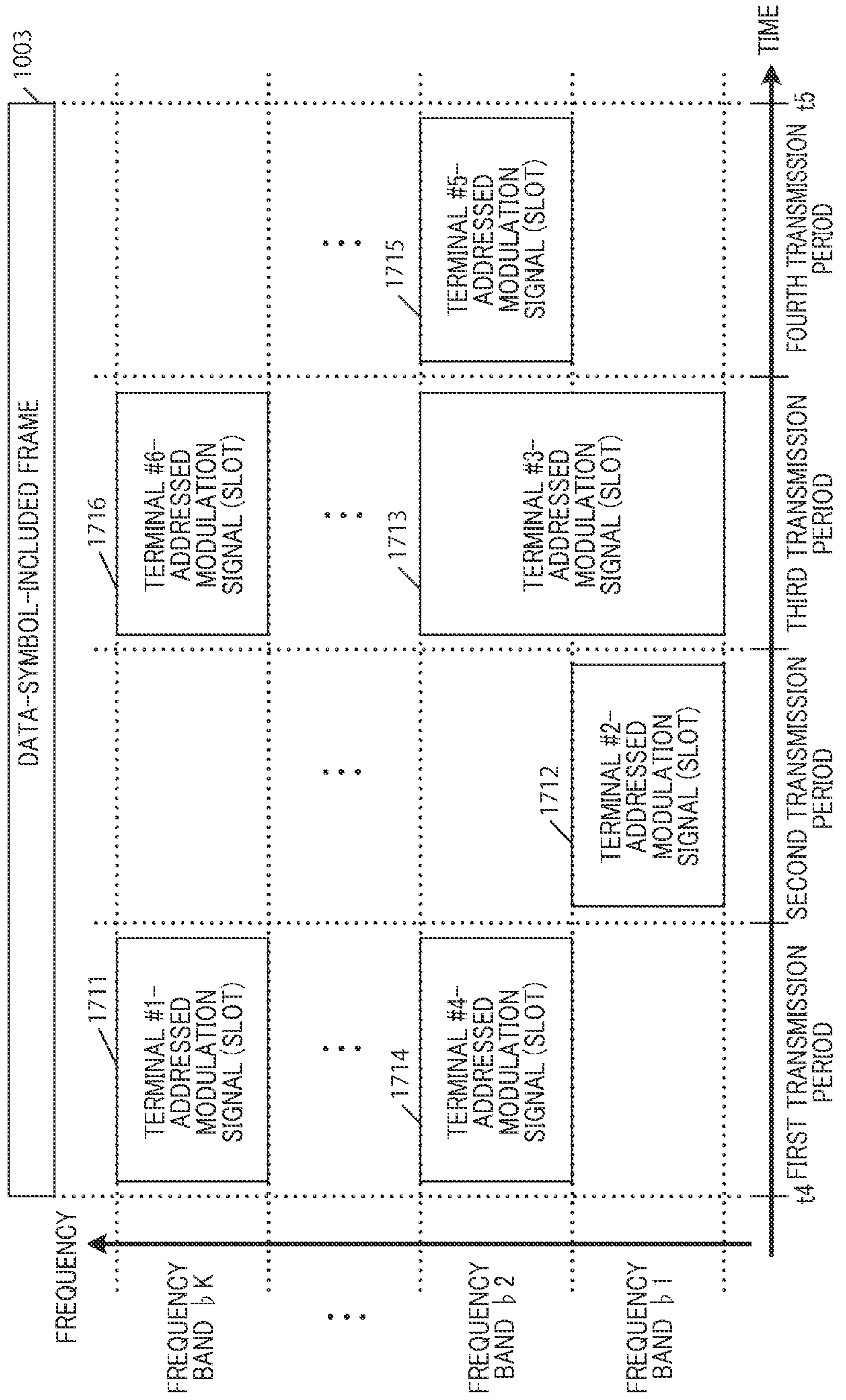
FIG. 17B illustrates exemplary specific modulation signal (slot) assignment for the data-symbol-included frame illustrated in FIG. 17A.

FIG. 17B illustrates exemplary specific modulation signal (slot) assignment for data-symbol-included frame 1003 illustrated in FIG. 17A.

As in FIG. 14, for example, terminal #1 labeled 902_1 transmits terminal #1 "sector sweep reference signal" 1401_1, terminal #2 labeled 902_2 transmits terminal #2 "sector sweep reference signal" 1401_2, terminal #3 labeled 902_3 transmits terminal #3 "sector sweep reference signal" 1401_3, terminal #4 labeled 902_4 transmits terminal #4 "sector sweep reference signal" 1401_4, terminal #5 labeled 902_5 transmits terminal #5 "sector sweep reference signal" 1401_5, and terminal #6 labeled 902_6 transmits terminal #6 "sector sweep reference signal" 1401_6.

Since terminal #1 "sector sweep reference signal" 1401_1 is present in frequency band ♭K as in FIG. 14, terminal #1-addressed modulation signal (slot) (i.e., modulation signal (slot) addressed to terminal #1) 1711 is present in frequency band ♭K in FIG. 17B.

Since terminal #2 "sector sweep reference signal" 1401_2 is present in frequency band ♭1 as in FIG. 14, terminal #2-addressed modulation signal (slot) 1712 is present in frequency band ♭1 in FIG. 17B.

Since terminal #3 "sector sweep reference signal" 1401_3 is present in frequency bands ♭1 and ♭2 as in FIG. 14, terminal #3-addressed modulation signal (slot) 1713 is present in frequency bands ♭1 and ♭2 in FIG. 17B.

Since terminal #4 "sector sweep reference signal" 1401_4 is present in frequency band ♭2 as in FIG. 14, terminal #4-addressed modulation signal (slot) 1714 is present in frequency band ♭2 in FIG. 17B.

Since terminal #5 "sector sweep reference signal" 1401_5 is present in frequency band ♭2 as in FIG. 14, terminal #5-addressed modulation signal (slot) 1715 is present in frequency band ♭2 in FIG. 17B.

Since terminal #6 "sector sweep reference signal" 1401_6 is present in frequency band ♭K as in FIG. 14, terminal #6-addressed modulation signal (slot) 1716 is present in frequency band ♭K in FIG. 17B.

At this time, terminal #i-addressed modulation signal (slot) 171*i* includes, for example, a data symbol (data and/or information) addressed to terminal #i labeled 902_*i*.

In this manner, terminal #i-addressed modulation signal (slot) 171*i* allows terminal #i labeled 902_*i* to know that communication with base station #1 labeled 901_1 is available and to know the frequency band to be used. Note that FIG. 17B is merely an example. In a case where there is no terminal #1-addressed modulation signal (slot) 1711 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed modulation signal (slot) 171*i*.

Note that, in FIGS. 16A and 16B, base station #1 labeled 901_1 may estimate the "frequency (band)" and the "transmission panel antenna and parameter" of terminal #i labeled 902_1 with high reception quality in receiving "terminal #i "sector sweep reference signal" 1401_*i* transmitted by terminal #i labeled 902_*i*", and the estimated information may be included in terminal #i-addressed feedback signal 1611_*i*.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) 171*i* in FIG. 17B may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

Figure 18:
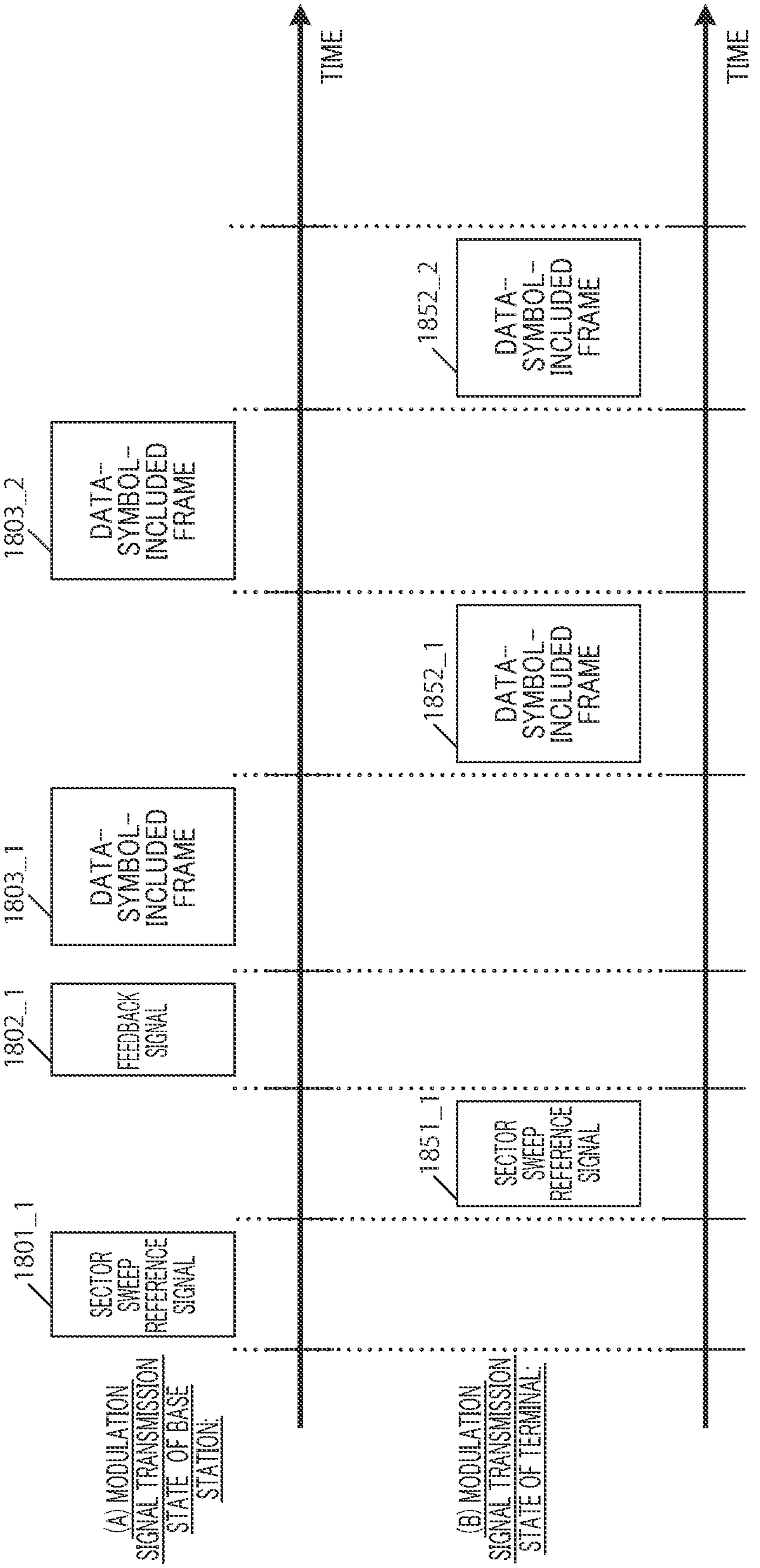
FIG. 18 illustrates an exemplary state where base station #1 and "terminal #1 to terminal #6" communicate with each other.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of "terminal #1 labeled

902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example. FIGS. 13, 14, 15A, 15B, etc., and the description thereof will be thus omitted.

Base station #1 labeled 901_1 transmits feedback signal 1802_1. Note that this has already been described with reference to FIGS. 16A and 16B, and the description thereof will be thus omitted.

After that, base station #1 labeled 901_1 transmits "data-symbol-included frame 1803_1". Note that this has already been described with reference to FIGS. 17A and 17B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 20A to 20F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 17A and 17B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 20A to 20F.

Figure 19:
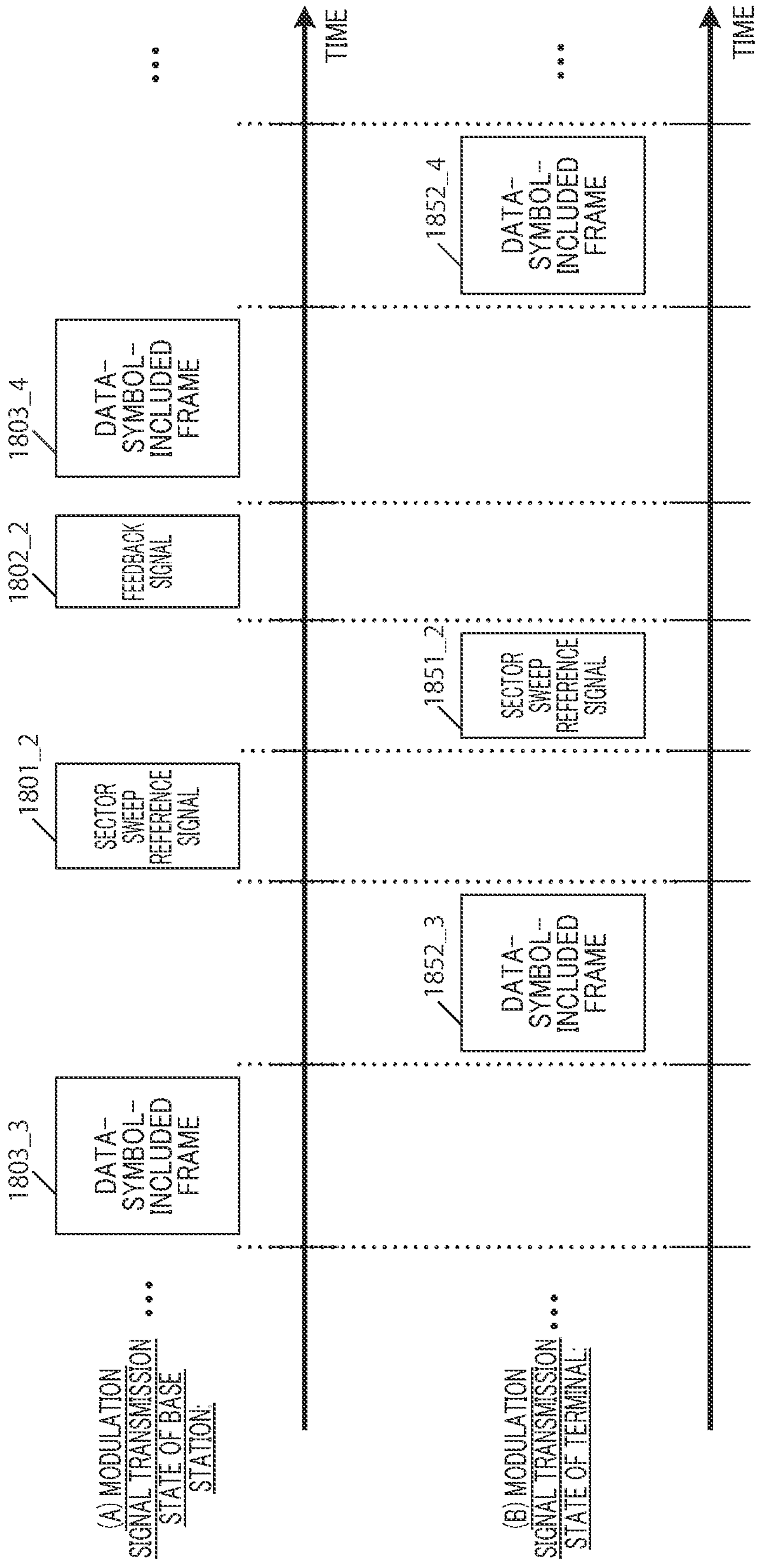
FIG. 19 illustrates an exemplary modulation signal transmission state of base station #1 and an exemplary modulation signal transmission state of a terminal such as "terminal #1 to terminal #6" after the state in FIG. 18.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 17A and 17B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIGS. 20A to 20F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 13, 14, 15A, 15B, etc., and the description thereof will be thus omitted.

Base station #1 labeled 901_1 transmits feedback signal 1802_2. Note that this has already been described with reference to FIGS. 16A and 16B, and the description thereof will be thus omitted.

After that, base station #1 labeled 901_1 transmits "data-symbol-included frame 1803_4". Note that this has already been described with reference to FIGS. 17A and 17B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 20A to 20F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 20A to 20F. Note that i is an integer equal to or greater than 1, for example, and the horizontal axis represents time in FIGS. 20A to 20F.

As illustrated in FIGS. 20A, 20B, 20C, 20D, 20E, and 20F, "data-symbol-included frame 1852_*i*" is composed of a first transmission period, a second transmission period, a third transmission period, and a fourth transmission period. In addition, there are frequency band ♭1, frequency band ♭2, . . . , frequency band ♭K for “data-symbol-included frame 1852_*i*”.

Figure 20A:
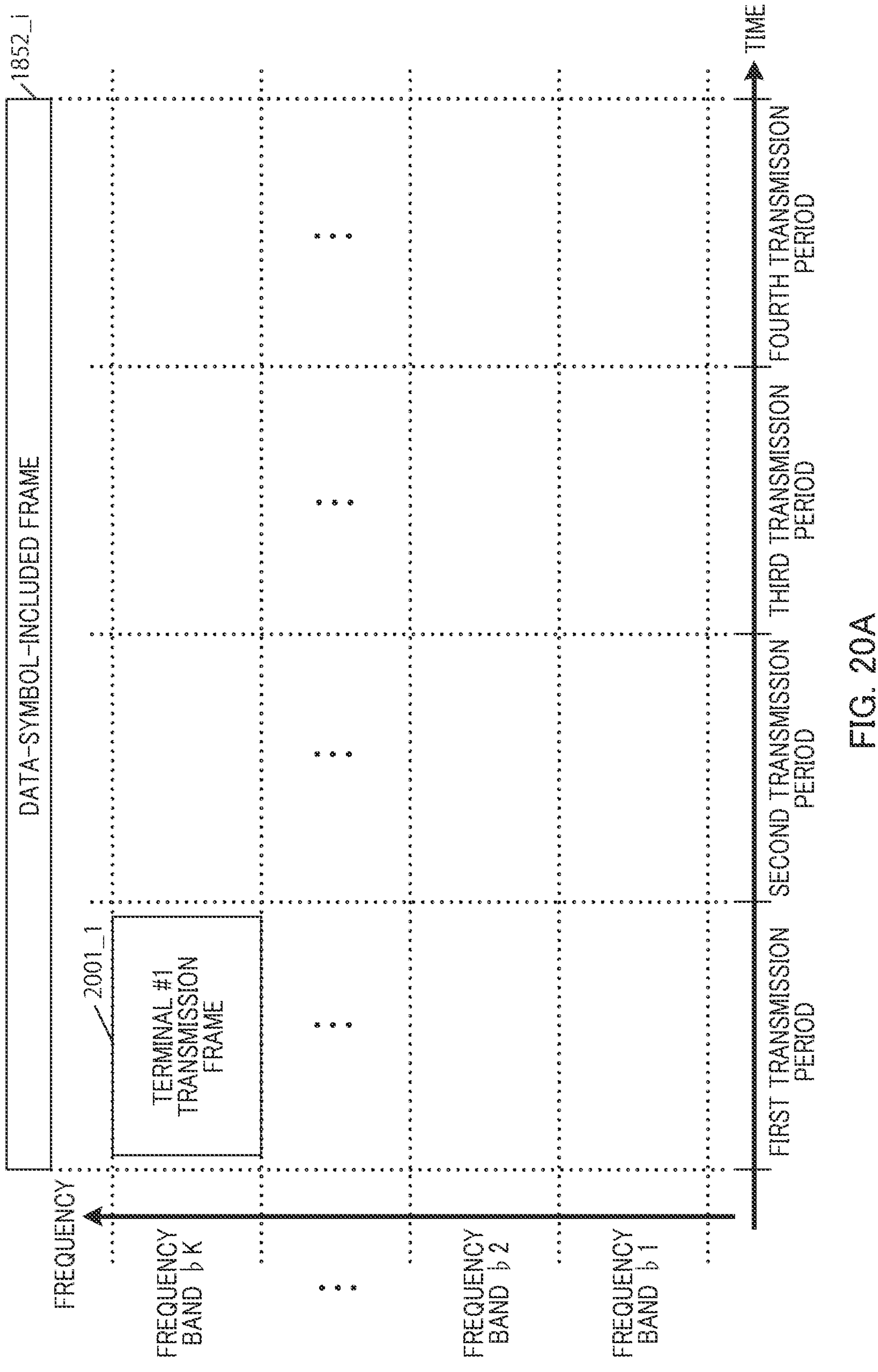
FIG. 20A illustrates an exemplary configuration of a "data-symbol-included frame" transmitted by terminal #1.

As illustrated in FIG. 20A, terminal #1 labeled 902_1 transmits terminal #1 transmission frame (including a data symbol) 2001_1 using frequency band ♭K and the first transmission period, for example.

“Terminal #1 labeled 902_1 transmits terminal #1 transmission frame (including a data symbol) 2001_1 using frequency band ♭K” because “base station #1 labeled 901_1 transmits a modulation signal (slot) addressed to terminal #1 labeled 902_1 using frequency band ♭K” as illustrated in FIG. 17B.

Figure 20B:
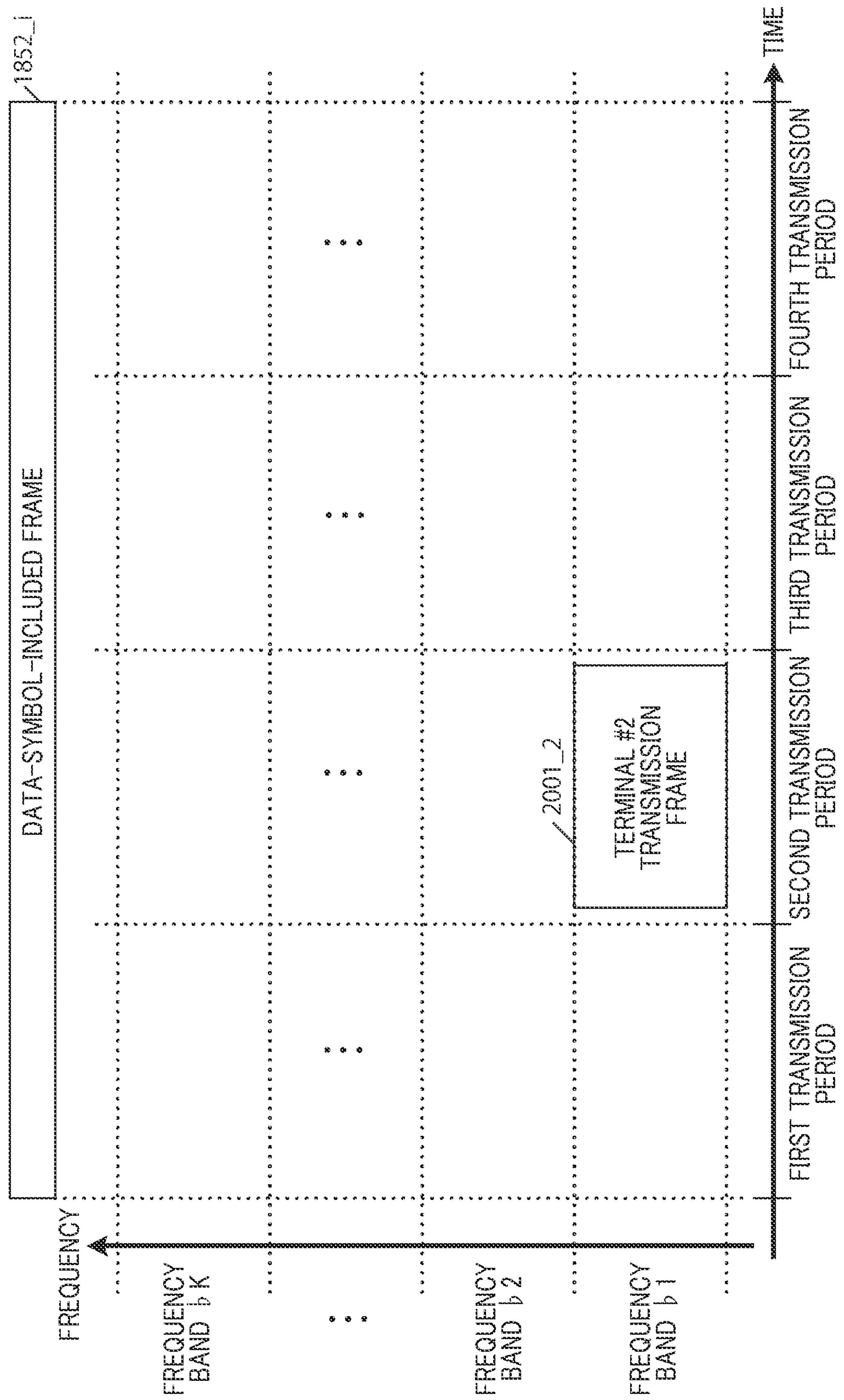
FIG. 20B illustrates an exemplary configuration of a "data-symbol-included frame" transmitted by terminal #2.

As illustrated in FIG. 20B, terminal #2 labeled 902_2 transmits terminal #2 transmission frame (including a data symbol) 2001_2 using frequency band ♭1 and the second transmission period, for example.

“Terminal #2 labeled 902_2 transmits terminal #2 transmission frame (including a data symbol) 2001_2 using frequency band ♭1” because “base station #1 labeled 901_1 transmits a modulation signal (slot) addressed to terminal #2 labeled 902_2 using frequency band ♭1” as illustrated in FIG. 17B.

Figure 20C:
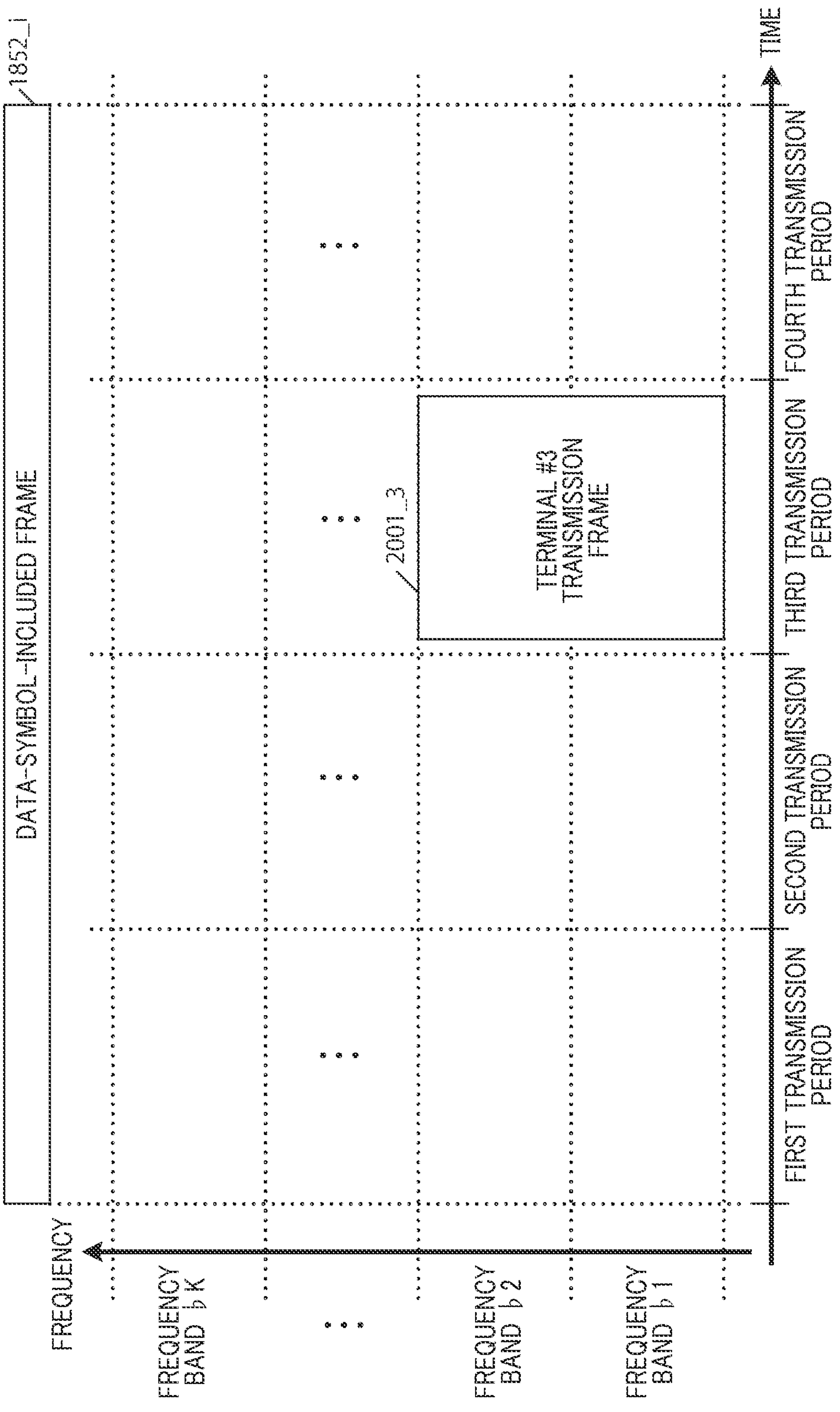
FIG. 20C illustrates an exemplary configuration of a "data-symbol-included frame" transmitted by terminal #3.

As illustrated in FIG. 20C, terminal #3 labeled 902_3 transmits terminal #3 transmission frame (including a data symbol) 2001_3 using frequency bands ♭1 and ♭2 and the third transmission period, for example.

“Terminal #3 labeled 902_3 transmits terminal #3 transmission frame (including a data symbol) 2001_3 using frequency bands ♭1 and ♭2” because “base station #1 labeled 901_1 transmits a modulation signal (slot) addressed to terminal #3 labeled 902_3 using frequency bands ♭1 and ♭2” as illustrated in FIG. 17B.

Figure 20D:
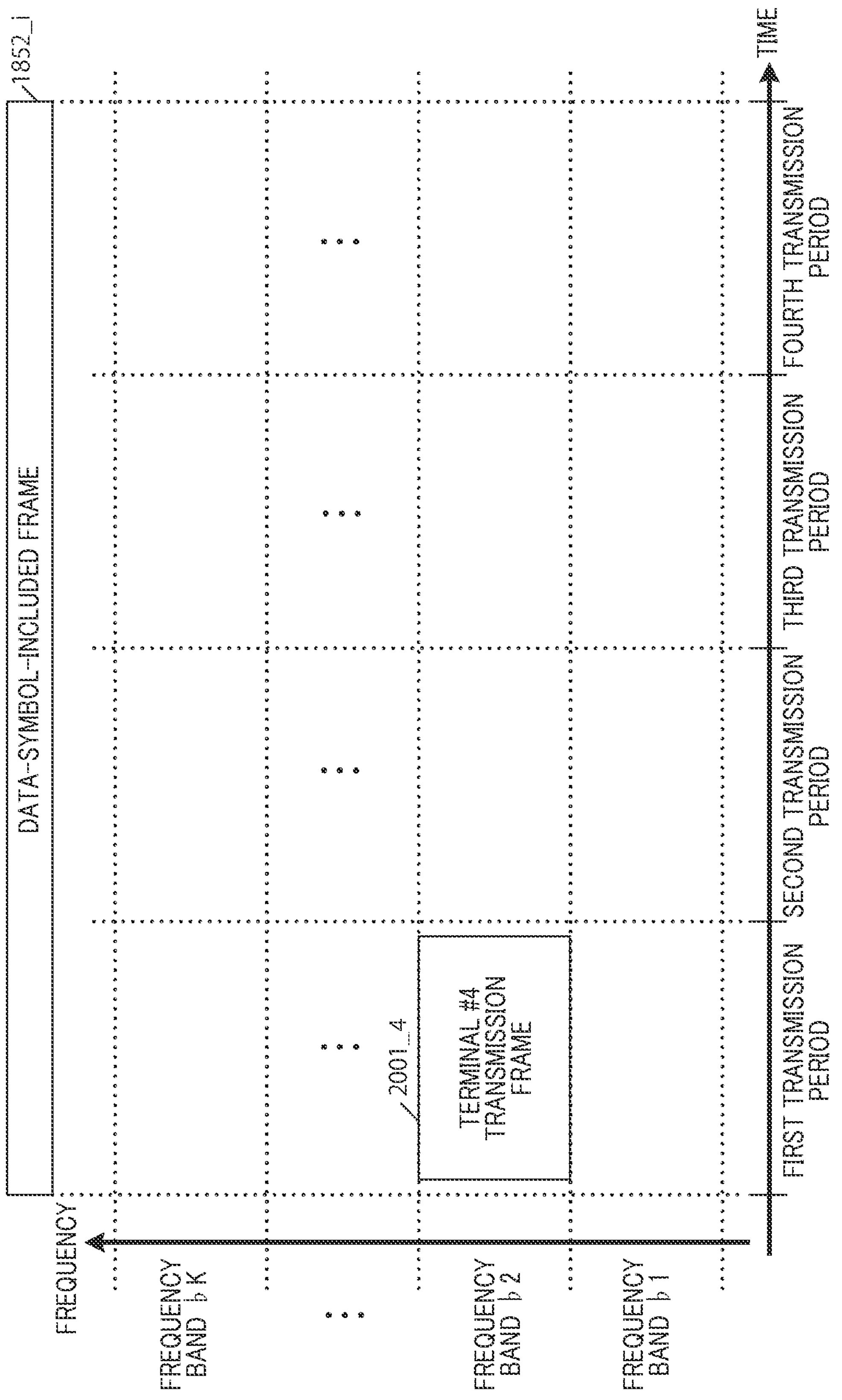
FIG. 20D illustrates an exemplary configuration of a "data-symbol-included frame" transmitted by terminal #4.

As illustrated in FIG. 20D, terminal #4 labeled 902_4 transmits terminal #4 transmission frame (including a data symbol) 2001_4 using frequency band ♭2 and the first transmission period, for example.

“Terminal #4 labeled 902_4 transmits terminal #4 transmission frame (including a data symbol) 2001_4 using frequency band ♭2” because “base station #1 labeled 901_1 transmits a modulation signal (slot) addressed to terminal #4 labeled 902_4 using frequency band ♭2” as illustrated in FIG. 17B.

Figure 20E:
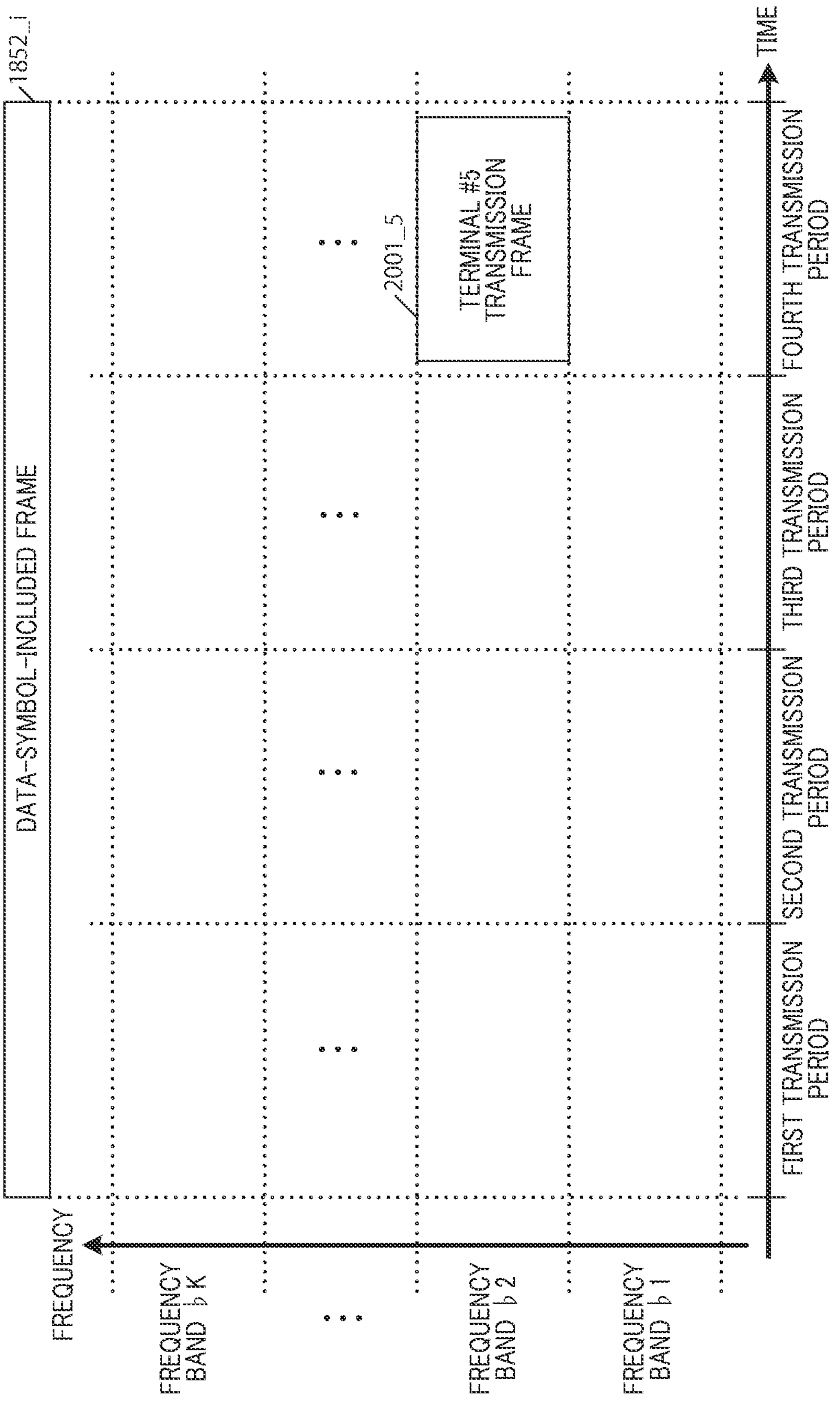
FIG. 20E illustrates an exemplary configuration of a "data-symbol-included frame" transmitted by terminal #5.

As illustrated in FIG. 20E, terminal #5 labeled 902_5 transmits terminal #5 transmission frame (including a data symbol) 2001_5 using frequency band ♭2 and the fourth transmission period, for example.

“Terminal #5 labeled 902_5 transmits terminal #5 transmission frame (including a data symbol) 2001_5 using frequency band ♭2” because “base station #1 labeled 901_1 transmits a modulation signal (slot) addressed to terminal #5 labeled 902_5 using frequency band ♭2” as illustrated in FIG. 17B.

Figure 20F:
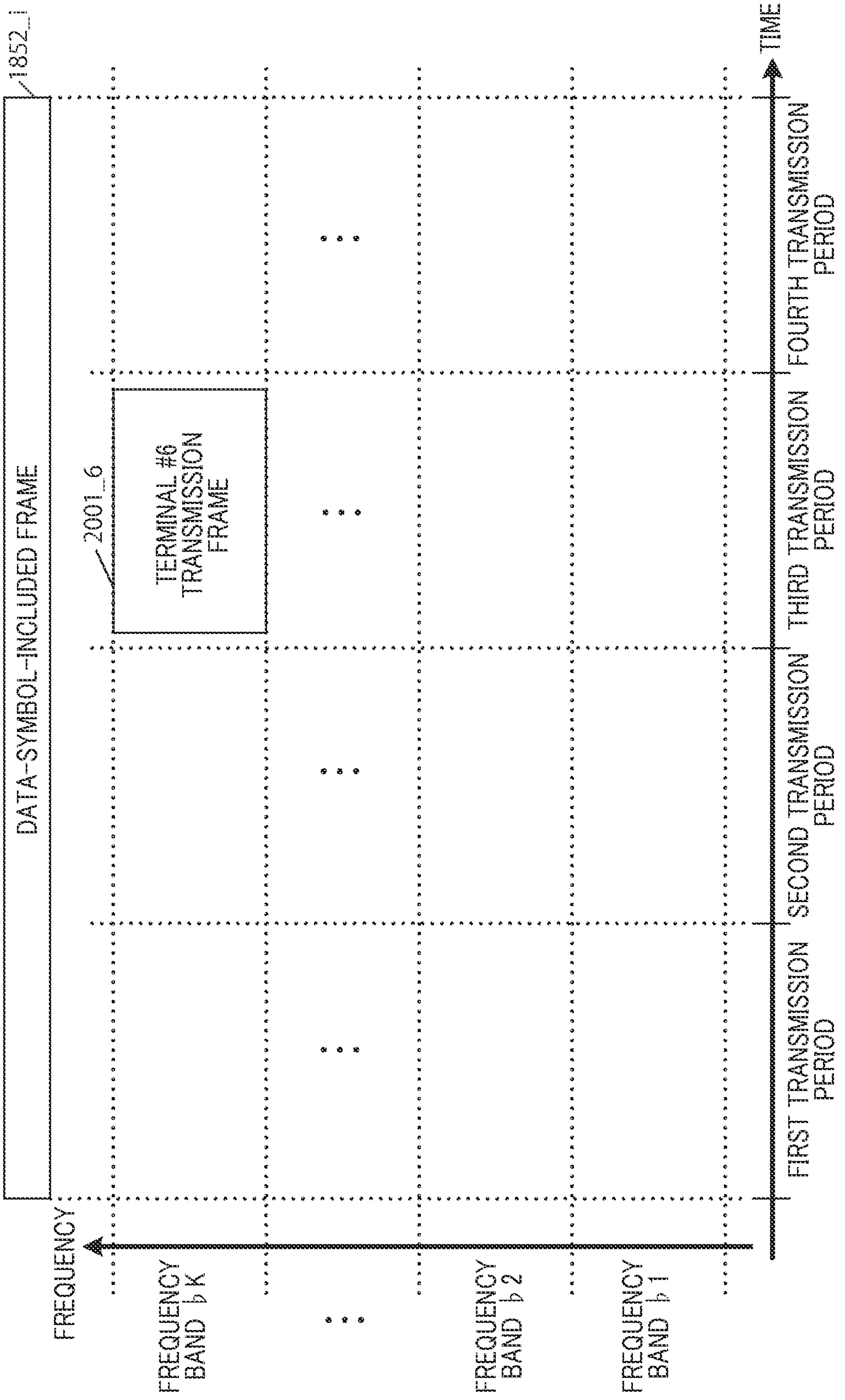
FIG. 20F illustrates an exemplary configuration of a "data-symbol-included frame" transmitted by terminal #6.

As illustrated in FIG. 20F, terminal #6 labeled 902_6 transmits terminal #6 transmission frame (including a data symbol) 2001_6 using frequency band ♭K and the third transmission period, for example.

“Terminal #6 labeled 902_6 transmits terminal #6 transmission frame (including a data symbol) 2001_6 using frequency band ♭K” because “base station #1 labeled 901_1 transmits a modulation signal (slot) addressed to terminal #6 labeled 902_6 using frequency band ♭K” as illustrated in FIG. 17B.

As described above, “data-symbol-included frame 1852_*i*” transmitted by the terminal such as “terminal #1 labeled 902_1, terminal #2 labeled 902_2, terminal #3 labeled 902_3, terminal #4 labeled 902_4, terminal #5 labeled 902_5, and terminal #6 labeled 902_6” is subjected to, for example, OFDMA and/or time division and transmitted by each terminal, and base station #1 labeled 901_1 receives the frame transmitted by the terminal, thereby preventing interference and achieving high data reception quality.

Note that terminal #1 transmission frame 2001_1, terminal #2 transmission frame 2001_2, terminal #3 transmission frame 2001_3, terminal #4 transmission frame 2001_4, terminal #5 transmission frame 2001_5, and terminal #6 transmission frame 2001_6 in FIGS. 20A, 20B, 20C, 20D, 20E, and 20F may include, in addition to the data symbol, a “reference signal such as DMRS, PTRS, or SRS”, a pilot symbol, a pilot signal, a preamble, and a symbol including control information, for example.

In FIGS. 20A, 20B, 20C, 20D, 20E, and 20F, a description has been given of a case where the terminals perform OFDMA and/or time division on the frames to be transmitted, but the terminals may perform spatial division on the frames to be transmitted using multi user-multiple-input multiple-output (MU-MIMO).

FIG. 14 illustrates exemplary occupation by terminals in “terminal “sector sweep reference signal” first transmission period 1301_1, terminal “sector sweep reference signal” second transmission period 1301_2, terminal “sector sweep reference signal” third transmission period 1301_3, and terminal “sector sweep reference signal” fourth transmission period 1301_4” illustrated in FIG. 13.

Figure 21A:
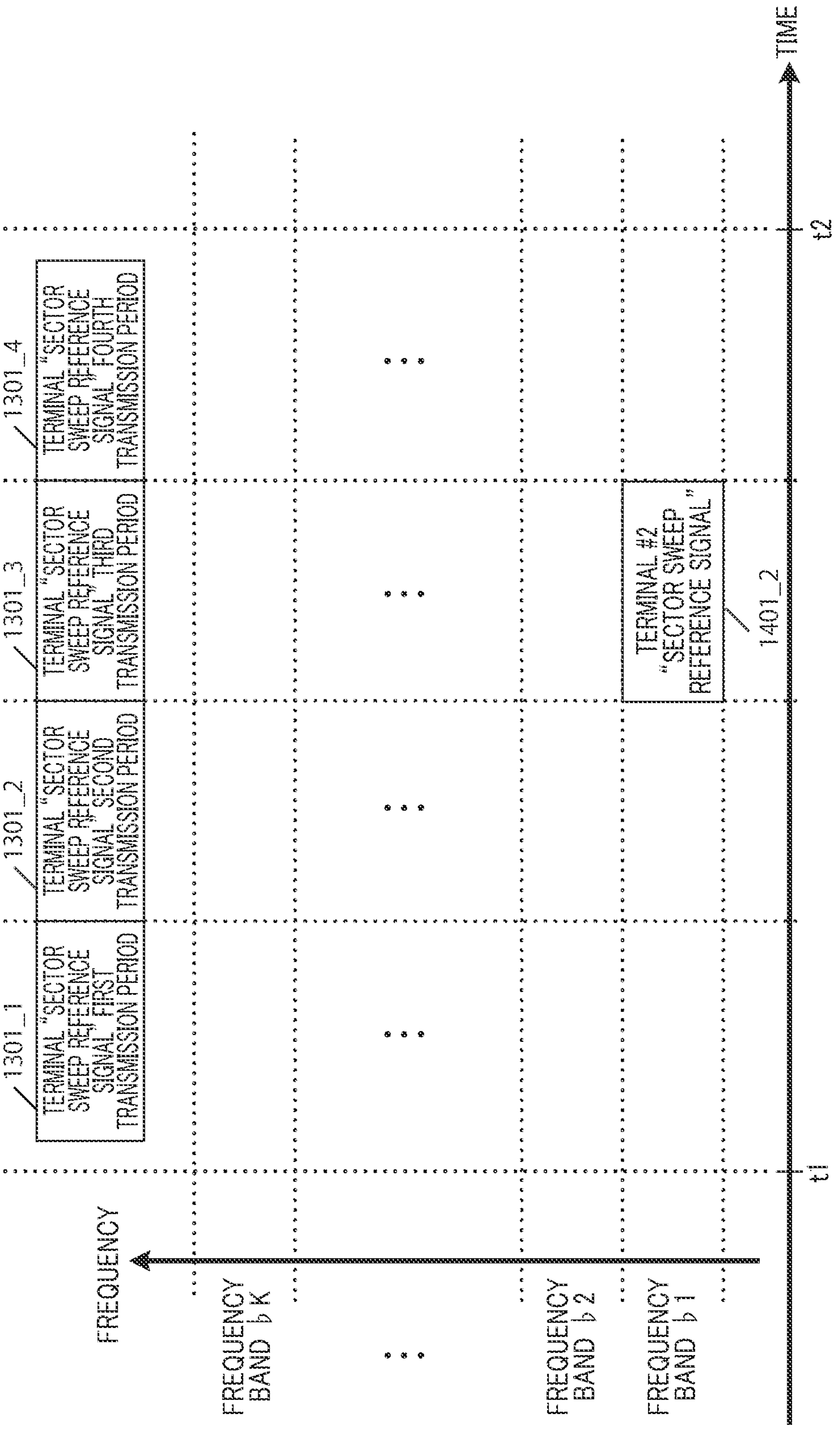
FIG. 21A illustrates exemplary occupation by terminals different from that in FIG. 14 in terminal "sector sweep reference signal" transmission periods illustrated in FIG. 13.
Figure 21B:
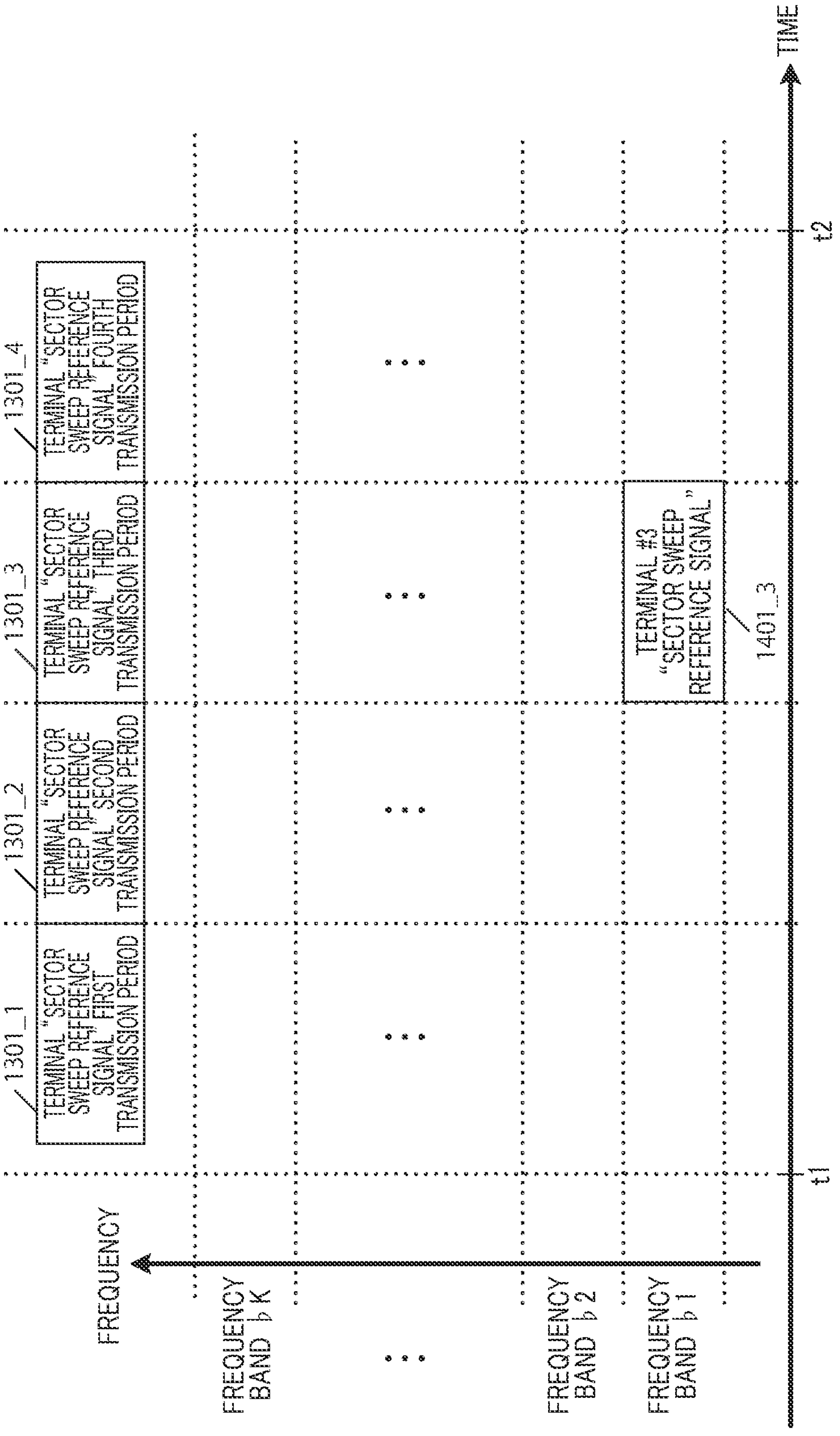
FIG. 21B illustrates exemplary occupation by terminals different from that in FIG. 14 in terminal "sector sweep reference signal" transmission periods illustrated in FIG. 13.

In FIGS. 21A and 21B, a description will be given of exemplary occupation by terminals different from that in FIG. 14 in “terminal “sector sweep reference signal” first transmission period 1301_1, terminal “sector sweep reference signal” second transmission period 1301_2, terminal “sector sweep reference signal” third transmission period 1301_3, and terminal “sector sweep reference signal” fourth transmission period 1301_4” illustrated in FIG. 13.

In FIGS. 21A and 21B, the components that operate in the same manner as in FIGS. 13 and 14 are denoted by the same reference signs, and the descriptions thereof will be omitted since they have already been described. In the following, the difference from the description in FIG. 14 will be described.

Terminal #2 labeled 902_2 in FIG. 9 receives sector sweep reference signal 1001 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #2 labeled 902_2, for example, estimates frequency band ♭1 as the “frequency (band)” with high reception quality and estimates “transmission panel antenna a2 and parameter b2” as the “transmission panel antenna and parameter”.

In addition, while estimating the “transmission panel antenna and parameter” with high reception quality, terminal #2 labeled 902_2 simultaneously obtains information of the “the number of time divisions in which sector sweep reference signals can be transmitted when the terminals transmit the sector sweep reference signals”. In the case of FIG. 21A, terminal #2 labeled 902_2 obtains information indicating that “the number of time divisions in which sector sweep reference signals can be transmitted when the terminals transmit the sector sweep reference signals” is four.

In this case, terminal #2 labeled 902_2 obtains, for example, any one of the values “0”, “1”, “2”, and “3” using a random number. For example, terminal #2 labeled 902_2 obtains “2” using a random number. In this case, since “2”+1=3, terminal #2 labeled 902_2 transmits terminal #2 “sector sweep reference signal” 1401_2 using frequency band ♭1 and “terminal “sector sweep reference signal” third transmission period 1301_3” as in FIG. 21A.

Note that terminal #2 “sector sweep reference signal” 1401_2 includes information of the “transmission panel antenna and parameter” with high reception quality obtained by terminal #2 labeled 902_2, that is, information of “transmission panel antenna a2 and parameter b2”.

Terminal #3 labeled 902_3 in FIG. 9 receives sector sweep reference signal 1001 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #3 labeled 902_3, for example, estimates frequency band ♭1 as the “frequency (band)” with high reception quality and estimates “transmission panel antenna a3 and parameter b3” as the “transmission panel antenna and parameter”.

In addition, while estimating the “transmission panel antenna and parameter” with high reception quality, terminal #3 labeled 902_3 simultaneously obtains information of the “the number of time divisions in which sector sweep reference signals can be transmitted when the terminals transmit the sector sweep reference signals”. In the case of FIG. 21B, terminal #3 labeled 902_3 obtains information indicating that “the number of time divisions in which sector sweep reference signals can be transmitted when the terminals transmit the sector sweep reference signals” is four.

In this case, terminal #3 labeled 902_3 obtains, for example, any one of the values “0”, “1”, “2”, and “3” using a random number. For example, terminal #3 labeled 902_3 obtains “2” using a random number. In this case, since “2”+1=3, terminal #3 labeled 902_3 transmits terminal #3 “sector sweep reference signal” 1401_3 using frequency band ♭1 and “terminal “sector sweep reference signal” third transmission period 1301_3” as in FIG. 21B.

Note that terminal #3 “sector sweep reference signal” 1401_3 includes information of the “transmission panel antenna and parameter” with high reception quality obtained by terminal #3 labeled 902_3, that is, information of “transmission panel antenna a3 and parameter b3”.

At this time, as illustrated in FIGS. 21A and 21B, the time period for “terminal #2 “sector sweep reference signal” 1401_2 transmitted by terminal #2 labeled 902_2” and the time period for “terminal #3 “sector sweep reference signal” 1401_3 transmitted by terminal #3 labeled 902_3” overlap each other.

Thus, base station #1 labeled 901_1 possibly simultaneously receives terminal #2 “sector sweep reference signal” 1401_2 and terminal #3 “sector sweep reference signal” 1401_3.

In this case, the following is two possible cases.

<Case 1>

Both “terminal #2 “sector sweep reference signal” 1401_2 transmitted by terminal #2 labeled 902_2” and “terminal #3 “sector sweep reference signal” 1401_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 1401_2 transmitted by terminal #2 labeled 902_2” by base station #1 labeled 901_1 are different from the ““transmission panel antenna and parameter for beamforming of terminal #3 labeled 902_3” with high reception quality in receiving terminal #3 “sector sweep reference signal” 1401_3 transmitted by terminal #3 labeled 902_3” by base station #1 labeled 901_1. Accordingly, base station #1 labeled 901_1 obtains information included in “terminal #2 “sector sweep reference signal” 1401_2 transmitted by terminal #2 labeled 902_2” and information included in “terminal #3 “sector sweep reference signal” 1401_3 transmitted by terminal #3 labeled 902_3”.

In this case, in FIG. 16A for example, “feedback signal second transmission period 1601_12 for frequency ♭1 is for a signal addressed to terminal #2 labeled 902_2” and “feedback signal third transmission period 1601_13 for frequency ♭1 is for a signal addressed to terminal #3 labeled 902_3”.

In addition, in FIG. 17A for example, “modulation signal (slot) second transmission period 1701_12 for frequency ♭1 is for a signal addressed to terminal #2 labeled 902_2” and “modulation signal (slot) third transmission period 1701_13 for frequency ♭1 is for a signal addressed to terminal #3 labeled 902_3”.

In this manner, base station #1 labeled 901_1 can communicate with terminal #2 labeled 902_2 and terminal #3 labeled 902_3.

<Case 2>

Both “terminal #2 “sector sweep reference signal” 1401_2 transmitted by terminal #2 labeled 902_2” and “terminal #3 “sector sweep reference signal” 1401_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 1401_2 transmitted by terminal #2 labeled 902_2” by base station #1 labeled 901_1 interfere with the ““transmission panel antenna and parameter for beamforming of terminal #3 labeled 902_3” with high reception quality in receiving terminal #3 “sector sweep reference signal” 1401_3 transmitted by terminal #3 labeled 902_3” by base station #1 labeled 901_1.

<Case 2-1>

In some cases, base station #1 labeled 901_1 obtains either information included in “terminal #2 “sector sweep reference signal” 1401_2 transmitted by terminal #2 labeled 902_2” or information included in “terminal #3 “sector sweep reference signal” 1401_3 transmitted by terminal #3 labeled 902_3”.

For example, base station #1 labeled 901_1 obtains the information included in “terminal #2 “sector sweep reference signal” 1401_2 transmitted by terminal #2 labeled 902_2”.

In this case, in FIG. 16A for example, “feedback signal second transmission period 1601_12 for frequency ♭1 is for a signal addressed to terminal #2 labeled 902_2”.

In addition, in FIG. 17A for example, “modulation signal (slot) second transmission period 1701_12 for frequency ♭1 is for a signal addressed to terminal #2 labeled 902_2”.

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIGS. 21A and 21B. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭1 as the "frequency (band)" with high reception quality and estimates "transmission panel antenna a3 and parameter b3" as the "transmission panel antenna and parameter".

In addition, while performing such estimation, terminal #3 labeled 902_3 simultaneously obtains information of the "the number of time divisions in which sector sweep reference signals can be transmitted when the terminals transmit the sector sweep reference signals". Terminal #3 labeled 902_3 obtains information indicating that "the number of time divisions in which sector sweep reference signals can be transmitted when the terminals transmit the sector sweep reference signals" is four.

In this case, terminal #3 labeled 902_3 obtains, for example, any one of the values "0", "1", "2", and "3" using a random number. For example, terminal #3 labeled 902_3 obtains "3" by generating a random number using seeds different from the previous. In this case, since "3"+1=4, terminal #3 labeled 902_3 transmits terminal #3 "sector sweep reference signal" 1401_3 using frequency band ♭1 and terminal "sector sweep reference signal" fourth transmission period 1301_4 as in FIG. 22A.

Note that terminal #3 "sector sweep reference signal" 1401_3 includes information of the "transmission panel antenna and parameter" with high reception quality obtained by terminal #3 labeled 902_3, that is, information of "transmission panel antenna a3 and parameter b3".

Figure 22A:
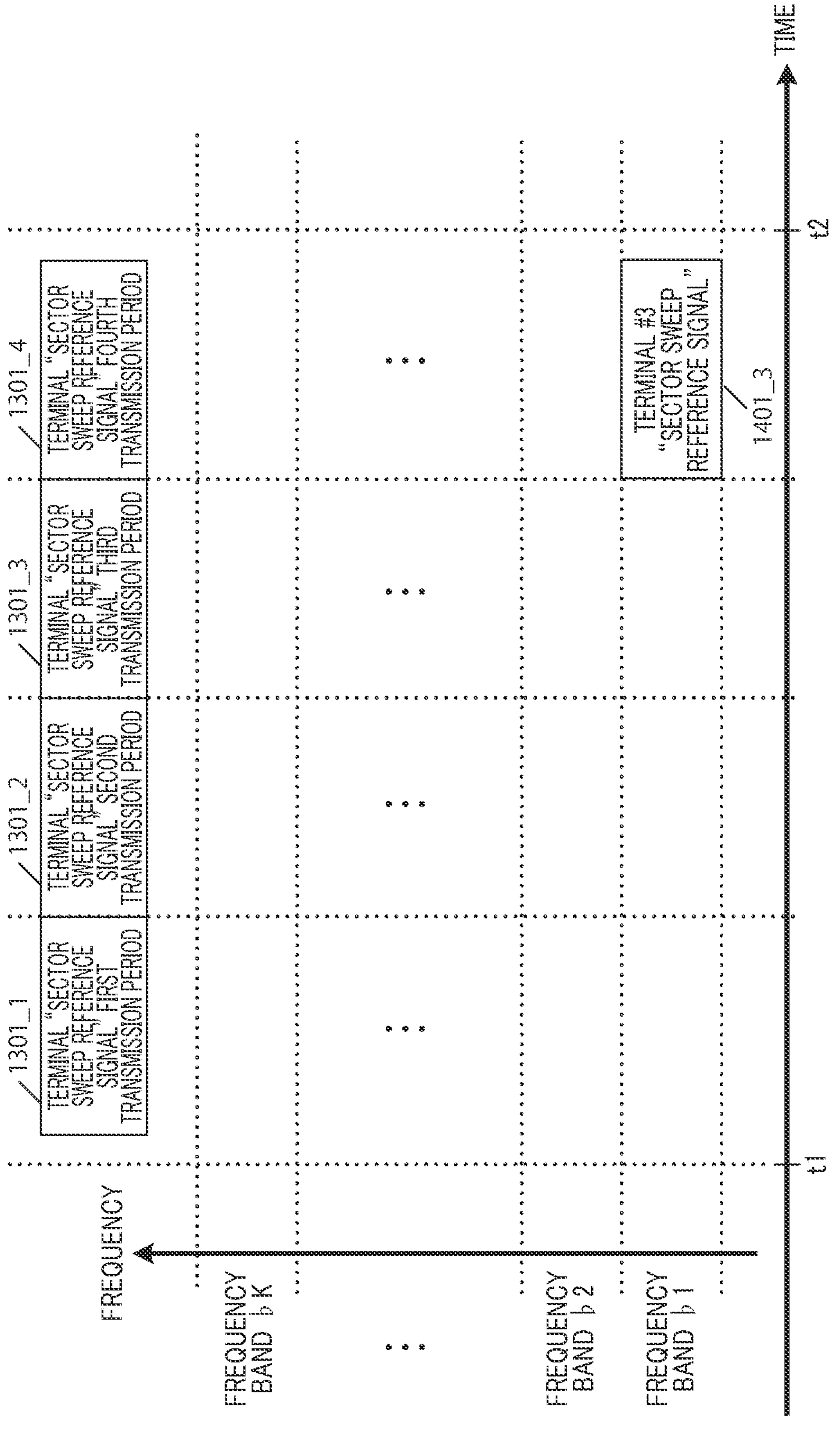
FIG. 22A illustrates an exemplary terminal #3 "sector sweep reference signal"

In this case, as illustrated in FIG. 22A, base station #1 labeled 901_1 receives "terminal #3 "sector sweep reference signal" 1401_3 transmitted by terminal #3 labeled 902_3". Then, the predetermined procedure described above is performed, and base station #1 labeled 901_1 and terminal #3 labeled 902_3 communicate with each other.

As another example, terminal #3 labeled 902_3 estimates frequency band ♭K as the "frequency (band)" with high reception quality and estimates "transmission panel antenna a3 and parameter b3" as the "transmission panel antenna and parameter", for example.

Figure 22B:
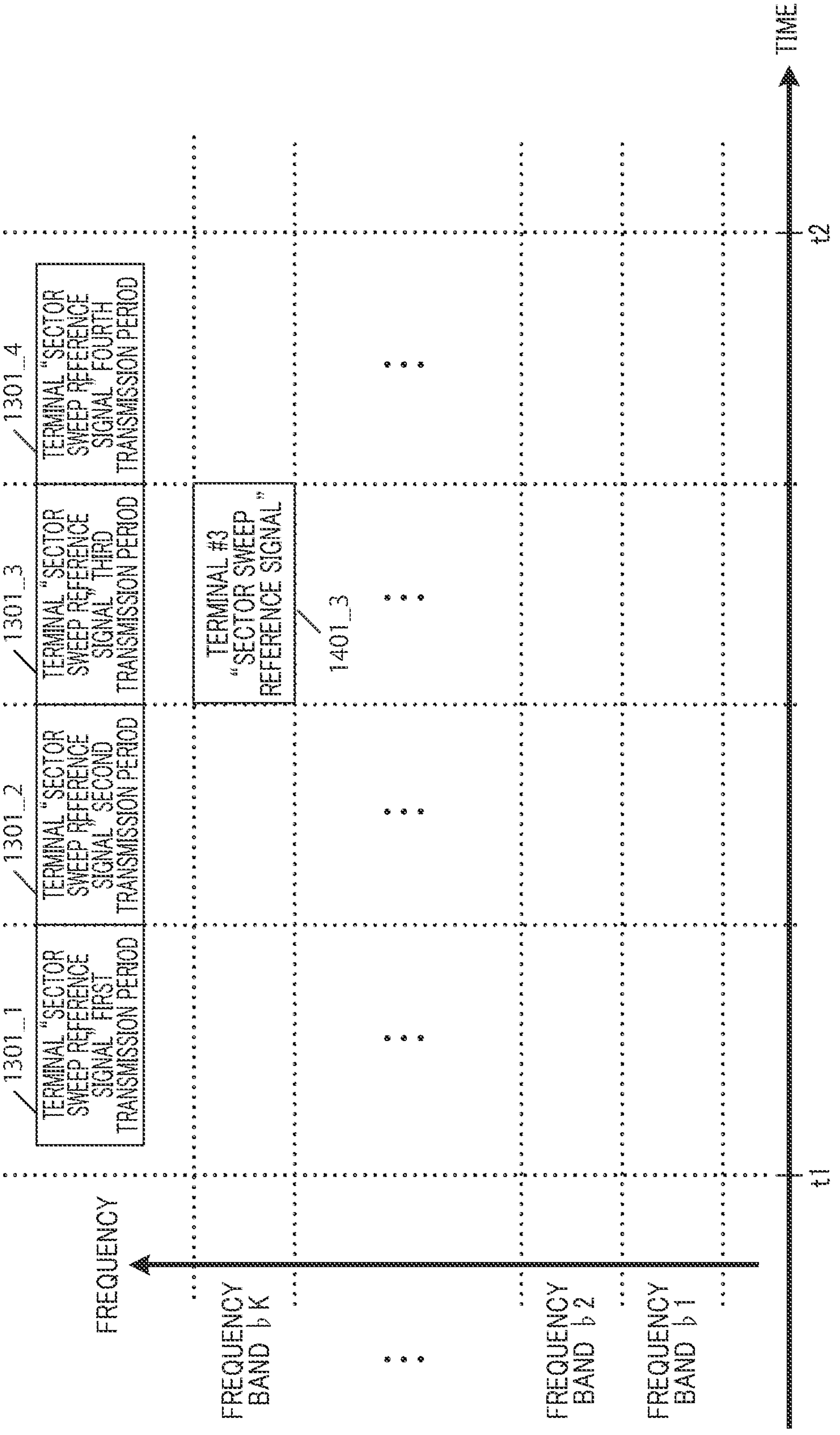
FIG. 22B illustrates another exemplary terminal #3 "sector sweep reference signal"

In this case, as in FIG. 22B, base station #1 labeled 901_1 receives "terminal #3 "sector sweep reference signal" 1401_3 transmitted by terminal #3 labeled 902_3". Then, the predetermined procedure described above is performed, and base station #1 labeled 901_1 and terminal #3 labeled 902_3 communicate with each other. This is possible because "terminal #3 "sector sweep reference signal" 1401_3 can avoid interference with terminal #2 "sector sweep reference signal" 1401_2 transmitted by terminal #2 labeled 902_2 in FIG. 21A".

<Case 2-2>

In some cases, base station #1 labeled 901_1 obtains neither information included in "terminal #2 "sector sweep reference signal" 1401_2 transmitted by terminal #2 labeled 902_2" nor information included in "terminal #3 "sector sweep reference signal" 1401_3 transmitted by terminal #3 labeled 902_3".

It is assumed that sector sweep reference signal 1851_1 in FIG. 18 has the states in FIGS. 21A and 21B, and base station #1 labeled 901_1 obtains neither information included in "terminal #2 "sector sweep reference signal" 1401_2 transmitted by terminal #2 labeled 902_2" nor information included in "terminal #3 "sector sweep reference signal" 1401_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

In addition, while performing such estimation, terminal #2 labeled 902_2 simultaneously obtains information of the "the number of time divisions in which sector sweep reference signals can be transmitted when the terminals transmit the sector sweep reference signals". Terminal #2 labeled 902_2 obtains information indicating that "the number of time divisions in which sector sweep reference signals can be transmitted when the terminals transmit the sector sweep reference signals" is four.

In this case, terminal #2 labeled 902_2 obtains, for example, any one of the values "0", "1", "2", and "3" using a random number. For example, terminal #2 labeled 902_2 obtains "2" by generating a random number using seeds different from the previous. In this case, since "2"+1=3, terminal #2 labeled 902_2 transmits terminal #2 "sector sweep reference signal" 1401_2 using frequency band ♭1 and "terminal "sector sweep reference signal" third transmission period 1301_3" as in FIG. 21A.

Note that terminal #2 "sector sweep reference signal" 1401_2 includes information of the "transmission panel antenna and parameter" with high reception quality obtained by terminal #2 labeled 902_2, that is, information of "transmission panel antenna a2 and parameter b3".

In this case, as illustrated in FIG. 21A, base station #1 labeled 901_1 receives "terminal #2 "sector sweep reference signal" 1401_2 transmitted by terminal #2 labeled 902_2". Then, the predetermined procedure described above is performed, and base station #1 labeled 901_1 and terminal #2 labeled 902_2 communicate with each other.

Likewise, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭1 as the "frequency (band)" with high reception quality and estimates “transmission panel antenna a3 and parameter b3” as the “transmission panel antenna and parameter”.

In addition, while performing such estimation, terminal #3 labeled 902_3 simultaneously obtains information of the “the number of time divisions in which sector sweep reference signals can be transmitted when the terminals transmit the sector sweep reference signals”. Terminal #3 labeled 902_3 obtains information indicating that “the number of time divisions in which sector sweep reference signals can be transmitted when the terminals transmit the sector sweep reference signals” is four.

In this case, terminal #3 labeled 902_3 obtains, for example, any one of the values “0”, “1”. “2”, and “3” using a random number. For example, terminal #3 labeled 902_3 obtains “3” by generating a random number using seeds different from the previous. In this case, since “3”+1=4, terminal #3 labeled 902_3 transmits terminal #3 “sector sweep reference signal” 1401_3 using frequency band ♭1 and terminal “sector sweep reference signal” fourth transmission period 1301_4 as in FIG. 22A.

Note that terminal #3 “sector sweep reference signal” 1401_3 includes information of the “transmission panel antenna and parameter” with high reception quality obtained by terminal #3 labeled 902_3, that is, information of “transmission panel antenna a3 and parameter b3”.

In this case, as illustrated in FIG. 22A, base station #1 labeled 901_1 receives “terminal #3 “sector sweep reference signal” 1401_3 transmitted by terminal #3 labeled 902_3”. Then, the predetermined procedure described above is performed, and base station #1 labeled 901_1 and terminal #3 labeled 902_3 communicate with each other.

As another example, terminal #3 labeled 902_3 estimates frequency band ♭K as the “frequency (band)” with high reception quality and estimates “transmission panel antenna a3 and parameter b3” as the “transmission panel antenna and parameter”, for example.

In this case, as in FIG. 22B, base station #1 labeled 901_1 receives “terminal #3 “sector sweep reference signal” 1401_3 transmitted by terminal #3 labeled 902_3”. Then, the predetermined procedure described above is performed, and base station #1 labeled 901_1 and terminal #3 labeled 902_3 communicate with each other. This is possible because “terminal #3 “sector sweep reference signal” 1401_3 can avoid interference with terminal #2 “sector sweep reference signal” 1401_2 transmitted by terminal #2 labeled 902_2 in FIG. 21A”.

In the manner described above, a collision of the sector sweep reference signals transmitted by the respective terminals can be further reduced. This produces an effect that the base station can receive more sector sweep reference signals and can communicate with more terminals.

As described above in Embodiment 1, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 11, 12, 13, 14, 15A, 15B, 16A, 16B, 17A, 17B, 18, 19, 20A, 20B, 20C, 20D, 20E, 20F, 21A, 21B, 22A, and 22B, but the names thereof are not limited to those in the drawings and the important part is the functions of the signals to be transmitted.

Embodiment 2

In Embodiment 2, a description will be given of an example where a terminal performs transmission in a single-carrier scheme as a variation of Embodiment 1. Note that the drawings used in Embodiment 1 are sometimes used in the following description of Embodiment 2.

FIGS. 1A, 1B, and 1C illustrate exemplary configurations of, for example, a base station, an access point, a terminal, and a repeater according to Embodiment 2, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in the present embodiment. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a single-carrier scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band ♭i, sector sweep reference signal **1101_*i*1 in transmission panel antenna 1 for frequency ♭i is present in the first time period, sector sweep reference signal 1101_*i*2 in transmission panel antenna 2 for frequency bi is present in the second time period, . . . , sector sweep reference signal 1101**_iM in transmission panel antenna M for frequency ♭i is present in the M-th time period. Note that i is an integer from 1 to K (both inclusive).

Note that sector sweep reference signal **1101_*ij* in transmission panel antenna j for frequency ♭i is transmitted from transmission panel antenna j labeled 106_*j* of base station #1 labeled 901_1 with the configuration in FIG. 1A, 1B, or 1**C. In this case, j is an integer from 1 to M (both inclusive).

One feature is that "sector sweep reference signals are transmitted from the same transmission panel antenna in the i-th time period regardless of the frequency band in FIG. 11". At this time, the same beamforming parameter is used in a first period of time regardless of the frequency band. Note that the beamforming will be described later.

FIG. 12 illustrates an exemplary configuration of "sector sweep reference signal **1101_*pi* in transmission panel antenna i for frequency ♭p" in FIG. 11. Note that the horizontal axis represents time in FIG. 12**. Note that p is an integer from 1 to K (both inclusive) and i is an integer from 1 to M (both inclusive).

A description will be omitted regarding a specific example of a transmission method for "sector sweep reference signal **1101_*pi* in transmission panel antenna i for frequency ♭p" that is composed as in FIGS. 11 and 12 and transmitted by base station #1 labeled 901_1 with the configuration in FIG. 1A, 1B, or 1**C, since it has already been described.

As illustrated in FIGS. 11 and 12, when base station #1 labeled 901_1 transmits "sector sweep reference signal **1101_*i* in transmission panel antenna i for frequency ♭p", "reference signal 1201_*j*** according to j-th parameter in transmission panel antenna i for frequency ♭p" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal 1201_1 according to j-th parameter in transmission panel antenna i for frequency ♭p";

- Information on the frequency band and/or frequency ♭p (information of the number of frequency divisions may also be included), which will be described later.

Transmission of the "identification number (ID) of the transmission panel antenna for frequency ♭p" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of time divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency ♭p" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 2, the description is based on a case where the terminals transmit signals using a single-carrier scheme and frequency (bands) used by the base station and frequency (bands) used by the terminals partially overlap each other.

Figure 23:
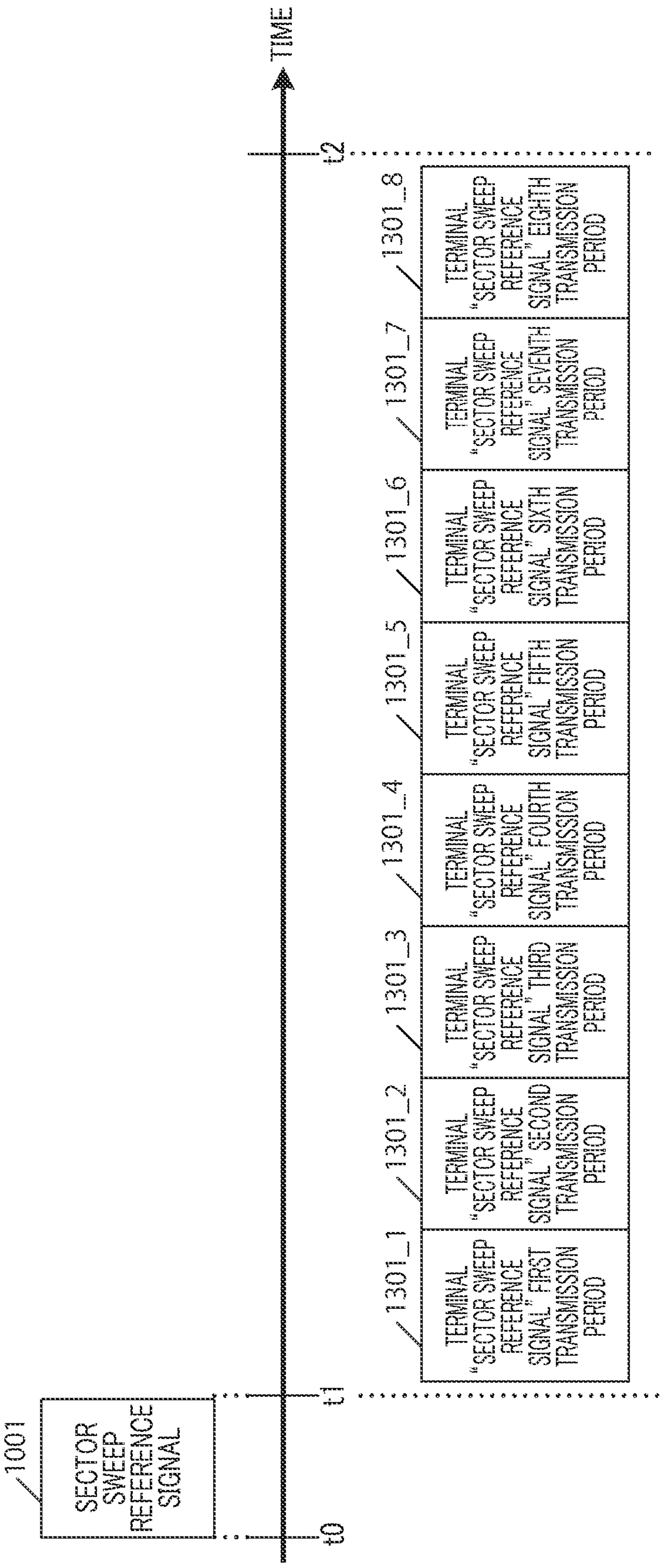
FIG. 23 illustrates an exemplary operation in the time period from time t1 to t2, which is the terminal response period.

FIG. 23 illustrates an exemplary operation in the time period from time t1 to t2, which is the terminal response period. Note that the horizontal axis represents time in FIG. 23. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 23, the components that operate in the same manner as in FIGS. 10 and 13 are denoted by the same reference signs.

As illustrated in FIGS. 10 and 23, for example, base station #1 labeled 901_1 transmits sector sweep reference signals in the time period from time t0 to t1. After that, the terminal response period, which is the time period from time t1 to t2, includes terminal "sector sweep reference signal" first transmission period 1301_1, terminal "sector sweep reference signal" second transmission period 1301_2, terminal "sector sweep reference signal" third transmission period 1301_3, terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8, as illustrated in FIG. 13.

Thus, in the case of FIG. 23, "the number of time divisions in which sector sweep reference signals can be transmitted when the terminals transmit the sector sweep reference signals" is set to eight by base station #1 labeled 901_1.

Figure 24:
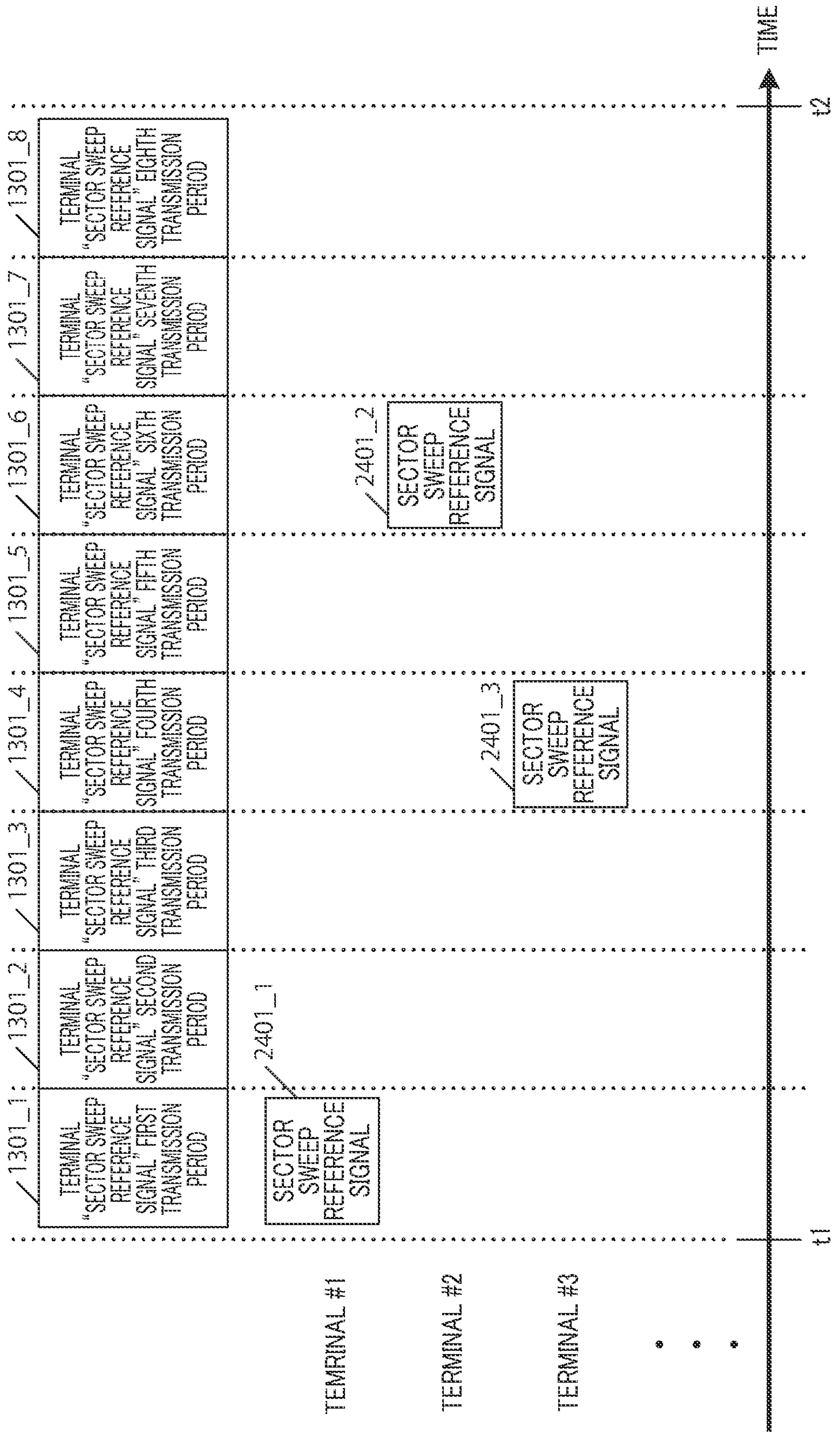
FIG. 24 illustrates exemplary occupation by terminals in terminal "sector sweep reference signal" transmission periods illustrated in FIG. 23.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23. Note that the horizontal axis represents time in FIG. 24.

Terminal #1 labeled 902_1 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #1 labeled 902_1 estimates, for example, "transmission panel antenna a1 and parameter b1" as the "transmission panel antenna and parameter" with high reception quality. Terminal #1 labeled 902_1 also estimates frequency band ♭K as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal #1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 2401_1 includes information of the "transmission panel antenna and parameter" with high reception quality obtained by terminal #1 labeled 902_1, that is, information of "transmission panel antenna a1 and parameter b1". Terminal #1 "sector sweep reference signal" 2401_1 also includes information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 24, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth (="5"+1) transmission period 1301_6" in FIG. 24.

Note that terminal #2 "sector sweep reference signal" 1401_2 includes information of the "transmission panel antenna and parameter" with high reception quality obtained by terminal #2 labeled 902_2, that is, information of "transmission panel antenna a2 and parameter b2". Terminal #2 "sector sweep reference signal" 2401_2 also includes information of the "frequency domain", for example, information of "frequency band ♭1". This will be described later.

Thus, terminal #i labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001** may be used for this estimation.

Terminal #i labeled **902_*i* estimates, for example, "transmission panel antenna ai and parameter bi" as the "transmission panel antenna and parameter" with high reception quality. Terminal #i labeled 902_*i*** also estimates frequency band ♭zi as the "frequency domain" with high reception quality.

In addition, while estimating the "transmission panel antenna and parameter" with high reception quality, terminal #i labeled 902_*i* simultaneously obtains information of "the number of time divisions in which sector sweep reference signals can be transmitted when the terminals transmit the sector sweep reference signals". In the case of FIG. 24, terminal #i labeled 902_*i* obtains information indicating that "the number of time divisions in which sector sweep reference signals can be transmitted when the terminals transmit the sector sweep reference signals" is eight.

In this case, terminal #i labeled 902_*i* obtains, for example, any one of the values "0", "1", "2", "3", "4", "5", "6", and "7" using a random number. For example, terminal #i labeled 902_*i* obtains "yi" using a random number. Note that yi is any one of the values "0", "1", "2", "3", "4", "5", "6", and "7". In this case, terminal #i labeled 902_*i* transmits terminal #i "sector sweep reference signal" 2401_*i* using terminal "sector sweep reference signal" ("yi"+1)-th transmission period 1301_("yi"+1) in FIG. 24.

Note that terminal #i "sector sweep reference signal" 2401_*i* includes information of the "transmission panel antenna and parameter" with high reception quality obtained by terminal #1 labeled 902_*i*, that is, information of "transmission panel antenna ai and parameter bi". Terminal #i "sector sweep reference signal" 2401_*i* also includes information of the "frequency domain", for example, information of "frequency band ♭p". This will be described later.

Note that, in FIG. 24, it may be considered that terminal #i "sector sweep reference signals" 2401_*i* use a first frequency (band) regardless of i as a first method. In this case, terminal #i "sector sweep reference signals" 2401_*i* are subjected to time division (time division multiple access (TDMA)). This is because the terminals transmit modulation signals using a single-carrier scheme.

As a second method, terminal #i "sector sweep reference signals" 2401_*i* do not necessarily use the same frequency (band).

Both the first and second methods produce an effect of "reducing interference between terminal #i "sector sweep reference signals" 2401_*i*".

For example, in a case where base station #1 labeled 901_1 transmits modulation signals using "frequency band ♭1 to frequency band ♭K" as described in Embodiment 1, a method can be considered in which terminal #i labeled 902_*i* transmits a modulation signal in a single-carrier scheme using "frequency band ♭1 to frequency band ♭K".

As another method, in a case where base station #1 labeled 901_1 transmits modulation signals using "frequency band ♭1 to frequency band ♭K" as described in Embodiment 1, a method can be considered in which terminal #i labeled 902_*i* transmits a modulation signal in a single-carrier scheme using some of "frequency band ♭1 to frequency band ♭K".

Further, a method can be considered in which base station #1 labeled 901_1 transmits modulation signals using "frequency band ♭1 to frequency band ♭K" as described in Embodiment 1 and terminal #i labeled 902_*i* transmits a modulation signal using a frequency (band) other than "frequency band ♭1 to frequency band ♭K".

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Note that the difference from Embodiment 1 is that terminal #1 labeled 902_*i* transmits a modulation signal in a single-carrier scheme, and the specific configuration has already been described in Embodiment 1.

Terminal #i labeled 902_*i* transmits terminal #i "sector sweep reference signal" 2401_*i* as illustrated in FIG. 24. FIG. 15A illustrates an exemplary configuration of terminal #i "sector sweep reference signal" 2401_*i*. Note that the horizontal axis represents time in FIG. 15A. "Terminal #i "sector sweep reference signal" 1401_*i*" in FIG. 15A corresponds to an exemplary "sector sweep reference signal" 2401_*i* in FIG. 24.

As illustrated in FIG. 15A, terminal #i "sector sweep reference signal" 2401_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled **902_*i* based on the "information of the "transmission panel antenna and parameter" of base station #1 labeled 901_1 with high reception quality", and terminal #i labeled 902_*i*** can receive the modulation signal with high reception quality.

In a case where a plurality of terminals transmit the sector sweep reference signals as in FIG. 24, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 24, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled **902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1** can perform appropriate control. This produces an effect of enhancing data reception quality.

Further, as illustrated in FIGS. 24, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

- "Information on the frequency band and/or frequency ♭p" that has been used for transmission by terminal #i labeled **902_*i* or that terminal #i labeled 902_*i* desires base station #1 labeled 901_1** to use.

Transmission of the "information on the frequency band and/or frequency ♭p" by terminal #i labeled **902_*i* allows base station #1 labeled 901_1 to recognize the "information on the frequency band and/or frequency ♭p"; accordingly, terminal #i labeled 902_*i* and base station #1 labeled 901_1** can perform appropriate control. This produces an effect of enhancing data reception quality.

FIG. 16A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 16A. In this example, there are a first transmission period, a second transmission period, a third transmission period, and a fourth transmission period for feedback signal 1002 as illustrated in FIG. 16A. Note that Ω transmission periods may be configured to be present for feedback signal 1002, where Ω is an integer equal to or greater than 1 or an integer equal to or greater than 2.

In addition, there are frequency band ♭1, frequency band ♭2, . . . , frequency band ♭K for feedback signal 1002 in FIG. 16A.

Thus, the first transmission period includes feedback signal first transmission period 1601_11 for frequency ♭1, feedback signal first transmission period 1601_21 for frequency ♭2, . . . , feedback signal first transmission period 1601_K1 for frequency ♭K. Likewise, the second transmission period includes feedback signal second transmission period 1601_12 for frequency ♭1, feedback signal second transmission period 1601_22 for frequency ♭2, . . . , feedback signal second transmission period 1601_K2 for frequency ♭K. The third transmission period includes feedback signal third transmission period 1601_13 for frequency ♭1, feedback signal third transmission period 1601_23 for frequency ♭2, . . . , feedback signal third transmission period 1601_K3 for frequency ♭K. The fourth transmission period includes feedback signal fourth transmission period 1601_14 for frequency ♭1, feedback signal fourth transmission period 1601_24 for frequency ♭2, . . . , feedback signal fourth transmission period 1601_K4 for frequency ♭K.

One feature is that "feedback signals are transmitted from the same transmission panel antenna in the i-th time period regardless of the frequency band in FIG. 16A".

FIG. 16B illustrates exemplary specific feedback signal assignment for feedback signal 1002 illustrated in FIG. 16A.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, terminal #3 labeled 902_3 transmits terminal #3 "sector sweep reference signal" 2401_3, and other terminals also transmit sector sweep reference signals.

Additionally, terminal #1 "sector sweep reference signal" 2401_1 includes information indicating that "frequency band ♭K has high reception quality". Thus, base station #1 labeled 901_1 transmits terminal #1-addressed feedback signal 1611_1 using frequency band ♭K as in FIG. 16B.

Terminal #2 "sector sweep reference signal" 2401_2 includes information indicating that "frequency band ♭1 has high reception quality". Thus, base station #1 labeled 901_1 transmits terminal #2-addressed feedback signal 1611_2 using frequency band ♭1 as in FIG. 16B.

Terminal #3 "sector sweep reference signal" 2401_3 includes information indicating that "frequency band ♭1 and frequency band ♭2 have high reception quality". Thus, base station #1 labeled 901_1 transmits terminal #3-addressed feedback signal 1611_3 using frequency bands ♭1 and ♭2 as in FIG. 16B.

Terminal #4 "sector sweep reference signal" (not illustrated in FIG. 24) includes information indicating that "frequency band ♭2 has high reception quality". Thus, base station #1 labeled 901_1 transmits terminal #4-addressed feedback signal 1611_4 using frequency band ♭2 as in FIG. 16B.

Terminal #5 "sector sweep reference signal" (not illustrated in FIG. 24) includes information indicating that "frequency band ♭2 has high reception quality". Thus, base station #1 labeled 901_1 transmits terminal #5-addressed feedback signal 1611_5 using frequency band ♭2 as in FIG. 16B.

Terminal #6 "sector sweep reference signal" (not illustrated in FIG. 24) includes information indicating that "frequency band ♭K has high reception quality". Thus, base station #1 labeled 901_1 transmits terminal #6-addressed feedback signal 1611_6 using frequency band ♭K as in FIG. 16B.

In this manner, obtaining terminal #i-addressed feedback signal 1611_*i* allows terminal #i labeled 902_*i* to know that communication with base station #1 labeled 901_1 is available and to know the frequency band to be used. Note that FIG. 16B is merely an example. In a case where there is no terminal #1-addressed feedback signal 1611_1 as feedback signal 1002, for example, terminal #1 labeled 902_1 recognizes that the communication with base station #1 labeled 901_1 has not been established.

At this time, terminal #i-addressed feedback signal 1611_*i* includes, for example, information indicating that communication with terminal #1 labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #1 labeled 902_*i*, and base station #1 labeled 901_1 then transmits terminal #i-addressed feedback signal 1611_*i*.

FIG. 17A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 17A. In this example, there are a first transmission period, a second transmission period, a third transmission period, and a fourth transmission period for data-symbol-included frame 1003 as illustrated in FIG. 17A. Note that Ω transmission periods may be configured to be present for data-symbol-included frame 1003, where Ω is an integer equal to or greater than 1 or an integer equal to or greater than 2.

In addition, there are frequency band ♭1, frequency band ♭2, . . . , frequency band ♭K for data-symbol-included frame 1003 in FIG. 17A.

Thus, the first transmission period includes modulation signal (slot) first transmission period 1701_11 for frequency ♭1, modulation signal (slot) first transmission period 1701_21 for frequency ♭2, . . . , modulation signal (slot) first transmission period 1701_K1 for frequency ♭K. Likewise, the second transmission period includes modulation signal (slot) second transmission period 1701_12 for frequency ♭1, modulation signal (slot) second transmission period 1701_22 for frequency ♭2, . . . , modulation signal (slot) second transmission period 1701_K2 for frequency ♭K. The third transmission period includes modulation signal (slot) third transmission period 1701_13 for frequency ♭1, modulation signal (slot) third transmission period 1701_23 for frequency ♭2, . . . , modulation signal (slot) third transmission period 1701_K3 for frequency ♭K. The fourth transmission period includes modulation signal (slot) fourth transmission period 1701_14 for frequency ♭1, modulation signal (slot) fourth transmission period 1701_24 for frequency ♭2, . . . , modulation signal (slot) fourth transmission period 1701_K4 for frequency ♭K.

FIG. 17B illustrates exemplary specific modulation signal (slot) assignment for data-symbol-included frame 1003 illustrated in FIG. 17A.

As in the example of FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, terminal #3 labeled 902_3 transmits terminal #3 "sector sweep reference signal" 2401_3, terminal #4 labeled 902_4 transmits terminal #4 "sector sweep reference signal" (not illustrated in FIG. 24), terminal #5 labeled 902_5 transmits terminal #5 "sector sweep reference signal" (not illustrated in FIG. 24), and terminal #6 labeled 902_6 transmits terminal #6 "sector sweep reference signal" (not illustrated in FIG. 24).

Additionally, terminal #1 "sector sweep reference signal" 2401_1 includes information indicating that "frequency band ♭K has high reception quality". Thus, base station #1 labeled 901_1 transmits terminal #1-addressed modulation signal (slot) 1711 using frequency band ♭K as in FIG. 17B.

Terminal #2 "sector sweep reference signal" 2401_2 includes information indicating that "frequency band ♭1 has high reception quality". Thus, base station #1 labeled 901_1 transmits terminal #2-addressed modulation signal (slot) 1712 using frequency band ♭1 as in FIG. 17B.

Terminal #3 "sector sweep reference signal" 2401_3 includes information indicating that "frequency band ♭1 and frequency band ♭2 have high reception quality". Thus, base station #1 labeled 901_1 transmits terminal #3-addressed modulation signal (slot) 1713 using frequency bands ♭1 and ♭2 as in FIG. 17B.

Terminal #4 "sector sweep reference signal" (not illustrated in FIG. 24) includes information indicating that "frequency band ♭2 has high reception quality". Thus, base station #1 labeled 901_1 transmits terminal #4-addressed modulation signal (slot) 1714 using frequency band ♭2 as in FIG. 17B.

Terminal #5 "sector sweep reference signal" (not illustrated in FIG. 24) includes information indicating that "frequency band ♭2 has high reception quality". Thus, base station #1 labeled 901_1 transmits terminal #5-addressed modulation signal (slot) 1715 using frequency band ♭2 as in FIG. 17B.

Terminal #6 "sector sweep reference signal" (not illustrated in FIG. 24) includes information indicating that "frequency band ♭K has high reception quality". Thus, base station #1 labeled 901_1 transmits terminal #6-addressed modulation signal (slot) 1716 using frequency band ♭K as in FIG. 17B.

At this time, terminal #1-addressed modulation signal (slot) 171_i_ includes, for example, a data symbol (data and/or information) addressed to terminal #1 labeled 902_*i*.

In this manner, terminal #i-addressed modulation signal (slot) 171_i_ allows terminal #i labeled 902_1 to know that communication with base station #1 labeled 901_1 is available and to know the frequency band to be used. Note that FIG. 17B is merely an example. In a case where there is no terminal #1-addressed modulation signal (slot) 1711 as data-symbol-included frame 1003, for example, terminal #1 labeled 902_1 recognizes that the communication with base station #1 labeled 901_1 has not been established.

Base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #1-addressed modulation signal (slot) 171_i_.

Note that, in FIGS. 16A and 16B, base station #1 labeled 901_1 may estimate the "frequency (band)" and the "transmission panel antenna and parameter" of terminal #i labeled 902_1 with high reception quality in receiving "terminal #i "sector sweep reference signal" 2401_*i* transmitted by terminal #i labeled 902_*i*", and the estimated information may be included in terminal #i-addressed feedback signal 1611_*i*.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #1 labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) 171*i* in FIG. 17B may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 23, 24, 15A, 15B, etc., and the description thereof will be thus omitted.

Base station #1 labeled 901_1 transmits feedback signal 1802_1. Note that this has already been described with reference to FIGS. 16A and 16B, and the description thereof will be thus omitted.

After that, base station #1 labeled 901_1 transmits "data-symbol-included frame 1803_1". Note that this has already been described with reference to FIGS. 17A and 17B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIG. 25. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 17A and 17B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIG. 25.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 17A and 17B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIG. 25.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 23, 24, 15A, 15B, etc., and the description thereof will be thus omitted.

Base station #1 labeled 901_1 transmits feedback signal 1802_2. Note that this has already been described with reference to FIGS. 16A and 16B, and the description thereof will be thus omitted.

After that, base station #1 labeled 901_1 transmits "data-symbol-included frame 1803_4". Note that this has already been described with reference to FIGS. 17A and 17B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIG. 25.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIG. 25. Note that i is an integer equal to or greater than 1, for example, and the horizontal axis represents time in FIG. 25.

Figure 25:
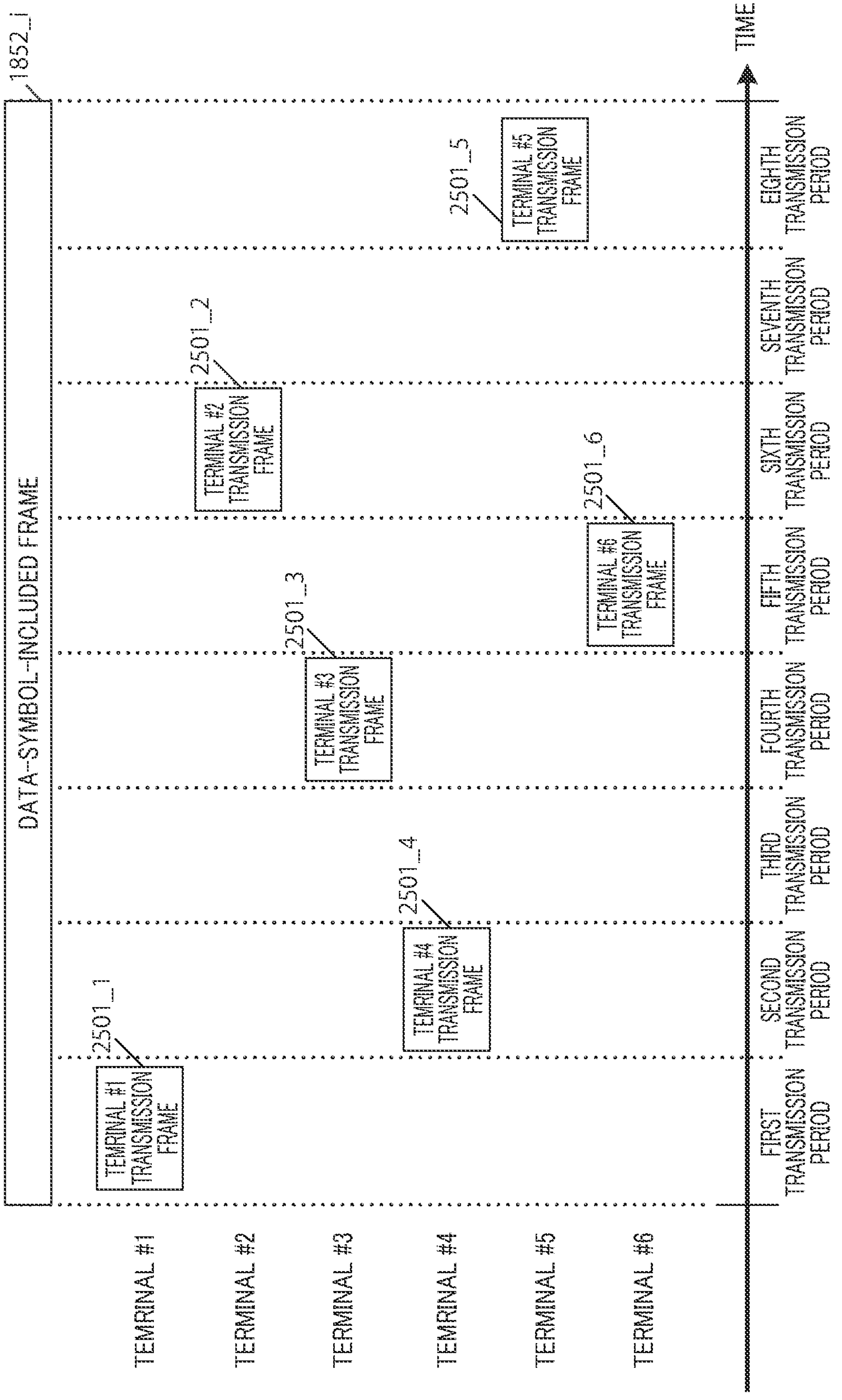
FIG. 25 illustrates an exemplary configuration of a "data-symbol-included frame" transmitted by terminals such as terminal #1 to terminal #6.

As illustrated in FIG. 25, "data-symbol-included frame 1852_*i*" is composed of a first transmission period, a second transmission period, a third transmission period, a fourth transmission period, a fifth transmission period, a sixth transmission period, a seventh transmission period, and an eighth transmission period.

As illustrated in FIG. 25, for example, terminal #1 labeled 902_1 transmits terminal #1 transmission frame (including a data symbol) 2501_1 using the first transmission period.

Terminal #2 labeled 902_2 transmits terminal #2 transmission frame (including a data symbol) 2501_2 using the sixth transmission period.

Terminal #3 labeled 902_3 transmits terminal #3 transmission frame (including a data symbol) 2501_3 using the fourth transmission period.

Terminal #4 labeled 902_4 transmits terminal #4 transmission frame (including a data symbol) 2501_4 using the second transmission period.

Terminal #5 labeled 902_5 transmits terminal #5 transmission frame (including a data symbol) 2501_5 using the eighth transmission period.

Terminal #6 labeled 902_6 transmits terminal #6 transmission frame (including a data symbol) 2501_6 using the fifth transmission period.

Note that the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" uses a single-carrier transmission scheme. In addition, a plurality of terminals may use the same frequency (band).

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, time division and transmitted by each terminal, and base station #1 labeled 901_1 receives the frame transmitted by the terminal, thereby preventing interference and achieving high data reception quality.

Note that terminal #1 transmission frame 2501_1, terminal #2 transmission frame 2501_2, terminal #3 transmission frame 2501_3, terminal #4 transmission frame 2501_4, terminal #5 transmission frame 2501_5, and terminal #6 transmission frame 2501_6 in FIG. 25 may include, in addition to the data symbol, a "reference signal such as DMRS, PTRS, or SRS", a pilot symbol, a pilot signal, a preamble, and a symbol including control information, for example.

In FIG. 25, a description has been given of a case where the terminals perform time division on the frames to be transmitted, but the terminals may perform spatial division on the frames to be transmitted using multi user-multiple-input multiple-output (MU-MIMO).

FIG. 24 illustrates exemplary occupation by the terminals in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

Figure 26:
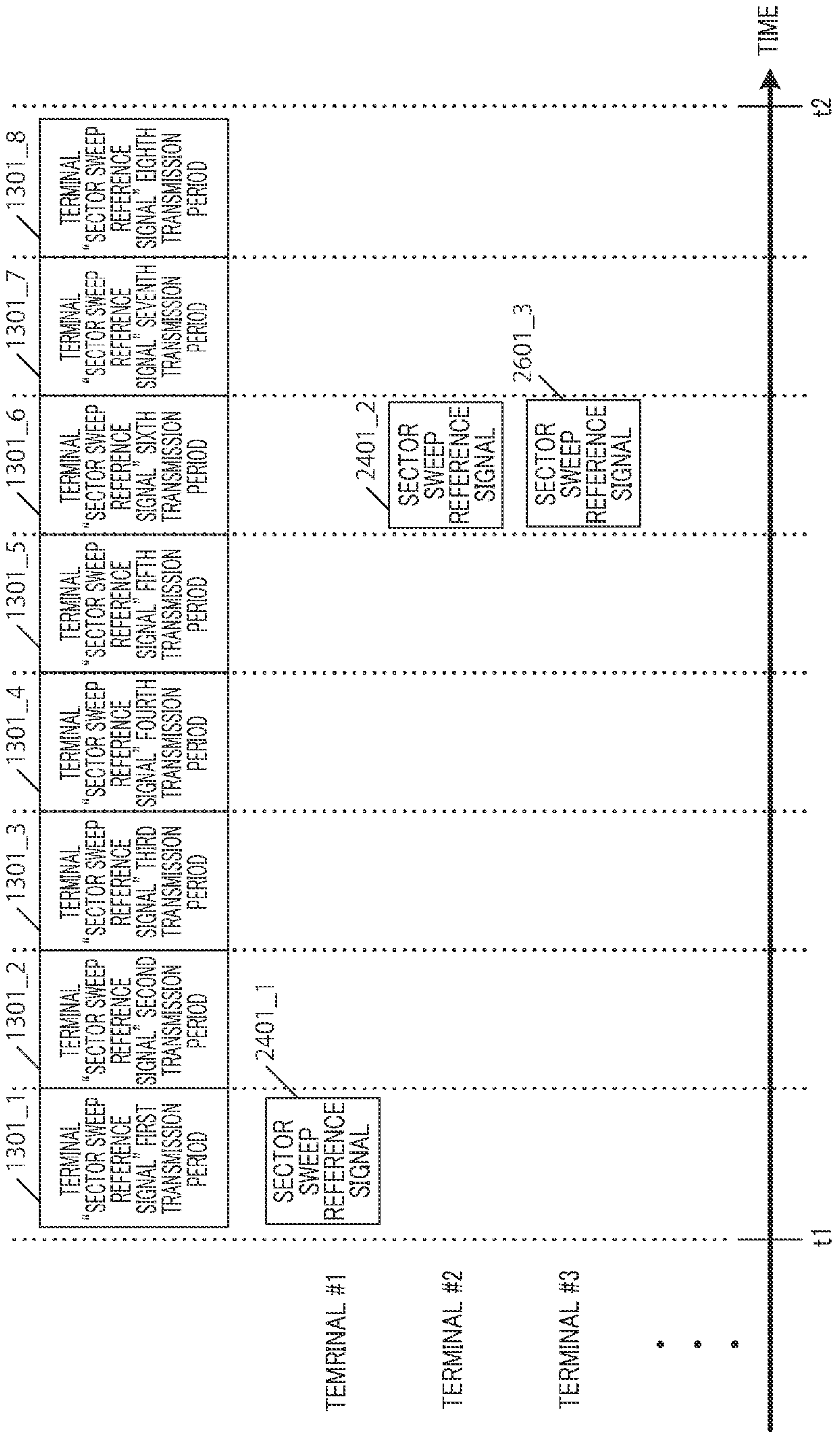
FIG. 26 illustrates exemplary occupation by terminals different from that in FIG. 24 in terminal "sector sweep reference signal" transmission periods illustrated in FIG. 23.

In FIG. 26, a description will be given of exemplary occupation by terminals different from that in FIG. 24 in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, the components that operate in the same manner as in FIGS. 23 and 24 are denoted by the same reference signs, and the descriptions thereof will be omitted since they have already been described. In the following, the difference from the description in FIG. 24 will be described.

Terminal #2 labeled 902_2 in FIG. 9 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of time divisions in which sector sweep reference signals can be transmitted when the terminals transmit the sector sweep reference signals". In the case of FIG. 26, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth transmission period 1301_6" as in FIG. 26.

Note that terminal #2 "sector sweep reference signal" 2401_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 9 receives sector sweep reference signal 1001 transmitted by base station #1 labeled 901_1, obtains the "identification number (ID) of the transmission panel antenna" and "identification number (ID) of the parameter used for beamforming (directivity control)" with high reception quality, and then can communicate with base station #1 labeled 901_1.

Terminal #3 labeled 902_3, for example, estimates frequency band ♭1 as the "frequency (band)" with high reception quality and estimates "transmission panel antenna a3 and parameter b3" as the "transmission panel antenna and parameter" with high reception quality.

In addition, while estimating the "frequency (band)" and "transmission panel antenna and parameter" with high reception quality, terminal #3 labeled 902_3 simultaneously obtains information of the "the number of time divisions in which sector sweep reference signals can be transmitted when the terminals transmit the sector sweep reference signals". In the case of FIG. 26, terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "5" using a random number. In this case, since "5"+1=6, terminal #3 labeled 902_3 transmits terminal #3 "sector sweep reference signal" 2601_3 using "terminal "sector sweep reference signal" sixth transmission period 1301_6" as in FIG. 26.

Note that terminal #3 "sector sweep reference signal" 2601_3 includes information of the "transmission panel antenna and parameter" with high reception quality obtained by terminal #3 labeled 902_3, that is, information of "transmission panel antenna a3 and parameter b3".

At this time, as illustrated in FIG. 26, the time period for "terminal #2 "sector sweep reference signal" 2401_2 transmitted by terminal #2 labeled 902_2" and the time period for "terminal #3 "sector sweep reference signal" 2601_3 transmitted by terminal #3 labeled 902_3" overlap each other.

Thus, base station #1 labeled 901_1 possibly simultaneously receives terminal #2 "sector sweep reference signal" 2401_2 and terminal #3 "sector sweep reference signal" 2601_3.

In this case, the following is two possible cases.

<Case 1>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 are different from the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1. Accordingly, base station #1 labeled 901_1 obtains information included in "terminal #2 "sector sweep reference signal" 2401_2 transmitted by terminal #2 labeled 902_2" and information included in "terminal #3 "sector sweep reference signal" 2601_3 transmitted by terminal #3 labeled 902_3".

In this case, in FIG. 16A for example, "feedback signal second transmission period 1601_12 for frequency ♭1 is for a signal addressed to terminal #2 labeled 902_2" and "feedback signal third transmission period 1601_13 for frequency ♭1 is for a signal addressed to terminal #3 labeled 902_3".

In addition, in FIG. 17A for example, "modulation signal (slot) second transmission period 1701_12 for frequency ♭1 is for a signal addressed to terminal #2 labeled 902_2" and "modulation signal (slot) third transmission period 1701_13 for frequency ♭1 is for a signal addressed to terminal #3 labeled 902_3".

In this manner, base station #1 labeled 901_1 can communicate with terminal #2 labeled 902_2 and terminal #3 labeled 902_3.

<Case 2>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 interfere with the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1.

<Case 2-1>

In some cases, base station #1 labeled 901_1 obtains either information included in "terminal #2 "sector sweep reference signal" 2401_2 transmitted by terminal #2 labeled 902_2" or information included in "terminal #3 "sector sweep reference signal" 2601_3 transmitted by terminal #3 labeled 902_3".

For example, base station #1 labeled 901_1 obtains the information included in "terminal #2 "sector sweep reference signal" 2401_2 transmitted by terminal #2 labeled 902_2".

In this case, in FIG. 16A for example, "feedback signal second transmission period 1601_13 for frequency ♭1 is for a signal addressed to terminal #2 labeled 902_2".

In addition, in FIG. 17A for example, "modulation signal (slot) second transmission period 1701_13 for frequency ♭1 is for a signal addressed to terminal #2 labeled 902_2".

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIG. 26. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭1 as the "frequency (band)" with high reception quality and estimates "transmission panel antenna a3 and parameter b3" as the "transmission panel antenna and parameter".

In addition, while performing such estimation, terminal #3 labeled 902_3 simultaneously obtains information of the "the number of time divisions in which sector sweep reference signals can be transmitted when the terminals transmit the sector sweep reference signals". Terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "3" by generating a random number using seeds different from the previous. In this case, since "3"+1=4, terminal #3 labeled 902_3 transmits terminal #3 "sector sweep reference signal" 2401_3 using "terminal "sector sweep reference signal" fourth transmission period 1301_4" as in FIG. 24.

Note that terminal #3 "sector sweep reference signal" 2401_3 includes information of the "transmission panel antenna and parameter" with high reception quality obtained by terminal #3 labeled 902_3, that is, information of "transmission panel antenna a3 and parameter b3".

In this case, as illustrated in FIG. 24, base station #1 labeled 901_1 receives "terminal #3 "sector sweep reference signal" 2401_3 transmitted by terminal #3 labeled 902_3". Then, the predetermined procedure described above is performed, and base station #1 labeled 901_1 and terminal #3 labeled 902_3 communicate with each other.

<Case 2-2>

In some cases, base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3".

It is assumed that sector sweep reference signal 1851_1 in FIG. 18 has the states in FIG. 26, and base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

In addition, while performing such estimation, terminal #2 labeled 902_2 simultaneously obtains information of the "the number of time divisions in which sector sweep reference signals can be transmitted when the terminals transmit the sector sweep reference signals". Terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" by generating a random number using seeds different from the previous. In this case, since "5"+1=6, terminal #2 labeled 902_2 transmits terminal #2 "sector sweep reference signal" 2401_2 using "terminal "sector sweep reference signal" sixth transmission period 1301_6" as in FIG. 24.

Note that terminal #2 "sector sweep reference signal" 2401_2 includes information of the "transmission panel antenna and parameter" with high reception quality obtained by terminal #2 labeled 902_2, that is, information of "transmission panel antenna a2 and parameter b3".

In this case, as illustrated in FIG. 24, base station #1 labeled 901_1 receives "terminal #2 "sector sweep reference signal" 2401_2 transmitted by terminal #2 labeled 902_2". Then, the predetermined procedure described above is performed, and base station #1 labeled 901_1 and terminal #2 labeled 902_2 communicate with each other.

Likewise, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭1 as the "frequency (band)" with high reception quality and estimates "transmission panel antenna a3 and parameter b3" as the "transmission panel antenna and parameter".

In addition, while performing such estimation, terminal #3 labeled 902_3 simultaneously obtains information of the "the number of time divisions in which sector sweep reference signals can be transmitted when the terminals transmit the sector sweep reference signals". Terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "3" by generating a random number using seeds different from the previous. In this case, since "3"+1=4, terminal #3 labeled 902_3 transmits terminal #3 "sector sweep reference signal" 2401_3 using "terminal "sector sweep reference signal" fourth transmission period 1301_4" as in FIG. 24.

Note that terminal #3 "sector sweep reference signal" 2401_3 includes information of the "transmission panel antenna and parameter" with high reception quality obtained by terminal #3 labeled 902_3, that is, information of "transmission panel antenna a3 and parameter b3".

In this case, as illustrated in FIG. 24, base station #1 labeled 901_1 receives "terminal #3 "sector sweep reference signal" 2401_3 transmitted by terminal #3 labeled 902_3". Then, the predetermined procedure described above is performed, and base station #1 labeled 901_1 and terminal #3 labeled 902_3 communicate with each other.

In the manner described above, a collision of the sector sweep reference signals transmitted by the respective terminals can be further reduced. This produces an effect that the base station can receive more sector sweep reference signals and can communicate with more terminals.

As described above in Embodiment 2, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 11, 12, 23, 24, 15A, 15B, 16A, 16B, 17A, 17B, 18, 19, 24, 25, and 26, but the names thereof are not limited to those in the drawings and the important part is the functions of the signals to be transmitted.

Embodiment 3

In Embodiment 3, a description will be given of an example where a base station transmits a plurality of modulation signals (a plurality of streams) to a terminal as a variation of Embodiment 1. (That is, an example of a case of performing multiple-input multiple-output (MIMO) will be described.) Note that the drawings used in Embodiments 1 and 2 are sometimes used in the following description of Embodiment 3.

FIG. 9 illustrates an exemplary communication state in the present embodiment. Note that the detail has already been described and the description will be thus omitted.

Figure 27:
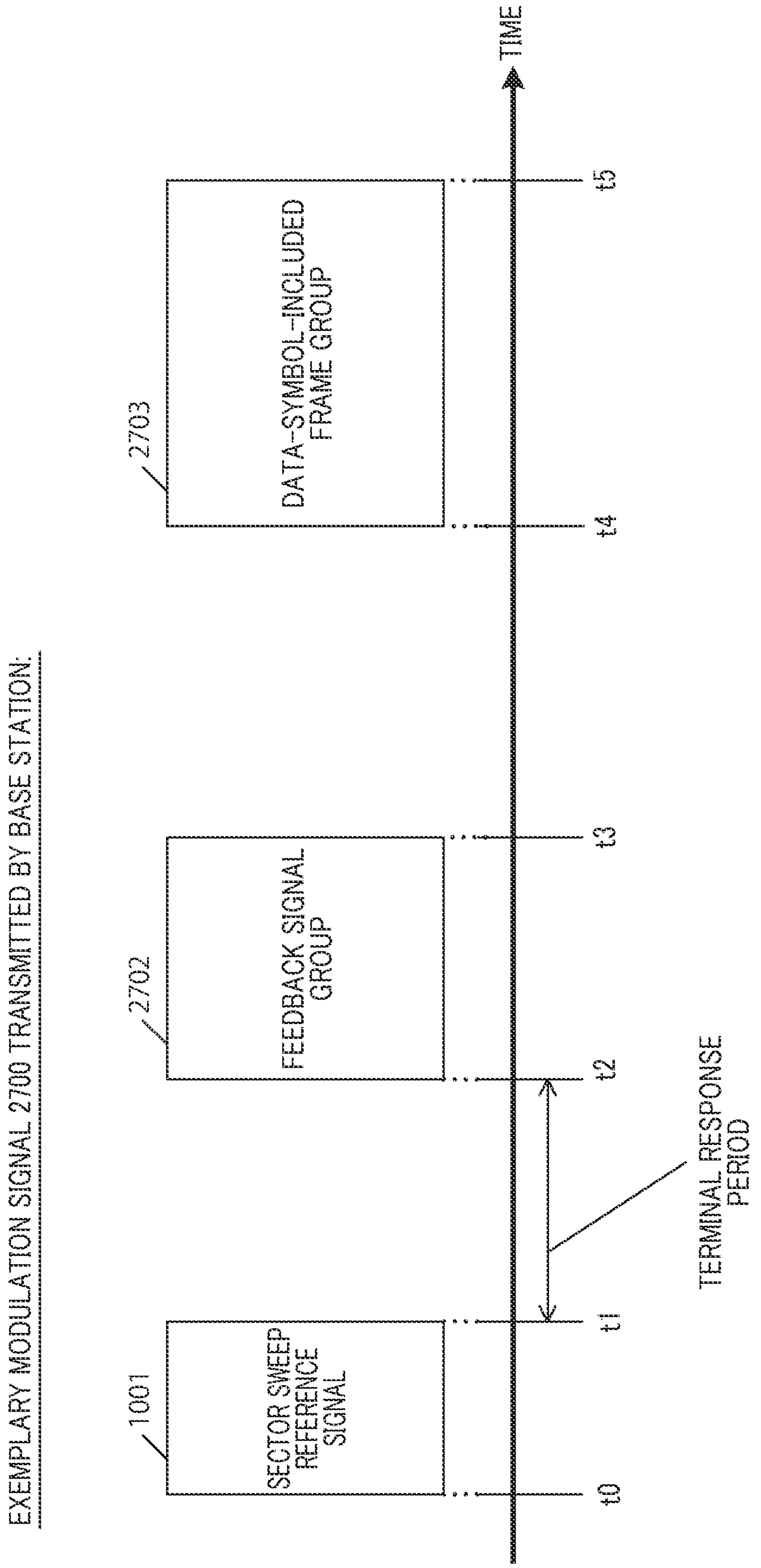
FIG. 27 illustrates an exemplary modulation signal transmitted by base station #1 in FIG. 9.

FIG. 27 illustrates an example of modulation signal 2700 transmitted by base station #1 labeled 901_1 in FIG. 9. Note that the components that operate in the same manner as in FIG. 10 are denoted by the same reference signs, and the descriptions thereof will be omitted.

In the time period from time t0 to t1, sector sweep reference signal 1001 is present.

The time period from time t1 to t2 is a terminal response period.

In the time period from time t2 to t3, feedback signal group 2702 is present. Note that feedback signal group 2702 will be described later.

In the time period from time t4 to t5, data-symbol-included frame getup 2703 is present. Note that data-symbol-included frame group 2703 will be described later.

The configuration of base station #1 labeled 901_1 in FIG. 9 is the configuration in FIG. 1A, 1B, or 1C as described in the other embodiments, and base station #1 labeled 901_1 with the configuration in FIG. 1A, 1B, or 1C includes the configuration in FIG. 3 as transmission panel antenna xi labeled 106_*xi*. Note that the configuration of base station #1 labeled 901_1 is not limited to the configuration in FIG. 1A, 1B, or 1C, and the configuration of transmission panel antenna xi labeled 106_*xi* included in base station #1 labeled 901_1 with the configuration in FIG. 1A, 1B, or 1C is not limited to the configuration in FIG. 3.

FIG. 11 illustrates examples of sector sweep reference signal 1001 in FIG. 23 transmitted by base station #1 in FIG. 9. Note that the operation in FIG. 11 has already been described and the description thereof will be thus omitted.

FIG. 12 illustrates an exemplary configuration of "sector sweep reference signal 1101_*i* in transmission panel antenna i" in FIG. 11. Note that the operation in FIG. 12 has already been described and the description thereof will be thus omitted.

FIG. 13 illustrates an exemplary operation in the time period from time t1 to t2, which is the terminal response period. Note that the operation in FIG. 13 has already been described and the description thereof will be thus omitted.

FIG. 14 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13. Note that the operation in FIG. 14 has already been described, and thus different operations in the present embodiment will be described.

For example, terminal #1 labeled 902_1 in FIG. 9 desires to receive a plurality of modulation signals from base station #1 labeled 901_1. Here, terminal #1 labeled 902_1 in FIG. 9 desires to receive two modulation signals from base station #1 labeled 901_1. In this case, terminal #1 labeled 902_1 in FIG. 9 receives sector sweep reference signal 1001 transmitted by base station #1 labeled 901_1 and estimates two "transmission panel antennas and parameter numbers" with high reception quality from transmission panel antennas of base station #1 labeled 901_1.

At this time, those two "transmission panel antennas and parameter numbers" with high reception quality are respectively referred to as the first "transmission panel antenna and parameter number" and the second "transmission panel antenna and parameter number". Further, a "transmission panel antenna of the first "transmission panel antenna and parameter number"" is different from a "transmission panel antenna of the second "transmission panel antenna and parameter number"".

In this case, terminal #1 labeled 902_1 in FIG. 9 selects a first frequency (band) as well as the first "transmission panel antenna and parameter number". Terminal #1 labeled 902_1 in FIG. 9 also selects a second frequency (band) as well as the second "transmission panel antenna and parameter number". Note that the first frequency (band) and the second frequency (band) may be the same, may be different, or may partially overlap each other.

Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. To be more specific, the above operation is performed by base station #1 labeled 901_1 transmitting a sector sweep reference signal in FIG. 11 and terminal #1 labeled 902_1 receiving the sector sweep reference signal in FIG. 11.

Terminal #1 labeled 902_1 estimates, for example, "transmission panel antenna a1_1 and parameter b1_1" and "transmission panel antenna a1_2 and parameter b1_2" as the two "transmission panel antennas and parameter numbers" with high reception quality. (Note that, in the following description with reference to FIGS. 28A, 28B, 29A, 29B, etc., "transmission panel antenna a1_1" is transmission panel antenna 1 labeled 106_1 (of base station #1 labeled 901_1) in FIGS. 1A, 1B, and 1C, and "transmission panel antenna a1_2" is transmission panel antenna 2 labeled 106_2 (of base station #1 labeled 901_1) in FIGS. 1A, 1B, and 1C.) (In addition, a frequency (band) is estimated as well as "transmission panel antenna a1_1 and parameter b1_1". Likewise, a frequency (band) is estimated as well as "transmission panel antenna a1_2 and parameter b1_2".)

In addition, while estimating the "transmission panel antenna and parameter" with high reception quality, terminal #1 labeled 902_1 simultaneously obtains information of "the number of slots in which sector sweep reference signals can be transmitted when the terminals transmit the sector sweep reference signals (the number of terminals that can transmit the sector sweep reference signal)". In the case of FIG. 14, terminal #1 labeled 902_1 obtains information indicating that "the number of time divisions in which sector sweep reference signals can be transmitted when the terminals transmit the sector sweep reference signals" is four.

In this case, terminal #1 labeled 902_1 obtains, for example, any one of the values "0", "1", "2", and "3" using a random number. For example, terminal #1 labeled 902_1 obtains "0" using a random number. In this case, since "0"+1=1, terminal #1 labeled 902_1 transmits terminal #1 "sector sweep reference signal" 1401_1 using "terminal "sector sweep reference signal" first (="0"+1) transmission period 1301_1" in FIG. 14 (see FIG. 14). (Terminal #1 "sector sweep reference signal" 1401_1 is present in frequency band ♭K.)

Note that terminal #1 "sector sweep reference signal" 1401_1 includes information of the "transmission panel antennas and parameters" with high reception quality obtained by terminal #1 labeled 902_1, that is, information of "transmission panel antenna a1_1 and parameter b1_1" and information of "transmission panel antenna a1_2 and parameter b1_2". Sector sweep reference signal 1401_1 may include request information, of terminal #1 labeled 902_1, of "the number of modulation signals (streams) desired to be transmitted by base station #1 labeled 901_1" (here, "2"). Further, terminal #1 "sector sweep reference signal" 1401_1 includes information of the frequency (band) corresponding to the information of "transmission panel antenna a1_1 and parameter b1_1" (here, frequency band ♭K) and information of the frequency (band) corresponding to the information of "transmission panel antenna a1_2 and parameter b1_2" (here, frequency band ♭K).

Information included in sector sweep reference signals transmitted by the other terminals and the transmission states have already been described with reference to FIG. 14 in other embodiments, and the description thereof will be thus omitted. Note that the sector sweep reference signals transmitted by the other terminals may include the request information of "the number of modulation signals (streams) desired to be transmitted by base station #1 labeled 901_1". For example, when "the number of modulation signals (streams) desired to be transmitted by base station #1 labeled 901_1" is "1", this information is included. ("The number of modulation signals (streams) desired to be transmitted by base station #1 labeled 901_1" is set to a number equal to or greater than "1").

In the manner described above, a collision of the sector sweep reference signals transmitted by the respective terminals can be reduced. This produces an effect that the base station can receive more sector sweep reference signals and can communicate with more terminals. The above operation also allows the base station to transmit one or a plurality of modulation signals (streams) to each terminal.

A description will be given of a configuration of terminal #i "sector sweep reference signal" 1401_*i* transmitted by terminal #i labeled 902_*i* described with reference to FIG. 14. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

For example, terminal #i labeled 902_*i* with the configuration in FIG. 1A, 1B, or 1C transmits terminal #i "sector sweep reference signal" 1401_*i* as illustrated in FIG. 14. The configuration of terminal #i "sector sweep reference signal" 1401_*i* and the information included in the signal have already been described with reference to FIGS. 15A and 15B in other embodiments, and the description thereof will be thus omitted.

A plurality of cases will be described in the following.

<Case 1>

Figure 28A:
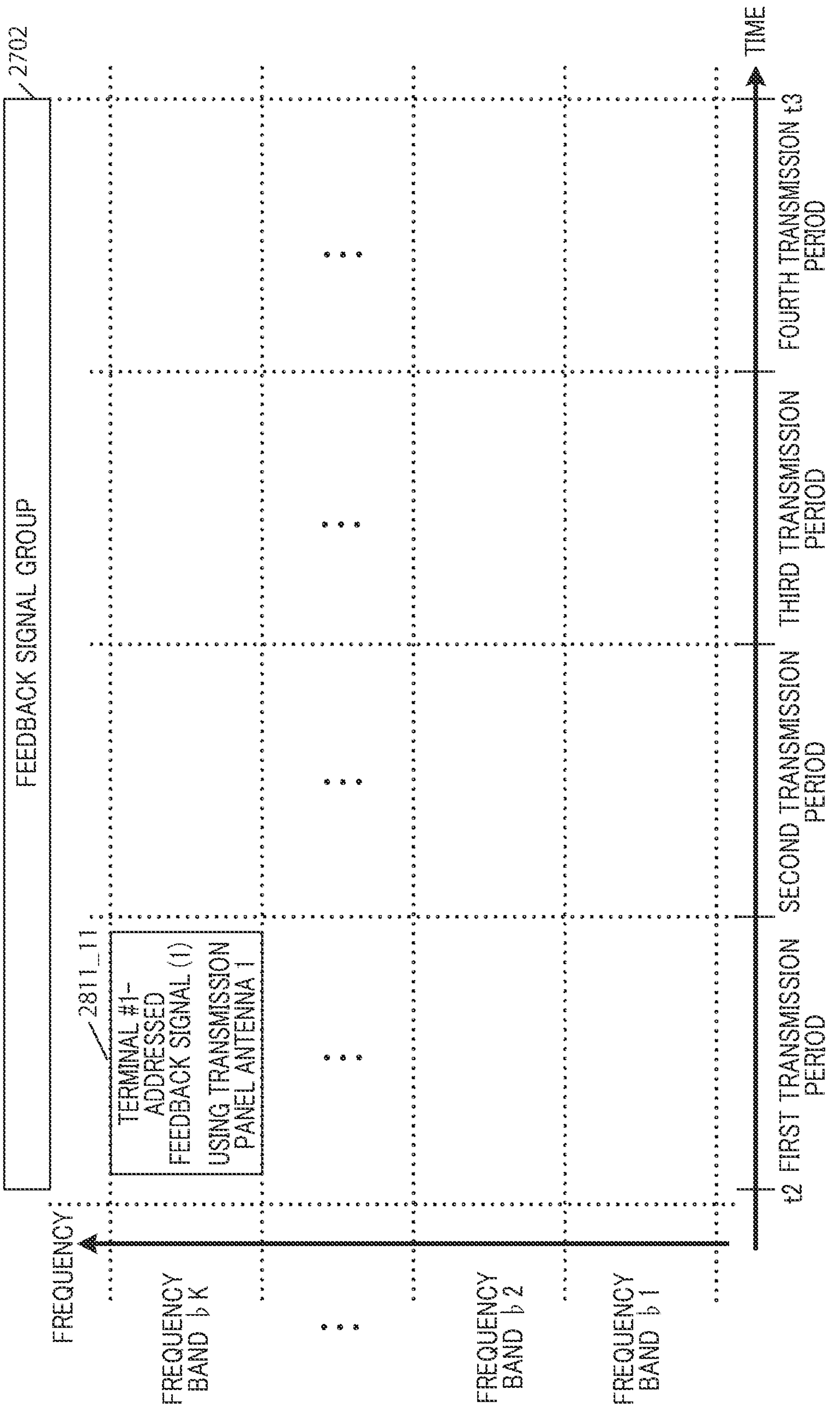
FIG. 28A illustrates the first example of a configuration of a feedback signal group that is present in the time period from t2 to t3 in FIG. 27 and transmitted by base station #1.
Figure 28B:
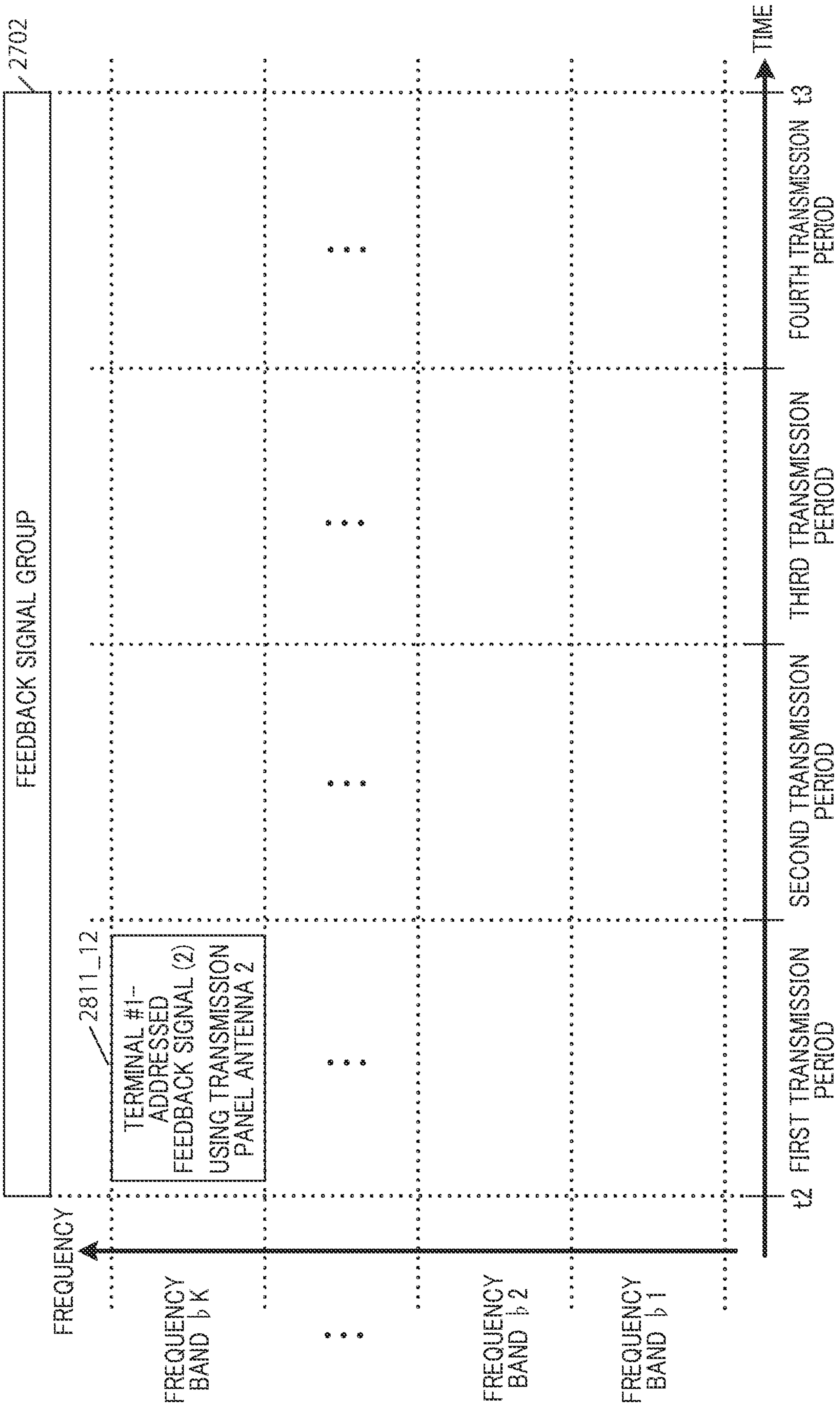
FIG. 28B illustrates the first example of the configuration of the feedback signal group that is present in the time period from t2 to t3 in FIG. 27 and transmitted by base station #1.

FIGS. 28A and 28B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 28A and 28B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 28A and 28B, there are a first transmission period, a second transmission period, a third transmission period, and a fourth transmission period, and frequency band ♭1, frequency band ♭2 . . . , frequency band ♭K for feedback signal group 2702, as in FIG. 16A.

Note that FIGS. 28A and 28B illustrate only feedback signals addressed to terminal #1 labeled 902_1. Although not illustrated in FIGS. 28A and 28B, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 2811_11 present in the first transmission period in frequency band ♭K as illustrated in FIG. 28A and terminal #1-addressed feedback signal (2) labeled 2811_12 present in the first transmission period in frequency band ♭K as illustrated in FIG. 28B.

Note that the term "feedback signal group" is used in the description because feedback signals transmitted from transmission panel antenna 1 labeled 106_1 can be present, feedback signals transmitted from transmission panel antenna 2 labeled 106_2 can be present, feedback signals transmitted from transmission panel antenna 3 labeled 106_3 can be present, and feedback signals transmitted from transmission panel antenna 4 labeled 106_4 can be present, in the same frequency band and the same transmission period.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 2811_11" present in the first transmission period in frequency band ♭K as illustrated in FIG. 28A and "terminal #1-addressed feedback signal (2) labeled 2811_12" present in the first transmission period in frequency band ♭K as illustrated in FIG. 28B. At this time, "terminal #1-addressed feedback signal (1) labeled 2811_11" is transmitted from transmission panel antenna 1 labeled 106_1 of base station #1 labeled 901_1, and "terminal #1-addressed feedback signal (2) labeled 2811_12" is transmitted from transmission panel antenna 2 labeled 106_2 of base station #1 labeled 901_1.

As described above, "terminal #1-addressed feedback signal (1) labeled 2811_11" and "terminal #1-addressed feedback signal (2) labeled 2811_12" are present because "base station #1 labeled 901_1 transmits two modulation signals (streams) to terminal #1 labeled 902_1".

At this time, "terminal #1-addressed feedback signal (1) labeled 2811_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 2811_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 2811_11" present in the first transmission period in frequency band ♭K as illustrated in FIG. 28A and "terminal #1-addressed feedback signal (2) labeled 2811_12" present in the first transmission period in frequency band ♭K as illustrated in FIG. 28B.

Further, there may be a feedback signal addressed to a terminal other than terminal #1 labeled 902_1 in FIGS. 28A and 28B (see FIG. 16B, for example).

The above example has described the case where base station #1 labeled 901_1 transmits, to terminal #1 labeled 902_1, "terminal #1-addressed feedback signal (1) labeled 2811_11" and "terminal #1-addressed feedback signal (2) labeled 2811_12" as illustrated in FIGS. 28A and 28B, but base station #1 labeled 901_1 may transmit three or more feedback signals to terminal #1 labeled 902_1.

Figure 29A:
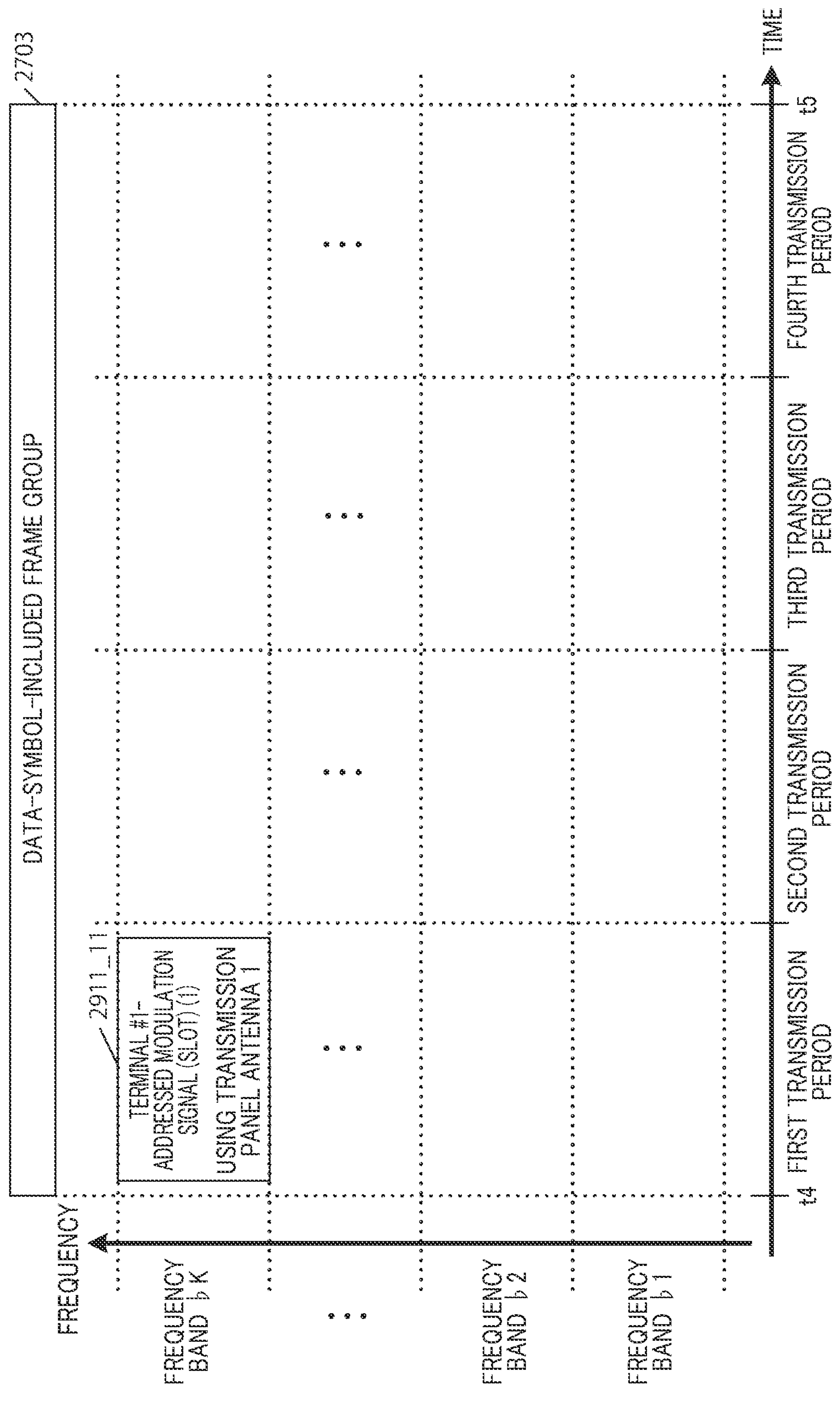
FIG. 29A illustrates the first example of a configuration of a data-symbol-included frame group that is present in the time period from t4 to t5 in FIG. 27 and transmitted by base station #1.
Figure 29B:
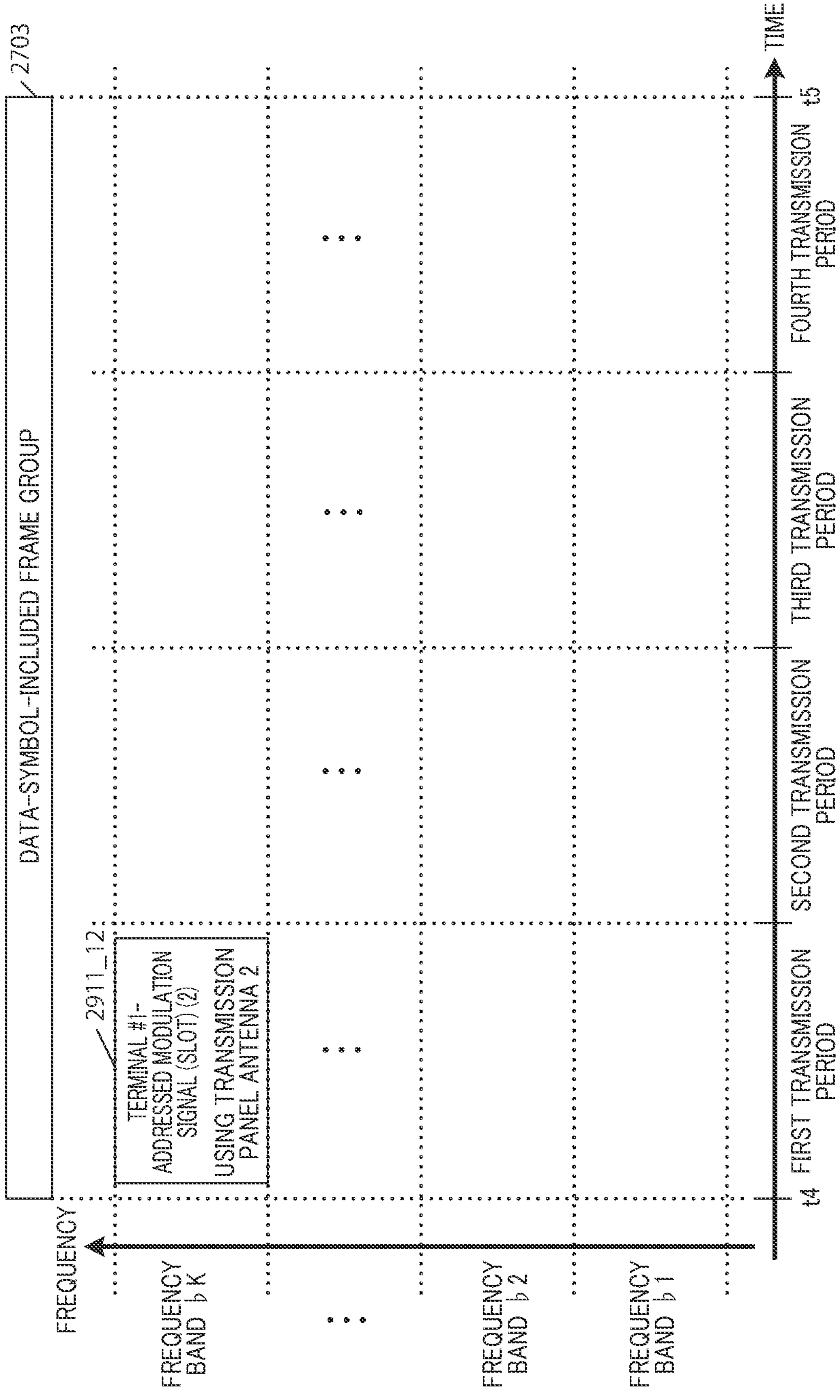
FIG. 29B illustrates the first example of the configuration of the data-symbol-included frame group that is present in the time period from t4 to t5 in FIG. 27 and transmitted by base station #1.

FIGS. 29A and 29B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 29A and 29B. In FIGS. 29A and 29B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 29A and 29B illustrate only modulation signals (slots) addressed to terminal #1 labeled 902_1. Although not illustrated in FIGS. 29A and 29B, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 2911_11 present in the first transmission period in frequency band ♭K as illustrated in FIG. 29A and terminal #1-addressed modulation signal (slot) (2) labeled 2911_12 present in the first transmission period in frequency band ♭K as illustrated in FIG. 29B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 2911_11" present in the first transmission period in frequency band ♭K as illustrated in FIG. 29A and "terminal #1-addressed modulation signal (slot) (2) labeled 2911_12" present in the first transmission period in frequency band ♭K as illustrated in FIG. 29B. At this time, "terminal #1-addressed modulation signal (slot) (1) labeled 2911_11" is transmitted from transmission panel antenna 1 labeled 106_1 of base station #1 labeled 901_1, and "terminal #1-addressed modulation signal (slot) (2) labeled 2911_12" is transmitted from transmission panel antenna 2 labeled 106_2 of base station #1 labeled 901_1.

As described above, "terminal #1-addressed modulation signal (slot) (1) labeled 2911_11" and "terminal #1-addressed modulation signal (slot) (2) labeled 2911_12" are present because "base station #1 labeled 901_1 transmits two modulation signals (streams) to terminal #1 labeled 902_1".

At this time, "terminal #1-addressed modulation signal (slot) (1) labeled 2911_11" includes, for example, a data symbol (data and/or information) addressed to terminal #1 labeled 902_1.

In addition, "terminal #1-addressed modulation signal (slot) (2) labeled 2911_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 2911_11" present in the first transmission period in frequency band ♭K as illustrated in FIG. 29A and "terminal #1-addressed modulation signal (slot) (2) labeled 2911_12" present in the first transmission period in frequency band ♭K as illustrated in FIG. 29B.

Further, there may be a modulation signal (slot) addressed to a terminal other than terminal #1 labeled 902_1 in FIGS. 29A and 29B (see FIG. 17B, for example).

The above example has described the case where base station #1 labeled 901_1 transmits, to terminal #1 labeled 902_1, "terminal #1-addressed modulation signal (slot) (1) labeled 2911_11" and "terminal #1-addressed modulation signal (slot) (2) labeled 2911_12" as illustrated in FIGS. 29A and 29B, but base station #1 labeled 901_1 may transmit three or more modulation signals (slots) (a plurality of modulation signals (slots) using the same frequency resource) to terminal #1 labeled 902_1.

Note that "terminal #1-addressed modulation signal (slot) (1) labeled 2911_11" and "terminal #1-addressed modulation signal (slot) (2) labeled 2911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 2>

Figure 30A:
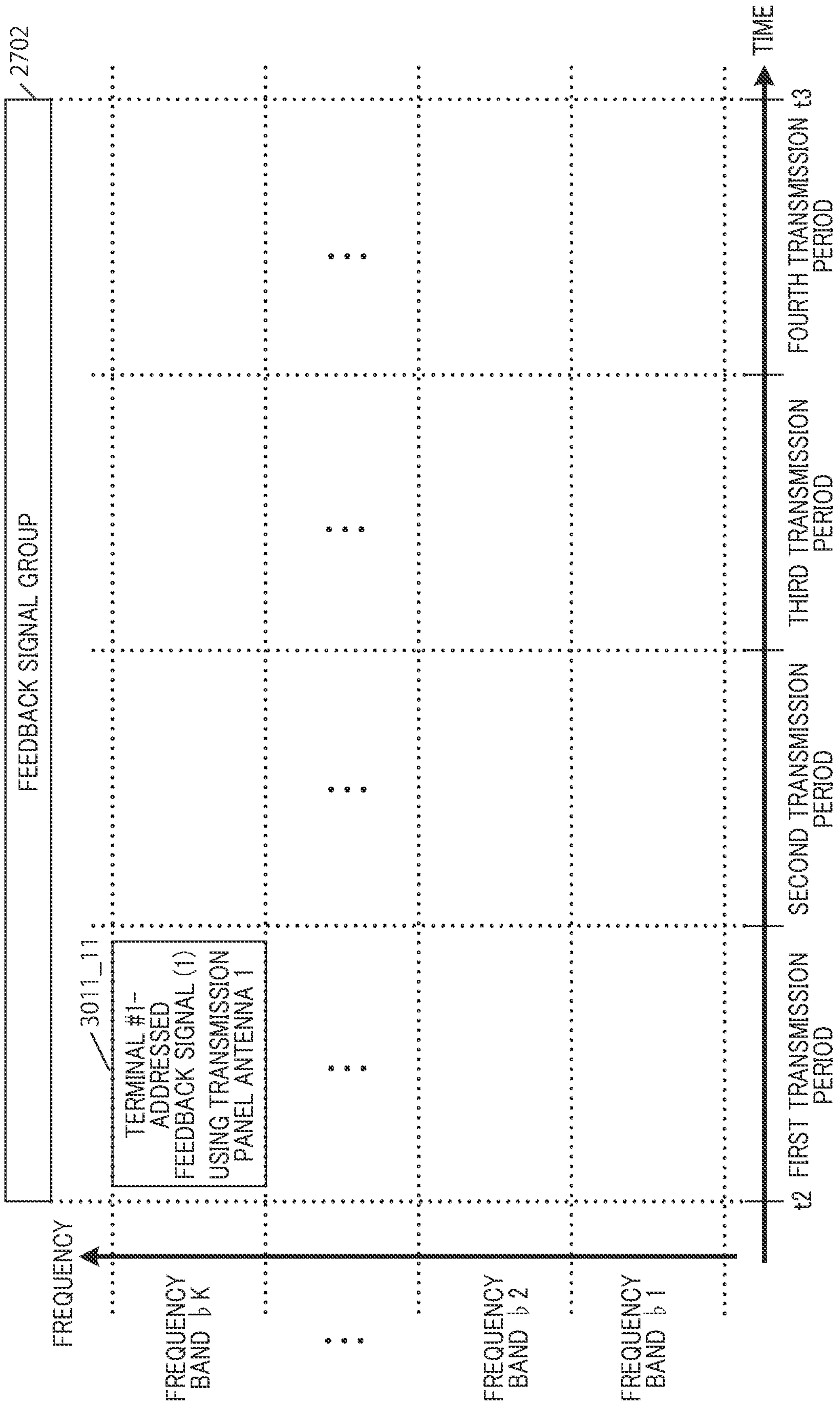
FIG. 30A illustrates the second example of the configuration of the feedback signal group that is present in the time period from t2 to t3 in FIG. 27 and transmitted by base station #1.
Figure 30B:
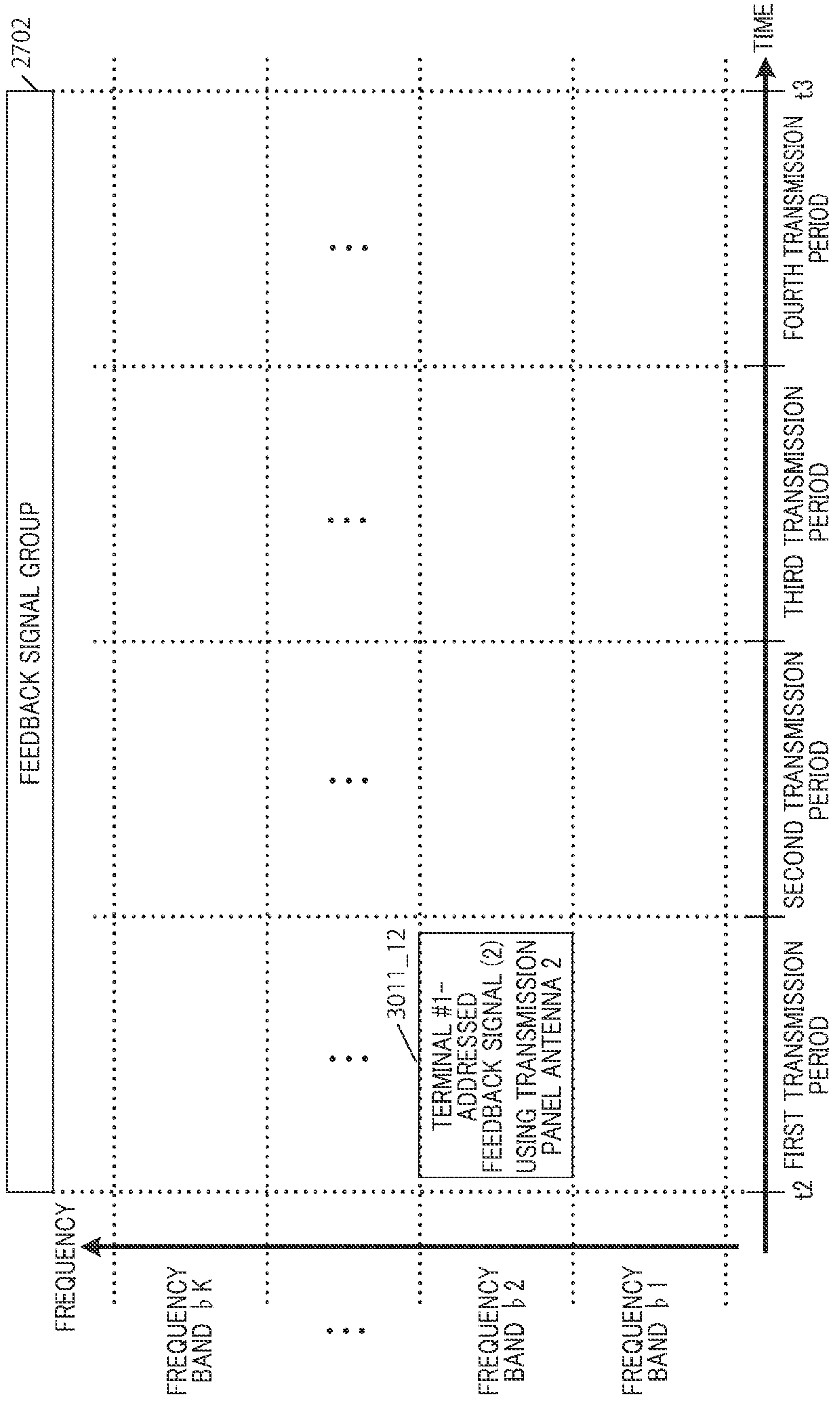
FIG. 30B illustrates the second example of the configuration of the feedback signal group that is present in the time period from t2 to t3 in FIG. 27 and transmitted by base station #1.

FIGS. 30A and 30B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 30A and 30B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 30A and 30B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 30A and 30B illustrate only feedback signals addressed to terminal #1 labeled 902_1. Although not illustrated in FIGS. 30A and 30B, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 3011_11 present in the first transmission period in frequency band ♭K as illustrated in FIG. 30A and terminal #1-addressed feedback signal (2) labeled 3011_12 present in the first transmission period in frequency band ♭2 as illustrated in FIG. 30B.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 3011_11" present in the first transmission period in frequency band ♭K as illustrated in FIG. 30A and "terminal #1-addressed feedback signal (2) labeled 3011_12" present in the first transmission period in frequency band ♭2 as illustrated in FIG. 30B. At this time, "terminal #1-addressed feedback signal (1) labeled 3011_11" is transmitted from transmission panel antenna 1 labeled 106_1 of base station #1 labeled 901_1, and "terminal #1-addressed feedback signal (2) labeled 3011_12" is transmitted from transmission panel antenna 2 labeled 106_2 of base station #1 labeled 901_1.

As described above, "terminal #1-addressed feedback signal (1) labeled 3011_11" and "terminal #1-addressed feedback signal (2) labeled 3011_12" are present because "base station #1 labeled 901_1 transmits two modulation signals (streams) to terminal #1 labeled 902_1".

At this time, "terminal #1-addressed feedback signal (1) labeled 3011_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 3011_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3011_11" present in the first transmission period in frequency band ♭K as illustrated in FIG. 30A and "terminal #1-addressed feedback signal (2) labeled 3011_12" present in the first transmission period in frequency band ♭2 as illustrated in FIG. 30B.

Further, there may be a feedback signal addressed to a terminal other than terminal #1 labeled 902_1 in FIGS. 30A and 30B (see FIG. 16B, for example).

The above example has described the case where base station #1 labeled 901_1 transmits, to terminal #1 labeled 902_1, "terminal #1-addressed feedback signal (1) labeled 3011_11" and "terminal #1-addressed feedback signal (2) labeled 3011_12" as illustrated in FIGS. 30A and 30B, but base station #1 labeled 901_1 may transmit three or more feedback signals to terminal #1 labeled 902_1.

Figure 31A:
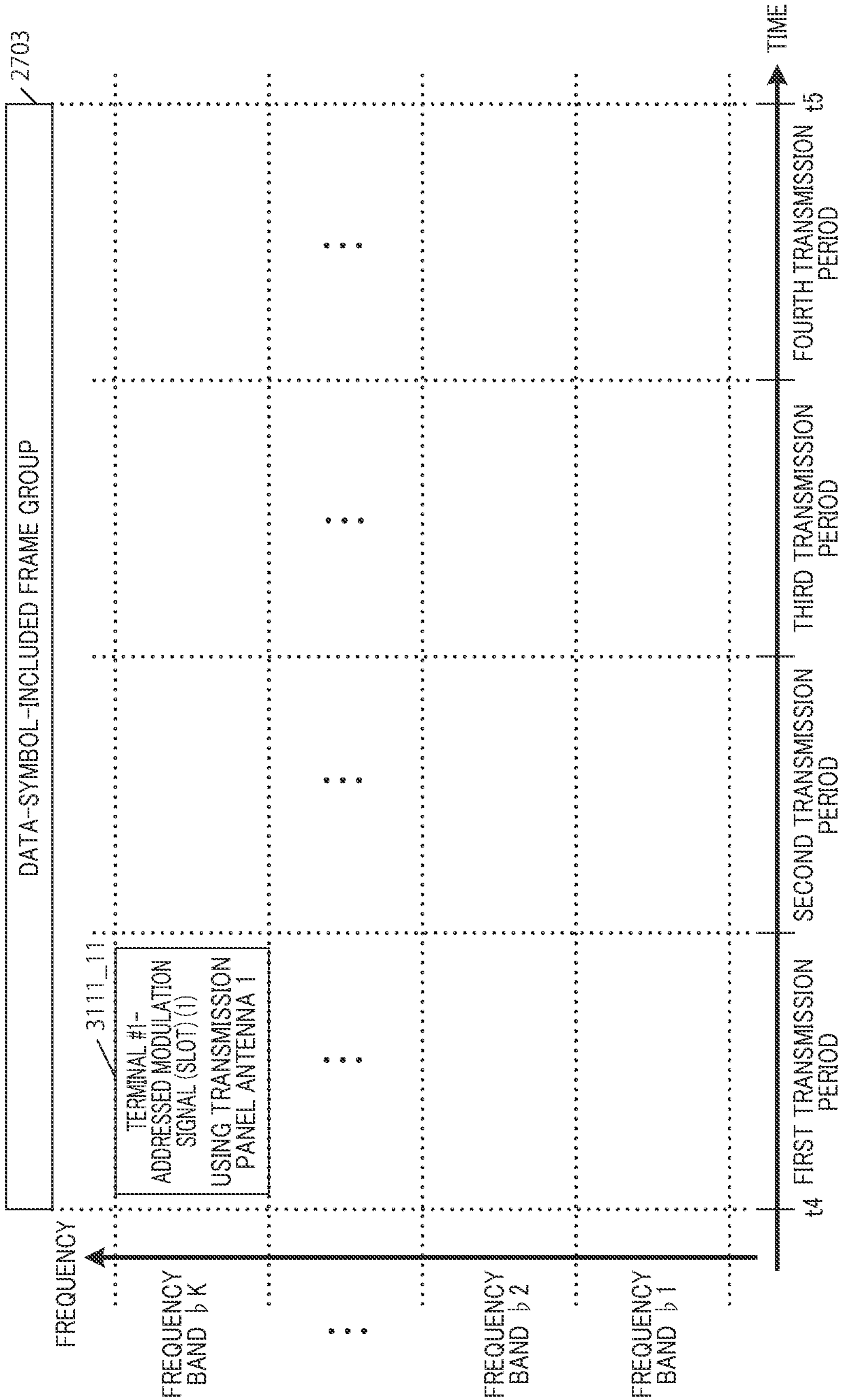
FIG. 31A illustrates the second example of the configuration of the data-symbol-included frame group that is present in the time period from t4 to t5 in FIG. 27 and transmitted by base station #1.
Figure 31B:
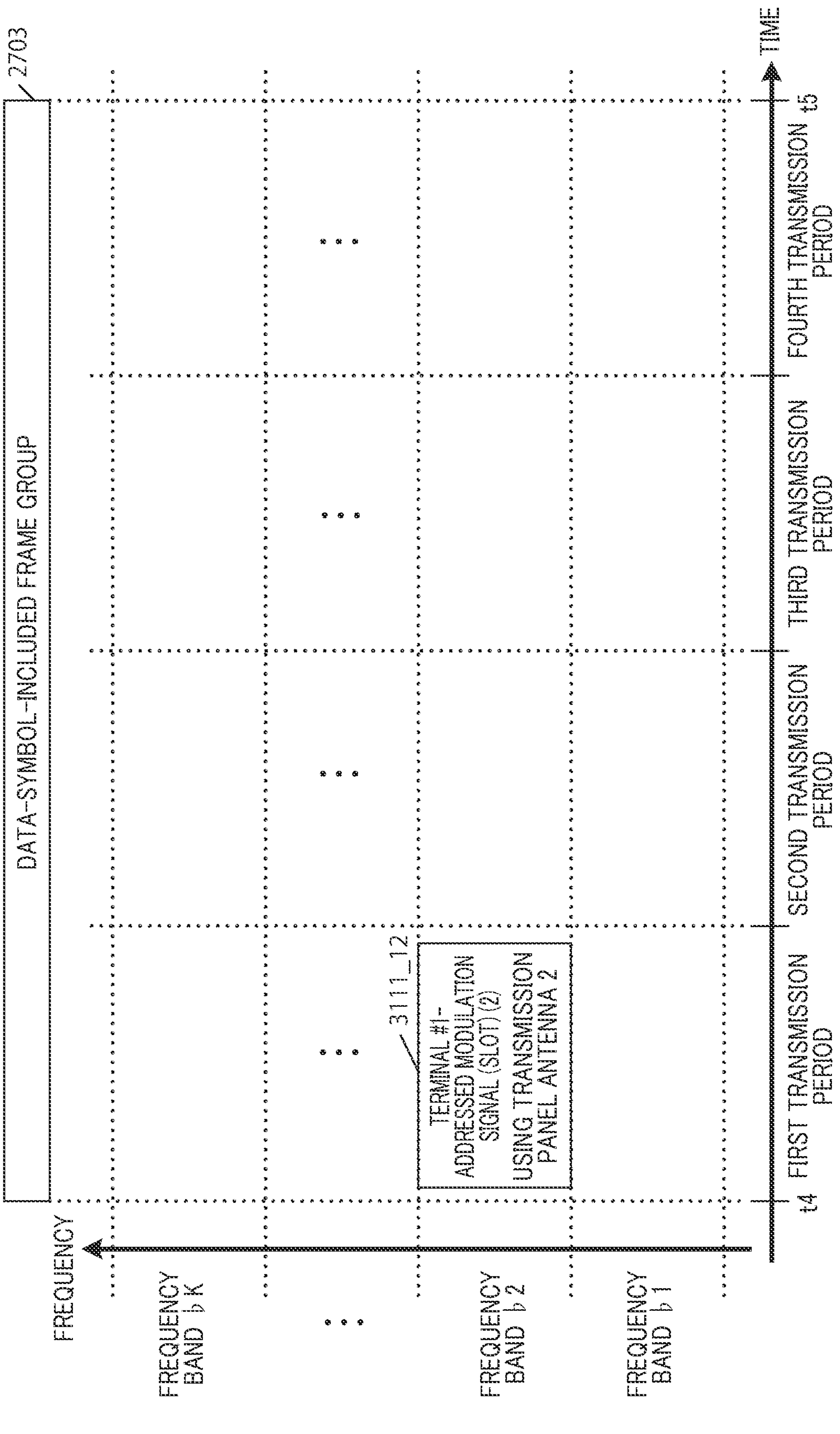
FIG. 31B illustrates the second example of the configuration of the data-symbol-included frame group that is present in the time period from t4 to t5 in FIG. 27 and transmitted by base station #1.

FIGS. 31A and 31B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 31A and 31B. In FIGS. 31A and 31B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 31A and 31B illustrate only modulation signals (slots) addressed to terminal #1 labeled 902_1. Although not illustrated in FIGS. 31A and 31B, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 3111_11 present in the first transmission period in frequency band ♭K as illustrated in FIG. 31A and terminal #1-addressed modulation signal (slot) (2) labeled 3111_12 present in the first transmission period in frequency band ♭2 as illustrated in FIG. 31B.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 3111_11" present in the first transmission period in frequency band ♭K as illustrated in FIG. 31A and "terminal #1-addressed modulation signal (slot) (2) labeled 3111_12" present in the first transmission period in frequency band ♭2 as illustrated in FIG. 31B. At this time, "terminal #1-addressed modulation signal (slot) (1) labeled 3111_11" is transmitted from transmission panel antenna 1 labeled 106_1 of base station #1 labeled 901_1, and "terminal #1-addressed modulation signal (slot) (2) labeled 3111_12" is transmitted from transmission panel antenna 2 labeled 106_2 of base station #1 labeled 901_1.

As described above, "terminal #1-addressed modulation signal (slot) (1) labeled 3111_11" and "terminal #1-addressed modulation signal (slot) (2) labeled 3111_12" are present because "base station #1 labeled 901_1 transmits two modulation signals (streams) to terminal #1 labeled 902_1".

At this time, "terminal #1-addressed modulation signal (slot) (1) labeled 3111_11" includes, for example, a data symbol (data and/or information) addressed to terminal #1 labeled 902_1.

In addition, "terminal #1-addressed modulation signal (slot) (2) labeled 3111_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1. "terminal #1-addressed modulation signal (slot) (1) labeled 3111_11" present in the first transmission period in frequency band ♭K as illustrated in FIG. 31A and "terminal #1-addressed modulation signal (slot) (2) labeled 3111_12" present in the first transmission period in frequency band ♭2 as illustrated in FIG. 31B.

Further, there may be a modulation signal (slot) addressed to a terminal other than terminal #1 labeled 902_1 in FIGS. 31A and 31B (see FIG. 17B, for example).

The above example has described the case where base station #1 labeled 901_1 transmits, to terminal #1 labeled 902_1, "terminal #1-addressed modulation signal (slot) (1) labeled 3111_11" and "terminal #1-addressed modulation signal (slot) (2) labeled 3111_12" as illustrated in FIGS. 31A and 31B, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 3111_11" and "terminal #1-addressed modulation signal (slot) (2) labeled 3111_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 3>

Figure 32A:
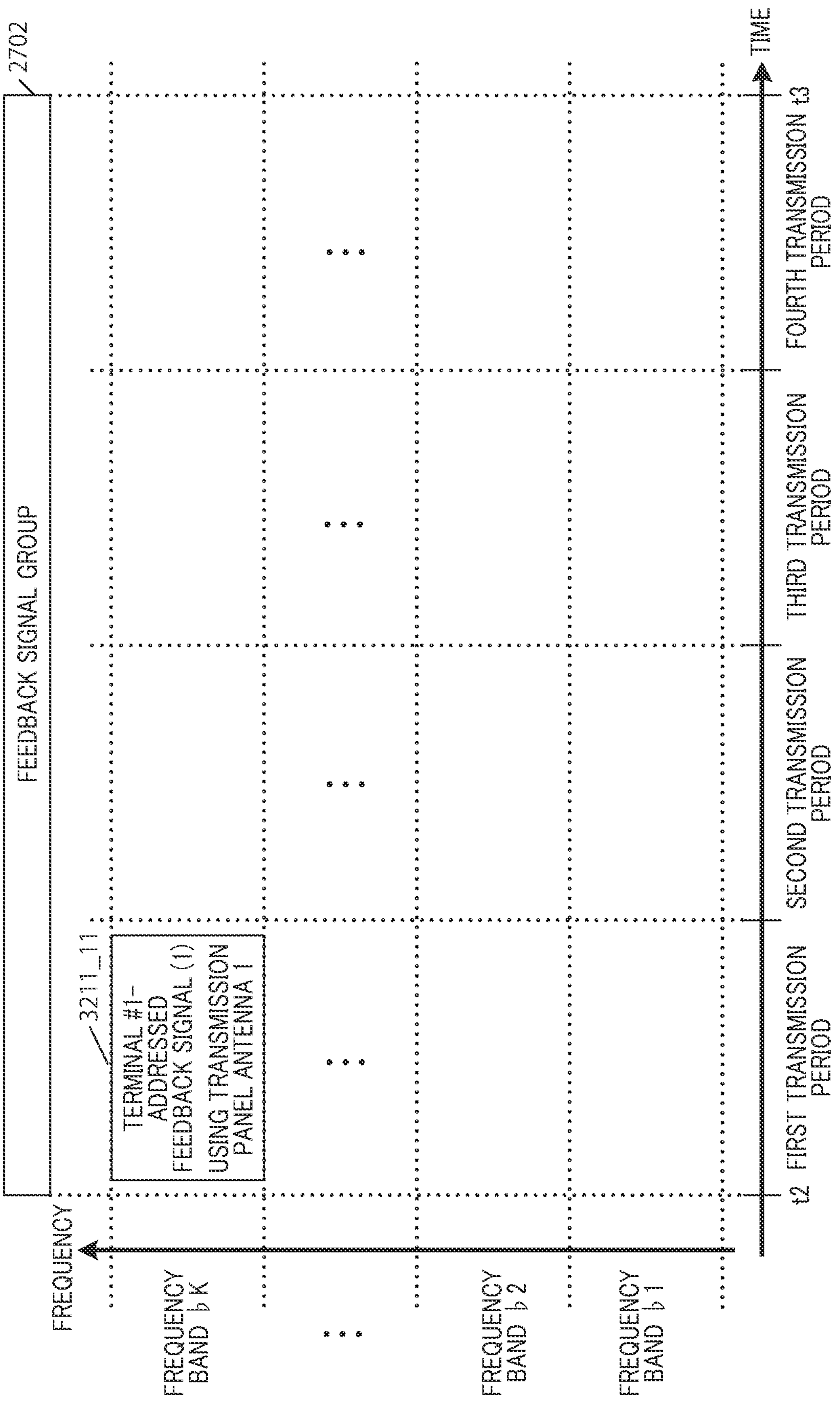
FIG. 32A illustrates the third example of the configuration of the feedback signal group that is present in the time period from t2 to t3 in FIG. 27 and transmitted by base station #1.
Figure 32B:
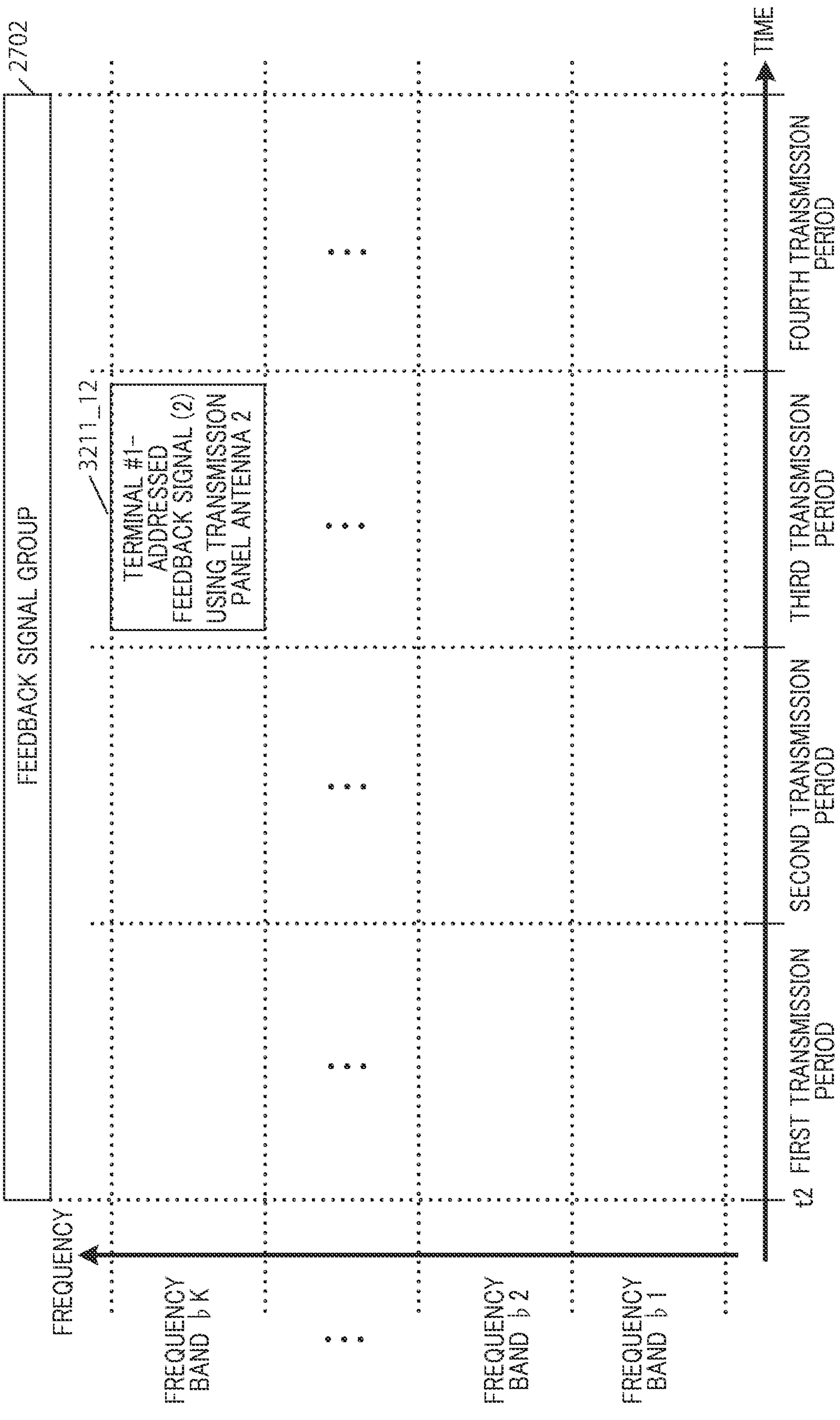
FIG. 32B illustrates the third example of the configuration of the feedback signal group that is present in the time period from t2 to t3 in FIG. 27 and transmitted by base station #1.

FIGS. 32A and 32B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 32A and 32B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 32A and 32B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 32A and 32B illustrate only feedback signals addressed to terminal #1 labeled 902_1. Although not illustrated in FIGS. 32A and 32B, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 3211_11 present in the first transmission period in frequency band ♭K as illustrated in FIG. 32A and terminal #1-addressed feedback signal (2) labeled 3211_12 present in the third transmission period in frequency band ♭K as illustrated in FIG. 32B.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 3211_11" present in the first transmission period in frequency band ♭K as illustrated in FIG. 32A and "terminal #1-addressed feedback signal (2) labeled 3211_12" present in the third transmission period in frequency band ♭K as illustrated in FIG. 32B. At this time, "terminal #1-addressed feedback signal (1) labeled 3211_11" is transmitted from transmission panel antenna 1 labeled 106_1 of base station #1 labeled 901_1, and "terminal #1-addressed feedback signal (2) labeled 3211_12" is transmitted from transmission panel antenna 2 labeled 106_2 of base station #1 labeled 901_1.

As described above, "terminal #1-addressed feedback signal (1) labeled 3211_11" and "terminal #1-addressed feedback signal (2) labeled 3211_12" are present because "base station #1 labeled 901_1 transmits two modulation signals (streams) to terminal #1 labeled 902_1".

At this time, "terminal #1-addressed feedback signal (1) labeled 3211_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 3211_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1. "terminal #1-addressed feedback signal (1) labeled 3211_11" present in the first transmission period in frequency band ♭K as illustrated in FIG. 32A and "terminal #1-addressed feedback signal (2) labeled 3211_12" present in the third transmission period in frequency band ♭K as illustrated in FIG. 32B.

Further, there may be a feedback signal addressed to a terminal other than terminal #1 labeled 902_1 in FIGS. 32A and 32B (see FIG. 16B, for example).

The above example has described the case where base station #1 labeled 901_1 transmits, to terminal #1 labeled 902_1, "terminal #1-addressed feedback signal (1) labeled 3211_11" and "terminal #1-addressed feedback signal (2) labeled 3211_12" as illustrated in FIGS. 32A and 32B, but base station #1 labeled 901_1 may transmit three or more feedback signals to terminal #1 labeled 902_1.

Figure 33A:
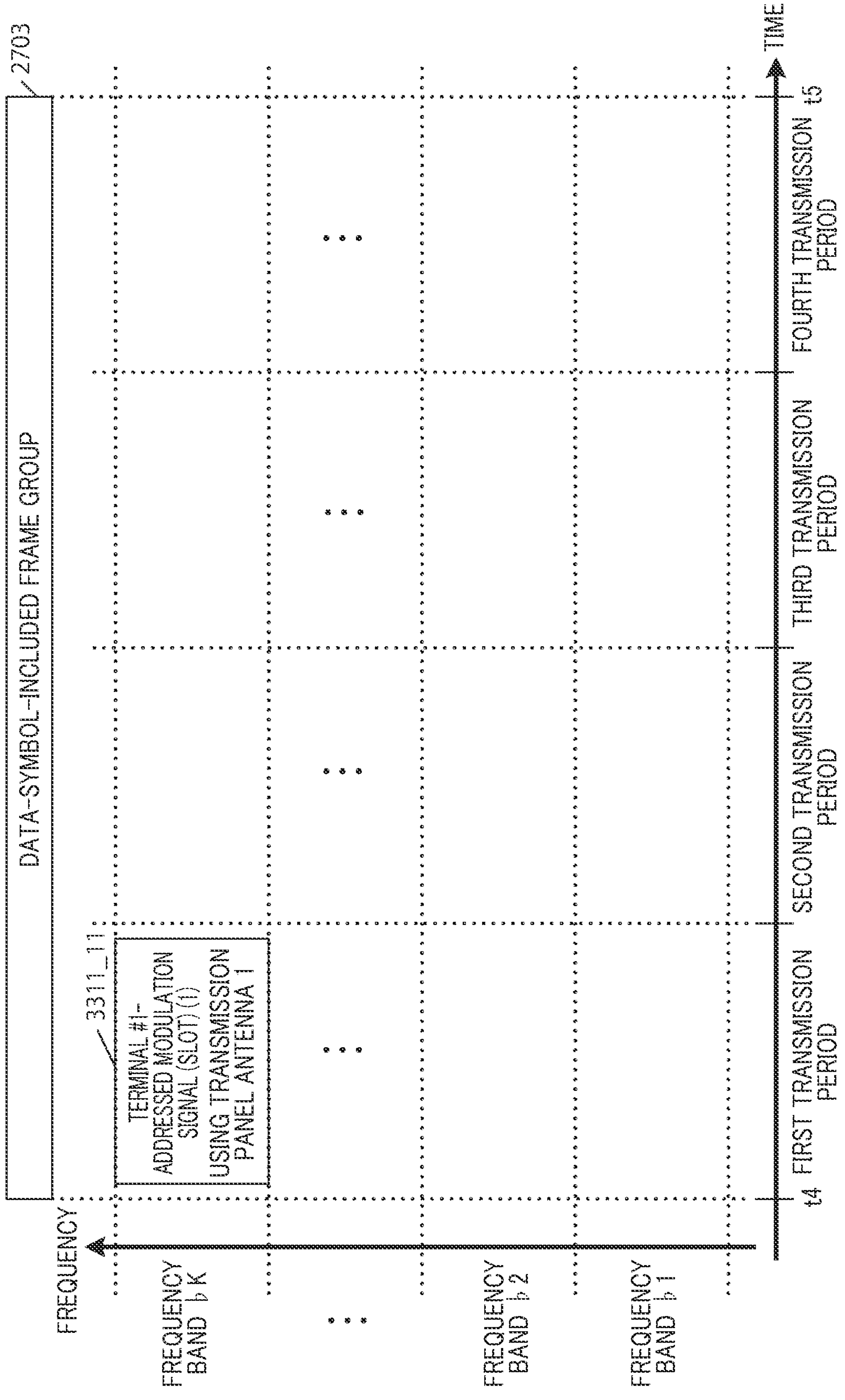
FIG. 33A illustrates the third example of the configuration of the data-symbol-included frame group that is present in the time period from t4 to t5 in FIG. 27 and transmitted by base station #1.
Figure 33B:
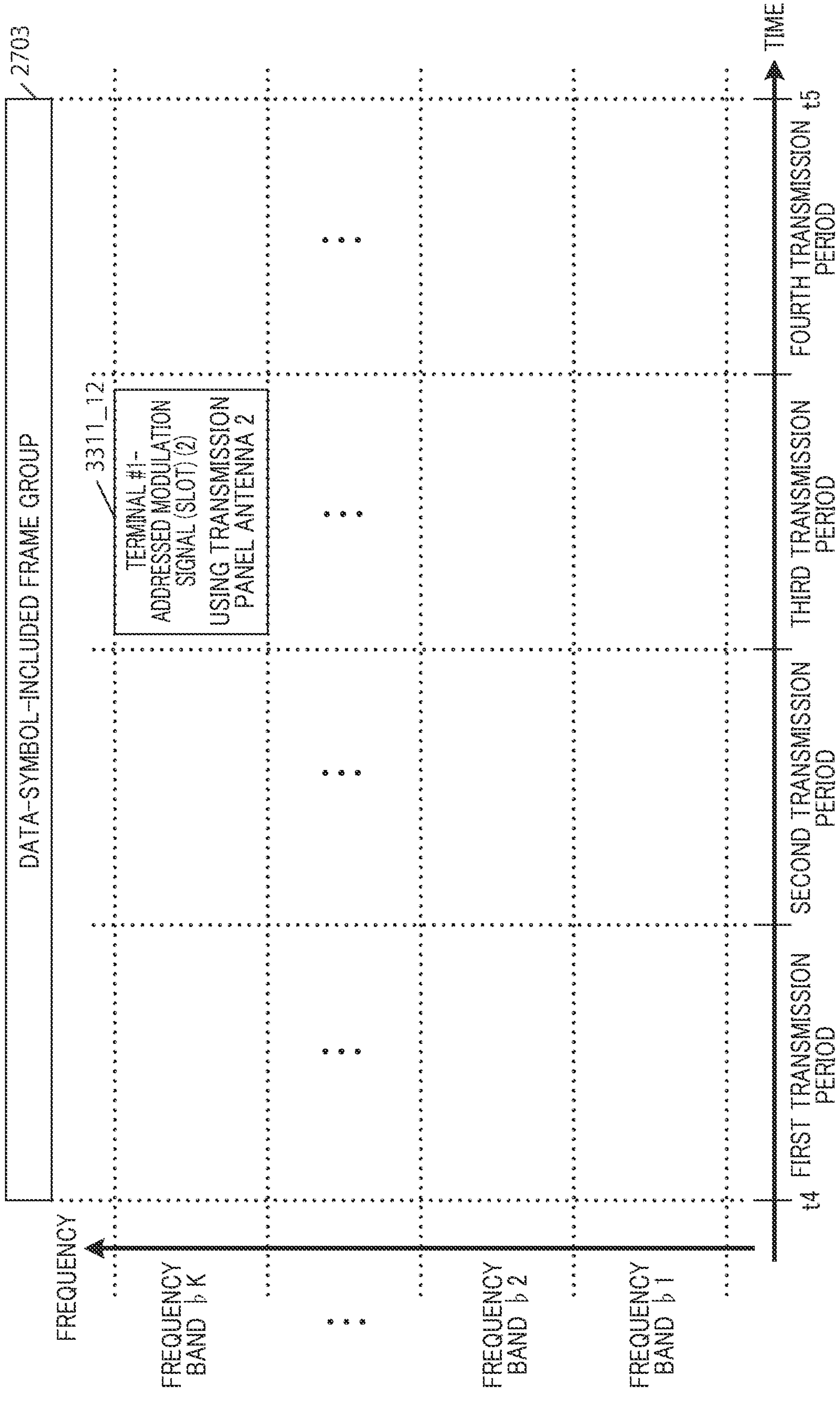
FIG. 33B illustrates the third example of the configuration of the data-symbol-included frame group that is present in the time period from t4 to t5 in FIG. 27 and transmitted by base station #1.

FIGS. 33A and 33B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 33A and 33B. In FIGS. 33A and 33B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 33A and 33B illustrate only modulation signals (slots) addressed to terminal #1 labeled 902_1. Although not illustrated in FIGS. 33A and 33B, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 3311_11 present in the first transmission period in frequency band ♭K as illustrated in FIG. 33A and terminal #1-addressed modulation signal (slot) (2) labeled 3311_12 present in the third transmission period in frequency band ♭K as illustrated in FIG. 33B.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 3311_11" present in the first transmission period in frequency band ♭K as illustrated in FIG. 33A and "terminal #1-addressed modulation signal (slot) (2) labeled 3311_12" present in the third transmission period in frequency band ♭K as illustrated in FIG. 33B. At this time, "terminal #1-addressed modulation signal (slot) (1) labeled 3311_11" is transmitted from transmission panel antenna 1 labeled 106_1 of base station #1 labeled 901_1, and "terminal #1-addressed modulation signal (slot) (2) labeled 3311_12" is transmitted from transmission panel antenna 2 labeled 106_2 of base station #1 labeled 901_1.

As described above, "terminal #1-addressed modulation signal (slot) (1) labeled 3311_11" and "terminal #1-addressed modulation signal (slot) (2) labeled 3311_12" are present because "base station #1 labeled 901_1 transmits two modulation signals (streams) to terminal #1 labeled 902_1".

At this time, "terminal #1-addressed modulation signal (slot) (1) labeled 3311_11" includes, for example, a data symbol (data and/or information) addressed to terminal #1 labeled 902_1.

In addition, "terminal #1-addressed modulation signal (slot) (2) labeled 3311_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3311_11" present in the first transmission period in frequency band ♭K as illustrated in FIG. 33A and "terminal #1-addressed modulation signal (slot) (2) labeled 3311_12" present in the third transmission period in frequency band ♭K as illustrated in FIG. 33B.

Further, there may be a modulation signal (slot) addressed to a terminal other than terminal #1 labeled 902_1 in FIGS. 33A and 33B (see FIG. 17B, for example).

The above example has described the case where base station #1 labeled 901_1 transmits, to terminal #1 labeled 902_1, "terminal #1-addressed modulation signal (slot) (1) labeled 3311_11" and "terminal #1-addressed modulation signal (slot) (2) labeled 3311_12" as illustrated in FIGS. 33A and 33B, but base station #1 labeled 901_1 may transmit three or more modulation signals (slots) (modulation signals (slots) using a plurality of time resources) to terminal #1 labeled 902_1.

Note that "terminal #1-addressed modulation signal (slot) (1) labeled 3311_11" and "terminal #1-addressed modulation signal (slot) (2) labeled 3311_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 4>

Figure 34A:
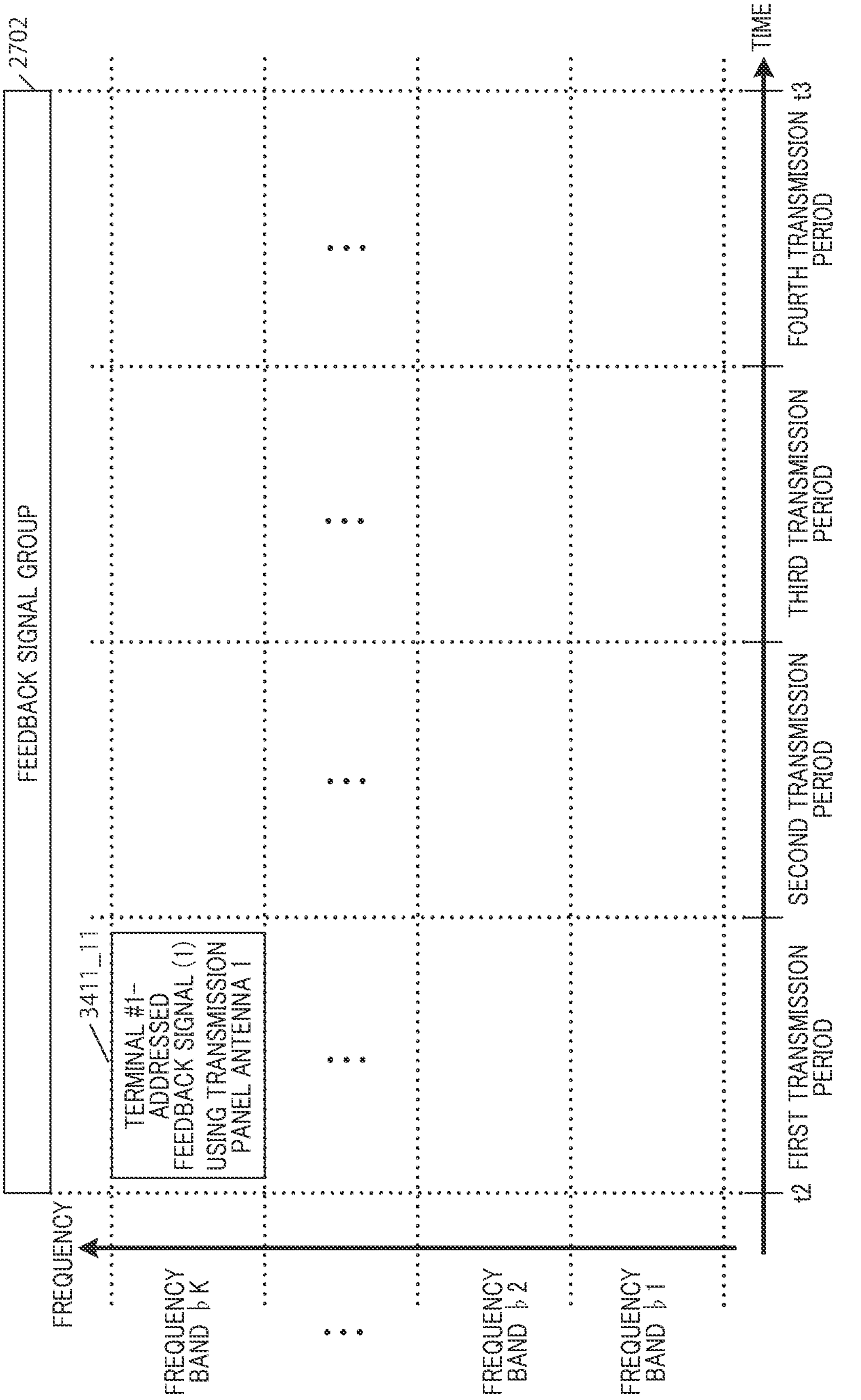
FIG. 34A illustrates the fourth example of the configuration of the feedback signal group that is present in the time period from t2 to t3 in FIG. 27 and transmitted by base station #1.
Figure 34B:
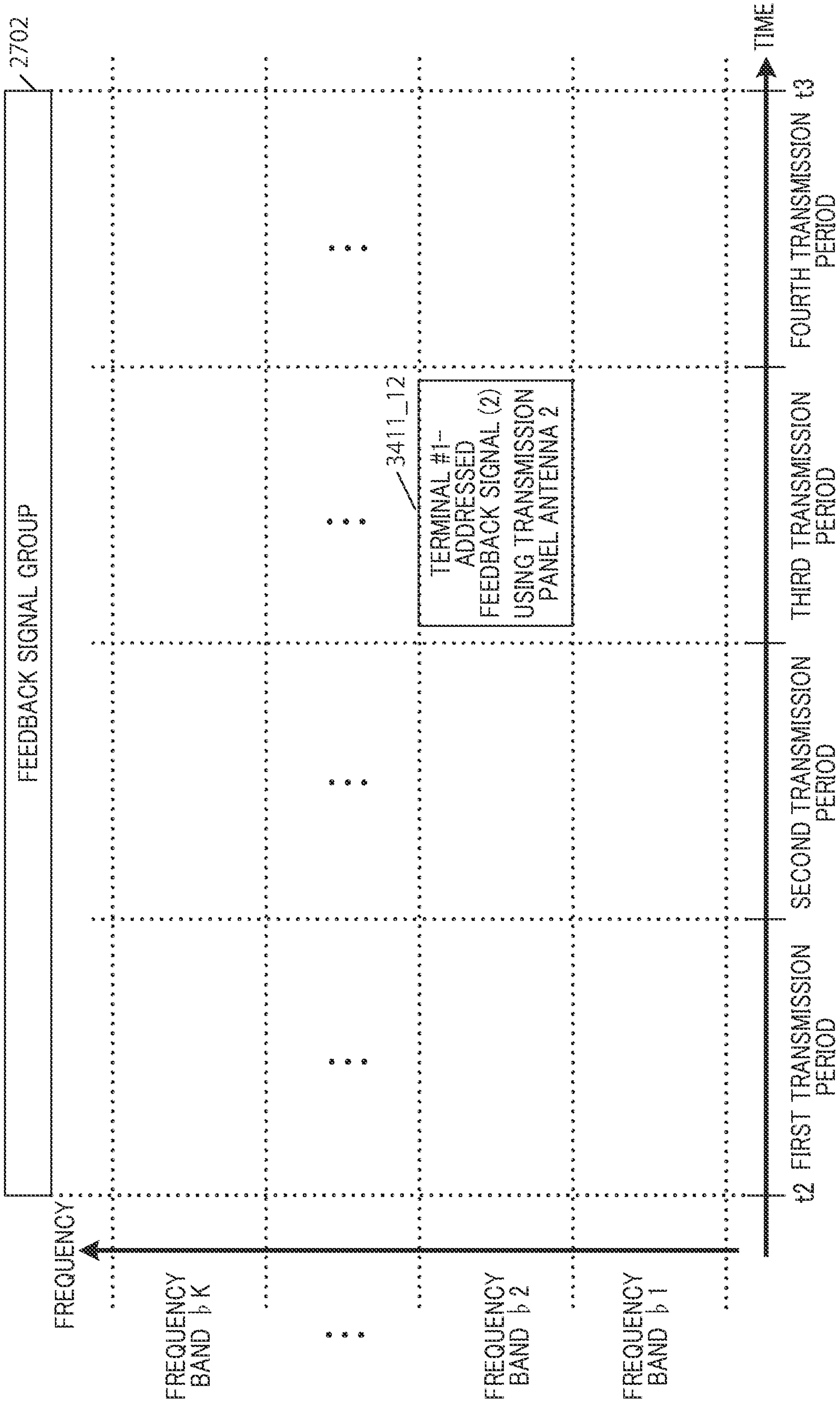
FIG. 34B illustrates the fourth example of the configuration of the feedback signal group that is present in the time period from t2 to t3 in FIG. 27 and transmitted by base station #1.

FIGS. 34A and 34B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 34A and 34B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 34A and 34B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 34A and 34B illustrate only feedback signals addressed to terminal #1 labeled 902_1. Although not illustrated in FIGS. 34A and 34B, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 3411_11 present in the first transmission period in frequency band ♭K as illustrated in FIG. 34A and terminal #1-addressed feedback signal (2) labeled 3411_12 present in the third transmission period in frequency band ♭2 as illustrated in FIG. 34B.

For example, when terminal #1 labeled 902_1 transmits sector sweep reference signal 1401_1 as illustrated in FIG. 14, base station #1 labeled 901_1 transmits, to terminal #1 labeled 902_1. "terminal #1-addressed feedback signal (1) labeled 3411_11" present in the first transmission period in frequency band ♭K as illustrated in FIG. 34A and "terminal #1-addressed feedback signal (2) labeled 3411_12" present in the third transmission period in frequency band ♭2 as illustrated in FIG. 34B. At this time, "terminal #1-addressed feedback signal (1) labeled 3411_11" is transmitted from transmission panel antenna 1 labeled 106_1 of base station #1 labeled 901_1, and "terminal #1-addressed feedback signal (2) labeled 3411_12" is transmitted from transmission panel antenna 2 labeled 106_2 of base station #1 labeled 901_1.

As described above, "terminal #1-addressed feedback signal (1) labeled 3411_11" and "terminal #1-addressed feedback signal (2) labeled 3411_12" are present because "base station #1 labeled 901_1 transmits two modulation signals (streams) to terminal #1 labeled 902_1".

At this time, "terminal #1-addressed feedback signal (1) labeled 3411_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 3411_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3411_11" present in the first transmission period in frequency band ♭K as illustrated in FIG. 34A and "terminal #1-addressed feedback signal (2) labeled 3411_12" present in the third transmission period in frequency band ♭2 as illustrated in FIG. 34B.

Further, there may be a feedback signal addressed to a terminal other than terminal #1 labeled 902_1 in FIGS. 34A and 34B (see FIG. 16B, for example).

The above example has described the case where base station #1 labeled 901_1 transmits, to terminal #1 labeled 902_1, "terminal #1-addressed feedback signal (1) labeled 3411_11" and "terminal #1-addressed feedback signal (2) labeled 3411_12" as illustrated in FIGS. 34A and 34B, but base station #1 labeled 901_1 may transmit three or more feedback signals to terminal #1 labeled 902_1.

Figure 35A:
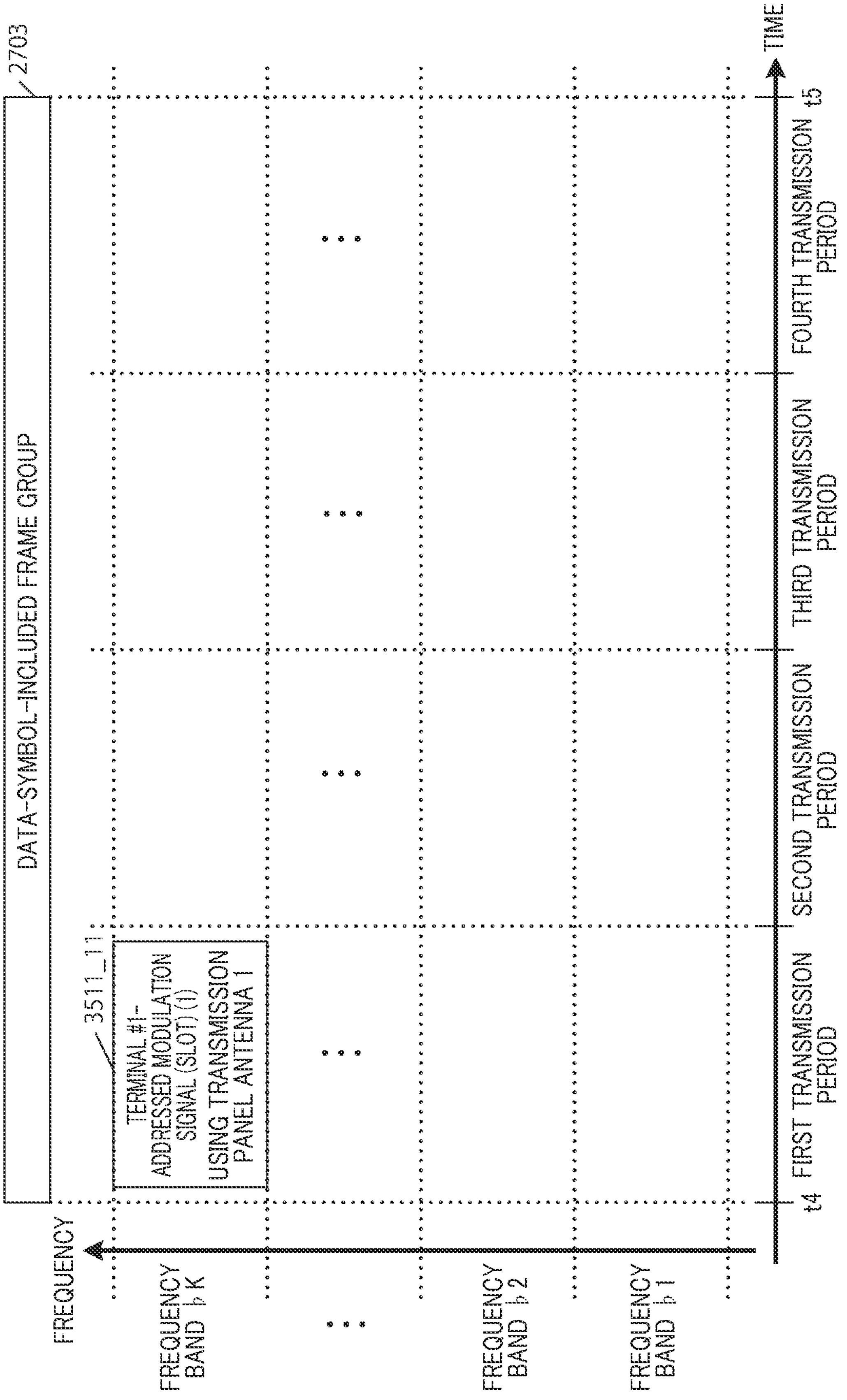
FIG. 35A illustrates the fourth example of the configuration of the data-symbol-included frame group that is present in the time period from t4 to t5 in FIG. 27 and transmitted by base station #1.
Figure 35B:
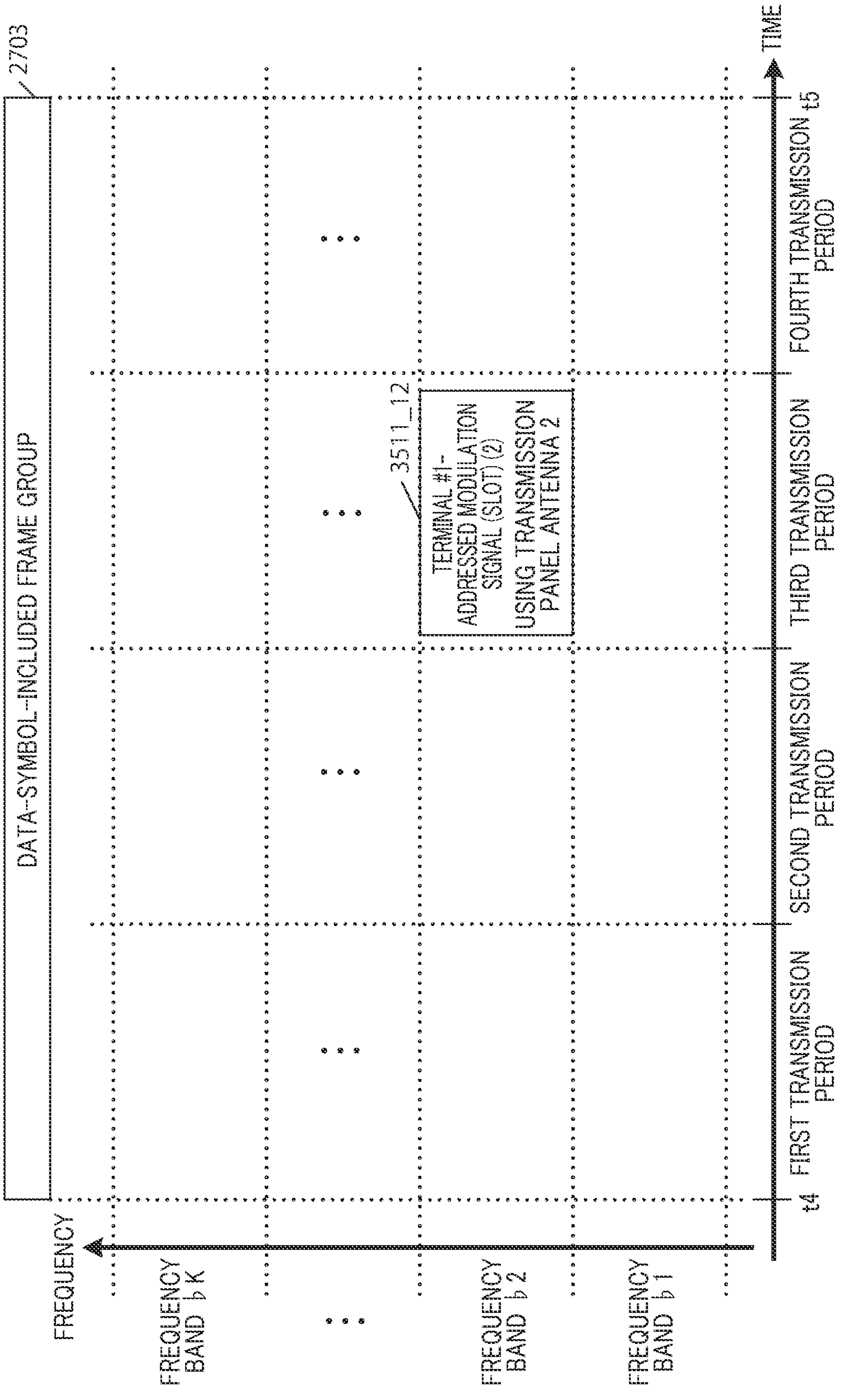
FIG. 35B illustrates the fourth example of the configuration of the data-symbol-included frame group that is present in the time period from t4 to t5 in FIG. 27 and transmitted by base station #1.

FIGS. 35A and 35B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 35A and 35B. In FIGS. 35A and 35B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 35A and 35B illustrate only modulation signals (slots) addressed to terminal #1 labeled 902_1. Although not illustrated in FIGS. 35A and 35B, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 3511_11 present in the first transmission period in frequency band ♭K as illustrated in FIG. 35A and terminal #1-addressed modulation signal (slot) (2) labeled 3511_12 present in the third transmission period in frequency band ♭2 as illustrated in FIG. 35B.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 3511_11" present in the first transmission period in frequency band ♭K as illustrated in FIG. 35A and "terminal #1-addressed modulation signal (slot) (2) labeled 3511_12" present in the third transmission period in frequency band ♭2 as illustrated in FIG. 35B. At this time, "terminal #1-addressed modulation signal (slot) (1) labeled 3511_11" is transmitted from transmission panel antenna 1 labeled 106_1 of base station #1 labeled 901_1, and "terminal #1-addressed modulation signal (slot) (2) labeled 3511_12" is transmitted from transmission panel antenna 2 labeled 106_2 of base station #1 labeled 901_1.

As described above, "terminal #1-addressed modulation signal (slot) (1) labeled 3511_11" and "terminal #1-addressed modulation signal (slot) (2) labeled 3511_12" are present because "base station #1 labeled 901_1 transmits two modulation signals (streams) to terminal #1 labeled 902_1".

At this time, "terminal #1-addressed modulation signal (slot) (1) labeled 3511_11" includes, for example, a data symbol (data and/or information) addressed to terminal #1 labeled 902_1.

In addition, "terminal #1-addressed modulation signal (slot) (2) labeled 3511_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3511_11" present in the first transmission period in frequency band ♭K as illustrated in FIG. 35A and "terminal #1-addressed modulation signal (slot) (2) labeled 3511_12" present in the third transmission period in frequency band ♭2 as illustrated in FIG. 35B.

Further, there may be a modulation signal (slot) addressed to a terminal other than terminal #1 labeled 902_1 in FIGS. 35A and 35B (see FIG. 17B, for example).

The above example has described the case where base station #1 labeled 901_1 transmits, to terminal #1 labeled 902_1, "terminal #1-addressed modulation signal (slot) (1) labeled 3511_11" and "terminal #1-addressed modulation signal (slot) (2) labeled 3511_12" as illustrated in FIGS. 35A and 35B, but base station #1 labeled 901_1 may transmit three or more modulation signals (slots) (modulation signals (slots) using a plurality of frequency and time resources) to terminal #1 labeled 902_1.

Note that "terminal #1-addressed modulation signal (slot) (1) labeled 3511_11" and "terminal #1-addressed modulation signal (slot) (2) labeled 3511_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 5>

Figure 36:
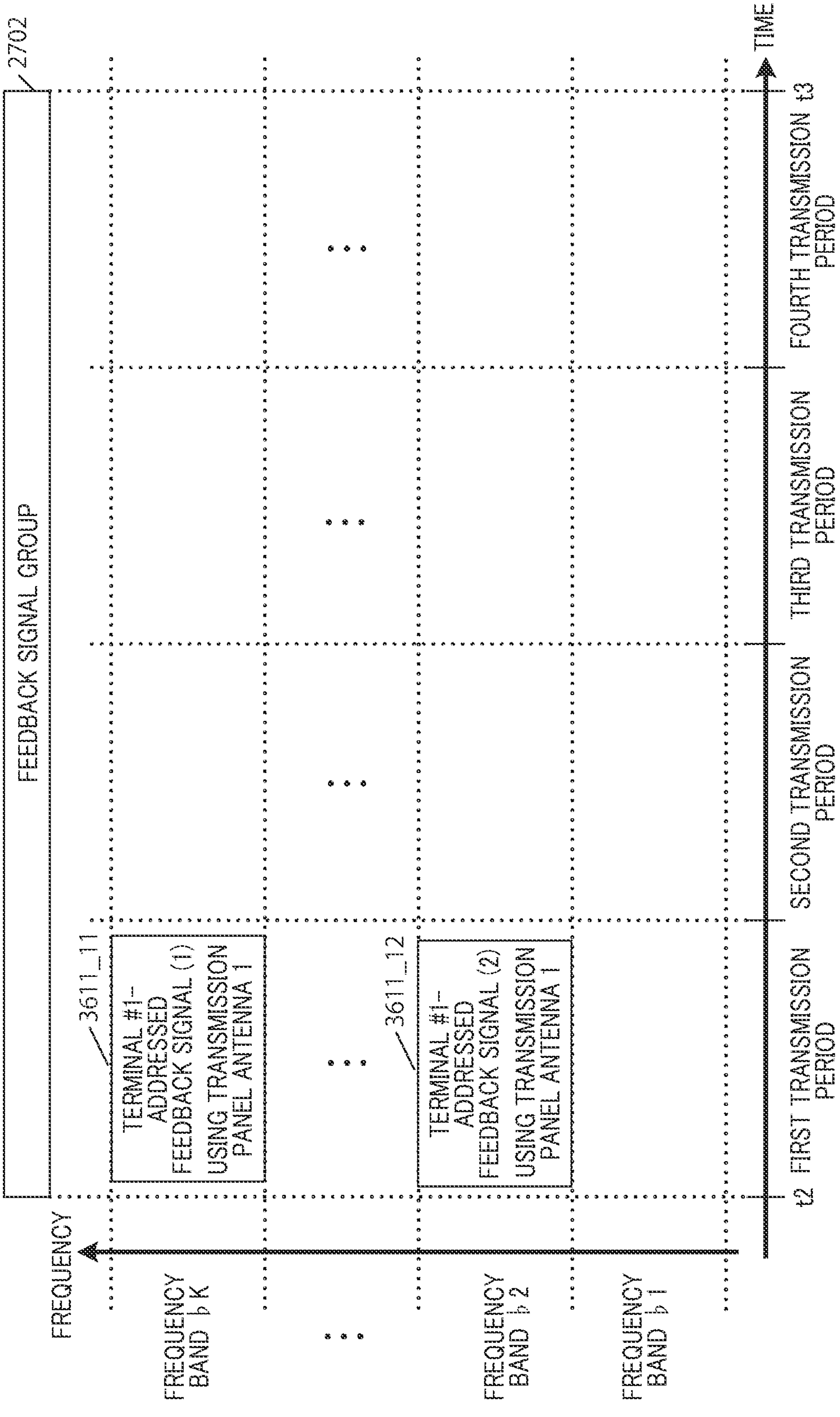
FIG. 36 illustrates the fifth example of the configuration of the feedback signal group that is present in the time period from t2 to t3 in FIG. 27 and transmitted by base station #1.

FIG. 36 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 36. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 36, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 36 illustrates only feedback signals addressed to terminal #1 labeled 902_1. Although not illustrated in FIG. 36, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 3611_11 present in the first transmission period in frequency band ♭K and terminal #1-addressed feedback signal (2) labeled 3611_12 present in the first transmission period in frequency band ♭2 as illustrated in FIG. 36.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 3611_11" present in the first transmission period in frequency band ♭K and "terminal #1-addressed feedback signal (2) labeled 3611_12" present in the first transmission period in frequency band ♭2 as illustrated in FIG. 36. At this time, both "terminal #1-addressed feedback signal (1) labeled 3611_11" and "terminal #1-addressed feedback signal (2) labeled 3611_12" are transmitted from transmission panel antenna 1 labeled 106_1 of base station #1 labeled 901_1, which means that a single transmission panel antenna has been selected.

As described above, "terminal #1-addressed feedback signal (1) labeled 3611_11" and "terminal #1-addressed feedback signal (2) labeled 3611_12" are present because "base station #1 labeled 901_1 transmits two resources (slots) to terminal #1 labeled 902_1".

At this time, "terminal #1-addressed feedback signal (1) labeled 3611_11" and "terminal #1-addressed feedback signal (2) labeled 3611_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3611_11" present in the first transmission period in frequency band ♭K and "terminal #1-addressed feedback signal (2) labeled 3611_12" present in the first transmission period in frequency band ♭2 as illustrated in FIG. 36.

Further, there may be a feedback signal addressed to a terminal other than terminal #1 labeled 902_1 in FIG. 36 (see FIG. 16B, for example).

The above example has described the case where base station #1 labeled 901_1 transmits, to terminal #1 labeled 902_1, "terminal #1-addressed feedback signal (1) labeled 3611_11" and "terminal #1-addressed feedback signal (2) labeled 3611_12" as illustrated in FIG. 36, but base station #1 labeled 901_1 may transmit three or more feedback signals to terminal #1 labeled 902_1.

Figure 37:
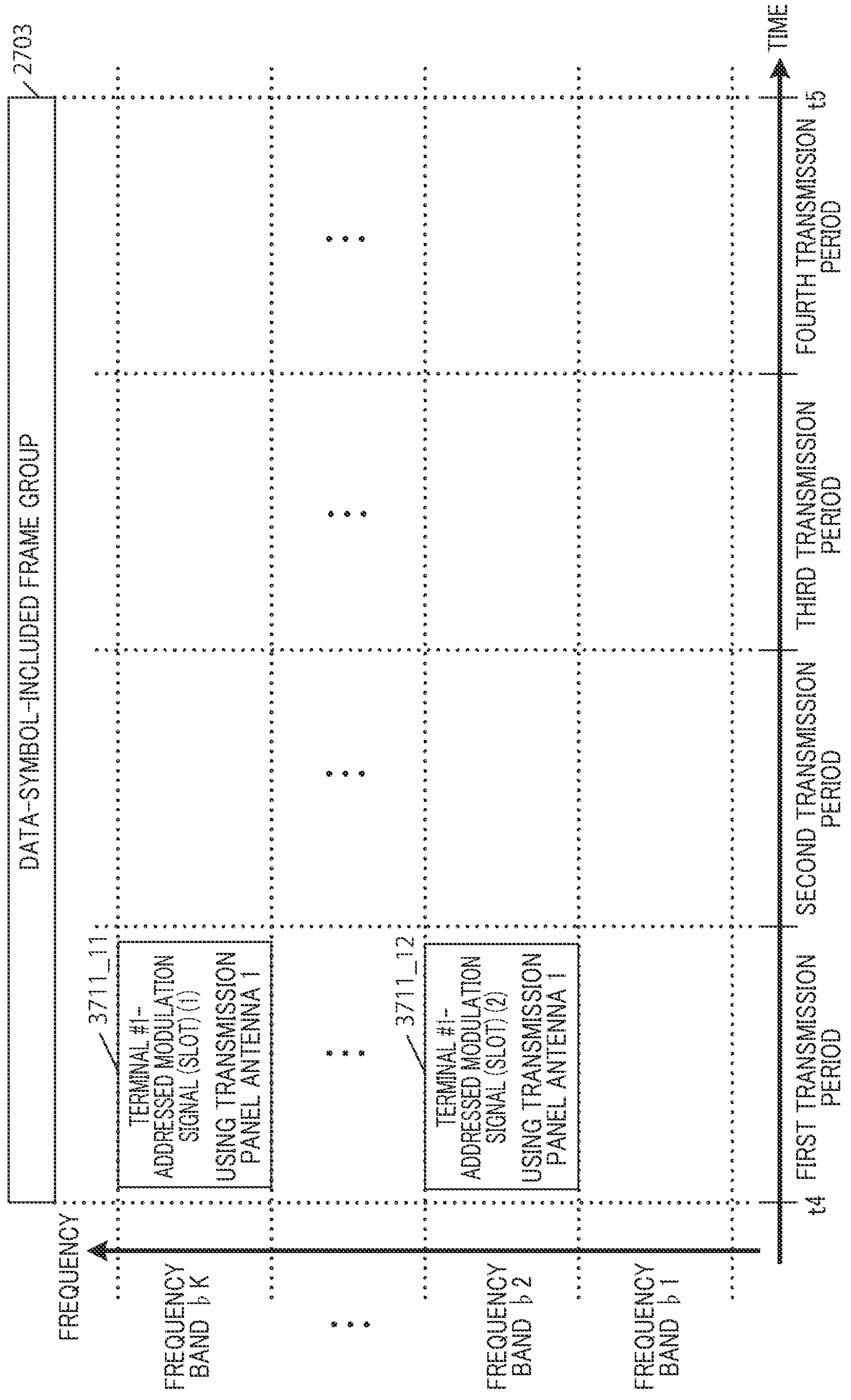
FIG. 37 illustrates the fifth example of the configuration of the data-symbol-included frame group that is present in the time period from t4 to t5 in FIG. 27 and transmitted by base station #1.

FIG. 37 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 37. In FIG. 37, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 37 illustrates only modulation signals (slots) addressed to terminal #1 labeled 902_1. Although not illustrated in FIG. 37, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 3711_11 present in the first transmission period in frequency band ♭K and terminal #1-addressed modulation signal (slot) (2) labeled 3711_12 present in the first transmission period in frequency band ♭2 as illustrated in FIG. 37.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 3711_11" present in the first transmission period in frequency band ♭K and "terminal #1-addressed modulation signal (slot) (2) labeled 3711_12" present in the first transmission period in frequency band ♭2 as illustrated in FIG. 37. At this time, "terminal #1-addressed modulation signal (slot) (1) labeled 3711_11" and "terminal #1-addressed modulation signal (slot) (2) labeled 3711_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 3711_11" and "terminal #1-addressed modulation signal (slot) (2) labeled 3711_12" are present because "base station #1 labeled 901_1 transmits two resources (slots) to terminal #1 labeled 902_1".

At this time, "terminal #1-addressed modulation signal (slot) (1) labeled 3711_11" and "terminal #1-addressed modulation signal (slot) (2) labeled 3711_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3711_11" present in the first transmission period in frequency band ♭K and "terminal #1-addressed modulation signal (slot) (2) labeled 3711_12" present in the first transmission period in frequency band ♭2 as illustrated in FIG. 37.

Further, there may be a modulation signal (slot) addressed to a terminal other than terminal #1 labeled 902_1 in FIG. 37 (see FIG. 17B, for example).

The above example has described the case where base station #1 labeled 901_1 transmits, to terminal #1 labeled 902_1, "terminal #1-addressed modulation signal (slot) (1) labeled 3711_11" and "terminal #1-addressed modulation signal (slot) (2) labeled 3711_12" as illustrated in FIG. 37, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 3711_11" and "terminal #1-addressed modulation signal (slot) (2) labeled 3711_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 6>

Figure 38:
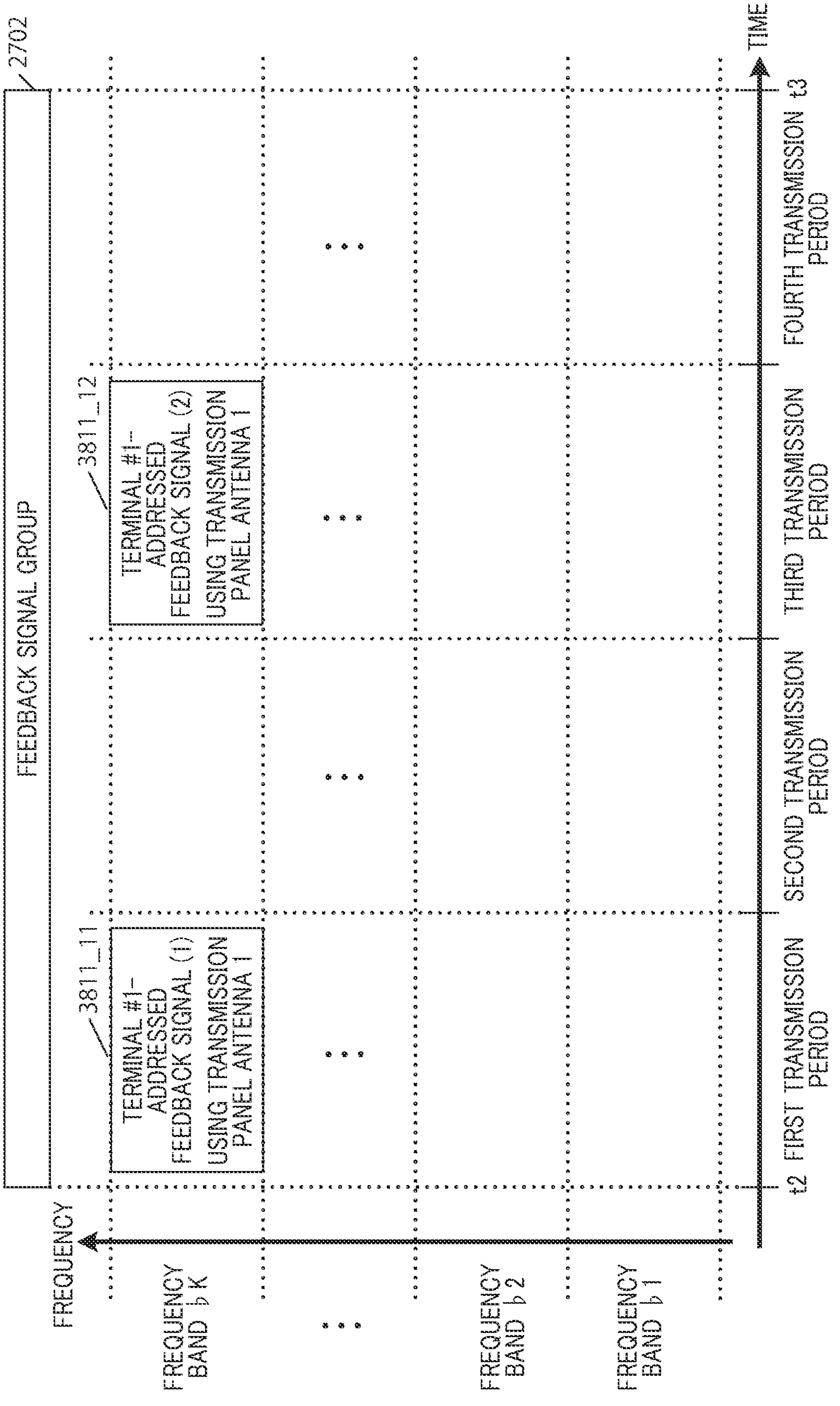
FIG. 38 illustrates the sixth example of the configuration of the feedback signal group that is present in the time period from t2 to t3 in FIG. 27 and transmitted by base station #1.

FIG. 38 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 38. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 38, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 38 illustrates only feedback signals addressed to terminal #1 labeled 902_1. Although not illustrated in FIG. 38, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 3811_11 present in the first transmission period in frequency band ♭K and terminal #1-addressed feedback signal (2) labeled 3811_12 present in the third transmission period in frequency band ♭K as illustrated in FIG. 38.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 3811_11" present in the first transmission period in frequency band ♭K and "terminal #1-addressed feedback signal (2) labeled 3811_12" present in the third transmission period in frequency band ♭K as illustrated in FIG. 38. At this time, both "terminal #1-addressed feedback signal (1) labeled 3811_11" and "terminal #1-addressed feedback signal (2) labeled 3811_12" are transmitted from transmission panel antenna 1 labeled 106_1 of base station #1 labeled 901_1, which means that a single transmission panel antenna has been selected.

As described above, "terminal #1-addressed feedback signal (1) labeled 3811_11" and "terminal #1-addressed feedback signal (2) labeled 3811_12" are present because "base station #1 labeled 901_1 transmits two resources (slots) to terminal #1 labeled 902_1".

At this time, "terminal #1-addressed feedback signal (1) labeled 3811_11" and "terminal #1-addressed feedback signal (2) labeled 3811_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3811_11" present in the first transmission period in frequency band ♭K and "terminal #1-addressed feedback signal (2) labeled 3811_12" present in the third transmission period in frequency band ♭K as illustrated in FIG. 38.

Further, there may be a feedback signal addressed to a terminal other than terminal #1 labeled 902_1 in FIG. 38 (see FIG. 16B, for example).

The above example has described the case where base station #1 labeled 901_1 transmits, to terminal #1 labeled 902_1, "terminal #1-addressed feedback signal (1) labeled 3811_11" and "terminal #1-addressed feedback signal (2) labeled 3811_12" as illustrated in FIG. 38, but base station #1 labeled 901_1 may transmit three or more feedback signals to terminal #1 labeled 902_1.

Figure 39:
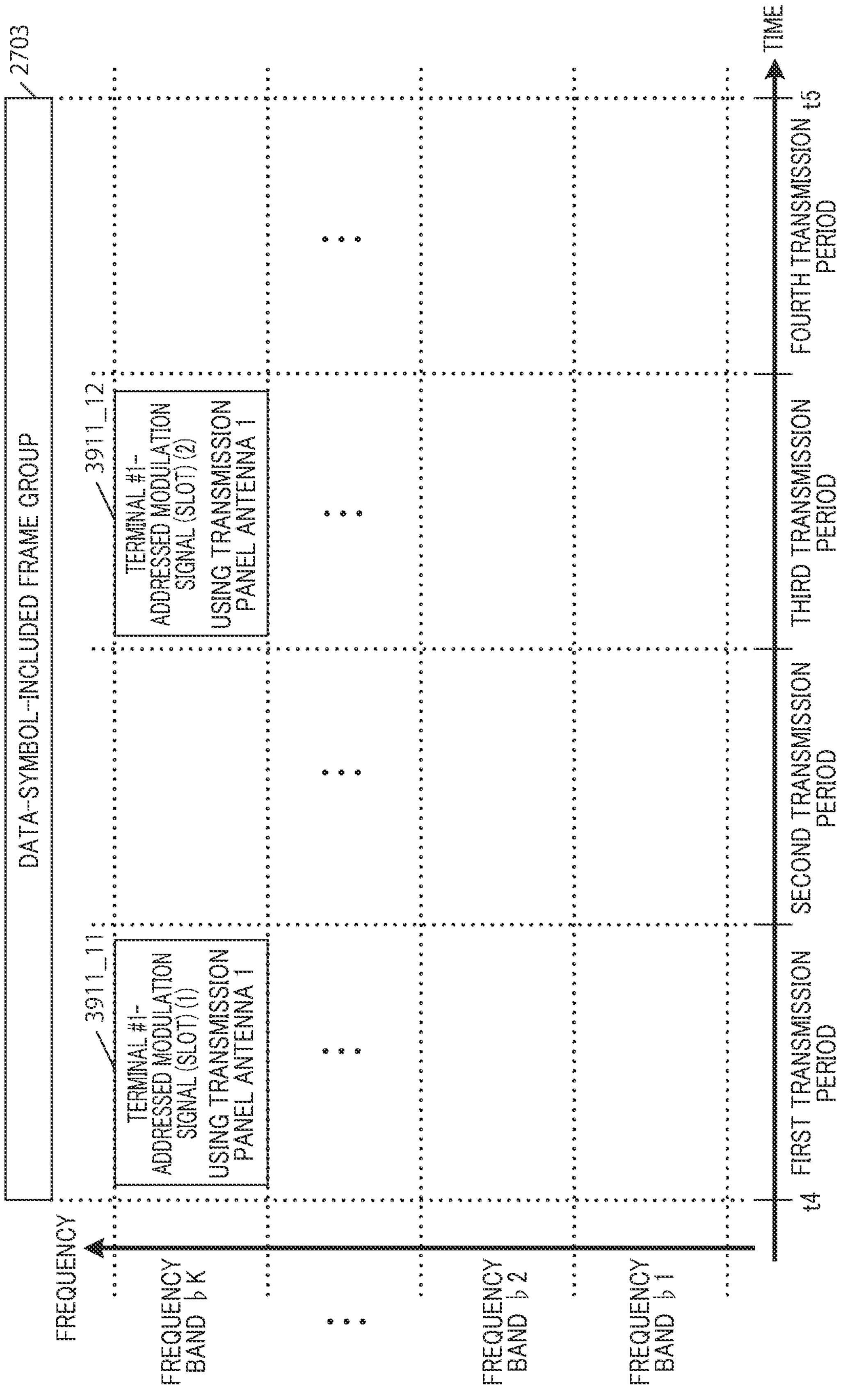
FIG. 39 illustrates the sixth example of the configuration of the data-symbol-included frame group that is present in the time period from t4 to t5 in FIG. 27 and transmitted by base station #1.

FIG. 39 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 39. In FIG. 39, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 39 illustrates only modulation signals (slots) addressed to terminal #1 labeled 902_1. Although not illustrated in FIG. 39, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 3911_11 present in the first transmission period in frequency band ♭K and terminal #1-addressed modulation signal (slot) (2) labeled 3911_12 present in the third transmission period in frequency band ♭K as illustrated in FIG. 39.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 3911_11" present in the first transmission period in frequency band ♭K and "terminal #1-addressed modulation signal (slot) (2) labeled 3911_12" present in the third transmission period in frequency band ♭K as illustrated in FIG. 39. At this time, "terminal #1-addressed modulation signal (slot) (1) labeled 3911_11" and "terminal #1-addressed modulation signal (slot) (2) labeled 3911_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 3911_11" and "terminal #1-addressed modulation signal (slot) (2) labeled 3911_12" are present because "base station #1 labeled 901_1 transmits two resources (slots) to terminal #1 labeled 902_1".

At this time, "terminal #1-addressed modulation signal (slot) (1) labeled 3911_11" and "terminal #1-addressed modulation signal (slot) (2) labeled 3911_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3911_11" present in the first transmission period in frequency band ♭K and "terminal #1-addressed modulation signal (slot) (2) labeled 3911_12" present in the third transmission period in frequency band ♭K as illustrated in FIG. 39.

Further, there may be a modulation signal (slot) addressed to a terminal other than terminal #1 labeled 902_1 in FIG. 39 (see FIG. 17B, for example).

The above example has described the case where base station #1 labeled 901_1 transmits, to terminal #1 labeled 902_1, "terminal #1-addressed modulation signal (slot) (1) labeled 3911_11" and "terminal #1-addressed modulation signal (slot) (2) labeled 3911_12" as illustrated in FIG. 39, but base station #1 labeled 901_1 may transmit three or more modulation signals (slots) (modulation signals (slots) using a plurality of time resources) to terminal #1 labeled 902_1.

Note that "terminal #1-addressed modulation signal (slot) (1) labeled 3911_11" and "terminal #1-addressed modulation signal (slot) (2) labeled 3911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 7>

Figure 40:
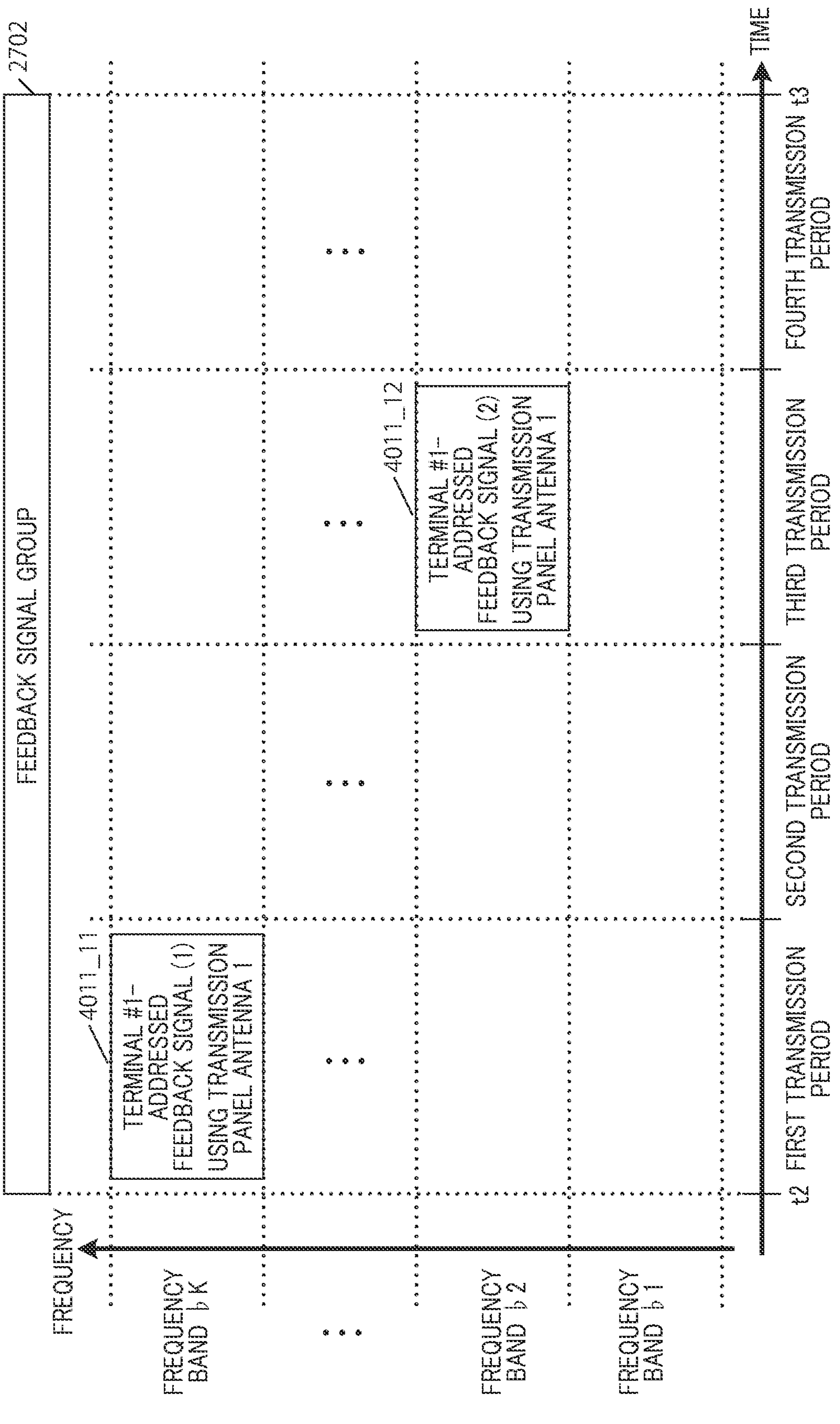
FIG. 40 illustrates the seventh example of the configuration of the feedback signal group that is present in the time period from t2 to t3 in FIG. 27 and transmitted by base station #1.

FIG. 40 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 40. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 40, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 40 illustrates only feedback signals addressed to terminal #1 labeled 902_1. Although not illustrated in FIG. 40, there may be a feedback signal addressed to a terminal other than terminal #1 labeled 902_1.

In this example, since "the number of time divisions in which sector sweep reference signals can be transmitted when the terminals transmit the sector sweep reference signals" is four, feedback signal group 2702 includes terminal #1-addressed feedback signal (1) labeled 4011_11 present in the first transmission period in frequency band ♭K and terminal #1-addressed feedback signal (2) labeled 4011_12 present in the third transmission period in frequency band ♭2 as illustrated in FIG. 40.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed feedback signal (1) labeled 4011_11" present in the first transmission period in frequency band ♭K and "terminal #1-addressed feedback signal (2) labeled 4011_12" present in the third transmission period in frequency band ♭2 as illustrated in FIG. 40. At this time, both "terminal #1-addressed feedback signal (1) labeled 4011_11" and "terminal #1-addressed feedback signal (2) labeled 4011_12" are transmitted from transmission panel antenna 1 labeled 106_1 of base station #1 labeled 901_1, which means that a single transmission panel antenna has been selected.

As described above, "terminal #1-addressed feedback signal (1) labeled 4011_11" and "terminal #1-addressed feedback signal (2) labeled 4011_12" are present because "base station #1 labeled 901_1 transmits two resources (slots) to terminal #1 labeled 902_1".

At this time, "terminal #1-addressed feedback signal (1) labeled 4011_11" and "terminal #1-addressed feedback signal (2) labeled 4011_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 4011_11" present in the first transmission period in frequency band ♭K and "terminal #1-addressed feedback signal (2) labeled 4011_12" present in the third transmission period in frequency band ♭2 as illustrated in FIG. 40.

Further, there may be a feedback signal addressed to a terminal other than terminal #1 labeled 902_1 in FIG. 40 (see FIG. 16B, for example).

The above example has described the case where base station #1 labeled 901_1 transmits, to terminal #1 labeled 902_1, "terminal #1-addressed feedback signal (1) labeled 4011_11" and "terminal #1-addressed feedback signal (2) labeled 4011_12" as illustrated in FIG. 40, but base station #1 labeled 901_1 may transmit three or more feedback signals to terminal #1 labeled 902_1.

Figure 41:
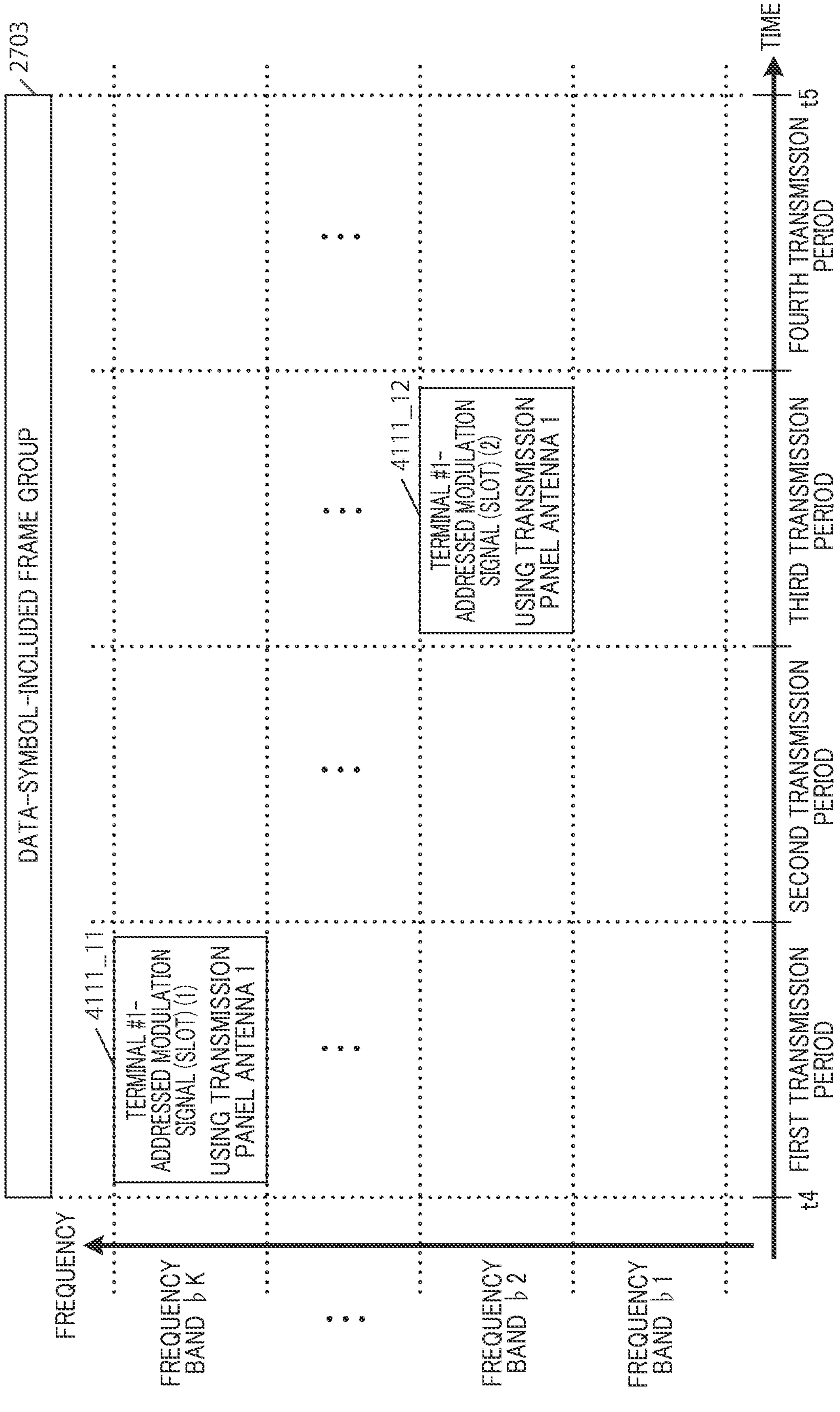
FIG. 41 illustrates the seventh example of the configuration of the data-symbol-included frame group that is present in the time period from t4 to t5 in FIG. 27 and transmitted by base station #1.

FIG. 41 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 41. In FIG. 41, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 41 illustrates only modulation signals (slots) addressed to terminal #1 labeled 902_1. Although not illustrated in FIG. 41, there may be a modulation signal (slot) addressed to a terminal other than terminal #1 labeled 902_1.

In this example, since "the number of time divisions in which sector sweep reference signals can be transmitted when the terminals transmit the sector sweep reference signals" is four, data-symbol-included frame group 2703 includes terminal #1-addressed modulation signal (slot) (1) labeled 4111_11 present in the first transmission period in frequency band ♭K and terminal #1-addressed modulation signal (slot) (2) labeled 4111_12 present in the third transmission period in frequency band ♭2 as illustrated in FIG. 41.

For example, when terminal #1 labeled 902_1 transmits sector sweep reference signal 1401_1 as illustrated in FIG. 14, base station #1 labeled 901_1 transmits, to terminal #1 labeled 902_1, "terminal #1-addressed modulation signal (slot) (1) labeled 4111_11" present in the first transmission period in frequency band ♭K and "terminal #1-addressed modulation signal (slot) (2) labeled 4111_12" present in the third transmission period in frequency band ♭2 as illustrated in FIG. 41. At this time, "terminal #1-addressed modulation signal (slot) (1) labeled 4111_11" and "terminal #1-addressed modulation signal (slot) (2) labeled 4111_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 4111_11" and "terminal #1-addressed modulation signal (slot) (2) labeled 4111_12" are present because "base station #1 labeled 901_1 transmits two resources (slots) to terminal #1 labeled 902_1".

At this time, "terminal #1-addressed modulation signal (slot) (1) labeled 4111_11" and "terminal #1-addressed modulation signal (slot) (2) labeled 4111_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 4111_11" present in the first transmission period in frequency band ♭K and "terminal #1-addressed modulation signal (slot) (2) labeled 4111_12" present in the third transmission period in frequency band ♭2 as illustrated in FIG. 41.

Further, there may be a modulation signal (slot) addressed to a terminal other than terminal #1 labeled 902_1 in FIG. 41 (see FIG. 17B, for example).

The above example has described the case where base station #1 labeled 901_1 transmits, to terminal #1 labeled 902_1, "terminal #1-addressed modulation signal (slot) (1) labeled 4111_11" and "terminal #1-addressed modulation signal (slot) (2) labeled 4111_12" as illustrated in FIG. 41, but base station #1 labeled 901_1 may transmit three or more modulation signals (slots) (modulation signals (slots) using a plurality of frequency and time resources) to terminal #1 labeled 902_1.

Note that "terminal #1-addressed modulation signal (slot) (1) labeled 4111_11" and "terminal #1-addressed modulation signal (slot) (2) labeled 4111_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

As described thus far, transmitting modulation signals according to <Case 1> to <Case 7>, for example, reduces interference between the modulation signals, and efficiently assigning the modulation signals and slots produces an effect of enhancing data transmission efficiency.

Note that the base station and the terminals may perform communication according to any of the methods of <Case 1> to <Case 7>, and the base station and the terminals may perform communication selecting any of the communication methods of <Case 1> to <Case 7> depending on the radio propagation environment, the communication state, etc.

Figure 42:
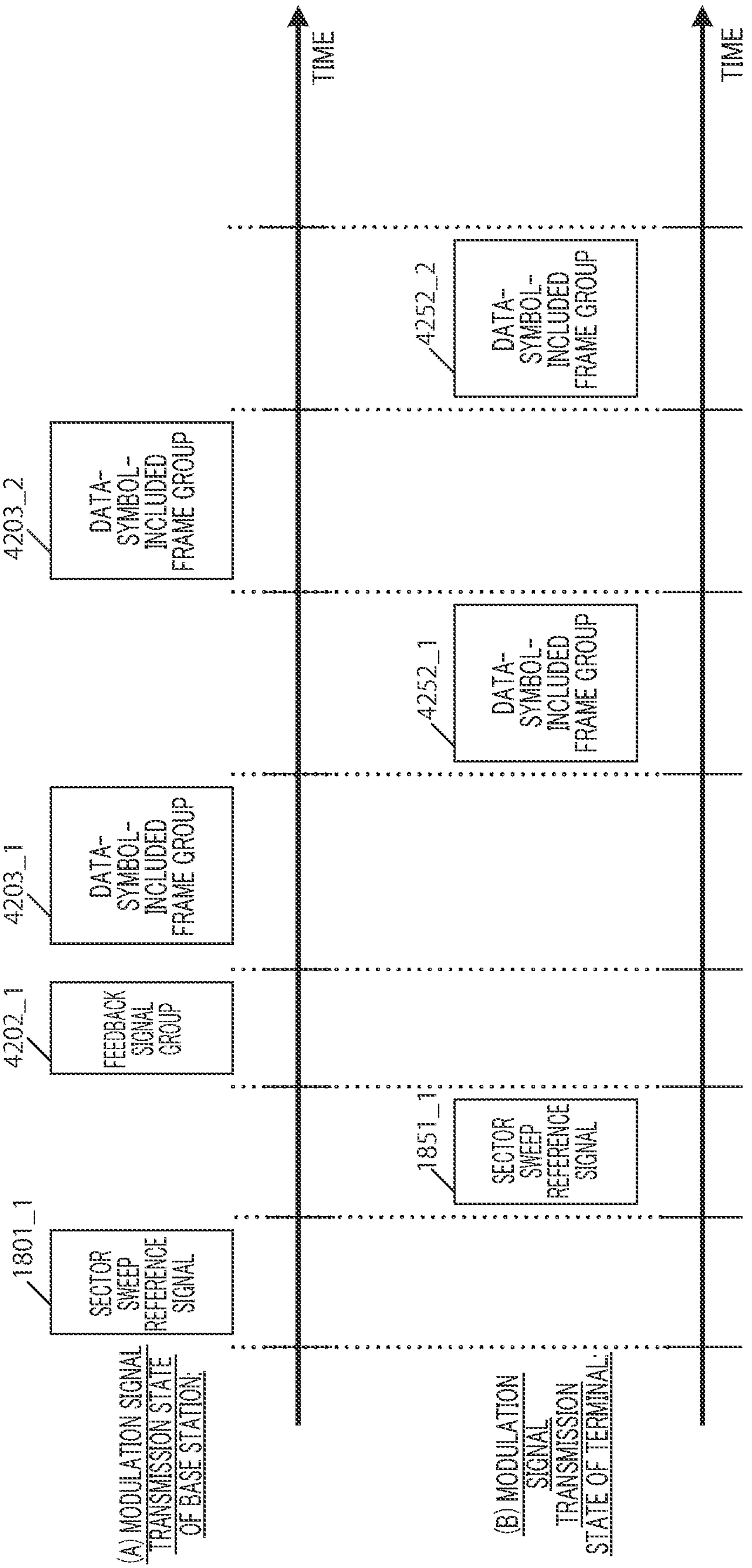
FIG. 42 illustrates an exemplary state where base station #1 and a "terminal such as terminal #1" communicate with each other in FIG. 9.

FIG. 42 illustrates an exemplary state where base station #1 labeled 901_1 and a "terminal such as terminal #1 labeled 902_1" communicate with each other in FIG. 9. (A) of FIG. 42 illustrates an exemplary modulation signal transmission state of base station #1 labeled 901_1, and (B) of FIG. 42 illustrates an exemplary modulation signal transmission state of the "terminal such as terminal #1 labeled 902_1". Note that the horizontal axes represent time in (A) and (B) of FIG. 42. Note that, in FIG. 42, the components that operate in the same manner as in FIG. 18 are denoted by the same reference signs.

First, base station #1 labeled 901_1 transmits sector sweep reference signal 1801_1. Note that this has already been described with reference to FIG. 27, and the description thereof will be thus omitted.

Then, the "terminal such as terminal #1 labeled 902_1" transmits sector sweep reference signal 1851_1. Note that this has already been described with reference to, for example, FIGS. 13, 14, etc., and the description thereof will be thus omitted.

Base station #1 labeled 901_1 transmits feedback signal group 4202_1. Note that this has already been described with reference to FIGS. 28A, 28B, 30A, 30B, 32A, 32B, 34A, 34B, 36, 38, and 40, and the description thereof will be thus omitted.

After that, base station #1 labeled 901_1 transmits "data-symbol-included frame group 4203_1". Note that this has already been described with reference to FIGS. 29A, 29B, 31A, 31B, 33A, 33B, 35A, 35B, 37, 39, and 41, and the description thereof will be thus omitted. (Hence, "data-symbol-included frame 4203_1" is considered to be a frame for downlink, for example).

Then, the "terminal such as terminal #1 labeled 902_1" transmits "data-symbol-included frame group 4252_1". Note that a configuration of the frame will be described later with reference to "FIGS. 44A and 44B", "FIGS. 45A and 45B", "FIGS. 46A and 46B", "FIGS. 47A and 47B", "FIG. 48", "FIG. 49", and "FIG. 50". (Hence, "data-symbol-included frame group 4252_1" is considered to be a frame for uplink, for example).

Next, base station #1 labeled 901_1 transmits "data-symbol-included frame group 4203_2". Note that a configuration method of "data-symbol-included frame group 4203_2" is as described with reference to FIGS. 29A, 29B, 31A, 31B, 33A, 33B, 35A, 35B, 37, 39, and 41.

Then, the terminal such as "terminal #1 labeled 902_1 and terminal #2 labeled 902_2" transmits "data-symbol-included frame group 4252_2". Note that a configuration of the frame will be described later with reference to "FIGS. 44A and 441", "FIGS. 45A and 45B", "FIGS. 46A and 46B", "FIGS. 47A and 471", "FIG. 48", "FIG. 49", and "FIG. 50".

Figure 43:
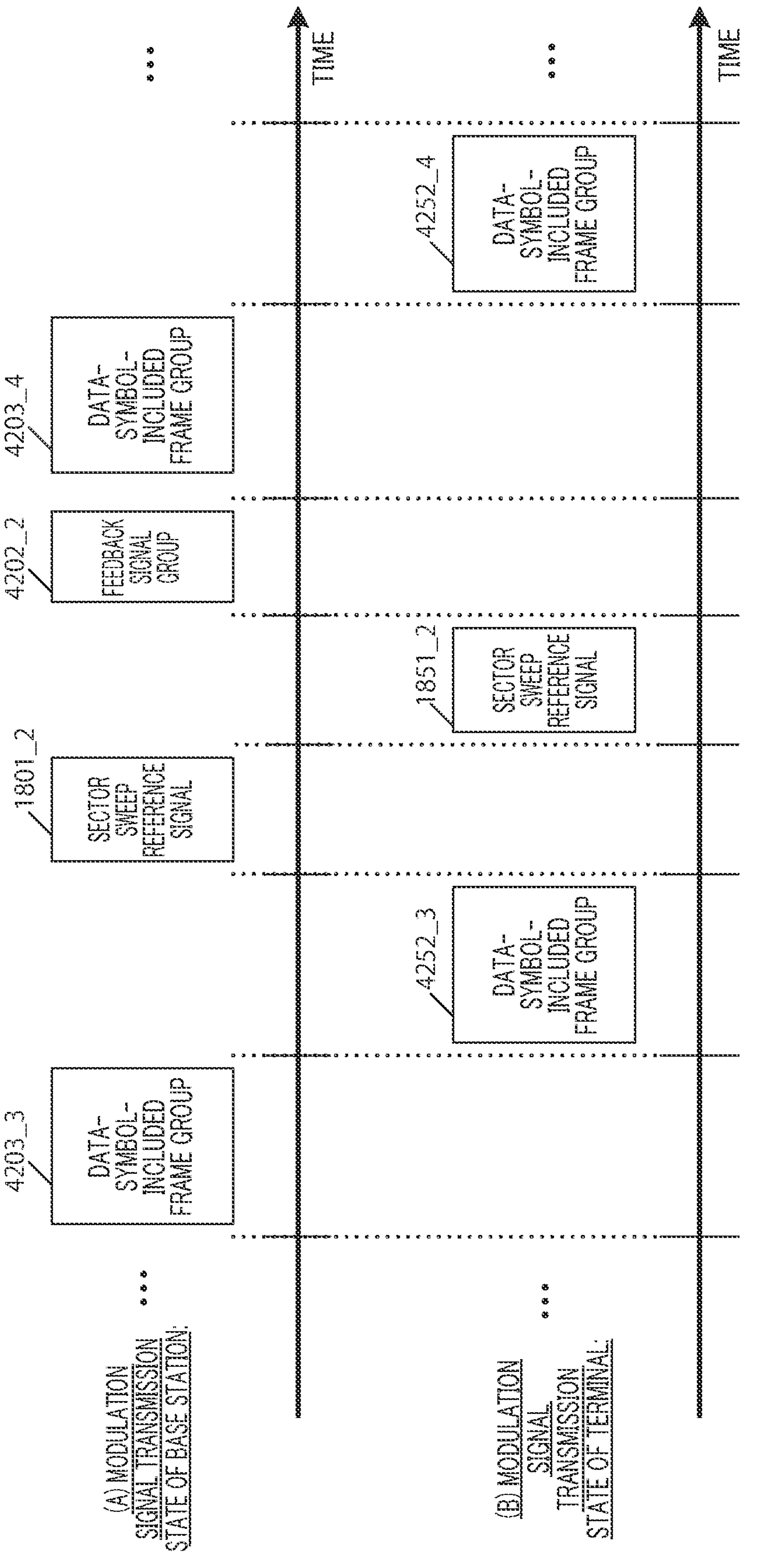
FIG. 43 illustrates an exemplary modulation signal transmission state of base station #1 and an exemplary modulation signal transmission state of the "terminal such as terminal #1" after the state in FIG. 42.

FIG. 43 illustrates an exemplary modulation signal transmission state of base station #1 labeled 901_1 and an exemplary modulation signal transmission state of the "terminal such as terminal #1 labeled 902_1" after the state in FIG. 42. Note that, in FIG. 43, the components that operate in the same manner as in FIG. 18 are denoted by the same reference signs.

(A) of FIG. 43 illustrates an exemplary modulation signal transmission state of base station #1 labeled 901_1, and it is a temporal continuation from the modulation signal transmission state of base station #1 labeled 901_1 in (A) of FIG. 42.

(B) of FIG. 43 illustrates an exemplary modulation signal transmission state of "terminal #1 labeled 902_1 and terminal #2 labeled 902_2", and it is a temporal continuation from the modulation signal transmission state of the "terminal such as terminal #1 labeled 902_1" in (B) of FIG. 42.

Note that the horizontal axes represent time in (A) and (B) of FIG. 43.

After the states in (A) and (B) of FIG. 42, base station #1 labeled 901_1 transmits "data-symbol-included frame group 4203_3". Note that a configuration method of "data-symbol-included frame group 4203_3" is as described with reference to FIGS. 29A, 29B, 31A, 31B, 33A, 33B, 35A, 35B, 37, 39, and 41.

The "terminal such as terminal #1 labeled 902_1" transmits "data-symbol-included frame group 4252_3". Note that a configuration of the frame will be described later with reference to "FIGS. 44A and 44B", "FIGS. 45A and 45B", "FIGS. 46A and 461", "FIGS. 47A and 47B", "FIG. 48", "FIG. 49", and "FIG. 50".

Next, base station #1 labeled 901_1 transmits sector sweep reference signal 1801_2. Note that this has already been described with reference to FIG. 27, and the description thereof will be thus omitted.

Then, the "terminal such as terminal #1 labeled 902_1" transmits sector sweep reference signal 1851_2. Note that this has already been described with reference to FIGS. 13, 14, etc., and the description thereof will be thus omitted.

Base station #1 labeled 901_1 transmits feedback signal group 4202_2. Note that this has already been described with reference to FIGS. 28A, 28B, 30A, 30B, 32A, 32B, 34A, 34B, 36, 38, and 40, and the description thereof will be thus omitted.

After that, base station #1 labeled 901_1 transmits "data-symbol-included frame group 4203_4". Note that this has already been described with reference to FIGS. 29A, 29B, 31A, 31B, 33A, 33B, 35A, 35B, 37, 39, and 41, and the description thereof will be thus omitted.

Then, the "terminal such as terminal #1 labeled 902_1" transmits "data-symbol-included frame group 4252_4". Note that a configuration of the frame will be described later with reference to "FIGS. 44A and 441", "FIGS. 45A and 45B", "FIGS. 46A and 46B", "FIGS. 47A and 47B", "FIG. 48", "FIG. 49", and "FIG. 50".

As described above, base station #1 labeled 901_1 and the terminal transmit the sector sweep reference signals before the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"", and again transmit the sector sweep reference signals after the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"" Base station #1 labeled 901_1 and the terminal then each select a transmission panel antenna to be used and configure transmission beamforming. This produces an effect that the base station and/or the terminal achieve high data reception quality.

Next, a description will be given of an exemplary configuration of "data-symbol-included frame group 4252_*i*" transmitted by the terminal such as "terminal #1 labeled 902_1 and terminal #2 labeled 902_2". Note that i is an integer equal to or greater than 1, for example.

As described before, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

A plurality of cases will be described in the following.

<Case A1>

Figure 44A:
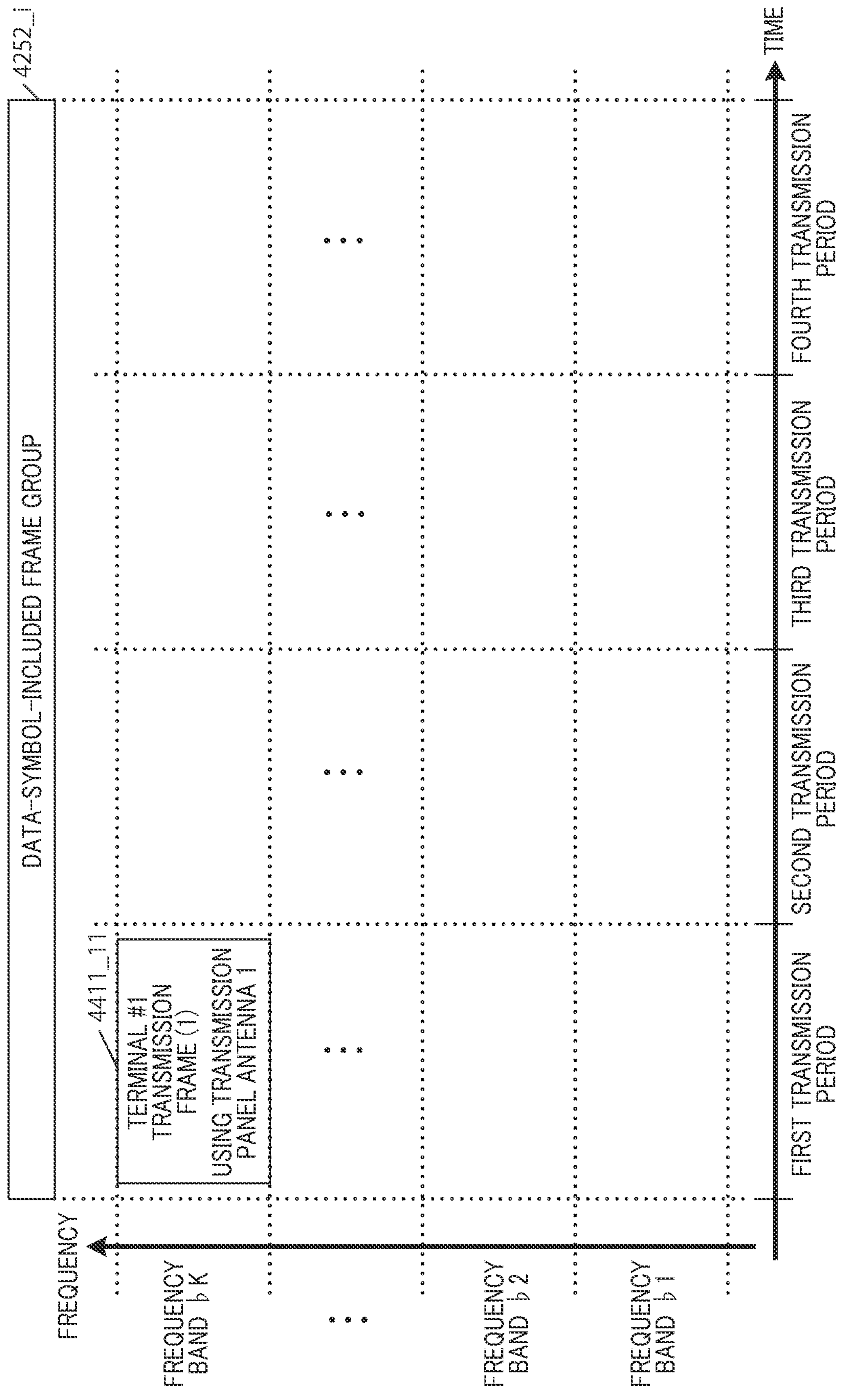
FIG. 44A illustrates the first example of a configuration of a "data-symbol-included frame group"
Figure 44B:
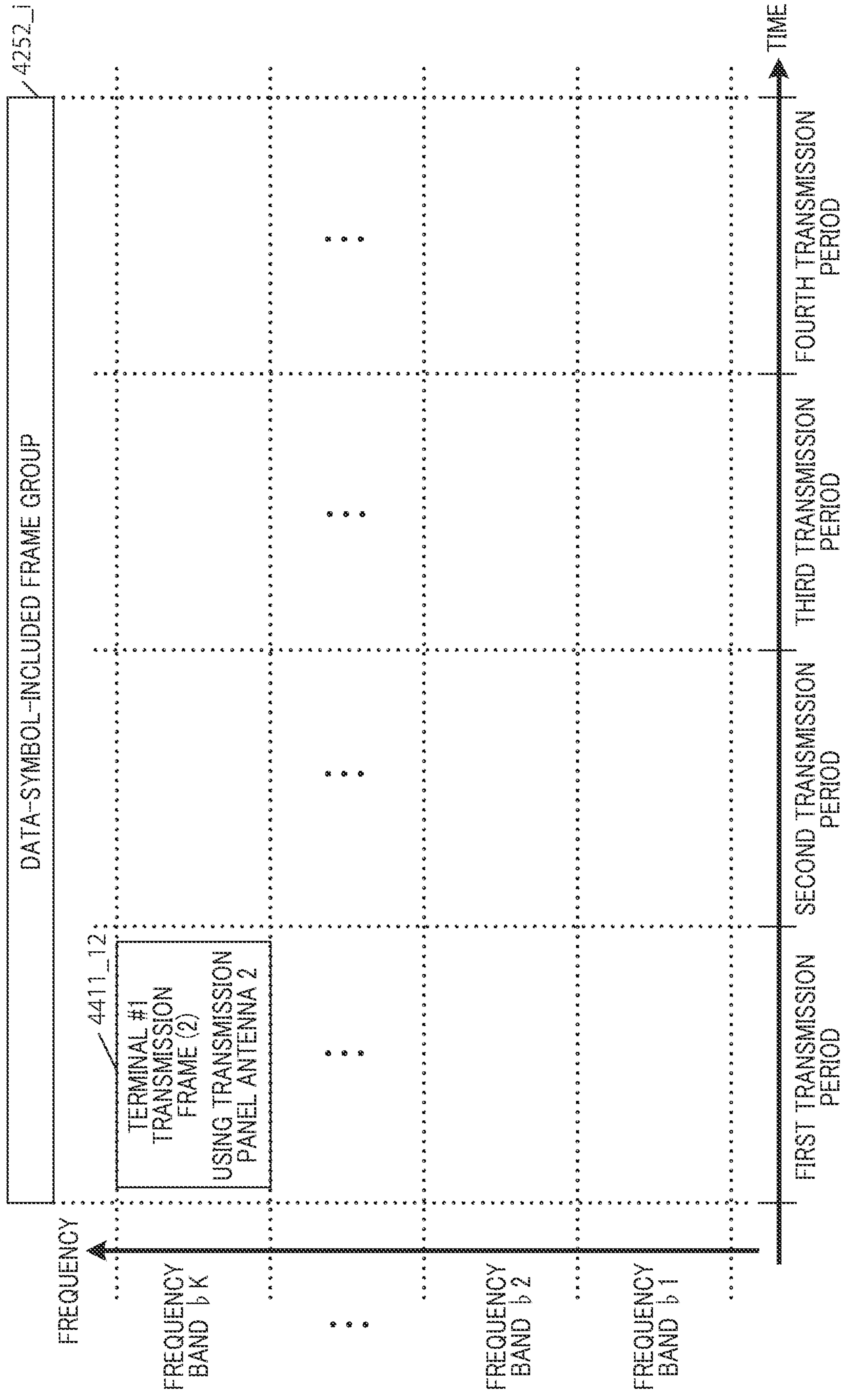
FIG. 44B illustrates the first example of the configuration of the "data-symbol-included frame group"

FIGS. 44A and 44B illustrate exemplary configurations of "data-symbol-included frame group 4252_*i*". Note that the horizontal axes represent time and the vertical axes represent frequency in FIGS. 44A and 44B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 44A and 44B, there are a first transmission period, a second transmission period, a third transmission period, and a fourth transmission period, and frequency band ♭1, frequency band ♭2, . . . , frequency band ♭K for "data-symbol-included frame group 4252_*i*", as in FIGS. 20A, 20B, 20C, 20D, 20E, and 20F.

Note that FIGS. 44A and 44B illustrate frames (slots or modulation signals) transmitted by terminal #1 labeled 902_1. Although not illustrated in FIGS. 44A and 44B, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 4411_11" transmitted by terminal #1 labeled 902_1 is present in the first transmission period in frequency band ♭K as illustrated in FIG. 44A and "terminal #1 transmission frame (2) labeled 4411_12" transmitted by terminal #1 labeled 902_1 is present in the first transmission period in frequency band ♭K as illustrated in FIG. 44B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, terminal #1 labeled 902_1 transmits, to base station #1 labeled 901_1, "terminal #1 transmission frame (1) labeled 4411_11" present in the first transmission period in frequency band ♭K as illustrated in FIG. 44A and "terminal #1 transmission frame (2) labeled 4411_12" present in the first transmission period in frequency band ♭K as illustrated in FIG. 44B. At this time, "terminal #1 transmission frame (1) labeled 4411_11" is transmitted from transmission panel antenna 1 labeled 106_1 of terminal #1 labeled 902_1, and "terminal #1 transmission frame (2) labeled 4411_12" is transmitted from transmission panel antenna 2 labeled 106_2 of terminal #1 labeled 902_1.

As described above, "terminal #1 transmission frame (1) labeled 4411_11" and "terminal #1 transmission frame (2) labeled 4411_12" are present because "terminal #1 labeled 902_1 transmits two modulation signals (streams) to base station #1 labeled 901_1".

At this time, "terminal #1 transmission frame (1) labeled 4411_11" includes, for example, a data symbol (data and/or information) addressed to base station #1 labeled 901_1.

In addition, "terminal #1 transmission frame (2) labeled 4411_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 4411_11" and "terminal #1 transmission frame (2) labeled 4411_12" as illustrated in FIGS. 44A and 44B, but terminal #1 labeled 902_1 may transmit three or more frames (slots or modulation signals) (a plurality of frames (slots or modulation signals) using the same frequency resource) to base station #1 labeled 901_1. Terminal #1 labeled 902_1 may also transmit a single frame (slot or modulation signal) to base station #1 labeled 901_1.

Note that "terminal #1 transmission frame (l) labeled 4411_11" and "terminal #1 transmission frame (2) labeled 4411_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A2>

Figure 45A:
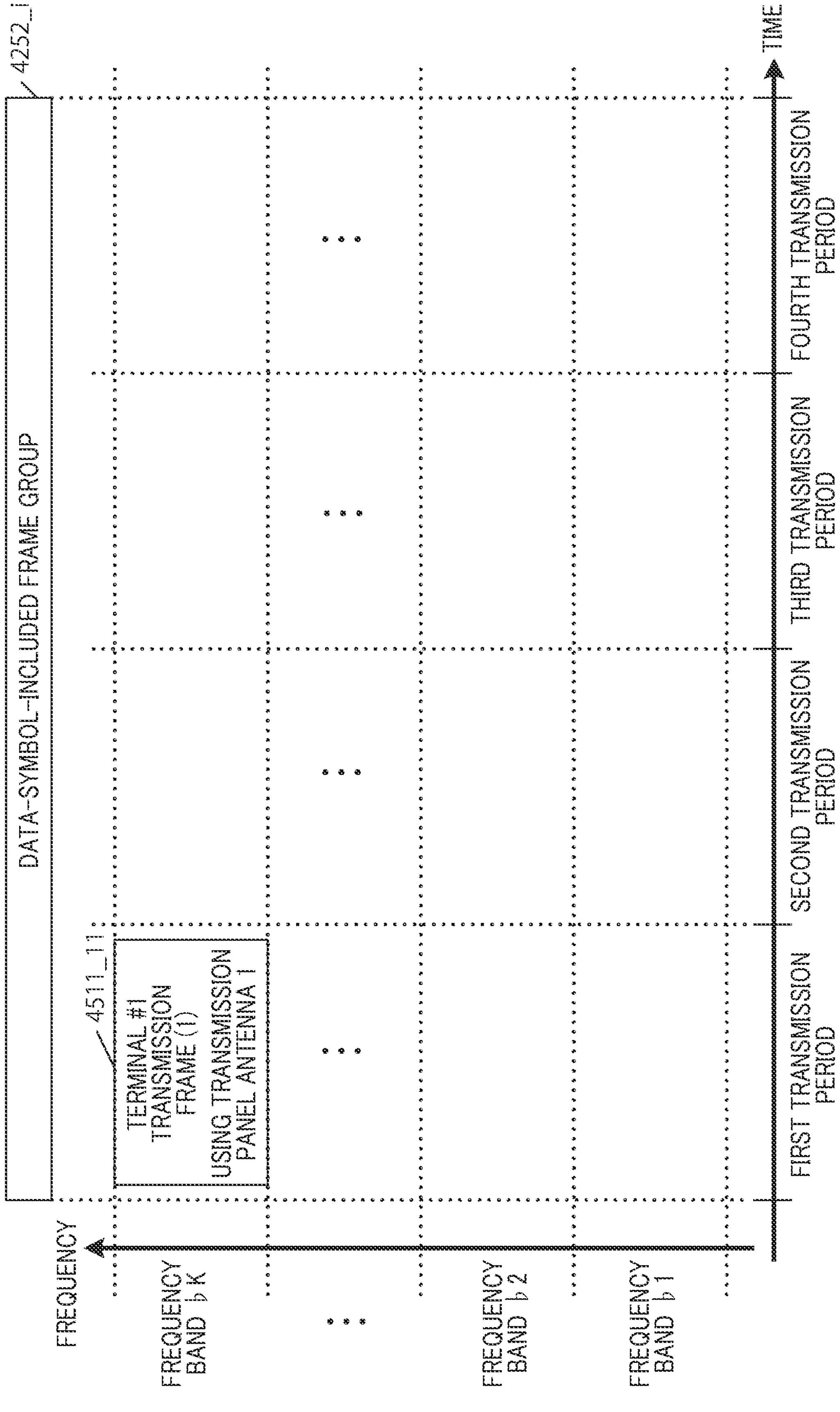
FIG. 45A illustrates the second example of the configuration of the "data-symbol-included frame group"
Figure 45B:
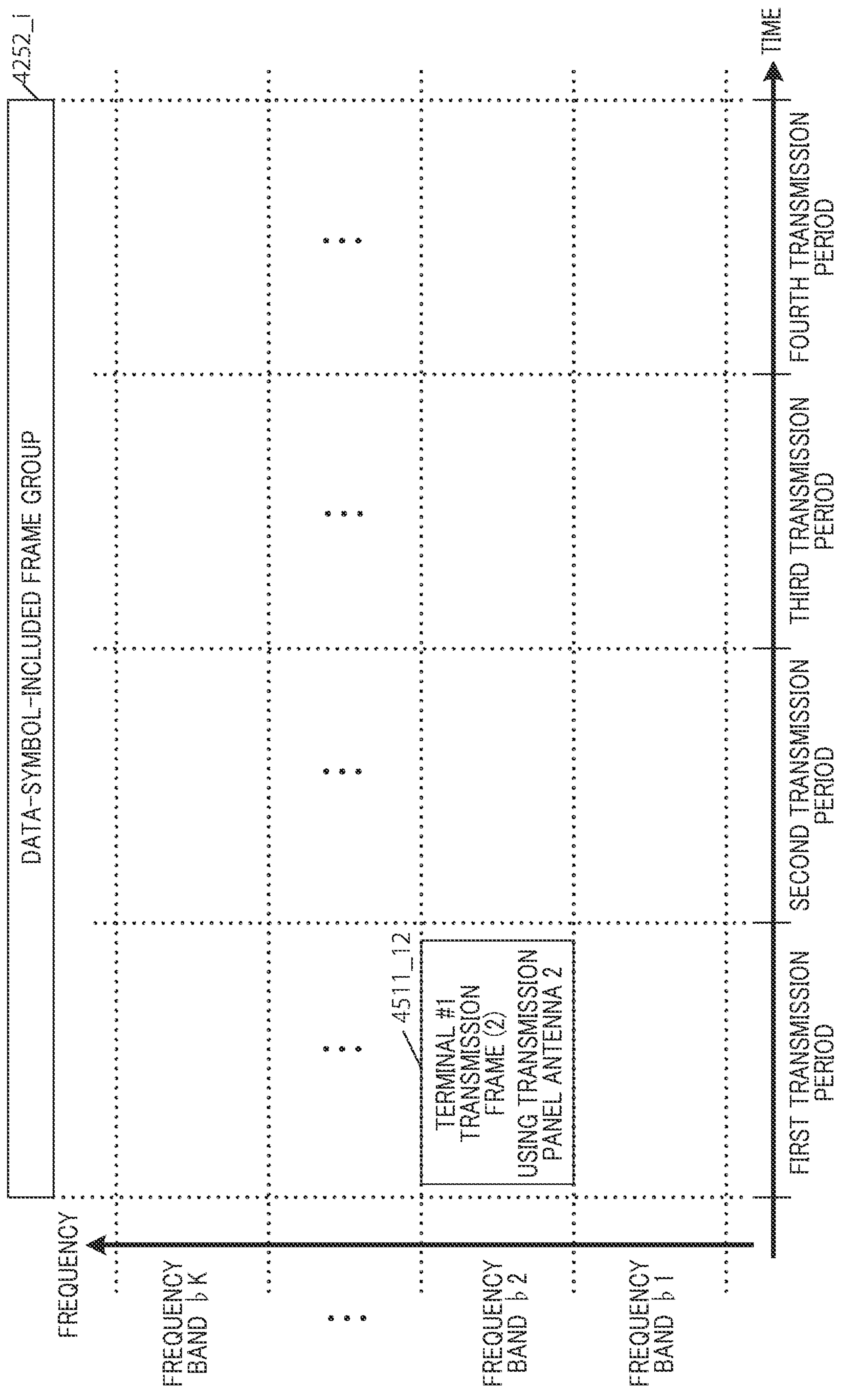
FIG. 45B illustrates the second example of the configuration of the "data-symbol-included frame group"

FIGS. 45A and 45B illustrate exemplary configurations of "data-symbol-included frame group 4252_*i*". Note that the horizontal axes represent time and the vertical axes represent frequency in FIGS. 45A and 45B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 45A and 45B, there are a first transmission period, a second transmission period, a third transmission period, and a fourth transmission period, and frequency band ♭1, frequency band ♭2, . . . , frequency band ♭K for "data-symbol-included frame group 4252_*i*", as in FIGS. 20A, 20B, 20C, 20D, 20E, and 20F.

Note that FIGS. 45A and 45B illustrate frames (slots or modulation signals) transmitted by terminal #1 labeled 902_1. Although not illustrated in FIGS. 45A and 45B, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 4511_11" transmitted by terminal #1 labeled 902_1 is present in the first transmission period in frequency band ♭K as illustrated in FIG. 45A and "terminal #1 transmission frame (2) labeled 4511_12" transmitted by terminal #1 labeled 902_1 is present in the first transmission period in frequency band ♭2 as illustrated in FIG. 45B.

For example, terminal #1 labeled 902_1 transmits, to base station #1 labeled 901_1, "terminal #1 transmission frame (1) labeled 4511_11" present in the first transmission period in frequency band ♭K as illustrated in FIG. 45A and "terminal #1 transmission frame (2) labeled 4511_12" present in the first transmission period in frequency band ♭2 as illustrated in FIG. 45B. At this time, "terminal #1 transmission frame (1) labeled 4511_11" is transmitted from transmission panel antenna 1 labeled 106_1 of terminal #1 labeled 902_1, and “terminal #1 transmission frame (2) labeled 4511_12” is transmitted from transmission panel antenna 2 labeled 106_2 of terminal #1 labeled 902_1.

As described above, “terminal #1 transmission frame (1) labeled 4511_11” and “terminal #1 transmission frame (2) labeled 4511_12” are present because “terminal #1 labeled 902_1 transmits two modulation signals (streams) to base station #1 labeled 901_1”.

At this time, “terminal #1 transmission frame (1) labeled 4511_11” includes, for example, a data symbol (data and/or information) addressed to base station #1 labeled 901_1.

In addition, “terminal #1 transmission frame (2) labeled 4511_12” also includes, for example, a data symbol (data and/or information) addressed to base station #1 labeled 901_1.

The above example has described the case where terminal #1 labeled 902_1 transmits, to base station #1 labeled 901_1, “terminal #1 transmission frame (1) labeled 4511_11” and “terminal #1 transmission frame (2) labeled 4511_12” as illustrated in FIGS. 45A and 45B, but terminal #1 labeled 902_1 may transmit three or more frames (slots or modulation signals) (a plurality of frames (slots or modulation signals) using a plurality of frequency resources) to base station #1 labeled 901_1. Terminal #1 labeled 902_1 may also transmit a single frame (slot or modulation signal) to base station #1 labeled 901_1.

Note that “terminal #1 transmission frame (1) labeled 4511_11” and “terminal #1 transmission frame (2) labeled 4511_12” may each include, in addition to the data symbol, a “reference signal such as DMRS, PTRS, or SRS”, a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A3>

Figure 46A:
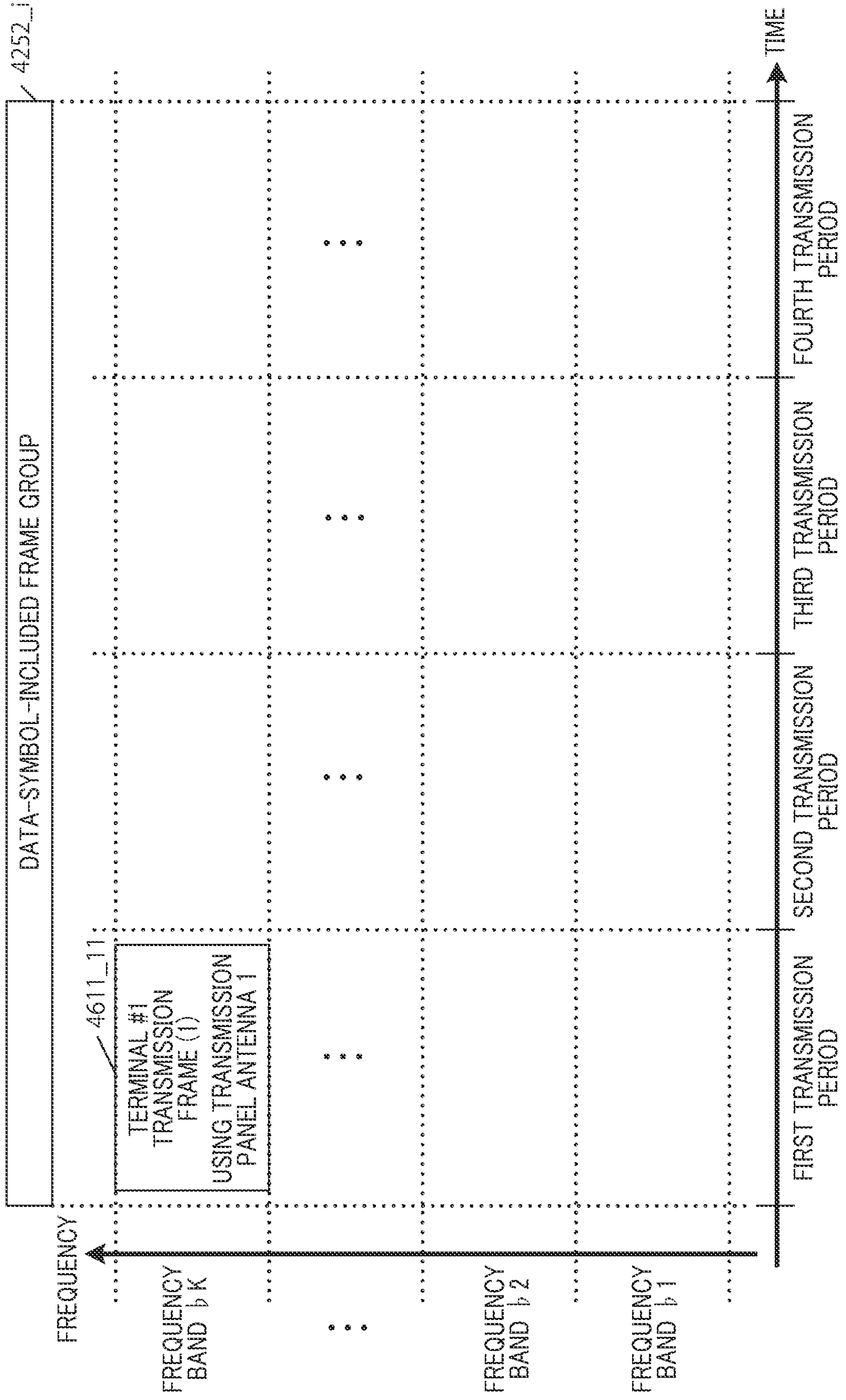
FIG. 46A illustrates the third example of the configuration of the "data-symbol-included frame group"
Figure 46B:
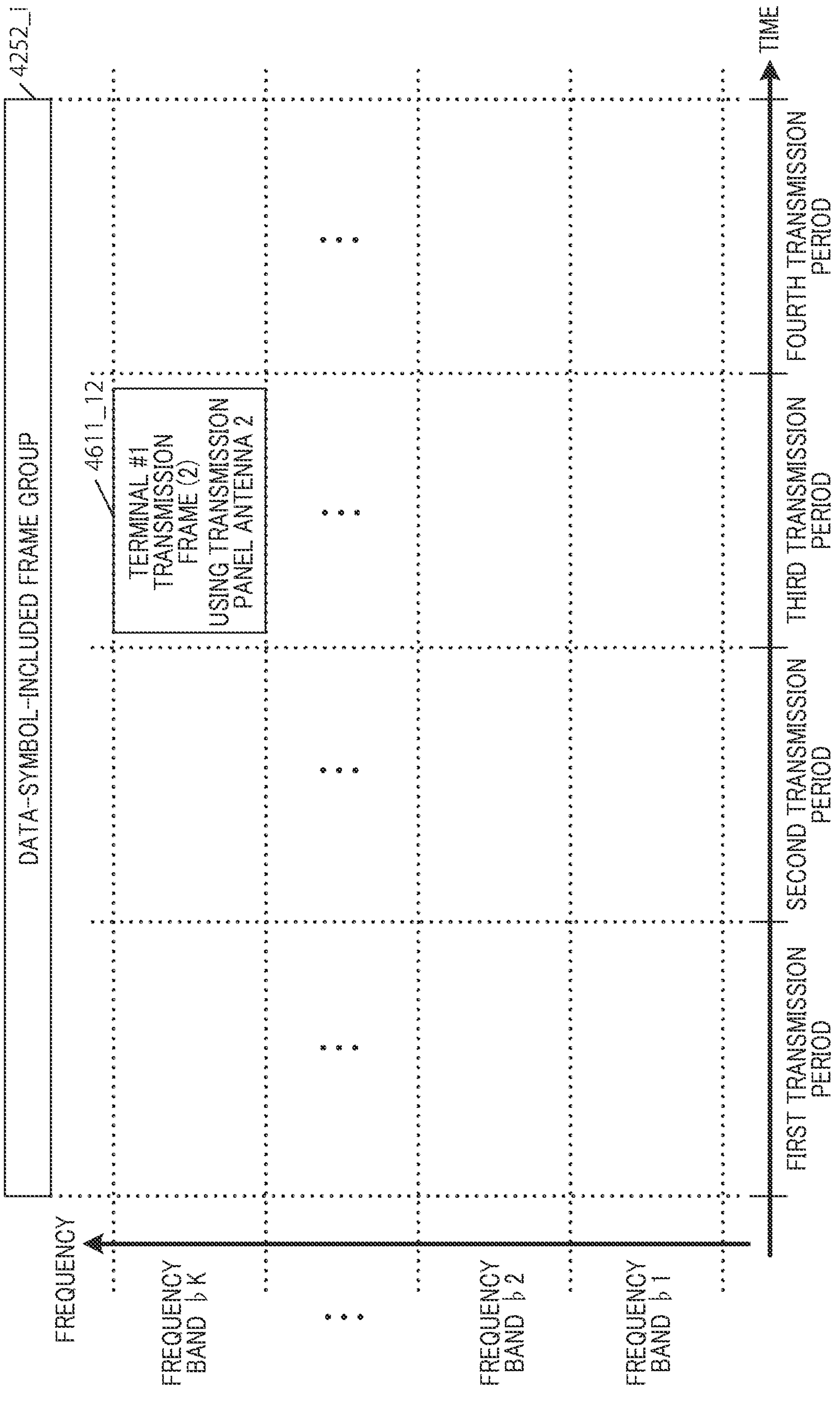
FIG. 46B illustrates the third example of the configuration of the "data-symbol-included frame group"

FIGS. 46A and 46B illustrate exemplary configurations of “data-symbol-included frame group 4252_*i*”. Note that the horizontal axes represent time and the vertical axes represent frequency in FIGS. 46A and 46B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 46A and 46B, there are a first transmission period, a second transmission period, a third transmission period, and a fourth transmission period, and frequency band ♭1, frequency band ♭2, . . . , frequency band ♭K for “data-symbol-included frame group 4252_*i*”, as in FIGS. 20A, 20B, 20C, 20D, 20E, and 20F.

Note that FIGS. 46A and 46B illustrate frames (slots or modulation signals) transmitted by terminal #1 labeled 902_1. Although not illustrated in FIGS. 46A and 46B, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, “terminal #1 transmission frame (1) labeled 4611_11” transmitted by terminal #1 labeled 902_1 is present in the first transmission period in frequency band ♭K as illustrated in FIG. 46A and “terminal #1 transmission frame (2) labeled 4611_12” transmitted by terminal #1 labeled 902_1 is present in the third transmission period in frequency band ♭K as illustrated in FIG. 46B.

For example, terminal #1 labeled 902_1 transmits, to base station #1 labeled 901_1. “terminal #1 transmission frame (1) labeled 4611_11” present in the first transmission period in frequency band ♭K as illustrated in FIG. 46A and “terminal #1 transmission frame (2) labeled 4611_12” present in the third transmission period in frequency band ♭K as illustrated in FIG. 46B. At this time, “terminal #1 transmission frame (1) labeled 4611_11” is transmitted from transmission panel antenna 1 labeled 106_1 of terminal #1 labeled 902_1, and “terminal #1 transmission frame (2) labeled 4611_12” is transmitted from transmission panel antenna 2 labeled 106_2 of terminal #1 labeled 902_1.

As described above, “terminal #1 transmission frame (1) labeled 4611_11” and “terminal #1 transmission frame (2) labeled 4611_12” are present because “terminal #1 labeled 902_1 transmits two modulation signals (streams) to base station #1 labeled 901_1”.

At this time, “terminal #1 transmission frame (1) labeled 4611_11” includes, for example, a data symbol (data and/or information) addressed to base station #1 labeled 901_1.

In addition, “terminal #1 transmission frame (2) labeled 4611_12” also includes, for example, a data symbol (data and/or information) addressed to base station #1 labeled 901_1.

The above example has described the case where terminal #1 labeled 902_1 transmits, to base station #1 labeled 901_1, “terminal #1 transmission frame (1) labeled 4611_11” and “terminal #1 transmission frame (2) labeled 4611_12” as illustrated in FIGS. 46A and 46B, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that “terminal #1 transmission frame (1) labeled 4611_11” and “terminal #1 transmission frame (2) labeled 4611_12” may each include, in addition to the data symbol, a “reference signal such as DMRS, PTRS, or SRS”, a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A4>

Figure 47A:
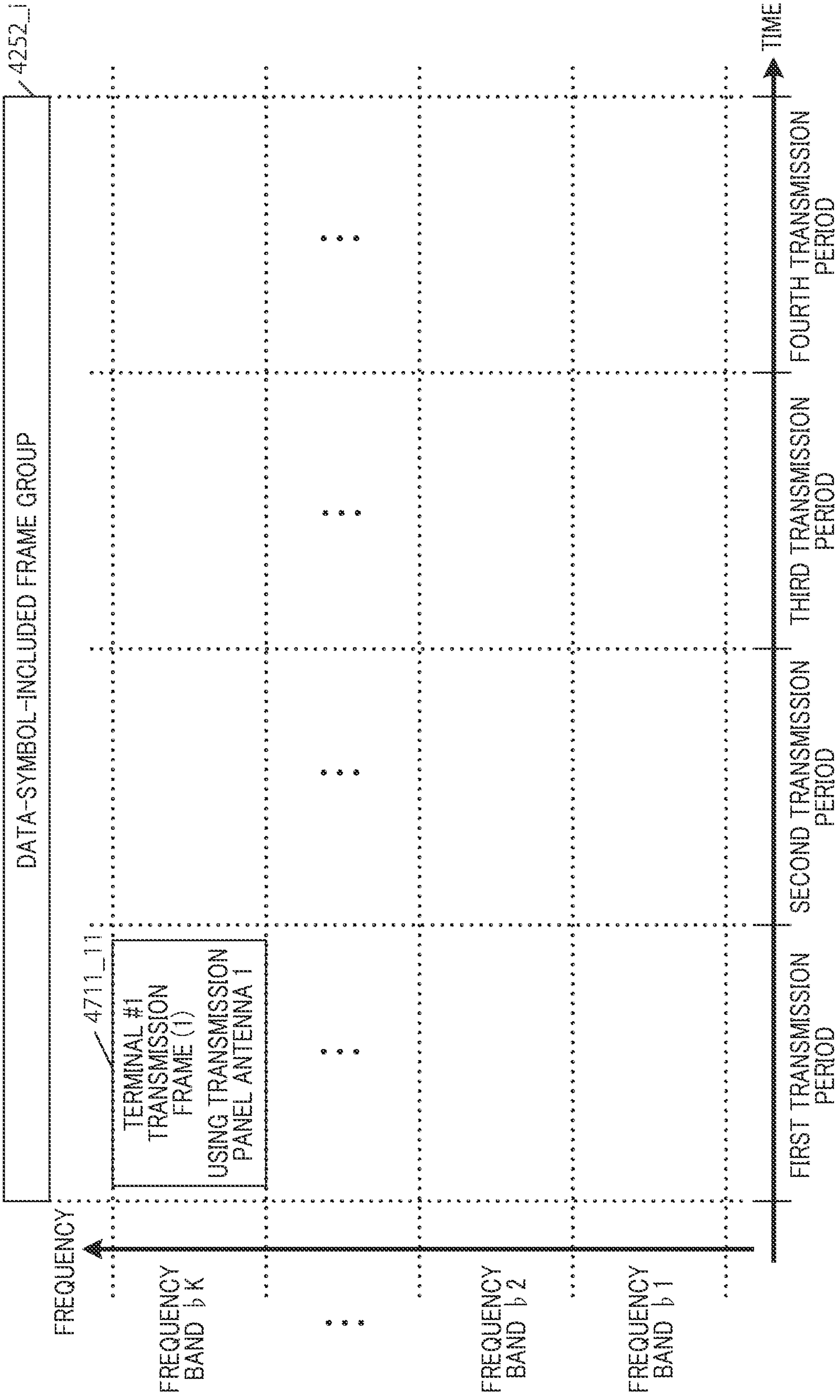
FIG. 47A illustrates the fourth example of the configuration of the "data-symbol-included frame group"
Figure 47B:
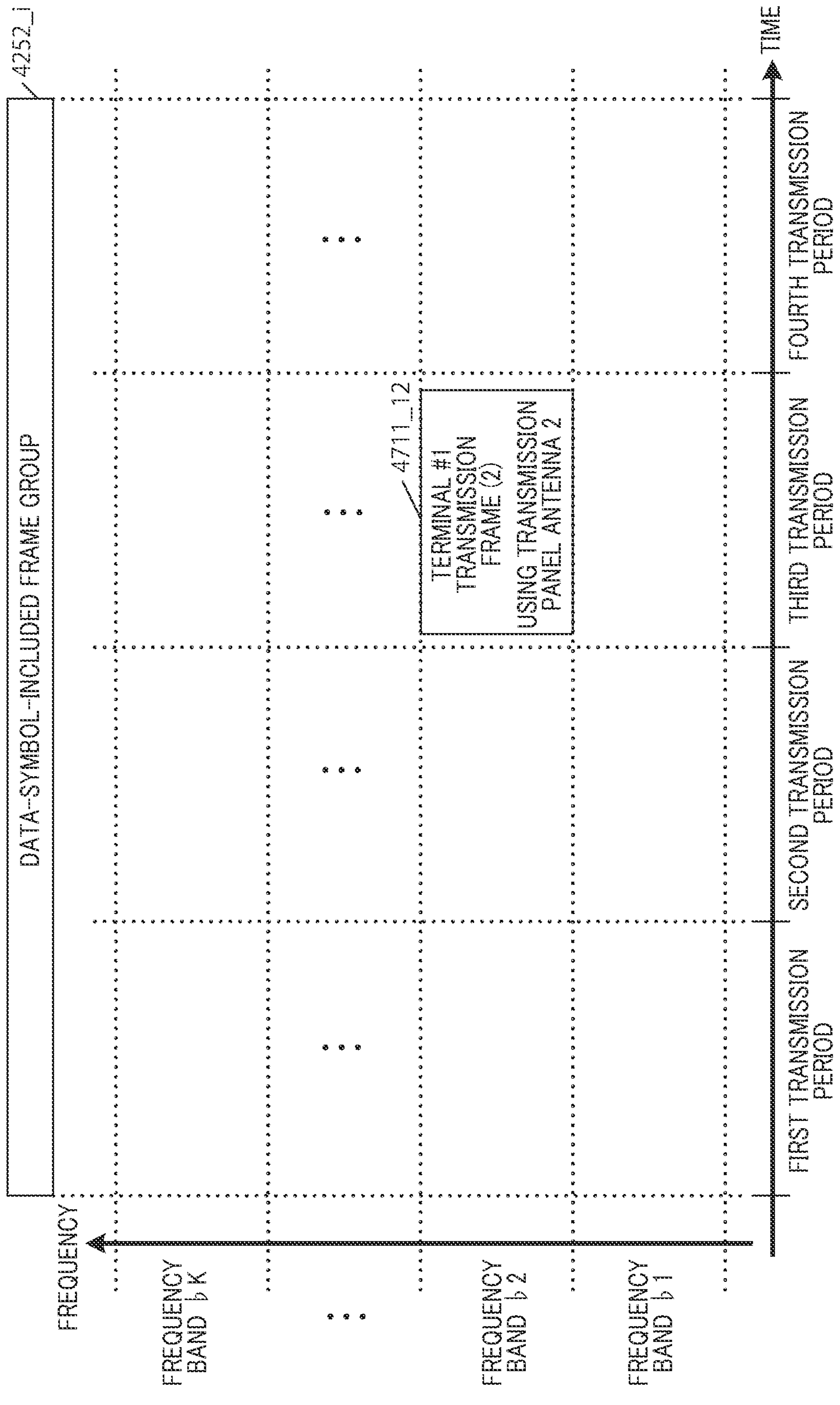
FIG. 47B illustrates the fourth example of the configuration of the "data-symbol-included frame group"

FIGS. 47A and 47B illustrate exemplary configurations of “data-symbol-included frame group 4252_*i*”. Note that the horizontal axes represent time and the vertical axes represent frequency in FIGS. 47A and 47B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 47A and 47B, there are a first transmission period, a second transmission period, a third transmission period, and a fourth transmission period, and frequency band ♭1, frequency band ♭2, . . . , frequency band ♭K for “data-symbol-included frame group 4252_*i*”, as in FIGS. 20A, 20B, 20C, 20D, 20E, and 20F.

Note that FIGS. 47A and 47B illustrate frames (slots or modulation signals) transmitted by terminal #1 labeled 902_1. Although not illustrated in FIGS. 47A and 47B, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 4711_11" transmitted by terminal #1 labeled 902_1 is present in the first transmission period in frequency band ♭K as illustrated in FIG. 47A and "terminal #1 transmission frame (2) labeled 4711_12" transmitted by terminal #1 labeled 902_1 is present in the third transmission period in frequency band ♭2 as illustrated in FIG. 47B.

For example, terminal #1 labeled 902_1 transmits, to base station #1 labeled 901_1. "terminal #1 transmission frame (1) labeled 4711_11" present in the first transmission period in frequency band ♭K as illustrated in FIG. 47A and "terminal #1 transmission frame (2) labeled 4711_12" present in the third transmission period in frequency band ♭2 as illustrated in FIG. 47B. At this time, "terminal #1 transmission frame (1) labeled 4711_11" is transmitted from transmission panel antenna 1 labeled 106_1 of terminal #1 labeled 902_1, and "terminal #1 transmission frame (2) labeled 4711_12" is transmitted from transmission panel antenna 2 labeled 106_2 of terminal #1 labeled 902_1.

As described above, "terminal #1 transmission frame (1) labeled 4711_11" and "terminal #1 transmission frame (2) labeled 4711_12" are present because "terminal #1 labeled 902_1 transmits two modulation signals (streams) to base station #1 labeled 901_1".

At this time, "terminal #1 transmission frame (1) labeled 4711_11" includes, for example, a data symbol (data and/or information) addressed to base station #1 labeled 901_1.

In addition, "terminal #1 transmission frame (2) labeled 4711_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 4711_11" and "terminal #1 transmission frame (2) labeled 4711_12" as illustrated in FIGS. 47A and 47B, but terminal #1 labeled 902_1 may transmit three or more frames (slots or modulation signals) (a plurality of frames (slots or modulation signals) using a plurality of frequency and time resources) to base station #1 labeled 901_1. Terminal #1 labeled 902_1 may also transmit a single frame (slot or modulation signal) to base station #1 labeled 901_1.

Note that "terminal #1 transmission frame (1) labeled 4711_11" and "terminal #1 transmission frame (2) labeled 4711_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A5>

Figure 48:
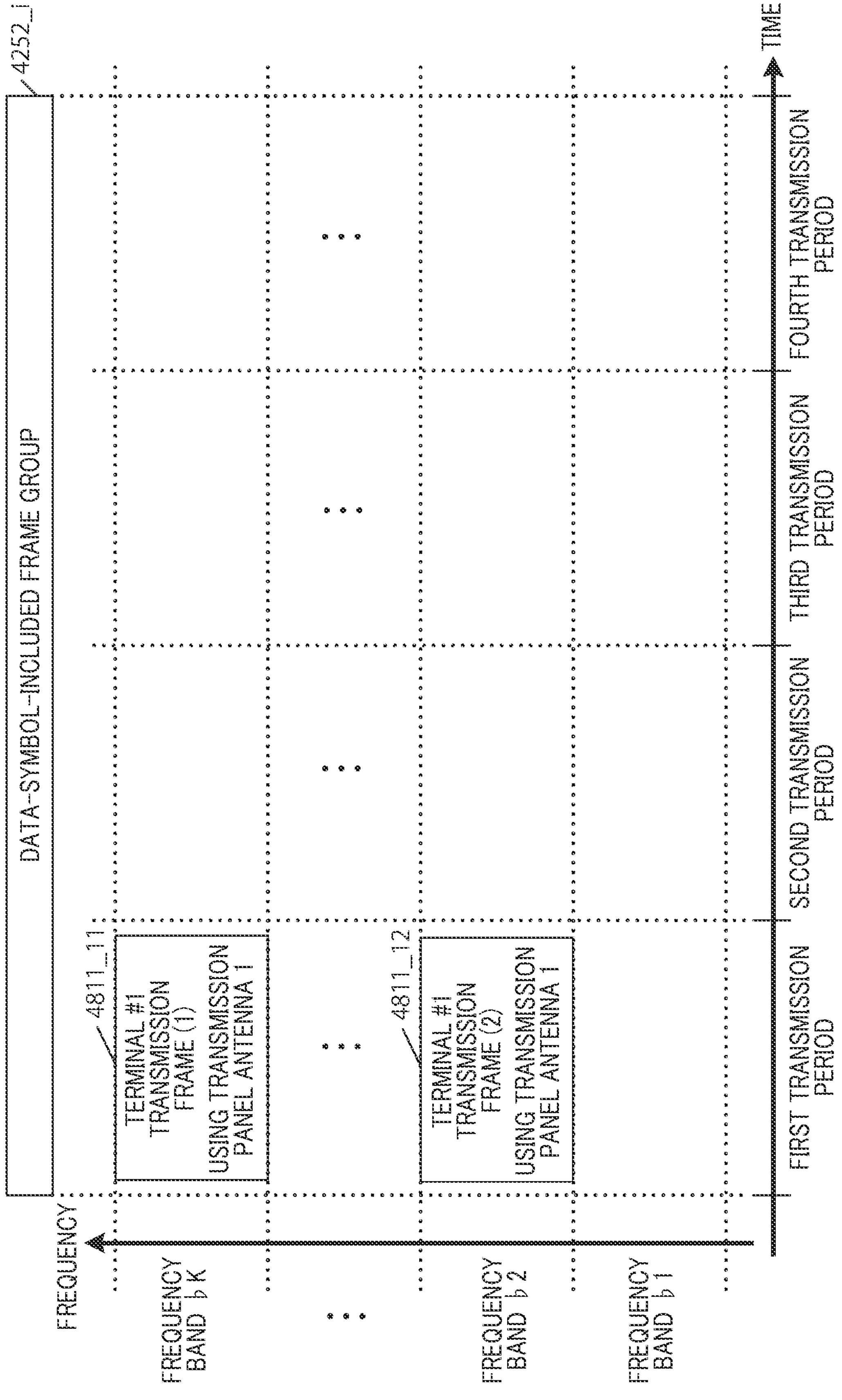
FIG. 48 illustrates the fifth example of the configuration of the "data-symbol-included frame group"

FIG. 48 illustrates an exemplary configuration of "data-symbol-included frame group 4252_*i*". Note that the horizontal axis represents time and the vertical axis represents frequency in FIG. 48. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 48, there are a first transmission period, a second transmission period, a third transmission period, and a fourth transmission period, and frequency band ♭1, frequency band ♭2, . . . , frequency band ♭K for "data-symbol-included frame group 4252_*i*", as in FIGS. 20A, 20B, 20C, 20D, 20E, and 20F.

Note that FIG. 48 illustrates frames (slots or modulation signals) transmitted by terminal #1 labeled 902_1. Although not illustrated in FIG. 48, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 4811_11" transmitted by terminal #1 labeled 902_1 is present in the first transmission period in frequency band ♭K and "terminal #1 transmission frame (2) labeled 4811_12" transmitted by terminal #1 labeled 902_1 is present in the first transmission period in frequency band ♭2 as illustrated in FIG. 48.

For example, terminal #1 labeled 902_1 transmits, to base station #1 labeled 901_1, "terminal #1 transmission frame (1) labeled 4811_11" present in the first transmission period in frequency band ♭K and "terminal #1 transmission frame (2) labeled 4811_12" present in the first transmission period in frequency band ♭2 as illustrated in FIG. 48. At this time, "terminal #1 transmission frame (1) labeled 4811_11" and "terminal #1 transmission frame (2) labeled 4811_12" are transmitted from transmission panel antenna 1 labeled 106_1 of terminal #1 labeled 902_1, which means that a single transmission panel antenna has been selected.

As described above, "terminal #1 transmission frame (1) labeled 4811_11" and "terminal #1 transmission frame (2) labeled 4811_12" are present because "terminal #1 labeled 902_1 transmits two frames (resources) to base station #1 labeled 901_1".

At this time, "terminal #1 transmission frame (1) labeled 4811_11" and "terminal #1 transmission frame (2) labeled 4811_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 4811_11" and "terminal #1 transmission frame (2) labeled 4811_12" as illustrated in FIG. 48, but terminal #1 labeled 902_1 may transmit three or more frames (slots or modulation signals) (a plurality of frames (slots or modulation signals) using a plurality of frequency resources) to base station #1 labeled 901_1. Terminal #1 labeled 902_1 may also transmit a single frame (slot or modulation signal) to base station #1 labeled 901_1.

Note that "terminal #1 transmission frame (1) labeled 4811_11" and "terminal #1 transmission frame (2) labeled 4811_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A6>

Figure 49:
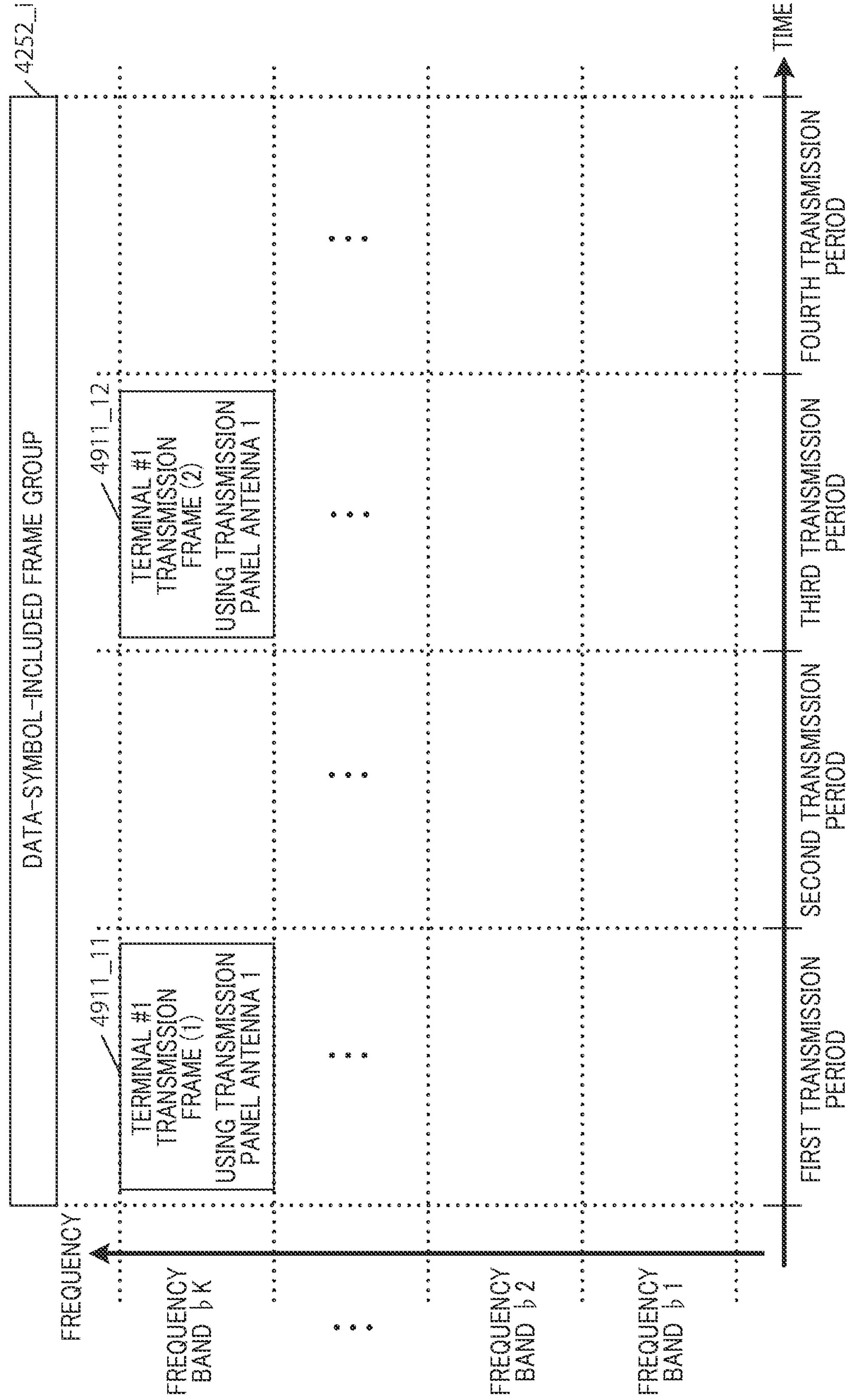
FIG. 49 illustrates the sixth example of the configuration of the "data-symbol-included frame group"

FIG. 49 illustrates an exemplary configuration of "data-symbol-included frame group 4252_*i*". Note that the horizontal axis represents time and the vertical axis represents frequency in FIG. 49. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 49, there are a first transmission period, a second transmission period, a third transmission period, and a fourth transmission period, and frequency band ♭1, frequency band ♭2, . . . , frequency band ♭K for "data-symbol-included frame group 4252_*i*", as in FIGS. 20A, 20B, 20C, 20D, 20E, and 20F.

Note that FIG. 49 illustrates frames (slots or modulation signals) transmitted by terminal #1 labeled 902_1. Although not illustrated in FIG. 49, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 4911_11" transmitted by terminal #1 labeled 902_1 is present in the first transmission period in frequency band ♭K and "terminal #1 transmission frame (2) labeled 4911_12" transmitted by terminal #1 labeled 902_1 is present in the third transmission period in frequency band ♭K as illustrated in FIG. 49.

For example, terminal #1 labeled 902_1 transmits, to base station #1 labeled 901_1, "terminal #1 transmission frame (1) labeled 4911_11" present in the first transmission period in frequency band ♭K and "terminal #1 transmission frame (2) labeled 4911_12" present in the third transmission period in frequency band ♭K as illustrated in FIG. 49. At this time, "terminal #1 transmission frame (1) labeled 4911_11" and "terminal #1 transmission frame (2) labeled 4911_12" are transmitted from transmission panel antenna 1 labeled 106_1 of terminal #1 labeled 902_1, which means that a single transmission panel antenna has been selected.

As described above, "terminal #1 transmission frame (1) labeled 4911_11" and "terminal #1 transmission frame (2) labeled 4911_12" are present because "terminal #1 labeled 902_1 transmits two frames (resources) to base station #1 labeled 901_1".

At this time, "terminal #1 transmission frame (1) labeled 4911_11" and "terminal #1 transmission frame (2) labeled 4911_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 4911_11" and "terminal #1 transmission frame (2) labeled 4911_12" as illustrated in FIG. 49, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that "terminal #1 transmission frame (1) labeled 4911_11" and "terminal #1 transmission frame (2) labeled 4911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A7>

Figure 50:
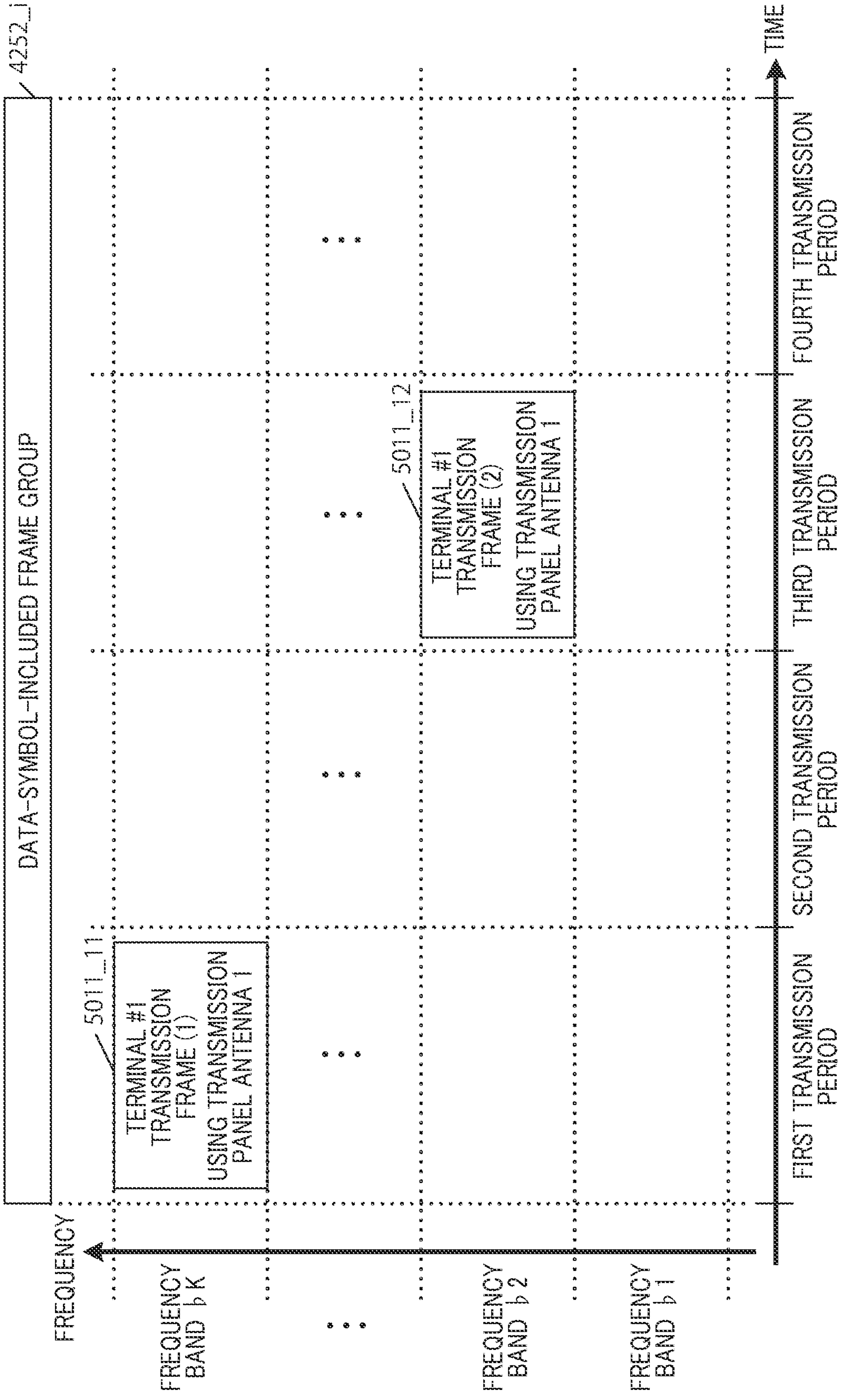
FIG. 50 illustrates the seventh example of the configuration of the "data-symbol-included frame group"

FIG. 50 illustrates an exemplary configuration of "data-symbol-included frame group 4252_*i*". Note that the horizontal axis represents time and the vertical axis represents frequency in FIG. 50. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 50, there are a first transmission period, a second transmission period, a third transmission period, and a fourth transmission period, and frequency band ♭1, frequency band ♭2, . . . , frequency band ♭K for "data-symbol-included frame group 4252_*i*", as in FIGS. 20A, 20B, 20C, 20D, 20E, and 20F.

Note that FIG. 50 illustrates frames (slots or modulation signals) transmitted by terminal #1 labeled 902_1. Although not illustrated in FIG. 50, there may be a frame (slot or modulation signal) transmitted by a terminal other than terminal #1 labeled 902_1 (see FIGS. 20A, 20B, 20C, 20D, 20E, and 20F).

In this example, in data-symbol-included frame group 4252_*i*, "terminal #1 transmission frame (1) labeled 5011_11" transmitted by terminal #1 labeled 902_1 is present in the first transmission period in frequency band ♭K and "terminal #1 transmission frame (2) labeled 5011_12" transmitted by terminal #1 labeled 902_1 is present in the third transmission period in frequency band ♭2 as illustrated in FIG. 50.

For example, terminal #1 labeled 902_1 transmits, to base station #1 labeled 901_1, "terminal #1 transmission frame (1) labeled 5011_11" present in the first transmission period in frequency band ♭K and "terminal #1 transmission frame (2) labeled 5011_12" present in the third transmission period in frequency band ♭2 as illustrated in FIG. 50. At this time, "terminal #1 transmission frame (1) labeled 5011_11" and "terminal #1 transmission frame (2) labeled 5011_12" are transmitted from transmission panel antenna 1 labeled 106_1 of terminal #1 labeled 902_1, which means that a single transmission panel antenna has been selected.

As described above, "terminal #1 transmission frame (1) labeled 5011_11" and "terminal #1 transmission frame (2) labeled 5011_12" are present because "terminal #1 labeled 902_1 transmits two frames (resources) to base station #1 labeled 901_1".

At this time, "terminal #1 transmission frame (1) labeled 5011_11" and "terminal #1 transmission frame (2) labeled 5011_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 5011_11" and "terminal #1 transmission frame (2) labeled 5011_12" as illustrated in FIG. 50, but terminal #1 labeled 902_1 may transmit three or more frames (slots or modulation signals) (a plurality of frames (slots or modulation signals) using a plurality of frequency and time resources) to base station #1 labeled 901_1. Terminal #1 labeled 902_1 may also transmit a single frame (slot or modulation signal) to base station #1 labeled 901_1.

Note that "terminal #1 transmission frame (1) labeled 5011_11" and "terminal #1 transmission frame (2) labeled 5011_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

As described thus far, transmitting frames according to <Case A1> to <Case A7>, for example, reduces interference between the frames, and efficiently assigning the frames and slots produces an effect of enhancing data transmission efficiency.

Note that the base station and the terminals may perform communication according to any of the methods of <Case A1> to <Case A1>, and the base station and the terminals may perform communication selecting any of the communication methods of <Case A 1> to <Case A7> depending on the radio propagation environment, the communication state, etc.

As described above in Embodiment 3, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, operations have been described using various frame configurations in the present embodiment, but the frames used in the present embodiment are merely examples and the frame configuration is not limited to the examples. In addition, the terms "signal", "frame", "modulation signal" "frame", etc. are used in the present embodiment, but the terms are not limited to those and the important part is the functions of the signals to be transmitted.

Embodiment 4

In Embodiment 4, a description will be given of an example where a base station transmits a plurality of modulation signals (a plurality of streams) to a terminal as a variation of Embodiment 2. (That is, an example of a case of performing MIMO will be described.) Note that the drawings used in Embodiments 1 to 3 are sometimes used in the following description of Embodiment 4.

FIG. 9 illustrates an exemplary communication state in the present embodiment. Note that the detail has already been described and the description will be thus omitted.

FIG. 27 illustrates an example of modulation signal 2700 transmitted by base station #1 labeled 901_1 in FIG. 9. Note that the components that operate in the same manner as in FIG. 10 are denoted by the same reference signs, and the descriptions thereof will be omitted. The details have been described in Embodiment 3, and the description will also be omitted.

The configuration of base station #1 labeled 901_1 in FIG. 9 is the configuration in FIG. 1A, 1B, or 1C as described in the other embodiments, and base station #1 labeled 901_1 with the configuration in FIG. 1A, 1B, or 1C includes the configuration in FIG. 3 as transmission panel antenna xi labeled 106_*xi*. Note that the configuration of base station #1 labeled 901_1 is not limited to the configuration in FIG. 1A, 1B, or 1C, and the configuration of transmission panel antenna xi labeled 106_*xi* included in base station #1 labeled 901_1 with the configuration in FIG. 1A, 1B, or 1C is not limited to the configuration in FIG. 3.

FIG. 11 illustrates examples of sector sweep reference signal 1001 in FIG. 23 transmitted by base station #1 in FIG. 9. Note that the operation in FIG. 11 has already been described and the description thereof will be thus omitted.

FIG. 12 illustrates an exemplary configuration of "sector sweep reference signal 1101_*i* in transmission panel antenna i" in FIG. 11. Note that the operation in FIG. 12 has already been described and the description thereof will be thus omitted.

FIG. 23 illustrates an exemplary operation in the time period from time t1 to t2, which is the terminal response period. Note that the operation in FIG. 23 has already been described and the description thereof will be thus omitted.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23. Note that the operation in FIG. 24 has already been described, and thus different operations in the present embodiment will be described.

For example, terminal #1 labeled 902_1 in FIG. 9 desires to receive a plurality of modulation signals from base station #1 labeled 901_1. Here, terminal #1 labeled 902_1 in FIG. 9 desires to receive two modulation signals from base station #1 labeled 901_1. In this case, terminal #1 labeled 902_1 in FIG. 9 receives sector sweep reference signal 1001 transmitted by base station #1 labeled 901_1 and estimates two "transmission panel antennas and parameter numbers" with high reception quality from transmission panel antennas of base station #1 labeled 901_1.

At this time, those two "transmission panel antennas and parameter numbers" with high reception quality are respectively referred to as the first "transmission panel antenna and parameter number" and the second "transmission panel antenna and parameter number". Further, a "transmission panel antenna of the first "transmission panel antenna and parameter number"" is different from a "transmission panel antenna of the second "transmission panel antenna and parameter number"".

In this case, terminal #1 labeled 902_1 in FIG. 9 selects a first frequency (band) as well as the first "transmission panel antenna and parameter number". Terminal #1 labeled 902_1 in FIG. 9 also selects a second frequency (band) as well as the second "transmission panel antenna and parameter number". Note that the first frequency (band) and the second frequency (band) may be the same, may be different, or may partially overlap each other.

Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. To be more specific, the above operation is performed by base station #1 labeled 901_1 transmitting a sector sweep reference signal in FIG. 11 and terminal #1 labeled 902_1 receiving the sector sweep reference signal in FIG. 11.

Terminal #1 labeled 902_1 estimates, for example, "transmission panel antenna a1_1 and parameter b1_1" and "transmission panel antenna a1_2 and parameter b1_2" as the two "transmission panel antennas and parameter numbers" with high reception quality.

(Note that, in the following description with reference to FIGS. 28A, 28B, 29A, 29B, etc., "transmission panel antenna a1_1" is transmission panel antenna 1 labeled 106_1 (of base station #1 labeled 901_1) in FIGS. 1A, 1B, and 1C, and "transmission panel antenna a1_2" is transmission panel antenna 2 labeled 106_2 (of base station #1 labeled 901_1) in FIGS. 1A, 1B, and 1C.) (In addition, a frequency (band) is estimated as well as "transmission panel antenna a1_1 and parameter b1_1". Likewise, a frequency (band) is estimated as well as "transmission panel antenna a1_2 and parameter b1_2".)

In addition, while estimating the "transmission panel antenna and parameter" with high reception quality, terminal #1 labeled 902_1 simultaneously obtains information of "the number of slots in which sector sweep reference signals can be transmitted when the terminals transmit the sector sweep reference signals (the number of terminals that can transmit the sector sweep reference signal)". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal #1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24 (see FIG. 24).

Note that terminal #1 "sector sweep reference signal" 2401_1 includes information of the "transmission panel antennas and parameters" with high reception quality obtained by terminal #1 labeled 902_1, that is, information of "transmission panel antenna a1_1 and parameter b1_1" and information of "transmission panel antenna a1_2 and parameter b1_2". Sector sweep reference signal 2401_1 may include request information, of terminal #1 labeled 902_1, of "the number of modulation signals (streams) desired to be transmitted by base station #1 labeled 901_1" (here, "2"). Further, terminal #1 "sector sweep reference signal" 2401_1 includes information of the frequency (band) corresponding to the information of "transmission panel antenna a1_1 and parameter b1_1" (here, frequency band ♭K) and information of the frequency (band) corresponding to the information of "transmission panel antenna a1_2 and parameter b1_2" (here, frequency band ♭K).

Thus, "sector sweep reference signal" 2401_*i* transmitted by terminal i, which includes terminal #1, includes the above-described frequency (band) information.

Note that base station #1 labeled 901_1 determines a frequency band to transmit feedback signal group 2702 and data-symbol-included frame group 2703 based on the frequency (band) information included in "sector sweep reference signal" 2401_*i* transmitted by terminal i.

Information included in sector sweep reference signals transmitted by the other terminals and the transmission states have already been described with reference to FIG. 24 in other embodiments, and the description thereof will be thus omitted. Note that the sector sweep reference signals transmitted by the other terminals may include the request information of "the number of modulation signals (streams) desired to be transmitted by base station #1 labeled 901_1". For example, when "the number of modulation signals (streams) desired to be transmitted by base station #1 labeled 901_1" is "1", this information is included. ("The number of modulation signals (streams) desired to be transmitted by base station #1 labeled 901_1" is set to a number equal to or greater than "1").

In the manner described above, a collision of the sector sweep reference signals transmitted by the respective terminals can be reduced. This produces an effect that the base station can receive more sector sweep reference signals and can communicate with more terminals. The above operation also allows the base station to transmit one or a plurality of modulation signals (streams) to each terminal.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

For example, terminal #i labeled 902_*i* with the configuration in FIG. 1A, 1B, or 1C transmits terminal #i "sector sweep reference signal" 2401_*i* as illustrated in FIG. 24. The configuration of terminal #i "sector sweep reference signal" 2401_*i* and the information included in the signal have already been described with reference to FIGS. 15A and 15B in other embodiments, and the description thereof will be thus omitted.

A plurality of cases will be described in the following.

<Case B1>

FIGS. 28A and 28B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 28A and 28B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 28A and 28B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 28A and 28B illustrate only feedback signals addressed to terminal #1 labeled 902_1. Although not illustrated in FIGS. 28A and 28B, there may be a feedback signal addressed to a terminal other than terminal #1 labeled 902_1.

In this example, feedback signal group 2702 includes terminal #1-addressed feedback signal (1) labeled 2811_11 present in the first transmission period in frequency band ♭K as illustrated in FIG. 28A and terminal #1-addressed feedback signal (2) labeled 2811_12 present in the first transmission period in frequency band ♭K as illustrated in FIG. 28B.

Note that the term "feedback signal group" is used in the description because feedback signals transmitted from transmission panel antenna 1 labeled 106_1 can be present, feedback signals transmitted from transmission panel antenna 2 labeled 106_2 can be present, feedback signals transmitted from transmission panel antenna 3 labeled 106_3 can be present, and feedback signals transmitted from transmission panel antenna 4 labeled 106_4 can be present, in the same frequency band and the same transmission period.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 2811_11" present in the first transmission period in frequency band ♭K as illustrated in FIG. 28A and "terminal #1-addressed feedback signal (2) labeled 2811_12" present in the first transmission period in frequency band ♭K as illustrated in FIG. 28B, based on the information included in sector sweep reference signal 2401_1 (the included information has already been described, and the description thereof will be thus omitted). At this time, "terminal #1-addressed feedback signal (1) labeled 2811_11" is transmitted from transmission panel antenna 1 labeled 106_1 of base station #1 labeled 901_1, and "terminal #1-addressed feedback signal (2) labeled 2811_12" is transmitted from transmission panel antenna 2 labeled 106_2 of base station #1 labeled 901_1.

As described above, "terminal #1-addressed feedback signal (1) labeled 2811_11" and "terminal #1-addressed feedback signal (2) labeled 2811_12" are present because "base station #1 labeled 901_1 transmits two modulation signals (streams) to terminal #1 labeled 902_1".

At this time, "terminal #1-addressed feedback signal (1) labeled 2811_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 2811_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 2811_11" present in the first transmission period in frequency band ♭K as illustrated in FIG. 28A and "terminal #1-addressed feedback signal (2) labeled 2811_12" present in the first transmission period in frequency band ♭K as illustrated in FIG. 28B.

Further, there may be a feedback signal addressed to a terminal other than terminal #1 labeled 902_1 in FIGS. 28A and 28B (see FIG. 16B, for example).

The above example has described the case where base station #1 labeled 901_1 transmits, to terminal #1 labeled 902_1, "terminal #1-addressed feedback signal (1) labeled 2811_11" and "terminal #1-addressed feedback signal (2) labeled 2811_12" as illustrated in FIGS. 28A and 28B, but base station #1 labeled 901_1 may transmit three or more feedback signals to terminal #1 labeled 902_1.

FIGS. 29A and 29B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 29A and 29B. In FIGS. 29A and 29B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 29A and 29B illustrate only modulation signals (slots) addressed to terminal #1 labeled 902_1. Although not illustrated in FIGS. 29A and 29B, there may be a modulation signal (slot) addressed to a terminal other than terminal #1 labeled 902_1.

In this example, data-symbol-included frame group 2703 includes terminal #1-addressed modulation signal (slot) (1) labeled 2911_11 present in the first transmission period in frequency band ♭K as illustrated in FIG. 29A and terminal #1-addressed modulation signal (slot) (2) labeled 2911_12 present in the first transmission period in frequency band ♭K as illustrated in FIG. 29B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, when terminal #1 labeled 902_1 transmits sector sweep reference signal 2401_1 as illustrated in FIG. 24, base station #1 labeled 901_1 transmits, to terminal #1 labeled 902_1. "terminal #1-addressed modulation signal (slot) (1) labeled 2911_11" present in the first transmission period in frequency band ♭K as illustrated in FIG. 29A and "terminal #1-addressed modulation signal (slot) (2) labeled 2911_12" present in the first transmission period in frequency band ♭K as illustrated in FIG. 29B, based on the information included in sector sweep reference signal 2401_1 (the included information has already been described, and the description thereof will be thus omitted). At this time, "terminal #1-addressed modulation signal (slot) (1) labeled 2911_11" is transmitted from transmission panel antenna 1 labeled 106_1 of base station #1 labeled 901_1, and "terminal #1-addressed modulation signal (slot) (2) labeled 2911_12" is transmitted from transmission panel antenna 2 labeled 106_2 of base station #1 labeled 901_1.

As described above, "terminal #1-addressed modulation signal (slot) (1) labeled 2911_11" and "terminal #1-addressed modulation signal (slot) (2) labeled 2911_12" are present because "base station #1 labeled 901_1 transmits two modulation signals (streams) to terminal #1 labeled 902_1".

At this time, "terminal #1-addressed modulation signal (slot) (1) labeled 2911_11" includes, for example, a data symbol (data and/or information) addressed to terminal #1 labeled 902_1.

In addition, "terminal #1-addressed modulation signal (slot) (2) labeled 2911_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 2911_11" present in the first transmission period in frequency band ♭K as illustrated in FIG. 29A and "terminal #1-addressed modulation signal (slot) (2) labeled 2911_12" present in the first transmission period in frequency band ♭K as illustrated in FIG. 29B.

Further, there may be a modulation signal (slot) addressed to a terminal other than terminal #1 labeled 902_1 in FIGS. 29A and 29B (see FIG. 17B, for example).

The above example has described the case where base station #1 labeled 901_1 transmits, to terminal #1 labeled 902_1, "terminal #1-addressed modulation signal (slot) (1) labeled 2911_11" and "terminal #1-addressed modulation signal (slot) (2) labeled 2911_12" as illustrated in FIGS. 29A and 29B, but base station #1 labeled 901_1 may transmit three or more modulation signals (slots) (a plurality of modulation signals (slots) using the same frequency resource) to terminal #1 labeled 902_1.

Note that "terminal #1-addressed modulation signal (slot) (1) labeled 2911_11" and "terminal #1-addressed modulation signal (slot) (2) labeled 2911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B2>

FIGS. 30A and 30B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 30A and 30B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 30A and 30B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 30A and 30B illustrate only feedback signals addressed to terminal #1 labeled 902_1. Although not illustrated in FIGS. 30A and 30B, there may be a feedback signal addressed to a terminal other than terminal #1 labeled 902_1.

In this example, feedback signal group 2702 includes terminal #1-addressed feedback signal (1) labeled 3011_11 present in the first transmission period in frequency band ♭K as illustrated in FIG. 30A and terminal #1-addressed feedback signal (2) labeled 3011_12 present in the first transmission period in frequency band ♭2 as illustrated in FIG. 30B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 3011_11" present in the first transmission period in frequency band ♭K as illustrated in FIG. 30A and "terminal #1-addressed feedback signal (2) labeled 3011_12" present in the first transmission period in frequency band ♭2 as illustrated in FIG. 30B, based on the information included in sector sweep reference signal 2401_1 (the included information has already been described, and the description thereof will be thus omitted). At this time, "terminal #1-addressed feedback signal (1) labeled 3011_11" is transmitted from transmission panel antenna 1 labeled 106_1 of base station #1 labeled 901_1, and "terminal #1-addressed feedback signal (2) labeled 3011_12" is transmitted from transmission panel antenna 2 labeled 106_2 of base station #1 labeled 901_1.

As described above, "terminal #1-addressed feedback signal (1) labeled 3011_11" and "terminal #1-addressed feedback signal (2) labeled 3011_12" are present because "base station #1 labeled 901_1 transmits two modulation signals (streams) to terminal #1 labeled 902_1".

At this time, "terminal #1-addressed feedback signal (1) labeled 3011_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 3011_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3011_11" present in the first transmission period in frequency band ♭K as illustrated in FIG. 30A and "terminal #1-addressed feedback signal (2) labeled 3011_12" present in the first transmission period in frequency band ♭2 as illustrated in FIG. 30B.

Further, there may be a feedback signal addressed to a terminal other than terminal #1 labeled 902_1 in FIGS. 30A and 30B (see FIG. 16B, for example).

The above example has described the case where base station #1 labeled 901_1 transmits, to terminal #1 labeled 902_1, "terminal #1-addressed feedback signal (1) labeled 3011_11" and "terminal #1-addressed feedback signal (2) labeled 3011_12" as illustrated in FIGS. 30A and 30B, but base station #1 labeled 901_1 may transmit three or more feedback signals to terminal #1 labeled 902_1.

FIGS. 31A and 31B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 31A and 31B. In FIGS. 31A and 31B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 31A and 31B illustrate only modulation signals (slots) addressed to terminal #1 labeled 902_1. Although not illustrated in FIGS. 31A and 31B, there may be a modulation signal (slot) addressed to a terminal other than terminal #1 labeled 902_1.

In this example, data-symbol-included frame group 2703 includes terminal #1-addressed modulation signal (slot) (1) labeled 3111_11 present in the first transmission period in frequency band ♭K as illustrated in FIG. 31A and terminal #1-addressed modulation signal (slot) (2) labeled 3111_12 present in the first transmission period in frequency band ♭2 as illustrated in FIG. 31B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 3111_11" present in the first transmission period in frequency band ♭K as illustrated in FIG. 31A and "terminal #1-addressed modulation signal (slot) (2) labeled 3111_12" present in the first transmission period in frequency band ♭2 as illustrated in FIG. 31B, based on the information included in sector sweep reference signal 2401_1 (the included information has already been described, and the description thereof will be thus omitted). At this time, "terminal #1-addressed modulation signal (slot) (1) labeled 3111_11" is transmitted from transmission panel antenna 1 labeled 106_1 of base station #1 labeled 901_1, and "terminal #1-addressed modulation signal (slot) (2) labeled 3111_12" is transmitted from transmission panel antenna 2 labeled 106_2 of base station #1 labeled 901_1.

As described above, "terminal #1-addressed modulation signal (slot) (1) labeled 3111_11" and "terminal #1-addressed modulation signal (slot) (2) labeled 3111_12" are present because "base station #1 labeled 901_1 transmits two modulation signals (streams) to terminal #1 labeled 902_1".

At this time, "terminal #1-addressed modulation signal (slot) (1) labeled 3111_11" includes, for example, a data symbol (data and/or information) addressed to terminal #1 labeled 902_1.

In addition, "terminal #1-addressed modulation signal (slot) (2) labeled 3111_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3111_11" present in the first transmission period in frequency band ♭K as illustrated in FIG. 31A and "terminal #1-addressed modulation signal (slot) (2) labeled 3111_12" present in the first transmission period in frequency band ♭2 as illustrated in FIG. 31B.

Further, there may be a modulation signal (slot) addressed to a terminal other than terminal #1 labeled 902_1 in FIGS. 31A and 31B (see FIG. 17B, for example).

The above example has described the case where base station #1 labeled 901_1 transmits, to terminal #1 labeled 902_1, "terminal #1-addressed modulation signal (slot) (1) labeled 3111_11" and "terminal #1-addressed modulation signal (slot) (2) labeled 3111_12" as illustrated in FIGS. 31A and 31B, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 3111_11" and "terminal #1-addressed modulation signal (slot) (2) labeled 3111_12" may each include, in addition to the data symbol, a "reference signal such as DMRS, PTRS, or SRS", a pilot symbol, a pilot signal, a preamble, and a symbol including control information, for example.

Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B3>

FIGS. 32A and 32B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 32A and 32B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 32A and 32B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 32A and 32B illustrate only feedback signals addressed to terminal #1 labeled 902_1. Although not illustrated in FIGS. 32A and 32B, there may be a feedback signal addressed to a terminal other than terminal #1 labeled 902_1.

In this example, feedback signal group 2702 includes terminal #1-addressed feedback signal (1) labeled 3211_11 present in the first transmission period in frequency band ♭K as illustrated in FIG. 32A and terminal #1-addressed feedback signal (2) labeled 3211_12 present in the third transmission period in frequency band ♭K as illustrated in FIG. 32B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 3211_11" present in the first transmission period in frequency band ♭K as illustrated in FIG. 32A and "terminal #1-addressed feedback signal (2) labeled 3211_12" present in the third transmission period in frequency band ♭K as illustrated in FIG. 32B, based on the information included in sector sweep reference signal 2401_1 (the included information has already been described, and the description thereof will be thus omitted). At this time, "terminal #1-addressed feedback signal (1) labeled 3211_11" is transmitted from transmission panel antenna 1 labeled 106_1 of base station #1 labeled 901_1, and "terminal #1-addressed feedback signal (2) labeled 3211_12" is transmitted from transmission panel antenna 2 labeled 106_2 of base station #1 labeled 901_1.

As described above, "terminal #1-addressed feedback signal (1) labeled 3211_11" and "terminal #1-addressed feedback signal (2) labeled 3211_12" are present because "base station #1 labeled 901_1 transmits two modulation signals (streams) to terminal #1 labeled 902_1".

At this time, "terminal #1-addressed feedback signal (1) labeled 3211_11" includes, for example, information indicating that communication with terminal #1 labeled 902_1 (by base station #1 labeled 901_1) is possible using transmission panel antenna 1 labeled 106_1.

In addition, “terminal #1-addressed feedback signal (2) labeled 3211_12” includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the “information of two “transmission panel antennas and parameters” of base station #1 labeled 901_1 with high reception quality and the frequency (band) information” transmitted by terminal #1 labeled 902_1, and base station #1 labeled 901_1 then transmits, to terminal #1 labeled 902_1, “terminal #1-addressed feedback signal (1) labeled 3211_11” present in the first transmission period in frequency band ♭K as illustrated in FIG. 32A and “terminal #1-addressed feedback signal (2) labeled 3211_12” present in the third transmission period in frequency band ♭K as illustrated in FIG. 32B.

Further, there may be a feedback signal addressed to a terminal other than terminal #1 labeled 902_1 in FIGS. 32A and 32B (see FIG. 168, for example).

The above example has described the case where base station #1 labeled 901_1 transmits, to terminal #1 labeled 902_1, “terminal #1-addressed feedback signal (1) labeled 3211_11” and “terminal #1-addressed feedback signal (2) labeled 3211_12” as illustrated in FIGS. 32A and 32B, but base station #1 labeled 901_1 may transmit three or more feedback signals to terminal #1 labeled 902_1.

FIGS. 33A and 33B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 33A and 33B. In FIGS. 33A and 33B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 33A and 33B illustrate only modulation signals (slots) addressed to terminal #1 labeled 902_1. Although not illustrated in FIGS. 33A and 33B, there may be a modulation signal (slot) addressed to a terminal other than terminal #1 labeled 902_1.

In this example, data-symbol-included frame group 2703 includes terminal #1-addressed modulation signal (slot) (1) labeled 3311_11 present in the first transmission period in frequency band ♭K as illustrated in FIG. 33A and terminal #1-addressed modulation signal (slot) (2) labeled 3311_12 present in the third transmission period in frequency band ♭K as illustrated in FIG. 33B.

For example, when terminal #1 labeled 902_1 transmits sector sweep reference signal 2401_1 as illustrated in FIG. 24, base station #1 labeled 901_1 transmits, to terminal #1 labeled 902_1, “terminal #1-addressed modulation signal (slot) (1) labeled 3311_11” present in the first transmission period in frequency band ♭K as illustrated in FIG. 33A and “terminal #1-addressed modulation signal (slot) (2) labeled 3311_12” present in the third transmission period in frequency band ♭K as illustrated in FIG. 33B, based on the information included in sector sweep reference signal 2401_1 (the included information has already been described, and the description thereof will be thus omitted). At this time, “terminal #1-addressed modulation signal (slot) (1) labeled 3311_11” is transmitted from transmission panel antenna 1 labeled 106_1 of base station #1 labeled 901_1, and “terminal #1-addressed modulation signal (slot) (2) labeled 3311_12” is transmitted from transmission panel antenna 2 labeled 106_2 of base station #1 labeled 901_1.

As described above, “terminal #1-addressed modulation signal (slot) (1) labeled 3311_11” and “terminal #1-addressed modulation signal (slot) (2) labeled 3311_12” are present because “base station #1 labeled 901_1 transmits two modulation signals (streams) to terminal #1 labeled 902_1”.

At this time, “terminal #1-addressed modulation signal (slot) (1) labeled 3311_11” includes, for example, a data symbol (data and/or information) addressed to terminal #1 labeled 902_1.

In addition, “terminal #1-addressed modulation signal (slot) (2) labeled 3311_12” also includes, for example, a data symbol (data and/or information) addressed to terminal #1 labeled 902_1.

Note that base station #1 labeled 901_1 selects transmission panel antennas and sets parameters of beamforming based on the “information of two “transmission panel antennas and parameters” of base station #1 labeled 901_1 with high reception quality and the frequency (band) information” transmitted by terminal #1 labeled 902_1, and base station #1 labeled 901_1 then transmits, to terminal #1 labeled 902_1, “terminal #1-addressed modulation signal (slot) (1) labeled 3311_11” present in the first transmission period in frequency band ♭K as illustrated in FIG. 33A and “terminal #1-addressed modulation signal (slot) (2) labeled 3311_12” present in the third transmission period in frequency band ♭K as illustrated in FIG. 33B.

Further, there may be a modulation signal (slot) addressed to a terminal other than terminal #1 labeled 902_1 in FIGS. 33A and 33B (see FIG. 17B, for example).

The above example has described the case where base station #1 labeled 901_1 transmits, to terminal #1 labeled 902_1, “terminal #1-addressed modulation signal (slot) (1) labeled 3311_11” and “terminal #1-addressed modulation signal (slot) (2) labeled 3311_12” as illustrated in FIGS. 33A and 33B, but base station #1 labeled 901_1 may transmit three or more modulation signals (slots) (modulation signals (slots) using a plurality of time resources) to terminal #1 labeled 902_1.

Note that “terminal #1-addressed modulation signal (slot) (1) labeled 3311_11” and “terminal #1-addressed modulation signal (slot) (2) labeled 3311_12” may each include, in addition to the data symbol, a “reference signal such as DMRS, PTRS, or SRS”, a pilot symbol, a pilot signal, a preamble, and a symbol including control information, for example.

Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B4>

FIGS. 34A and 34B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 34A and 34B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 34A and 34B, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIGS. 34A and 34B illustrate only feedback signals addressed to terminal #1 labeled 902_1. Although not illustrated in FIGS. 34A and 34B, there may be a feedback signal addressed to a terminal other than terminal #1 labeled 902_1.

In this example, feedback signal group 2702 includes terminal #1-addressed feedback signal (1) labeled 3411_11 present in the first transmission period in frequency band ♭K as illustrated in FIG. 34A and terminal #1-addressed feedback signal (2) labeled 3411_12 present in the third transmission period in frequency band ♭2 as illustrated in FIG. 34B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 3411_11" present in the first transmission period in frequency band ♭K as illustrated in FIG. 34A and "terminal #1-addressed feedback signal (2) labeled 3411_12" present in the third transmission period in frequency band ♭2 as illustrated in FIG. 34B, based on the information included in sector sweep reference signal 2401_1 (the included information has already been described, and the description thereof will be thus omitted). At this time, "terminal #1-addressed feedback signal (1) labeled 3411_11" is transmitted from transmission panel antenna 1 labeled 106_1 of base station #1 labeled 901_1, and "terminal #1-addressed feedback signal (2) labeled 3411_12" is transmitted from transmission panel antenna 2 labeled 106_2 of base station #1 labeled 901_1.

As described above, "terminal #1-addressed feedback signal (1) labeled 3411_11" and "terminal #1-addressed feedback signal (2) labeled 3411_12" are present because "base station #1 labeled 901_1 transmits two modulation signals (streams) to terminal #1 labeled 902_1".

At this time, "terminal #1-addressed feedback signal (1) labeled 3411_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 3411_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3411_11" present in the first transmission period in frequency band ♭K as illustrated in FIG. 34A and "terminal #1-addressed feedback signal (2) labeled 3411_12" present in the third transmission period in frequency band ♭2 as illustrated in FIG. 34B.

Further, there may be a feedback signal addressed to a terminal other than terminal #1 labeled 902_1 in FIGS. 34A and 34B (see FIG. 16B, for example).

The above example has described the case where base station #1 labeled 901_1 transmits, to terminal #1 labeled 902_1, "terminal #1-addressed feedback signal (1) labeled 3411_11" and "terminal #1-addressed feedback signal (2) labeled 3411_12" as illustrated in FIGS. 34A and 34B, but base station #1 labeled 901_1 may transmit three or more feedback signals to terminal #1 labeled 902_1.

FIGS. 35A and 35B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 35A and 35B. In FIGS. 35A and 35B, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIGS. 35A and 35B illustrate only modulation signals (slots) addressed to terminal #1 labeled 902_1. Although not illustrated in FIGS. 35A and 35B, there may be a modulation signal (slot) addressed to a terminal other than terminal #1 labeled 902_1.

In this example, data-symbol-included frame group 2703 includes terminal #1-addressed modulation signal (slot) (1) labeled 3511_11 present in the first transmission period in frequency band ♭K as illustrated in FIG. 35A and terminal #1-addressed modulation signal (slot) (2) labeled 3511_12 present in the third transmission period in frequency band ♭2 as illustrated in FIG. 35B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 3511_11" present in the first transmission period in frequency band ♭K as illustrated in FIG. 35A and "terminal #1-addressed modulation signal (slot) (2) labeled 3511_12" present in the third transmission period in frequency band ♭2 as illustrated in FIG. 35B, based on the information included in sector sweep reference signal 2401_1 (the included information has already been described, and the description thereof will be thus omitted). At this time, "terminal #1-addressed modulation signal (slot) (1) labeled 3511_11" is transmitted from transmission panel antenna 1 labeled 106_1 of base station #1 labeled 901_1, and "terminal #1-addressed modulation signal (slot) (2) labeled 3511_12" is transmitted from transmission panel antenna 2 labeled 106_2 of base station #1 labeled 901_1.

As described above, "terminal #1-addressed modulation signal (slot) (1) labeled 3511_11" and "terminal #1-addressed modulation signal (slot) (2) labeled 3511_12" are present because "base station #1 labeled 901_1 transmits two modulation signals (streams) to terminal #1 labeled 902_1".

At this time, "terminal #1-addressed modulation signal (slot) (1) labeled 3511_11" includes, for example, a data symbol (data and/or information) addressed to terminal #1 labeled 902_1.

In addition, "terminal #1-addressed modulation signal (slot) (2) labeled 3511_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3511_11" present in the first transmission period in frequency band ♭K as illustrated in FIG. 35A and "terminal #1-addressed modulation signal (slot) (2) labeled 3511_12" present in the third transmission period in frequency band ♭2 as illustrated in FIG. 35B.

Further, there may be a modulation signal (slot) addressed to a terminal other than terminal #1 labeled 902_1 in FIGS. 35A and 35B (see FIG. 17B, for example).

The above example has described the case where base station #1 labeled 901_1 transmits, to terminal #1 labeled 902_1, "terminal #1-addressed modulation signal (slot) (1) labeled 3511_11" and "terminal #1-addressed modulation signal (slot) (2) labeled 3511_12" as illustrated in FIGS. 35A and 35B, but base station #1 labeled 901_1 may transmit three or more modulation signals (slots) (modulation signals (slots) using a plurality of frequency and time resources) to terminal #1 labeled 902_1.

Note that "terminal #1-addressed modulation signal (slot) (1) labeled 3511_11" and "terminal #1-addressed modulation signal (slot) (2) labeled 3511_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B5>

FIG. 36 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 36. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 36, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 36 illustrates only feedback signals addressed to terminal #1 labeled 902_1. Although not illustrated in FIG. 36, there may be a feedback signal addressed to a terminal other than terminal #1 labeled 902_1.

In this example, feedback signal group 2702 includes terminal #1-addressed feedback signal (1) labeled 3611_11 present in the first transmission period in frequency band ♭K and terminal #1-addressed feedback signal (2) labeled 3611_12 present in the first transmission period in frequency band ♭2 as illustrated in FIG. 36.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 3611_11" present in the first transmission period in frequency band ♭K and "terminal #1-addressed feedback signal (2) labeled 3611_12" present in the first transmission period in frequency band ♭2 as illustrated in FIG. 36, based on the information included in sector sweep reference signal 2401_1 (the included information has already been described, and the description thereof will be thus omitted). At this time, both "terminal #1-addressed feedback signal (1) labeled 3611_11" and "terminal #1-addressed feedback signal (2) labeled 3611_12" are transmitted from transmission panel antenna 1 labeled 106_1 of base station #1 labeled 901_1, which means that a single transmission panel antenna has been selected.

As described above, "terminal #1-addressed feedback signal (1) labeled 3611_11" and "terminal #1-addressed feedback signal (2) labeled 3611_12" are present because "base station #1 labeled 901_1 transmits two resources (slots) to terminal #1 labeled 902_1".

At this time, "terminal #1-addressed feedback signal (1) labeled 3611_11" and "terminal #1-addressed feedback signal (2) labeled 3611_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3611_11" present in the first transmission period in frequency band ♭K and "terminal #1-addressed feedback signal (2) labeled 3611_12" present in the first transmission period in frequency band ♭2 as illustrated in FIG. 36.

Further, there may be a feedback signal addressed to a terminal other than terminal #1 labeled 902_1 in FIG. 36 (see FIG. 16B, for example).

The above example has described the case where base station #1 labeled 901_1 transmits, to terminal #1 labeled 902_1, "terminal #1-addressed feedback signal (1) labeled 3611_11" and "terminal #1-addressed feedback signal (2) labeled 3611_12" as illustrated in FIG. 36, but base station #1 labeled 901_1 may transmit three or more feedback signals to terminal #1 labeled 902_1.

FIG. 37 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 37. In FIG. 37, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 37 illustrates only modulation signals (slots) addressed to terminal #1 labeled 902_1. Although not illustrated in FIG. 37, there may be a modulation signal (slot) addressed to a terminal other than terminal #1 labeled 902_1.

In this example, data-symbol-included frame group 2703 includes terminal #1-addressed modulation signal (slot) (1) labeled 3711_11 present in the first transmission period in frequency band ♭K and terminal #1-addressed modulation signal (slot) (2) labeled 3711_12 present in the first transmission period in frequency band ♭2 as illustrated in FIG. 37.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 3711_11" present in the first transmission period in frequency band ♭K and "terminal #1-addressed modulation signal (slot) (2) labeled 3711_12" present in the first transmission period in frequency band ♭2 as illustrated in FIG. 37, based on the information included in sector sweep reference signal 2401_1 (the included information has already been described, and the description thereof will be thus omitted). At this time, "terminal #1-addressed modulation signal (slot) (1) labeled 3711_11" and "terminal #1-addressed modulation signal (slot) (2) labeled 3711_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 3711_11" and "terminal #1-addressed modulation signal (slot) (2) labeled 3711_12" are present because "base station #1 labeled 901_1 transmits two resources (slots) to terminal #1 labeled 902_1".

At this time, "terminal #1-addressed modulation signal (slot) (1) labeled 3711_11" and "terminal #1-addressed modulation signal (slot) (2) labeled 3711_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3711_11" present in the first transmission period in frequency band ♭K and "terminal #1-addressed modulation signal (slot) (2) labeled 3711_12" present in the first transmission period in frequency band ♭2 as illustrated in FIG. 37.

Further, there may be a modulation signal (slot) addressed to a terminal other than terminal #1 labeled 902_1 in FIG. 37 (see FIG. 17B, for example).

The above example has described the case where base station #1 labeled 901_1 transmits, to terminal #1 labeled 902_1, "terminal #1-addressed modulation signal (slot) (1) labeled 3711_11" and "terminal #1-addressed modulation signal (slot) (2) labeled 3711_12" as illustrated in FIG. 37, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 3711_11" and "terminal #1-addressed modulation signal (slot) (2) labeled 3711_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B6>

FIG. 38 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 38. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 38, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 38 illustrates only feedback signals addressed to terminal #1 labeled 902_1. Although not illustrated in FIG. 38, there may be a feedback signal addressed to a terminal other than terminal #1 labeled 902_1.

In this example, feedback signal group 2702 includes terminal #1-addressed feedback signal (1) labeled 3811_11 present in the first transmission period in frequency band ♭K and terminal #1-addressed feedback signal (2) labeled 3811_12 present in the third transmission period in frequency band ♭K as illustrated in FIG. 38.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 3811_11" present in the first transmission period in frequency band ♭K and "terminal #1-addressed feedback signal (2) labeled 3811_12" present in the third transmission period in frequency band ♭K as illustrated in FIG. 38, based on the information included in sector sweep reference signal 2401_1 (the included information has already been described, and the description thereof will be thus omitted). At this time, both "terminal #1-addressed feedback signal (1) labeled 3811_11" and "terminal #1-addressed feedback signal (2) labeled 3811_12" are transmitted from transmission panel antenna 1 labeled 106_1 of base station #1 labeled 901_1, which means that a single transmission panel antenna has been selected.

As described above, "terminal #1-addressed feedback signal (1) labeled 3811_11" and "terminal #1-addressed feedback signal (2) labeled 3811_12" are present because "base station #1 labeled 901_1 transmits two resources (slots) to terminal #1 labeled 902_1".

At this time, "terminal #1-addressed feedback signal (1) labeled 3811_11" and "terminal #1-addressed feedback signal (2) labeled 3811_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 3811_11" present in the first transmission period in frequency band ♭K and "terminal #1-addressed feedback signal (2) labeled 3811_12" present in the third transmission period in frequency band ♭K as illustrated in FIG. 38.

Further, there may be a feedback signal addressed to a terminal other than terminal #1 labeled 902_1 in FIG. 38 (see FIG. 16B, for example).

The above example has described the case where base station #1 labeled 901_1 transmits, to terminal #1 labeled 902_1, "terminal #1-addressed feedback signal (1) labeled 3811_11" and "terminal #1-addressed feedback signal (2) labeled 3811_12" as illustrated in FIG. 38, but base station #1 labeled 901_1 may transmit three or more feedback signals to terminal #1 labeled 902_1.

FIG. 39 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 39. In FIG. 39, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 39 illustrates only modulation signals (slots) addressed to terminal #1 labeled 902_1. Although not illustrated in FIG. 39, there may be a modulation signal (slot) addressed to a terminal other than terminal #1 labeled 902_1.

In this example, data-symbol-included frame group 2703 includes terminal #1-addressed modulation signal (slot) (1) labeled 3911_11 present in the first transmission period in frequency band ♭K and terminal #1-addressed modulation signal (slot) (2) labeled 3911_12 present in the third transmission period in frequency band ♭K as illustrated in FIG. 39.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 3911_11" present in the first transmission period in frequency band ♭K and "terminal #1-addressed modulation signal (slot) (2) labeled 3911_12" present in the third transmission period in frequency band ♭K as illustrated in FIG. 39, based on the information included in sector sweep reference signal 2401_1 (the included information has already been described, and the description thereof will be thus omitted). At this time, "terminal #1-addressed modulation signal (slot) (1) labeled 3911_11" and "terminal #1-addressed modulation signal (slot) (2) labeled 3911_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 3911_11" and "terminal #1-addressed modulation signal (slot) (2) labeled 3911_12" are present because "base station #1 labeled 901_1 transmits two resources (slots) to terminal #1 labeled 902_1".

At this time, "terminal #1-addressed modulation signal (slot) (1) labeled 3911_11" and "terminal #1-addressed modulation signal (slot) (2) labeled 3911_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 3911_11" present in the first transmission period in frequency band ♭K and "terminal #1-addressed modulation signal (slot) (2) labeled 3911_12" present in the third transmission period in frequency band ♭K as illustrated in FIG. 39.

Further, there may be a modulation signal (slot) addressed to a terminal other than terminal #1 labeled 902_1 in FIG. 39 (see FIG. 17B, for example).

The above example has described the case where base station #1 labeled 901_1 transmits, to terminal #1 labeled 902_1, "terminal #1-addressed modulation signal (slot) (1) labeled 3911_11" and "terminal #1-addressed modulation signal (slot) (2) labeled 3911_12" as illustrated in FIG. 39, but base station #1 labeled 901_1 may transmit three or more modulation signals (slots) (modulation signals (slots) using a plurality of time resources) to terminal #1 labeled 902_1.

Note that "terminal #1-addressed modulation signal (slot) (1) labeled 3911_11" and "terminal #1-addressed modulation signal (slot) (2) labeled 3911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B7>

FIG. 40 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 40. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 40, there are a first transmission period, a second transmission period, a third transmission period, and a fourth transmission period, and frequency band ♭1, frequency band ♭2, . . . , frequency band ♭K for feedback signal group 2702, as in FIG. 16A.

Note that FIG. 40 illustrates only feedback signals addressed to terminal #1 labeled 902_1. Although not illustrated in FIG. 40, there may be a feedback signal addressed to a terminal other than terminal #1 labeled 902_1.

In this example, feedback signal group 2702 includes terminal #1-addressed feedback signal (1) labeled 4011_11 present in the first transmission period in frequency band ♭K and terminal #1-addressed feedback signal (2) labeled 4011_12 present in the third transmission period in frequency band ♭2 as illustrated in FIG. 40.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 4011_11" present in the first transmission period in frequency band ♭K and "terminal #1-addressed feedback signal (2) labeled 4011_12" present in the third transmission period in frequency band ♭2 as illustrated in FIG. 40, based on the information included in sector sweep reference signal 2401_1 (the included information has already been described, and the description thereof will be thus omitted). At this time, both "terminal #1-addressed feedback signal (1) labeled 4011_11" and "terminal #1-addressed feedback signal (2) labeled 4011_12" are transmitted from transmission panel antenna 1 labeled 106_1 of base station #1 labeled 901_1, which means that a single transmission panel antenna has been selected.

As described above, "terminal #1-addressed feedback signal (1) labeled 4011_11" and "terminal #1-addressed feedback signal (2) labeled 4011_12" are present because "base station #1 labeled 901_1 transmits two resources (slots) to terminal #1 labeled 902_1".

At this time, “terminal #1-addressed feedback signal (1) labeled 4011_11” and “terminal #1-addressed feedback signal (2) labeled 4011_12” include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the “information of two “transmission panel antennas and parameters” of base station #1 labeled 901_1 with high reception quality and the frequency (band) information” transmitted by terminal #1 labeled 902_1, and base station #1 labeled 901_1 then transmits, to terminal #1 labeled 902_1, “terminal #1-addressed feedback signal (1) labeled 4011_11” present in the first transmission period in frequency band ♭K and “terminal #1-addressed feedback signal (2) labeled 4011_12” present in the third transmission period in frequency band ♭2 as illustrated in FIG. 40.

Further, there may be a feedback signal addressed to a terminal other than terminal #1 labeled 902_1 in FIG. 40 (see FIG. 16B, for example).

The above example has described the case where base station #1 labeled 901_1 transmits, to terminal #1 labeled 902_1, “terminal #1-addressed feedback signal (1) labeled 4011_11” and “terminal #1-addressed feedback signal (2) labeled 4011_12” as illustrated in FIG. 40, but base station #i labeled 901_1 may transmit three or more feedback signals to terminal #1 labeled 902_1.

FIG. 41 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 41. In FIG. 41, there are a first transmission period, a second transmission period, a third transmission period, and a fourth transmission period, and frequency band ♭1, frequency band ♭2, . . . , frequency band ♭K for data-symbol-included frame group 2703, as in FIG. 17A.

Note that FIG. 41 illustrates only modulation signals (slots) addressed to terminal #1 labeled 902_1. Although not illustrated in FIG. 41, there may be a modulation signal (slot) addressed to a terminal other than terminal #1 labeled 902_1.

In this example, data-symbol-included frame group 2703 includes terminal #1-addressed modulation signal (slot) (1) labeled 4111_11 present in the first transmission period in frequency band ♭K and terminal #1-addressed modulation signal (slot) (2) labeled 4111_12 present in the third transmission period in frequency band ♭2 as illustrated in FIG. 41.

For example, when terminal #1 labeled 902_1 transmits sector sweep reference signal 2401_1 as illustrated in FIG. 24, base station #1 labeled 901_1 transmits, to terminal #1 labeled 902_1, “terminal #1-addressed modulation signal (slot) (1) labeled 4111_11” present in the first transmission period in frequency band ♭K and “terminal #1-addressed modulation signal (slot) (2) labeled 4111_12” present in the third transmission period in frequency band ♭2 as illustrated in FIG. 41, based on the information included in sector sweep reference signal 2401_1 (the included information has already been described, and the description thereof will be thus omitted). At this time, “terminal #1-addressed modulation signal (slot) (1) labeled 4111_11” and “terminal #1-addressed modulation signal (slot) (2) labeled 4111_12” are transmitted from transmission panel antenna 1 labeled 106_1 of base station #1 labeled 901_1, which means that a single transmission panel antenna has been selected.

As described above, “terminal #1-addressed modulation signal (slot) (1) labeled 4111_11” and “terminal #1-addressed modulation signal (slot) (2) labeled 4111_12” are present because “base station #1 labeled 901_1 transmits two resources (slots) to terminal #1 labeled 902_1”.

At this time, “terminal #1-addressed modulation signal (slot) (1) labeled 4111_11” and “terminal #1-addressed modulation signal (slot) (2) labeled 4111_12” include, for example, data symbols (data and/or information) addressed to terminal #1 labeled 902_1.

Note that base station #1 labeled 901_1 selects a transmission panel antenna and sets a parameter of beamforming based on the “information of two “transmission panel antennas and parameters” of base station #1 labeled 901_1 with high reception quality and the frequency (band) information” transmitted by terminal #1 labeled 902_1, and base station #1 labeled 901_1 then transmits, to terminal #1 labeled 902_1, “terminal #1-addressed modulation signal (slot) (1) labeled 4111_11” present in the first transmission period in frequency band ♭K and “terminal #1-addressed modulation signal (slot) (2) labeled 4111_12” present in the third transmission period in frequency band ♭2 as illustrated in FIG. 41.

Further, there may be a modulation signal (slot) addressed to a terminal other than terminal #1 labeled 902_1 in FIG. 41 (see FIG. 17B, for example).

The above example has described the case where base station #1 labeled 901_1 transmits, to terminal #1 labeled 902_1, “terminal #1-addressed modulation signal (slot) (1) labeled 4111_11” and “terminal #1-addressed modulation signal (slot) (2) labeled 4111_12” as illustrated in FIG. 41, but base station #1 labeled 901_1 may transmit three or more modulation signals (slots) (modulation signals (slots) using a plurality of frequency and time resources) to terminal #1 labeled 902_1.

Note that “terminal #1-addressed modulation signal (slot) (1) labeled 4111_11” and “terminal #1-addressed modulation signal (slot) (2) labeled 4111_12” may each include, in addition to the data symbol, a “reference signal such as DMRS, PTRS, or SRS”, a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

As described thus far, transmitting modulation signals according to <Case B1> to <Case B7>, for example, reduces interference between the modulation signals, and efficiently assigning the modulation signals and slots produces an effect of enhancing data transmission efficiency.

Note that the base station and the terminals may perform communication according to any of the methods of <Case B1> to <Case B7>, and the base station and the terminals may perform communication selecting any of the communication methods of <Case B1> to <Case B7> depending on the radio propagation environment, the communication state, etc.

FIG. 42 illustrates an exemplary state where base station #1 labeled 901_1 and a “terminal such as terminal #1 labeled 902_1” communicate with each other in FIG. 9. (A) of FIG. 42 illustrates an exemplary modulation signal transmission state of base station #1 labeled 901_1, and (B) of FIG. 42 illustrates an exemplary modulation signal transmission state of the “terminal such as terminal #1 labeled 902_1”.

Note that the horizontal axes represent time in (A) and (B) of FIG. 42. Note that, in FIG. 42, the components that operate in the same manner as in FIG. 18 are denoted by the same reference signs.

First, base station #1 labeled 901_1 transmits sector sweep reference signal 1801_1. Note that this has already been described with reference to FIG. 27, and the description thereof will be thus omitted.

Then, the "terminal such as terminal #1 labeled 902_1" transmits sector sweep reference signal 1851_1. Note that this has already been described with reference to, for example, FIGS. 23, 24, etc., and the description thereof will be thus omitted.

Base station #1 labeled 901_1 transmits feedback signal group 4202_1. Note that this has already been described with reference to FIGS. 28A, 28B, 30A, 30B, 32A, 32B, 34A, 34B, 36, 38, and 40, and the description thereof will be thus omitted.

After that, base station #1 labeled 901_1 transmits "data-symbol-included frame group 4203_1". Note that this has already been described with reference to FIGS. 29A, 29B, 31A, 318, 33A, 33B, 35A, 35B, 37, 39, and 41, and the description thereof will be thus omitted. (Hence, "data-symbol-included frame 4203_1" is considered to be a frame for downlink, for example).

Then, the "terminal such as terminal #1 labeled 902_1" transmits "data-symbol-included frame group 4252_1". Note that a configuration of the frame will be described later with reference to "FIGS. 51A and 51B", "FIGS. 52A and 52B", and "FIG. 53". (Hence. "data-symbol-included frame group 4252_1" is considered to be a frame for uplink, for example).

Next, base station #1 labeled 901_1 transmits "data-symbol-included frame group 4203_2". Note that a configuration method of "data-symbol-included frame group 4203_2" is as described with reference to FIGS. 29A, 29B, 31A, 31B, 33A, 33B, 35A, 35B, 37, 39, and 41.

Then, the terminal such as "terminal #1 labeled 902_1 and terminal #2 labeled 902_2" transmits "data-symbol-included frame group 4252_2". Note that a configuration of the frame will be described later with reference to "FIGS. 51A and 51B", "FIGS. 52A and 52B", and "FIG. 53".

FIG. 43 illustrates an exemplary modulation signal transmission state of base station #1 labeled 901_1 and an exemplary modulation signal transmission state of the "terminal such as terminal #1 labeled 902_1" after the state in FIG. 42. Note that, in FIG. 43, the components that operate in the same manner as in FIG. 18 are denoted by the same reference signs.

(A) of FIG. 43 illustrates an exemplary modulation signal transmission state of base station #1 labeled 901_1, and it is a temporal continuation from the modulation signal transmission state of base station #1 labeled 901_1 in (A) of FIG. 42.

(B) of FIG. 43 illustrates an exemplary modulation signal transmission state of "terminal #1 labeled 902_1 and terminal #2 labeled 902_2", and it is a temporal continuation from the modulation signal transmission state of the "terminal such as terminal #1 labeled 902_1" in (B) of FIG. 42.

Note that the horizontal axes represent time in (A) and (B) of FIG. 43.

After the states in (A) and (B) of FIG. 42, base station #1 labeled 901_1 transmits "data-symbol-included frame group 4203_3". Note that a configuration method of "data-symbol-included frame group 4203_3" is as described with reference to FIGS. 29A, 29B, 31A, 31B, 33A, 33B, 35A, 35B, 37, 39, and 41.

The "terminal such as terminal #1 labeled 902_1" transmits "data-symbol-included frame group 4252_3". Note that a configuration of the frame will be described later with reference to "FIGS. 51A and 51B", "FIGS. 52A and 52B", and "FIG. 53".

Next, base station #1 labeled 901_1 transmits sector sweep reference signal 1801_2. Note that this has already been described with reference to FIG. 27, and the description thereof will be thus omitted.

Then, the "terminal such as terminal #1 labeled 902_1" transmits sector sweep reference signal 1851_2. Note that this has already been described with reference to FIGS. 23, 24, etc., and the description thereof will be thus omitted.

Base station #1 labeled 901_1 transmits feedback signal group 4202_2. Note that this has already been described with reference to FIGS. 28A, 28B, 30A, 30B, 32A, 32B, 34A, 34B, 36, 38, and 40, and the description thereof will be thus omitted.

After that, base station #1 labeled 901_1 transmits "data-symbol-included frame group 4203_4". Note that this has already been described with reference to FIGS. 29A, 29B, 31A, 31B, 33A, 33B, 35A, 35B, 37, 39, and 41, and the description thereof will be thus omitted.

Then, the "terminal such as terminal #1 labeled 902_1" transmits "data-symbol-included frame group 4252_4". Note that a configuration of the frame will be described later with reference to "FIGS. 51A and 51B", "FIGS. 52A and 52B", and "FIG. 53".

As described above, base station #1 labeled 901_1 and the terminal transmit the sector sweep reference signals before the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"", and again transmit the sector sweep reference signals after the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"" Base station #1 labeled 901_1 and the terminal then each select a transmission panel antenna to be used and configure transmission beamforming. This produces an elect that the base station and/or the terminal achieve high data reception quality.

Next, a description will be given of an exemplary configuration of "data-symbol-included frame group 4252_*i*" transmitted by the terminal such as "terminal #1 labeled 902_1 and terminal #2 labeled 902_2". Note that i is an integer equal to or greater than 1, for example.

As described before, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

A plurality of cases will be described in the following.

<Case C1>

Figure 51A:
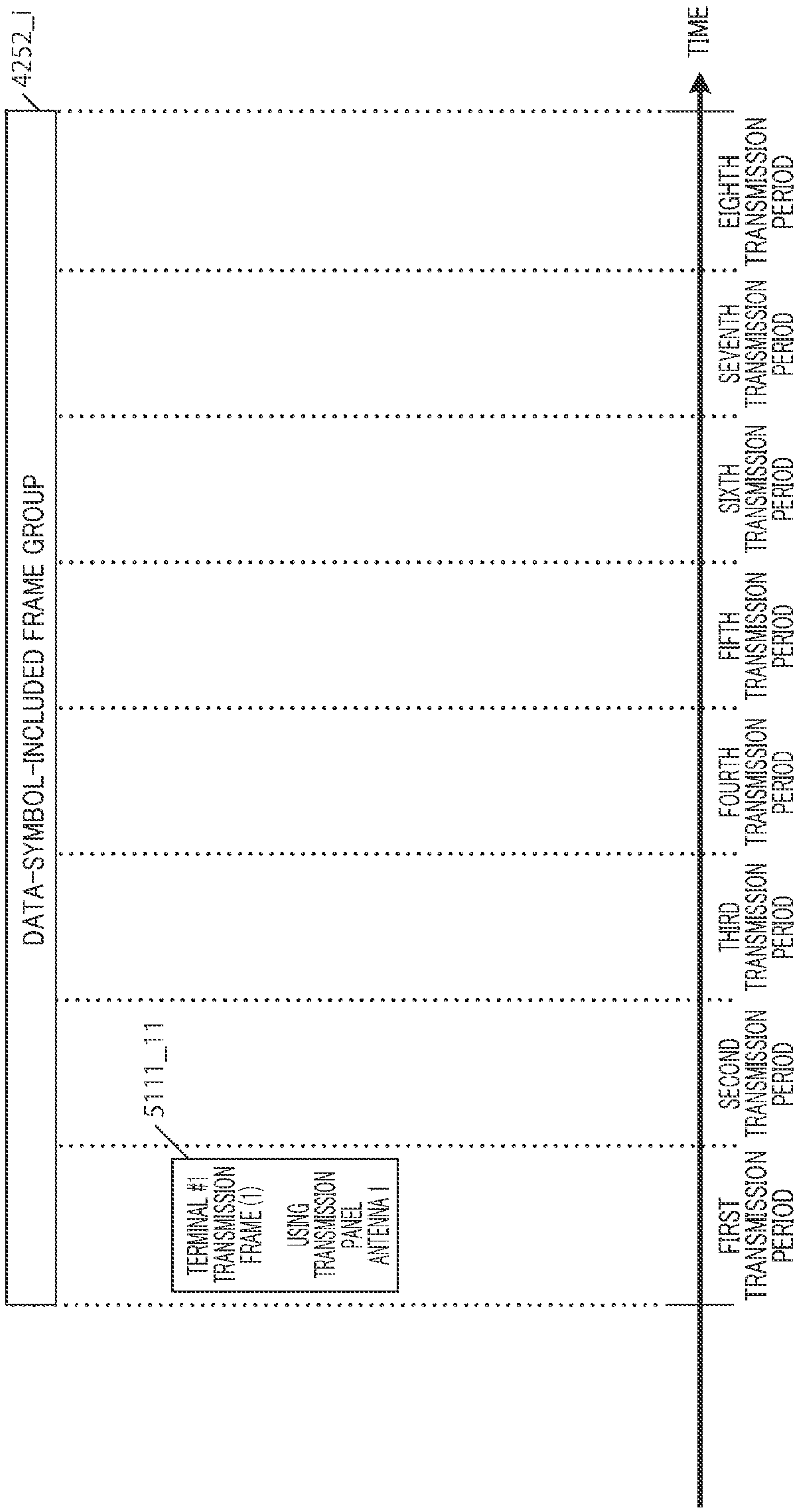
FIG. 51A illustrates the eighth example of the configuration of the "data-symbol-included frame getup"
Figure 51B:
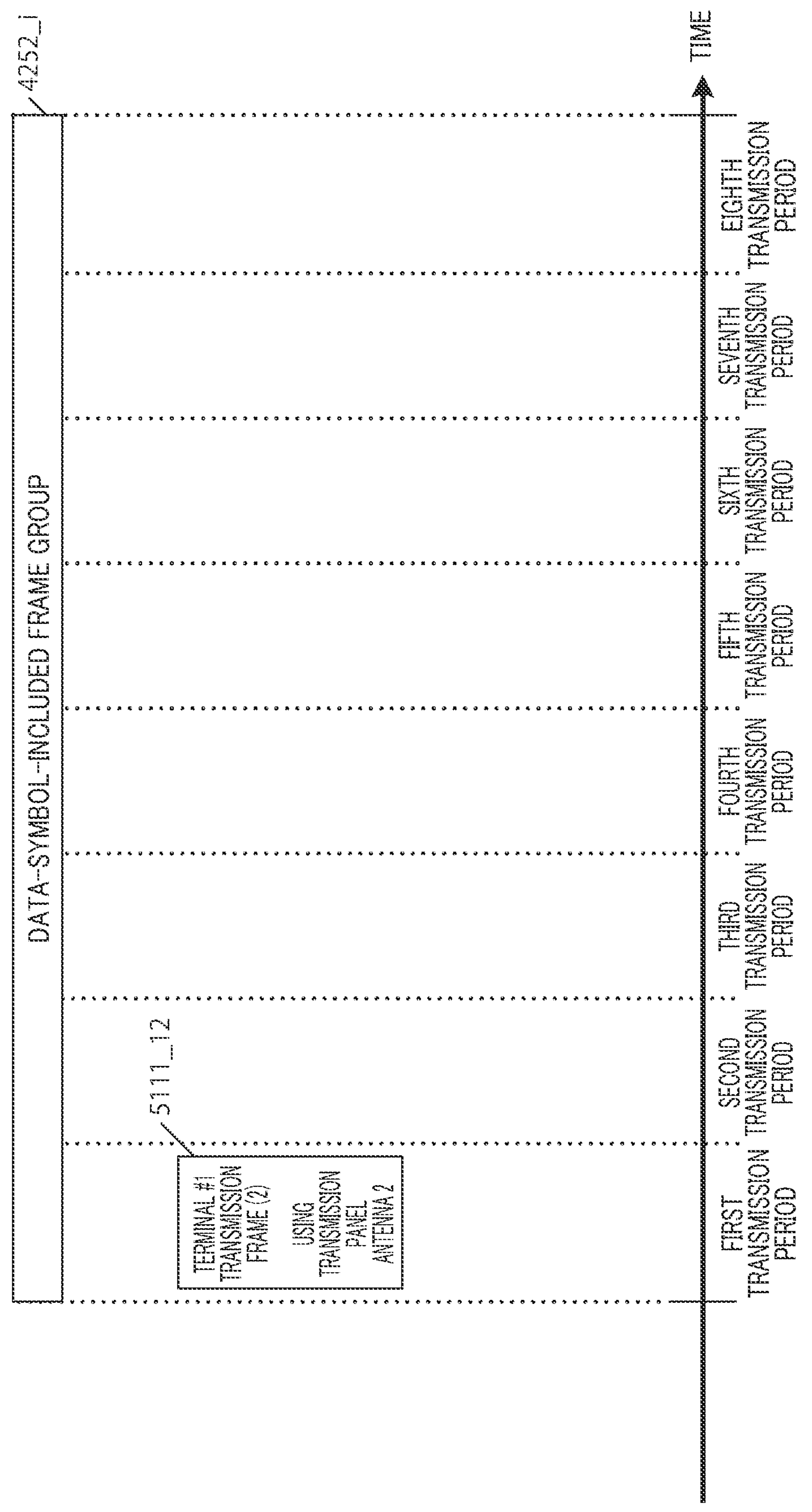
FIG. 51B illustrates the eighth example of the configuration of the "data-symbol-included frame group"

FIGS. 51A and 51B illustrate exemplary configurations of "data-symbol-included frame group 4252_*i*". Note that the horizontal axes represent time in FIGS. 51A and 51B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 51A and 51B, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIGS. 51A and 51B illustrate frames (slots or modulation signals) transmitted by terminal #1 labeled 902_1. Although not illustrated in FIGS. 51A and 51B, there may be a frame (slot or modulation signal) transmitted by a terminal other than terminal #1 labeled 902_1 (see FIG. 25).

In this example, in data-symbol-included frame group 4252_*i*, "terminal #1 transmission frame (1) labeled 5111_11" transmitted by terminal #1 labeled 902_1 is present in the first transmission period as illustrated in FIG. 51A and "terminal #1 transmission frame (2) labeled 5111_12" transmitted by terminal #1 labeled 902_1 is present in the first transmission period as illustrated in FIG. 51B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, terminal #1 labeled 902_1 transmits, to base station #1 labeled 901_1. "terminal #1 transmission frame (1) labeled 5111_11" present in the first transmission period as illustrated in FIG. 51A and "terminal #1 transmission frame (2) labeled 5111_12" present in the first transmission period as illustrated in FIG. 51B. At this time, "terminal #1 transmission frame (1) labeled 5111_11" is transmitted from transmission panel antenna 1 labeled 106_1 of terminal #1 labeled 902_1, and "terminal #1 transmission frame (2) labeled 5111_12" is transmitted from transmission panel antenna 2 labeled 106_2 of terminal #1 labeled 902_1.

As described above, "terminal #1 transmission frame (1) labeled 5111_11" and "terminal #1 transmission frame (2) labeled 5111_12" are present because "terminal #1 labeled 902_1 transmits two modulation signals (streams) to base station #1 labeled 901_1".

At this time, "terminal #1 transmission frame (1) labeled 5111_11" includes, for example, a data symbol (data and/or information) addressed to base station #1 labeled 901_1.

In addition, "terminal #1 transmission frame (2) labeled 5111_12" also includes, for example, a data symbol (data and/or information) addressed to base station #1 labeled 9011.

The above example has described the case where terminal #1 labeled 902_1 transmits, to base station #1 labeled 901_1, "terminal #1 transmission frame (1) labeled 5111_11" and "terminal #1 transmission frame (2) labeled 5111_12" as illustrated in FIGS. 51A and 51B, but terminal #1 labeled 902_1 may transmit three or more frames (slots or modulation signals) (a plurality of frames (slots or modulation signals) using the same frequency resource) to base station #1 labeled 901_1. Terminal #1 labeled 902_1 may also transmit a single frame (slot or modulation signal) to base station #1 labeled 901_1.

Note that "terminal #1 transmission frame (1) labeled 5111_11" and "terminal #1 transmission frame (2) labeled 5111_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case C2>

Figure 52A:
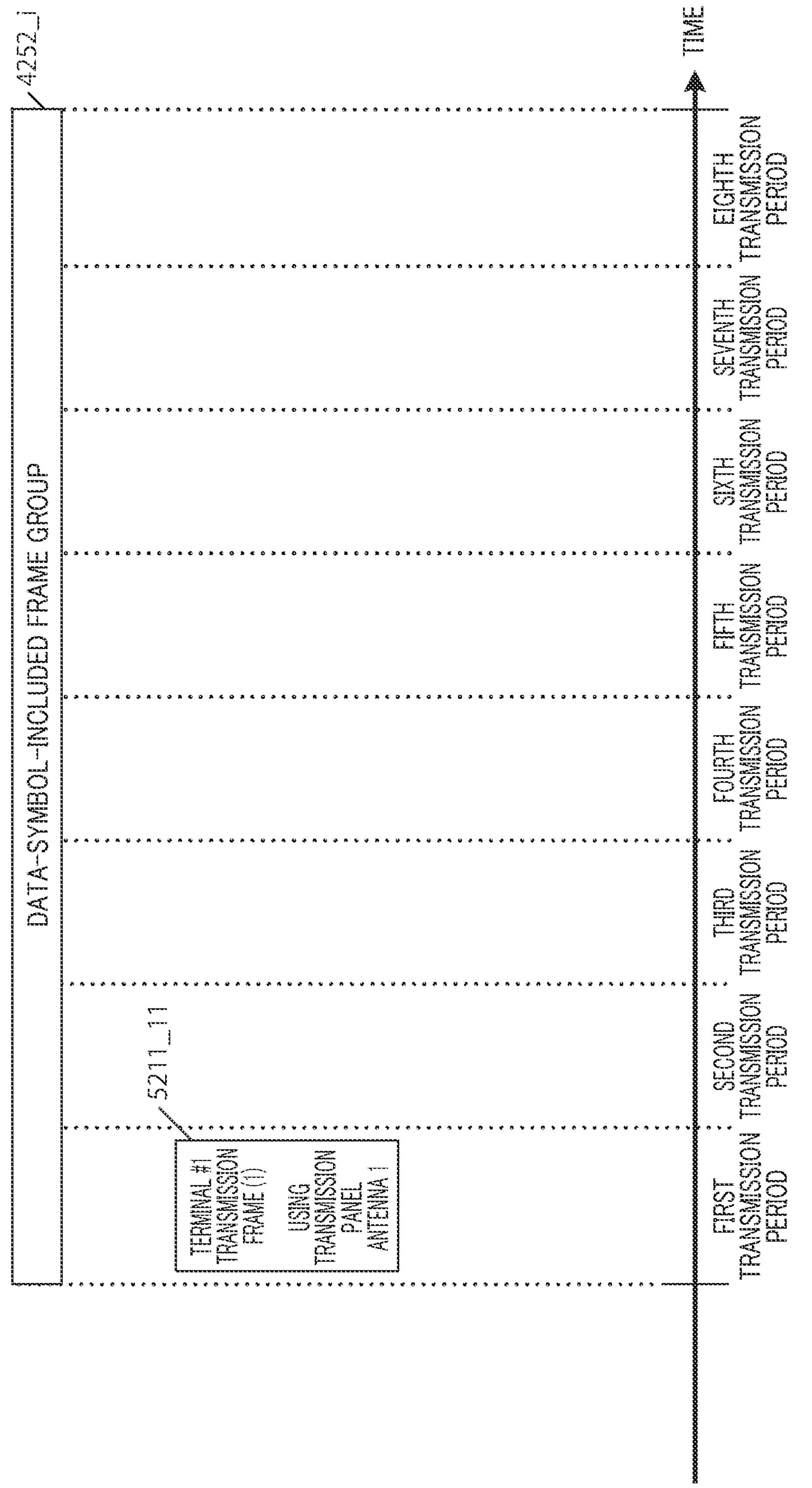
FIG. 52A illustrates the ninth example of the configuration of the "data-symbol-included frame group"
Figure 52B:
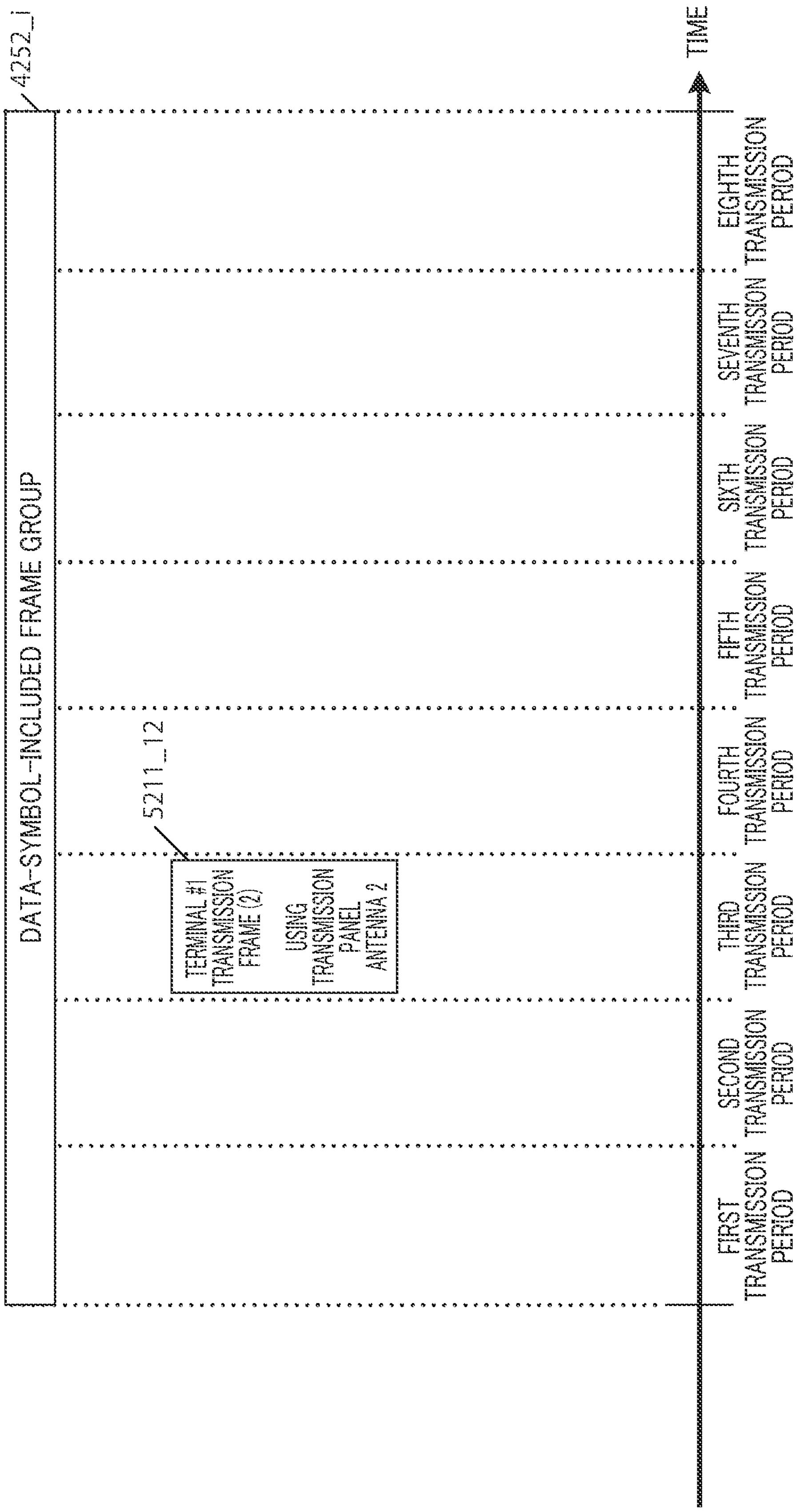
FIG. 52B illustrates the ninth example of the configuration of the "data-symbol-included frame group"

FIGS. 52A and 52B illustrate exemplary configurations of "data-symbol-included frame group 4252_*i*". Note that the horizontal axes represent time in FIGS. 52A and 52B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 52A and 52B, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIGS. 52A and 52B illustrate frames (slots or modulation signals) transmitted by terminal #1 labeled 902_1. Although not illustrated in FIGS. 52A and 52B, there may be a frame (slot or modulation signal) transmitted by a terminal other than terminal #1 labeled 902_1 (see FIG. 25).

In this example, in data-symbol-included frame group 4252_. "terminal #1 transmission frame (1) labeled 5211_11" transmitted by terminal #1 labeled 902_1 is present in the first transmission period as illustrated in FIG. 52A and "terminal #1 transmission frame (2) labeled 5211_12" transmitted by terminal #1 labeled 902_1 is present in the third transmission period as illustrated in FIG. 52B.

For example, terminal #1 labeled 902_1 transmits, to base station #1 labeled 901_1, "terminal #1 transmission frame (1) labeled 5211_11" present in the first transmission period as illustrated in FIG. 52A and "terminal #1 transmission frame (2) labeled 5211_12" present in the third transmission period as illustrated in FIG. 52B. At this time, "terminal #1 transmission frame (1) labeled 5211_11" is transmitted from transmission panel antenna 1 labeled 106_1 of terminal #1 labeled 902_1, and "terminal #1 transmission frame (2) labeled 5211_12" is transmitted from transmission panel antenna 2 labeled 106_2 of terminal #1 labeled 902_1.

As described above, "terminal #1 transmission frame (1) labeled 5211_11" and "terminal #1 transmission frame (2) labeled 5211_12" are present because "terminal #1 labeled 902_1 transmits two modulation signals (streams) to base station #1 labeled 901_1".

At this time, "terminal #1 transmission frame (1) labeled 5211_11" includes, for example, a data symbol (data and/or information) addressed to base station #1 labeled 901_1.

In addition, "terminal #1 transmission frame (2) labeled 5211_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 5211_11" and "terminal #1 transmission frame (2) labeled 4511_12" as illustrated in FIGS. 52A and 52B, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that "terminal #1 transmission frame (1) labeled 5211_11" and "terminal #1 transmission frame (2) labeled 5211_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case C3>

Figure 53:
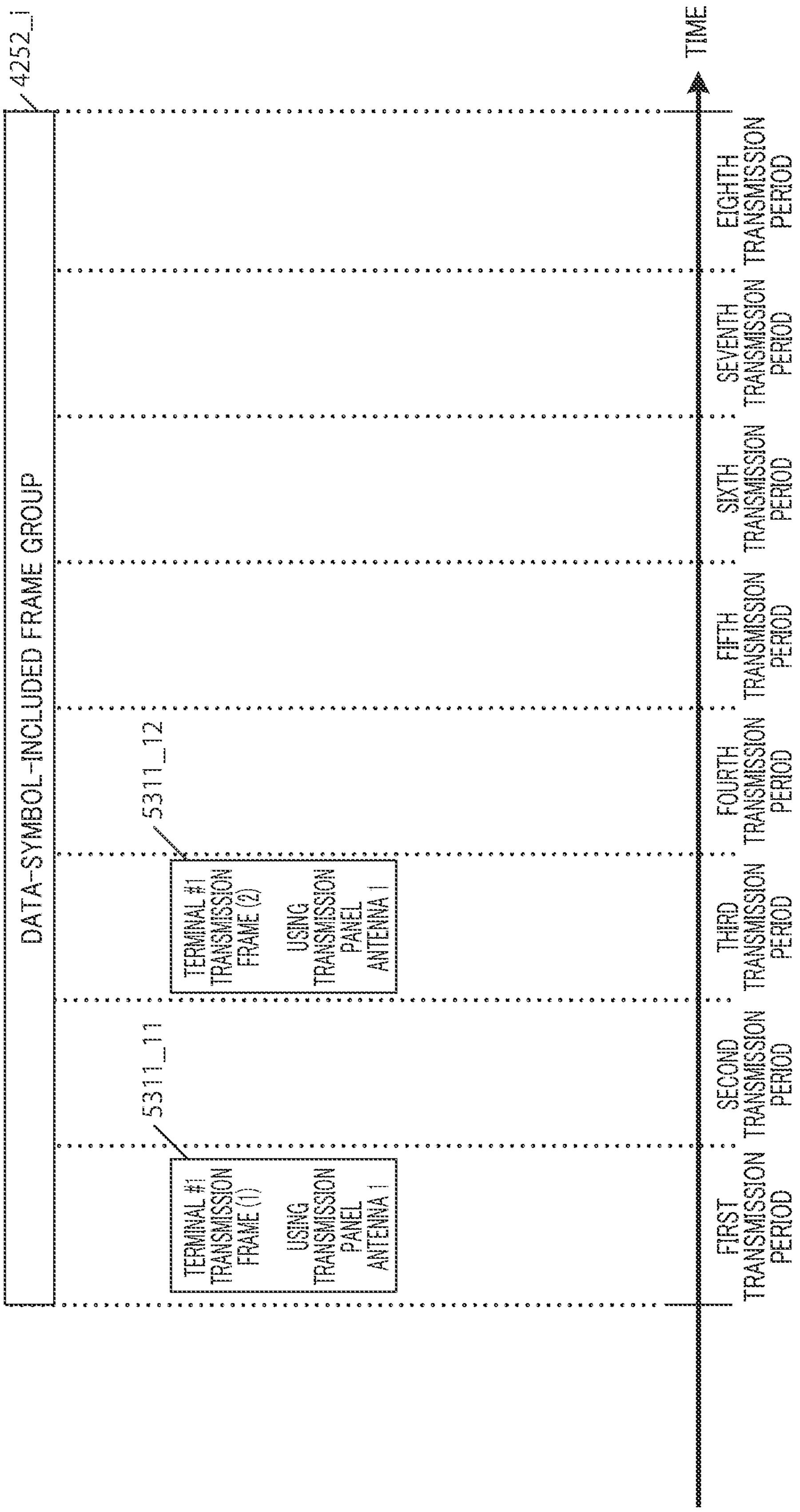
FIG. 53 illustrates the tenth example of the configuration of the "data-symbol-included frame group"

FIG. 53 illustrates an exemplary configuration of "data-symbol-included frame group 4252_*i*". Note that the horizontal axis represents time in FIG. 53. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 53, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIG. 53 illustrates frames (slots or modulation signals) transmitted by terminal #1 labeled 902_1. Although not illustrated in FIG. 53, there may be a frame (slot or modulation signal) transmitted by a terminal other than terminal #1 labeled 902_1 (see FIG. 25).

In this example, in data-symbol-included frame group 4252_*i*, "terminal #1 transmission frame (1) labeled 5311_11" transmitted by terminal #1 labeled 902_1 is present in the first transmission period and "terminal #1 transmission frame (2) labeled 5311_12" transmitted by terminal #1 labeled 902_1 is present in the third transmission period as illustrated in FIG. 53.

For example, terminal #1 labeled 902_1 transmits, to base station #1 labeled 901_1, "terminal #1 transmission frame (1) labeled 5311_11" present in the first transmission period and "terminal #1 transmission frame (2) labeled 5311_12" present in the third transmission period as illustrated in FIG. 53. At this time, "terminal #1 transmission frame (1) labeled 5311_11" and "terminal #1 transmission frame (2) labeled 5311_12" are transmitted from transmission panel antenna 1 labeled 106_1 of terminal #1 labeled 902_1, which means a single transmission panel antenna has been selected.

As described above, "terminal #1 transmission frame (1) labeled 5311_11" and "terminal #1 transmission frame (2) labeled 5311_12" are present because "terminal #1 labeled 902_1 transmits two frames (resources) to base station #1 labeled 901_1".

At this time, "terminal #1 transmission frame (1) labeled 5311_11" and "terminal #1 transmission frame (2) labeled 5311_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 5311_11" and "terminal #1 transmission frame (2) labeled 5311_12" as illustrated in FIG. 53, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that "terminal #1 transmission frame (1) labeled 5311_11" and "terminal #1 transmission frame (2) labeled 5311_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

As described thus far, transmitting frames according to <Case C1> to <Case C3>, for example, reduces interference between the frames, and efficiently assigning the frames and slots produces an effect of enhancing data transmission efficiency.

Note that the base station and the terminals may perform communication according to any of the methods of <Case C1> to <Case C3>, and the base station and the terminals may perform communication selecting any of the communication methods of <Case C1> to <Case C3> depending on the radio propagation environment, the communication state, etc.

As described above in Embodiment 4, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, operations have been described using various frame configurations in the present embodiment, but the frames used in the present embodiment are merely examples and the frame configuration is not limited to the examples. In addition, the terms "signal", "frame", "modulation signal" "frame", etc. are used in the present embodiment, but the terms are not limited to those and the important part is the functions of the signals to be transmitted.

Embodiment 5

The embodiments in the present specification, such as Embodiments 1 to 3, have provided a description of methods of transmitting a sector sweep reference signal (e.g., 1001 in FIG. 10, etc.) by a base station, the example of which is base station #1 labeled 901_1 in FIG. 9, and a description of methods of transmitting a sector sweep reference signal by a terminal, the example of which is terminal #1 labeled 902_1 in FIG. 9. In the present embodiment, a description will be given of variations of the "methods of transmitting a sector sweep reference signal by a base station" and the "methods of transmitting a sector sweep reference signal by a terminal".

The methods of transmitting a sector sweep reference signal by a base station have described with reference to, for example, FIGS. 11, 12, etc.

To be more specific, a sector sweep reference signal is generated based on the identification (ID) of a transmission panel antenna and the ID of beamforming (see FIG. 12).

For example, a base station transmits sector sweep reference signals using transmission panel antenna #1. In this case, the base station transmits the following sector sweep reference signals using transmission panel antenna #1.

"(Reference) signal subjected to processing based on a parameter of beamforming (directivity control) ID 0, which is parameter ID 0, using transmission panel antenna #1"

"(Reference) signal subjected to processing based on a parameter of beamforming (directivity control) ID 1, which is parameter ID 1, using transmission panel antenna #1"

"(Reference) signal subjected to processing based on a parameter of beamforming (directivity control) ID 2, which is parameter ID 2, using transmission panel antenna #1"

"(Reference) signal subjected to processing based on a parameter of beamforming (directivity control) ID 3, which is parameter ID 3, using transmission panel antenna #1"

Likewise, the base station transmits sector sweep reference signals using transmission panel antenna #2. In this case, the base station transmits the following sector sweep reference signals using transmission panel antenna #2.

"(Reference) signal subjected to processing based on a parameter of beamforming (directivity control) ID 0, which is parameter ID 0, using transmission panel antenna #2"

"(Reference) signal subjected to processing based on a parameter of beamforming (directivity control) ID 1, which is parameter ID 1, using transmission panel antenna #2"

"(Reference) signal subjected to processing based on a parameter of beamforming (directivity control) ID 2, which is parameter ID 2, using transmission panel antenna #2"

"(Reference) signal subjected to processing based on a parameter of beamforming (directivity control) ID 3, which is parameter ID 3, using transmission panel antenna #2"

That is, the base station transmits sector sweep reference signals using transmission panel antenna #i. Note that i is an integer equal to or greater than 1. In this case, the base station transmits the following sector sweep reference signals using transmission panel antenna #i.

"(Reference) signal subjected to processing based on a parameter of beamforming (directivity control) ID 0, which is parameter ID 0, using transmission panel antenna #i"

"(Reference) signal subjected to processing based on a parameter of beamforming (directivity control) ID 1, which is parameter ID 1, using transmission panel antenna #i"

"(Reference) signal subjected to processing based on a parameter of beamforming (directivity control) ID 2, which is parameter ID 2, using transmission panel antenna #i"

"(Reference) signal subjected to processing based on a parameter of beamforming (directivity control) ID 3, which is parameter ID 3, using transmission panel antenna #i"

In the above, "the ID of a transmission panel antenna and the ID of beamforming (directivity control) of a base station" are distinguished from each other, but the ID may be assigned without distinguishing and the base station may generate and transmit a sector sweep reference signal.

For example, an ID is assigned to "use of beamforming (directivity control) ID 0, which is parameter ID 0, with transmission panel antenna #1", and it is ID ♭0. An ID is assigned to "use of beamforming (directivity control) ID 1, which is parameter ID 1, with transmission panel antenna #1", and it is ID ♭1. An ID is assigned to "use of beamforming (directivity control) ID 2, which is parameter ID 2, with transmission panel antenna #1", and it is ID ♭2. An ID is assigned to "use of beamforming (directivity control) ID 3, which is parameter ID 3, with transmission panel antenna #1", and it is ID ♭3.

An ID is assigned to "use of beamforming (directivity control) ID 0, which is parameter ID 0, with transmission panel antenna #2", and it is ID ♭4. An ID is assigned to "use of beamforming (directivity control) ID 1, which is parameter ID 1, with transmission panel antenna #2", and it is ID ♭5. An ID is assigned to "use of beamforming (directivity control) ID 2, which is parameter ID 2, with transmission panel antenna #2", and it is ID ♭6. An ID is assigned to "use of beamforming (directivity control) ID 3, which is parameter ID 3, with transmission panel antenna #2", and it is ID ♭7.

An ID is assigned to "use of beamforming (directivity control) ID 0, which is parameter ID 0, with transmission panel antenna #3", and it is ID ♭8. An ID is assigned to "use of beamforming (directivity control) ID 1, which is parameter ID 1, with transmission panel antenna #3", and it is ID ♭9. An ID is assigned to "use of beamforming (directivity control) ID 2, which is parameter ID 2, with transmission panel antenna #3", and it is ID ♭10. An ID is assigned to "use of beamforming (directivity control) ID 3, which is parameter ID 3, with transmission panel antenna #3", and it is ID ♭11, and so forth.

Then, the base station transmits, as sector sweep reference signals, a "(reference) signal subjected to processing based on ID ♭0", a "(reference) signal subjected to processing based on ID ♭1", a "(reference) signal subjected to processing based on ID ♭2", a "(reference) signal subjected to processing based on ID ♭3", a "(reference) signal subjected to processing based on ID ♭4", a "(reference) signal subjected to processing based on ID ♭5", a "(reference) signal subjected to processing based on ID ♭6", a "(reference) signal subjected to processing based on ID ♭7", a "(reference) signal subjected to processing based on ID ♭8", a "(reference) signal subjected to processing based on ID ♭9", a "(reference) signal subjected to processing based on ID ♭10", a "(reference) signal subjected to processing based on ID ♭11", and so forth. Note that the above signals may be transmitted in the above order or in a different order.

At this time, the "(reference) signal subjected to processing based on ID ♭k" transmitted by the base station includes information of ID ♭k, where k is an integer equal to or greater than 0. Note that the "(reference) signal subjected to processing based on ID ♭k" transmitted by the base station may include other information. The examples have already been described in other embodiments, and the description thereof will be thus omitted (information of a transmission panel antenna may be included).

A terminal then receives the sector sweep reference signals transmitted by the base station and transmits a sector sweep reference signal including information of the ID with high reception quality (e.g., when "ID ♭3" has high reception quality, the information of "ID ♭3" is included). Note that the sector sweep reference signal transmitted by a terminal may include other information. The examples are as described in other embodiments. Methods of transmitting the sector sweep reference signal by a terminal are as described in other embodiments and will be described later in the present embodiment.

A transmission panel antenna (see FIGS. 1A, 1B and 1C) of the base station may include the configuration in FIG. 3. The transmission panel antenna may be composed of a single antenna or a plurality of antennas.

Based on the above, the base station may generate and transmit, for example, sector sweep reference signal 1001 in FIG. 10, etc. in the following manner.

Figure 54:
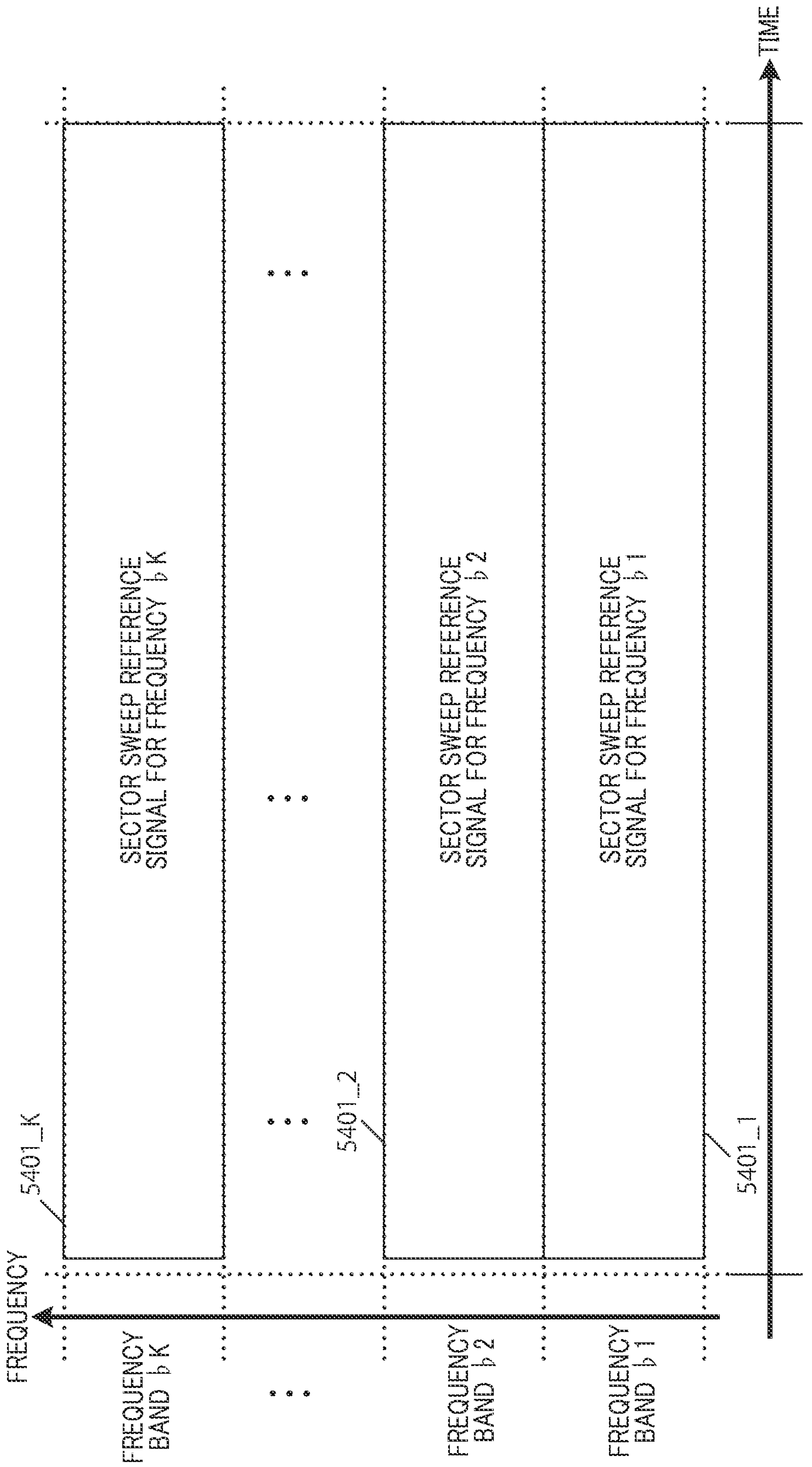
FIG. 54 illustrates an exemplary configuration of a sector sweep reference signal transmitted by the base station.

FIG. 54 illustrates an exemplary configuration of sector sweep reference signal 1001, which has been described with reference to FIG. 10 etc., for example, transmitted by the base station. The vertical axis represents frequency and the horizontal axis represents time in FIG. 54. Note that there are frequency band ♭1, frequency band ♭2, . . . , frequency band ♭K as in other embodiments.

As illustrated in FIG. 54, sector sweep reference signal 1001 is composed of "sector sweep reference signal 5401_1 for frequency ♭1", "sector sweep reference signal 5401_2 for frequency ♭2", . . . , "sector sweep reference signal 5401_K for frequency ♭K".

Figure 55:
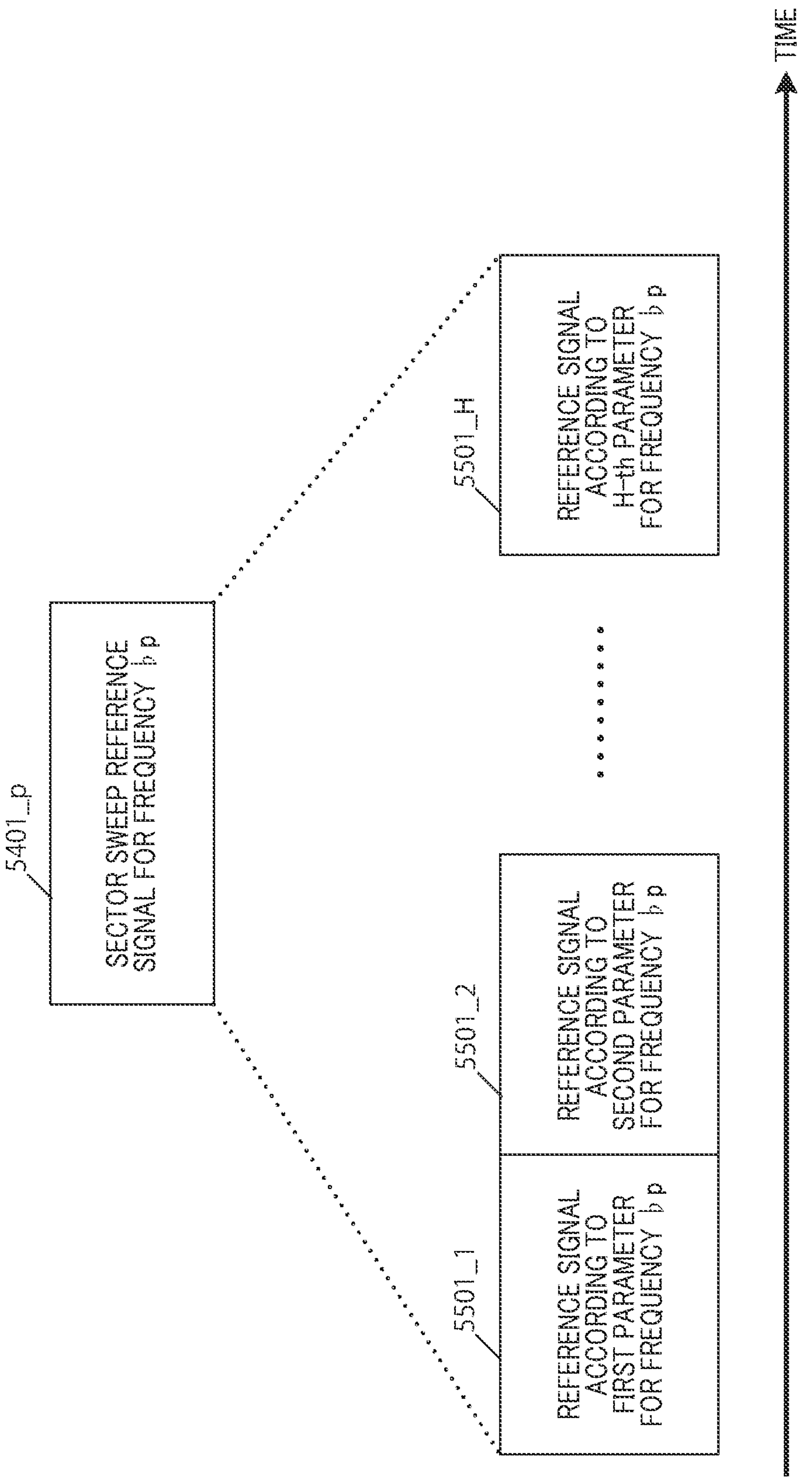
FIG. 55 illustrates an exemplary configuration of a "sector sweep reference signal for frequency ♭p" in FIG. 54.

FIG. 55 illustrates an exemplary configuration of "sector sweep reference signal 5401_*p* for frequency ♭p" in FIG. 54. Note that the horizontal axis represents time in FIG. 55 and p is an integer from 1 to K (both inclusive).

"Sector sweep reference signal 5401_*p* for frequency ♭p" is composed of "reference signal 5501_1 according to first parameter for frequency ♭p", "reference signal 5501_2 according to second parameter for frequency ♭p", . . . , "reference signal 5501_H according to H-th parameter for frequency ♭p". Note that H is an integer equal to or greater than 1 or an integer equal to or greater than 2.

In a case where the base station has a configuration in FIG. 1A, 1B, or 1C, "reference signal 5501_*i* according to i-th parameter for frequency ♭p" is transmitted using one or more transmission panel antennas among transmission panel antenna 1 labeled 106_1 to transmission panel antenna M labeled 106_M. Note that i is an integer from 1 to H (both inclusive).

For example, in a case where the base station has a configuration in FIG. 1A or 1B. "reference signal 5501_*i* according to i-th parameter for frequency ♭p" is subjected to signal processing (beamforming (directivity control)) according to the i-th parameter in first processor 104, and first processor 104 generates "reference signal 5501_*i* according to i-th parameter for frequency ♭p" to be transmitted using one or more transmission panel antennas among transmission panel antenna 1 labeled 106_1 to transmission panel antenna M labeled 106_M.

"Reference signal 5501_*i* according to i-th parameter for frequency ♭p" includes, for example, the following information:

- Information on the i-th parameter, that is, a beamforming (directivity control) identification number (ID), which corresponds to i here, for example;
- The number of time divisions in which sector sweep reference signals can be transmitted when the terminals transmit the sector sweep reference signals; and
- Information on the frequency band and/or frequency ♭p (information of the number of frequency divisions may also be included)

Other information may also be included, and "reference signal 5501_*i* according to i-th parameter for frequency ♭p" may include, for example, information similar to the information included in reference signal 1201_*a* according to a-th parameter in a transmission panel antenna for frequency ♭p in FIG. 12. Thus, for operations on "reference signal 1201_*a* according to a-th parameter in a transmission panel antenna for frequency ♭p in FIG. 12" in the present specification, the same can be implemented by replacing "reference signal 1201_*a* according to a-th parameter in a transmission panel antenna for frequency ♭p in FIG. 12" with "reference signal 5501_*i* according to i-th parameter for frequency ♭p".

In addition, "reference signal 5501_*i* according to i-th parameter for frequency ♭p" may include information of an antenna (e.g., transmission panel antenna ID, sector antenna information, and antenna port number) used for transmitting "reference signal 5501_*i* according to i-th parameter for frequency ♭p".

Next, a variation on a sector sweep reference signal transmitted by a terminal will be described.

The methods of transmitting a sector sweep reference signal by a terminal have described with reference to, for example, FIGS. 14, 15A, 15B, etc.

To be more specific, a sector sweep reference signal is generated based on the identification (ID) of a transmission panel antenna and the ID of beamforming (see FIGS. 15A and 15B).

For example, a terminal transmits sector sweep reference signals using transmission panel antenna #1. In this case, the terminal transmits the following sector sweep reference signals using transmission panel antenna #1.

- "(Reference) signal subjected to processing based on a parameter of beamforming (directivity control) ID 0, which is parameter ID 0, using transmission panel antenna #1"
- "(Reference) signal subjected to processing based on a parameter of beamforming (directivity control) ID 1, which is parameter ID 1, using transmission panel antenna #1"
- "(Reference) signal subjected to processing based on a parameter of beamforming (directivity control) ID 2, which is parameter ID 2, using transmission panel antenna #1"
- "(Reference) signal subjected to processing based on a parameter of beamforming (directivity control) ID 3, which is parameter ID 3, using transmission panel antenna #1"

Likewise, the terminal transmits sector sweep reference signals using transmission panel antenna #2. In this case, the terminal transmits the following sector sweep reference signals using transmission panel antenna #2.

- "(Reference) signal subjected to processing based on a parameter of beamforming (directivity control) ID 0, which is parameter ID 0, using transmission panel antenna #2"
- "(Reference) signal subjected to processing based on a parameter of beamforming (directivity control) ID 1, which is parameter ID 1, using transmission panel antenna #2"
- "(Reference) signal subjected to processing based on a parameter of beamforming (directivity control) ID 2, which is parameter ID 2, using transmission panel antenna #2"
- "(Reference) signal subjected to processing based on a parameter of beamforming (directivity control) ID 3, which is parameter ID 3, using transmission panel antenna #2"

That is, the terminal transmits sector sweep reference signals using transmission panel antenna #i. Note that i is an integer equal to or greater than 1. In this case, the terminal transmits the following sector sweep reference signals using transmission panel antenna #i.

"(Reference) signal subjected to processing based on a parameter of beamforming (directivity control) ID 0, which is parameter ID 0, using transmission panel antenna #i"

"(Reference) signal subjected to processing based on a parameter of beamforming (directivity control) ID 1, which is parameter ID 1, using transmission panel antenna #i"

"(Reference) signal subjected to processing based on a parameter of beamforming (directivity control) ID 2, which is parameter ID 1 using transmission panel antenna #i"

"(Reference) signal subjected to processing based on a parameter of beamforming (directivity control) ID 3, which is parameter ID 3, using transmission panel antenna #i"

In the above, "the ID of a transmission panel antenna and the ID of beamforming (directivity control) of a terminal" are distinguished from each other, but the ID may be assigned without distinguishing and the terminal may generate and transmit a sector sweep reference signal.

For example, an ID is assigned to "use of beamforming (directivity control) ID 0, which is parameter ID 0, with transmission panel antenna #1", and it is ID ♭0. An ID is assigned to "use of beamforming (directivity control) ID 1, which is parameter ID 1, with transmission panel antenna #1", and it is ID ♭1. An ID is assigned to "use of beamforming (directivity control) ID 2, which is parameter ID 2, with transmission panel antenna #1", and it is ID ♭2. An ID is assigned to "use of beamforming (directivity control) ID 3, which is parameter ID 3, with transmission panel antenna #1", and it is ID ♭3.

An ID is assigned to "use of beamforming (directivity control) ID 0, which is parameter ID 0, with transmission panel antenna #2", and it is ID ♭4. An ID is assigned to "use of beamforming (directivity control) ID 1, which is parameter ID 1, with transmission panel antenna #2", and it is ID ♭5. An ID is assigned to "use of beamforming (directivity control) ID 2, which is parameter ID 2, with transmission panel antenna #2", and it is ID ♭6. An ID is assigned to "use of beamforming (directivity control) ID 3, which is parameter ID 3, with transmission panel antenna #2", and it is ID ♭7.

An ID is assigned to "use of beamforming (directivity control) ID 0, which is parameter ID 0, with transmission panel antenna #3", and it is ID ♭8. An ID is assigned to "use of beamforming (directivity control) ID 1, which is parameter ID 1, with transmission panel antenna #3", and it is ID ♭9. An ID is assigned to "use of beamforming (directivity control) ID 2, which is parameter ID 2, with transmission panel antenna #3", and it is ID ♭10. An ID is assigned to "use of beamforming (directivity control) ID 3, which is parameter ID 3, with transmission panel antenna #3", and it is ID ♭11, and so forth.

Then, the terminal transmits, as sector sweep reference signals, a "(reference) signal subjected to processing based on ID ♭0", a "(reference) signal subjected to processing based on ID ♭1", a "(reference) signal subjected to processing based on ID ♭2", a "(reference) signal subjected to processing based on ID ♭3", a "(reference) signal subjected to processing based on ID ♭4", a "(reference) signal subjected to processing based on ID ♭5", a "(reference) signal subjected to processing based on ID ♭6", a "(reference) signal subjected to processing based on ID ♭7", a "(reference) signal subjected to processing based on ID ♭8", a "(reference) signal subjected to processing based on ID ♭9", a "(reference) signal subjected to processing based on ID ♭10", a "(reference) signal subjected to processing based on ID ♭11", and so forth. Note that the above signals may be transmitted in the above order or in a different order.

At this time, the "(reference) signal subjected to processing based on ID ♭k" transmitted by the terminal includes information of ID ♭k, where k is an integer equal to or greater than 0. Note that the "(reference) signal subjected to processing based on ID ♭k" transmitted by the terminal may include other information. The examples have already been described in other embodiments, and the description thereof will be thus omitted (information of a transmission panel antenna may be included).

A base station then receives the sector sweep reference signals transmitted by the terminal and transmits a feedback signal including information of the ID with high reception quality (e.g., when "ID ♭3" has high reception quality, the information of "ID ♭3" is included). Note that the feedback signal transmitted by a base station may include other information. The examples are as described in other embodiments. Methods of transmitting the feedback signal by a base station are as described in other embodiments and will be described later in the present embodiment.

A transmission panel antenna (see FIGS. 1A, 1B and 1C) of the terminal may include the configuration in FIG. 3. The transmission panel antenna may be composed of a single antenna or a plurality of antennas.

Based on the above, the terminal may generate and transmit, for example, a terminal sector sweep reference signal in FIG. 13, etc. in the following manner.

FIG. 14 illustrates exemplary assignment of sector sweep reference signals transmitted by the terminals. The description thereof will be omitted since it has already been described.

Figure 56:
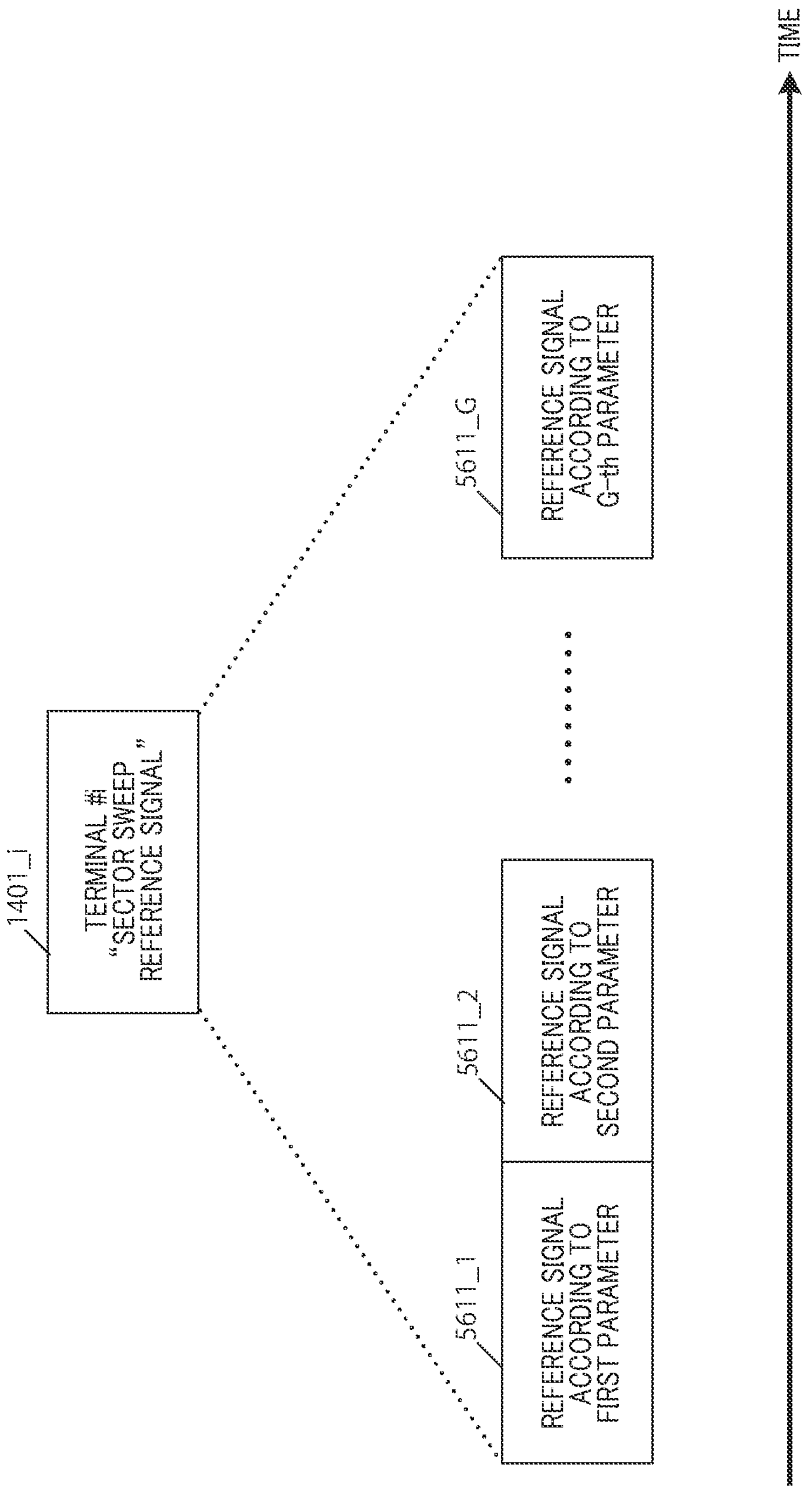
FIG. 56 illustrates an exemplary configuration of a terminal #i "sector sweep reference signal" in FIG. 14.

FIG. 56 illustrates an exemplary configuration of terminal #i "sector sweep reference signal" 1401_*i* in FIG. 14. Terminal #i "sector sweep reference signal" 1401_*i* is composed of "reference signal 5611_1 according to first parameter", "reference signal 5611_2 according to second parameter", . . . , "reference signal 5611_G according to G-th parameter". Note that G is an integer equal to or greater than 1 or an integer equal to or greater than 2.

In a case where terminal #i has a configuration in FIG. 1A, 1B, or 1C, terminal #i "sector sweep reference signal" 1401_*i* is transmitted using one or more transmission panel antennas among transmission panel antenna 1 labeled 106_1 to transmission panel antenna M labeled 106_M.

For example, in a case where the terminal has a configuration in FIG. 1A or 1B, "reference signal 5611_*k* according to k-th parameter" is subjected to signal processing (beamforming (directivity control)) according to the k-th parameter in first processor 104, and first processor 104 generates "reference signal 5611_*k* according to k-th parameter" to be transmitted using one or more transmission panel antennas among transmission panel antenna 1 labeled 106_1 to transmission panel antenna M labeled 106_M. Note that k is an integer from 1 to G (both inclusive).

"Reference signal 5611_*k* according to k-th parameter" includes, for example, the following information:

Information on the k-th parameter, that is, a beamforming (directivity control) identification number (ID), for example; and Information to be fed back to the base station, for example, information of a frequency (band) with high reception quality, information of a parameter of beamforming (directivity control) with high reception quality, and information of an antenna with high reception quality that have been estimated by the terminal in receiving sector sweep reference signals transmitted by the base station.

Information included in "reference signal 5611_*k* according to k-th parameter" are as described in other embodiments, including the above-described information.

Thus, for operations on "reference signal 1511_*a* according to a-th parameter in transmission panel antenna xi in FIG. 15B" in the present specification, the same can be implemented by replacing "reference signal 1511_*a* according to a-th parameter in transmission panel antenna xi in FIG. 15B" with "reference signal 5611_*k* according to k-th parameter".

In addition, "reference signal 5611_*k* according to k-th parameter" may include information of an antenna (e.g., transmission panel antenna ID, sector antenna information, and antenna port number) used for transmitting "reference signal 5611_*k* according to k-th parameter".

Another example will be described.

A transmission panel antenna (see FIGS. 1A, 1B and 1C) of the terminal may include the configuration in FIG. 3. The transmission panel antenna may be composed of a single antenna or a plurality of antennas.

Based on the above, the terminal may generate and transmit, for example, a terminal sector sweep reference signal in FIG. 23, etc. in the following manner.

FIG. 24 illustrates exemplary assignment of sector sweep reference signals transmitted by the terminals. The description thereof will be omitted since it has already been described.

Figure 57:
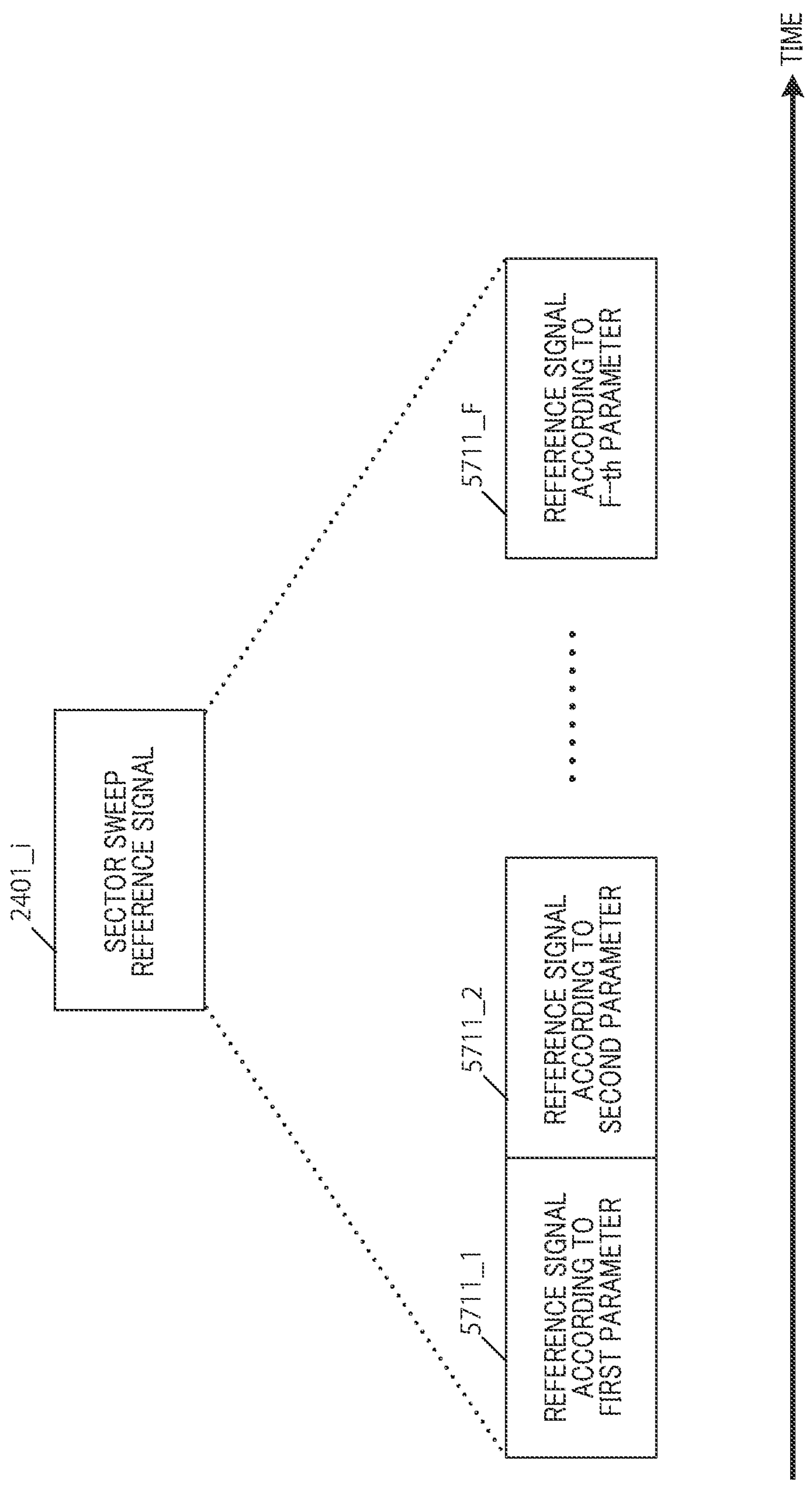
FIG. 57 illustrates an exemplary configuration of a sector sweep reference signal in FIG. 24.

FIG. 57 illustrates an exemplary configuration of sector sweep reference signal 2401_*i* in FIG. 24. Sector sweep reference signal 2401_*i* is composed of "reference signal 5711_1 according to first parameter", "reference signal 5711_2 according to second parameter", . . . , "reference signal 5711_F according to F-th parameter". Note that F is an integer equal to or greater than 1 or an integer equal to or greater than 2.

In a case where terminal #i has a configuration in FIG. 1A, 1B, or 1C, sector sweep reference signal 2401_*i* is transmitted using one or more transmission panel antennas among transmission panel antenna 1 labeled 106_1 to transmission panel antenna M labeled 106_M.

For example, in a case where the terminal has a configuration in FIG. 1A or 1B, "reference signal 5711_*k* according to k-th parameter" is subjected to signal processing (beamforming (directivity control)) according to the k-th parameter in first processor 104, and first processor 104 generates "reference signal 5711_*k* according to k-th parameter" to be transmitted using one or more transmission panel antennas among transmission panel antenna 1 labeled 106_1 to transmission panel antenna M labeled 106_M. Note that k is an integer from 1 to F (both inclusive).

"Reference signal 5711_*k* according to k-th parameter" includes, for example, the following information:

- Information on the k-th parameter, that is, a beamforming (directivity control) identification number (ID), for example; and
- Information to be fed back to the base station, for example, information of a frequency (band) with high reception quality, information of a parameter of beamforming (directivity control) with high reception quality, and information of an antenna with high reception quality that have been estimated by the terminal in receiving sector sweep reference signals transmitted by the base station.

Information included in "reference signal 5711_*k* according to k-th parameter" are as described in other embodiments, including the above-described information.

Thus, for operations on "reference signal 1511_*a* according to a-th parameter in transmission panel antenna xi in FIG. 15B" in the present specification, the same can be implemented by replacing "reference signal 1511_*a* according to a-th parameter in transmission panel antenna xi in FIG. 15B" with "reference signal 5711_*k* according to k-th parameter".

In addition, "reference signal 5711_*k* according to k-th parameter" may include information of an antenna (e.g., transmission panel antenna ID, sector antenna information, and antenna port number) used for transmitting "reference signal 5711_*k* according to k-th parameter".

The base station may transmit, to a communication counterpart (terminal), information of a reception panel antenna used for reception of a modulation signal and information of a parameter of beamforming (directivity control) for the reception. In addition, as is the case with the above examples on transmission, an ID may be assigned without distinguishing between the information of a reception panel antenna and the beamforming (directivity control), and the ID information may be transmitted to the communication counterpart (terminal).

Note that, although FIGS. 1A, 1B, and 1C have been used for the configuration example of the base station, the configuration is not limited to these. The configuration of a reception panel antenna is not limited to the configuration in FIG. 4 either, and the reception panel antenna may be composed of a single antenna or a plurality of antennas.

At this time, the beamforming (directivity control) for reception may be performed using one or more reception panel antennas (one or more reception antennas). Then, information of a parameter of the beamforming (directivity control) used for the reception may be transmitted to a communication counterpart (terminal).

The terminal may transmit, to a communication counterpart (base station), information of a reception panel antenna used for reception of a modulation signal and information of a parameter of beamforming (directivity control) for the reception. In addition, as is the case with the above examples on transmission, an ID may be assigned without distinguishing between the information of a reception panel antenna and the beamforming (directivity control), and the ID information may be transmitted to the communication counterpart (base station).

Note that, although FIGS. 1A, 1B, and 1C have been used for the configuration example of the terminal, the configuration is not limited to these. The configuration of a reception panel antenna is not limited to the configuration in FIG. 4 either, and the reception panel antenna may be composed of a single antenna or a plurality of antennas.

At this time, the beamforming (directivity control) for reception may be performed using one or more reception panel antennas (one or more reception antennas). Then, information of a parameter of the beamforming (directivity control) used for the reception may be transmitted to a communication counterpart (base station).

Embodiment 6

In Embodiment 6, a description will be given of an embodiment on a frame transmitted by a base station as a variation of Embodiment 1. Note that the drawings used in Embodiment 1 are sometimes used in the following description of Embodiment 6.

FIGS. 1A, 1B, and 1C illustrate exemplary configurations of, for example, a base station, an access point, a terminal, and a repeater according to Embodiment 6, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 6. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a multi-carrier scheme such as the OFDM scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t 1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 58 illustrates an exemplary configuration of the time period from time t1 to t2 in FIG. 10, which is the terminal response period, and the horizontal axis represents time.

Sector sweep reference signal 1001 transmitted by the base station is present in the time period from time t0 to t1.

Subsequently, a terminal "sector sweep reference signal" is present in the time period from time t1 to t2.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band bi, sector sweep reference signal *1101_i1* in transmission panel antenna 1 for frequency ♭i is present in the first time period, sector sweep reference signal *1101_i2* in transmission panel antenna 2 for frequency ♭i is present in the second time period, . . . , sector sweep reference signal 1101_iM in transmission panel antenna M for frequency ♭i is present in the M-th time period. Note that i is an integer from 1 to K (both inclusive).

Note that sector sweep reference signal *1101_ij* in transmission panel antenna j for frequency ♭i is transmitted from transmission panel antenna j labeled *106_j* of base station #1 labeled 901_1 with the configuration in FIG. 1A, 1B, or 1C. In this case, j is an integer from 1 to M (both inclusive).

One feature is that "sector sweep reference signals are transmitted from the same transmission panel antenna in the i-th time period regardless of the frequency band in FIG. 11". At this time, the same beamforming parameter is used in a first period of time regardless of the frequency band. Note that the beamforming will be described later.

FIG. 12 illustrates an exemplary configuration of "sector sweep reference signal *1101_pi* in transmission panel antenna i for frequency ♭p" in FIG. 11. Note that the horizontal axis represents time in FIG. 12. Note that p is an integer from 1 to K (both inclusive) and i is an integer from 1 to M (both inclusive).

A description will be omitted on a specific example of a method of transmitting "sector sweep reference signal *1101_pi* in transmission panel antenna i for frequency ♭p", which is configured as in FIGS. 11 and 12 and transmitted by base station #1 labeled 901_1 with the configuration in FIG. 1A, 1B, or 1C, since it has already been described.

As illustrated in FIGS. 11 and 12, when base station #1 labeled 901_1 transmits "sector sweep reference signal *1101_i* in transmission panel antenna i for frequency ♭p", "reference signal *1201_j* according to j-th parameter in transmission panel antenna i for frequency ♭p" includes, for example, the following information:

- Identification number (ID) of the transmission panel antenna, which corresponds to i here, for example;
- Identification number (ID) of the parameter used for beamforming (directivity control), which corresponds to j here, for example; and
- The number of frequency divisions in which sector sweep reference signals can be transmitted when the terminals transmit the sector sweep reference signals, which will be described later.

Note that, in a case where "the number of frequency divisions in which sector sweep reference signals can be transmitted" is determined in advance, information of the number of frequency divisions in which sector sweep reference signals can be transmitted need not be included in "reference signal *1201_j* according to j-th parameter in transmission panel antenna i for frequency ♭p".

The following information may also be included in "reference signal *1201_j* according to j-th parameter in transmission panel antenna i for frequency ♭p";

Information on the frequency band and/or frequency ♭p (information of the number of frequency divisions may also be included), which will be described later.

Transmission of the “identification number (ID) of the transmission panel antenna for frequency ♭p” and the “identification number (ID) of the parameter used for beamforming (directivity control)” by base station #1 labeled 901_1 allows the terminals to recognize the “identification number (ID) of the transmission panel antenna” and the “identification number (ID) of the parameter used for beamforming (directivity control)” that have allowed successful reception; accordingly, base station #1 labeled 901_1 and the terminals can perform appropriate control. This produces an effect of enhancing data reception quality.

Note that “the number of frequency divisions in which sector sweep reference signals can be transmitted when the terminals transmit the sector sweep reference signals” may be changeable according to the frame and/or time, for example. This produces an effect of enhancing data transmission efficiency of a communication system.

Further, transmission of the “information on the frequency band and/or frequency ♭p” by base station #1 labeled 901_1 allows the terminals to obtain the information and transmit “information relative to a frequency that the terminals desire the base station to use for transmission”. This allows the base station to perform appropriate control and produces an effect of enhancing data reception quality.

Next, a description will be given of an operation in the time period from time t1 to t2 in FIG. 10, which is the terminal response period. Note that, in Embodiment 6, the description is based on a case where the terminals transmit signals using a multi-carrier scheme such as the OFDM scheme and frequency (bands) used by the base station and frequency (bands) used by the terminals partially overlap each other, by way of example.

FIG. 58 illustrates an exemplary operation in the time period from time t1 to t2, which is the terminal response period. Note that the horizontal axis represents time in FIG. 58. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 58, the components that operate in the same manner as in FIG. 10 are denoted by the same reference signs.

As illustrated in FIGS. 10 and 58, for example, base station #1 labeled 901_1 transmits sector sweep reference signals in the time period from time t0 to t1. After that, the terminal response period, which is the time period from time t1 to t2, includes terminal “sector sweep reference signal” 5801_1 as illustrated in FIG. 58.

Figure 59A:
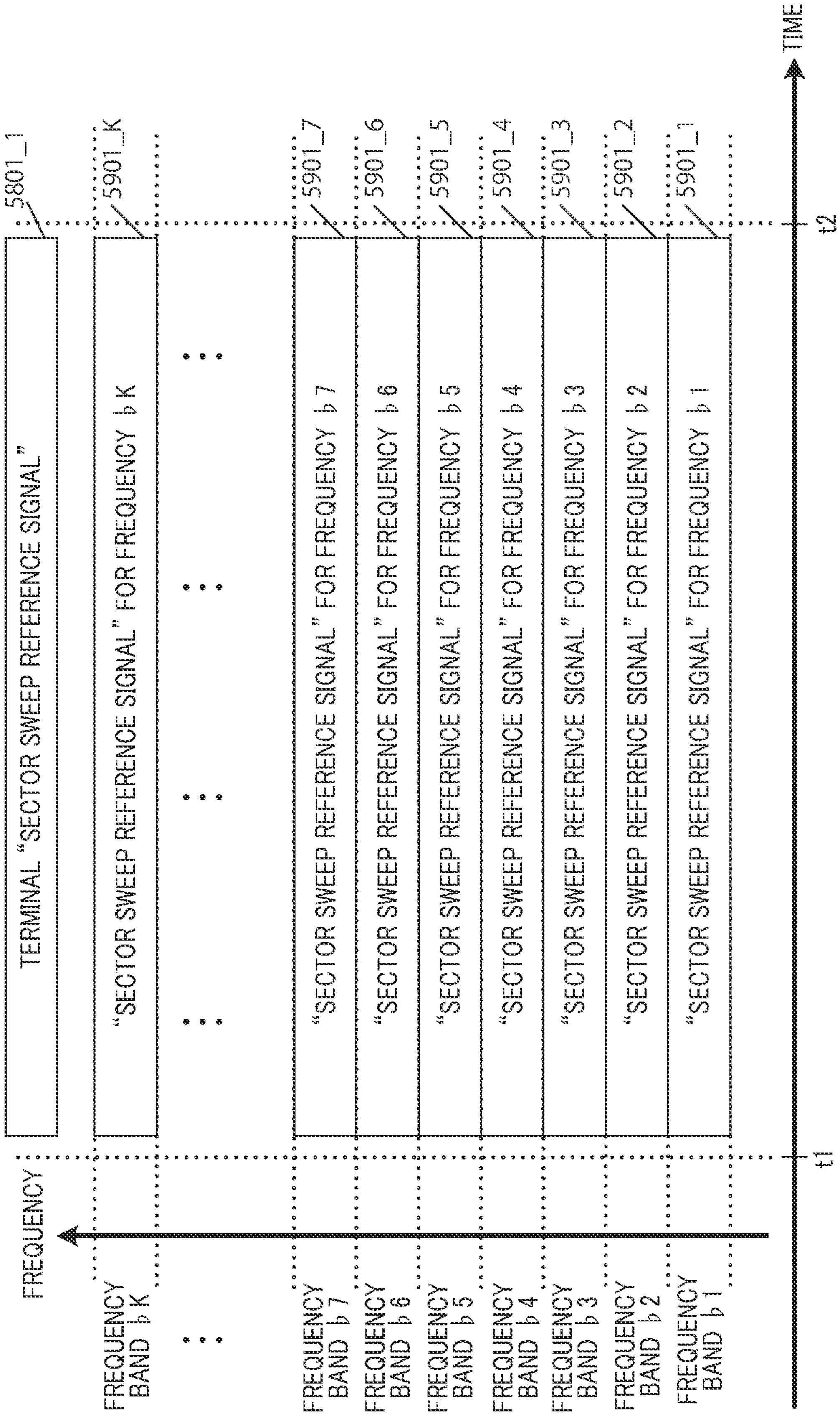
FIG. 59A illustrates an exemplary configuration, in time and frequency, of a terminal "sector sweep reference signal" illustrated in FIG. 58.

FIG. 59A illustrates an exemplary configuration, in time and frequency, of terminal “sector sweep reference signal” 5801_1 illustrated in FIG. 58. Note that the horizontal axis represents time and the vertical axis represents frequency in FIG. 59A.

As illustrated in FIG. 59A, “terminal “sector sweep reference signal” 5801_1 includes areas for “sector sweep reference signal” 5901_1 for frequency ♭1, “sector sweep reference signal” 5901_2 for frequency ♭2, “sector sweep reference signal” 5901_3 for frequency ♭3, “sector sweep reference signal” 5901_4 for frequency ♭4, “sector sweep reference signal” 5901_5 for frequency ♭5, “sector sweep reference signal” 5901_6 for frequency ♭6, “sector sweep reference signal” 5901_7 for frequency ♭7, . . . , “sector sweep reference signal” 5901_K for frequency ♭K”.

Thus, in the case of FIG. 59A, “the number of frequency divisions in which sector sweep reference signals can be transmitted when the terminals transmit the sector sweep reference signals” is set to K by base station #1 labeled 901_1.

Figure 59B:
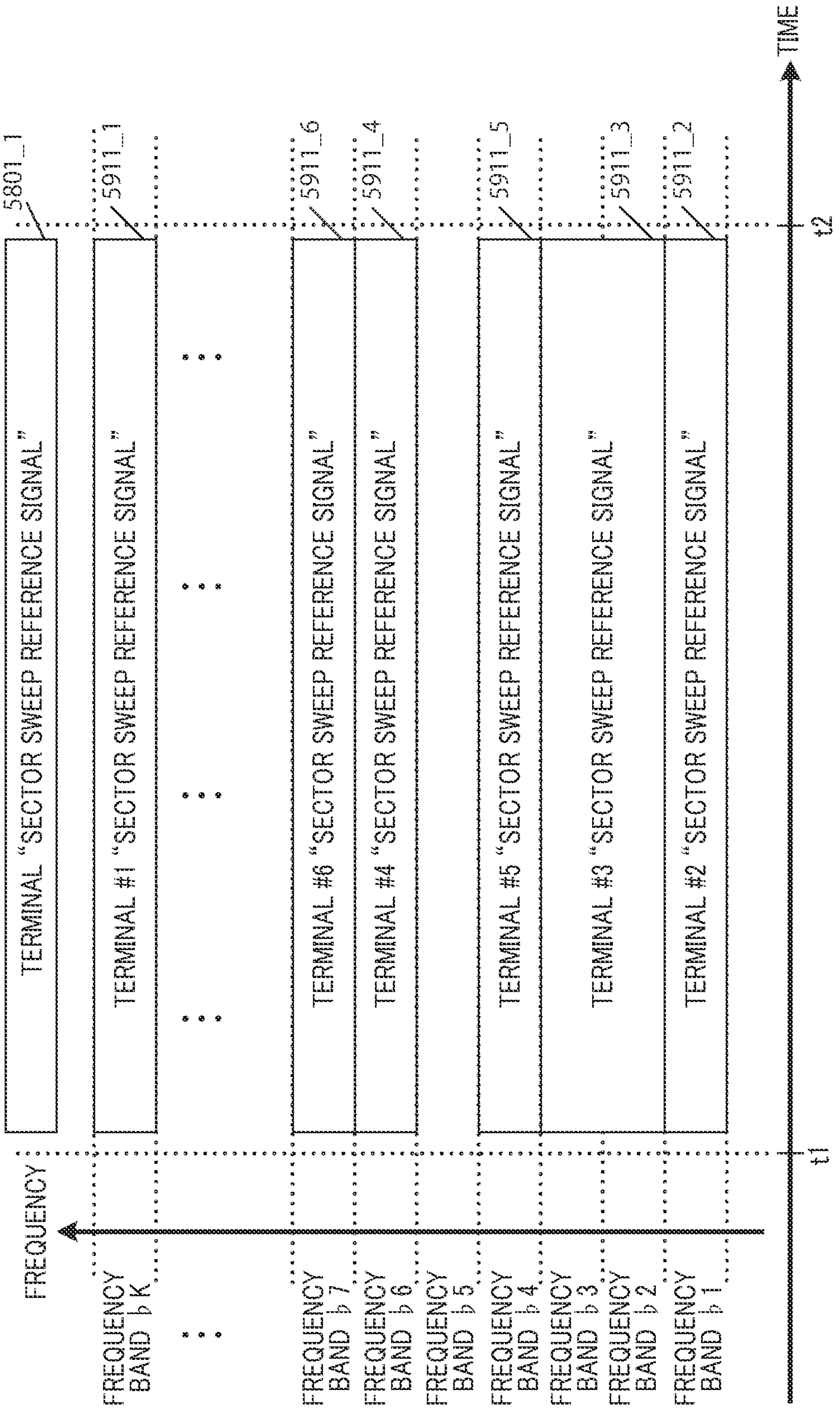
FIG. 59B illustrates exemplary occupation by terminals in the terminal "sector sweep reference signal" illustrated in FIG. 59A.

FIG. 59B illustrates exemplary occupation by the terminals in the areas for “sector sweep reference signal” 5901_1 for frequency ♭1, “sector sweep reference signal” 5901_2 for frequency ♭2, “sector sweep reference signal” 5901_3 for frequency ♭3, “sector sweep reference signal” 5901_4 for frequency ♭4, “sector sweep reference signal” 5901_5 for frequency ♭5, “sector sweep reference signal” 5901_6 for frequency ♭6, “sector sweep reference signal” 5901_7 for frequency ♭7, . . . , “sector sweep reference signal” 5901_K for frequency ♭K” included in terminal “sector sweep reference signal” 5801_1 illustrated in FIG. 59A. Note that the horizontal axis represents time and the vertical axis represents frequency in FIG. 59B.

Terminal #1 labeled 902_1 in FIG. 9 receives sector sweep reference signal 1001 transmitted by base station #1 labeled 901_1 and estimates the “frequency band, transmission panel antenna, and parameter number” with high reception quality from transmission panel antennas of base station #1 labeled 901_1. Note that this estimation can be performed by obtaining sector sweep reference signal 1001, and the “identification number (ID) of the transmission panel antenna” and the “identification number (ID) of the parameter used for beamforming (directivity control)” that are included in sector sweep reference signal 1001. In addition, the “information on the frequency band and/or frequency ♭p” included in sector sweep reference signal 1001 may be used for this estimation.

Terminal #1 labeled 902_1 estimates, for example, “transmission panel antenna a1 and parameter b1” as the “transmission panel antenna and parameter” with high reception quality. Terminal #1 labeled 902_1 also estimates frequency band ♭K as the “frequency domain” with high reception quality. Terminal #1 labeled 902_1 may further estimate the frequency domain with second highest reception quality, the frequency domain with third highest reception quality, and so forth. Note that the frequency domain with highest reception quality will be discussed here to simplify the description.

While estimating the “transmission panel antenna and parameter” with high reception quality, terminal #1 labeled 902_1 may simultaneously obtain information of “the number of frequency divisions in which sector sweep reference signals can be transmitted when the terminals transmit the sector sweep reference signals”. In the case of FIG. 59B, terminal #1 labeled 902_1 may obtain information indicating that “the number of frequency divisions in which sector sweep reference signals can be transmitted when the terminals transmit the sector sweep reference signals” is K.

Then, terminal #1 labeled 902_1, for example, transmits terminal #1 “sector sweep reference signal” 5911_1 using frequency band ♭K based on the above result. Although the description here is based on an example where terminal #1 labeled 902_1 uses “frequency band ♭K” that is estimated to have the highest reception quality, a frequency band other than the frequency band estimated to have the highest reception quality may be used.

Note that terminal #1 “sector sweep reference signal” 5911_1 includes information of the “transmission panel antenna and parameter” with high reception quality obtained by terminal #1 labeled 902_1, that is, information of “transmission panel antenna a1 and parameter b1”. Terminal #1 “sector sweep reference signal” 5911_1 also includes information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality. Terminal #2 labeled 902_2 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #2 labeled 902_2 may simultaneously obtain information of "the number of frequency divisions in which sector sweep reference signals can be transmitted when the terminals transmit the sector sweep reference signals". In the case of FIG. 59B, terminal #2 labeled 902_2 may obtain information indicating that "the number of frequency divisions in which sector sweep reference signals can be transmitted when the terminals transmit the sector sweep reference signals" is K.

Then, terminal #2 labeled 902_2, for example, transmits terminal #2 "sector sweep reference signal" 5911_2 using frequency band ♭1 based on the above result. Although the description here is based on an example where terminal #2 labeled 902_2 uses "frequency band ♭1" that is estimated to have the highest reception quality, a frequency band other than the frequency band estimated to have the highest reception quality may be used.

Note that terminal #2 "sector sweep reference signal" 5911_2 includes information of the "transmission panel antenna and parameter" with high reception quality obtained by terminal #2 labeled 902_2, that is, information of "transmission panel antenna a2 and parameter b2". Terminal #2 "sector sweep reference signal" 5911_2 also includes information of the "frequency domain", for example, information of "frequency band ♭1". This will be described later.

Thus, terminal #i labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001** may be used for this estimation.

Terminal #i labeled **902_*i* estimates, for example, "transmission panel antenna ai and parameter hi" as the "transmission panel antenna and parameter" with high reception quality. Terminal #i labeled 902_*i* also estimates frequency band ♭zi as the "frequency domain" with high reception quality. Note that a plurality of frequency domains can be specified. Terminal #i labeled 902_*i*** may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #i labeled **902_*i* may simultaneously obtain information of "the number of frequency divisions in which sector sweep reference signals can be transmitted when the terminals transmit the sector sweep reference signals". In the case of FIG. 24, terminal #i labeled 902_*i*** may obtain information indicating that "the number of frequency divisions in which sector sweep reference signals can be transmitted when the terminals transmit the sector sweep reference signals" is K.

Then, terminal #i labeled **902_*i*, for example, transmits terminal #i "sector sweep reference signal" 5911_*i* using frequency band ♭zi based on the above result. Although the description here is based on an example where terminal #i labeled 902_*i*** uses "frequency band ♭zi" that is estimated to have the highest reception quality, a frequency band other than the frequency band estimated to have the highest reception quality may be used.

Note that terminal #i "sector sweep reference signal" **5911_*i* includes information of the "transmission panel antenna and parameter" with high reception quality obtained by terminal #1 labeled 902_*i*, that is, information of "transmission panel antenna ai and parameter bi". Terminal #i "sector sweep reference signal" 5911_*i*** also includes information of the "frequency domain", for example, information of "frequency band ♭zi". This will be described later.

Note that, in FIG. 58, when the frequency (band) used for sector sweep reference signal 1001 transmitted by base station #1 labeled 901_1 is the same as the frequency (band) used for terminal "sector sweep reference signal" 5801_1 transmitted by terminal #i, terminal #i "sector sweep reference signal" **5911_*i* need not include the information of the "frequency domain". In this case, base station #1 labeled 901_1 can recognize the "frequency domain" by referring to the frequency domain where terminal #i "sector sweep reference signal" 5911_*i* is present. Note that the information of the "frequency domain" may be included in terminal #i "sector sweep reference signal" 5911_*i*** when the above two frequencies (bands) are the same.

Meanwhile, in FIG. 58, when the frequency (band) used for sector sweep reference signal 1001 transmitted by base station #1 labeled 901_1 is different from the frequency (band) used for terminal "sector sweep reference signal" 5801_1 transmitted by terminal #1, including the information of the "frequency domain" in terminal #i "sector sweep reference signal" **5911_*i* produces an effect of accurately transmitting the information of the "frequency domain" to base station #1 labeled 901_1**.

A description will be given of a configuration of terminal #i "sector sweep reference signal" **5911_*i* transmitted by terminal #i labeled 902_*i* described with reference to FIG. 59B. To simplify the description, terminal #i labeled 902_*i*** has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Terminal #i labeled 902_*i* transmits terminal #i "sector sweep reference signal" 5911_*i* as illustrated in FIG. 59B. FIG. 15A illustrates an exemplary configuration of terminal #i "sector sweep reference signal" 5911_*i*. Note that the horizontal axis represents time in FIG. 15A. "Terminal #i "sector sweep reference signal" 1401_*i*" in FIG. 15A corresponds to an example of "sector sweep reference signal" 5911_*i* in FIG. 59B.

As illustrated in FIG. 15A, "sector sweep reference signal" 5911_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

The details have also been described in other embodiments.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #1 labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #i labeled 902_*i* transmits tr2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)× w3(xi, j). Then, terminal #i labeled 902_i transmits tx3refj (t)×w3(xi, j) from antenna 306_3 in FIG. 3.

When terminal #i labeled 902_i transmits "reference signal 1511_j according to j-th parameter in transmission panel antenna xi" illustrated in FIG. 15B, terminal #i labeled 902_i sets the multiplication coefficient in multiplier 304_4 in transmission panel antenna xi labeled 106_xi as w4(xi, j). When fourth transmission signal 303_4 of "reference signal 1511_j according to j-th parameter in transmission panel antenna xi" is tx4refj(t), multiplier 304_4 obtains tx4refj(t)× w4(xi, j). Then, terminal #i labeled 902_i transmits tx4refj (t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 59B, 15A, and 15B, when terminal #i labeled 902_i transmits "sector sweep reference signal 1501_xi in terminal #i transmission panel antenna xi", "reference signal 1511_j according to j-th parameter in transmission panel antenna xi" includes, for example, the following information:

- Information of the "transmission panel antenna and parameter" of base station #1 labeled 901_1 with high reception quality, as described above.

Thus, terminal #i labeled 902_i transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_i transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_i. This is because terminal #i labeled 902_i performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_i. Accordingly, base station #1 labeled 901_1 can transmit a modulation signal to terminal #i labeled 902_i based on the "information of the "transmission panel antenna and parameter" of base station #1 labeled 901_1 with high reception quality", and terminal #i labeled 902_i can receive the modulation signal with high reception quality.

In a case where a plurality of terminals transmit the sector sweep reference signals as in FIG. 59B, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 59B, 15A, and 15B, when terminal #i labeled 902_i transmits "sector sweep reference signal 1501_xi in terminal #i transmission panel antenna xi", "reference signal 1511_j according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_i allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_i and base station #1 labeled 901_1 can perform appropriate control. This produces an effect of enhancing data reception quality.

Further, as illustrated in FIGS. 59B, 15A, and 15B, when terminal #i labeled 902_i transmits "sector sweep reference signal 1501_xi in terminal #i transmission panel antenna xi", "reference signal 1511_j according to j-th parameter in transmission panel antenna xi" includes, for example, the following information:

- "Information on the frequency band and/or frequency ♭p" that has been used for transmission by terminal #i labeled 902_i or that terminal #i labeled 902_i desires base station #1 labeled 901_1 to use.

Transmission of the "information on the frequency band and/or frequency ♭p" by terminal #i labeled 902_i allows base station #1 labeled 901_1 to recognize the "information on the frequency band and/or frequency ♭p"; accordingly, terminal #i labeled 902_i and base station #1 labeled 901_1 can perform appropriate control. This produces an effect of enhancing data reception quality.

Figure 60A:
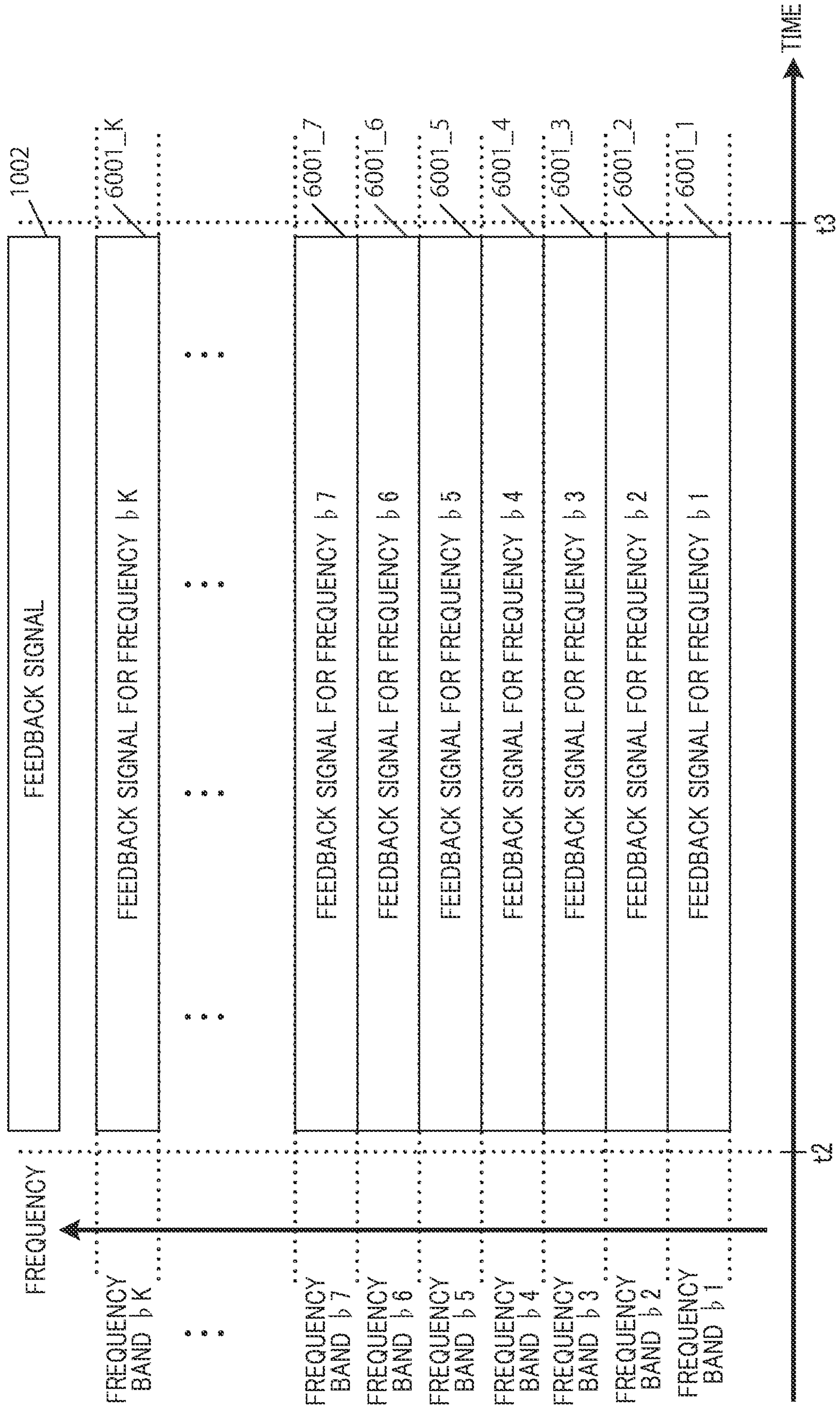
FIG. 60A illustrates an exemplary configuration of a feedback signal that is present in the time period from t2 to t3 in FIG. 10 and transmitted by base station #1.

FIG. 60A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 60A. In this example, feedback signal 1002 includes areas for "feedback signal 6001_1 for frequency ♭1, feedback signal 6001_2 for frequency ♭2, feedback signal 6001_3 for frequency ♭3, feedback signal 6001_4 for frequency ♭4, feedback signal 6001_5 for frequency ♭5, feedback signal 6001_6 for frequency ♭6, feedback signal 6001_7 for frequency ♭7, . . . , feedback signal 6001_K for frequency ♭K" as illustrated in FIG. 60A.

Figure 60B:
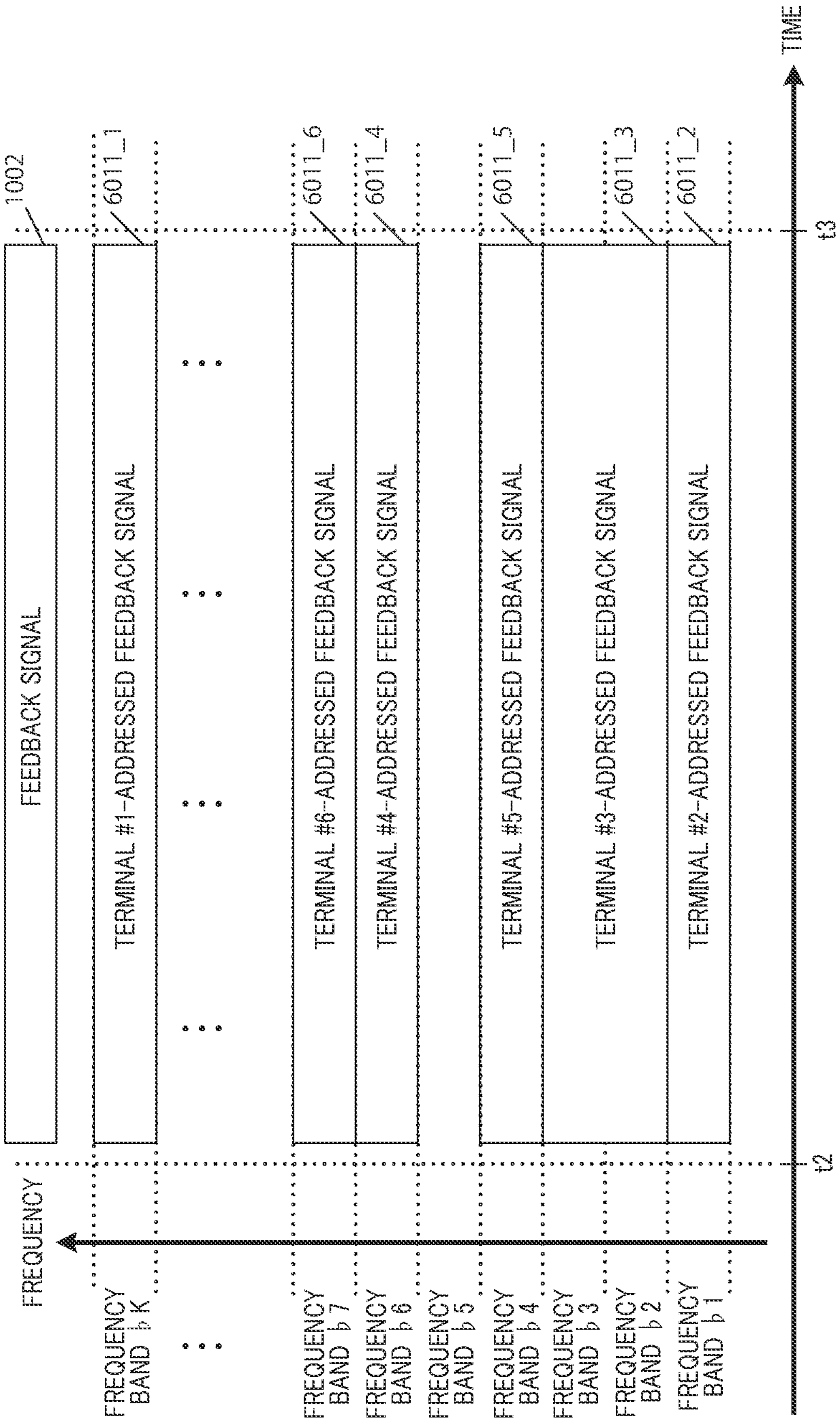
FIG. 60B illustrates exemplary specific feedback signal assignment for the feedback signal illustrated in FIG. 60A.

FIG. 60B illustrates exemplary specific feedback signal assignment for feedback signal 1002 in the areas for "feedback signal 6001_1 for frequency ♭1, feedback signal 6001_2 for frequency ♭2, feedback signal 6001_3 for frequency ♭3, feedback signal 6001_4 for frequency ♭4, feedback signal 6001_5 for frequency ♭5, feedback signal 6001_6 for frequency ♭6, feedback signal 6001_7 for frequency ♭7, . . . , feedback signal 6001_K for frequency ♭K" illustrated in FIG. 60A.

As in FIG. 59B, for example, terminal #1 labeled 902_1 transmits terminal #1 "sector sweep reference signal" 5911_1, terminal #2 labeled 902_2 transmits terminal #2 "sector sweep reference signal" 5911_2, terminal #3 labeled 902_3 transmits terminal #3 "sector sweep reference signal" 5911_3, and other terminals also transmit sector sweep reference signals.

As in FIG. 60B, base station #1 labeled 901_1 transmits terminal #1-addressed feedback signal 6011_1 using frequency band ♭K based on terminal #1 "sector sweep reference signal" 5911_1.

Base station #1 labeled 901_1 transmits terminal #2-addressed feedback signal 6011_2 using frequency band ♭1 based on terminal #2 "sector sweep reference signal" 5911_2 as in FIG. 60B.

Base station #1 labeled 901_1 transmits terminal #3-addressed feedback signal 6011_3 using frequency bands ♭2 and ♭3 based on terminal #3 "sector sweep reference signal" 5911_3 as in FIG. 60B.

Base station #1 labeled 901_1 transmits terminal #4-addressed feedback signal 6011_4 using frequency band ♭6 based on terminal #4 "sector sweep reference signal" 5911_4 as in FIG. 60B.

Base station #1 labeled 901_1 transmits terminal #5-addressed feedback signal 6011_5 using frequency band ♭4 based on terminal #5 "sector sweep reference signal" 5911_5 as in FIG. 60B.

Base station #1 labeled 901_1 transmits terminal #6-addressed feedback signal 6011_6 using frequency band ♭7 based on terminal #6 "sector sweep reference signal" 5911_6 as in FIG. 60B.

In this manner, obtaining terminal #i-addressed feedback signal 6011_*i* allows terminal #i labeled 902_*i* to know that communication with base station #1 labeled 901_1 is available and to know the frequency band to be used. Note that FIG. 60B is merely an example. In a case where there is no terminal #1-addressed feedback signal 6011_1 as feedback signal 1002, for example, terminal #1 labeled 902_1 recognizes that the communication with base station #1 labeled 901_1 has not been established.

At this time, terminal #i-addressed feedback signal 6011_*i* includes, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the "information of the "transmission panel antenna and parameter" of base station #1 labeled 901_1 with high reception quality" transmitted by terminal #i labeled 902_*i*, and base station #1 labeled 901_1 then transmits terminal #i-addressed feedback signal 6011_*i*. The ""frequency (band) information" of base station #1 labeled 901_1 with high reception quality" transmitted by terminal #i labeled 902_*i* may be included.

Figure 61A:
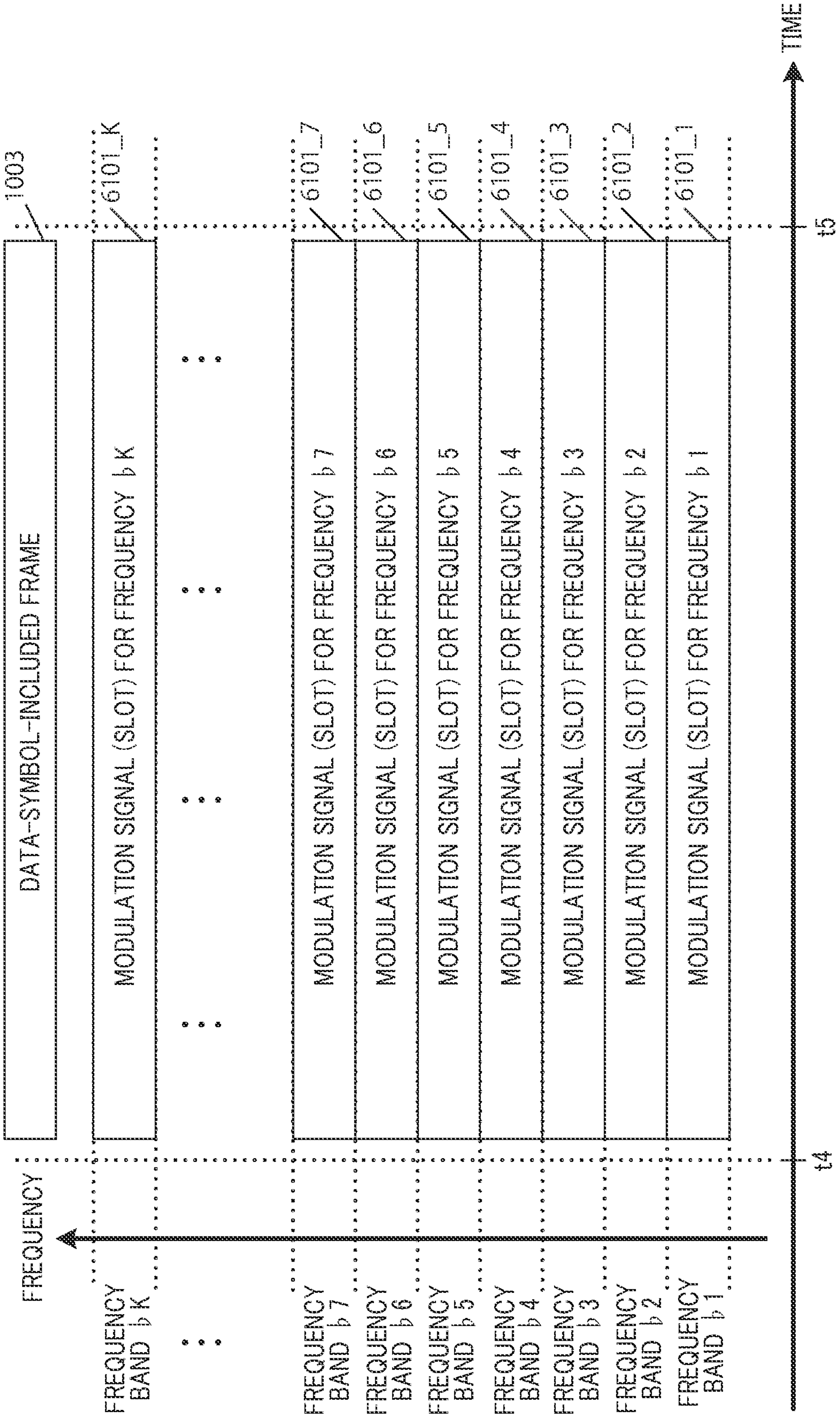
FIG. 61A illustrates an exemplary configuration of a data-symbol-included frame that is present in the time period from t4 to t5 in FIG. 10 and transmitted by base station #1.

FIG. 61A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 61A. In this example, data-symbol-included frame 1003 includes areas for "modulation signal (slot) 6101_1 for frequency ♭1, modulation signal (slot) 6101_2 for frequency ♭2, modulation signal (slot) 6101_3 for frequency ♭3, modulation signal (slot) 6101_4 for frequency ♭4, modulation signal (slot) 6101_5 for frequency ♭5, modulation signal (slot) 6101_6 for frequency ♭6, modulation signal (slot) 6101_7 for frequency ♭7, . . . , modulation signal (slot) 6101_K for frequency ♭K" as illustrated in FIG. 61A.

Figure 61B:
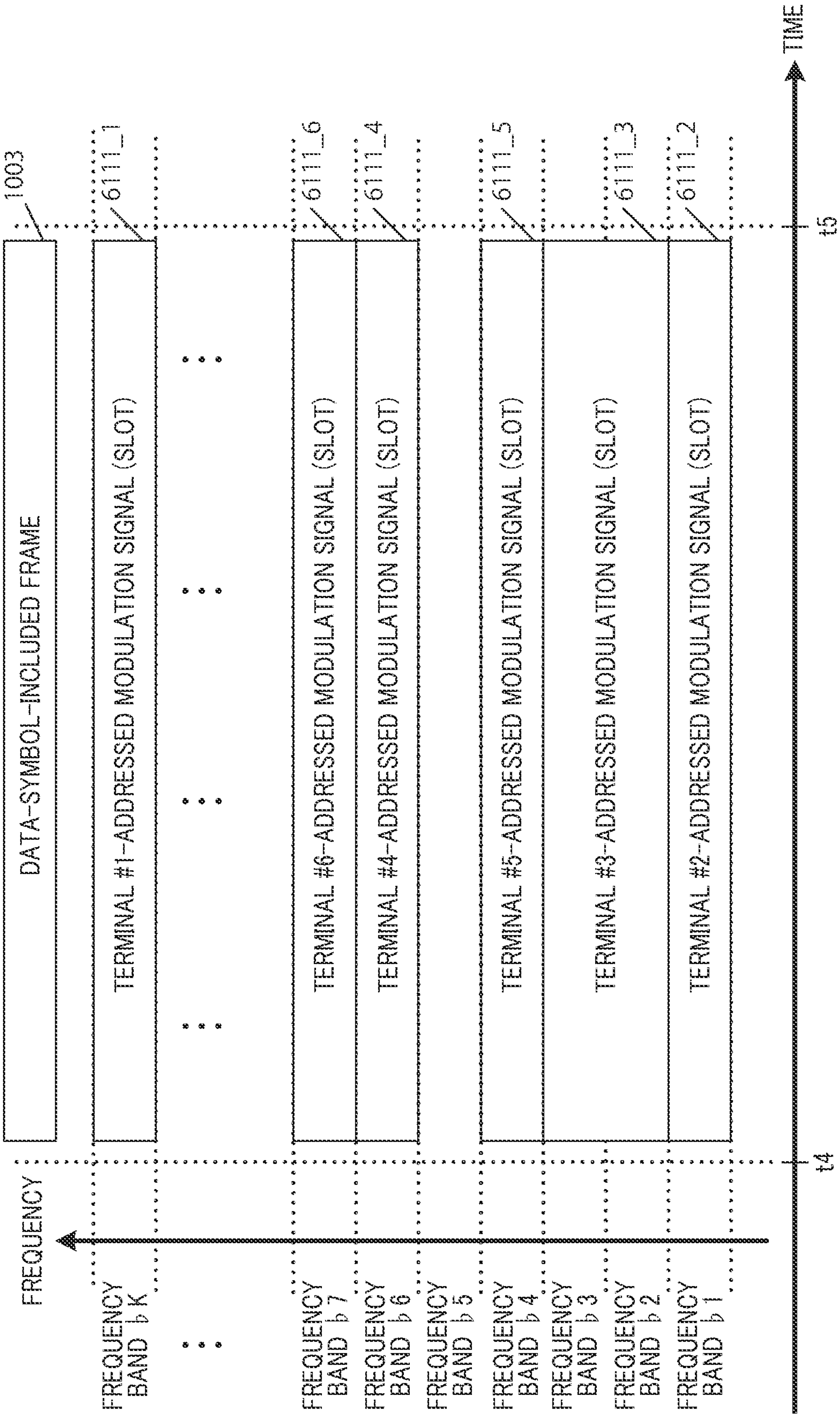
FIG. 61B illustrates exemplary specific modulation signal (slot) assignment for the data-symbol-included frame illustrated in FIG. 61A.

FIG. 61B illustrates exemplary specific modulation signal (slot) assignment for data-symbol-included frame 1003 in the areas for "modulation signal (slot) 6101_1 for frequency ♭1, modulation signal (slot) 6101_2 for frequency ♭2, modulation signal (slot) 6101_3 for frequency ♭3, modulation signal (slot) 6101_4 for frequency ♭4, modulation signal (slot) 6101_5 for frequency ♭5, modulation signal (slot) 6101_6 for frequency ♭6, modulation signal (slot) 6101_7 for frequency ♭7, . . . , modulation signal (slot) 6101_K for frequency ♭K" illustrated in FIG. 61A.

As in FIG. 59B, for example, terminal #1 labeled 902_1 transmits terminal #1 "sector sweep reference signal" 5911_1, terminal #2 labeled 902_2 transmits terminal #2 "sector sweep reference signal" 5911_2, terminal #3 labeled 902_3 transmits terminal #3 "sector sweep reference signal" 5911_3, and other terminals also transmit sector sweep reference signals.

As in FIG. 61B, base station #1 labeled 901_1 transmits terminal #1-addressed modulation signal (slot) 6111_1 using frequency band ♭K based on terminal #1 "sector sweep reference signal" 5911_1.

Base station #1 labeled 901_1 transmits terminal #2-addressed modulation signal (slot) 6111_2 using frequency band ♭1 based on terminal #2 "sector sweep reference signal" 5911_2 as in FIG. 61B.

Base station #1 labeled 901_1 transmits terminal #3-addressed modulation signal (slot) 6111_3 using frequency bands ♭2 and ♭3 based on terminal #3 "sector sweep reference signal" 5911_3 as in FIG. 61B.

Base station #1 labeled 901_1 transmits terminal #4-addressed modulation signal (slot) 6111_4 using frequency band ♭6 based on terminal #4 "sector sweep reference signal" 5911_4 as in FIG. 61B.

Base station #1 labeled 901_1 transmits terminal #5-addressed modulation signal (slot) 6111_5 using frequency band ♭4 based on terminal #5 "sector sweep reference signal" 5911_5 as in FIG. 61B.

Base station #1 labeled 901_1 transmits terminal #6-addressed modulation signal (slot) 6111_6 using frequency band ♭7 based on terminal #6 "sector sweep reference signal" 5911_6 as in FIG. 61B.

At this time, terminal #i-addressed modulation signal (slot) 6111_*i* includes, for example, a data symbol (data and/or information) addressed to terminal #i labeled 902_*i*.

In this manner, terminal #i-addressed modulation signal (slot) 6111_*i* allows terminal #i labeled 902_*i* to know that communication with base station #1 labeled 901_1 is available and to know the frequency band to be used. Note that FIG. 61B is merely an example. In a case where there is no terminal #1-addressed modulation signal (slot) 6111_*i* as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the "information of the "transmission panel antenna and parameter" of base station #1 labeled 901_1 with high reception quality" transmitted by terminal #i labeled 902_*i*, and base station #1 labeled 901_1 then transmits terminal #1-addressed modulation signal (slot) 6111_*i*. The ""frequency (band) information" of base station #1 labeled 901_1 with high reception quality" transmitted by terminal #i labeled 902_*i* may be included.

Note that, in FIGS. 60A and 60B, base station #1 labeled 901_1 may estimate the "frequency (band)" and the "transmission panel antenna and parameter" of terminal #1 labeled 902_1 with high reception quality in receiving "terminal #i "sector sweep reference signal" 5911_*i* transmitted by terminal #i labeled 902_*i*", and the estimated information may be included in terminal #i-addressed feedback signal 6011_*i*.

Terminal #i labeled 902_*i* selects a frequency (band) and a transmission panel antenna and determines a beamforming method based on the information of "frequency (band)" and "transmission panel antenna and parameter" of terminal #1 labeled 902_*i* with high reception quality obtained from base station #1 labeled 901_1, and terminal #1 labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) 6111_*i* in FIG. 61B may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 58, 59A, 59B, 15A, 15B, etc., and the description thereof will be thus omitted.

Base station #1 labeled 901_1 transmits feedback signal 1802_1. Note that this has already been described with reference to FIGS. 60A and 60B, and the description thereof will be thus omitted.

After that, base station #1 labeled 901_1 transmits "data-symbol-included frame 1803_1". Note that this has already been described with reference to FIGS. 61A and 61B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 62A, 62B, 62C, 62D, 62E, and 62F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 61A and 61B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 62A, 62B, 62C, 62D, 62E, and 62F.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 61A and 61B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame

1852_3". Note that a configuration of the frame will be described later with reference to FIGS. 62A, 62B, 62C, 62D, 62E, and 62F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 58, 59A, 59B, 15A, 15B, etc., and the description thereof will be thus omitted.

Base station #1 labeled 901_1 transmits feedback signal 1802_2. Note that this has already been described with reference to FIGS. 60A and 60B, and the description thereof will be thus omitted.

After that, base station #1 labeled 901_1 transmits "data-symbol-included frame 1803_4". Note that this has already been described with reference to FIGS. 61A and 61B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 62A, 62B, 62C, 62D, 62E, and 62F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 62A, 62B, 62C, 62D, 62E, and 62F. Note that i is an integer equal to or greater than 1, for example, and the horizontal axis represents time and the vertical axis represents frequency in FIGS. 62A, 62B, 62C, 62D, 62E, and 62F.

As illustrated in FIGS. 62A, 62B, 62C, 62D, 62E, and 62F, there are frequency band ♭1, frequency band ♭2, frequency band ♭3, frequency band ♭4, frequency band 65, frequency band ♭6, frequency band ♭7, . . . , frequency band ♭K for "data-symbol-included frame 1852_*i*".

Figure 62A:
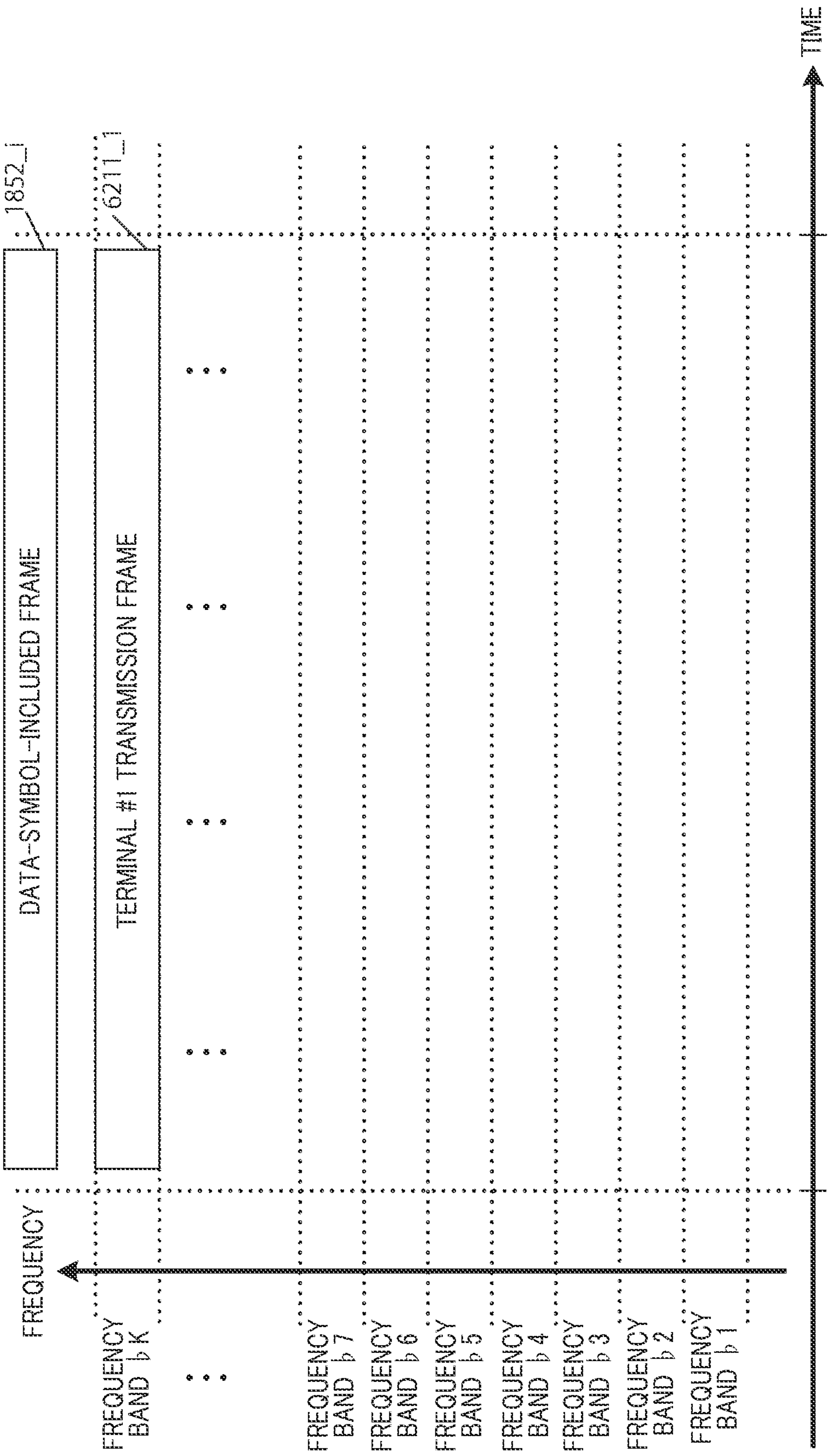
FIG. 62A illustrates an exemplary configuration of a "data-symbol-included frame" transmitted by terminal #1.

FIG. 62A illustrates "data-symbol-included frame 1852_*i*" transmitted by terminal #1 labeled 902_1, and terminal #1 labeled 902_1 transmits "terminal #1 transmission frame (including a data symbol) 6211_1" using frequency band ♭K as illustrated in FIG. 62A.

Figure 62B:
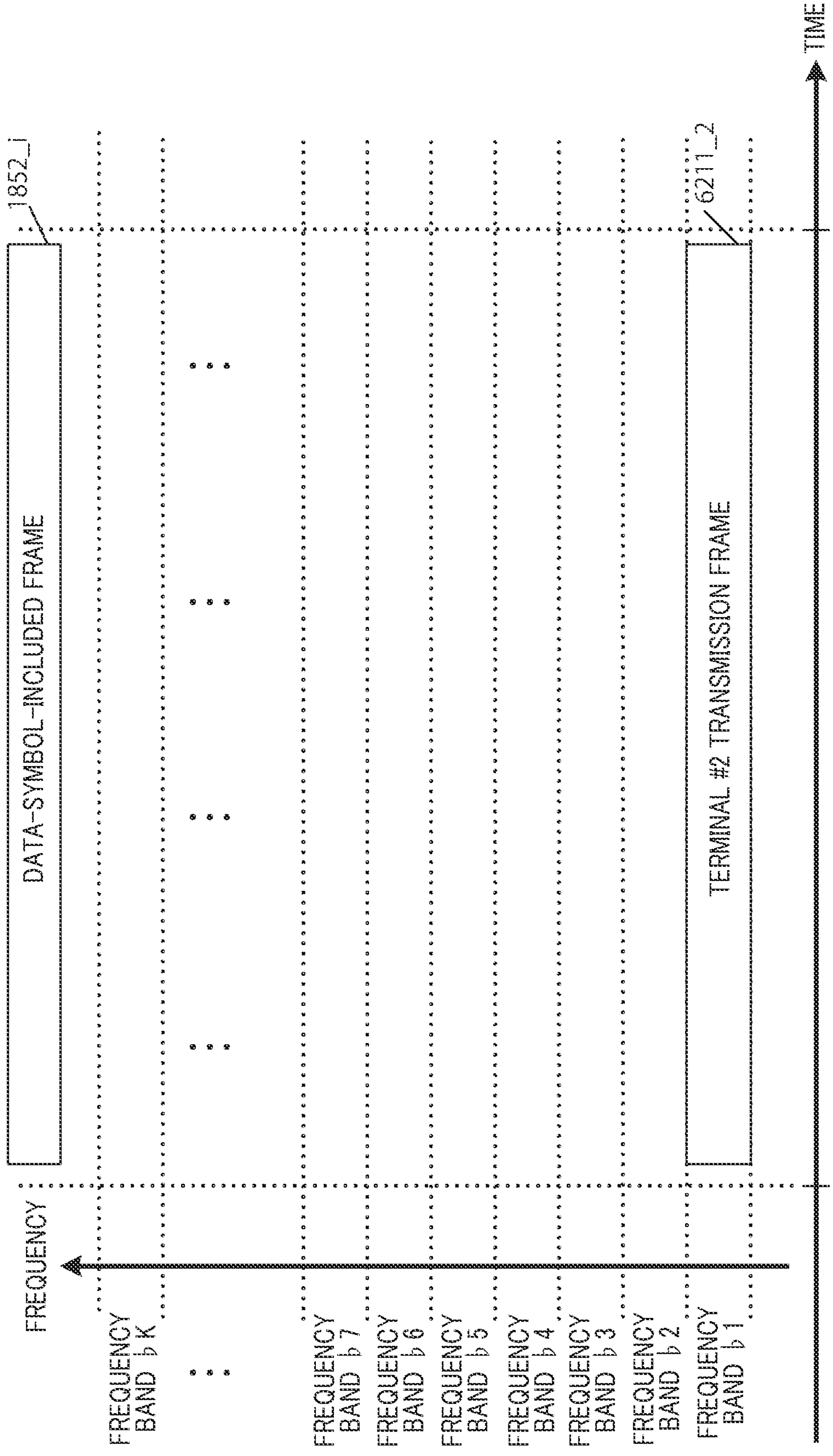
FIG. 62B illustrates an exemplary configuration of a "data-symbol-included frame" transmitted by terminal #2.

FIG. 62B illustrates "data-symbol-included frame 1852_*i*" transmitted by terminal #2 labeled 902_2, and terminal #2 labeled 902_2 transmits "terminal #2 transmission frame (including a data symbol) 6211_2" using frequency band ♭1 as illustrated in FIG. 62B.

Figure 62C:
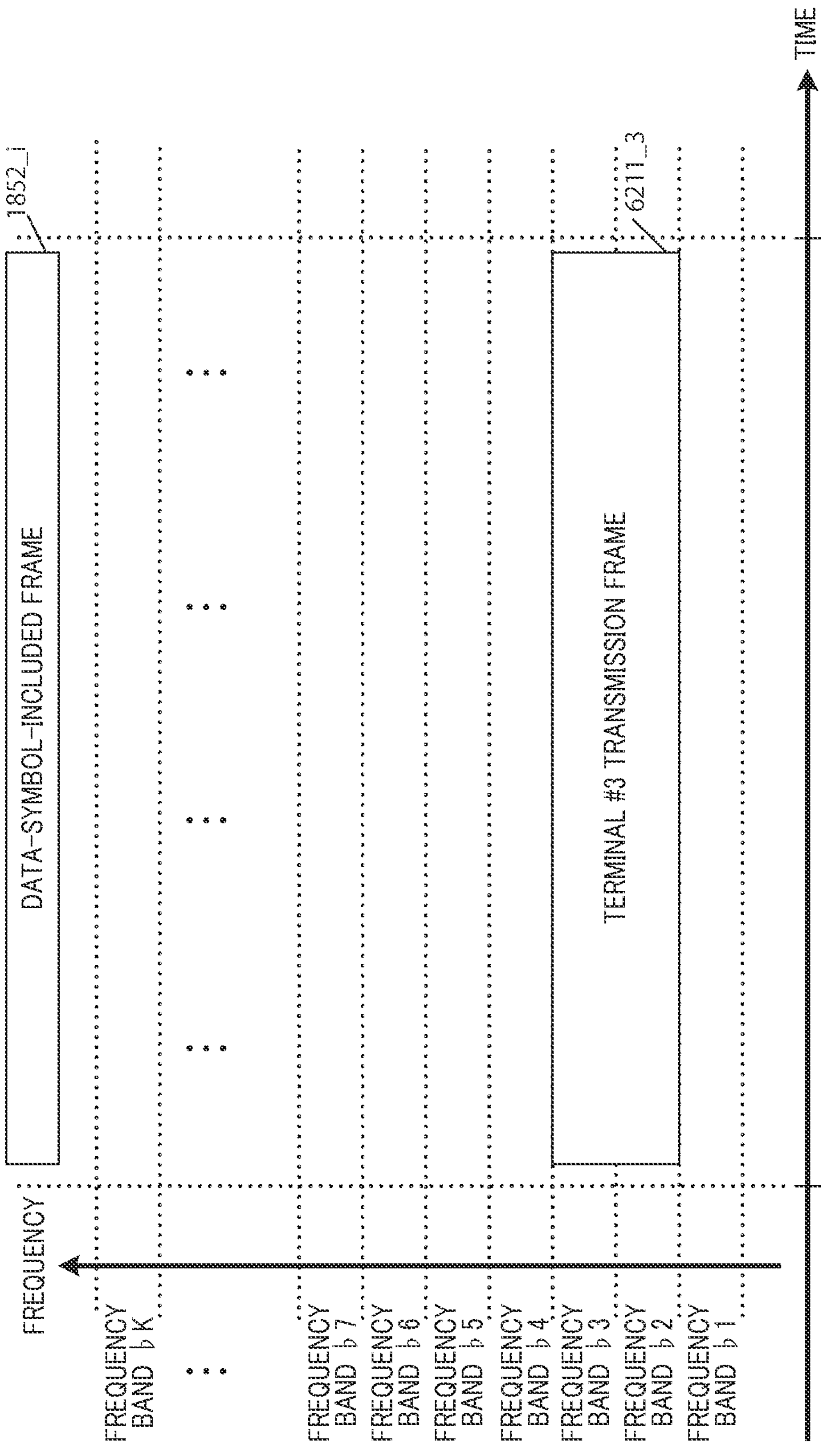
FIG. 62C illustrates an exemplary configuration of a "data-symbol-included frame" transmitted by terminal #3.

FIG. 62C illustrates "data-symbol-included frame 1852_*i*" transmitted by terminal #3 labeled 902_3, and terminal #3 labeled 902_3 transmits "terminal #3 transmission frame (including a data symbol) 6211_3" using frequency bands ♭2 and ♭3 as illustrated in FIG. 62C.

Figure 62D:
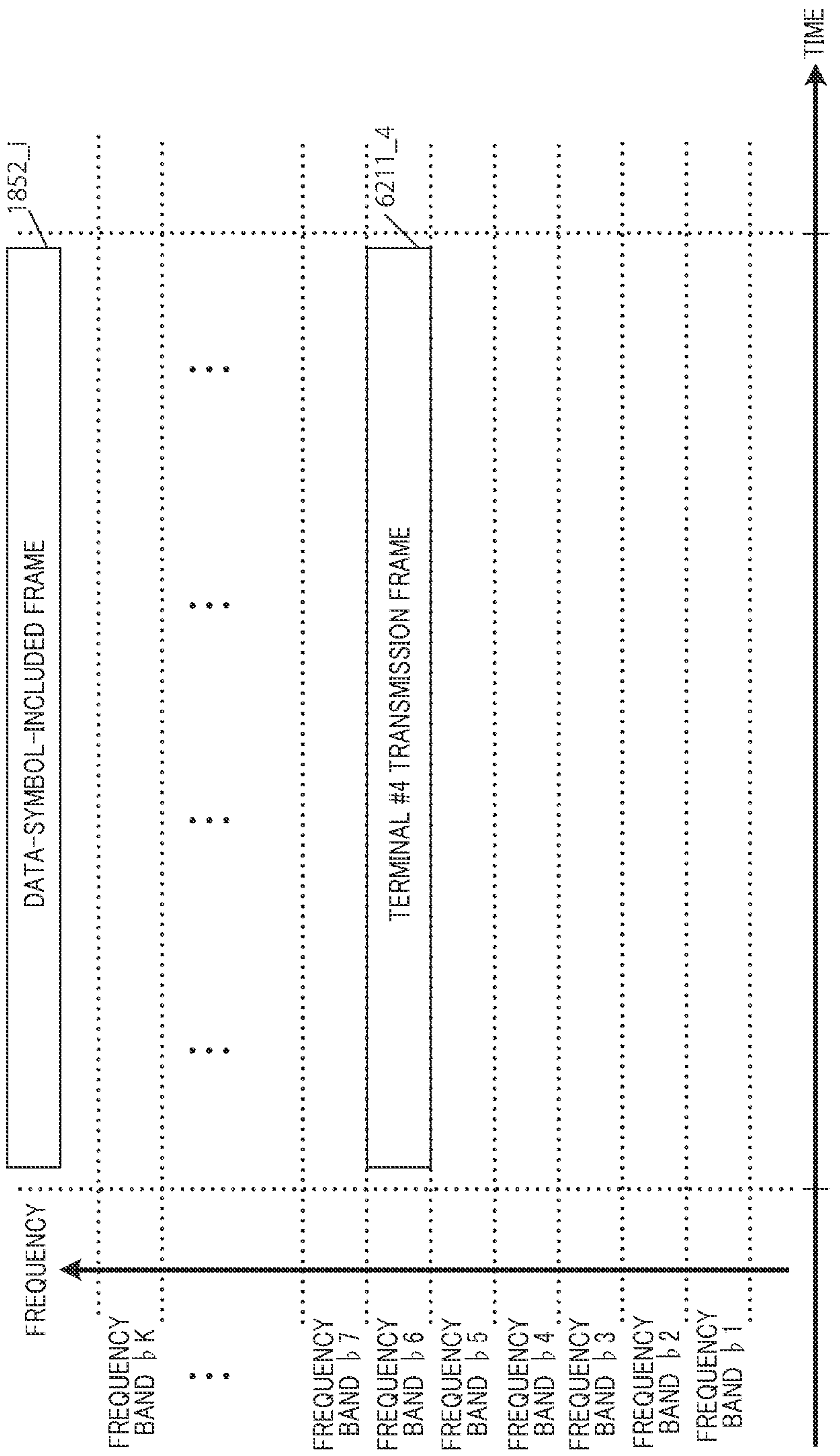
FIG. 62D illustrates an exemplary configuration of a "data-symbol-included frame" transmitted by terminal #4.

FIG. 62D illustrates "data-symbol-included frame 1852_*i*" transmitted by terminal #4 labeled 902_4, and terminal #4 labeled 902_4 transmits "terminal #4 transmission frame (including a data symbol) 6211_4" using frequency band ♭6 as illustrated in FIG. 62D.

Figure 62E:
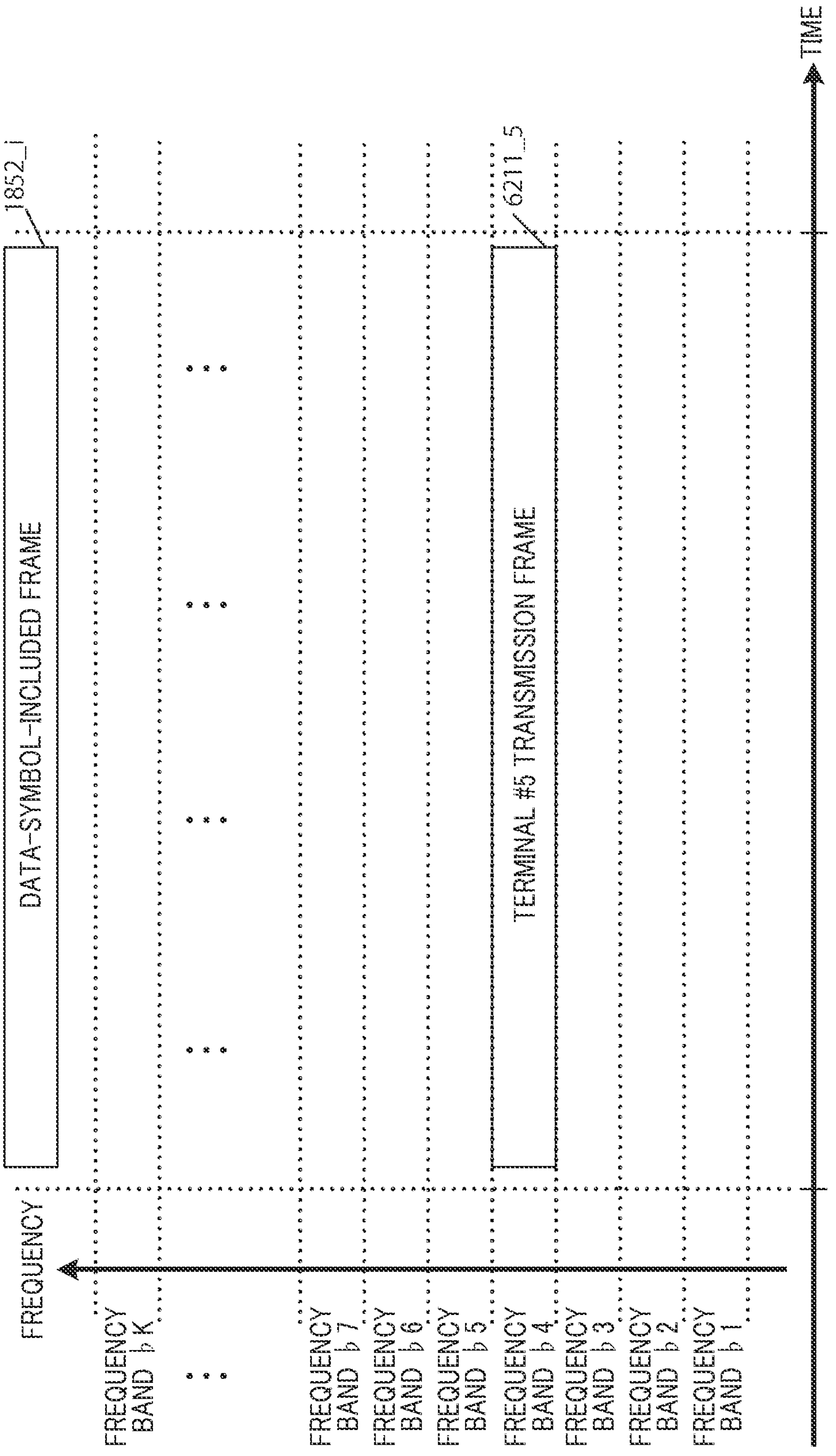
FIG. 62E illustrates an exemplary configuration of a "data-symbol-included frame" transmitted by terminal #5.

FIG. 62E illustrates "data-symbol-included frame 1852_*i*" transmitted by terminal #5 labeled 902_5, and terminal #5 labeled 902_5 transmits "terminal #5 transmission frame (including a data symbol) 6211_5" using frequency band ♭4 as illustrated in FIG. 62E.

Figure 62F:
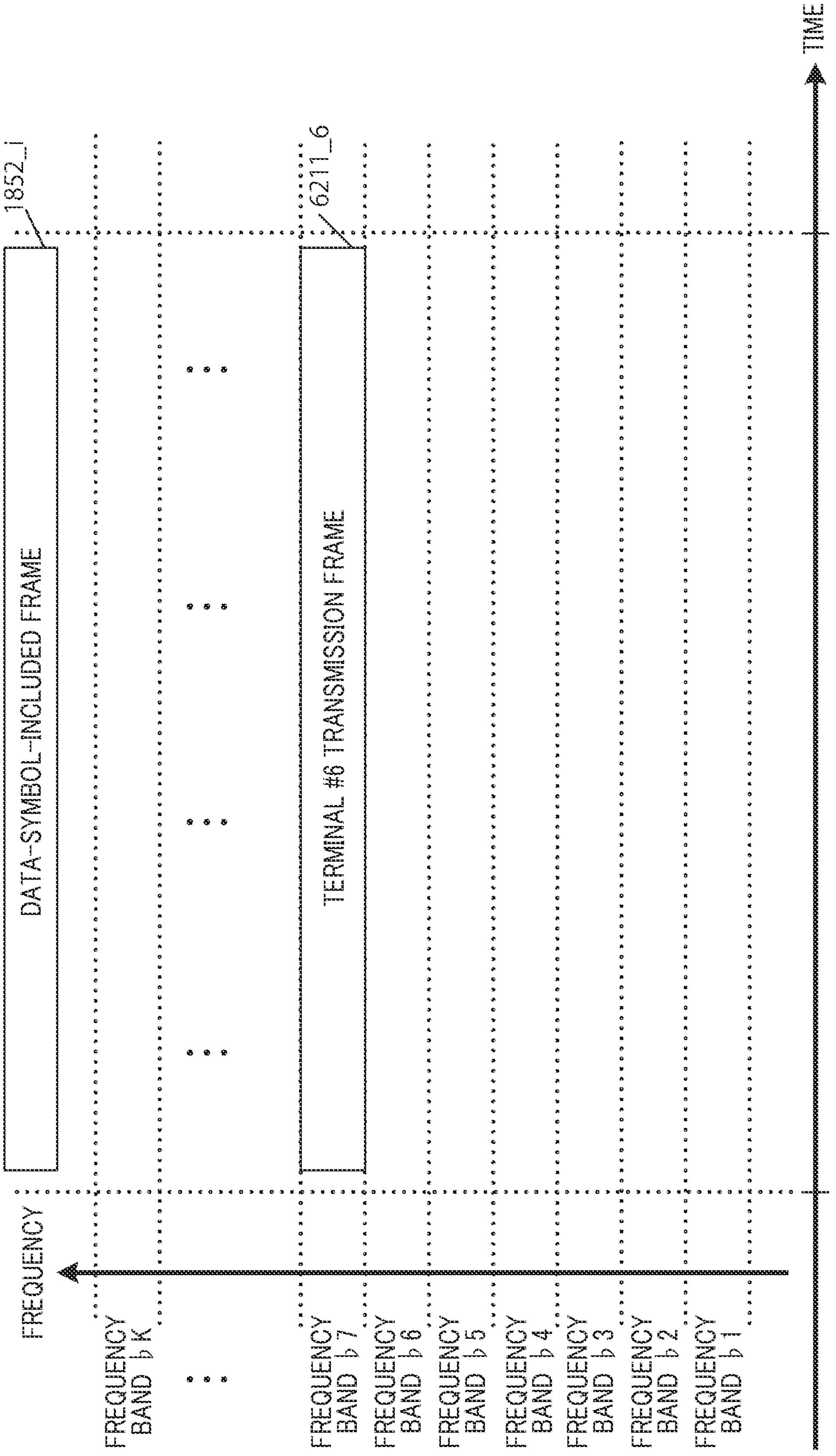
FIG. 62F illustrates an exemplary configuration of a "data-symbol-included frame" transmitted by terminal #6.

FIG. 62F illustrates "data-symbol-included frame 1852_*i*" transmitted by terminal #6 labeled 902_6, and terminal #6 labeled 902_6 transmits "terminal #6 transmission frame (including a data symbol) 6211_6" using frequency band ♭7 as illustrated in FIG. 62F.

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, frequency division (OFDMA here) and transmitted by each terminal, and base station #1 labeled 901_1 receives the frame transmitted by the terminal, thereby preventing interference and achieving high data reception quality.

Note that terminal #1 transmission frame 6211_1, terminal #2 transmission frame 6211_2, terminal #3 transmission frame 6211_3, terminal #4 transmission frame 6211_4, terminal #5 transmission frame 6211_5, and terminal #6 transmission frame 6211_6 in FIGS. 62A, 62B, 62C, 62D, 62E, and 62F may include, in addition to the data symbol, a "reference signal such as DMRS, PTRS, or SRS", a pilot symbol, a pilot signal, a preamble, and a symbol including control information, for example.

In FIGS. 62A, 62B, 62C, 62D, 62E, and 62F, a description has been given of a case where the terminals perform frequency division on the frames to be transmitted, but the terminals may perform spatial division on the frames to be transmitted using multi user-multiple-input multiple-output (MU-MIMO).

FIG. 59B illustrates exemplary occupation by the terminals in the areas for ""sector sweep reference signal" 5901_1 for frequency ♭1, "sector sweep reference signal" 5901_2 for frequency ♭2, "sector sweep reference signal" 5901_3 for frequency ♭3, "sector sweep reference signal" 5901_4 for frequency ♭4, "sector sweep reference signal" 5901_5 for frequency ♭5, "sector sweep reference signal" 5901_6 for frequency ♭6, "sector sweep reference signal" 5901_7 for frequency ♭7, . . . , "sector sweep reference signal" 5901_K for frequency ♭K" included in terminal "sector sweep reference signal" 5801_1" illustrated in FIG. 59A.

Figure 63A:
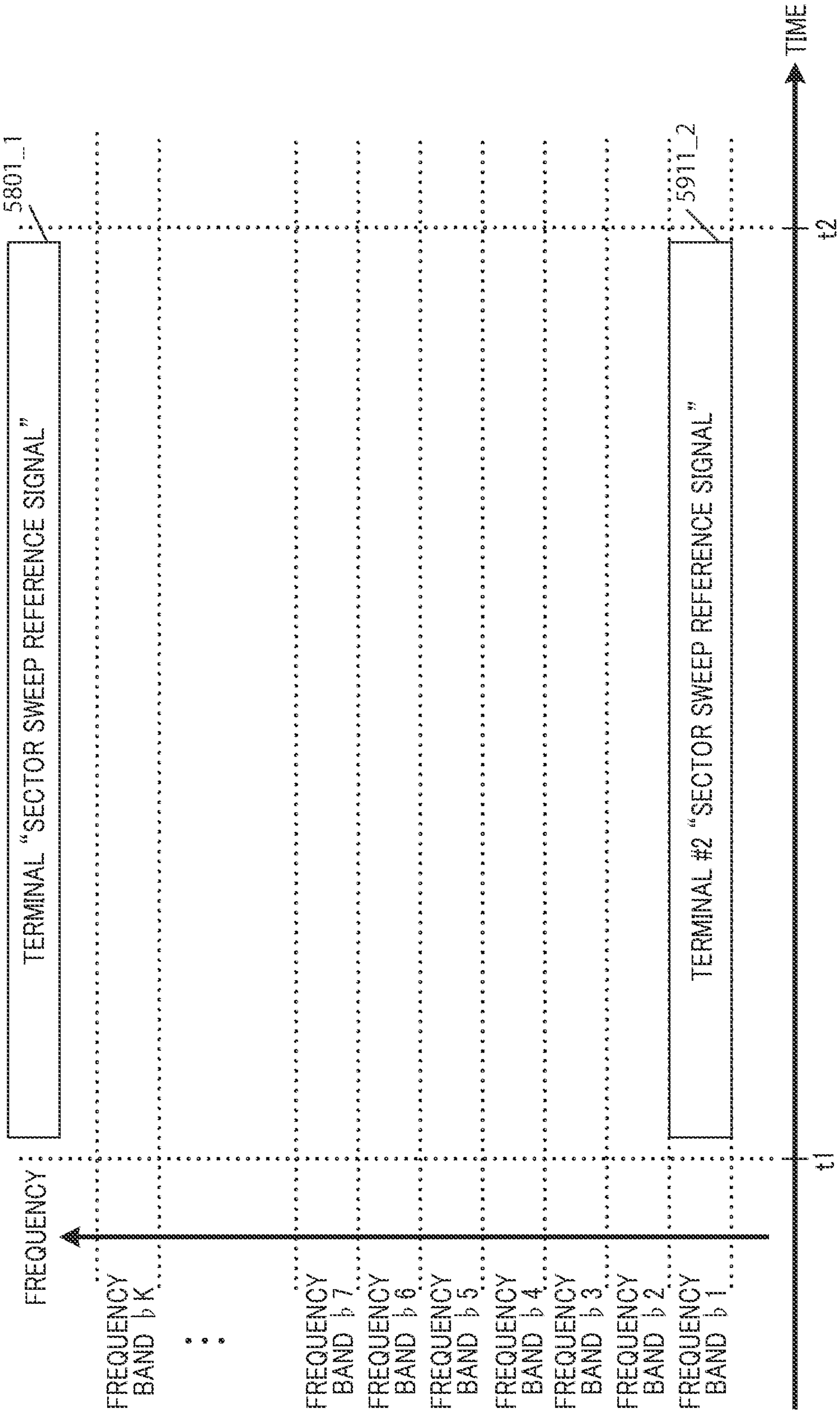
FIG. 63A illustrates exemplary occupation by terminals different from that in FIG. 59B in the terminal "sector sweep reference signal" illustrated in FIG. 59A.
Figure 63B:
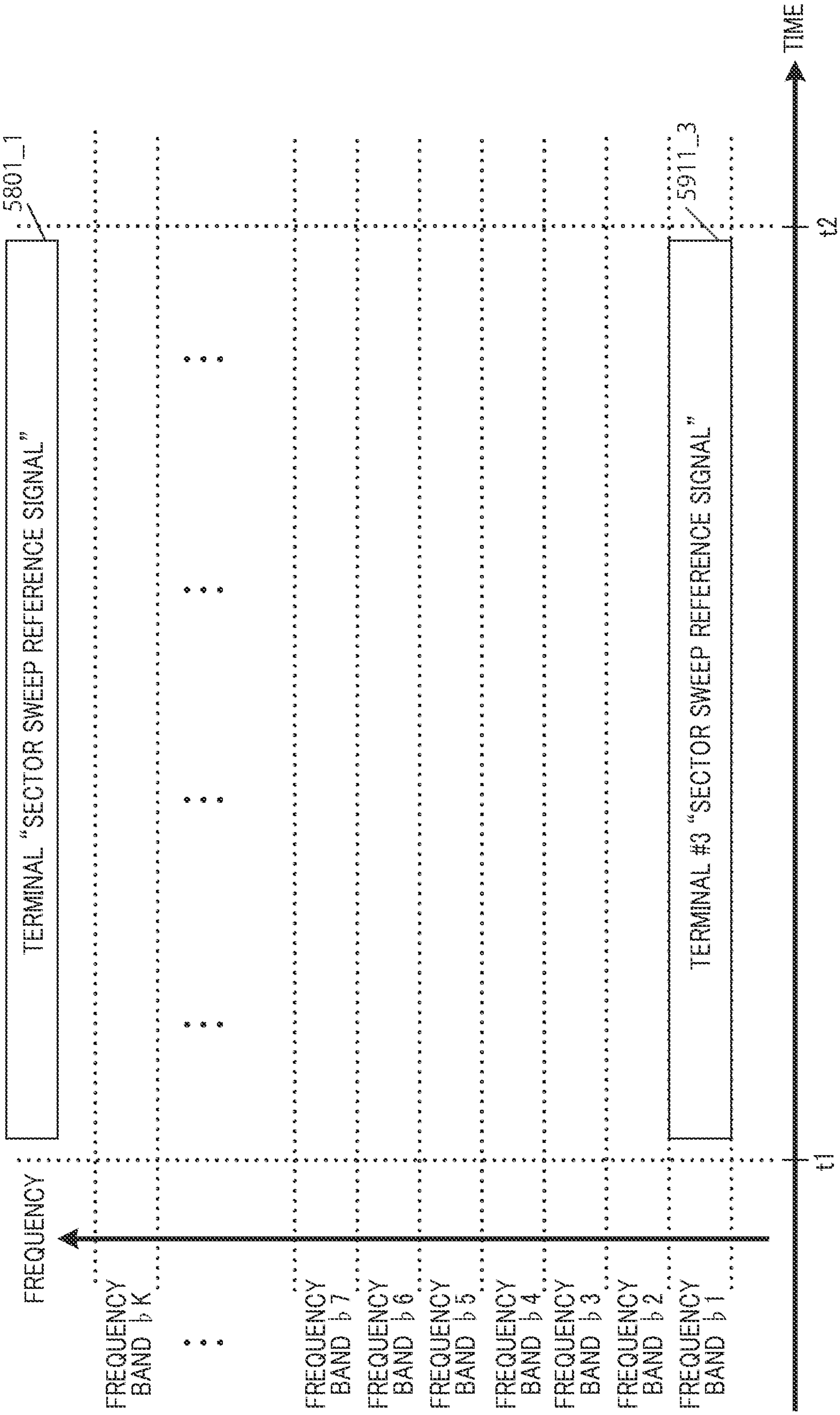
FIG. 63B illustrates exemplary occupation by terminals different from that in FIG. 59B in the terminal "sector sweep reference signal" illustrated in FIG. 59A.

In FIGS. 63A and 63B, a description will be given of exemplary occupation by the terminals different from that in FIG. 59B in the areas for ""sector sweep reference signal" 5901_1 for frequency ♭1, "sector sweep reference signal"

5901_2 for frequency ♭2, “sector sweep reference signal” 5901_3 for frequency ♭3, “sector sweep reference signal” 5901_4 for frequency ♭4, “sector sweep reference signal” 5901_5 for frequency ♭5, “sector sweep reference signal” 5901_6 for frequency ♭6, “sector sweep reference signal” 5901_7 for frequency ♭7, . . . , “sector sweep reference signal” 5901_K for frequency ♭K” included in terminal “sector sweep reference signal” 5801_1”.

In FIGS. 63A and 63B, the components that operate in the same manner as in FIG. 59B are denoted by the same reference signs, and the description thereof will be thus omitted. The horizontal axis represents time and the vertical axis represents frequency in FIGS. 63A and 63B.

Terminal #2 labeled 902_2 in FIG. 9 receives sector sweep reference signal 1001 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #2 labeled 902_2, for example, estimates frequency band ♭1 as the “frequency (band)” with high reception quality and estimates “transmission panel antenna a2 and parameter b2” as the “transmission panel antenna and parameter”.

Then, terminal #2 labeled 902_2 transmits “terminal #2 “sector sweep reference signal” 5911_2” using frequency band ♭1 as illustrated in FIG. 63A.

Note that “terminal #2 “sector sweep reference signal” 5911_2” includes information of the “transmission panel antenna and parameter” with high reception quality obtained by terminal #2 labeled 902_2, that is, information of “transmission panel antenna a2 and parameter b2”.

Terminal #3 labeled 902_3 in FIG. 9 receives sector sweep reference signal 1001 transmitted by base station #1 labeled 901_1, obtains the “identification number (ID) of the transmission panel antenna” and the “identification number (ID) of the parameter used for beamforming (directivity control)” with high reception quality, and then can communicate with base station #1 labeled 901_1.

Terminal #3 labeled 902_3, for example, estimates frequency band ♭1 as the “frequency (band)” with high reception quality and estimates “transmission panel antenna a3 and parameter b3” as the “transmission panel antenna and parameter”.

Then, terminal #3 labeled 902_3 transmits “terminal #3 “sector sweep reference signal” 5911_3” using frequency band ♭1 as illustrated in FIG. 63B.

Note that “terminal #3 “sector sweep reference signal” 5911_3” includes information of the “transmission panel antenna and parameter” with high reception quality obtained by terminal #3 labeled 902_3, that is, information of “transmission panel antenna a3 and parameter b3”.

At this time, as illustrated in FIGS. 63A and 63B, the frequencies and the time periods for “terminal #2 “sector sweep reference signal” 5911_2 transmitted by terminal #2 labeled 902_2” and “terminal #3 “sector sweep reference signal” 5911_3 transmitted by terminal #3 labeled 902_3” overlap each other.

Thus, base station #1 labeled 901_1 possibly simultaneously receives terminal #2 “sector sweep reference signal” 5911_2 and terminal #3 “sector sweep reference signal” 5911_3.

In this case, the following is two possible cases.

<Case 1>

Both “terminal #2 “sector sweep reference signal” 5911_2 transmitted by terminal #2 labeled 902_2” and “terminal #3 “sector sweep reference signal” 5911_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 5911_2 transmitted by terminal #2 labeled 902_2” by base station #1 labeled 901_1 are different from the ““transmission panel antenna and parameter for beamforming of terminal #3 labeled 902_3” with high reception quality in receiving terminal #3 “sector sweep reference signal” 5911_3 transmitted by terminal #3 labeled 902_3” by base station #1 labeled 901_1. Accordingly, base station #1 labeled 901_1 obtains information included in “terminal #2 “sector sweep reference signal” 5911_2 transmitted by terminal #2 labeled 902_2” and information included in “terminal #3 “sector sweep reference signal” 5911_3 transmitted by terminal #3 labeled 902_3”.

In this case, in FIG. 60A for example, “feedback signal 6001_1 for frequency ♭1 is a signal addressed to terminal #2 labeled 902_2” and “feedback signal 6001_2 for frequency 62 is a signal addressed to terminal #3 labeled 902_3”.

In addition, in FIG. 61A for example, “modulation signal (slot) 6101_1 for frequency ♭1 is a signal addressed to terminal #2 labeled 902_2” and “modulation signal (slot) 6101_2 for frequency ♭2 is a signal addressed to terminal #3 labeled 902_3”.

In this manner, base station #1 labeled 901_1 can communicate with terminal #2 labeled 902_2 and terminal #3 labeled 902_3.

<Case 2>

Both “terminal #2 “sector sweep reference signal” 5911_2 transmitted by terminal #2 labeled 902_2” and “terminal #3 “sector sweep reference signal” 5911_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 5911_2 transmitted by terminal #2 labeled 902_2” by base station #1 labeled 901_1 interfere with the ““transmission panel antenna and parameter for beamforming of terminal #3 labeled 902_3” with high reception quality in receiving terminal #3 “sector sweep reference signal” 5911_3 transmitted by terminal #3 labeled 902_3” by base station #1 labeled 901_1.

<Case 2-1>

In some cases, base station #1 labeled 901_1 obtains either information included in “terminal #2 “sector sweep reference signal” 5911_2 transmitted by terminal #2 labeled 902_2” or information included in “terminal #3 “sector sweep reference signal” 5911_3 transmitted by terminal #3 labeled 902_3”.

For example, base station #1 labeled 901_1 obtains the information included in “terminal #2 “sector sweep reference signal” 5911_2 transmitted by terminal #2 labeled 902_2”.

In this case, in FIG. 60A for example, “feedback signal 6001_1 for frequency ♭1 is a signal addressed to terminal #2 labeled 902_2”.

In addition, in FIG. 61A for example, “modulation signal (slot) 6101_1 for frequency ♭1 is a signal addressed to terminal #2 labeled 902_2”.

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIGS. 63A and 63B. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭2 as the "frequency (band)" with high reception quality and estimates "transmission panel antenna a3 and parameter b3" as the "transmission panel antenna and parameter".

At this time, terminal #3 labeled 902_3 transmits a terminal #3 "sector sweep reference signal" using the area for "sector sweep reference signal" 5901_2 for frequency band ♭2 in FIG. 59A.

Note that the terminal #3 "sector sweep reference signal" includes information of the "transmission panel antenna and parameter" with high reception quality obtained by terminal #3 labeled 902_3, that is, information of "transmission panel antenna a3 and parameter b3".

In this case, base station #1 labeled 901_1 receives the "terminal #3 "sector sweep reference signal" transmitted by terminal #3 labeled 902_3". Then, the predetermined procedure described above is performed, and base station #1 labeled 901_1 and terminal #3 labeled 902_3 communicate with each other.

<Case 2-2>

In some cases, base station #1 labeled 901_1 obtains neither information included in "terminal #2 "sector sweep reference signal" 5911_2 transmitted by terminal #2 labeled 902_2" nor information included in "terminal #3 "sector sweep reference signal" 5911_3 transmitted by terminal #3 labeled 902_3".

It is assumed that sector sweep reference signal 1851_1 in FIG. 18 has the states in FIGS. 63A and 63B, and base station #1 labeled 901_1 obtains neither information included in "terminal #2 "sector sweep reference signal" 5911_2 transmitted by terminal #2 labeled 902_2" nor information included in "terminal #3 "sector sweep reference signal" 5911_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

At this time, terminal #2 labeled 902_2 transmits a terminal #2 "sector sweep reference signal" using the area for "sector sweep reference signal" 5901_1 for frequency band ♭1 in FIG. 59A.

Note that the terminal #2 "sector sweep reference signal" includes information of the "transmission panel antenna and parameter" with high reception quality obtained by terminal #2 labeled 902_2, that is, information of "transmission panel antenna a2 and parameter b3".

In this case, base station #1 labeled 901_1 receives the "terminal #2 "sector sweep reference signal" transmitted by terminal #2 labeled 902_2". Then, the predetermined procedure described above is performed, and base station #1 labeled 901_1 and terminal #2 labeled 902_2 communicate with each other.

Likewise, terminal #3 labeled 902_3 in FIG. 9 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band ♭2 as the "frequency (band)" with high reception quality and estimates "transmission panel antenna a3 and parameter b3" as the "transmission panel antenna and parameter".

At this time, terminal #3 labeled 902_3 transmits a terminal #3 "sector sweep reference signal" using the area for "sector sweep reference signal" 5901_2 for frequency band ♭2 in FIG. 59A.

Note that the terminal #3 "sector sweep reference signal" includes information of the "transmission panel antenna and parameter" with high reception quality obtained by terminal #3 labeled 902_3, that is, information of "transmission panel antenna a3 and parameter b3".

In this case, base station #1 labeled 901_1 receives the "terminal #3 "sector sweep reference signal" transmitted by terminal #3 labeled 902_3". Then, the predetermined procedure described above is performed, and base station #1 labeled 901_1 and terminal #3 labeled 902_3 communicate with each other.

In the manner described above, a collision of the sector sweep reference signals transmitted by the respective terminals can be further reduced. This produces an effect that the base station can receive more sector sweep reference signals and can communicate with more terminals.

As described above in Embodiment 6, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 9, 10, 11, 12, 15A, 15B, 18, 19, 58, 59A, 59B, 60A, 60B, 61A, 61B, 62A, 62B, 62C, 62D, 62E, 62F, 63A, and 63B, but the names thereof are not limited to those in the drawings and the important part is the functions of the signals to be transmitted.

Note that, although the present embodiment has provided a description of a case where frequency (bands) for signals transmitted by a base station and frequency (bands) for signals transmitted by a terminal are the same or partially overlap each other, by way of example, the same can be implemented in a case where frequency (bands) for signals transmitted by a base station and frequency (bands) for signals transmitted by a terminal are different or partially different from each other.

Further, the present embodiment has provided a description of a case where a terminal transmits a modulation signal in a multi-carrier scheme such as OFDM, for example, but the scheme is not limited to this. For example, a terminal may transmit a signal in a single-carrier scheme when transmitting a signal of a frame in FIGS. 14, 20A, 20B, 20C, 20D, 20E, 20F, 21A, 21B, 22A, 22B, etc.

In FIG. 14, for example, terminal #1 labeled 902_1 may transmit terminal #1 "sector sweep reference signal" 1401_1 in frequency band ♭K in a single-carrier scheme. Further, in FIG. 20A, terminal #1 labeled 902_1 may transmit "terminal #1 transmission frame" 2001_1 in frequency band ♭K in a single-carrier scheme. Note that other terminals may also transmit a signal in a single-carrier scheme.

Embodiment 7

In Embodiment 7, a description will be given of an embodiment where a terminal performs transmission in a single-carrier scheme as a variation of Embodiment 6. Note that the drawings used in Embodiment 6 are sometimes used in the following description of Embodiment 7.

FIGS. 1A, 18, and 1C illustrate exemplary configurations of, for example, a base station, an access point, a terminal, and a repeater according to Embodiment 7, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 7. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a single-carrier scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band ♭i, sector sweep reference signal 1101_*i*1 in transmission panel antenna 1 for frequency ♭i is present in the first time period, sector sweep reference signal 1101_*i*2 in transmission panel antenna 2 for frequency bi is present in the second time period, . . . , sector sweep reference signal 1101_iM in transmission panel antenna M for frequency ♭i is present in the M-th time period. Note that i is an integer from 1 to K (both inclusive).

Note that sector sweep reference signal 1101_*ij* in transmission panel antenna j for frequency ♭i is transmitted from transmission panel antenna j labeled 106_*j* of base station #1 labeled 901_1 with the configuration in FIG. 1A, 1B, or 1C. In this case, j is an integer from 1 to M (both inclusive).

One feature is that "sector sweep reference signals are transmitted from the same transmission panel antenna in the i-th time period regardless of the frequency band in FIG. 11". At this time, the same beamforming parameter is used in a first period of time regardless of the frequency band. Note that the beamforming will be described later.

FIG. 12 illustrates an exemplary configuration of "sector sweep reference signal 1101_*pi* in transmission panel antenna i for frequency ♭p" in FIG. 11. Note that the horizontal axis represents time in FIG. 12. Note that p is an integer from 1 to K (both inclusive) and i is an integer from 1 to M (both inclusive).

A description will be omitted on a specific example of a method of transmitting "sector sweep reference signal 1101_*pi* in transmission panel antenna i for frequency ♭p", which is configured as in FIGS. 11 and 12 and transmitted by base station #1 labeled 901_1 with the configuration in FIG. 1A, 1B, or 1C, since it has already been described.

As illustrated in FIGS. 11 and 12, when base station #1 labeled 901_1 transmits "sector sweep reference signal 1101_*i* in transmission panel antenna i for frequency ♭p", "reference signal 1201_*j* according to j-th parameter in transmission panel antenna i for frequency ♭p" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

Note that, in a case where "the number of time divisions in which sector sweep reference signals can be transmitted" is determined in advance, information of the number of time divisions in which sector sweep reference signals can be transmitted need not be included in "reference signal 1201_*j* according to j-th parameter in transmission panel antenna i for frequency ♭p".

The following information may also be included in "reference signal 1201_*j* according to j-th parameter in transmission panel antenna i for frequency ♭p";

- Information on the frequency band and/or frequency ♭p (information of the number of frequency divisions may also be included), which will be described later.

Transmission of the "identification number (ID) of the transmission panel antenna for frequency ♭p" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of time divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency ♭p" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 7, the description is based on a case where the terminals transmit signals using a single-carrier scheme and frequency (bands) used by the base station and frequency (bands) used by the terminals partially overlap each other.

FIG. 23 illustrates an exemplary operation in the time period from time t1 to t2, which is the terminal response period. Note that the horizontal axis represents time in FIG. 23. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 23, the components that operate in the same manner as in FIGS. 10 and 13 are denoted by the same reference signs.

As illustrated in FIGS. 10 and 23, for example, base station #1 labeled 901_1 transmits sector sweep reference signals in the time period from time t0 to t1. After that, the terminal response period, which is the time period from time t1 to t2, includes terminal "sector sweep reference signal" first transmission period 1301_1, terminal "sector sweep reference signal" second transmission period 1301_2, terminal "sector sweep reference signal" third transmission period 1301_3, terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8, as illustrated in FIG. 13.

Thus, in the case of FIG. 23, "the number of time divisions in which sector sweep reference signals can be transmitted when the terminals transmit the sector sweep reference signals" is set to eight by base station #1 labeled 901_1.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23. Note that the horizontal axis represents time in FIG. 24.

Terminal #1 labeled 902_1 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #1 labeled 902_1 estimates, for example, "transmission panel antenna a 1 and parameter b1" as the "transmission panel antenna and parameter" with high reception quality. Terminal #1 labeled 902_1 also estimates frequency band ♭K as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal #1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 2401_1 includes information of the "transmission panel antenna and parameter" with high reception quality obtained by terminal #1 labeled 902_1, that is, information of "transmission panel antenna a1 and parameter b1". Terminal #1 "sector sweep reference signal" 2401_1 also includes information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 24, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth (="5"+1) transmission period 1301_6" in FIG. 24.

Note that terminal #2 "sector sweep reference signal" 2401_2 includes information of the "transmission panel antenna and parameter" with high reception quality obtained by terminal #2 labeled 902_2, that is, information of "transmission panel antenna a2 and parameter b2". Terminal #2 "sector sweep reference signal" 2401_2 also includes information of the "frequency domain", for example, information of "frequency band ♭1". This will be described later.

Thus, terminal #i labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001** may be used for this estimation.

Terminal #i labeled **902_*i* estimates, for example, "transmission panel antenna ai and parameter bi" as the "transmission panel antenna and parameter" with high reception quality. Terminal #i labeled 902_*i*** also estimates frequency band ♭zi as the "frequency domain" with high reception quality.

In addition, while estimating the "transmission panel antenna and parameter" with high reception quality, terminal #i labeled **902_*i* simultaneously obtains information of "the number of time divisions in which sector sweep reference signals can be transmitted when the terminals transmit the sector sweep reference signals". In the case of FIG. 24, terminal #i labeled 902_*i*** obtains information indicating that "the number of time divisions in which sector sweep reference signals can be transmitted when the terminals transmit the sector sweep reference signals" is eight.

In this case, terminal #i labeled **902_*i* obtains, for example, any one of the values "0", "1", "2", "3", "4", "5", "6", and "7" using a random number. For example, terminal #i labeled 902_*i* obtains "yi" using a random number. Note that yi is any one of the values "0", "1", "2", "3", "4", "5", "6", and "7". In this case, terminal #i labeled 902_*i* transmits terminal #i "sector sweep reference signal" 2401_*i* using terminal "sector sweep reference signal" ("yi"+1)-th transmission period 1301_("yi"+1) in FIG. 24**.

Note that terminal #i "sector sweep reference signal" 2401_1 includes information of the "transmission panel antenna and parameter" with high reception quality obtained by terminal #i labeled **902_*i*, that is, information of "transmission panel antenna ai and parameter bi". Terminal #i "sector sweep reference signal" 2401_*i*** also includes information of the "frequency domain", for example, information of "frequency band ♭zi". This will be described later.

Note that, in FIG. 24, it may be considered that terminal #i "sector sweep reference signals" **2401_*i* use a first frequency (band) regardless of i as a first method. In this case, terminal #i "sector sweep reference signals" 2401_*i*** are subjected to time division (time division multiple access (TDMA)). This is because the terminals transmit modulation signals using a single-carrier scheme.

As a second method, terminal #i "sector sweep reference signals" 2401_*i* do not necessarily use the same frequency (band).

Both the first and second methods produce an effect of "reducing interference between terminal #i "sector sweep reference signals" 2401_*i*".

For example, in a case where base station #1 labeled 901_1 transmits modulation signals using "frequency band ♭1 to frequency band ♭K" as described in Embodiment 6, a method can be considered in which terminal #i labeled 902_*i* transmits a modulation signal in a single-carrier scheme using "frequency band ♭1 to frequency band ♭K".

As another method, in a case where base station #1 labeled 901_1 transmits modulation signals using "frequency band ♭1 to frequency band ♭K" as described in Embodiment 6, a method can be considered in which terminal #i labeled 902_*i* transmits a modulation signal in a single-carrier scheme using some of "frequency band ♭1 to frequency band ♭K".

Further, a method can be considered in which base station #1 labeled 901_1 transmits modulation signals using "frequency band ♭1 to frequency band ♭K" as described in Embodiment 6 and terminal #i labeled 902_*i* transmits a modulation signal using a frequency (band) other than "frequency band ♭1 to frequency band ♭K".

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Note that the difference from Embodiment 6 is that terminal #i labeled 902_*i* transmits a modulation signal in a single-carrier scheme, and the specific configuration has already been described in Embodiment 6.

Terminal #i labeled 902_*i* transmits terminal #i "sector sweep reference signal" 2401_*i* as illustrated in FIG. 24. FIG. 15A illustrates an exemplary configuration of terminal #i "sector sweep reference signal" 2401_*i*. Note that the horizontal axis represents time in FIG. 15A. "Terminal #i "sector sweep reference signal" 1401_*i*" in FIG. 15A corresponds to an exemplary "sector sweep reference signal" 2401_*i* in FIG. 24.

As illustrated in FIG. 15A, terminal #i "sector sweep reference signal" 2401_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1 (t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)× w1(xi, j). Then, terminal #i labeled 902_*i* transmits tx1refj (t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)× w2(xi, j). Then, terminal #i labeled 902_*i* transmits tx2refj (t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)× w3(xi, j). Then, terminal #1 labeled 902_*i* transmits tx3refj (t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)× w4(xi, j). Then, terminal #i labeled 902_*i* transmits tx4refj (t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 24, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces an effect of enhancing data reception quality.

Further, as illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency ♭p" that has been used for transmission by terminal #i labeled 902_*i* or that terminal #i labeled 902_*i* desires base station #1 labeled 901_1 to use.

Transmission of the "information on the frequency band and/or frequency ♭p" by terminal #i labeled 902_*i* allows base station #1 labeled 901_1 to recognize the "information on the frequency band and/or frequency ♭p"; accordingly, terminal #i labeled 902_*i* and base station #1 labeled 901_1 can perform appropriate control. This produces an effect of enhancing data reception quality.

FIG. 60A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 60A. In this example, feedback signal 1002 includes areas for "feedback signal 6001_1 for frequency ♭1, feedback signal 6001_2 for frequency ♭2, feedback signal 6001_3 for frequency ♭3, feedback signal 6001_4 for frequency ♭4, feedback signal 6001_5 for frequency ♭5, feedback signal 6001_6 for frequency ♭6, feedback signal 6001_7 for frequency ♭7, . . . , feedback signal 6001_K for frequency ♭K" as illustrated in FIG. 60A.

FIG. 60B illustrates exemplary specific feedback signal assignment for feedback signal 1002 in the areas for "feedback signal 6001_1 for frequency ♭1, feedback signal 6001_2 for frequency ♭2, feedback signal 6001_3 for frequency ♭3, feedback signal 6001_4 for frequency ♭4, feedback signal 6001_5 for frequency ♭5, feedback signal 6001_6 for frequency ♭6, feedback signal 6001_7 for frequency ♭7, . . . , feedback signal 6001_K for frequency ♭K" illustrated in FIG. 60A.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, terminal #3 labeled 902_3 transmits terminal #3 "sector sweep reference signal" 2401_3, and other terminals also transmit sector sweep reference signals.

Additionally, terminal #1 "sector sweep reference signal" 2401_1 includes information indicating that "frequency band ♭K has high reception quality". Thus, base station #1 labeled 901_1 transmits terminal #1-addressed feedback signal 1611_1 using frequency band ♭K as in FIG. 60B.

Terminal #2 "sector sweep reference signal" 2401_2 includes information indicating that "frequency band ♭1 has high reception quality". Thus, base station #1 labeled 901_1 transmits terminal #2-addressed feedback signal 1611_2 using frequency band ♭1 as in FIG. 60B.

Terminal #3 "sector sweep reference signal" 2401_3 includes information indicating that "frequency band ♭2 and frequency band ♭3 have high reception quality". Thus, base station #1 labeled 901_1 transmits terminal #3-addressed feedback signal 1611_3 using frequency bands ♭2 and ♭3 as in FIG. 60B.

Terminal #4 "sector sweep reference signal" (not illustrated in FIG. 24) includes information indicating that "frequency band ♭6 has high reception quality". Thus, base station #1 labeled 901_1 transmits terminal #4-addressed feedback signal 1611_4 using frequency band ♭6 as in FIG. 60B.

Terminal #5 "sector sweep reference signal" (not illustrated in FIG. 24) includes information indicating that "frequency band ♭4 has high reception quality". Thus, base station #1 labeled 901_1 transmits terminal #5-addressed feedback signal 1611_5 using frequency band ♭4 as in FIG. 60B.

Terminal #6 "sector sweep reference signal" (not illustrated in FIG. 24) includes information indicating that "frequency band ♭7 has high reception quality". Thus, base station #1 labeled 901_1 transmits terminal #6-addressed feedback signal 1611_6 using frequency band ♭7 as in FIG. 60B.

In this manner, obtaining terminal #i-addressed feedback signal 6011_*i* allows terminal #i labeled 902_*i* to know that communication with base station #1 labeled 901_1 is available and to know the frequency band to be used. Note that FIG. 60B is merely an example. In a case where there is no terminal #1-addressed feedback signal 6011_1 as feedback signal 1002, for example, terminal #1 labeled 902_1 recognizes that the communication with base station #1 labeled 901_1 has not been established.

At this time, terminal #i-addressed feedback signal 6011_*i* includes, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the "frequency (band) information" and the "information of the "transmission panel antenna and parameter" of base station #1 labeled 901_1 with high reception quality" transmitted by terminal #i labeled 902_*i*, and base station #1 labeled 901_1 then transmits terminal #i-addressed feedback signal 6011_*i*.

FIG. 61A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 61A. In this example, data-symbol-included frame 1003 includes areas for "modulation signal (slot) 6101_1 for frequency ♭1, modulation signal (slot) 6101_2 for frequency ♭2, modulation signal (slot) 6101_3 for frequency ♭3, modulation signal (slot) 6101_4 for frequency ♭4, modulation signal (slot) 6101_5 for frequency ♭5, modulation signal (slot) 6101_6 for frequency ♭6, modulation signal (slot) 6101_7 for frequency ♭7, . . . , modulation signal (slot) 6101_K for frequency ♭K" as illustrated in FIG. 61A.

FIG. 61B illustrates exemplary specific modulation signal (slot) assignment for data-symbol-included frame 1003 in the areas for "modulation signal (slot) 6101_1 for frequency ♭1, modulation signal (slot) 6101_2 for frequency ♭2, modulation signal (slot) 6101_3 for frequency ♭3, modulation signal (slot) 6101_4 for frequency ♭4, modulation signal (slot) 6101_5 for frequency ♭5, modulation signal (slot) 6101_6 for frequency ♭6, modulation signal (slot) 6101_7 for frequency ♭7, . . . , modulation signal (slot) 6101_K for frequency ♭K" illustrated in FIG. 61A.

As in the example of FIG. 24, for example, terminal #1 labeled 902_1 transmits terminal #1 “sector sweep reference signal” 2401_1, terminal #2 labeled 902_2 transmits terminal #2 “sector sweep reference signal” 2401_2, terminal #3 labeled 902_3 transmits terminal #3 “sector sweep reference signal” 2401_3, terminal #4 labeled 902_4 transmits terminal #4 “sector sweep reference signal” (not illustrated in FIG. 24), terminal #5 labeled 902_5 transmits terminal #5 “sector sweep reference signal” (not illustrated in FIG. 24), and terminal #6 labeled 902_6 transmits terminal #6 “sector sweep reference signal” (not illustrated in FIG. 24).

Additionally, terminal #1 “sector sweep reference signal” 2401_1 includes information indicating that “frequency band ♭K has high reception quality”. Thus, base station #1 labeled 901_1 transmits terminal #1-addressed modulation signal (slot) 6111_1 using frequency band ♭K as in FIG. 61B.

Terminal #2 “sector sweep reference signal” 2401_2 includes information indicating that “frequency band ♭1 has high reception quality”. Thus, base station #1 labeled 901_1 transmits terminal #2-addressed modulation signal (slot) 6111_2 using frequency band ♭1 as in FIG. 61B.

Terminal #3 “sector sweep reference signal” 2401_3 includes information indicating that “frequency band ♭2 and frequency band ♭3 have high reception quality”. Thus, base station #1 labeled 901_1 transmits terminal #3-addressed modulation signal (slot) 6111_3 using frequency bands ♭2 and ♭3 as in FIG. 61B.

Terminal #4 “sector sweep reference signal” (not illustrated in FIG. 24) includes information indicating that “frequency band ♭6 has high reception quality”. Thus, base station #1 labeled 901_1 transmits terminal #4-addressed modulation signal (slot) 6111_4 using frequency band ♭6 as in FIG. 61B.

Terminal #5 “sector sweep reference signal” (not illustrated in FIG. 24) includes information indicating that “frequency band ♭4 has high reception quality”. Thus, base station #1 labeled 901_1 transmits terminal #5-addressed modulation signal (slot) 6111_5 using frequency band ♭4 as in FIG. 61B.

Terminal #6 “sector sweep reference signal” (not illustrated in FIG. 24) includes information indicating that “frequency band ♭7 has high reception quality”. Thus, base station #1 labeled 901_1 transmits terminal #6-addressed modulation signal (slot) 6111_6 using frequency band ♭7 as in FIG. 61B.

At this time, terminal #i-addressed modulation signal (slot) 6111_*i* includes, for example, a data symbol (data and/or information) addressed to terminal #i labeled 902_*i*.

In this manner, terminal #i-addressed modulation signal (slot) 6111_*i* allows terminal #i labeled 902_*i* to know that communication with base station #1 labeled 901_1 is available and to know the frequency band to be used. Note that FIG. 61B is merely an example. In a case where there is no terminal #1-addressed modulation signal (slot) 6111_1 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the “frequency (band) information” and the “information of the “transmission panel antenna and parameter” of base station #1 labeled 901_1 with high reception quality” transmitted by terminal #i labeled 902_*i*, and base station #1 labeled 901_1 then transmits terminal #i-addressed modulation signal (slot) 6111_*i*.

Note that, in FIGS. 60A and 60B, base station #1 labeled 901_1 may estimate the “frequency (band)” and the “transmission panel antenna and parameter” of terminal #i labeled 902_1 with high reception quality in receiving “terminal #i “sector sweep reference signal” 2401_*i* transmitted by terminal #i labeled 902_*i*”, and the estimated information may be included in terminal #i-addressed feedback signal 6011_*i*.

Terminal #i labeled 902_*i* selects a frequency (band) and a transmission panel antenna and determines a beamforming method based on the information of “frequency (band)” and “transmission panel antenna and parameter” of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) 6111_*i* in FIG. 61B may include, in addition to the data symbol, a “reference signal such as a demodulation reference signal (DMRS), phase tracking reference signal (PTRS), or sounding reference signal (SRS)”, a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and “terminal #1 labeled 902_1, terminal #2 labeled 902_2, terminal #3 labeled 902_3, terminal #4 labeled 902_4, terminal #5 labeled 902_5, and terminal #6 labeled 902_6” communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of “terminal #1 labeled 902_1, terminal #2 labeled 902_2, terminal #3 labeled 902_3, terminal #4 labeled 902_4, terminal #5 labeled 902_5, and terminal #6 labeled 902_6”. Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as “terminal #1 labeled 902_1, terminal #2 labeled 902_2, terminal #3 labeled 902_3, terminal #4 labeled 902_4, terminal #5 labeled 902_5, and terminal #6 labeled 902_6” transmits sector sweep reference signal 1851_1. Note that this has already been described with reference to, for example, FIGS. 23, 24, 15A, 15B, etc., and the description thereof will be thus omitted.

Base station #1 labeled 901_1 transmits feedback signal 1802_1. Note that this has already been described with reference to FIGS. 60A and 60B, and the description thereof will be thus omitted.

After that, base station #1 labeled 901_1 transmits “data-symbol-included frame 1803_1”. Note that this has already been described with reference to FIGS. 61A and 61B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIG. 25. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 61A and 61B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIG. 25.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 61A and 61B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIG. 25.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 23, 24, 15A, 15B, etc., and the description thereof will be thus omitted.

Base station #1 labeled 901_1 transmits feedback signal 1802_2. Note that this has already been described with reference to FIGS. 60A and 60B, and the description thereof will be thus omitted.

After that, base station #1 labeled 901_1 transmits "data-symbol-included frame 1803_4". Note that this has already been described with reference to FIGS. 61A and 61B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIG. 25.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIG. 25. Note that i is an integer equal to or greater than 1, for example, and the horizontal axis represents time in FIG. 25.

As illustrated in FIG. 25, "data-symbol-included frame 1852_*i*" is composed of a first transmission period, a second transmission period, a third transmission period, a fourth transmission period, a fifth transmission period, a sixth transmission period, a seventh transmission period, and an eighth transmission period.

As illustrated in FIG. 25, for example, terminal #1 labeled 902_1 transmits terminal #1 transmission frame (including a data symbol) 2501_1 using the first transmission period.

Terminal #2 labeled 902_2 transmits terminal #2 transmission frame (including a data symbol) 2501_2 using the sixth transmission period.

Terminal #3 labeled 902_3 transmits terminal #3 transmission frame (including a data symbol) 2501_3 using the fourth transmission period.

Terminal #4 labeled 902_4 transmits terminal #4 transmission frame (including a data symbol) 2501_4 using the second transmission period.

Terminal #5 labeled 902_5 transmits terminal #5 transmission frame (including a data symbol) 2501_5 using the eighth transmission period.

Terminal #6 labeled 902_6 transmits terminal #6 transmission frame (including a data symbol) 2501_6 using the fifth transmission period.

Note that the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" uses a single-carrier transmission scheme. In addition, a plurality of terminals may use the same frequency (band).

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, time division and transmitted by each terminal, and base station #1 labeled 901_1 receives the frame transmitted by the terminal, thereby preventing interference and achieving high data reception quality.

Note that terminal #1 transmission frame 2501_1, terminal #2 transmission frame 2501_2, terminal #3 transmission frame 2501_3, terminal #4 transmission frame 2501_4, terminal #5 transmission frame 2501_5, and terminal #6 transmission frame 2501_6 in FIG. 25 may include, in addition to the data symbol, a "reference signal such as DMRS, PTRS, or SRS", a pilot symbol, a pilot signal, a preamble, and a symbol including control information, for example.

In FIG. 25, a description has been given of a case where the terminals perform time division on the frames to be transmitted, but the terminals may perform spatial division on the frames to be transmitted using multi user-multiple-input multiple-output (MU-MIMO).

FIG. 59B illustrates exemplary occupation by the terminals in the areas for ""sector sweep reference signal" 5901_1 for frequency ♭1, "sector sweep reference signal" 5901_2 for frequency ♭2, "sector sweep reference signal" 5901_3 for frequency ♭3, "sector sweep reference signal" 5901_4 for frequency ♭4, "sector sweep reference signal" 5901_5 for frequency ♭5, "sector sweep reference signal" 5901_6 for frequency ♭6, "sector sweep reference signal" 5901_7 for frequency ♭7, . . . , "sector sweep reference signal" 5901_K for frequency ♭K" included in terminal "sector sweep reference signal" 5801_1" illustrated in FIG. 59A.

In FIGS. 63A and 63B, a description will be given of exemplary occupation by the terminals different from that in FIG. 59A in the areas for ""sector sweep reference signal" 5901_1 for frequency ♭1, "sector sweep reference signal" 5901_2 for frequency ♭2, "sector sweep reference signal" 5901_3 for frequency ♭3, "sector sweep reference signal" 5901_4 for frequency ♭4, "sector sweep reference signal" 5901_5 for frequency ♭5, "sector sweep reference signal" 5901_6 for frequency ♭6, "sector sweep reference signal" 5901_7 for frequency ♭7, . . . , "sector sweep reference signal" 5901_K for frequency ♭K" included in terminal "sector sweep reference signal" 5801_1".

In FIG. 26, a description will be given of exemplary occupation by terminals different from that in FIG. 24 in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, the components that operate in the same manner as in FIGS. 23 and 24 are denoted by the same reference signs, and the descriptions thereof will be omitted since they have already been described. In the following, the difference from the description in FIG. 24 will be described.

Terminal #2 labeled 902_2 in FIG. 9 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of time divisions in which sector sweep reference signals can be transmitted when the terminals transmit the sector sweep reference signals". In the case of FIG. 26, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth transmission period 1301_6" as in FIG. 26.

Note that terminal #2 "sector sweep reference signal" 2401_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 9 receives sector sweep reference signal 1001 transmitted by base station #1 labeled 901_1, obtains the "identification number (ID) of the transmission panel antenna" and "identification number (ID) of the parameter used for beamforming (directivity control)" with high reception quality, and then can communicate with base station #1 labeled 901_1.

Terminal #3 labeled 902_3, for example, estimates frequency band ♭2 as the "frequency (band)" with high reception quality and estimates "transmission panel antenna a3 and parameter b3" as the "transmission panel antenna and parameter" with high reception quality.

In addition, while estimating the "frequency (band)" and "transmission panel antenna and parameter" with high reception quality, terminal #3 labeled 902_3 simultaneously obtains information of the "the number of time divisions in which sector sweep reference signals can be transmitted when the terminals transmit the sector sweep reference signals". In the case of FIG. 26, terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "5" using a random number. In this case, since "5"+1=6, terminal #3 labeled 902_3 transmits terminal #3 “sector sweep reference signal” 2601_3 using “terminal “sector sweep reference signal” sixth transmission period 1301_6” as in FIG. 26.

Note that terminal #3 “sector sweep reference signal” 2601_3 includes information of the “transmission panel antenna and parameter” with high reception quality obtained by terminal #3 labeled 902_3, that is, information of “transmission panel antenna a3 and parameter b3”.

At this time, as illustrated in FIG. 26, the time period for “terminal #2 “sector sweep reference signal” 2401_2 transmitted by terminal #2 labeled 902_2” and the time period for “terminal #3 “sector sweep reference signal” 2601_3 transmitted by terminal #3 labeled 902_3” overlap each other.

Thus, base station #1 labeled 901_1 possibly simultaneously receives terminal #2 “sector sweep reference signal” 2401_2 and terminal #3 “sector sweep reference signal” 2601_3.

In this case, the following is two possible cases.

<Case 1>

Both “terminal #2 “sector sweep reference signal” 2401_2 transmitted by terminal #2 labeled 902_2” and “terminal #3 “sector sweep reference signal” 2601_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 2401_2 transmitted by terminal #2 labeled 902_2” by base station #1 labeled 901_1 are different from the ““transmission panel antenna and parameter for beamforming of terminal #3 labeled 902_3” with high reception quality in receiving terminal #3 “sector sweep reference signal” 2601_3 transmitted by terminal #3 labeled 902_3” by base station #1 labeled 901_1. Accordingly, base station #1 labeled 901_1 obtains information included in “terminal #2 “sector sweep reference signal” 2401_2 transmitted by terminal #2 labeled 902_2” and information included in “terminal #3 “sector sweep reference signal” 2601_3 transmitted by terminal #3 labeled 902_3”.

In this case, in FIG. 60A for example, “feedback signal 6001_1 for frequency ♭1 is a signal addressed to terminal #2 labeled 902_2” and “feedback signal 6001_2 for frequency 62 is a signal addressed to terminal #3 labeled 902_3”.

In addition, in FIG. 61A for example, “modulation signal (slot) 6101_1 for frequency ♭1 is a signal addressed to terminal #2 labeled 902_2” and “modulation signal (slot) 6101_2 for frequency ♭2 is a signal addressed to terminal #3 labeled 902_3”.

In this manner, base station #1 labeled 901_1 can communicate with terminal #2 labeled 902_2 and terminal #3 labeled 902_3.

<Case 2>

Both “terminal #2 “sector sweep reference signal” 2401_2 transmitted by terminal #2 labeled 902_2” and “terminal #3 “sector sweep reference signal” 2601_3 transmitted by terminal #3 labeled 902_3” have the configuration in FIGS. 15A and 15B.

Here, the ““transmission panel antenna and parameter for beamforming of terminal #2 labeled 902_2” with high reception quality in receiving terminal #2 “sector sweep reference signal” 2401_2 transmitted by terminal #2 labeled 902_2” by base station #1 labeled 901_1 interfere with the ““transmission panel antenna and parameter for beamforming of terminal #3 labeled 902_3” with high reception quality in receiving terminal #3 “sector sweep reference signal” 2601_3 transmitted by terminal #3 labeled 902_3” by base station #1 labeled 901_1.

<Case 2-1>

In some cases, base station #1 labeled 901_1 obtains either information included in “terminal #2 “sector sweep reference signal” 2401_2 transmitted by terminal #2 labeled 902_2” or information included in “terminal #3 “sector sweep reference signal” 2601_3 transmitted by terminal #3 labeled 902_3”.

For example, base station #1 labeled 901_1 obtains the information included in “terminal #2 “sector sweep reference signal” 2401_2 transmitted by terminal #2 labeled 902_2”.

In this case, in FIG. 60A for example, “feedback signal 6001_1 for frequency ♭1 is a signal addressed to terminal #2 labeled 902_2”.

In addition, in FIG. 61A for example, “modulation signal (slot) 6101_1 for frequency ♭1 is a signal addressed to terminal #2 labeled 902_2”.

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIG. 26. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 9 receives sector sweep reference signal 1801_2 in FIG. 19 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #3 labeled 902_3, for example, estimates frequency band ♭2 as the “frequency (band)” with high reception quality and estimates “transmission panel antenna a3 and parameter b3” as the “transmission panel antenna and parameter”.

In addition, while performing such estimation, terminal #3 labeled 902_3 simultaneously obtains information of the “the number of time divisions in which sector sweep reference signals can be transmitted when the terminals transmit the sector sweep reference signals”. Terminal #3 labeled 902_3 obtains information indicating that “the number of time divisions in which sector sweep reference signals can be transmitted when the terminals transmit the sector sweep reference signals” is eight.

In this case, terminal #3 labeled 902_3 obtains, for example, any one of the values “0”, “1”, “2”, “3”, “4”, “5”, “6”, and “7” using a random number. For example, terminal #3 labeled 902_3 obtains “3” by generating a random number using seeds different from the previous. In this case, since “3”+1=4, terminal #3 labeled 902_3 transmits terminal #3 “sector sweep reference signal” 2401_3 using “terminal “sector sweep reference signal” fourth transmission period 1301_4” as in FIG. 24.

Note that terminal #3 “sector sweep reference signal” 2401_3 includes information of the “transmission panel antenna and parameter” with high reception quality obtained by terminal #3 labeled 902_3, that is, information of “transmission panel antenna a3 and parameter b3”.

In this case, as illustrated in FIG. 24, base station #1 labeled 901_1 receives “terminal #3 “sector sweep reference signal” 2401_3 transmitted by terminal #3 labeled 902_3”. Then, the predetermined procedure described above is performed, and base station #1 labeled 901_1 and terminal #3 labeled 902_3 communicate with each other.

<Case 2-2>

In some cases, base station #1 labeled 901_1 obtains neither information included in “terminal #2 “sector sweep reference signal” 2401_2 transmitted by terminal #2 labeled 902_2” nor information included in “terminal #3 “sector sweep reference signal” 2601_3 transmitted by terminal #3 labeled 902_3”.

It is assumed that sector sweep reference signal 1851_1 in FIG. 18 has the states in FIG. 26, and base station #1 labeled 901_1 obtains neither information included in “terminal #2 “sector sweep reference signal” 2401_2 transmitted by terminal #2 labeled 902_2” nor information included in “terminal #3 “sector sweep reference signal” 2601_3 transmitted by terminal #3 labeled 902_3”. In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 9 receives sector sweep reference signal 1801_2 in FIG. 19 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #2 labeled 902_2, for example, estimates frequency band ♭1 as the “frequency (band)” with high reception quality and estimates “transmission panel antenna a2 and parameter b2” as the “transmission panel antenna and parameter”.

In addition, while performing such estimation, terminal #2 labeled 902_2 simultaneously obtains information of the “the number of time divisions in which sector sweep reference signals can be transmitted when the terminals transmit the sector sweep reference signals”. Terminal #2 labeled 902_2 obtains information indicating that “the number of time divisions in which sector sweep reference signals can be transmitted when the terminals transmit the sector sweep reference signals” is eight.

In this case, terminal #2 labeled 902_2 obtains, for example, any one of the values “0”, “1”, “2”, “3”, “4”, “5”, “6”, and “7” using a random number. For example, terminal #2 labeled 902_2 obtains “5” by generating a random number using seeds different from the previous. In this case, since “5”+1=6, terminal #2 labeled 902_2 transmits terminal #2 “sector sweep reference signal” 2401_2 using “terminal “sector sweep reference signal” sixth transmission period 1301_6” as in FIG. 24.

Note that terminal #2 “sector sweep reference signal” 2401_2 includes information of the “transmission panel antenna and parameter” with high reception quality obtained by terminal #2 labeled 902_2, that is, information of “transmission panel antenna a2 and parameter b3”.

In this case, as illustrated in FIG. 24, base station #1 labeled 901_1 receives “terminal #2 “sector sweep reference signal” 2401_2 transmitted by terminal #2 labeled 902_2”. Then, the predetermined procedure described above is performed, and base station #1 labeled 901_1 and terminal #2 labeled 902_2 communicate with each other.

Likewise, terminal #3 labeled 902_3 in FIG. 9 receives sector sweep reference signal 1801_2 in FIG. 19 transmitted by base station #1 labeled 901_1, obtains the “frequency (band)”, “identification number (ID) of the transmission panel antenna”, and “identification number (ID) of the parameter used for beamforming (directivity control)” with high reception quality, and then can communicate with base station #1 labeled 901_1.

Terminal #3 labeled 902_3, for example, estimates frequency band ♭2 as the “frequency (band)” with high reception quality and estimates “transmission panel antenna a3 and parameter b3” as the “transmission panel antenna and parameter”.

In addition, while performing such estimation, terminal #3 labeled 902_3 simultaneously obtains information of the “the number of time divisions in which sector sweep reference signals can be transmitted when the terminals transmit the sector sweep reference signals”. Terminal #3 labeled 902_3 obtains information indicating that “the number of time divisions in which sector sweep reference signals can be transmitted when the terminals transmit the sector sweep reference signals” is eight.

In this case, terminal #3 labeled 902_3 obtains, for example, any one of the values “0”, “1”, “2”, “3”, “4”, “5”, “6”, and “7” using a random number. For example, terminal #3 labeled 902_3 obtains “3” by generating a random number using seeds different from the previous. In this case, since “3”+1=4, terminal #3 labeled 902_3 transmits terminal #3 “sector sweep reference signal” 2401_3 using “terminal “sector sweep reference signal” fourth transmission period 1301_4” as in FIG. 24.

Note that terminal #3 “sector sweep reference signal” 2401_3 includes information of the “transmission panel antenna and parameter” with high reception quality obtained by terminal #3 labeled 902_3, that is, information of “transmission panel antenna a3 and parameter b3”.

In this case, as illustrated in FIG. 24, base station #1 labeled 901_1 receives “terminal #3 “sector sweep reference signal” 2401_3 transmitted by terminal #3 labeled 902_3”. Then, the predetermined procedure described above is performed, and base station #1 labeled 901_1 and terminal #3 labeled 902_3 communicate with each other.

In the manner described above, a collision of the sector sweep reference signals transmitted by the respective terminals can be further reduced. This produces an effect that the base station can receive more sector sweep reference signals and can communicate with more terminals.

As described above in Embodiment 7, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 11, 12, 23, 24, 15A, 15B, 18, 19, 24, 25, 26, 60A, 60B, 61A, and 61B, but the names thereof are not limited to those in the drawings and the important part is the functions of the signals to be transmitted.

Embodiment 8

In Embodiment 8, a description will be given of an example where a base station transmits a plurality of modulation signals (a plurality of streams) to a terminal as a variation of Embodiment 6. (That is, an example of a case of performing multiple-input multiple-output (MIMO) will be described.) Note that the drawings used in Embodiments 1 to 7 are sometimes used in the following description of Embodiment 8.

FIG. 9 illustrates an exemplary communication state in Embodiment 8. Note that the detail has already been described and the description will be thus omitted.

FIG. 27 illustrates an example of modulation signal 2700 transmitted by base station #1 labeled 901_1 in FIG. 9. Note that the components that operate in the same manner as in FIG. 10 are denoted by the same reference signs, and the descriptions thereof will be omitted.

In the time period from time t0 to t1, sector sweep reference signal 1001 is present.

The time period from time t1 to t2 is a terminal response period.

In the time period from time t2 to t3, feedback signal group 2702 is present. Note that feedback signal group 2702 will be described later.

In the time period from time t4 to t5, data-symbol-included frame group 2703 is present. Note that data-symbol-included frame group 2703 will be described later.

The configuration of base station #1 labeled 901_1 in FIG. 9 is the configuration in FIG. 1A, 1B, or 1C as described in the other embodiments, and base station #1 labeled 901_1 with the configuration in FIG. 1A, 1B, or 1C includes the configuration in FIG. 3 as transmission panel antenna xi labeled 106_*xi*. Note that the configuration of base station #1 labeled 901_1 is not limited to the configuration in FIG. 1A, 1B, or 1C, and the configuration of transmission panel antenna xi labeled 106_*xi* included in base station #1 labeled 901_1 with the configuration in FIG. 1A, 1B, or 1C is not limited to the configuration in FIG. 3.

FIG. 11 illustrates examples of sector sweep reference signal 1001 in FIG. 23 transmitted by base station #1 in FIG. 9. Note that the operation in FIG. 11 has already been described and the description thereof will be thus omitted.

FIG. 12 illustrates an exemplary configuration of "sector sweep reference signal 1101_*i* in transmission panel antenna i" in FIG. 11. Note that the operation in FIG. 12 has already been described and the description thereof will be thus omitted.

FIG. 58 illustrates an exemplary operation in the time period from time t1 to t2, which is the terminal response period. Note that the operation in FIG. 58 has already been described and the description thereof will be thus omitted.

FIG. 59A illustrates an exemplary configuration, in time and frequency, of terminal "sector sweep reference signal" 5801_1 illustrated in FIG. 58. Note that the horizontal axis represents time and the vertical axis represents frequency in FIG. 59A.

As illustrated in FIG. 59A, "terminal "sector sweep reference signal" 5801_1 includes areas for "sector sweep reference signal" 5901_1 for frequency ♭1, "sector sweep reference signal" 5901_2 for frequency ♭2, "sector sweep reference signal" 5901_3 for frequency ♭3, "sector sweep reference signal" 5901_4 for frequency ♭4, "sector sweep reference signal" 5901_5 for frequency ♭5, "sector sweep reference signal" 5901_6 for frequency ♭6, "sector sweep reference signal" 5901_7 for frequency ♭7, . . . , "sector sweep reference signal" 5901_K for frequency ♭K".

Thus, in the case of FIG. 59A, "the number of frequency divisions in which sector sweep reference signals can be transmitted when the terminals transmit the sector sweep reference signals" is set to K by base station #1 labeled 901_1.

For example, terminal #1 labeled 902_1 in FIG. 9 desires to receive a plurality of modulation signals from base station #1 labeled 901_1. Here, terminal #1 labeled 902_1 in FIG. 9 desires to receive two modulation signals from base station #1 labeled 901_1. In this case, terminal #1 labeled 902_1 in FIG. 9 receives sector sweep reference signal 1001 transmitted by base station #1 labeled 901_1 and estimates two "transmission panel antennas and parameter numbers" with high reception quality from transmission panel antennas of base station #1 labeled 901_1.

At this time, those two "transmission panel antennas and parameter numbers" with high reception quality are respectively referred to as the first "transmission panel antenna and parameter number" and the second "transmission panel antenna and parameter number". Further, a "transmission panel antenna of the first "transmission panel antenna and parameter number"" is different from a "transmission panel antenna of the second "transmission panel antenna and parameter number"".

In this case, terminal #1 labeled 902_1 in FIG. 9 selects a first frequency (band) as well as the first "transmission panel antenna and parameter number". Terminal #1 labeled 902_1 in FIG. 9 also selects a second frequency (band) as well as the second "transmission panel antenna and parameter number". Note that the first frequency (band) and the second frequency (band) may be the same, may be different, or may partially overlap each other.

Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. To be more specific, the above operation is performed by base station #1 labeled 901_1 transmitting a sector sweep reference signal in FIG. 11 and terminal #1 labeled 902_1 receiving the sector sweep reference signal in FIG. 11.

Terminal #1 labeled 902_1 estimates, for example, "transmission panel antenna a1_1 and parameter b1_1" and "transmission panel antenna a1_2 and parameter b1_2" as the two "transmission panel antennas and parameter numbers" with high reception quality.

(Note that, in the following description with reference to FIGS. 64A, 64B, 65A, 65B, etc., "transmission panel antenna a1_1" is transmission panel antenna 1 labeled 106_1 (of base station #1 labeled 901_1) in FIGS. 1A, 1B, and 1C, and "transmission panel antenna a1_2" is transmission panel antenna 2 labeled 106_2 (of base station #1 labeled 901_1) in FIGS. 1A, 1B, and 1C.) (In addition, a frequency (band) is estimated as well as "transmission panel antenna a1_1 and parameter b1_1". Likewise, a frequency (band) is estimated as well as "transmission panel antenna a1_2 and parameter b1_2".)

Note that terminal #1 "sector sweep reference signal" 5911_1 includes information of the "transmission panel antennas and parameters" with high reception quality obtained by terminal #1 labeled 902_1, that is, information of "transmission panel antenna a1_1 and parameter b1_1" and information of "transmission panel antenna a1_2 and parameter b1_2". Sector sweep reference signal 5911_1 may include request information, of terminal #1 labeled 902_1, of "the number of modulation signals (streams) desired to be transmitted by base station #1 labeled 901_1" (here, "2"). Further, terminal #1 "sector sweep reference signal" 5911_1 includes information of the frequency (band) corresponding to the information of "transmission panel antenna a1_1 and parameter b1_1" (here, frequency band ♭K) and information of the frequency (band) corresponding to the information of "transmission panel antenna a1_2 and parameter b1_2" (here, frequency band ♭K).

Information included in sector sweep reference signals transmitted by the other terminals and the transmission states have already been described with reference to FIG. 59B in other embodiments, and the description thereof will be thus omitted. Note that the sector sweep reference signals transmitted by the other terminals may include the request information of "the number of modulation signals (streams) desired to be transmitted by base station #1 labeled 901_1". For example, when "the number of modulation signals (streams) desired to be transmitted by base station #1 labeled 901_1" is "1", this information is included. ("The number of modulation signals (streams) desired to be transmitted by base station #1 labeled 901_1" is set to a number equal to or greater than "1").

In the manner described above, a collision of the sector sweep reference signals transmitted by the respective terminals can be reduced. This produces an effect that the base station can receive more sector sweep reference signals and can communicate with more terminals. The above operation also allows the base station to transmit one or a plurality of modulation signals (streams) to each terminal.

A description will be given of a configuration of terminal #i "sector sweep reference signal" 5911_*i* transmitted by terminal #i labeled 902_*i* described with reference to FIG. 59B. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

For example, terminal #i labeled 902_*i* with the configuration in FIG. 1A, 1B, or 1C transmits terminal #i "sector sweep reference signal" 5911_*i* as illustrated in FIG. 59B. The configuration of terminal #i "sector sweep reference signal" 5911_*i* and the information included in the signal have already been described with reference to FIGS. 15A and 15B in other embodiments, and the description thereof will be thus omitted.

A plurality of cases will be described in the following.

<Case 1>

Figure 64A:
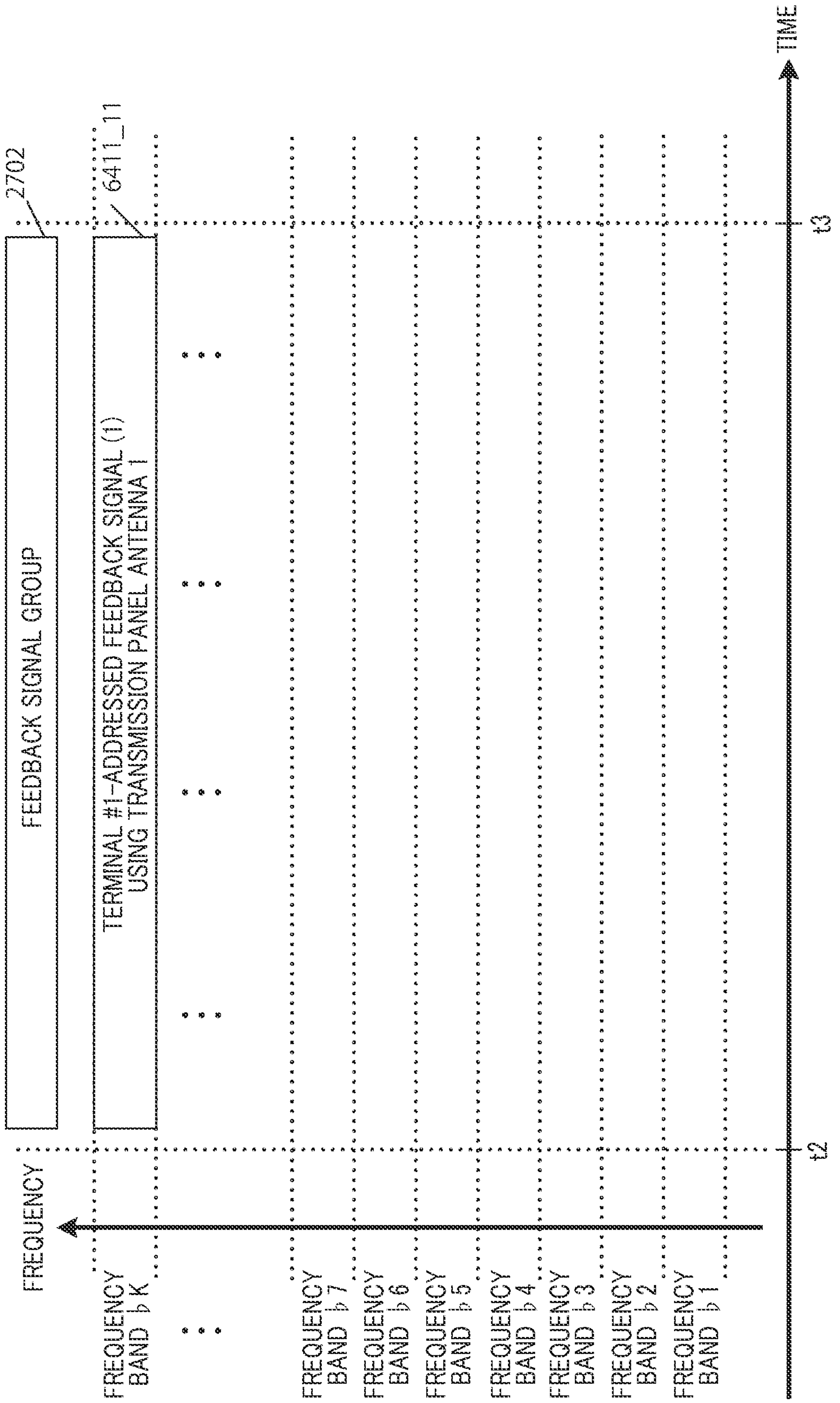
FIG. 64A illustrates the eighth example of the configuration of the feedback signal group that is present in the time period from t2 to t3 in FIG. 27 and transmitted by base station #1.
Figure 64B:
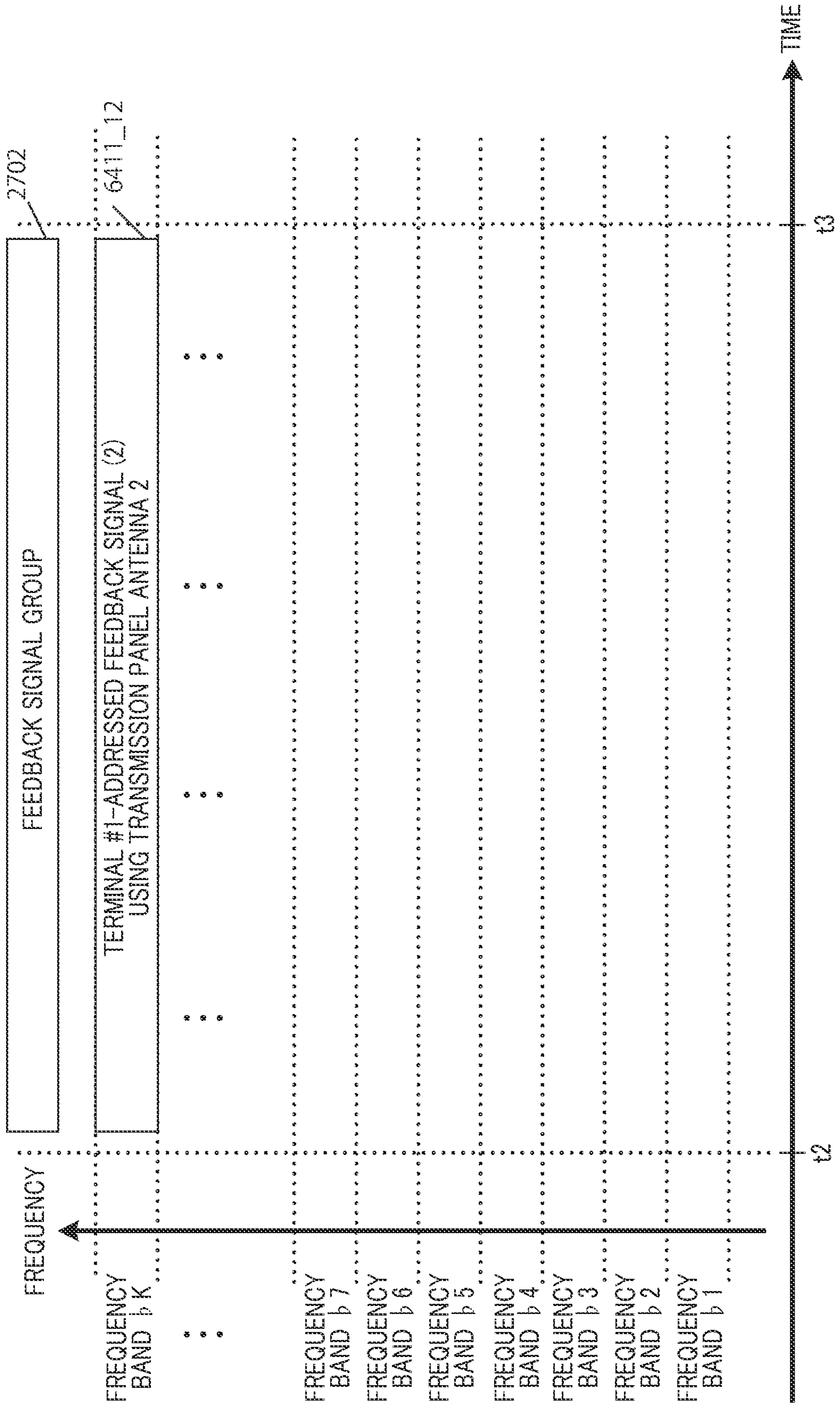
FIG. 64B illustrates the eighth example of the configuration of the feedback signal group that is present in the time period from t2 to t3 in FIG. 27 and transmitted by base station #1.

FIGS. 64A and 64B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 64A and 64B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 64A and 64B, there are frequency band ♭1, frequency band ♭2, . . . , frequency band ♭K for feedback signal group 2702, as in FIG. 60A.

Note that FIGS. 64A and MB illustrate only feedback signals addressed to terminal #1 labeled 902_1. Although not illustrated in FIGS. 64A and MB, there may be a feedback signal addressed to a terminal other than terminal #1 labeled 902_1.

In this example, feedback signal group 2702 includes terminal #1-addressed feedback signal (1) labeled 6411_11 present in frequency band ♭K as illustrated in FIG. 64A and terminal #1-addressed feedback signal (2) labeled 6411_12 present in frequency band ♭K as illustrated in FIG. 64B.

Note that the term "feedback signal group" is used in the description because feedback signals transmitted from transmission panel antenna 1 labeled 106_1 can be present, feedback signals transmitted from transmission panel antenna 2 labeled 106_2 can be present, feedback signals transmitted from transmission panel antenna 3 labeled 106_3 can be present, and feedback signals transmitted from transmission panel antenna 4 labeled 106_4 can be present, in the same frequency band and the same transmission period.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed feedback signal (1) labeled 6411_11" present in frequency band ♭K as illustrated in FIG. 64A and "terminal #1-addressed feedback signal (2) labeled 6411_12" present in frequency band ♭K as illustrated in FIG. 64B. At this time, "terminal #1-addressed feedback signal (1) labeled 6411_11" is transmitted from transmission panel antenna 1 labeled 106_1 of base station #1 labeled 901_1, and "terminal #1-addressed feedback signal (2) labeled 6411_12" is transmitted from transmission panel antenna 2 labeled 106_2 of base station #1 labeled 901_1.

As described above, "terminal #1-addressed feedback signal (1) labeled 6411_11" and "terminal #1-addressed feedback signal (2) labeled 6411_12" are present because "base station #1 labeled 901_1 transmits two modulation signals (streams) to terminal #1 labeled 902_1".

At this time. "terminal #1-addressed feedback signal (1) labeled 6411_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 6411_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6411_11" present in frequency band ♭K as illustrated in FIG. 64A and "terminal #1-addressed feedback signal (2) labeled 6411_12" present in frequency band ♭K as illustrated in FIG. 64B.

Further, there may be a feedback signal addressed to a terminal other than terminal #1 labeled 902_1 in FIGS. 64A and 64B (see FIG. 60B, for example).

The above example has described the case where base station #1 labeled 901_1 transmits, to terminal #1 labeled 902_1, "terminal #1-addressed feedback signal (1) labeled 6411_11" and "terminal #1-addressed feedback signal (2) labeled 6411_12" as illustrated in FIGS. 64A and MB, but base station #1 labeled 901_1 may transmit three or more feedback signals to terminal #1 labeled 902_1.

Figure 65A:
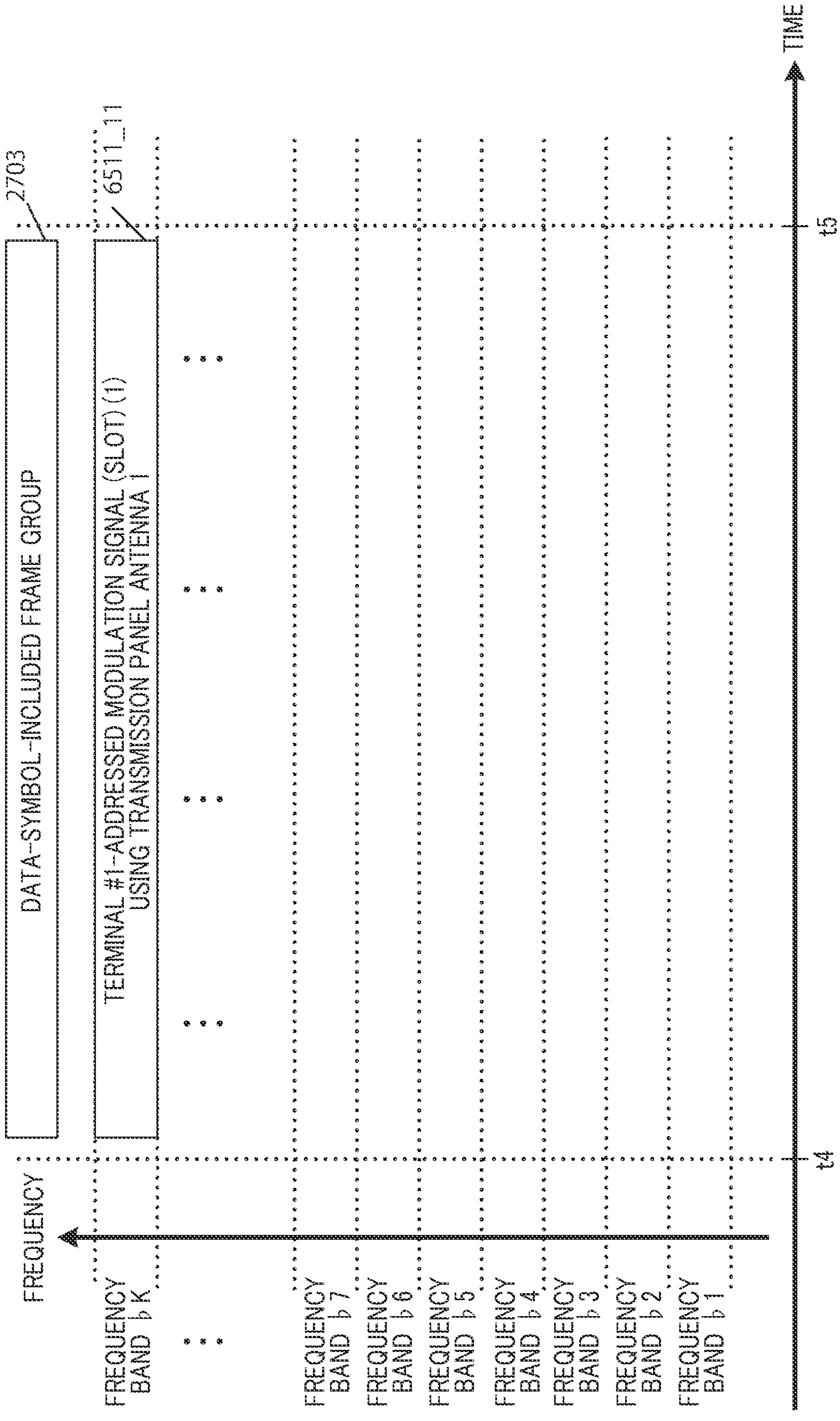
FIG. 65A illustrates the eighth example of the configuration of the data-symbol-included frame group that is present in the time period from t4 to t5 in FIG. 27 and transmitted by base station #1.
Figure 65B:
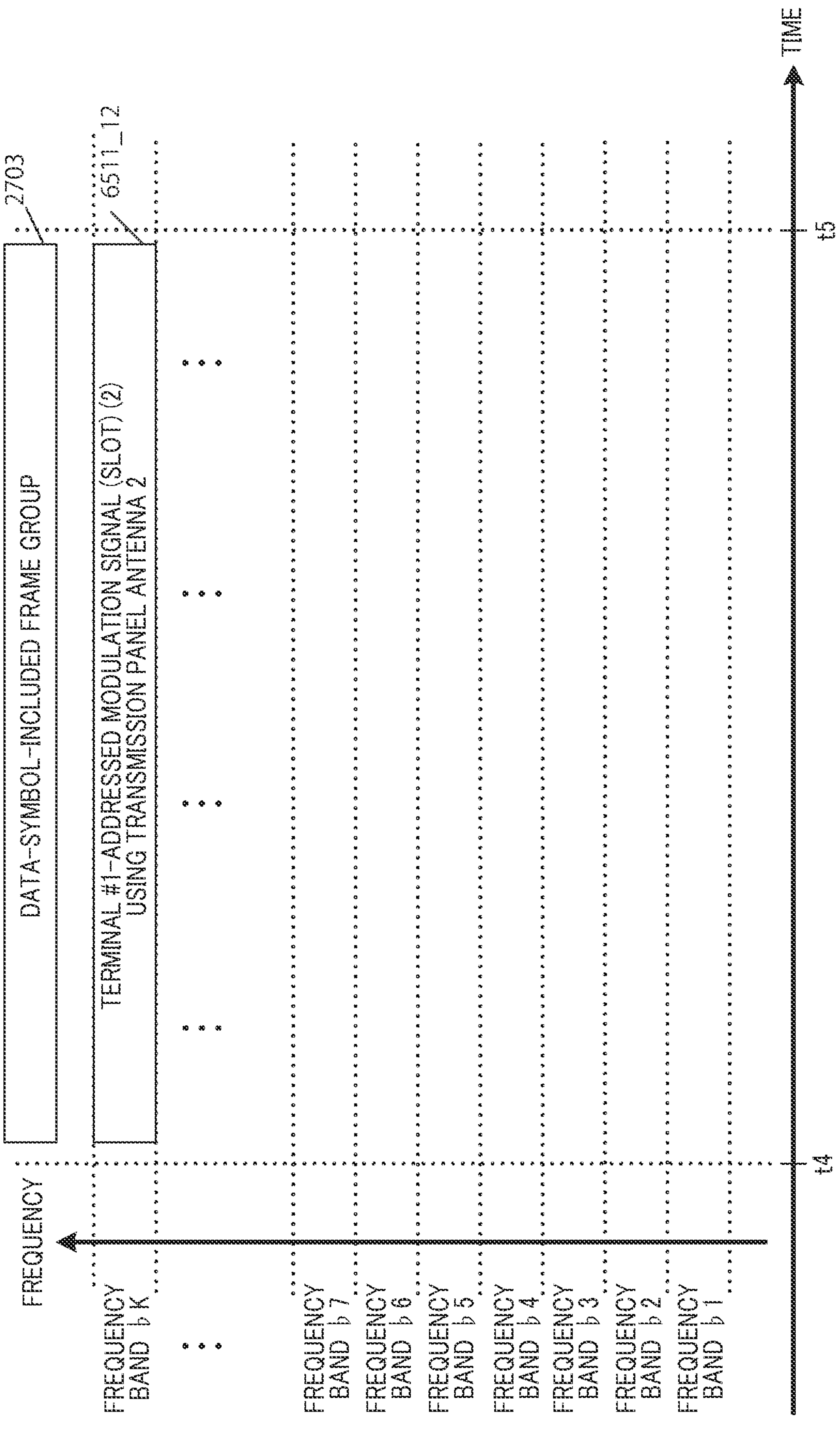
FIG. 65B illustrates the eighth example of the configuration of the data-symbol-included frame group that is present in the time period from t4 to t5 in FIG. 27 and transmitted by base station #1.

FIGS. 65A and 65B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 65A and 65B. In FIGS. 65A and 65B, there are frequency band ♭1, frequency band ♭2, . . . , frequency band ♭K for data-symbol-included frame group 2703, as in FIG. 61A.

Note that FIGS. 65A and 65B illustrate only modulation signals (slots) addressed to terminal #1 labeled 902_1. Although not illustrated in FIGS. 65A and 65B, there may be a modulation signal (slot) addressed to a terminal other than terminal #1 labeled 902_1.

In this example, data-symbol-included frame group 2703 includes terminal #1-addressed modulation signal (slot) (1) labeled 6511_11 present in frequency band ♭K as illustrated in FIG. 65A and terminal #1-addressed modulation signal (slot) (2) labeled 6511_12 present in frequency band ♭K as illustrated in FIG. 65B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed modulation signal (slot) (1) labeled 6511_11" present in frequency band ♭K as illustrated in FIG. 65A and "terminal #1-addressed modulation signal (slot) (2) labeled 6511_12" present in frequency band ♭K as illustrated in FIG. 65B. At this time, "terminal #1-addressed modulation signal (slot) (1) labeled 6511_11" is transmitted from transmission panel antenna 1 labeled 106_1 of base station #1 labeled 901_1, and "terminal #1-addressed modulation signal (slot) (2) labeled 6511_12" is transmitted from transmission panel antenna 2 labeled 106_2 of base station #1 labeled 901_1.

As described above, "terminal #1-addressed modulation signal (slot) (1) labeled 6511_11" and "terminal #1-addressed modulation signal (slot) (2) labeled 6511_12" are present because "base station #1 labeled 901_1 transmits two modulation signals (streams) to terminal #1 labeled 902_1".

At this time, "terminal #1-addressed modulation signal (slot) (1) labeled 6511_11" includes, for example, a data symbol (data and/or information) addressed to terminal #1 labeled 902_1.

In addition, "terminal #1-addressed modulation signal (slot) (2) labeled 6511_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6511_11" present in frequency band ♭K as illustrated in FIG. 65A and "terminal #1-addressed modulation signal (slot) (2) labeled 6511_12" present in frequency band ♭K as illustrated in FIG. 65B.

Further, there may be a modulation signal (slot) addressed to a terminal other than terminal #1 labeled 902_1 in FIGS. 65A and 65B (see FIG. 61B, for example).

The above example has described the case where base station #1 labeled 901_1 transmits, to terminal #1 labeled 902_1, "terminal #1-addressed modulation signal (slot) (1) labeled 6511_11" and "terminal #1-addressed modulation signal (slot) (2) labeled 6511_12" as illustrated in FIGS. 65A and 65B, but base station #1 labeled 901_1 may transmit three or more modulation signals (slots) (a plurality of modulation signals (slots) using the same frequency resource) to terminal #1 labeled 902_1.

Note that "terminal #1-addressed modulation signal (slot) (1) labeled 6511_11" and "terminal #1-addressed modulation signal (slot) (2) labeled 6511_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 2>

Figure 66A:
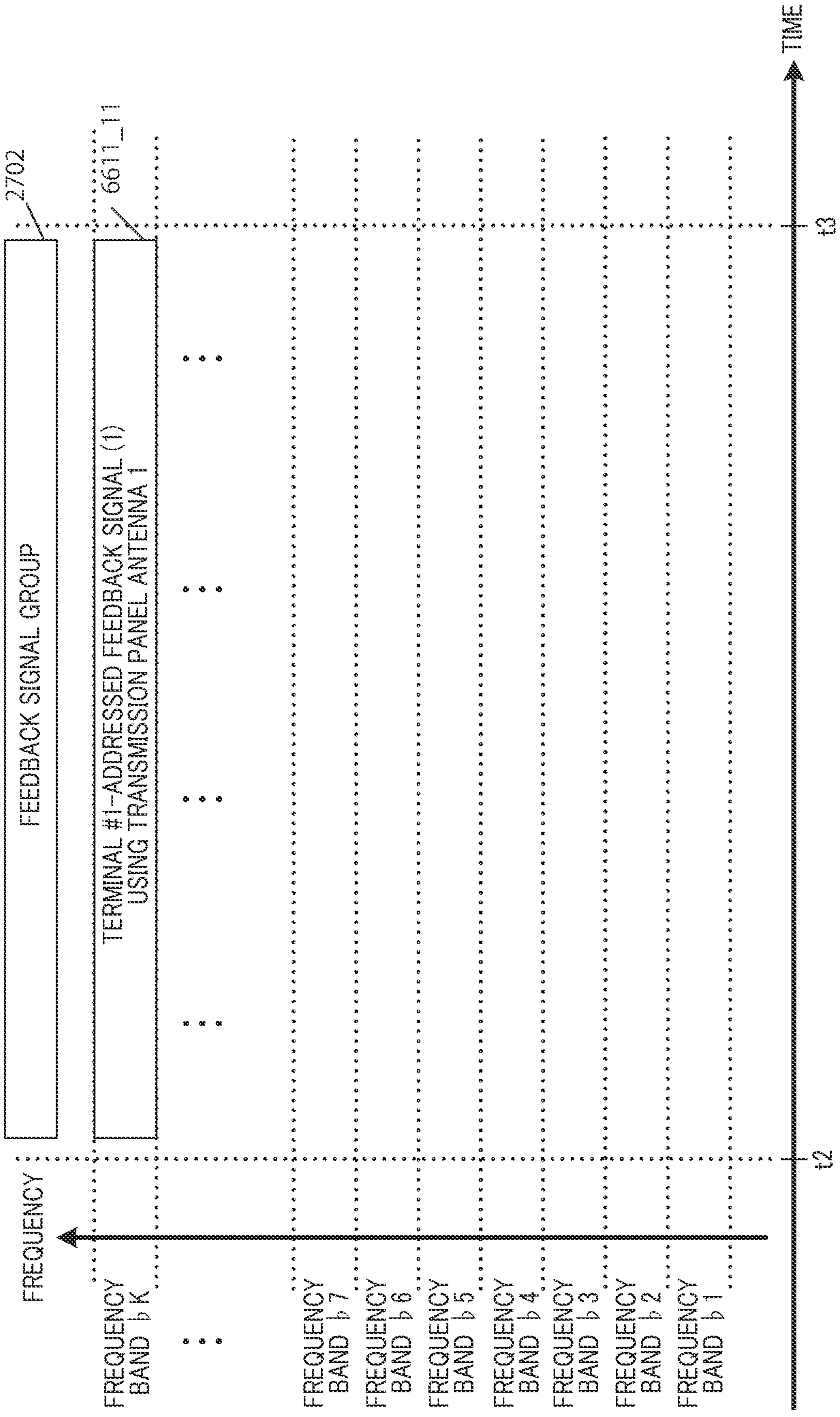
FIG. 66A illustrates the ninth example of the configuration of the feedback signal group that is present in the time period from t2 to t3 in FIG. 27 and transmitted by base station #1.
Figure 66B:
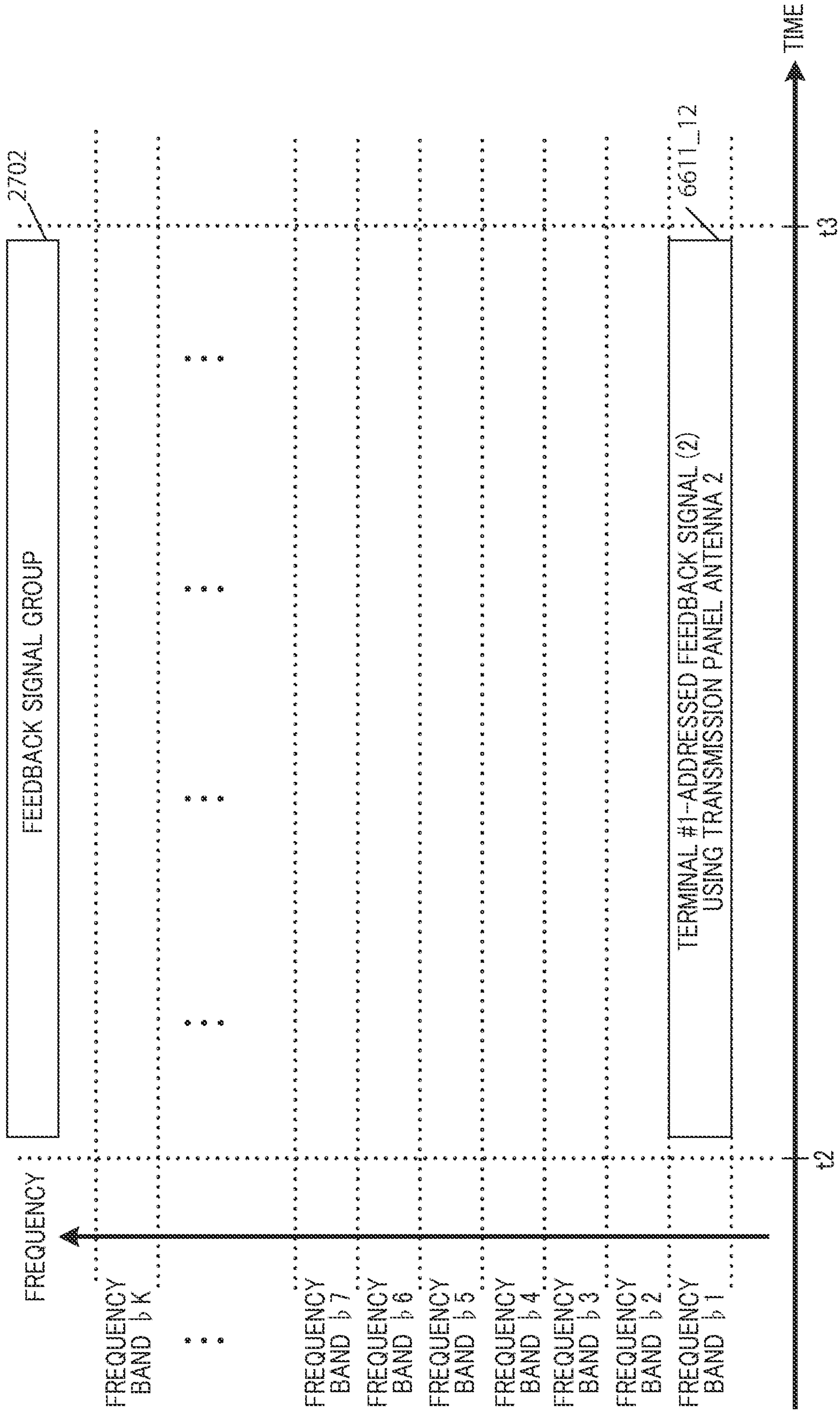
FIG. 66B illustrates the ninth example of the configuration of the feedback signal group that is present in the time period from t2 to t3 in FIG. 27 and transmitted by base station #1.

FIGS. 66A and 66B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 66A and 66B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 66A and 66B, there are frequency band ♭1, frequency band ♭2, . . . , frequency band ♭K for feedback signal group 2702, as in FIG. 60A.

Note that FIGS. 66A and 66B illustrate only feedback signals addressed to terminal #1 labeled 902_1. Although not illustrated in FIGS. 66A and 66B, there may be a feedback signal addressed to a terminal other than terminal #1 labeled 902_1.

In this example, feedback signal group 2702 includes terminal #1-addressed feedback signal (1) labeled 6611_11 present in frequency band ♭K as illustrated in FIG. 66A and terminal #1-addressed feedback signal (2) labeled 6611_12 present in frequency band ♭1 as illustrated in FIG. 66B.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed feedback signal (1) labeled 6611_11" present in frequency band ♭K as illustrated in FIG. 66A and "terminal #1-addressed feedback signal (2) labeled 6611_12" present in frequency band ♭1 as illustrated in FIG. 66B. At this time, "terminal #1-addressed feedback signal (1) labeled 6611_11" is transmitted from transmission panel antenna 1 labeled 106_1 of base station #1 labeled 901_1, and "terminal #1-addressed feedback signal (2) labeled 6611_12" is transmitted from transmission panel antenna 2 labeled 106_2 of base station #1 labeled 901_1.

As described above, "terminal #1-addressed feedback signal (1) labeled 6611_11" and "terminal #1-addressed feedback signal (2) labeled 6611_12" are present because "base station #1 labeled 901_1 transmits two modulation signals (streams) to terminal #1 labeled 902_1".

At this time, "terminal #1-addressed feedback signal (1) labeled 6611_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 6611_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6611_11" present in frequency band ♭K as illustrated in FIG. 66A and "terminal #1-addressed feedback signal (2) labeled 6611_12" present in frequency band ♭1 as illustrated in FIG. 66B.

Further, there may be a feedback signal addressed to a terminal other than terminal #1 labeled 902_1 in FIGS. 66A and 66B (see FIG. 60B, for example).

The above example has described the case where base station #1 labeled 901_1 transmits, to terminal #1 labeled 902_1, "terminal #1-addressed feedback signal (1) labeled 6611_11" and "terminal #1-addressed feedback signal (2) labeled 6611_12" as illustrated in FIGS. 66A and 66B, but base station #1 labeled 901_1 may transmit three or more feedback signals to terminal #1 labeled 902_1.

Figure 67A:
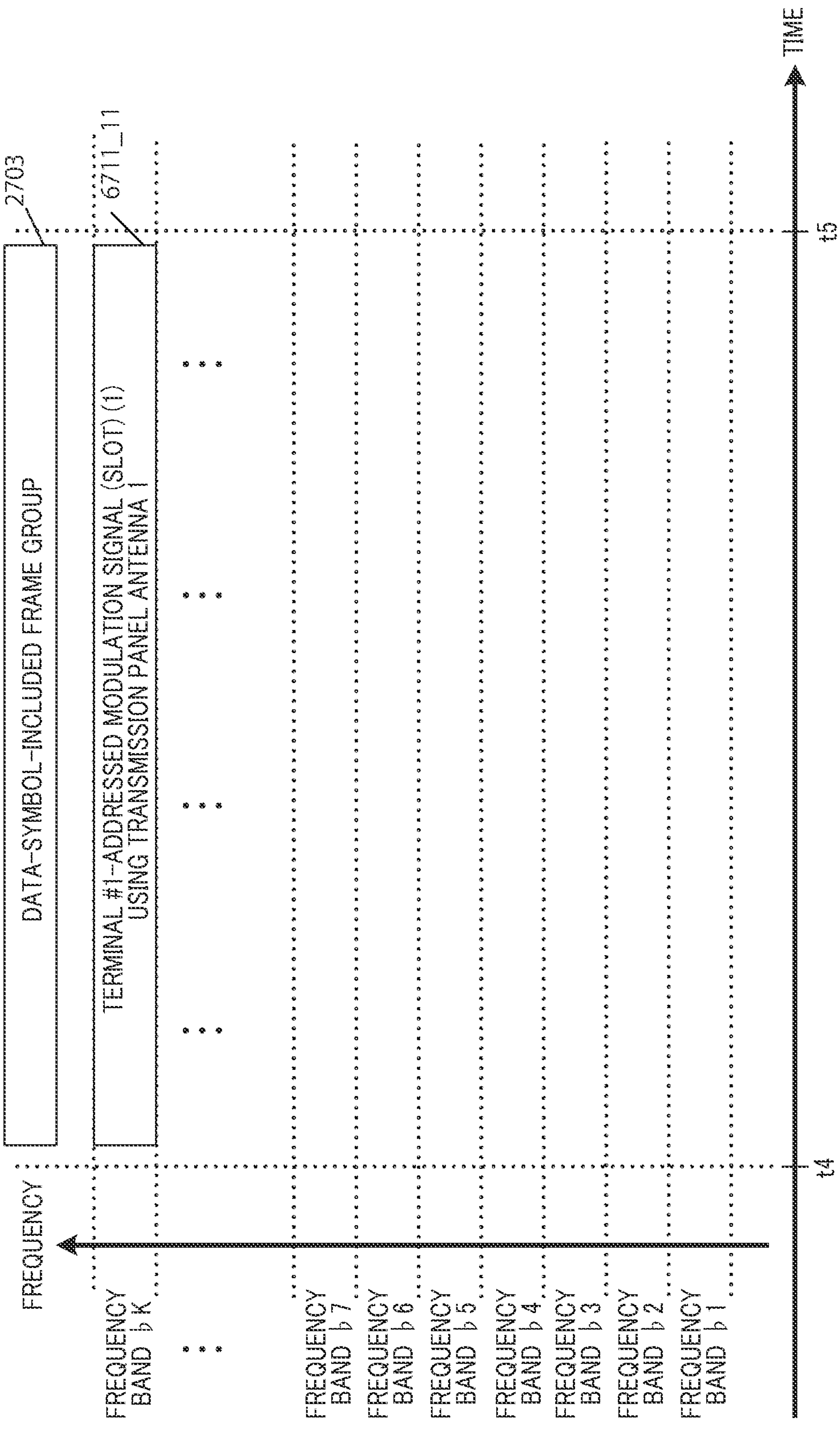
FIG. 67A illustrates the ninth example of the configuration of the data-symbol-included frame group that is present in the time period from t4 to t5 in FIG. 27 and transmitted by base station #1.
Figure 67B:
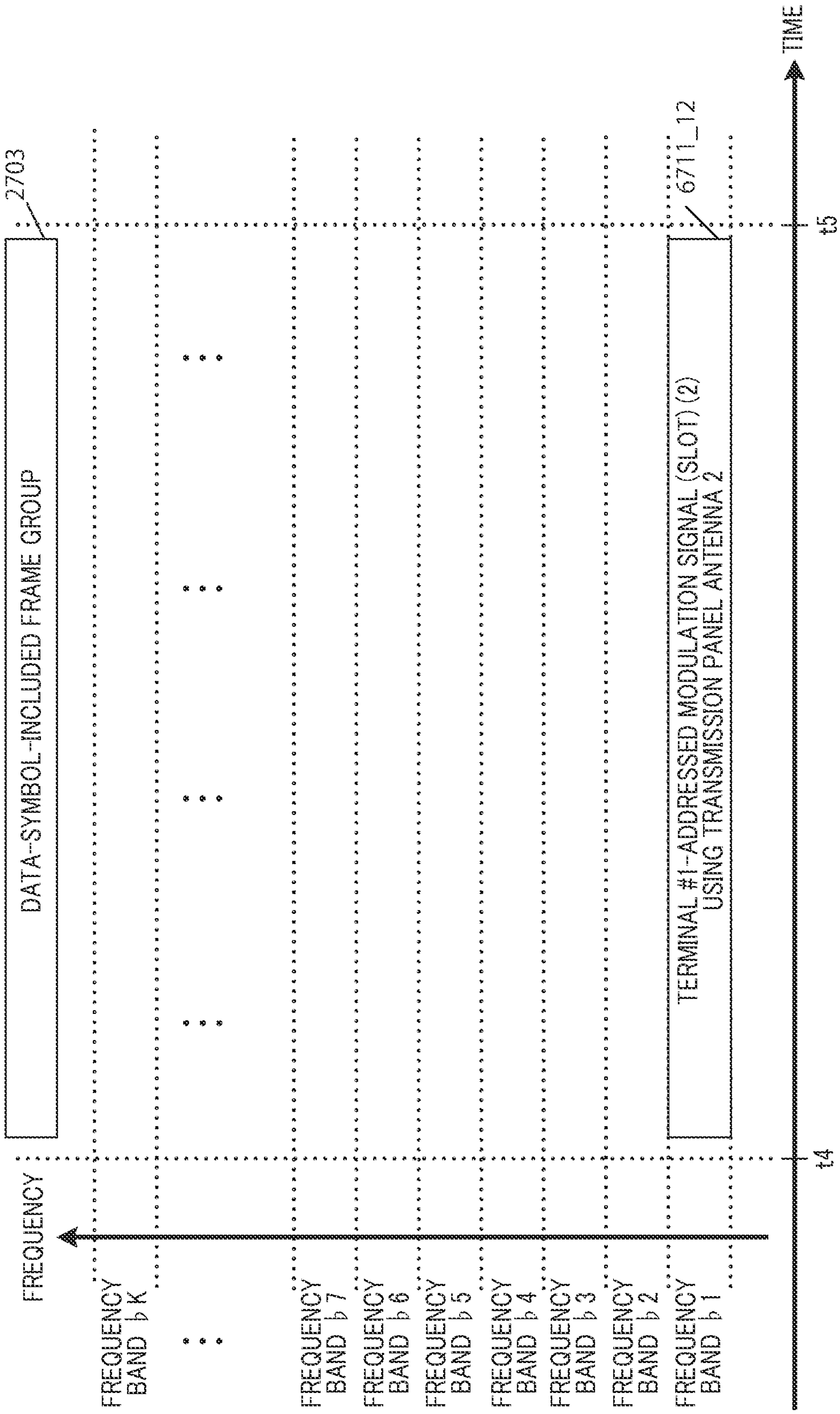
FIG. 67B illustrates the ninth example of the configuration of the data-symbol-included frame group that is present in the time period from t4 to t5 in FIG. 27 and transmitted by base station #1.

FIGS. 67A and 67B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 67A and 67B. In FIGS. 67A and 67B, there are frequency band ♭1, frequency band ♭2, . . . , frequency band ♭K for data-symbol-included frame group 2703, as in FIG. 61A.

Note that FIGS. 67A and 67B illustrate only modulation signals (slots) addressed to terminal #1 labeled 902_1. Although not illustrated in FIGS. 67A and 67B, there may be a modulation signal (slot) addressed to a terminal other than terminal #1 labeled 902_1.

In this example, data-symbol-included frame group 2703 includes terminal #1-addressed modulation signal (slot) (1) labeled 6711_11 present in frequency band ♭K as illustrated in FIG. 67A and terminal #1-addressed modulation signal (slot) (2) labeled 6711_12 present in frequency band ♭1 as illustrated in FIG. 67B.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed modulation signal (slot) (l) labeled 6711_11" present in frequency band ♭K as illustrated in FIG. 67A and "terminal #1-addressed modulation signal (slot) (2) labeled 6711_12" present in frequency band ♭1 as illustrated in FIG. 67B. At this time, "terminal #1-addressed modulation signal (slot) (1) labeled 6711_11" is transmitted from transmission panel antenna 1 labeled 106_1 of base station #1 labeled 901_1, and "terminal #1-addressed modulation signal (slot) (2) labeled 6711_12" is transmitted from transmission panel antenna 2 labeled 106_2 of base station #1 labeled 901_1.

As described above, "terminal #1-addressed modulation signal (slot) (1) labeled 6711_11" and "terminal #1-addressed modulation signal (slot) (2) labeled 6711_12" are present because "base station #1 labeled 901_1 transmits two modulation signals (streams) to terminal #1 labeled 902_1".

At this time, "terminal #1-addressed modulation signal (slot) (1) labeled 6711_11" includes, for example, a data symbol (data and/or information) addressed to terminal #1 labeled 902_1.

In addition, "terminal #1-addressed modulation signal (slot) (2) labeled 6711_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6711_11" present in frequency band ♭K as illustrated in FIG. 67A and "terminal #1-addressed modulation signal (slot) (2) labeled 6711_12" present in frequency band ♭1 as illustrated in FIG. 67B.

Further, there may be a modulation signal (slot) addressed to a terminal other than terminal #1 labeled 902_1 in FIGS. 67A and 67B (see FIG. 61B, for example).

The above example has described the case where base station #1 labeled 901_1 transmits, to terminal #1 labeled 902_1, "terminal #1-addressed modulation signal (slot) (1) labeled 6711_11" and "terminal #1-addressed modulation signal (slot) (2) labeled 6711_12" as illustrated in FIGS. 67A and 67B, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 6711_11" and "terminal #1-addressed modulation signal (slot) (2) labeled 6711_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case 3>

Figure 68:
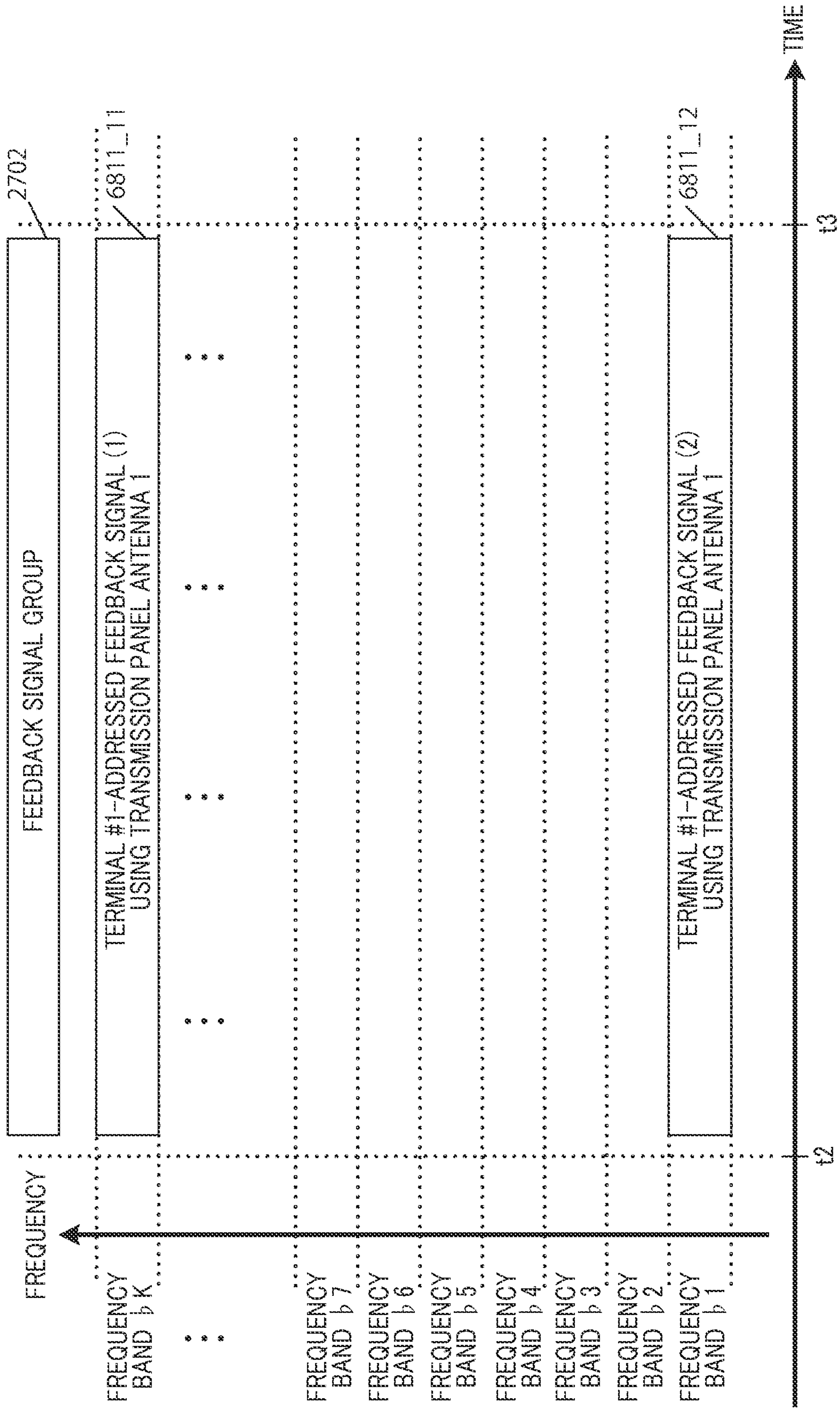
FIG. 68 illustrates the tenth example of the configuration of the feedback signal group that is present in the time period from t2 to t3 in FIG. 27 and transmitted by base station #1.

FIG. 68 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 68. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 68, there are frequency band ♭1, frequency band ♭2, . . . , frequency band ♭K for feedback signal group 2702, as in FIG. 60A.

Note that FIG. 68 illustrates only feedback signals addressed to terminal #1 labeled 902_1. Although not illustrated in FIG. 68, there may be a feedback signal addressed to a terminal other than terminal #1 labeled 902_1.

In this example, feedback signal group 2702 includes terminal #1-addressed feedback signal (1) labeled 6811_11 present in frequency band ♭K and terminal #1-addressed feedback signal (2) labeled 6811_12 present in frequency band ♭1 as illustrated in FIG. 68.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed feedback signal (1) labeled 6811_11" present in frequency band ♭K and "terminal #1-addressed feedback signal (2) labeled 6811_12" present in frequency band ♭1 as illustrated in FIG. 68. At this time, both "terminal #1-addressed feedback signal (1) labeled 6811_11" and "terminal #1-addressed feedback signal (2) labeled 6811_12" are transmitted from transmission panel antenna 1 labeled 106_1 of base station #1 labeled 901_1, which means that a single transmission panel antenna has been selected.

As described above, "terminal #1-addressed feedback signal (1) labeled 6811_11" and "terminal #1-addressed feedback signal (2) labeled 6811_12" are present because "base station #1 labeled 901_1 transmits two resources (slots) to terminal #1 labeled 902_1".

At this time, "terminal #1-addressed feedback signal (1) labeled 6811_11" and "terminal #1-addressed feedback signal (2) labeled 6811_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6811_11" present in frequency band ♭K and "terminal #1-addressed feedback signal (2) labeled 6811_12" present in frequency band b1 as illustrated in FIG. 68.

Further, there may be a feedback signal addressed to a terminal other than terminal #1 labeled 902_1 in FIG. 68 (see FIG. 608, for example).

The above example has described the case where base station #1 labeled 901_1 transmits, to terminal #1 labeled 902_1, "terminal #1-addressed feedback signal (1) labeled 6811_11" and "terminal #1-addressed feedback signal (2) labeled 6811_12" as illustrated in FIG. 68, but base station #1 labeled 901_1 may transmit three or more feedback signals to terminal #1 labeled 902_1.

Figure 69:
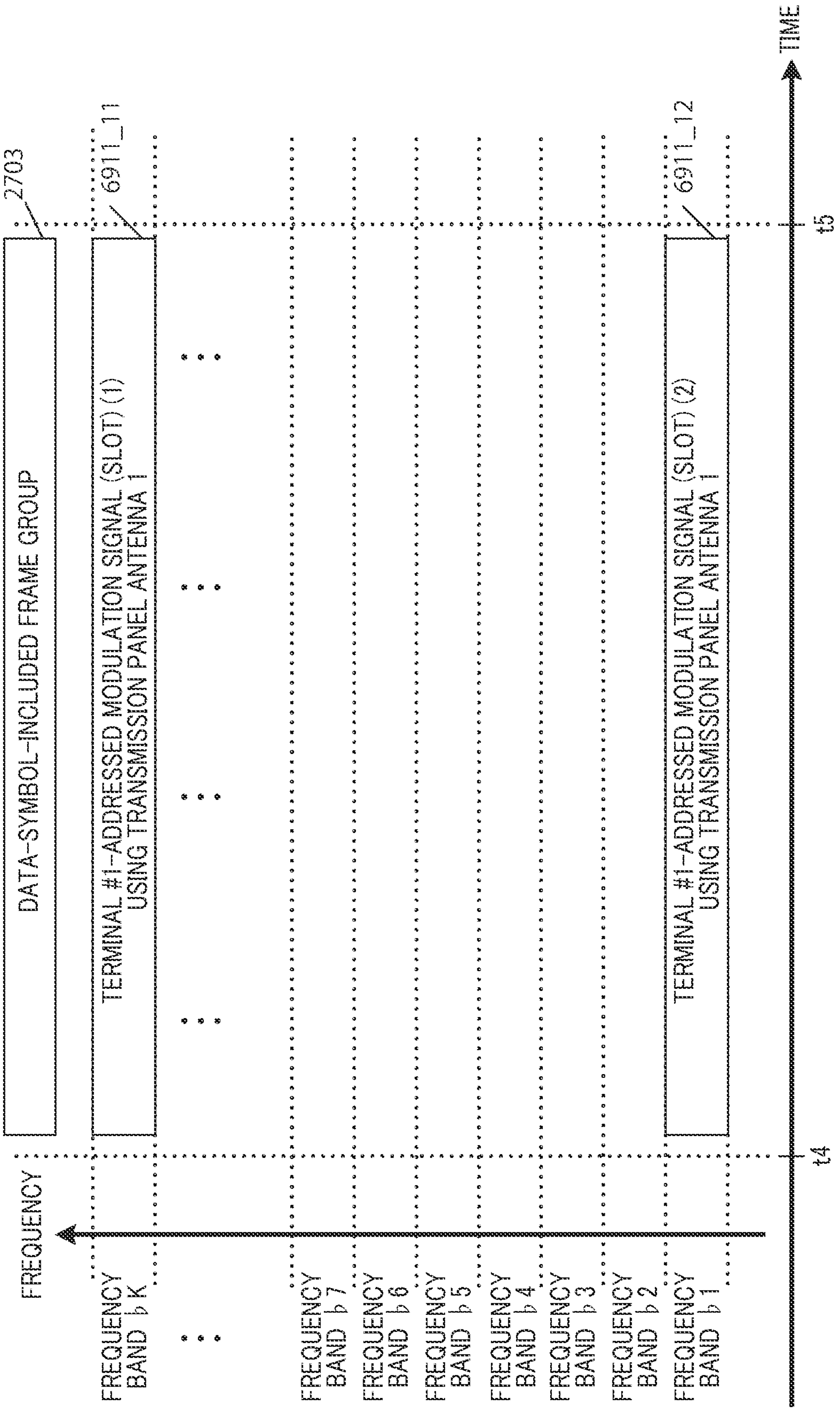
FIG. 69 illustrates the tenth example of the configuration of the data-symbol-included frame group that is present in the time period from t4 to t5 in FIG. 27 and transmitted by base station #1.

FIG. 69 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 69. In FIG. 69, there are frequency band ♭1, frequency band ♭2, . . . , frequency band ♭K for data-symbol-included frame group 2703, as in FIG. 61A.

Note that FIG. 69 illustrates only modulation signals (slots) addressed to terminal #1 labeled 902_1. Although not illustrated in FIG. 69, there may be a modulation signal (slot) addressed to a terminal other than terminal #1 labeled 902_1.

In this example, data-symbol-included frame group 2703 includes terminal #1-addressed modulation signal (slot) (1) labeled 6911_11 present in frequency band ♭K and terminal #1-addressed modulation signal (slot) (2) labeled 6911_12 present in frequency band ♭1 as illustrated in FIG. 69.

For example, when terminal #1 labeled 902_1 transmits terminal #1 "sector sweep reference signal" 5911_1 as illustrated in FIG. 59B, base station #1 labeled 901_1 transmits, to terminal #1 labeled 902_1, "terminal #1-addressed modulation signal (slot) (1) labeled 6911_11" present in frequency band ♭K and "terminal #1-addressed modulation signal (slot) (2) labeled 6911_12" present in frequency band ♭1 as illustrated in FIG. 69. At this time, "terminal #1-addressed modulation signal (slot) (1) labeled 6911_11" and "terminal #1-addressed modulation signal (slot) (2) labeled 6911_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 6911_11" and "terminal #1-addressed modulation signal (slot) (2) labeled 6911_12" are present because "base station #1 labeled 901_1 transmits two resources (slots) to terminal #1 labeled 902_1".

At this time, "terminal #1-addressed modulation signal (slot) (1) labeled 6911_11" and "terminal #1-addressed modulation signal (slot) (2) labeled 6911_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6911_11" present in frequency band ♭K and "terminal #1-addressed modulation signal (slot) (2) labeled 6911_12" present in frequency band ♭1 as illustrated in FIG. 69.

Further, there may be a modulation signal (slot) addressed to a terminal other than terminal #1 labeled 902_1 in FIG. 69 (see FIG. 61B, for example).

The above example has described the case where base station #1 labeled 901_1 transmits, to terminal #1 labeled 902_1, "terminal #1-addressed modulation signal (slot) (1) labeled 6911_11" and "terminal #1-addressed modulation signal (slot) (2) labeled 6911_12" as illustrated in FIG. 69, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 6911_11" and "terminal #1-addressed modulation signal (slot) (2) labeled 6911_12" may each include, in addition to the data symbol, a "reference signal such as DMRS, PTRS, or SRS", a pilot symbol, a pilot signal, a preamble, and a symbol including control information, for example.

Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

As described thus far, transmitting modulation signals according to <Case 1> to <Case 3>, for example, reduces interference between the modulation signals, and efficiently assigning the modulation signals and slots produces an effect of enhancing data transmission efficiency.

Note that the base station and the terminals may perform communication according to any of the methods of <Case 1> to <Case 3>, and the base station and the terminals may perform communication selecting any of the communication methods of <Case 1> to <Case 3> depending on the radio propagation environment, the communication state, etc.

FIG. 42 illustrates an exemplary state where base station #1 labeled 901_1 and a "terminal such as terminal #1 labeled 902_1" communicate with each other in FIG. 9. (A) of FIG. 42 illustrates an exemplary modulation signal transmission state of base station #1 labeled 901_1, and (B) of FIG. 42 illustrates an exemplary modulation signal transmission state of the "terminal such as terminal #1 labeled 902_1". Note that the horizontal axes represent time in (A) and (B) of FIG. 42. Note that, in FIG. 42, the components that operate in the same manner as in FIG. 18 are denoted by the same reference signs.

First, base station #1 labeled 901_1 transmits sector sweep reference signal 1801_1. Note that this has already been described with reference to FIG. 27, and the description thereof will be thus omitted.

Then, the "terminal such as terminal #1 labeled 902_1" transmits sector sweep reference signal 1851_1. Note that this has already been described with reference to, for example, FIGS. 58, 59A, 59B, etc., and the description thereof will be thus omitted.

Base station #1 labeled 901_1 transmits feedback signal group 4202_1. Note that this has already been described with reference to FIGS. 64A, 64B, 66A, 66B, and 68, and the description thereof will be thus omitted.

After that, base station #1 labeled 901_1 transmits "data-symbol-included frame group 4203_1". Note that this has already been described with reference to FIGS. 65A, 65B, 67A, 67B, and 69, and the description thereof will be thus omitted. (Hence, "data-symbol-included frame 4203_1" is considered to be a frame for downlink, for example).

Then, the "terminal such as terminal #1 labeled 902_1" transmits "data-symbol-included frame group 4252_1". Note that a configuration of the frame will be described later with reference to "FIGS. 70A and 70B", "FIGS. 71A and 71B", and "FIG. 72". (Hence, "data-symbol-included frame group 4252_1" is considered to be a frame for uplink, for example).

Next, base station #1 labeled 901_1 transmits "data-symbol-included frame group 4203_2". Note that a configuration method of "data-symbol-included frame group 4203_2" is as described with reference to FIGS. 65A, 65B, 67A, 67B, and 69.

Then, the terminal such as "terminal #1 labeled 902_1 and terminal #2 labeled 902_2" transmits "data-symbol-included frame group 4252_2". Note that a configuration of the frame will be described later with reference to "FIGS. 70A and 70B", "FIGS. 71A and 71B", and "FIG. 72".

FIG. 43 illustrates an exemplary modulation signal transmission state of base station #1 labeled 901_1 and an exemplary modulation signal transmission state of the "terminal such as terminal #1 labeled 902_1" after the state in FIG. 42. Note that, in FIG. 43, the components that operate in the same manner as in FIG. 18 are denoted by the same reference signs.

(A) of FIG. 43 illustrates an exemplary modulation signal transmission state of base station #1 labeled 901_1, and it is a temporal continuation from the modulation signal transmission state of base station #1 labeled 901_1 in (A) of FIG. 42.

(B) of FIG. 43 illustrates an exemplary modulation signal transmission state of "terminal #1 labeled 902_1 and terminal #2 labeled 902_2", and it is a temporal continuation from the modulation signal transmission state of the "terminal such as terminal #1 labeled 902_1" in (B) of FIG. 42.

Note that the horizontal axes represent time in (A) and (B) of FIG. 43.

After the states in (A) and (B) of FIG. 42, base station #1 labeled 901_1 transmits "data-symbol-included frame group 4203_3". Note that a configuration method of "data-symbol-included frame group 4203_3" is as described with reference to FIGS. 65A, 65B, 67A, 67B, and 69.

The "terminal such as terminal #1 labeled 902_1" transmits "data-symbol-included frame group 4252_3". Note that a configuration of the frame will be described later with reference to "FIGS. 70A and 70B", "FIGS. 71A and 71B", and "FIG. 72".

Next, base station #1 labeled 901_1 transmits sector sweep reference signal 1801_2. Note that this has already been described with reference to FIG. 27, and the description thereof will be thus omitted.

Then, the "terminal such as terminal #1 labeled 902_1" transmits sector sweep reference signal 1851_2. Note that this has already been described with reference to FIGS. 58, 59A, 59B etc., and the description thereof will be thus omitted.

Base station #1 labeled 901_1 transmits feedback signal group 4202_2. Note that this has already been described with reference to FIGS. 64A, 64B, 66A, 66B, and 68, and the description thereof will be thus omitted.

After that, base station #1 labeled 901_1 transmits "data-symbol-included frame group 4203_4". Note that this has already been described with reference to FIGS. 65A, 65B, 67A, 67B, and 69, and the description thereof will be thus omitted.

Then, the "terminal such as terminal #1 labeled 902_1" transmits "data-symbol-included frame group 4252_4". Note that a configuration of the frame will be described later with reference to "FIGS. 70A and 70B", "FIGS. 71A and 71B", and "FIG. 72".

As described above, base station #1 labeled 901_1 and the terminal transmit the sector sweep reference signals before the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"", and again transmit the sector sweep reference signals after the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"" Base station #1 labeled 901_1 and the terminal then each select a transmission panel antenna to be used and configure transmission beamforming. This produces an effect that the base station and/or the terminal achieve high data reception quality.

Next, a description will be given of an exemplary configuration of "data-symbol-included frame group **4252_*i*" transmitted by the terminal such as "terminal #1 labeled 902_1 and terminal #2 labeled 902_2**". Note that i is an integer equal to or greater than 1, for example.

As described before, terminal #i labeled **902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106**_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

A plurality of cases will be described in the following.

<Case A1>

Figure 70A:
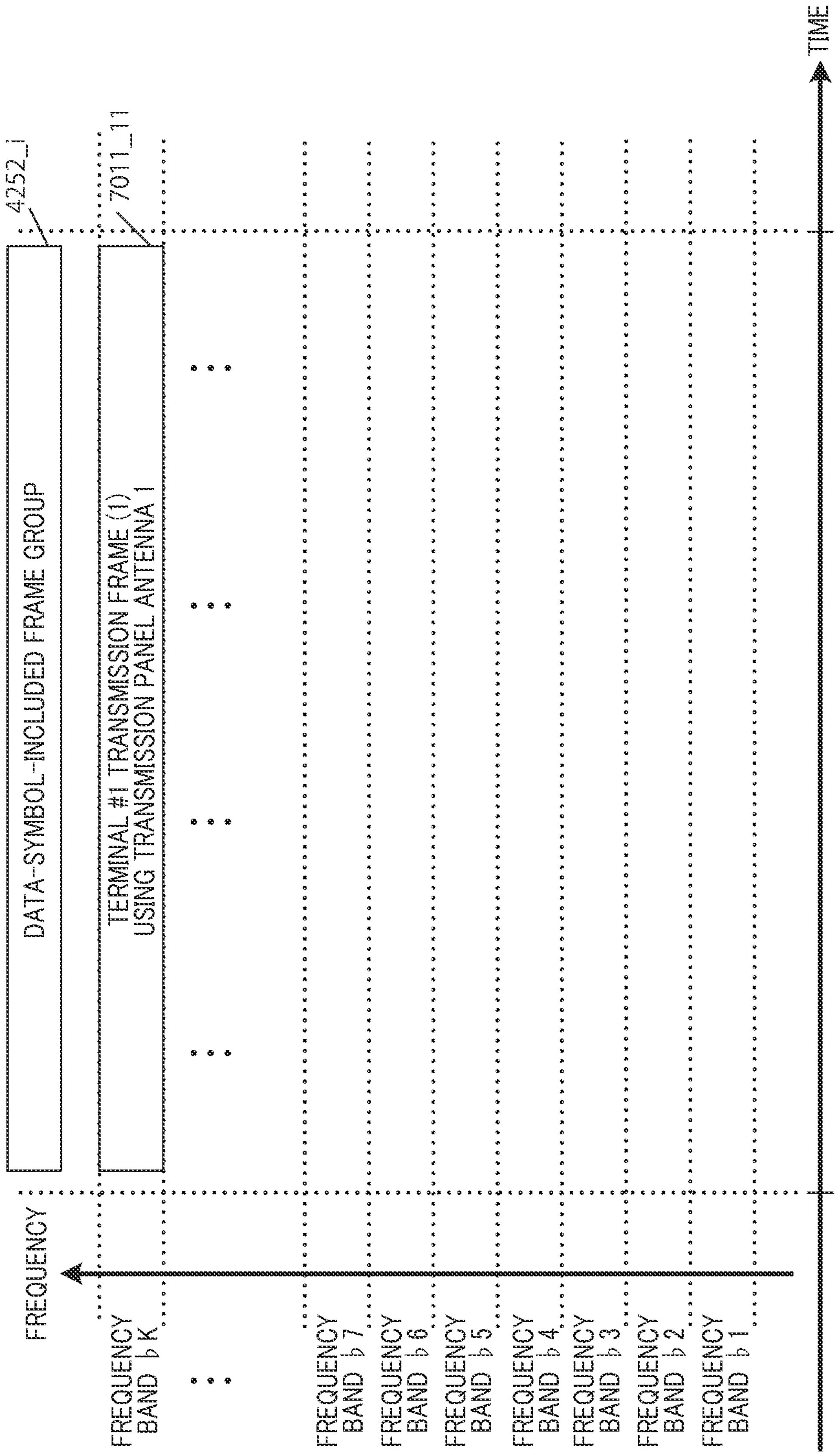
FIG. 70A illustrates the eleventh example of the configuration of the "data-symbol-included frame getup"
Figure 70B:
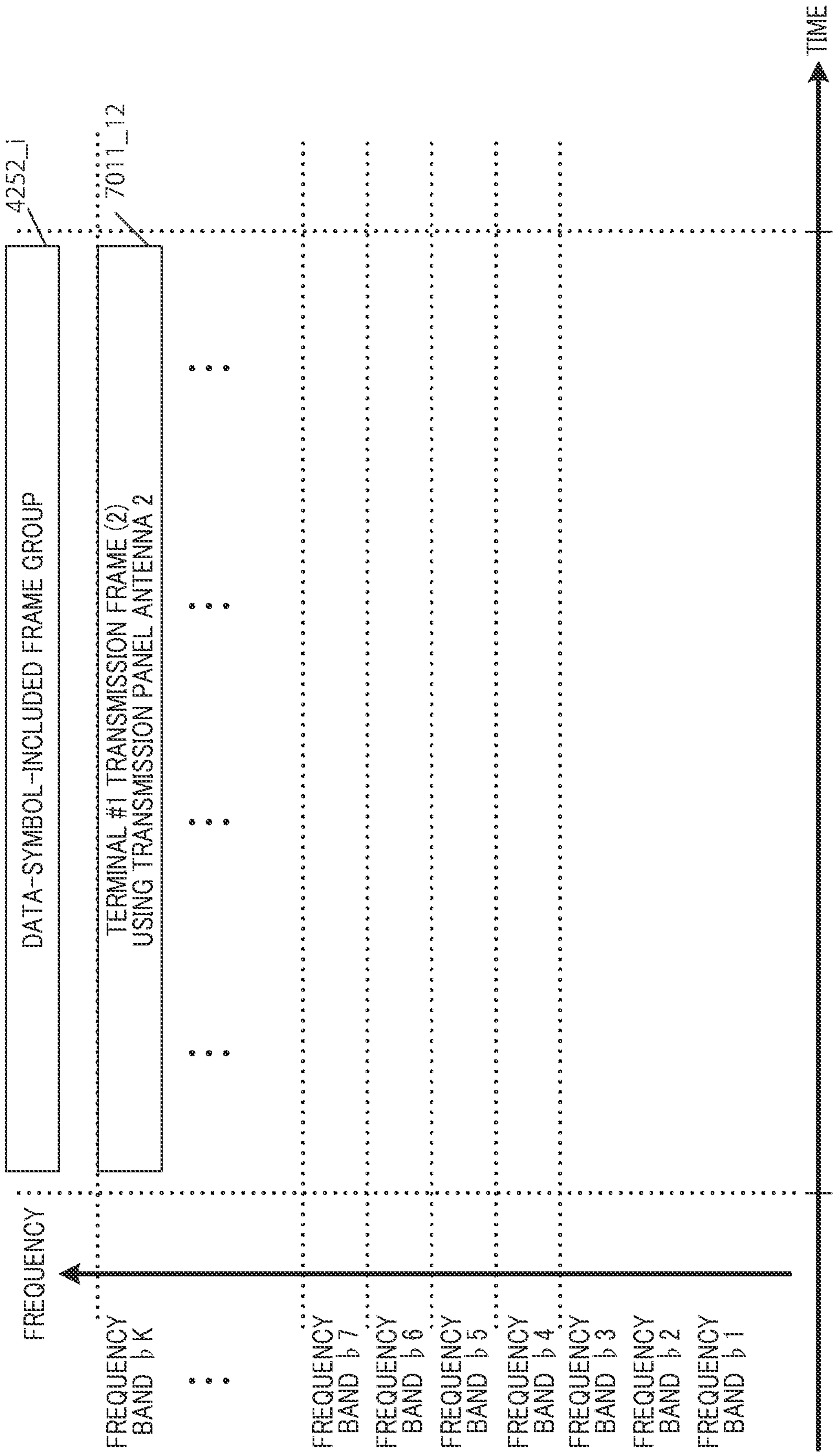
FIG. 70B illustrates the eleventh example of the configuration of the "data-symbol-included frame group"

FIGS. 70A and 70B illustrate exemplary configurations of "data-symbol-included frame group 4252_*i*". Note that the horizontal axes represent time and the vertical axes represent frequency in FIGS. 70A and 70B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 70A and 70B, there are frequency band ♭1, frequency band ♭2, . . . , frequency band ♭K for "data-symbol-included frame group 4252_*i*".

Note that FIGS. 70A and 70B illustrate frames (slots or modulation signals) transmitted by terminal #1 labeled 902_1. Although not illustrated in FIGS. 70A and 70B, there may be a frame (slot or modulation signal) transmitted by a terminal other than terminal #1 labeled 902_1 (see FIGS. 62A, 62B, 62C, 62D, 62E, and 62F).

In this example, in data-symbol-included frame group 4252_*i*, "terminal #1 transmission frame (1) labeled 7011_11" transmitted by terminal #1 labeled 902_1 is present in frequency band ♭K as illustrated in FIG. 70A and "terminal #1 transmission frame (2) labeled 7011_12" transmitted by terminal #1 labeled 902_1 is present in frequency band ♭K as illustrated in FIG. 70B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, terminal #1 labeled 902_1 transmits, to base station #1 labeled 901_1, "terminal #1 transmission frame (1) labeled 7011_11" present in frequency band ♭K as illustrated in FIG. 70A and "terminal #1 transmission frame (2) labeled 7011_12" present in frequency band ♭K as illustrated in FIG. 70B. At this time, "terminal #1 transmission frame (1) labeled 7011_11" is transmitted from transmission panel antenna 1 labeled 106_1 of terminal #1 labeled 902_1, and "terminal #1 transmission frame (2) labeled 7011_12" is transmitted from transmission panel antenna 2 labeled 106_2 of terminal #1 labeled 902_1.

As described above, "terminal #1 transmission frame (1) labeled 7011_11" and "terminal #1 transmission frame (2) labeled 7011_12" are present because "terminal #1 labeled 902_1 transmits two modulation signals (streams) to base station #1 labeled 901_1".

At this time, "terminal #1 transmission frame (1) labeled 7011_11" includes, for example, a data symbol (data and/or information) addressed to base station #1 labeled 901_1.

In addition, "terminal #1 transmission frame (2) labeled 7011_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 7011_11" and "terminal #1 transmission frame (2) labeled 7011_12" as illustrated in FIGS. 70A and 70B, but terminal #1 labeled 902_1 may transmit three or more frames (slots or modulation signals) (a plurality of frames (slots or modulation signals) using the same frequency resource) to base station #1 labeled 901_1. Terminal #1 labeled 902_1 may also transmit a single frame (slot or modulation signal) to base station #1 labeled 901_1.

Note that "terminal #1 transmission frame (l) labeled 7011_11" and "terminal #1 transmission frame (2) labeled 7011_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A2>

Figure 71A:
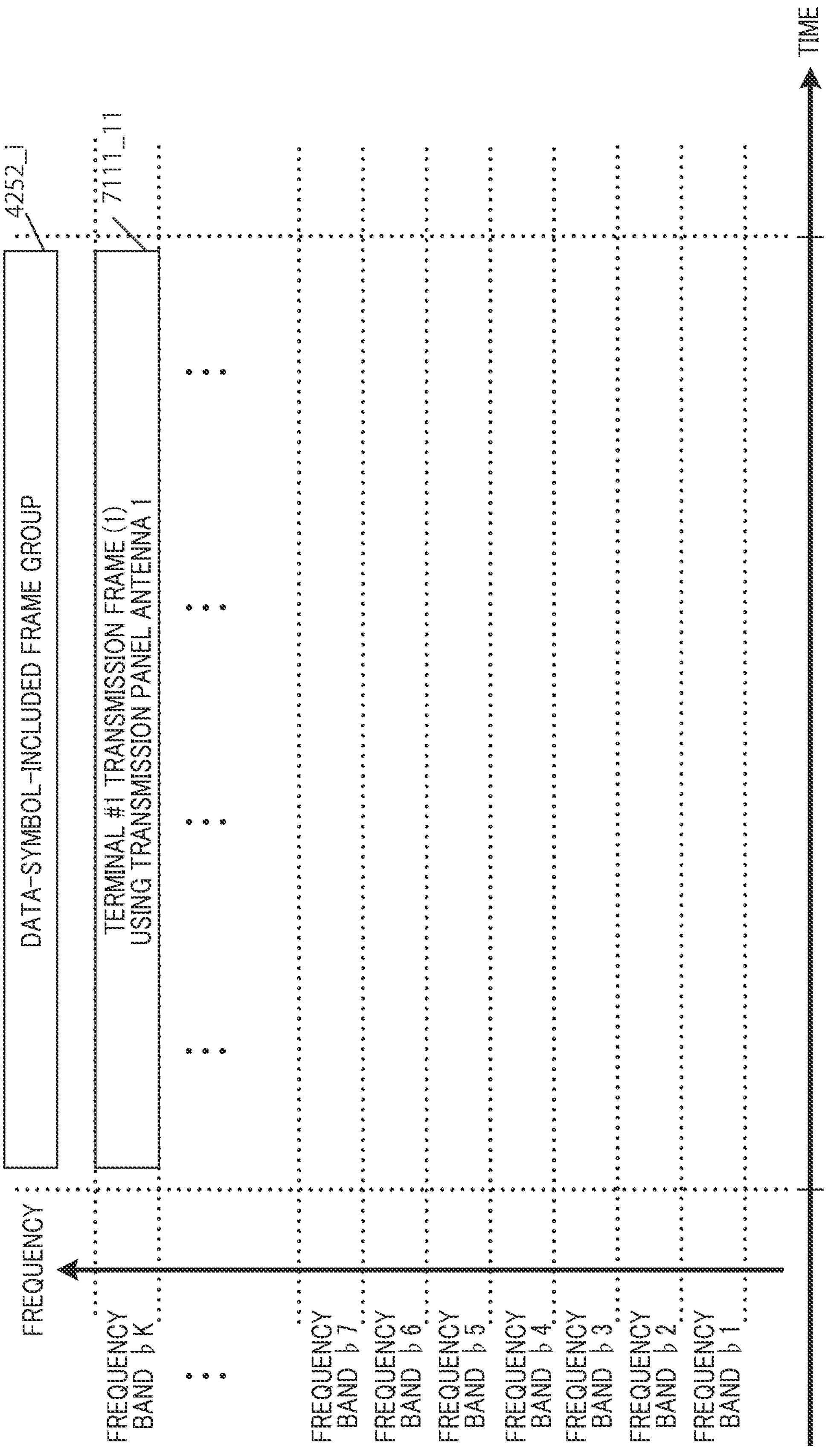
FIG. 71A illustrates the twelfth example of the configuration of the "data-symbol-included frame group"
Figure 71B:
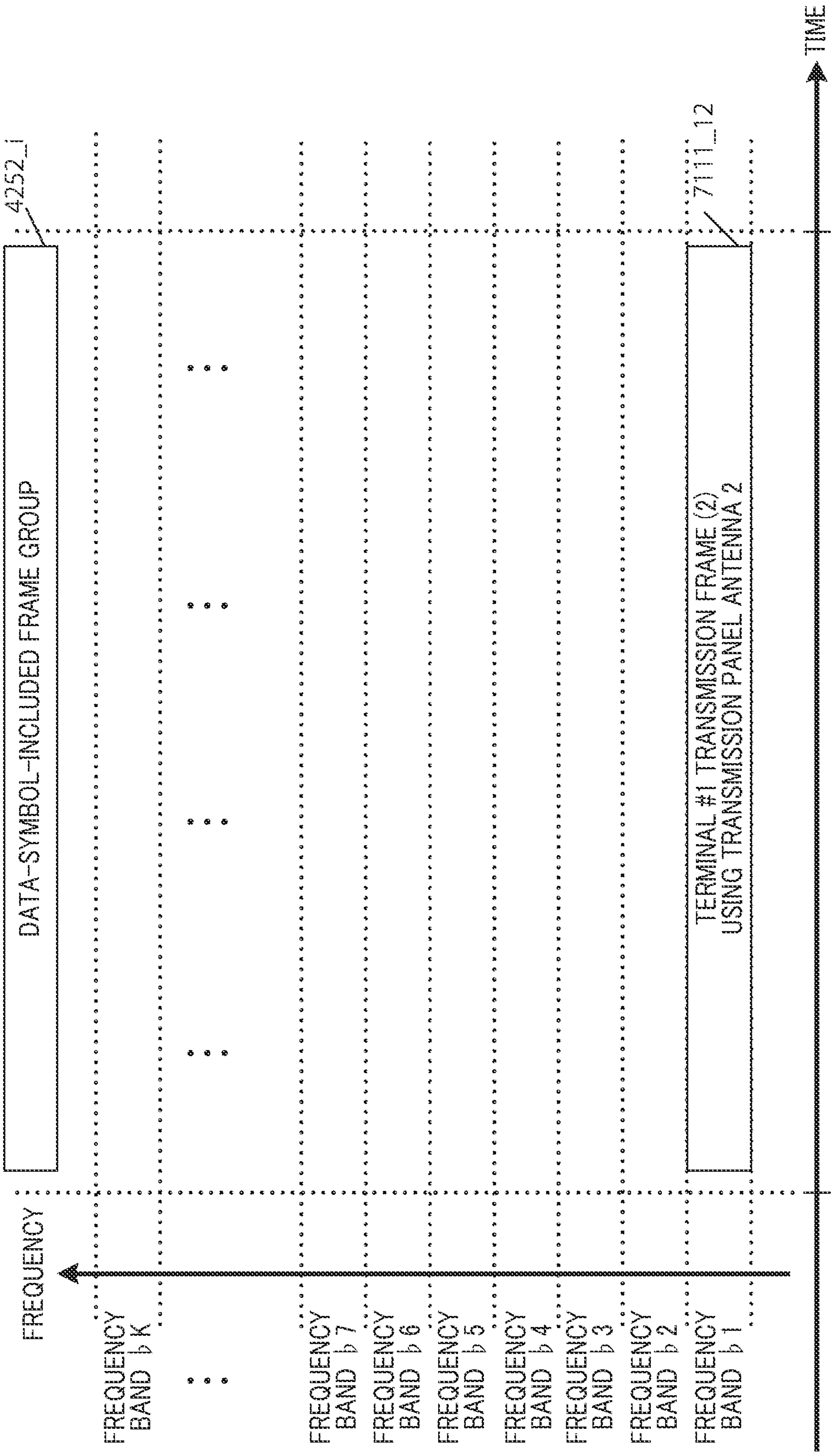
FIG. 71B illustrates the twelfth example of the configuration of the "data-symbol-included frame group"

FIGS. 71A and 71B illustrate exemplary configurations of "data-symbol-included frame group 4252_*i*". Note that the horizontal axes represent time and the vertical axes represent frequency in FIGS. 71A and 71B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 71A and 71B, there are frequency band ♭1, frequency band ♭2, . . . , frequency band ♭K for "data-symbol-included frame group 4252_*i*".

Note that FIGS. 71A and 71B illustrate frames (slots or modulation signals) transmitted by terminal #1 labeled 902_1. Although not illustrated in FIGS. 71A and 71B, there may be a frame (slot or modulation signal) transmitted by a terminal other than terminal #1 labeled 902_1 (see FIGS. 62A, 62B, 62C, 62D, 62E, and 62F).

In this example, in data-symbol-included frame group 4252_*i*, "terminal #1 transmission frame (1) labeled 7111_11" transmitted by terminal #1 labeled 902_1 is present in frequency band ♭K as illustrated in FIG. 71A and "terminal #1 transmission frame (2) labeled 7111_12" transmitted by terminal #1 labeled 902_1 is present in frequency band ♭1 as illustrated in FIG. 71B.

For example, terminal #1 labeled 902_1 transmits, to base station #1 labeled 901_1, "terminal #1 transmission frame (1) labeled 7111_11" present in frequency band ♭K as illustrated in FIG. 71A and "terminal #1 transmission frame (2) labeled 7111_12" present in frequency band ♭1 as illustrated in FIG. 71B. At this time, "terminal #1 transmission frame (1) labeled 7111_11" is transmitted from transmission panel antenna 1 labeled 106_1 of terminal #1 labeled 902_1, and "terminal #1 transmission frame (2) labeled 7111_12" is transmitted from transmission panel antenna 2 labeled 106_2 of terminal #1 labeled 902_1.

As described above, "terminal #1 transmission frame (1) labeled 7111_11" and "terminal #1 transmission frame (2)

labeled 7111_12" are present because "terminal #1 labeled 902_1 transmits two modulation signals (streams) to base station #1 labeled 901_1".

At this time, "terminal #1 transmission frame (1) labeled 7111_11" includes, for example, a data symbol (data and/or information) addressed to base station #1 labeled 901_1.

In addition, "terminal #1 transmission frame (2) labeled 7111_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 7111_11" and "terminal #1 transmission frame (2) labeled 7111_12" as illustrated in FIGS. 71A and 71B, but terminal #1 labeled 902_1 may transmit three or more frames (slots or modulation signals) (a plurality of frames (slots or modulation signals) using a plurality of frequency resources) to base station #1 labeled 901_1. Terminal #1 labeled 902_1 may also transmit a single frame (slot or modulation signal) to base station #1 labeled 901_1.

Note that "terminal #1 transmission frame (1) labeled 7111_11" and "terminal #1 transmission frame (2) labeled 7111_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case A3>

Figure 72:
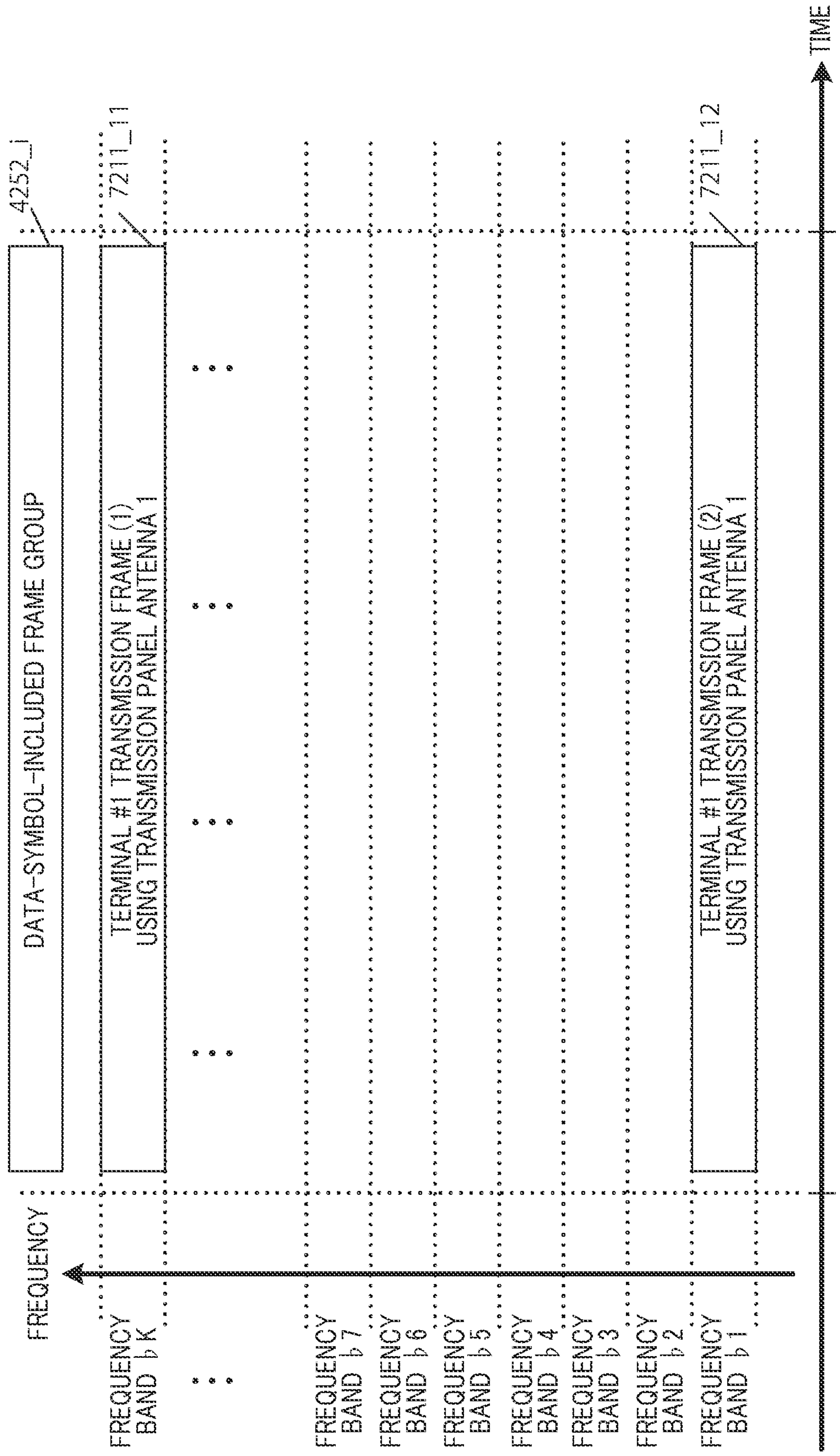
FIG. 72 illustrates the thirteenth example of the configuration of the "data-symbol-included frame group"

FIG. 72 illustrates an exemplary configuration of "data-symbol-included frame group 4252_*i*". Note that the horizontal axis represents time and the vertical axis represents frequency in FIG. 72. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 72, there are frequency band ♭1, frequency band ♭2, . . . , frequency band ♭K for "data-symbol-included frame group 4252_*i*".

Note that FIG. 72 illustrates frames (slots or modulation signals) transmitted by terminal #1 labeled 902_1. Although not illustrated in FIG. 72, there may be a frame (slot or modulation signal) transmitted by a terminal other than terminal #1 labeled 902_1 (see FIGS. 62A, 62B, 62C, 62D, 62E, and 62F).

In this example, in data-symbol-included frame group 4252_*i*, "terminal #1 transmission frame (1) labeled 7211_11" transmitted by terminal #1 labeled 902_1 is present in frequency band ♭K and "terminal #1 transmission frame (2) labeled 7211_12" transmitted by terminal #1 labeled 902_1 is present in frequency band ♭1 as illustrated in FIG. 72.

For example, terminal #1 labeled 902_1 transmits, to base station #1 labeled 901_1, "terminal #1 transmission frame (1) labeled 7211_11" present in frequency band ♭K and "terminal #1 transmission frame (2) labeled 7211_12" present in frequency band ♭1 as illustrated in FIG. 72. At this time, "terminal #1 transmission frame (1) labeled 7211_11" and "terminal #1 transmission frame (2) labeled 7211_12" are transmitted from transmission panel antenna 1 labeled 106_1 of terminal #1 labeled 902_1, which means that a single transmission panel antenna has been selected.

As described above, "terminal #1 transmission frame (1) labeled 7211_11" and "terminal #1 transmission frame (2) labeled 7211_12" are present because "terminal #1 labeled 902_1 transmits two frames (resources) to base station #1 labeled 901_1".

At this time, "terminal #1 transmission frame (1) labeled 7211_11" and "terminal #1 transmission frame (2) labeled 7211_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 7211_11" and "terminal #1 transmission frame (2) labeled 7211_12" as illustrated in FIG. 72, but terminal #1 labeled 902_1 may transmit three or more frames (slots or modulation signals) (a plurality of frames (slots or modulation signals) using a plurality of frequency resources) to base station #1 labeled 901_1. Terminal #1 labeled 902_1 may also transmit a single frame (slot or modulation signal) to base station #1 labeled 901_1.

Note that "terminal #1 transmission frame (1) labeled 7211_11" and "terminal #1 transmission frame (2) labeled 7211_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

As described thus far, transmitting frames according to <Case A1> to <Case A3>, for example, reduces interference between the frames, and efficiently assigning the frames and slots produces an effect of enhancing data transmission efficiency.

Note that the base station and the terminals may perform communication according to any of the methods of <Case A1> to <Case A3>, and the base station and the terminals may perform communication selecting any of the communication methods of <Case A 1> to <Case A3> depending on the radio propagation environment, the communication state, etc.

As described above in Embodiment 8, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, operations have been described using various frame configurations in Embodiment 8, but the frames used in Embodiment 8 are merely examples and the frame configuration is not limited to the examples. In addition, the terms "signal", "frame", "modulation signal" "frame", etc. are used in the present embodiment, but the terms are not limited to those and the important part is the functions of the signals to be transmitted.

Further, the present embodiment has provided a description of a case where a terminal transmits a modulation signal in a multi-carrier scheme such as OFDM, for example, but the scheme is not limited to this. For example, a terminal may transmit a signal in a single-carrier scheme when transmitting a signal of a frame in FIGS. 70A, 70B, 71A, 71B, 72, etc. Note that this has also been described in Embodiment 6.

Embodiment 9

In Embodiment 9, a description will be given of an example where a base station transmits a plurality of modulation signals (a plurality of streams) to a terminal as a variation of Embodiment 7. (That is, an example of a case of performing MIMO will be described.) Note that the drawings used in Embodiments 1 to 8 are sometimes used in the following description of Embodiment 4.

FIG. 9 illustrates an exemplary communication state in Embodiment 9. Note that the detail has already been described and the description will be thus omitted.

FIG. 27 illustrates an example of modulation signal 2700 transmitted by base station #1 labeled 901_1 in FIG. 9. Note that the components that operate in the same manner as in FIG. 10 are denoted by the same reference signs, and the descriptions thereof will be omitted. The detail has already been described in Embodiment 3, and thus the description will also be omitted.

The configuration of base station #1 labeled 901_1 in FIG. 9 is the configuration in FIG. 1A, 1B, or 1C as described in the other embodiments, and base station #1 labeled 901_1 with the configuration in FIG. 1A, 1B, or 1C includes the configuration in FIG. 3 as transmission panel antenna xi labeled 106_*xi*. Note that the configuration of base station #1 labeled 901_1 is not limited to the configuration in FIG. 1A, 1B, or 1C, and the configuration of transmission panel antenna xi labeled 106_*xi* included in base station #1 labeled 901_1 with the configuration in FIG. 1A, 1B, or 1C is not limited to the configuration in FIG. 3.

FIG. 11 illustrates examples of sector sweep reference signal 1001 in FIG. 23 transmitted by base station #1 in FIG. 9. Note that the operation in FIG. 11 has already been described and the description thereof will be thus omitted.

FIG. 12 illustrates an exemplary configuration of "sector sweep reference signal 1101_*i* in transmission panel antenna i" in FIG. 11. Note that the operation in FIG. 12 has already been described and the description thereof will be thus omitted.

FIG. 23 illustrates an exemplary operation in the time period from time t1 to t2, which is the terminal response period. Note that the operation in FIG. 23 has already been described and the description thereof will be thus omitted.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23.

Note that the operation in FIG. 24 has already been described, and thus different operations in Embodiment 9 will be described.

For example, terminal #1 labeled 902_1 in FIG. 9 desires to receive a plurality of modulation signals from base station #1 labeled 901_1. Here, terminal #1 labeled 902_1 in FIG. 9 desires to receive two modulation signals from base station #1 labeled 901_1. In this case, terminal #1 labeled 902_1 in FIG. 9 receives sector sweep reference signal 1001 transmitted by base station #1 labeled 901_1 and estimates two "transmission panel antennas and parameter numbers" with high reception quality from transmission panel antennas of base station #1 labeled 901_1.

At this time, those two "transmission panel antennas and parameter numbers" with high reception quality are respectively referred to as the first "transmission panel antenna and parameter number" and the second "transmission panel antenna and parameter number". Further, a "transmission panel antenna of the first "transmission panel antenna and parameter number"" is different from a "transmission panel antenna of the second "transmission panel antenna and parameter number"".

Terminal #1 labeled 902_1 in FIG. 9 selects a first frequency (band) as well as the first "transmission panel antenna and parameter number". Terminal #1 labeled 902_1 in FIG. 9 also selects a second frequency (band) as well as the second "transmission panel antenna and parameter number". Note that the first frequency (band) and the second frequency (band) may be the same, may be different, or may partially overlap each other.

Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. To be more specific, the above operation is performed by base station #1 labeled 901_1 transmitting a sector sweep reference signal in FIG. 11 and terminal #1 labeled 902_1 receiving the sector sweep reference signal in FIG. 11.

Terminal #1 labeled 902_1 estimates, for example, "transmission panel antenna a1_1 and parameter b1_1" and "transmission panel antenna a1_2 and parameter b1_2" as the two "transmission panel antennas and parameter numbers" with high reception quality. (Note that, in the following description with reference to FIGS. 64A, 64B, 65A, 65B, etc., "transmission panel antenna a1_1" is transmission panel antenna 1 labeled 106_1 (of base station #1 labeled 901_1) in FIGS. 1A, 1B, and 1C, and "transmission panel antenna a1_2" is transmission panel antenna 2 labeled 106_2 (of base station #1 labeled 901_1) in FIGS. 1A, 1B, and 1C.) (In addition, a frequency (band) is estimated as well as "transmission panel antenna a1_1 and parameter b1_1". Likewise, a frequency (band) is estimated as well as "transmission panel antenna a1_2 and parameter b1_2".)

In addition, while estimating the "transmission panel antenna and parameter" with high reception quality, terminal #1 labeled 902_1 simultaneously obtains information of "the number of slots in which sector sweep reference signals can be transmitted when the terminals transmit the sector sweep reference signals (the number of terminals that can transmit the sector sweep reference signal)". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal #1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24 (see FIG. 24).

Note that terminal #1 "sector sweep reference signal" 2401_1 includes information of the "transmission panel antennas and parameters" with high reception quality obtained by terminal #1 labeled 902_1, that is, information of "transmission panel antenna a1_1 and parameter b1_1" and information of "transmission panel antenna a1_2 and parameter b1_2". Sector sweep reference signal 2401_1 may include request information, of terminal #1 labeled 902_1, of "the number of modulation signals (streams) desired to be transmitted by base station #1 labeled 901_1" (here, "2"). Further, terminal #1 "sector sweep reference signal" 2401_1 includes information of the frequency (band) corresponding to the information of "transmission panel antenna a1_1 and parameter b1_1" (here, frequency band ♭K) and information of the frequency (band) corresponding to the information of "transmission panel antenna a1_2 and parameter b1_2" (here, frequency band ♭K).

Thus, "sector sweep reference signal" 2401_*i* transmitted by terminal i, which includes terminal #1, includes the above-described frequency (band) information.

Note that base station #1 labeled 901_1 determines a frequency band to transmit feedback signal group 2702 and data-symbol-included frame group 2703 based on the frequency (band) information included in "sector sweep reference signal" 2401_*i* transmitted by terminal i.

Information included in sector sweep reference signals transmitted by the other terminals and the transmission states have already been described with reference to FIG. 24 in other embodiments, and the description thereof will be thus omitted. Note that the sector sweep reference signals transmitted by the other terminals may include the request information of "the number of modulation signals (streams) desired to be transmitted by base station #1 labeled 901_1". For example, when "the number of modulation signals (streams) desired to be transmitted by base station #1 labeled 901_1" is "1", this information is included. ("The number of modulation signals (streams) desired to be transmitted by base station #1 labeled 901_1" is set to a number equal to or greater than "1").

In the manner described above, a collision of the sector sweep reference signals transmitted by the respective terminals can be reduced. This produces an effect that the base station can receive more sector sweep reference signals and can communicate with more terminals. The above operation also allows the base station to transmit one or a plurality of modulation signals (streams) to each terminal.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

For example, terminal #1 labeled 902_*i* with the configuration in FIG. 1A, 1B, or 1C transmits terminal #i "sector sweep reference signal" 2401_*i* as illustrated in FIG. 24. The configuration of terminal #i "sector sweep reference signal" 2401_*i* and the information included in the signal have already been described with reference to FIGS. 15A and 15B in other embodiments, and the description thereof will be thus omitted.

A plurality of cases will be described in the following.

<Case B1>

FIGS. 64A and 64B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 64A and 64B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 64A and 64B, there are frequency band ♭1, frequency band ♭2, . . . , frequency band ♭K for feedback signal group 2702, as in FIG. 60A.

Note that FIGS. 64A and 64B illustrate only feedback signals addressed to terminal #1 labeled 902_1. Although not illustrated in FIGS. 64A and MB, there may be a feedback signal addressed to a terminal other than terminal #1 labeled 902_1.

In this example, feedback signal group 2702 includes terminal #1-addressed feedback signal (1) labeled 6411_11 present in frequency band ♭K as illustrated in FIG. 64A and terminal #1-addressed feedback signal (2) labeled 6411_12 present in frequency band ♭K as illustrated in FIG. 64B.

Note that the term "feedback signal group" is used in the description because feedback signals transmitted from transmission panel antenna 1 labeled 106_1 can be present, feedback signals transmitted from transmission panel antenna 2 labeled 106_2 can be present, feedback signals transmitted from transmission panel antenna 3 labeled 106_3 can be present, and feedback signals transmitted from transmission panel antenna 4 labeled 106_4 can be present, in the same frequency band and the same transmission period.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 6411_11" present in frequency band ♭K as illustrated in FIG. 64A and "terminal #1-addressed feedback signal (2) labeled 6411_12" present in frequency band ♭K as illustrated in FIG. 64B, based on the information included in sector sweep reference signal 2401_1 (the included information has already been described, and the description thereof will be thus omitted). At this time, "terminal #1-addressed feedback signal (1) labeled 6411_11" is transmitted from transmission panel antenna 1 labeled 106_1 of base station #1 labeled 901_1, and "terminal #1-addressed feedback signal (2) labeled 6411_12" is transmitted from transmission panel antenna 2 labeled 106_2 of base station #1 labeled 901_1.

As described above, "terminal #1-addressed feedback signal (1) labeled 6411_11" and "terminal #1-addressed feedback signal (2) labeled 6411_12" are present because "base station #1 labeled 901_1 transmits two modulation signals (streams) to terminal #1 labeled 902_1".

At this time, "terminal #1-addressed feedback signal (1) labeled 6411_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 6411_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6411_11" present in frequency band ♭K as illustrated in FIG. 64A and "terminal #1-addressed feedback signal (2) labeled 6411_12" present in frequency band ♭K as illustrated in FIG. 64B.

Further, there may be a feedback signal addressed to a terminal other than terminal #1 labeled 902_1 in FIGS. 64A and MB (see FIG. 60B, for example).

The above example has described the case where base station #1 labeled 901_1 transmits, to terminal #1 labeled 902_1, "terminal #1-addressed feedback signal (1) labeled 6411_11" and "terminal #1-addressed feedback signal (2) labeled 6411_12" as illustrated in FIGS. 64A and 64B, but base station #1 labeled 901_1 may transmit three or more feedback signals to terminal #1 labeled 902_1.

FIGS. 65A and 65B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 65A and 65B. In FIGS. 65A and 65B, there are frequency band ♭1, frequency band ♭2, . . . , frequency band ♭K for data-symbol-included frame group 2703, as in FIG. 61A.

Note that FIGS. 65A and 65B illustrate only modulation signals (slots) addressed to terminal #1 labeled 902_1. Although not illustrated in FIGS. 65A and 65B, there may be a modulation signal (slot) addressed to a terminal other than terminal #1 labeled 902_1.

In this example, data-symbol-included frame group 2703 includes terminal #1-addressed modulation signal (slot) (1) labeled 6511_11 present in frequency band ♭K as illustrated in FIG. 65A and terminal #1-addressed modulation signal (slot) (2) labeled 6511_12 present in frequency band ♭K as illustrated in FIG. 65B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 6511_11" present in frequency band ♭K as illustrated in FIG. 65A and "terminal #1-addressed modulation signal (slot) (2) labeled 6511_12" present in frequency band ♭K as illustrated in FIG. 65B, based on the information included in sector sweep reference signal 2401_1 (the included information has already been described, and the description thereof will be thus omitted). At this time, "terminal #1-addressed modulation signal (slot) (1) labeled 6511_11" is transmitted from transmission panel antenna 1 labeled 106_1 of base station #1 labeled 901_1, and "terminal #1-addressed modulation signal (slot) (2) labeled 6511_12" is transmitted from transmission panel antenna 2 labeled 106_2 of base station #1 labeled 901_1.

As described above, "terminal #1-addressed modulation signal (slot) (1) labeled 6511_11" and "terminal #1-addressed modulation signal (slot) (2) labeled 6511_12" are present because "base station #1 labeled 901_1 transmits two modulation signals (streams) to terminal #1 labeled 902_1".

At this time, "terminal #1-addressed modulation signal (slot) (1) labeled 6511_11" includes, for example, a data symbol (data and/or information) addressed to terminal #1 labeled 902_1.

In addition, "terminal #1-addressed modulation signal (slot) (2) labeled 6511_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6511_11" present in frequency band ♭K as illustrated in FIG. 65A and "terminal #1-addressed modulation signal (slot) (2) labeled 6511_12" present in frequency band ♭K as illustrated in FIG. 65B.

Further, there may be a modulation signal (slot) addressed to a terminal other than terminal #1 labeled 902_1 in FIGS. 65A and 65B (see FIG. 61B, for example).

The above example has described the case where base station #1 labeled 901_1 transmits, to terminal #1 labeled 902_1, "terminal #1-addressed modulation signal (slot) (1) labeled 6511_11" and "terminal #1-addressed modulation signal (slot) (2) labeled 6511_12" as illustrated in FIGS. 65A and 65B, but base station #1 labeled 901_1 may transmit three or more modulation signals (slots) (a plurality of modulation signals (slots) using the same frequency resource) to terminal #1 labeled 902_1.

Note that "terminal #1-addressed modulation signal (slot) (1) labeled 6511_11" and "terminal #1-addressed modulation signal (slot) (2) labeled 6511_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B2>

FIGS. 66A and 66B illustrate exemplary configurations of feedback signal group 2702 that is present in the time period from t2 to t3 in FIG. 27 and transmitted by base station #1 labeled 901_1. Note that the horizontal axes represent time and the vertical axes represent frequency in FIGS. 66A and 66B. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 66A and 66B, there are frequency band ♭1, frequency band ♭2, . . . , frequency band ♭K for feedback signal group 2702, as in FIG. 60A.

Note that FIGS. 66A and 66B illustrate only feedback signals addressed to terminal #1 labeled 902_1. Although not illustrated in FIGS. 66A and 66B, there may be a feedback signal addressed to a terminal other than terminal #1 labeled 902_1.

In this example, feedback signal group 2702 includes terminal #1-addressed feedback signal (1) labeled 6611_11 present in frequency band ♭K as illustrated in FIG. 66A and terminal #1-addressed feedback signal (2) labeled 6611_12 present in frequency band ♭1 as illustrated in FIG. 66B.

For example, when terminal #1 labeled 902_1 transmits sector sweep reference signal 2401_1 as illustrated in FIG. 24, base station #1 labeled 901_1 transmits, to terminal #1 labeled 902_1. "terminal #1-addressed feedback signal (1) labeled 6611_11" present in frequency band ♭K as illustrated in FIG. 66A and "terminal #1-addressed feedback signal (2) labeled 6611_12" present in frequency band ♭1 as illustrated in FIG. 66B, based on the information included in sector sweep reference signal 2401_1 (the included information has already been described, and the description thereof will be thus omitted). At this time, "terminal #1-addressed feedback signal (1) labeled 6611_11" is transmitted from transmission panel antenna 1 labeled 106_1 of base station #1 labeled 901_1, and "terminal #1-addressed feedback signal (2) labeled 6611_12" is transmitted from transmission panel antenna 2 labeled 106_2 of base station #1 labeled 901_1.

As described above, "terminal #1-addressed feedback signal (1) labeled 6611_11" and "terminal #1-addressed feedback signal (2) labeled 6611_12" are present because "base station #1 labeled 901_1 transmits two modulation signals (streams) to terminal #1 labeled 902_1".

At this time, "terminal #1-addressed feedback signal (1) labeled 6611_11" includes, for example, information indicating that communication with terminal #1 labeled 902_1 (by base station #1 labeled 901_1) is possible using transmission panel antenna 1 labeled 106_1.

In addition, "terminal #1-addressed feedback signal (2) labeled 6611_12" includes, for example, information indicating that communication with terminal #1 labeled 902_1 (by base station #1 labeled 901_1) is possible using transmission panel antenna 2 labeled 106_2.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6611_11" present in frequency band ♭K as illustrated in FIG. 66A and "terminal #1-addressed feedback signal (2) labeled 6611_12" present in frequency band ♭1 as illustrated in FIG. 66B.

Further, there may be a feedback signal addressed to a terminal other than terminal #1 labeled 902_1 in FIGS. 66A and 66B (see FIG. 60B, for example).

The above example has described the case where base station #1 labeled 901_1 transmits, to terminal #1 labeled 902_1, "terminal #1-addressed feedback signal (1) labeled 6611_11" and "terminal #1-addressed feedback signal (2) labeled 6611_12" as illustrated in FIGS. 66A and 66B, but base station #1 labeled 901_1 may transmit three or more feedback signals to terminal #1 labeled 902_1.

FIGS. 67A and 67B illustrate exemplary configurations of data-symbol-included frame group 2703 that is present in the time period from t4 to t5 in FIG. 27 and transmitted by base station #1 labeled 901_1. Note that the horizontal axes represent time and the vertical axes represent frequency in FIGS. 67A and 67B. In FIGS. 67A and 67B, there are frequency band ♭1, frequency band ♭2, . . . , frequency band ♭K for data-symbol-included frame group 2703, as in FIG. 61A.

Note that FIGS. 67A and 67B illustrate only modulation signals (slots) addressed to terminal #1 labeled 902_1. Although not illustrated in FIGS. 67A and 67B, there may be a modulation signal (slot) addressed to a terminal other than terminal #1 labeled 902_1.

In this example, data-symbol-included frame group 2703 includes terminal #1-addressed modulation signal (slot) (1) labeled 6711_11 present in frequency band ♭K as illustrated in FIG. 67A and terminal #1-addressed modulation signal (slot) (2) labeled 6711_12 present in frequency band ♭1 as illustrated in FIG. 67B.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 6711_11" present in frequency band ♭K as illustrated in FIG. 67A and "terminal #1-addressed modulation signal (slot) (2) labeled 6711_12" present in frequency band ♭1 as illustrated in FIG. 67B, based on the information included in sector sweep reference signal 2401_1 (the included information has already been described, and the description thereof will be thus omitted). At this time, "terminal #1-addressed modulation signal (slot) (1) labeled 6711_11" is transmitted from transmission panel antenna 1 labeled 106_1 of base station #1 labeled 901_1, and "terminal #1-addressed modulation signal (slot) (2) labeled 6711_12" is transmitted from transmission panel antenna 2 labeled 106_2 of base station #1 labeled 901_1.

As described above, "terminal #1-addressed modulation signal (slot) (1) labeled 6711_11" and "terminal #1-addressed modulation signal (slot) (2) labeled 6711_12" are present because "base station #1 labeled 901_1 transmits two modulation signals (streams) to terminal #1 labeled 902_1".

At this time, "terminal #1-addressed modulation signal (slot) (1) labeled 6711_11" includes, for example, a data symbol (data and/or information) addressed to terminal #1 labeled 902_1.

In addition, "terminal #1-addressed modulation signal (slot) (2) labeled 6711_12" also includes, for example, a data symbol (data and/or information) addressed to terminal #1 labeled 902_1.

Note that base station #1 labeled 901_1 selects transmission panel antennas and sets parameters of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6711_11" present in frequency band ♭K as illustrated in FIG. 67A and "terminal #1-addressed modulation signal (slot) (2) labeled 6711_12" present in frequency band ♭1 as illustrated in FIG. 67B.

Further, there may be a modulation signal (slot) addressed to a terminal other than terminal #1 labeled 902_1 in FIGS. 67A and 67B (see FIG. 61B, for example).

The above example has described the case where base station #1 labeled 901_1 transmits, to terminal #1 labeled 902_1, "terminal #1-addressed modulation signal (slot) (1) labeled 6711_11" and "terminal #1-addressed modulation signal (slot) (2) labeled 6711_12" as illustrated in FIGS. 67A and 67B, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 6711_11" and "terminal #1-addressed modulation signal (slot) (2) labeled 6711_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

<Case B3>

FIG. 68 illustrates an exemplary configuration of feedback signal group 2702 that is present in the time period from t2 to t3 in FIG. 27 and transmitted by base station #1 labeled 901_1. Note that the horizontal axis represents time and the vertical axis represents frequency in FIG. 68. To simplify the description, base station #1 labeled 901_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 68, there are frequency band ♭1, frequency band ♭2, . . . , frequency band ♭K for feedback signal group 2702, as in FIG. 60A.

Note that FIG. 68 illustrates only feedback signals addressed to terminal #1 labeled 902_1. Although not illustrated in FIG. 68, there may be a feedback signal addressed to a terminal other than terminal #1 labeled 902_1.

In this example, feedback signal group 2702 includes terminal #1-addressed feedback signal (1) labeled 6811_11 present in frequency band ♭K and terminal #1-addressed feedback signal (2) labeled 6811_12 present in frequency band ♭1 as illustrated in FIG. 68.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed feedback signal (1) labeled 6811_11" present in frequency band ♭K and "terminal #1-addressed feedback signal (2) labeled 6811_12" present in frequency band ♭1 as illustrated in FIG. 68, based on the information included in sector sweep reference signal 2401_1 (the included information has already been described, and the description thereof will be thus omitted). At this time, both "terminal #1-addressed feedback signal (1) labeled 6811_11" and "terminal #1-addressed feedback signal (2) labeled 6811_12" are transmitted from transmission panel antenna 1 labeled 106_1 of base station #1 labeled 901_1, which means that a single transmission panel antenna has been selected.

As described above, "terminal #1-addressed feedback signal (1) labeled 6811_11" and "terminal #1-addressed feedback signal (2) labeled 6811_12" are present because "base station #1 labeled 901_1 transmits two resources (slots) to terminal #1 labeled 902_1".

At this time, "terminal #1-addressed feedback signal (1) labeled 6811_11" and "terminal #1-addressed feedback signal (2) labeled 6811_12" include, for example, information indicating that communication with terminal #1 labeled 902_1 (by base station #1 labeled 901_1) is possible using transmission panel antenna 1 labeled 106_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed feedback signal (1) labeled 6811_11" present in frequency band ♭K and "terminal #1-addressed feedback signal (2) labeled 6811_12" present in frequency band ♭1 as illustrated in FIG. 68.

Further, there may be a feedback signal addressed to a terminal other than terminal #1 labeled 902_1 in FIG. 68 (see FIG. 608, for example).

The above example has described the case where base station #1 labeled 901_1 transmits, to terminal #1 labeled 902_1, "terminal #1-addressed feedback signal (l) labeled 6811_11" and "terminal #1-addressed feedback signal (2) labeled 6811_12" as illustrated in FIG. 68, but base station #1 labeled 901_1 may transmit three or more feedback signals to terminal #1 labeled 902_1.

FIG. 69 illustrates an exemplary configuration of data-symbol-included frame group 2703 that is present in the time period from t4 to t5 in FIG. 27 and transmitted by base station #1 labeled 901_1. Note that the horizontal axis represents time and the vertical axis represents frequency in FIG. 69. In FIG. 69, there are frequency band ♭1, frequency band ♭2, . . . , frequency band ♭K for data-symbol-included frame group 2703, as in FIG. 61A.

Note that FIG. 69 illustrates only modulation signals (slots) addressed to terminal #1 labeled 902_1. Although not illustrated in FIG. 69, there may be a modulation signal (slot) addressed to a terminal other than terminal #1 labeled 902_1.

In this example, data-symbol-included frame group 2703 includes terminal #1-addressed modulation signal (slot) (1) labeled 6911_11 present in frequency band ♭K and terminal #1-addressed modulation signal (slot) (2) labeled 6911_12 present in frequency band ♭1 as illustrated in FIG. 69.

For example, when terminal #1 labeled 902_1 transmits sector sweep reference signal 2401_1 as illustrated in FIG. 24, base station #1 labeled 901_1 transmits, to terminal #1 labeled 902_1, "terminal #1-addressed modulation signal (slot) (1) labeled 6911_11" present in frequency band ♭K and "terminal #1-addressed modulation signal (slot) (2) labeled 6911_12" present in frequency band ♭1 as illustrated in FIG. 69, based on the information included in sector sweep reference signal 2401_1 (the included information has already been described, and the description thereof will be thus omitted). At this time, "terminal #1-addressed modulation signal (slot) (1) labeled 6911_11" and "terminal #1-addressed modulation signal (slot) (2) labeled 6911_12" are transmitted from transmission panel antenna 1 labeled 106_1 of base station #1 labeled 901_1, which means that a single transmission panel antenna has been selected.

As described above, "terminal #1-addressed modulation signal (slot) (1) labeled 6911_11" and "terminal #1-addressed modulation signal (slot) (2) labeled 6911_12" are present because "base station #1 labeled 901_1 transmits two resources (slots) to terminal #1 labeled 902_1".

At this time, "terminal #1-addressed modulation signal (slot) (1) labeled 6911_11" and "terminal #1-addressed modulation signal (slot) (2) labeled 6911_12" include, for example, data symbols (data and/or information) addressed to terminal #1 labeled 902_1.

Note that base station #1 labeled 901_1 selects a transmission panel antenna and sets a parameter of beamforming based on the "information of two "transmission panel antennas and parameters" of base station #1 labeled 901_1 with high reception quality and the frequency (band) information" transmitted by terminal #1 labeled 902_1, and base station #1 labeled 901_1 then transmits, to terminal #1 labeled 902_1, "terminal #1-addressed modulation signal (slot) (1) labeled 6911_11" present in frequency band♭K and "terminal #1-addressed modulation signal (slot) (2) labeled 6911_12" present in frequency band♭1 as illustrated in FIG. 69.

Further, there may be a modulation signal (slot) addressed to a terminal other than terminal #1 labeled 902_1 in FIG. 69 (see FIG. 61B, for example).

The above example has described the case where base station #1 labeled 901_1 transmits, to terminal #1 labeled 902_1, "terminal #1-addressed modulation signal (slot) (1) labeled 6911_11" and "terminal #1-addressed modulation signal (slot) (2) labeled 6911_12" as illustrated in FIG. 69, but base station #1 labeled 901_1 may transmit three or more modulation signals (slots) (modulation signals (slots) using a plurality of frequency resources) to terminal #1 labeled 902_1.

Note that "terminal #1-addressed modulation signal (slot) (1) labeled 6911_11" and "terminal #1-addressed modulation signal (slot) (2) labeled 6911_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of MCS, and the like.

As described thus far, transmitting modulation signals according to <Case B1> to <Case B3>, for example, reduces interference between the modulation signals, and efficiently assigning the modulation signals and slots produces an effect of enhancing data transmission efficiency.

Note that the base station and the terminals may perform communication according to any of the methods of <Case B1> to <Case B3>, and the base station and the terminals may perform communication selecting any of the communication methods of <Case B1> to <Case B3> depending on the radio propagation environment, the communication state, etc.

FIG. 42 illustrates an exemplary state where base station #1 labeled 901_1 and a "terminal such as terminal #1 labeled 902_1" communicate with each other in FIG. 9. (A) of FIG. 42 illustrates an exemplary modulation signal transmission state of base station #1 labeled 901_1, and (B) of FIG. 42 illustrates an exemplary modulation signal transmission state of the "terminal such as terminal #1 labeled 902_1". Note that the horizontal axes represent time in (A) and (B) of FIG. 42. Note that, in FIG. 42, the components that operate in the same manner as in FIG. 18 are denoted by the same reference signs.

First, base station #1 labeled 901_1 transmits sector sweep reference signal 1801_1. Note that this has already been described with reference to FIG. 27, and the description thereof will be thus omitted.

Then, the "terminal such as terminal #1 labeled 902_1" transmits sector sweep reference signal 1851_1. Note that this has already been described with reference to, for example, FIGS. 23, 24, etc., and the description thereof will be thus omitted.

Base station #1 labeled 901_1 transmits feedback signal group 4202_1. Note that this has already been described with reference to FIGS. 64A, 64B, 66A, 66B, and 68, and the description thereof will be thus omitted.

After that, base station #1 labeled 901_1 transmits "data-symbol-included frame group 4203_1". Note that this has already been described with reference to FIGS. 65A, 65B, 67A, 67B, and 69, and the description thereof will be thus omitted. (Hence, "data-symbol-included frame 4203_1" is considered to be a frame for downlink, for example).

Then, the "terminal such as terminal #1 labeled 902_1" transmits "data-symbol-included frame group 4252_1". Note that a configuration of the frame will be described later with reference to "FIGS. 51A and 51B", "FIGS. 52A and 521", and "FIG. 53". (Hence, "data-symbol-included frame group 4252_1" is considered to be a frame for uplink, for example).

Next, base station #1 labeled 901_1 transmits "data-symbol-included frame group 4203_2". Note that a configuration method of "data-symbol-included frame group 4203_2" is as described with reference to FIGS. 65A, 65B, 67A, 67B, and 69.

Then, the terminal such as "terminal #1 labeled 902_1 and terminal #2 labeled 902_2" transmits "data-symbol-included frame group 4252_2". Note that a configuration of the frame will be described later with reference to "FIGS. 51A and 51B", "FIGS. 52A and 52B", and "FIG. 53".

FIG. 43 illustrates an exemplary modulation signal transmission state of base station #1 labeled 901_1 and an exemplary modulation signal transmission state of the "terminal such as terminal #1 labeled 902_1" after the state in FIG. 42. Note that, in FIG. 43, the components that operate in the same manner as in FIG. 18 are denoted by the same reference signs.

(A) of FIG. 43 illustrates an exemplary modulation signal transmission state of base station #1 labeled 901_1, and it is a temporal continuation from the modulation signal transmission state of base station #1 labeled 901_1 in (A) of FIG. 42.

(B) of FIG. 43 illustrates an exemplary modulation signal transmission state of "terminal #1 labeled 902_1 and terminal #2 labeled 902_2", and it is a temporal continuation from the modulation signal transmission state of the "terminal such as terminal #1 labeled 902_1" in (B) of FIG. 42.

Note that the horizontal axes represent time in (A) and (B) of FIG. 43.

After the states in (A) and (B) of FIG. 42, base station #1 labeled 901_1 transmits "data-symbol-included frame group 4203_3". Note that a configuration method of "data-symbol-included frame group 4203_3" is as described with reference to FIGS. 65A, 65B, 67A, 67B, and 69.

The "terminal such as terminal #1 labeled 902_1" transmits "data-symbol-included frame group 4252_3". Note that a configuration of the frame will be described later with reference to "FIGS. 51A and 51B", "FIGS. 52A and 52B", and "FIG. 53".

Next, base station #1 labeled 901_1 transmits sector sweep reference signal 1801_2. Note that this has already been described with reference to FIG. 27, and the description thereof will be thus omitted.

Then, the "terminal such as terminal #1 labeled 902_1" transmits sector sweep reference signal 1851_2. Note that this has already been described with reference to FIGS. 23, 24 etc., and the description thereof will be thus omitted.

Base station #1 labeled 901_1 transmits feedback signal group 4202_2. Note that this has already been described with reference to FIGS. 64A, 64B, 66A, 66B, and 68, and the description thereof will be thus omitted.

After that, base station #1 labeled 901_1 transmits "data-symbol-included frame group 4203_4". Note that this has already been described with reference to FIGS. 65A, 65B, 67A, 67B, and 69, and the description thereof will be thus omitted.

Then, the "terminal such as terminal #1 labeled 902_1" transmits "data-symbol-included frame group 4252_4". Note that a configuration of the frame will be described later with reference to "FIGS. 51A and 518", "FIGS. 52A and 52B", and "FIG. 53".

As described above, base station #1 labeled 901_1 and the terminal transmit the sector sweep reference signals before the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"", and again transmit the sector sweep reference signals after the "transmission of the "data-symbol-included frame groups" by base station #1 labeled 901_1 and/or the transmission of the "data-symbol-included frame groups" by the terminal such as "terminal #1 labeled 902_1 and terminal #2 labeled 902_2"" Base station #1 labeled 901_1 and the terminal then each select a transmission panel antenna to be used and configure transmission beamforming. This produces an effect that the base station and/or the terminal achieve high data reception quality.

Next, a description will be given of an exemplary configuration of "data-symbol-included frame group 4252_*i*" transmitted by the terminal such as "terminal #1 labeled 902_1 and terminal #2 labeled 902_2". Note that i is an integer equal to or greater than 1, for example.

As described before, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

A plurality of cases will be described in the following.

<Case C1>

FIGS. 51A and 51B illustrate exemplary configurations of "data-symbol-included frame group 4252_*i*". Note that the horizontal axes represent time in FIGS. 51A and 51B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 51A and 51B, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIGS. 51A and 51B illustrate frames (slots or modulation signals) transmitted by terminal #1 labeled 902_1. Although not illustrated in FIGS. 51A and 51B, there may be a frame (slot or modulation signal) transmitted by a terminal other than terminal #1 labeled 902_1 (see FIG. 25).

In this example, in data-symbol-included frame group 4252_*i*, "terminal #1 transmission frame (1) labeled 5111_11" transmitted by terminal #1 labeled 902_1 is present in the first transmission period as illustrated in FIG. 51A and "terminal #1 transmission frame (2) labeled 5111_12" transmitted by terminal #1 labeled 902_1 is present in the first transmission period as illustrated in FIG. 51B.

Note that the term "data-symbol-included frame group" is used in the description because "data-symbol-included frames" transmitted from transmission panel antenna 1 labeled 106_1 can be present, "data-symbol-included frames" transmitted from transmission panel antenna 2 labeled 106_2 can be present, "data-symbol-included frames" transmitted from transmission panel antenna 3 labeled 106_3 can be present, and "data-symbol-included frames" transmitted from transmission panel antenna 4 labeled 106_4 can be present, in the same frequency band and the same transmission period.

For example, terminal #1 labeled 902_1 transmits, to base station #1 labeled 901_1, "terminal #1 transmission frame (1) labeled 5111_11" present in the first transmission period as illustrated in FIG. 51A and "terminal #1 transmission frame (2) labeled 5111_12" present in the first transmission period as illustrated in FIG. 51B. At this time, "terminal #1 transmission frame (1) labeled 5111_11" is transmitted from transmission panel antenna 1 labeled 106_1 of terminal #1 labeled 902_1, and "terminal #1 transmission frame (2) labeled 5111_12" is transmitted from transmission panel antenna 2 labeled 106_2 of terminal #1 labeled 902_1.

As described above, "terminal #1 transmission frame (1) labeled 5111_11" and "terminal #1 transmission frame (2) labeled 5111_12" are present because "terminal #1 labeled 902_1 transmits two modulation signals (streams) to base station #1 labeled 901_1".

At this time, "terminal #1 transmission frame (1) labeled 5111_11" includes, for example, a data symbol (data and/or information) addressed to base station #1 labeled 901_1.

In addition, "terminal #1 transmission frame (2) labeled 5111_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 5111_11" and "terminal #1 transmission frame (2) labeled 5111_12" as illustrated in FIGS. 51A and 51B, but terminal #1 labeled 902_1 may transmit three or more frames (slots or modulation signals) (a plurality of frames (slots or modulation signals) using the same frequency resource) to base station #1 labeled 901_1. Terminal #1 labeled 902_1 may also transmit a single frame (slot or modulation signal) to base station #1 labeled 901_1.

Note that "terminal #1 transmission frame (1) labeled 5111_11" and "terminal #1 transmission frame (2) labeled 5111_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case C2>

FIGS. 52A and 52B illustrate exemplary configurations of "data-symbol-included frame group 4252_*i*". Note that the horizontal axes represent time in FIGS. 52A and 52B. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIGS. 52A and 52B, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIGS. 52A and 52B illustrate frames (slots or modulation signals) transmitted by terminal #1 labeled 902_1. Although not illustrated in FIGS. 52A and 52B, there may be a frame (slot or modulation signal) transmitted by a terminal other than terminal #1 labeled 902_1 (see FIG. 25).

In this example, in data-symbol-included frame group 4252_*i*, "terminal #1 transmission frame (1) labeled 5211_11" transmitted by terminal #1 labeled 902_1 is present in the first transmission period as illustrated in FIG. 52A and "terminal #1 transmission frame (2) labeled 5211_12" transmitted by terminal #1 labeled 902_1 is present in the third transmission period as illustrated in FIG. 52B.

For example, terminal #1 labeled 902_1 transmits, to base station #1 labeled 901_1, "terminal #1 transmission frame (1) labeled 5211_11" present in the first transmission period as illustrated in FIG. 52A and "terminal #1 transmission frame (2) labeled 5211_12" present in the third transmission period as illustrated in FIG. 52B. At this time, "terminal #1 transmission frame (1) labeled 5211_11" is transmitted from transmission panel antenna 1 labeled 106_1 of terminal #1 labeled 902_1, and "terminal #1 transmission frame (2) labeled 5211_12" is transmitted from transmission panel antenna 2 labeled 106_2 of terminal #1 labeled 902_1.

As described above, "terminal #1 transmission frame (l) labeled 5211_11" and "terminal #1 transmission frame (2) labeled 5211_12" are present because "terminal #1 labeled 902_1 transmits two modulation signals (streams) to base station #1 labeled 901_1".

At this time, "terminal #1 transmission frame (1) labeled 5211_11" includes, for example, a data symbol (data and/or information) addressed to base station #1 labeled 901_1.

In addition, "terminal #1 transmission frame (2) labeled 5211_12" also includes, for example, a data symbol (data and/or information) addressed to base station #1 labeled 901_1.

The above example has described the case where terminal #1 labeled 902_1 transmits, to base station #1 labeled 901_1, "terminal #1 transmission frame (1) labeled 5211_11" and "terminal #1 transmission frame (2) labeled 4511_12" as illustrated in FIGS. 52A and 52B, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that "terminal #1 transmission frame (1) labeled 5211_11" and "terminal #1 transmission frame (2) labeled 5211_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

<Case C3>

FIG. 53 illustrates an exemplary configuration of "data-symbol-included frame group 4252_*i*". Note that the horizontal axis represents time in FIG. 53. To simplify the description, terminal #1 labeled 902_1 includes four transmission panel antennas, which are transmission panel antenna 1 labeled 106_1, transmission panel antenna 2 labeled 106_2, transmission panel antenna 3 labeled 106_3, and transmission panel antenna 4 labeled 106_4. In FIG. 53, there are a first transmission period, a second transmission period, a third transmission period, a fourth transmission period, a fifth transmission period, a sixth transmission period, a seventh transmission period, and an eighth transmission period for "data-symbol-included frame group 4252_*i*", as in FIG. 25.

Note that FIG. 53 illustrates frames (slots or modulation signals) transmitted by terminal #1 labeled 902_1. Although not illustrated in FIG. 53, there may be a frame (slot or modulation signal) transmitted by a terminal other than terminal #1 labeled 902_1 (see FIG. 25).

In this example, in data-symbol-included frame group 4252_*i*, "terminal #1 transmission frame (1) labeled 5311_11" transmitted by terminal #1 labeled 902_1 is present in the first transmission period and "terminal #1 transmission frame (2) labeled 5311_12" transmitted by terminal #1 labeled 902_1 is present in the third transmission period as illustrated in FIG. 53.

For example, terminal #1 labeled 902_1 transmits, to base station #1 labeled 901_1, "terminal #1 transmission frame (1) labeled 5311_11" present in the first transmission period and "terminal #1 transmission frame (2) labeled 5311_12" present in the third transmission period as illustrated in FIG. 53. At this time, "terminal #1 transmission frame (1) labeled 5311_11" and "terminal #1 transmission frame (2) labeled 5311_12" are transmitted from transmission panel antenna 1 labeled 106_1 of terminal #1 labeled 902_1, which means a single transmission panel antenna has been selected.

As described above, "terminal #1 transmission frame (1) labeled 5311_11" and "terminal #1 transmission frame (2) labeled 5311_12" are present because "terminal #1 labeled 902_1 transmits two frames (resources) to base station #1 labeled 901_1".

At this time, "terminal #1 transmission frame (1) labeled 5311_11" and "terminal #1 transmission frame (2) labeled 5311_12" include, for example, data symbols (data and/or information) addressed to base station #1 labeled 901_1.

The above example has described the case where terminal #1 labeled 902_1 transmits, to base station #1 labeled 901_1, "terminal #1 transmission frame (1) labeled 5311_11" and "terminal #1 transmission frame (2) labeled 5311_12" as illustrated in FIG. 53, but terminal #1 labeled 902_1 may transmit three or more frames (slots or modulation signals) (a plurality of frames (slots or modulation signals) using a plurality of time resources) to base station #1 labeled 901_1. Terminal #1 labeled 902_1 may also transmit a single frame (slot or modulation signal) to base station #1 labeled 901_1.

Note that "terminal #1 transmission frame (1) labeled 5311_11" and "terminal #1 transmission frame (2) labeled 5311_12" may each include, in addition to the data symbol, a "reference signal such as DMRS, PTRS, or SRS", a pilot symbol, a pilot signal, a preamble, and a symbol including control information, for example. Examples of the symbol including the control information may include information of a destination base station (ID for identifying the base station), a transmission method of the modulation signal, information of the modulation scheme, information of the error correction coding scheme (code length, code rate, etc.), information of MCS, and the like.

As described thus far, transmitting frames according to <Case C1> to <Case C3>, for example, reduces interference between the frames, and efficiently assigning the frames and slots produces an effect of enhancing data transmission efficiency.

Note that the base station and the terminals may perform communication according to any of the methods of <Case C1> to <Case C3>, and the base station and the terminals may perform communication selecting any of the communication methods of <Case C1> to <Case C3> depending on the radio propagation environment, the communication state, etc.

As described above in Embodiment 9, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, operations have been described using various frame configurations in Embodiment 9, but the frames used in Embodiment 9 are merely examples and the frame configuration is not limited to the examples. In addition, the terms “signal”, “frame”, “modulation signal” “frame”, etc. are used in the present embodiment, but the terms are not limited to those and the important part is the functions of the signals to be transmitted.

Embodiment 10

In Embodiment 10, a variation of Embodiment 1 will be descried. Note that the drawings used in Embodiment 1 are sometimes used in the following description of Embodiment 10.

FIGS. 1A, 1B, and 1C illustrate exemplary configurations of, for example, a base station, an access point, a terminal, and a repeater according to Embodiment 10, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 10. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a multi-carrier scheme such as the OFDM scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

Figure 73:
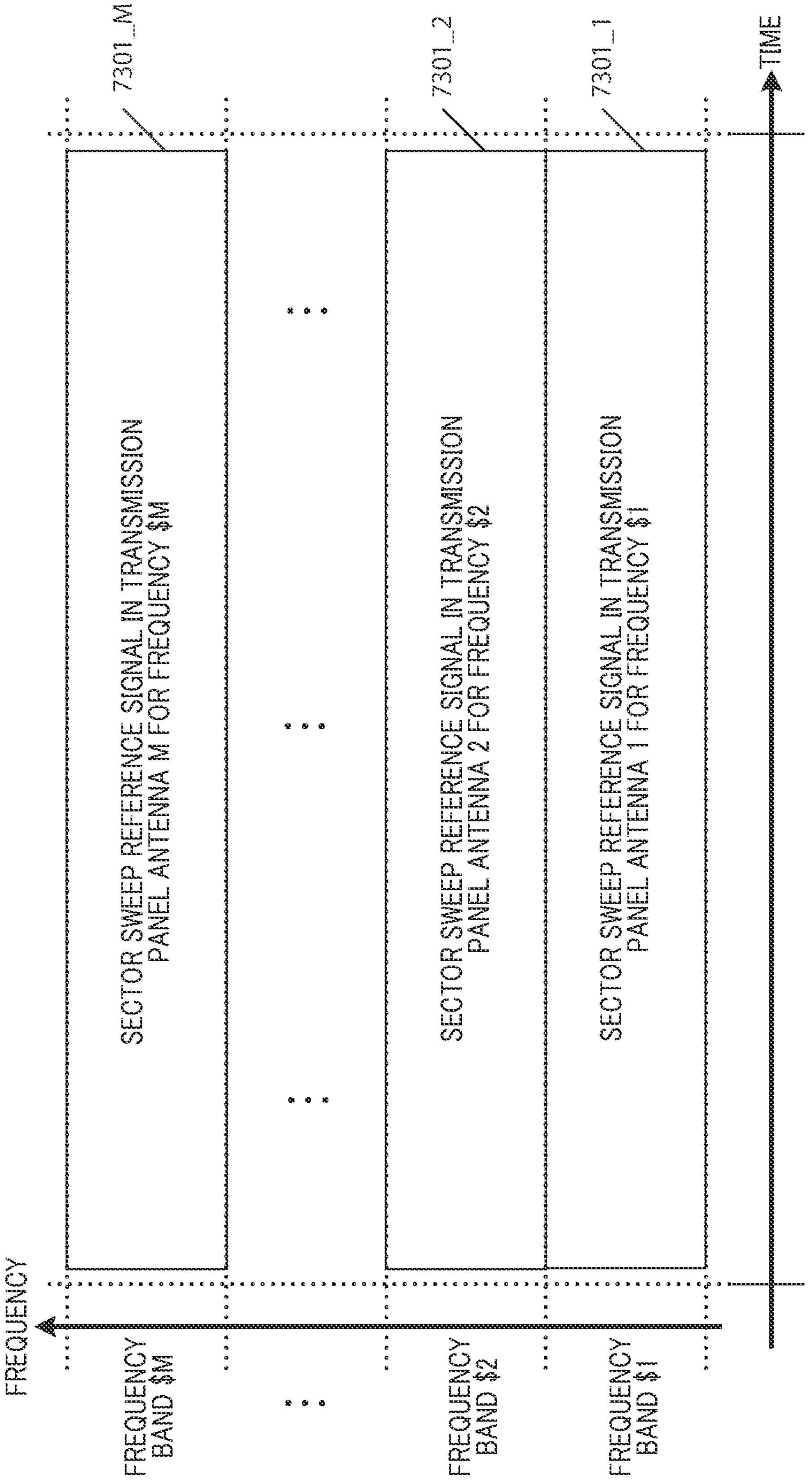
FIG. 73 illustrates exemplary sector sweep reference signals in FIG. 10 transmitted by base station #1 in FIG. 9 with the configuration in FIG. 1A, 1B, or 1C.

FIG. 73 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 73. In the example of FIG. 73, the frequency is divided into frequency band $1, frequency band $2, . . . , frequency band $M as illustrated in FIG. 73 for base station #1 labeled 901_1 to transmit modulation signals based on OFDMA. Note that M is an integer equal to or greater than 1 or an integer equal to or greater than 2. In the following description, M is the number of transmission panel antennas included in base station #1 labeled 901_1 in FIG. 9 with the configuration in FIG. 1A, 1B, or 1C, but the present disclosure is not limited to this.

For example, sector sweep reference signal 7301_1 in transmission panel antenna 1 for frequency $1 is present in frequency band $1.

Thus, sector sweep reference signal 7301_X in transmission panel antenna X for frequency $X is present in frequency band $X. Note that X is an integer from 1 to M (both inclusive).

Note that sector sweep reference signal 7301_X in transmission panel antenna X for frequency $X is transmitted from transmission panel antenna X labeled 106_X of base station #1 labeled 901_1 with the configuration in FIG. 1A, 1B, or 1C.

Figure 74:
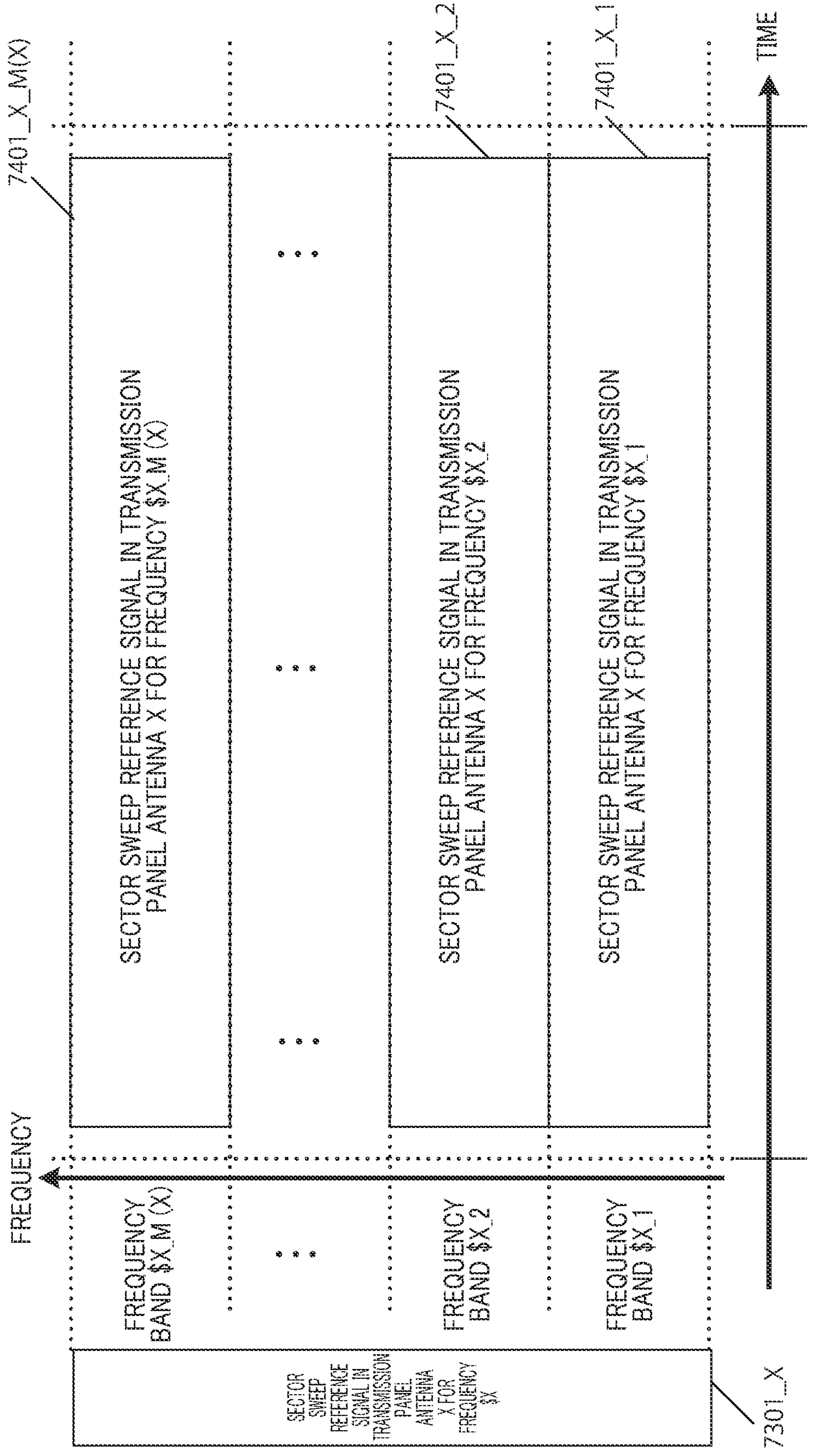
FIG. 74 illustrates an exemplary configuration of the "sector sweep reference signal in transmission panel antenna X for frequency $X" in FIG. 73.

FIG. 74 illustrates an exemplary configuration of “sector sweep reference signal 7301_X in transmission panel antenna X for frequency $X” in FIG. 73. Note that the vertical axis represents frequency and the horizontal axis represents time in FIG. 74.

Frequency band $X_1, frequency band $X_2, . . . , frequency band $X_M (X) are included in frequency $X where “sector sweep reference signal 7301_X in transmission panel antenna X for frequency $X" is present. Note that M (X) is an integer equal to or greater than 1 or an integer equal to or greater than 2.

Sector sweep reference signal 7401_X_i in transmission panel antenna X for frequency $X_i is present in frequency band $X_i. Note that i is an integer from 1 to M (X) (both inclusive).

Note that sector sweep reference signal 7401_X_i in transmission panel antenna X for frequency $X_i is transmitted from transmission panel antenna X labeled 106_X of base station #1 labeled 901_1 with the configuration in FIG. 1A, 1B, or 1C.

Figure 75:
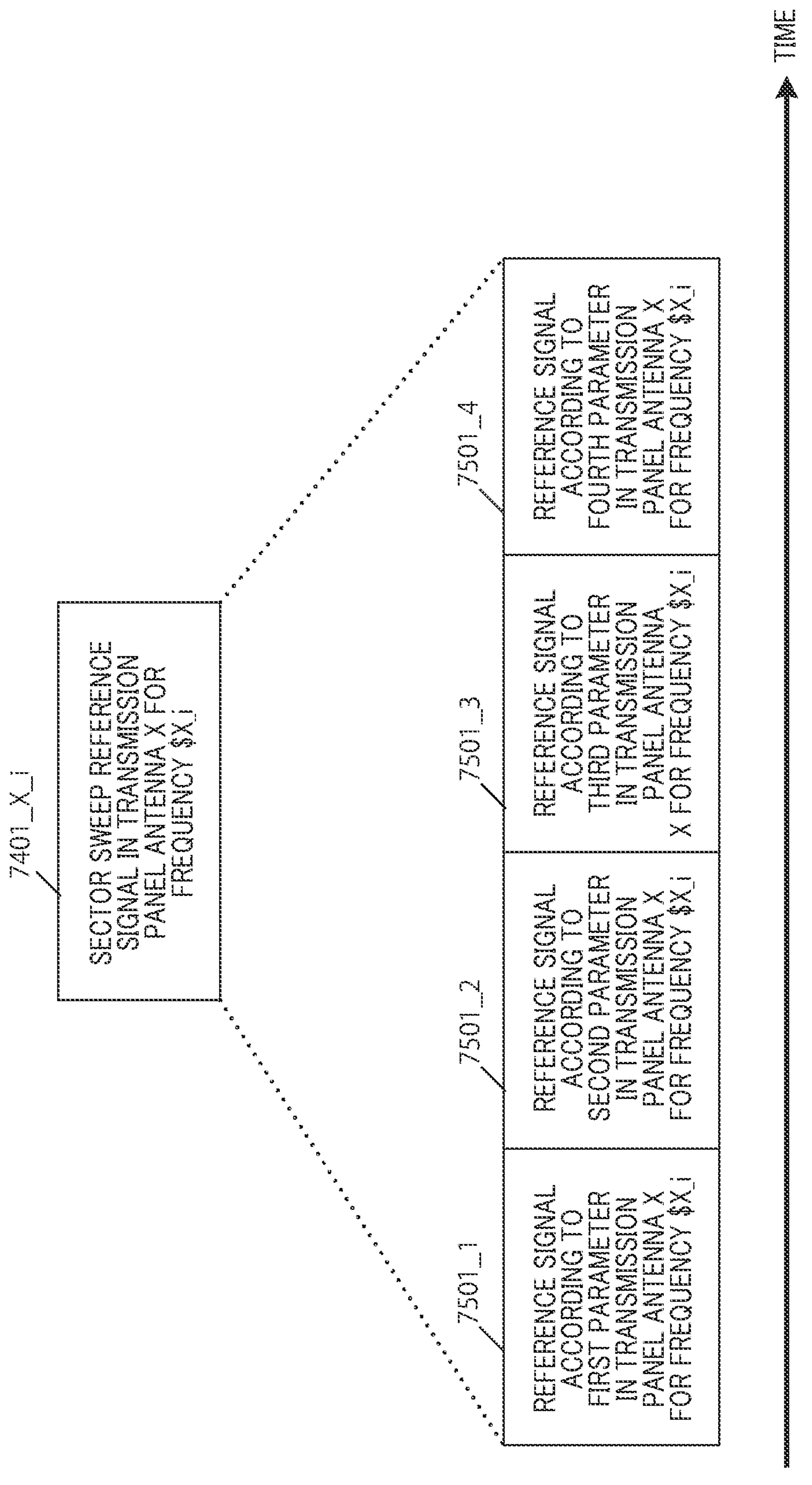
FIG. 75 illustrates an exemplary configuration of the "sector sweep reference signal in transmission panel antenna X for frequency $X_i" in FIG. 74.

FIG. 75 illustrates an exemplary configuration of "sector sweep reference signal 7401_X_i in transmission panel antenna X for frequency $X_i" in FIG. 74. Note that the horizontal axis represents time in FIG. 75.

"Sector sweep reference signal 7401_X_i in transmission panel antenna X for frequency $X_i" in FIG. 74 is composed of reference signal 7501_1 according to first parameter in transmission panel antenna X for frequency $X_i, reference signal 7501_2 according to second parameter in transmission panel antenna X for frequency $X_i, reference signal 7501_3 according to second parameter in transmission panel antenna X for frequency $X_i, and reference signal 7501_4 according to second parameter in transmission panel antenna X for frequency $X_i.

Next, a description will be given of a method of transmitting "sector sweep reference signal 7401_X_i in transmission panel antenna X for frequency $X_i" that is configured as in FIGS. 74 and 75 and transmitted by base station #1 labeled 901_1 with the configuration in FIG. 1A, 1B, or 1C.

For example, base station #1 labeled 901_1 with the configuration in FIG. 1A, 1B, or 1C includes the configuration in FIG. 3 as transmission panel antenna i labeled 106_*i*.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, 1). When first transmission signal 303_1 of "reference signal 7501_1 according to first parameter in transmission panel antenna X for frequency $X_i" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, 1). When second transmission signal 303_2 of "reference signal 7501_1 according to first parameter in transmission panel antenna X for frequency $X_i" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, 1). When third transmission signal 303_3 of "reference signal 7501_1 according to first parameter in transmission panel antenna X for frequency $X_i" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, 1). When fourth transmission signal 303_4 of "reference signal 7501_1 according to first parameter in transmission panel antenna X for frequency $X_i" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 7501_*j* according to j-th parameter in transmission panel antenna X for frequency $X_i".

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, j). When first transmission signal 303_1 of "reference signal 7501_*j* according to j-th parameter in transmission panel antenna X for frequency $X_i" is tx1refj(t), multiplier 304_1 obtains tx1refj(t)×w1(i, j). Then, base station #1 labeled 901_1 transmits tx1refj(t)×w1(i, j) from antenna 306_1 in FIG. 3. Note that t represents time.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, j). When second transmission signal 303_2 of "reference signal 7501_*j* according to j-th parameter in transmission panel antenna X for frequency $X_i" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, j). When third transmission signal 303_3 of "reference signal 7501_*j* according to j-th parameter in transmission panel antenna X for frequency $X_i" is tx3refj(t), multiplier 304_3 obtains tx3refj(t)×w3(i, j). Then, base station #1 labeled 901_1 transmits tx3refj(t)×w3(i, j) from antenna 306_3 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, j). When fourth transmission signal 303_4 of "reference signal 7501_*j* according to j-th parameter in transmission panel antenna X for frequency $X_i" is tx4refj(t), multiplier 304_4 obtains tx4refj(t)×w4(i, j). Then, base station #1 labeled 901_1 transmits tx4refj(t)×w4(i, j) from antenna 306_4 in FIG. 3.

Note that j is an integer from 1 to 4 (both inclusive) in the case of FIG. 75. The number Z of parameter changes is four in FIG. 75, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 73, 74, and 75, when base station #1 labeled 901_1 transmits "sector sweep reference signal 7401_X_i in transmission panel antenna X for frequency $X_i", "reference signal 7501_*j* according to j-th parameter in transmission panel antenna X for frequency $X_i" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal 7501_*j* according to j-th parameter in transmission panel antenna X for frequency $X_i";

- Information on the frequency band and/or frequency $X_i (information of the number of frequency divisions may also be included), which will be described later.

Transmission of the "identification number (ID) of the transmission panel antenna" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of time divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency $X_i" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 10, the description is based on a case where the terminals transmit signals using a multi-carrier scheme such as OFDM and frequency (bands) used by the base station and frequency (bands) used by the terminals partially overlap each other, by way of example.

FIG. 13 illustrates an exemplary operation in the time period from time t1 to t2, which is the terminal response period. Note that the horizontal axis represents time in FIG. 13. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period.

As illustrated in FIGS. 10 and 13, for example, base station #1 labeled 901_1 transmits sector sweep reference signals in the time period from time t0 to t1. After that, the terminal response period, which is the time period from time LI to t2, includes terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, as illustrated in FIG. 13.

Thus, in the case of FIG. 13, "the number of time divisions in which sector sweep reference signals can be transmitted when the terminals transmit the sector sweep reference signals" is set to four by base station #1 labeled 901_1.

Figure 76:
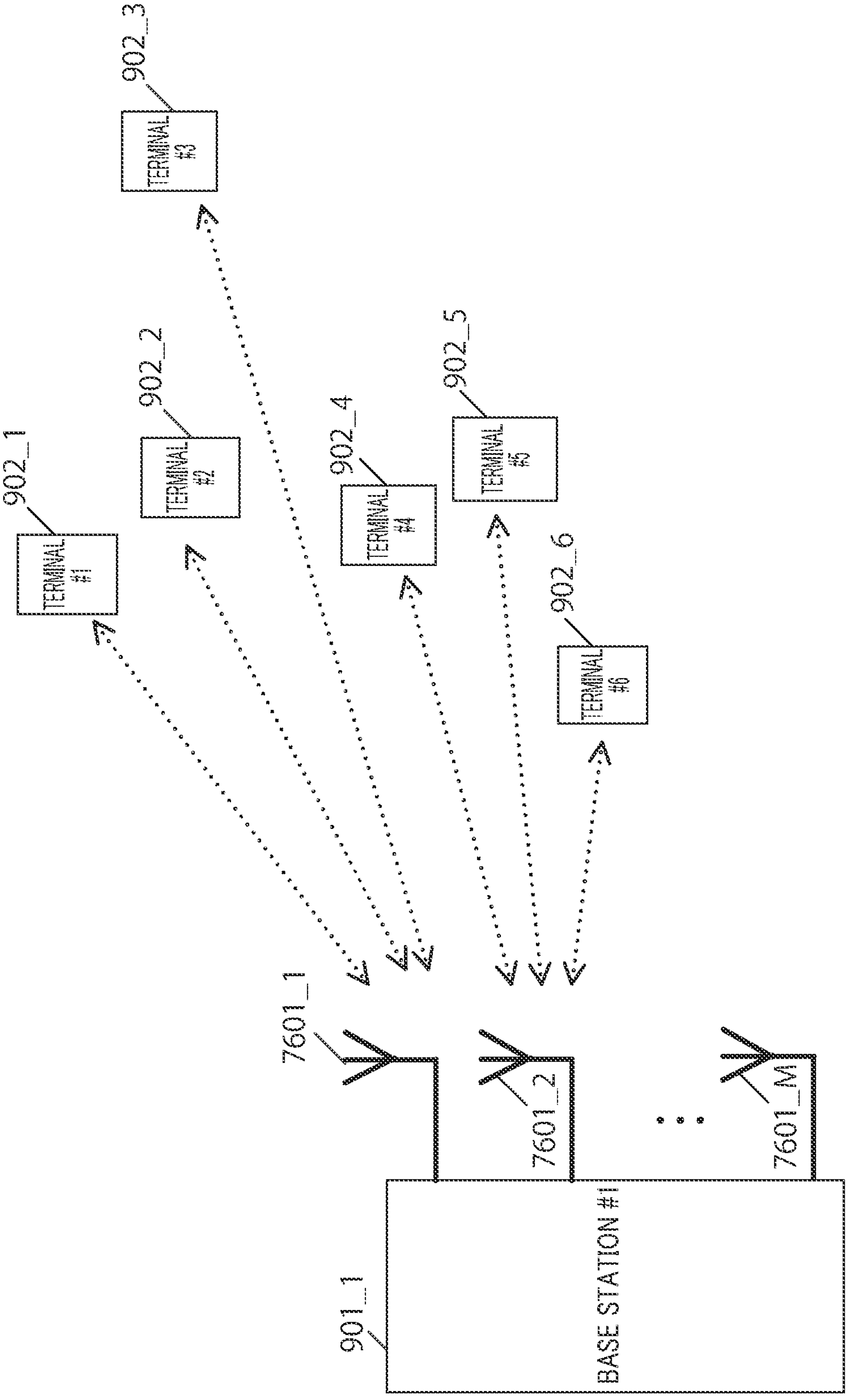
FIG. 76 illustrates an exemplary relationship between a base station and terminals.

FIG. 76 illustrates an exemplary relationship between base station #1 labeled 901_1 and terminal #i labeled 902_*i* in Embodiment 10, and the components that operate in the same manner as in FIG. 9 are denoted by the same reference signs. As illustrated in FIGS. 1A, 1B, and 1C, base station #1 labeled 901_1 includes transmission panel antenna 1 labeled 7601_1, transmission panel antenna 2 labeled 7601_2, . . . , transmission panel antenna M labeled 7601_M.

Base station #1 labeled 901_1 communicates with terminal #1 labeled 902_1, terminal #2 labeled 902_2, and terminal #3 labeled 902_3 using transmission panel antenna 1 labeled 7601_1.

In addition, base station #1 labeled 901_1 communicates with terminal #4 labeled 902_4, terminal #5 labeled 902_5, and terminal #6 labeled 902_6 using transmission panel antenna 2 labeled 7601_2.

Note that base station #1 labeled 901 may communicate with other terminals using transmission panel antenna 3 labeled 7601_3 to transmission panel antenna M labeled 7601_M, but a description on this point will be omitted for simplicity.

Figure 77B:
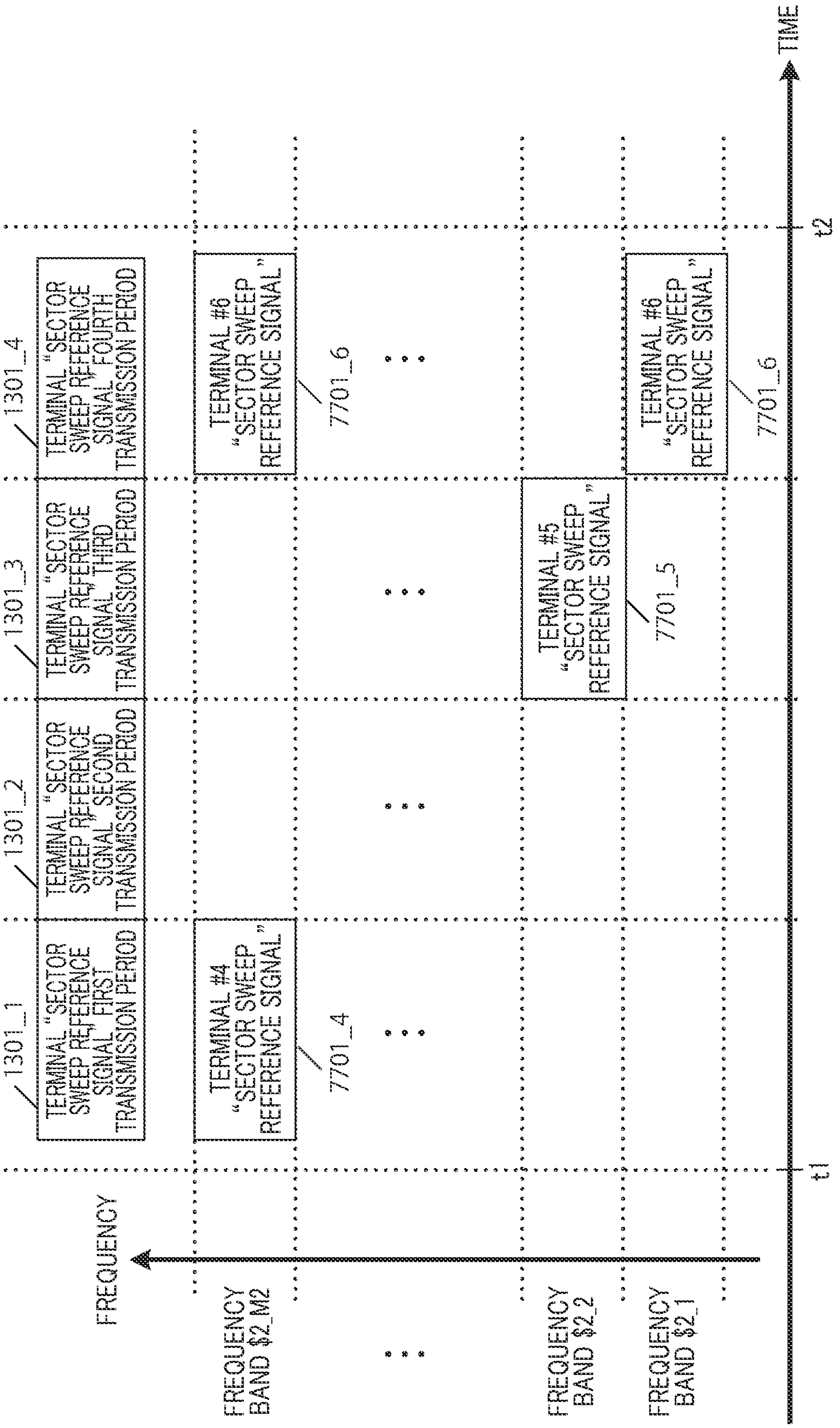
FIG. 77B illustrates exemplary occupation by the terminals in the terminal "sector sweep reference signal" transmission periods illustrated in FIG. 13.

FIGS. 77A and 77B illustrate exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13. Note that the vertical axis represents frequency and the horizontal axis represents time in FIGS. 77A and 77B.

FIG. 77A illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13 in frequency band $1_1 to frequency band $1_M1.

Since it is "frequency band $1_1 to frequency band $1_M1", a terminal that has received a "sector sweep reference signal (see FIGS. 74 and 75)" transmitted from transmission panel antenna 1 labeled 7601_1 by base station #1 labeled 901_1 transmits a "sector sweep reference signal" in "frequency band $1_1 to frequency band $1_M1". Thus, as illustrated in FIG. 76, terminal #1 labeled 902_1, terminal #2 labeled 902_2, and terminal #3 labeled 902_3 transmit "sector sweep reference signals" using "frequency band $1_1 to frequency band $1_M1".

Terminal #1 labeled 902_1 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #1 labeled 902_1 estimates, for example, "transmission panel antenna a1 (=1) and parameter b1" as the "transmission panel antenna and parameter" with high reception quality. Terminal #1 labeled 902_1 also estimates frequency band $1_M1 as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 77A, terminal #1 labeled 902_1 obtains information indicating that "the number of time divisions in which sector sweep reference signals can be transmitted when the terminals transmit the sector sweep reference signals" is four.

In this case, terminal #1 labeled 902_1 obtains, for example, any one of the values "0", "1", "2", and "3" using a random number. For example, terminal #1 labeled 902_1 obtains "0" using a random number. In this case, since "0"+1=1, terminal #1 labeled 902_1 transmits terminal #1 "sector sweep reference signal" 7701_1 using "terminal "sector sweep reference signal" first (="0"+1) transmission period 1301_1" as well as frequency band $1_M1 in FIG. 77A. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 7701_1 includes information of the "transmission panel antenna and parameter" with high reception quality obtained by terminal #1 labeled 902_1, that is, information of "transmission panel antenna a1 (=1) and parameter b1". Terminal #1 "sector sweep reference signal" 7701_1 may also include information of the "frequency domain", for example, information of "frequency band $1_M1". This will be described later.

Likewise, terminal #2 labeled 902_2 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #2 labeled 902_2 estimates, for example, "transmission panel antenna a2 (=1) and parameter b2" as the "transmission panel antenna and parameter" with high reception quality. Terminal #2 labeled 902_2 also estimates frequency band $1_1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 77A, terminal #2 labeled 902_2 obtains information indicating that "the number of time divisions in which sector sweep reference signals can be transmitted when the terminals transmit the sector sweep reference signals" is four.

In this case, terminal #2 labeled 902_2 obtains, for example, any one of the values "0", "1", "2", and "3" using a random number. For example, terminal #2 labeled 902_2 obtains "1" using a random number. In this case, since "1"+1=2, terminal #2 labeled 902_2 transmits terminal #2 "sector sweep reference signal" 7701_2 using "terminal "sector sweep reference signal" second (="1"+1) transmission period 1301_2" as well as frequency band $1_1 in FIG. 77A.

Note that terminal #2 "sector sweep reference signal" 7701_2" includes information of the "transmission panel antenna and parameter" with high reception quality obtained by terminal #2 labeled 902_2, that is, information of "transmission panel antenna a2 (=1) and parameter b2". Terminal #2 "sector sweep reference signal" 7701_2 may also include information of the "frequency domain", for example, information of "frequency band $1_1". This will be described later.

Terminal #3 labeled 902_3 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #3 labeled 902_3 estimates, for example, "transmission panel antenna a3 (=1) and parameter b3" as the "transmission panel antenna and parameter" with high reception quality. Terminal #3 labeled 902_3 also estimates frequency band $1_1 and frequency band $1_2 as the "frequency domain" with high reception quality.

In addition, while estimating the "transmission panel antenna and parameter" with high reception quality, terminal #3 labeled 902_3 simultaneously obtains information of "the number of time divisions in which sector sweep reference signals can be transmitted when the terminals transmit the sector sweep reference signals". In the case of FIG. 77A, terminal #3 labeled 902_3 obtains information indicating that "the number of time divisions in which sector sweep reference signals can be transmitted when the terminals transmit the sector sweep reference signals" is four.

In this case, terminal #3 labeled 902_3 obtains, for example, any one of the values "0", "1", "2", and "3" using a random number. For example, terminal #3 labeled 902_3 obtains "2" using a random number. In this case, since "2"+1=3, terminal #3 labeled 902_3 transmits terminal #3 "sector sweep reference signal" 7701_3 using "terminal "sector sweep reference signal" third (="2"+1) transmission period 1301_3" as well as frequency band $1_1 and frequency band $1_2 in FIG. 77A.

Note that terminal #3 "sector sweep reference signal 7701_3" includes information of the "transmission panel antenna and parameter" with high reception quality obtained by terminal #3 labeled 902_3, that is, information of "transmission panel antenna a3 (=1) and parameter b3". Terminal #3 "sector sweep reference signal" 7701_3 may also include information of the "frequency domain", for example, information of "frequency band $1_1 and frequency band $1_2". This will be described later.

Note that terminal #i "sector sweep reference signal" **7701_*i* may be assigned to a plurality of frequency bands as illustrated in FIG. 77A. At this time, terminal #1 "sector sweep reference signal" 7701_*i* may be assigned to frequency bands discretely. (As a result, terminal #i "sector sweep reference signal" 7701_*i*** is assigned to one or more frequency bands.)

Further, terminal #i "sector sweep reference signal" **7701_*i* may be assigned to a plurality of time periods. At this time, terminal #i "sector sweep reference signal" 7701_*i* may be assigned to time periods discretely. (As a result, terminal #i "sector sweep reference signal" 7701_*i*** is assigned to one or more time periods.)

FIG. 77B illustrates exemplary occupation by the terminals in terminal "sector sweep reference signal" first transmission period 1301_1, terminal "sector sweep reference signal" second transmission period 1301_2, terminal "sector sweep reference signal" third transmission period 13013, and terminal "sector sweep reference signal" fourth transmission period 1301_4 illustrated in FIG. 13 in frequency band $2_1 to frequency band $2_M2.

Since it is "frequency band $2_1 to frequency band $2_M2", a terminal that has received a "sector sweep reference signal (see FIGS. 74 and 75)" transmitted from transmission panel antenna 2 labeled 7601_1 by base station #1 labeled 901_1 transmits a "sector sweep reference signal" in "frequency band $2_1 to frequency band $2_M2". Thus, as illustrated in FIG. 76, terminal #4 labeled 902_4, terminal #5 labeled 902_5, and terminal #6 labeled 902_6 transmit "sector sweep reference signals" using "frequency band $2_1 to frequency band $2_M2".

Terminal #4 labeled 902_4 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #4 labeled 902_4 estimates, for example, "transmission panel antenna a4 (=2) and parameter b4" as the "transmission panel antenna and parameter" with high reception quality. Terminal #4 labeled 902_1 also estimates frequency band $2_M2 as the "frequency domain" with high reception quality.

In addition, while estimating the "transmission panel antenna and parameter" with high reception quality, terminal #4 labeled 902_4 simultaneously obtains information of "the number of time divisions in which sector sweep reference signals can be transmitted when the terminals transmit the sector sweep reference signals". In the case of FIG. 77B, terminal #4 labeled 902_4 obtains information indicating that "the number of time divisions in which sector sweep reference signals can be transmitted when the terminals transmit the sector sweep reference signals" is four.

In this case, terminal #4 labeled 902_4 obtains, for example, any one of the values "0", "1", "2", and "3" using a random number. For example, terminal #4 labeled 902_4 obtains "0" using a random number. In this case, since "0"+1=1, terminal #4 labeled 902_4 transmits terminal #4 "sector sweep reference signal" 7701_4 using "terminal "sector sweep reference signal" first (="0"+1) transmission period 1301_1" as well as frequency band $2_M2 in FIG. 77B. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #4 "sector sweep reference signal" 7701_4 includes information of the "transmission panel antenna and parameter" with high reception quality obtained by terminal #4 labeled 902_4, that is, information of "transmission panel antenna a4 (=2) and parameter b4". Terminal #4 "sector sweep reference signal" 7701_4 may also include information of the "frequency domain", for example, information of "frequency band $2_M2". This will be described later.

Likewise, terminal #5 labeled 902_5 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #5 labeled 902_5 estimates, for example, "transmission panel antenna a5 (=2) and parameter b5" as the "transmission panel antenna and parameter" with high reception quality. Terminal #5 labeled 902_5 also estimates frequency band $2_2 as the "frequency domain" with high reception quality.

In addition, while estimating the "transmission panel antenna and parameter" with high reception quality, terminal #5 labeled 902_5 simultaneously obtains information of "the number of time divisions in which sector sweep reference signals can be transmitted when the terminals transmit the sector sweep reference signals". In the case of FIG. 77B, terminal #5 labeled 902_5 obtains information indicating that "the number of time divisions in which sector sweep reference signals can be transmitted when the terminals transmit the sector sweep reference signals" is four.

In this case, terminal #5 labeled 902_5 obtains, for example, any one of the values "0", "1", "2", and "3" using a random number. For example, terminal #5 labeled 902_5 obtains "2" using a random number. In this case, since "2"+1=3, terminal #5 labeled 902_5 transmits terminal #5 "sector sweep reference signal" 7701_5 using "terminal "sector sweep reference signal" third (="2"+1) transmission period 1301_3" as well as frequency band $2_2 in FIG. 77B.

Note that terminal #5 "sector sweep reference signal 7701_5" includes information of the "transmission panel antenna and parameter" with high reception quality obtained by terminal #5 labeled 902_5, that is, information of "transmission panel antenna a5 (=2) and parameter b5". Terminal #5 "sector sweep reference signal" 7701_5 may also include information of the "frequency domain", for example, information of "frequency band $2_2". This will be described later.

Terminal #6 labeled 902_6 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #6 labeled 902_6 estimates, for example, "transmission panel antenna a6 (=2) and parameter b6" as the "transmission panel antenna and parameter" with high reception quality. Terminal #6 labeled 902_6 also estimates frequency band $2_1 and frequency band $2_M2 as the "frequency domain" with high reception quality.

In addition, while estimating the "transmission panel antenna and parameter" with high reception quality, terminal #6 labeled 902_6 simultaneously obtains information of "the number of time divisions in which sector sweep reference signals can be transmitted when the terminals transmit the sector sweep reference signals". In the case of FIG. 77B, terminal #6 labeled 902_6 obtains information indicating that "the number of time divisions in which sector sweep reference signals can be transmitted when the terminals transmit the sector sweep reference signals" is four.

In this case, terminal #6 labeled 902_6 obtains, for example, any one of the values "0", "1", "2", and "3" using a random number. For example, terminal #6 labeled 902_6 obtains "3" using a random number. In this case, since "3"+1=4, terminal #6 labeled 902_6 transmits terminal #6 "sector sweep reference signal" 7701_6 using "terminal "sector sweep reference signal" fourth (="3"+1) transmission period 1301_3" as well as frequency band $2_1 and frequency band $2_M2 in FIG. 77B.

Note that terminal #6 "sector sweep reference signal 7701_6" includes information of the "transmission panel antenna and parameter" with high reception quality obtained by terminal #6 labeled 902_6, that is, information of "transmission panel antenna a6 (=2) and parameter b6". Terminal #6 "sector sweep reference signal" 7701_6 may also include information of the "frequency domain", for example, information of "frequency band $2_1 and frequency band $2_M2". This will be described later.

Note that terminal #i "sector sweep reference signal" **7701_*i* may be assigned to a plurality of frequency bands as illustrated in FIG. 77B. At this time, terminal #i "sector sweep reference signal" 7701_*i* may be assigned to frequency bands discretely. (As a result, terminal #i "sector sweep reference signal" 7701_*i*** is assigned to one or more frequency bands.)

Further, terminal #i "sector sweep reference signal" **7701_*i* may be assigned to a plurality of time periods. At this time, terminal #i "sector sweep reference signal" 7701_*i* may be assigned to time periods discretely. (As a result, terminal #i "sector sweep reference signal" 7701_*i*** is assigned to one or more time periods.)

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" **7701_*i* transmitted by terminal #i labeled 902_*i* described with reference to FIGS. 77A and 77B. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3**.

Note that FIGS. 77A and 77B illustrate exemplary communication with the terminals using transmission panel antenna 1 labeled 7601_1 and transmission panel antenna 2 labeled 7601_2 of base station #1 labeled 901_1, but communication with the terminals may be similarly performed using another transmission panel antenna.

Terminal #i labeled **902_*i* transmits terminal #i "sector sweep reference signal" 7701_*i* as illustrated in FIGS. 77A and 77B. FIG. 15A illustrates an exemplary configuration of terminal #i "sector sweep reference signal" 7701_*i*. Note that the horizontal axis represents time in FIG. 15**A.

In FIG. 15A, terminal #i "sector sweep reference signal" **1401_*i* of terminal #i labeled 902_*i* corresponds terminal #i "sector sweep reference signal" 7701_*i* in FIGS. 77A and 77B. Terminal #i "sector sweep reference signal" 7701_*i* is composed of "sector sweep reference signal 1501_1 in terminal #i transmission panel antenna 1, sector sweep reference signal 1501_2 in terminal #i transmission panel antenna 2, . . . , sector sweep reference signal 1501**_M in terminal #i transmission panel antenna M".

For example, terminal #1 labeled **902_*i* with the configuration in FIG. 1A, 1B, or 1C transmits "sector sweep reference signal 1501_1 in terminal #i transmission panel antenna 1" using transmission panel antenna 1 labeled 106_1**.

That is, terminal #i labeled **902_*i* with the configuration in FIG. 1A, 1B, or 1C transmits "sector sweep reference signal 1501_*k* in terminal #i transmission panel antenna k" using transmission panel antenna k labeled 106_*k***. Note that k is an integer from 1 to M (both inclusive).

Note that the number of transmission panel antennas included in terminal #i labeled **902_*i* is M in FIG. 15**A, but the number of transmission panel antennas is not limited to this and may be N, where N is an integer equal to or greater than 1.

FIG. 15B illustrates an exemplary configuration of "sector sweep reference signal **1501_*xi* in terminal #i transmission panel antenna xi" in FIG. 15A. Note that the horizontal axis represents time in FIG. 15**.

As illustrated in FIG. 15B, "sector sweep reference signal **1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4** according to fourth parameter in transmission panel antenna xi".

For example, terminal #i labeled **902_*i* with the configuration in FIG. 1A, 1B, or 1C includes the configuration in FIG. 3 as transmission panel antenna xi labeled 106_*xi***.

A description will be given of "reference signal 1511_1 according to first parameter in transmission panel antenna xi".

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3**. Note that t represents time.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3**.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3**.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3**.

A description will be given of "reference signal **1511_*j*** according to j-th parameter in transmission panel antenna xi".

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3**. Note that t represents time.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #1 labeled 902_*i* transmits tx2refj(t)×w2(xi, j) from antenna 306_2 in FIG. 3**.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3**.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3**.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 77A, 77B, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

Information of the "transmission panel antenna and parameter" of base station #1 labeled 901_1 with high reception quality, as described above.

Thus, terminal #i labeled **902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15**A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIGS. 77A and 77B, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 77A, 77B, 15A, and 15B, when terminal #1 labeled 902_*i* transmits "sector sweep reference signal 1501_*xi* in terminal #i transmission panel antenna xi". "reference signal 1511_*j* according to j-th parameter in transmission panel antenna xi" includes, for example, the following information:

Identification number (ID) of the transmission panel antenna, which corresponds to xi here, for example; and Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces an effect of enhancing data reception quality.

Further, as illustrated in FIGS. 77A, 77B, 15A, and 15B, when terminal #1 labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency $X_i" that has been used for transmission by terminal #i labeled 902_*i* or that terminal #i labeled 902_*i* desires base station #1 labeled 901_1 to use.

Transmission of the "information on the frequency band and/or frequency $X_i" by terminal #i labeled 902_*i* allows base station #1 labeled 901_1 to recognize the "information on the frequency band and/or frequency $X_i"; accordingly, terminal #i labeled 902_*i* and base station #1 labeled 901_1 can perform appropriate control. This produces an effect of enhancing data reception quality.

Figure 78A:
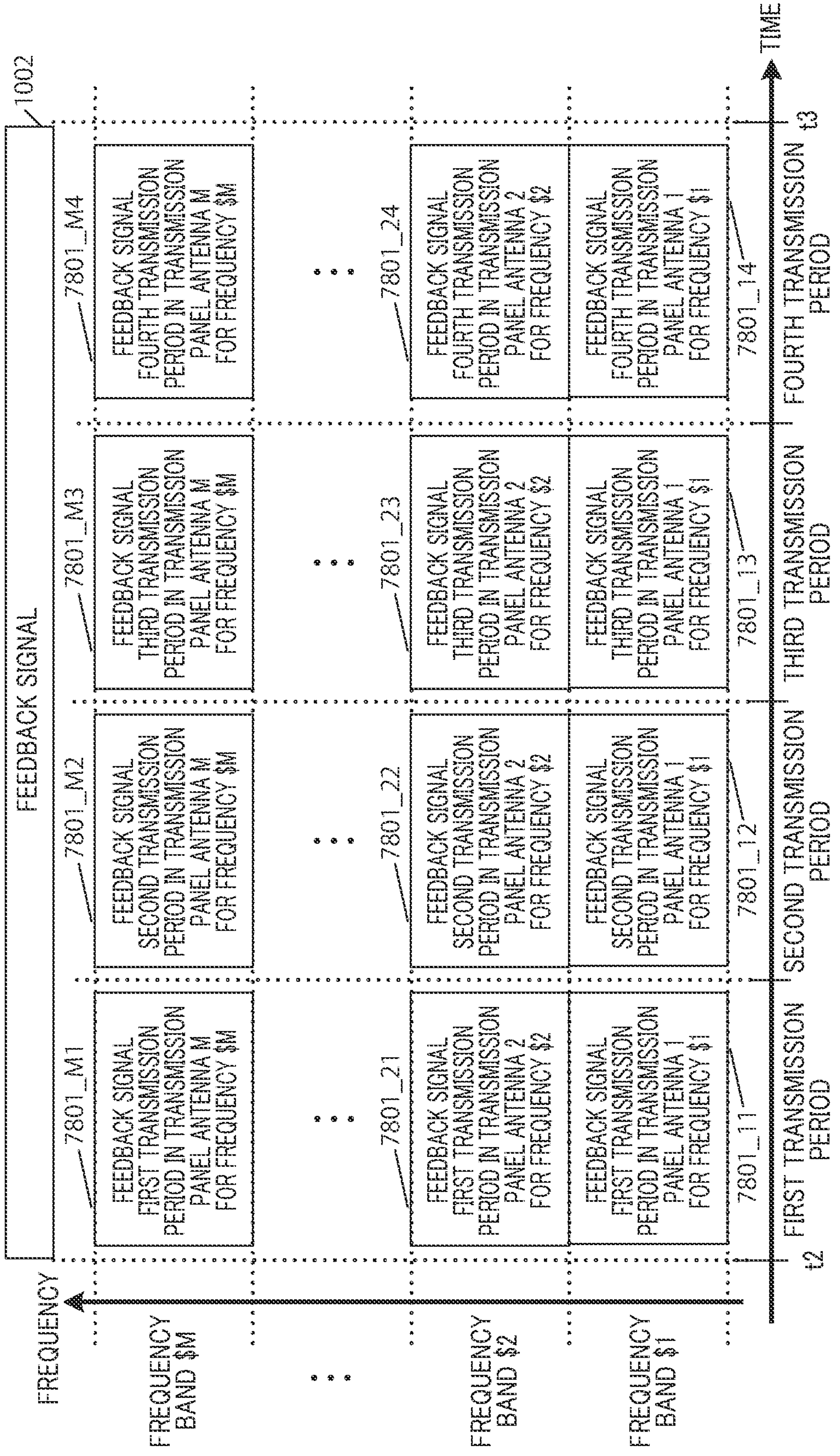

FIG. 78A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 78A. In this example, there are a first transmission period, a second transmission period, a third transmission period, and a fourth transmission period for feedback signal 1002 as illustrated in FIG. 78A. Note that Ω transmission periods may be configured to be present for feedback signal 1002, where Ω is an integer equal to or greater than 1 or an integer equal to or greater than 2.

In addition, there are frequency band $1, frequency band $2, . . . , frequency band $M for feedback signal 1002 in FIG. 78A.

Thus, the first transmission period includes feedback signal first transmission period 7801_11 in transmission panel antenna 1 for frequency $1, feedback signal first transmission period 7801_21 in transmission panel antenna 2 for frequency $2, . . . , feedback signal first transmission period 7801_M1 in transmission panel antenna M for frequency $M. Likewise, the second transmission period includes feedback signal second transmission period 7801_12 in transmission panel antenna 1 for frequency $1, feedback signal second transmission period 7801_22 in transmission panel antenna 2 for frequency $2, . . . , feedback signal second transmission period 7801_M2 in transmission panel antenna M for frequency $M. The third transmission period includes feedback signal third transmission period 7801_13 in transmission panel antenna 1 for frequency $1, feedback signal third transmission period 7801_23 in transmission panel antenna 2 for frequency $2, . . . , feedback signal third transmission period 7801_M3 in transmission panel antenna M for frequency $M. The fourth transmission period includes feedback signal fourth transmission period 7801_14 in transmission panel antenna 1 for frequency $1, feedback signal fourth transmission period 7801_24 in transmission panel antenna 2 for frequency $2, . . . , feedback signal fourth transmission period 7801_M4 in transmission panel antenna M for frequency $M.

One feature is that "feedback signals are transmitted from transmission panel antenna i in frequency band $i in FIG. 78A".

Figure 78B:
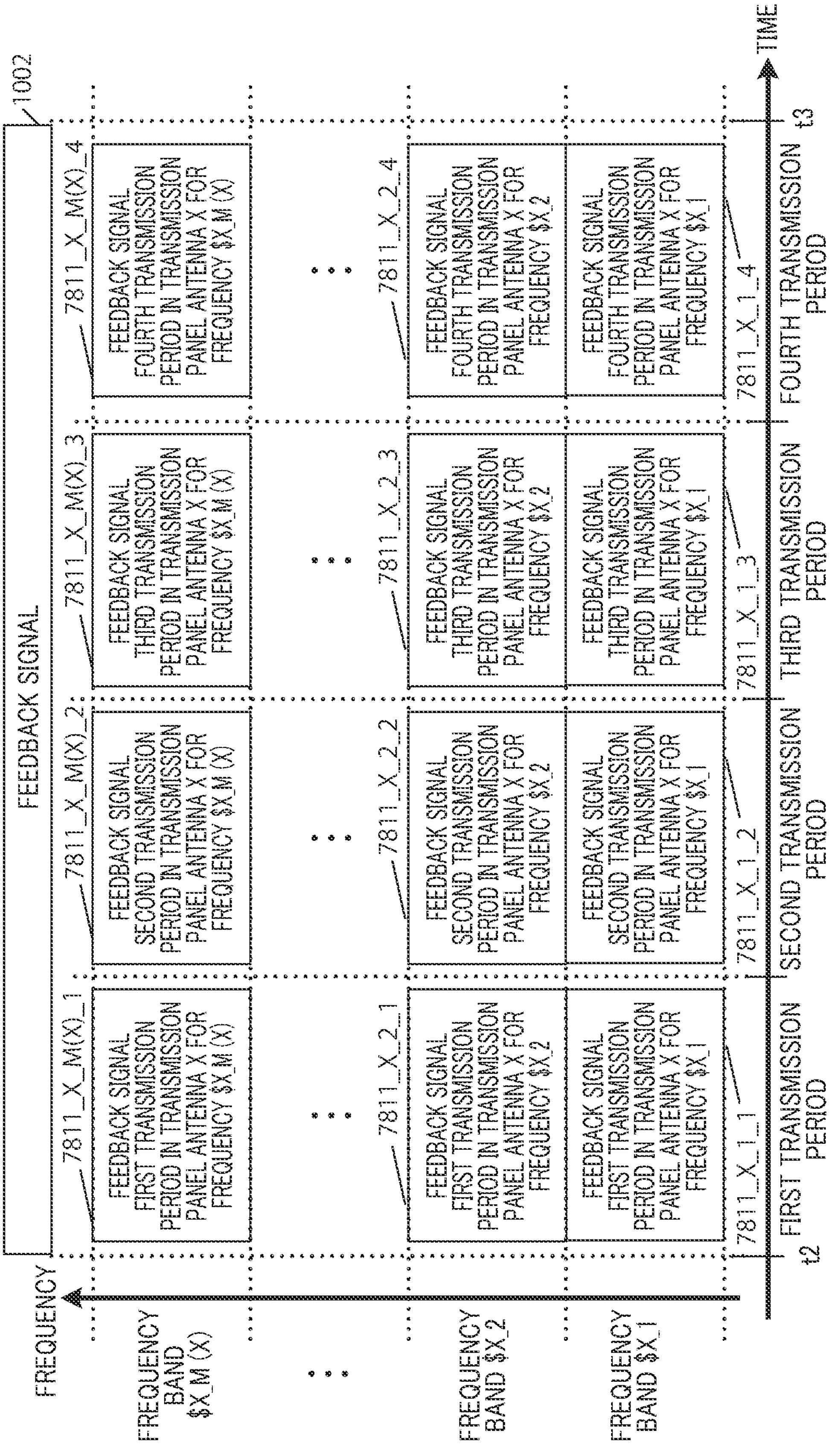

FIG. 78B illustrates an exemplary configuration of "feedback signal first transmission period 7801_X1 in transmission panel antenna X for frequency $X", "feedback signal second transmission period 7801_X2 in transmission panel antenna X for frequency $X", "feedback signal third transmission period 7801_X3 in transmission panel antenna X for frequency $X", and "feedback signal fourth transmission period 7801_X4 in transmission panel antenna X for frequency $X" in FIG. 78A. Note that the vertical axis represents frequency and the horizontal axis represents time in FIG. 78B.

Frequency band $X_1, frequency band $X_2, . . . , frequency band $X_M (X) are included in frequency $X where "feedback signal first transmission period 7801_X1 in transmission panel antenna X for frequency $X", "feedback signal second transmission period 7801_X2 in transmission panel antenna X for frequency $X", "feedback signal third transmission period 7801_X3 in transmission panel antenna X for frequency $X", and "feedback signal fourth transmission period 7801_X4 in transmission panel antenna X for frequency $X" are present. Note that M (X) is an integer equal to or greater than 1 or an integer equal to or greater than 2.

In frequency $X_i, feedback signal first transmission period 7811_X_i_1 in transmission panel antenna X for frequency $X_i, feedback signal second transmission period 7811_X_i_2 in transmission panel antenna X for frequency $X_i, feedback signal third transmission period 7811_X_i_3 in transmission panel antenna X for frequency $X_i, and feedback signal fourth transmission period 7811_X_i_4 in transmission panel antenna X for frequency $X_i are present. Note that i is an integer from 1 to M (X) (both inclusive).

Note that, in feedback signal first transmission period 7811_X_i_1 in transmission panel antenna X for frequency $X_i, feedback signal second transmission period 7811_X_i_2 in transmission panel antenna X for frequency $X_i, feedback signal third transmission period 7811_X_i_3 in transmission panel antenna X for frequency $X_i, and feedback signal fourth transmission period 7811_X_i_4 in transmission panel antenna X for frequency $X_i, signals are transmitted from transmission panel antenna X labeled 106_X of base station #1 labeled 901_1 with the configuration in FIG. 1A, 1B, or 1C.

Figure 78C:
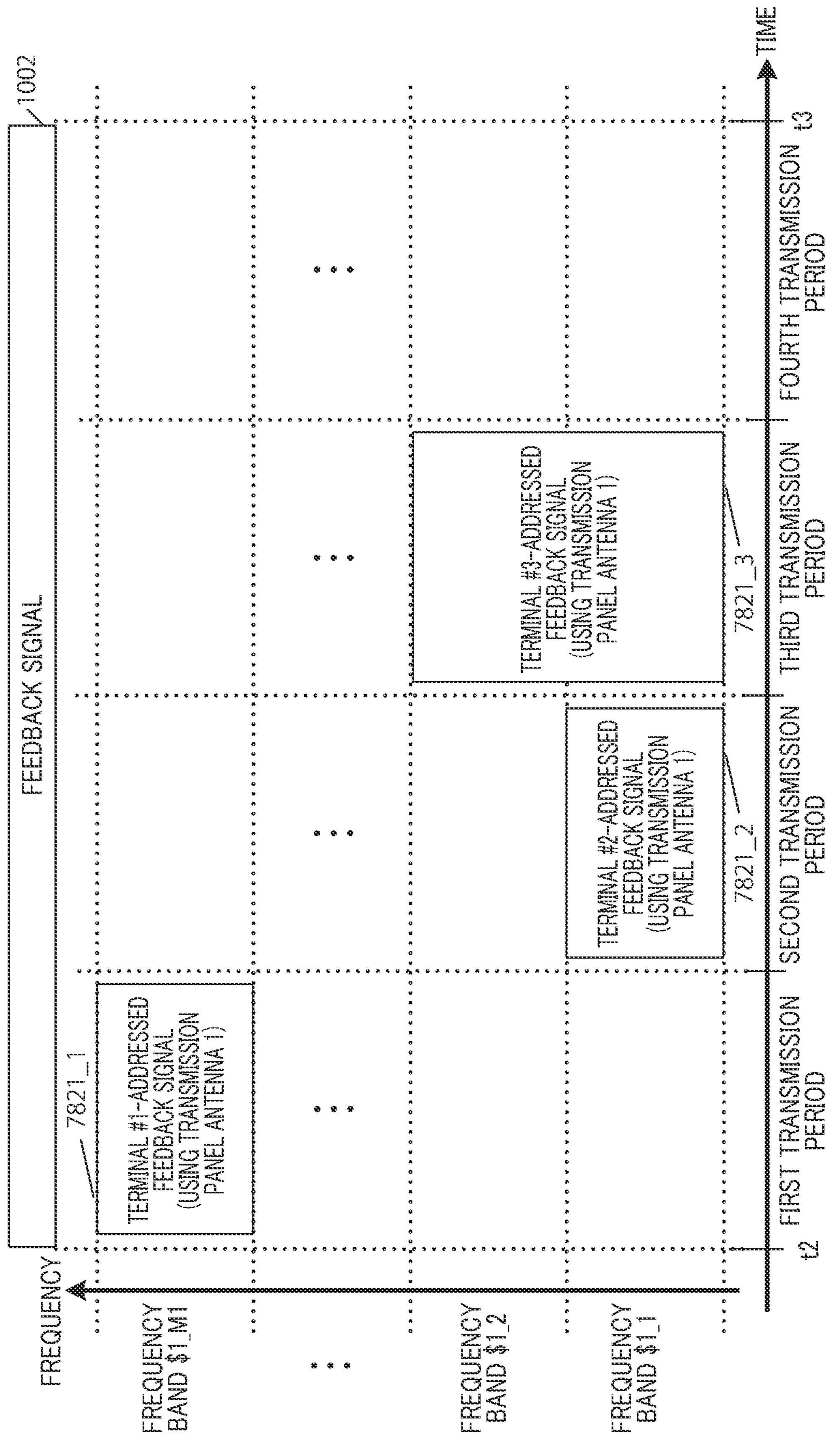

FIG. 78C illustrates exemplary specific feedback signal assignment for feedback signal 1002 illustrated in FIGS. 78A and 78B. Note that FIG. 78C illustrates exemplary feedback signal assignment in feedback signal first transmission period **7811_1_*i*_1 in transmission panel antenna 1 for frequency $1_i, feedback signal second transmission period 7811_1_*i*_2 in transmission panel antenna 1 for frequency $1_i, feedback signal third transmission period 7811_1_*i*_3 in transmission panel antenna 1 for frequency $1_i, and feedback signal fourth transmission period 7811_1_*i*_4** in transmission panel antenna 1 for frequency $1_i.

As in FIG. 77A, for example, terminal #1 labeled 902_1 transmits terminal #1 "sector sweep reference signal" 7701_1, terminal #2 labeled 902_2 transmits terminal #2 "sector sweep reference signal" 7701_2, and terminal #3 labeled 902_3 transmits terminal #3 "sector sweep reference signal" 7701_3.

Terminal #1 "sector sweep reference signal" 7701_1 includes information indicating that "frequency band $1_M1 has high reception quality". Thus, base station #1 labeled 901_1 transmits terminal #1-addressed feedback signal 7821_1 from transmission panel antenna 1 using frequency band $1_M1 as in FIG. 78C.

Terminal #2 "sector sweep reference signal" 7701_2 includes information indicating that "frequency band $1_1 has high reception quality". Thus, base station #1 labeled 901_1 transmits terminal #2-addressed feedback signal 7821_2 from transmission panel antenna 1 using frequency band $1_1 as in FIG. 78C.

Terminal #3 "sector sweep reference signal" 7701_3 includes information indicating that "frequency band $1_1 and frequency band $1_2 have high reception quality". Thus, base station #1 labeled 901_1 transmits terminal #3-addressed feedback signal 7821_3 from transmission panel antenna 1 using frequency bands $1_1 and $1_2 as in FIG. 78C.

Figure 78D:
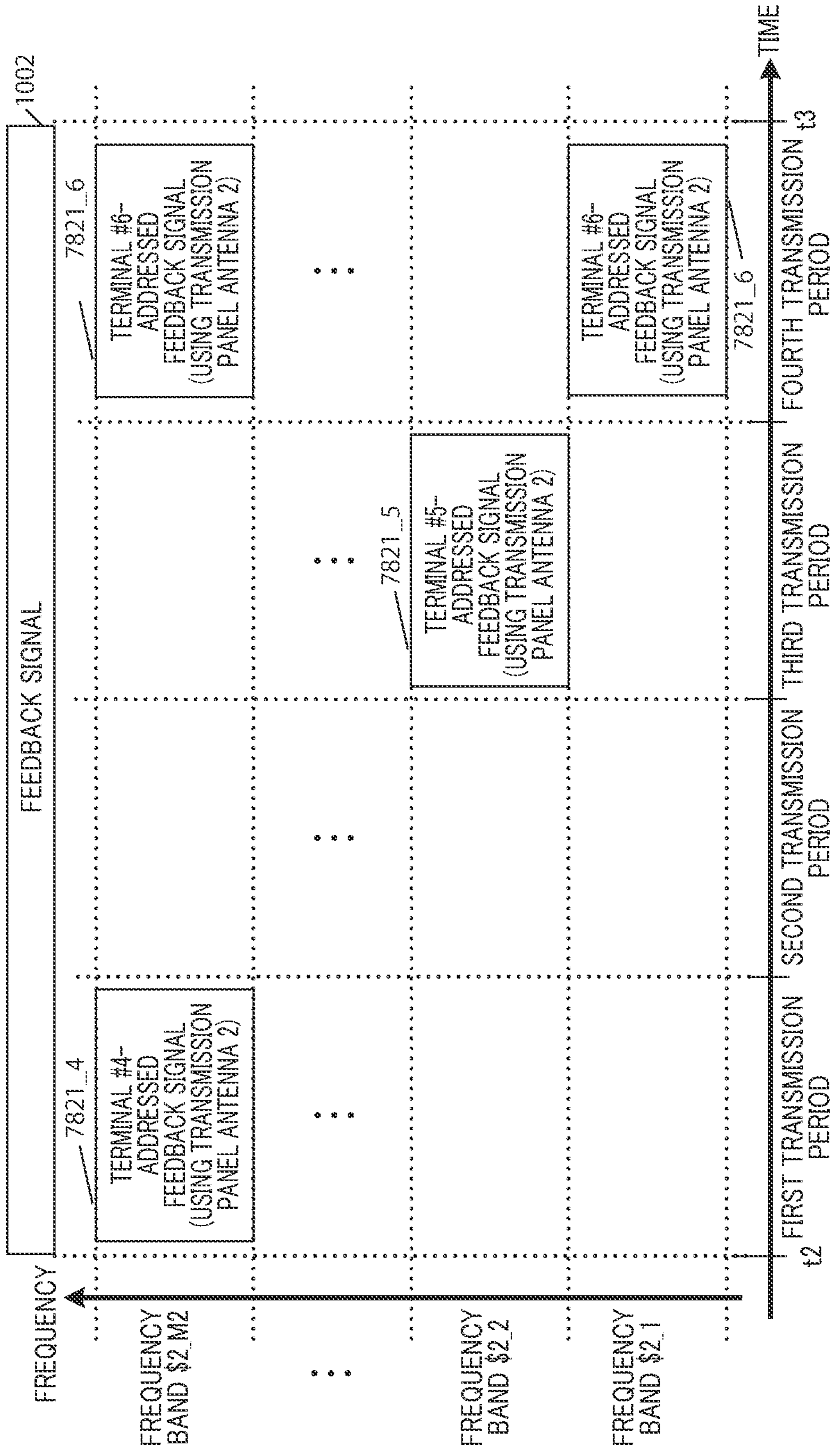

FIG. 78D illustrates exemplary specific feedback signal assignment for feedback signal 1002 illustrated in FIGS. 78A and 78B. Note that FIG. 78D illustrates exemplary feedback signal assignment in feedback signal first transmission period **7811_2_*i*_1 in transmission panel antenna 2 for frequency $2_i, feedback signal second transmission period 7811_2_*i*_2 in transmission panel antenna 2 for frequency $2_i, feedback signal third transmission period 7811_2_*i*_3 in transmission panel antenna 2 for frequency $2_i, and feedback signal fourth transmission period 7811_2_*i*_4** in transmission panel antenna 2 for frequency $2_i.

As in FIG. 77B, for example, terminal #4 labeled 902_4 transmits terminal #4 "sector sweep reference signal" 7701_4, terminal #5 labeled 902_5 transmits terminal #5 "sector sweep reference signal" 7701_5, and terminal #6 labeled 902_6 transmits terminal #6 "sector sweep reference signal" 7701_6.

Terminal #4 "sector sweep reference signal" 7701_4 includes information indicating that "frequency band $2_M2 has high reception quality". Thus, base station #1 labeled 901_1 transmits terminal #4-addressed feedback signal 7821_4 from transmission panel antenna 2 using frequency band $2_M2 as in FIG. 78D.

Terminal #5 "sector sweep reference signal" 7701_5 includes information indicating that "frequency band $2_2 has high reception quality". Thus, base station #1 labeled 901_1 transmits terminal #5-addressed feedback signal 7821_5 from transmission panel antenna 2 using frequency band $2_2 as in FIG. 78D.

Terminal #6 "sector sweep reference signal" 7701_6 includes information indicating that "frequency band $21 and frequency band $2_M2 have high reception quality". Thus, base station #1 labeled 901_1 transmits terminal #6-addressed feedback signal 7821_6 from transmission panel antenna 2 using frequency bands $2_1 and $2_M2 as in FIG. 78D.

Note that terminal-addressed feedback signals may be assigned to frequency band $3 to frequency band $M in the same manner as the above.

In this manner, obtaining terminal #i-addressed feedback signal **7821_*i* allows terminal #i labeled 902_*i* to know that communication with base station #1 labeled 901_1 is available and to know the frequency band to be used. Note that FIGS. 78C and 78D are merely examples. In a case where there is no terminal #1-addressed feedback signal 7821_1 as feedback signal 1002, for example, terminal #1 labeled 902_1 recognizes that the communication with base station #1 labeled 901_1** has not been established.

At this time, terminal #i-addressed feedback signal **7821_*i* includes, for example, information indicating that communication with terminal #1 labeled 902_*i* is available (or indicating that data-symbol-included frame 1003 in FIG. 10 includes a symbol addressed to terminal #i labeled 902_*i***).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902__i_, and base station #1 labeled 901_1 then transmits terminal #i-addressed feedback signal 7821__i_.

Note that terminal #i-addressed feedback signal 7821__i_ in FIGS. 78C and 78D may be assigned to a plurality of frequency bands. At this time, terminal #i-addressed feedback signal 7821__i_ may be assigned to frequency bands discretely. (As a result, terminal #i-addressed feedback signal 7821__i_ is assigned to one or more frequency bands.)

Further, terminal #i-addressed feedback signal 7821__i_ may be assigned to a plurality of time periods. At this time, terminal #i-addressed feedback signal 7821__i_ may be assigned to time periods discretely. (As a result, terminal #i-addressed feedback signal 7821__i_ is assigned to one or more time periods.)

Figure 79A:
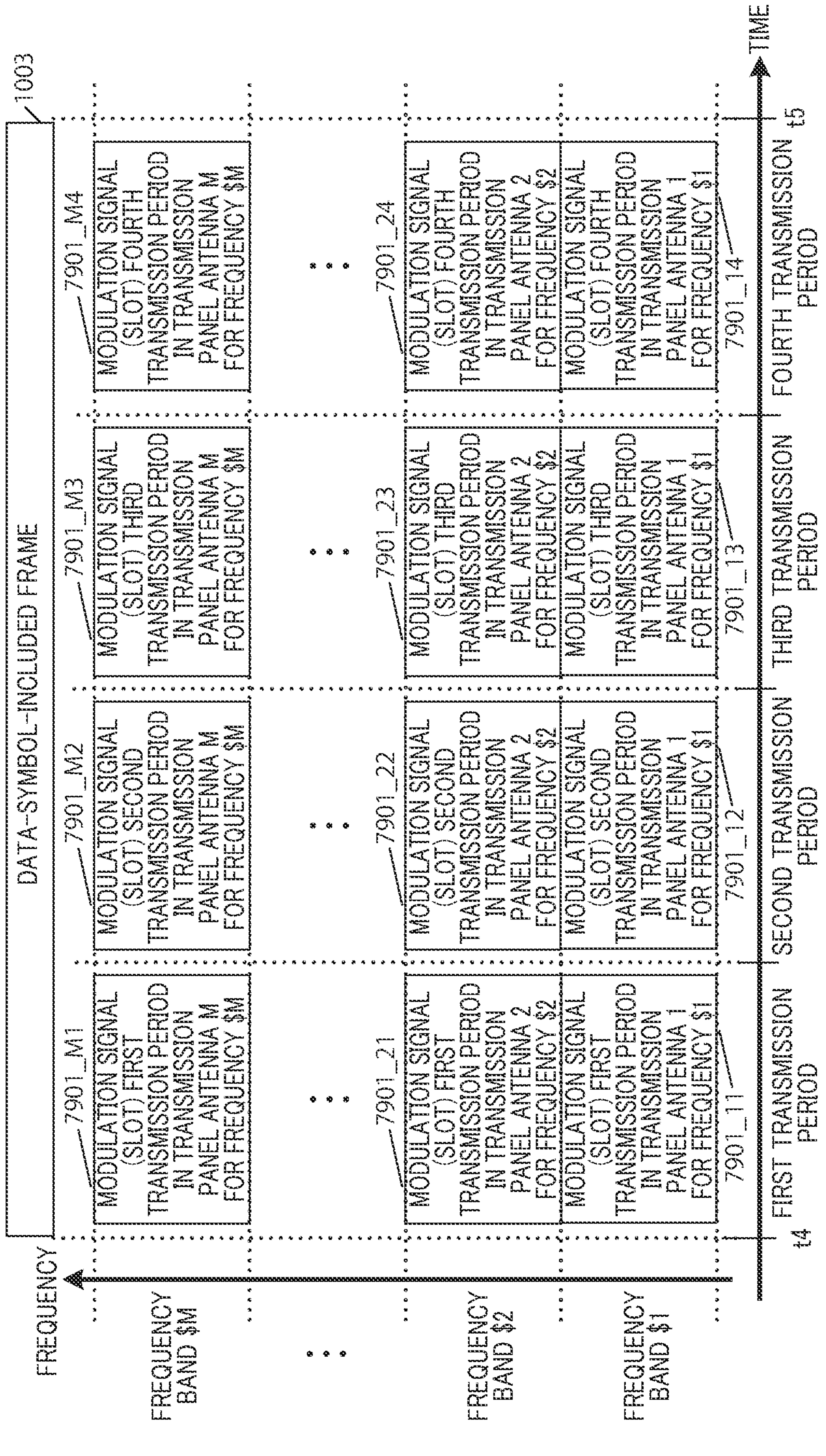

FIG. 79A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 79A. In this example, there are a first transmission period, a second transmission period, a third transmission period, and a fourth transmission period for data-symbol-included frame 1003 as illustrated in FIG. 79A. Note that Ω transmission periods may be configured to be present for data-symbol-included frame 1003, where Ω is an integer equal to or greater than 1 or an integer equal to or greater than 2.

In addition, there are frequency band $1, frequency band $2, . . . , frequency band $M for data-symbol-included frame 1003 in FIG. 79A.

Thus, the first transmission period includes modulation signal (slot) first transmission period 7901_11 in transmission panel antenna 1 for frequency $1, modulation signal (slot) fast transmission period 7901_21 in transmission panel antenna 2 for frequency $2, . . . , modulation signal (slot) first transmission period 7901_M1 in transmission panel antenna M for frequency $M. Likewise, the second transmission period includes modulation signal (slot) second transmission period 7901_12 in transmission panel antenna 1 for frequency $1, modulation signal (slot) second transmission period 7901_22 in transmission panel antenna 2 for frequency $2, . . . , modulation signal (slot) second transmission period 7901_M2 in transmission panel antenna M for frequency $M. The third transmission period includes modulation signal (slot) third transmission period 7901_13 in transmission panel antenna 1 for frequency $1, modulation signal (slot) third transmission period 7901_23 in transmission panel antenna 2 for frequency $2, . . . , modulation signal (slot) third transmission period 7901_M3 in transmission panel antenna M for frequency $M. The fourth transmission period includes modulation signal (slot) fourth transmission period 7901_14 in transmission panel antenna 1 for frequency $1, modulation signal (slot) fourth transmission period 7901_24 in transmission panel antenna 2 for frequency $2, . . . , modulation signal (slot) fourth transmission period 7901_M4 in transmission panel antenna M for frequency $M.

Figure 79B:
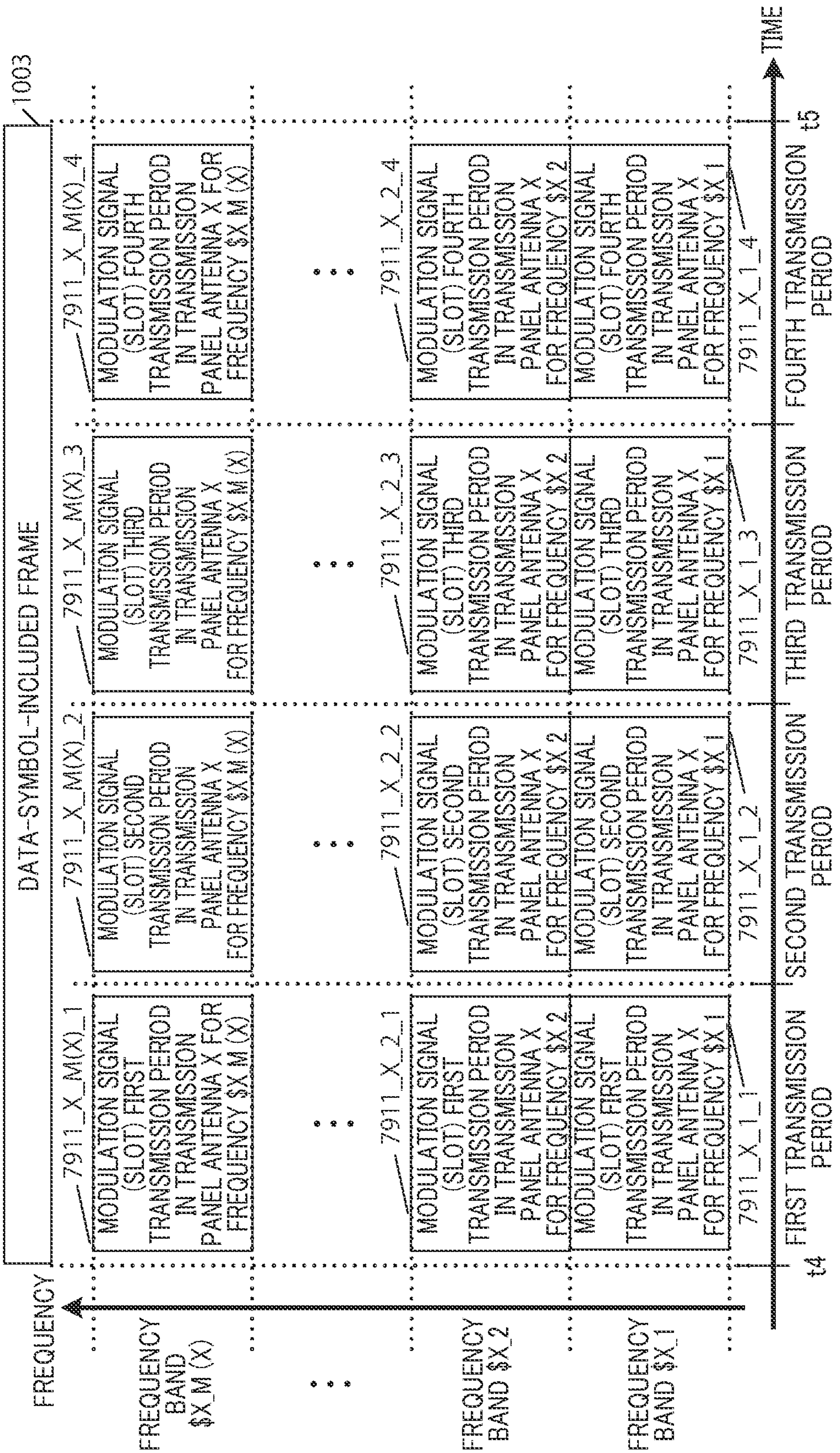

One feature is that "modulation signals (slots) are transmitted from transmission panel antenna i in frequency band $i in FIG. 79B".

FIG. 79B illustrates an exemplary configuration of "modulation signal (slot) first transmission period 7901_X1 in transmission panel antenna X for frequency $X", "modulation signal (slot) second transmission period 7901_X2 in transmission panel antenna X for frequency $X", "modulation signal (slot) third transmission period 7901_X3 in transmission panel antenna X for frequency $X", and "modulation signal (slot) fourth transmission period 7901_X4 in transmission panel antenna X for frequency $X" in FIG. 79A. Note that the vertical axis represents frequency and the horizontal axis represents time in FIG. 79B.

Frequency band $X_1, frequency band $X_2, . . . , frequency band $X_M (X) are included in frequency $X where "modulation signal (slot) first transmission period 7901_X1 in transmission panel antenna X for frequency $X", "modulation signal (slot) second transmission period 7901_X2 in transmission panel antenna X for frequency $X", "modulation signal (slot) third transmission period 7901_X3 in transmission panel antenna X for frequency $X", and "modulation signal (slot) fourth transmission period 7901_X4 in transmission panel antenna X for frequency $X" are present. Note that M (X) is an integer equal to or greater than 1 or an integer equal to or greater than 2.

In frequency $X_i, modulation signal (slot) first transmission period 7911_X_i_1 in transmission panel antenna X for frequency $X_i, modulation signal (slot) second transmission period 7911_X_i_2 in transmission panel antenna X for frequency $X_i, modulation signal (slot) third transmission period 7911_X_i_3 in transmission panel antenna X for frequency $X_i, and modulation signal (slot) fourth transmission period 7911_X_i_4 in transmission panel antenna X for frequency $X_i are present. Note that i is an integer from 1 to M (X) (both inclusive).

Note that, in modulation signal (slot) first transmission period 7911_X_i_1 in transmission panel antenna X for frequency $X_i, modulation signal (slot) second transmission period 7911_X_i_2 in transmission panel antenna X for frequency $X_i, modulation signal (slot) third transmission period 7911_X_i_3 in transmission panel antenna X for frequency $X_i, and modulation signal (slot) fourth transmission period 7911_X_i_4 in transmission panel antenna X for frequency $X_i, signals are transmitted from transmission panel antenna X labeled 106_X of base station #1 labeled 901_1 with the configuration in FIG. 1A, 1B, or 1C.

Figure 79C:
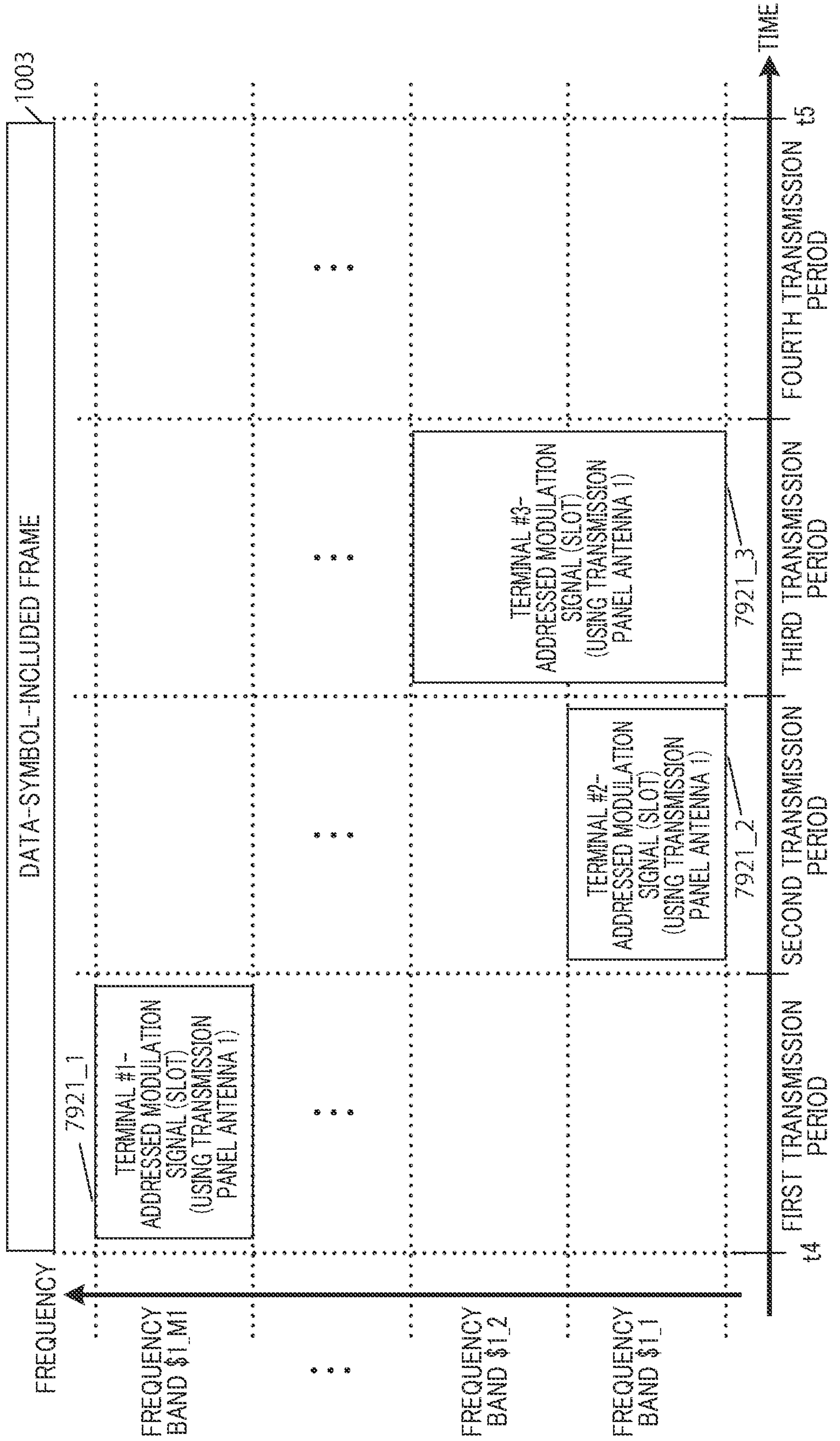

FIG. 79C illustrates exemplary specific modulation signal (slot) assignment for data-symbol-included frame 1003 illustrated in FIGS. 79A and 79B. Note that FIG. 79C illustrates exemplary modulation signal (slot) assignment in modulation signal (slot) first transmission period 7911_1__i__1 in transmission panel antenna 1 for frequency $1_i, modulation signal (slot) second transmission period 7911_1__i__2 in transmission panel antenna 1 for frequency $1_i, modulation signal (slot) third transmission period 7911_1__i__3 in transmission panel antenna 1 for frequency $1_i, and modulation signal (slot) fourth transmission period 7911_1__i__4 in transmission panel antenna 1 for frequency $1_i.

As in FIG. 77A, for example, terminal #1 labeled 902_1 transmits terminal #1 "sector sweep reference signal" 7701_1, terminal #2 labeled 902_2 transmits terminal #2 "sector sweep reference signal" 7701_2, and terminal #3 labeled 902_3 transmits terminal #3 "sector sweep reference signal" 7701_3.

Terminal #1 "sector sweep reference signal" 7701_1 includes information indicating that "frequency band $1_M1 has high reception quality". Thus, base station #1 labeled 901_1 transmits terminal #1-addressed modulation signal (slot) 7921_1 from transmission panel antenna 1 using frequency band $1_M1 as in FIG. 79C.

Terminal #2 "sector sweep reference signal" 7701_2 includes information indicating that "frequency band $1_1 has high reception quality". Thus, base station #1 labeled 901_1 transmits terminal #2-addressed modulation signal (slot) 7921_2 from transmission panel antenna 1 using frequency band $1_i as in FIG. 79C.

Terminal #3 "sector sweep reference signal" 7701_3 includes information indicating that "frequency band $1_1 and frequency band $1_2 have high reception quality". Thus, base station #1 labeled 901_1 transmits terminal #3-addressed modulation signal (slot) 7921_3 from transmission panel antenna 1 using frequency bands $1_1 and $1_2 as in FIG. 79C.

Figure 79D:
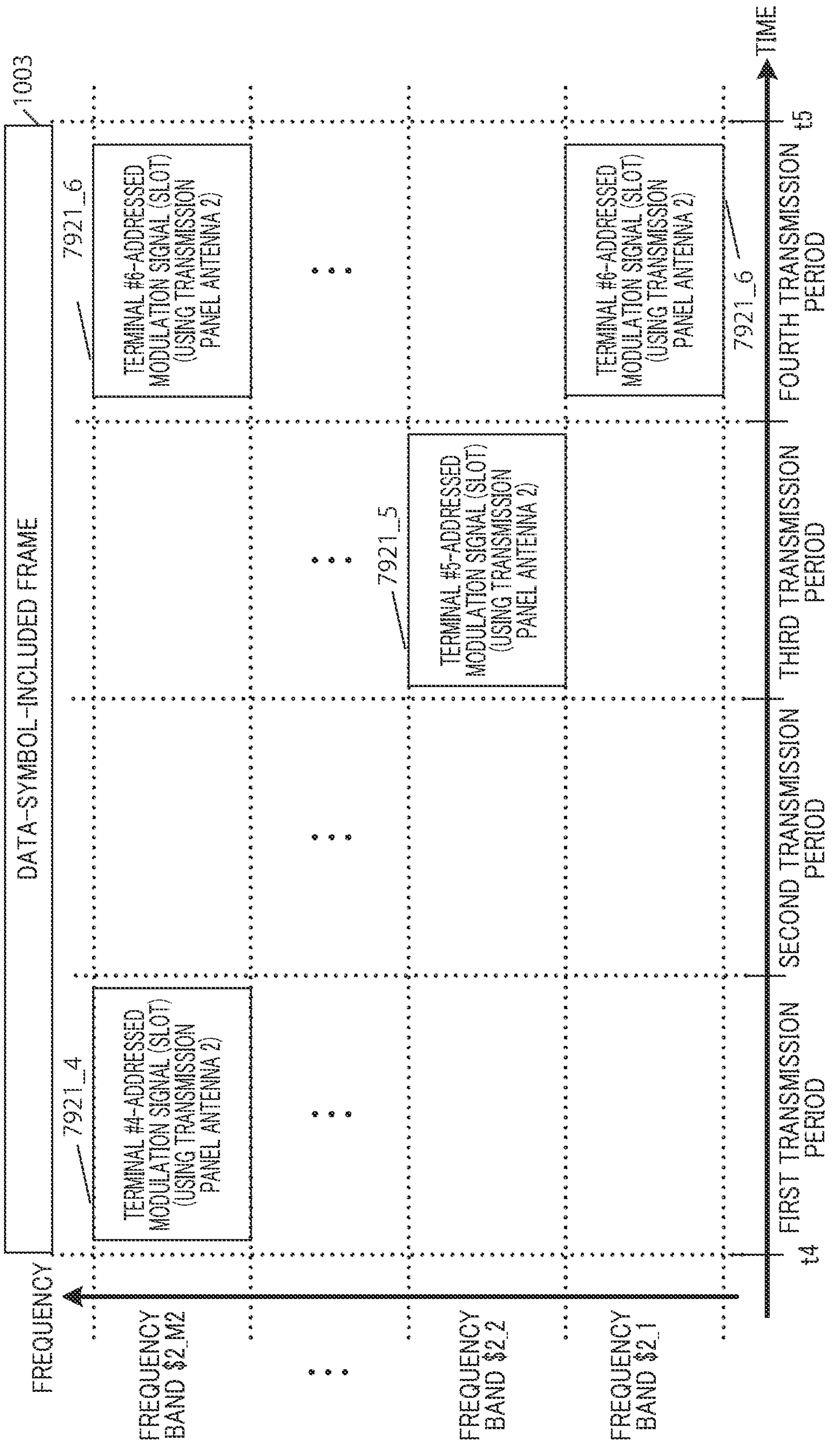

FIG. 79D illustrates exemplary specific modulation signal (slot) assignment for data-symbol-included frame 1003 illustrated in FIGS. 79A and 79B. Note that FIG. 79D illustrates exemplary modulation signal (slot) assignment in modulation signal (slot) first transmission period **7911_2_*i*_1 in transmission panel antenna 2 for frequency $2_i, modulation signal (slot) second transmission period 7911_2_*i*_2 in transmission panel antenna 2 for frequency $2_i, modulation signal (slot) third transmission period 7911_2_*i*_3 in transmission panel antenna 2 for frequency $2_i, and modulation signal (slot) fourth transmission period 7911_2_*i*_4** in transmission panel antenna 2 for frequency $2_i.

As in FIG. 77B, for example, terminal #4 labeled 902_4 transmits terminal #4 "sector sweep reference signal" 7701_4, terminal #5 labeled 902_5 transmits terminal #5 "sector sweep reference signal" 7701_5, and terminal #6 labeled 902_6 transmits terminal #6 "sector sweep reference signal" 7701_6.

Terminal #4 "sector sweep reference signal" 7701_4 includes information indicating that "frequency band $2_M2 has high reception quality". Thus, base station #1 labeled 901_1 transmits terminal #4-addressed modulation signal (slot) 7921_4 from transmission panel antenna 2 using frequency band $2_M2 as in FIG. 79D.

Terminal #5 "sector sweep reference signal" 7701_5 includes information indicating that "frequency band $2_2 has high reception quality". Thus, base station #1 labeled 901_1 transmits terminal #5-addressed modulation signal (slot) 7921_5 from transmission panel antenna 2 using frequency band $2_2 as in FIG. 79D.

Terminal #6 "sector sweep reference signal" 7701_6 includes information indicating that "frequency band $2_1 and frequency band $2_M2 have high reception quality". Thus, base station #1 labeled 901_1 transmits terminal #6-addressed modulation signal (slot) 7921_6 from transmission panel antenna 2 using frequency bands $2_1 and $2_M2 as in FIG. 79D.

Note that terminal-addressed modulation signals (slots) may be assigned to frequency band $3 to frequency band $M in the same manner as the above.

At this time, terminal #i-addressed modulation signal (slot) **7921_*i* includes, for example, a data symbol (data and/or information) addressed to terminal #1 labeled 902_*i***.

In this manner, obtaining terminal #i-addressed modulation signal (slot) **7921_*i* allows terminal #i labeled 902_*i* to know that communication with base station #1 labeled 901_1 is available and to know the frequency band to be used. Note that FIGS. 79C and 79D are merely examples. In a case where there is no terminal #1-addressed modulation signal (slot) 7921_1 as data-symbol-included frame 1003, for example, terminal #1 labeled 902_1 recognizes that the communication with base station #1 labeled 901_1** has not been established.

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled **902_*i*, and base station #1 labeled 901_1 then transmits terminal #i-addressed modulation signal (slot) 7921_*i***.

Note that, in FIGS. 78C and 78D, base station #1 labeled 901_1 may estimate the "frequency (band)" and the "transmission panel antenna and parameter" of terminal #i labeled **902_*i* with high reception quality in receiving "terminal #i "sector sweep reference signal" 7701_*i* transmitted by terminal #i labeled 902_*i*", and the estimated information may be included in terminal #i-addressed feedback signal 7821_*i***.

Terminal #i labeled **902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1**.

Incidentally, in the time period from t3 to t4 in FIG. 10, terminal #1 labeled **902_*i* may transmit, to base station #1 labeled 901_1, a modulation signal including information indicating successful reception of a signal from base station #1 labeled 901_1**, such as acknowledgement (ACK).

Note that, terminal #i-addressed modulation signal (slot) **7921_*i* in FIGS. 79C and 79**D may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

Terminal #i-addressed modulation signal (slot) **7921_*i* in FIGS. 79C and 79D may be assigned to a plurality of frequency bands. At this time, terminal #i-addressed modulation signal (slot) 7921_*i* may be assigned to frequency bands discretely. (As a result, terminal #i-addressed modulation signal (slot) 7921_*i*** is assigned to one or more frequency bands.)

Further, terminal #i-addressed modulation signal (slot) **7921_*i* may be assigned to a plurality of time periods. At this time, terminal #i-addressed modulation signal (slot) 7921_*i* may be assigned to time periods discretely. (As a result, terminal #i-addressed modulation signal (slot) 7921_*i*** is assigned to one or more time periods.)

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 76. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 13, 77A, 77B, 15A, 15B, etc., and the description thereof will be thus omitted.

Base station #1 labeled 901_1 transmits feedback signal 1802_1. Note that this has already been described with reference to FIGS. 78A, 78B, 78C, and 78D, and the description thereof will be thus omitted.

After that, base station #1 labeled 901_1 transmits "data-symbol-included frame 1803_1". Note that this has already been described with reference to FIGS. 79A, 79B, 79C, and 79D, and the description thereof will be thus omitted. (Hence. "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 80A, 80B, 80C, 80D, 80E, and 80F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 79A, 79B, 79C, and 79D.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 80A, 80B, 80C, 80D, 80E, and 80F.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 79A, 79B, 79C, and 79D.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIGS. 80A, 80B, 80C, 80D, 80E, and 80F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 13, 77A, 77B, 15A, 15B, etc., and the description thereof will be thus omitted.

Base station #1 labeled 901_1 transmits feedback signal 1802_2. Note that this has already been described with reference to FIGS. 78A, 78B, 78C, and 78D, and the description thereof will be thus omitted.

After that, base station #1 labeled 901_1 transmits "data-symbol-included frame 1803_4". Note that this has already been described with reference to FIGS. 79A, 79B, 79C, and 79D, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 80A, 80B, 80C, 80D, 80E, and 80F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 80A, 80B, 80C, 80D, 80E, and 80F. Note that i is an integer equal to or greater than 1, for example, and the horizontal axis represents time in FIGS. 80A, 80B, 80C, 80D, 80E, and 80F.

As illustrated in FIGS. 80A, 80B, 80C, 80D, 80E, and 80F, "data-symbol-included frame 1852_*i*" is composed of a first transmission period, a second transmission period, a third transmission period, and a fourth transmission period.

FIGS. 80A, 80B, and 80C illustrate an example in frequency band $1, and FIGS. 80D, 80E, and 80F illustrate an example in frequency band $2. Note that frequency band $1 and frequency band $2 will be described here. Although not described here for simplicity, the terminals may transmit transmission frames in frequency band $3 to frequency band $M in the same manner.

There are frequency band $1_1, frequency band $1_2, . . . , frequency band $1_M1 in FIGS. 80A, 80B, and 80C, and there are frequency band $2_1, frequency band $2_2, . . . , frequency band $2_M2 in FIGS. 80D, 80E, and 80F.

As illustrated in FIG. 80A, terminal #1 labeled 902_1 transmits terminal #1 transmission frame (including a data symbol) 8001_1 using frequency band $1_M1 and the first transmission period, for example.

"Terminal #1 labeled 902_1 transmits terminal #1 transmission frame (including a data symbol) 8001_1 using frequency band $1_M1" because "base station #1 labeled 901_1 transmits a modulation signal (slot) addressed to terminal #1 labeled 902_1 using frequency band $1_M1" as illustrated in FIG. 79C.

As illustrated in FIG. 80B, terminal #2 labeled 902_2 transmits terminal #2 transmission frame (including a data symbol) 8001_2 using frequency band $1_1 and the second transmission period, for example.

"Terminal #2 labeled 902_2 transmits terminal #2 transmission frame (including a data symbol) 8001_2 using frequency band $1_1" because "base station #1 labeled 901_1 transmits a modulation signal (slot) addressed to terminal #2 labeled 902_2 using frequency band $1_1" as illustrated in FIG. 79C.

As illustrated in FIG. 80C, terminal #3 labeled 902_3 transmits terminal #3 transmission frame (including a data symbol) 8001_3 using frequency bands $1_1 and $1_2 and the third transmission period, for example.

"Terminal #3 labeled 902_3 transmits terminal #3 transmission frame (including a data symbol) 8001_3 using frequency bands $1_1 and $1_2" because "base station #1 labeled 901_1 transmits a modulation signal (slot) addressed to terminal #3 labeled 902_3 using frequency bands $1_1 and $1_2" as illustrated in FIG. 79C.

As illustrated in FIG. 80D, terminal #4 labeled 902_4 transmits terminal #4 transmission frame (including a data symbol) 8001_4 using frequency band $2_M2 and the first transmission period, for example.

"Terminal #4 labeled 902_4 transmits terminal #4 transmission frame (including a data symbol) 8001_4 using frequency band $2_M2" because "base station #1 labeled 901_1 transmits a modulation signal (slot) addressed to terminal #4 labeled 902_4 using frequency band $2_M2" as illustrated in FIG. 79D.

As illustrated in FIG. 80E, terminal #5 labeled 902_5 transmits terminal #5 transmission frame (including a data symbol) 8001_5 using frequency band $2_2 and the third transmission period, for example.

"Terminal #5 labeled 902_5 transmits terminal #5 transmission frame (including a data symbol) 8001_5 using frequency band $2_2" because "base station #1 labeled 901_1 transmits a modulation signal (slot) addressed to terminal #5 labeled 902_5 using frequency band $2_2" as illustrated in FIG. 79D.

As illustrated in FIG. 80F, terminal #6 labeled 902_6 transmits terminal #6 transmission frame (including a data symbol) 8001_6 using frequency bands $2_1 and $2_M2 and the fourth transmission period, for example.

"Terminal #6 labeled 902_6 transmits terminal #6 transmission frame (including a data symbol) 8001_6 using frequency bands $2_1 and $2_M2" because "base station #1 labeled 901_1 transmits a modulation signal (slot) addressed to terminal #6 labeled 902_6 using frequency bands $2_1 and $2_M2" as illustrated in FIG. 79D.

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, OFDMA and/or time division and transmitted by each terminal, and base station #1 labeled 901_1 receives the frame transmitted by the terminal, thereby preventing interference and achieving high data reception quality.

Note that terminal #1 transmission frame 8001_1, terminal #2 transmission frame 8001_2, terminal #3 transmission frame 8001_3, terminal #4 transmission frame 8001_4, terminal #5 transmission frame 8001_5, and terminal #6 transmission frame 8001_6 in FIGS. 80A, 80B, 80C, 80D, 80E, and 80F may include, in addition to the data symbol, a "reference signal such as DMRS, PTRS, or SRS", a pilot symbol, a pilot signal, a preamble, and a symbol including control information, for example.

In FIGS. 80A, 80B, 80C, 80D, 80E, and 80F, a description has been given of a case where the terminals perform OFDMA and/or time division on the frames to be transmitted, but the terminals may perform spatial division on the frames to be transmitted using multi user-multiple-input multiple-output (MU-MIMO).

FIGS. 77A and 77B illustrate exemplary occupation by terminals in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4" illustrated in FIG. 13.

In FIGS. 81A and 81B, a description will be given of exemplary occupation by terminals different from that in FIG. 77A in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4" illustrated in FIG. 13.

In FIGS. 81A and 81B, the components that operate in the same manner as in FIGS. 13 and 77A are denoted by the same reference signs, and the descriptions thereof will be omitted since they have already been described. In the following, the difference from the description in FIG. 77A will be described.

Terminal #2 labeled 902_2 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band $1_1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of time divisions in which sector sweep reference signals can be transmitted when the terminals transmit the sector sweep reference signals". In the case of FIG. 81A, terminal #2 labeled 902_2 obtains information indicating that "the number of time divisions in which sector sweep reference signals can be transmitted when the terminals transmit the sector sweep reference signals" is four.

In this case, terminal #2 labeled 902_2 obtains, for example, any one of the values "0", "1", "2", and "3" using a random number. For example, terminal #2 labeled 902_2 obtains "2" using a random number. In this case, since "2"+1=3, terminal #2 labeled 902_2 transmits terminal #2 "sector sweep reference signal" 7701_2 using frequency band $1_1 and "terminal "sector sweep reference signal" third transmission period 1301_3" as in FIG. 81A.

Note that terminal #2 "sector sweep reference signal" 7701_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band $1_1 as the "frequency (band)" with high reception quality and estimates "transmission panel antenna a3 and parameter b3" as the "transmission panel antenna and parameter".

In addition, while estimating the "transmission panel antenna and parameter" with high reception quality, terminal #3 labeled 902_3 simultaneously obtains information of the "the number of time divisions in which sector sweep reference signals can be transmitted when the terminals transmit the sector sweep reference signals". In the case of FIG. 81B, terminal #3 labeled 902_3 obtains information indicating that "the number of time divisions in which sector sweep reference signals can be transmitted when the terminals transmit the sector sweep reference signals" is four.

In this case, terminal #3 labeled 902_3 obtains, for example, any one of the values "0", "1", "2", and "3" using a random number. For example, terminal #3 labeled 902_3 obtains "2" using a random number. In this case, since "2"+1=3, terminal #3 labeled 902_3 transmits terminal #3 "sector sweep reference signal" 7701_3 using frequency band $1_1 and "terminal "sector sweep reference signal" third transmission period 1301_3" as in FIG. 81B.

Note that terminal #3 "sector sweep reference signal" 7701_3 includes information of the "transmission panel antenna and parameter" with high reception quality obtained by terminal #3 labeled 902_3, that is, information of "transmission panel antenna a3 and parameter b3".

At this time, as illustrated in FIGS. 81A and 81B, the time period for "terminal #2 "sector sweep reference signal" 7701_2 transmitted by terminal #2 labeled 902_2" and the time period for "terminal #3 "sector sweep reference signal" 7701_3 transmitted by terminal #3 labeled 902_3" overlap each other.

Thus, base station #1 labeled 901_1 possibly simultaneously receives terminal #2 "sector sweep reference signal" 7701_2 and terminal #3 "sector sweep reference signal" 7701_3.

In this case, the following is two possible cases.

<Case 1>

Both "terminal #2 "sector sweep reference signal" 7701_2 transmitted by terminal #2 labeled 902_2" and "terminal #3 "sector sweep reference signal" 7701_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 7701_2 transmitted by terminal #2 labeled 902_2" by base station #1 labeled 901_1 are different from the ""transmission panel antenna and parameter for beamforming of terminal #3 labeled 902_3" with high reception quality in receiving terminal #3 "sector sweep reference signal" 7701_3 transmitted by terminal #3 labeled 902_3" by base station #1 labeled 901_1. Accordingly, base station #1 labeled 901_1 obtains information included in "terminal #2 "sector sweep reference signal" 7701_2 transmitted by terminal #2 labeled 902_2" and information included in "terminal #3 "sector sweep reference signal" 7701_3 transmitted by terminal #3 labeled 902_3".

In this case, in FIG. 78B for example, "feedback signal second transmission period 7811_X_1_2 (X is set to 1) for frequency $1_1 is for a signal addressed to terminal #2 labeled 902_2" and "feedback signal third transmission period 7811_X_1_3 for frequency $1_1 is for a signal addressed to terminal #3 labeled 902_3".

In addition, in FIG. 79B for example, "modulation signal (slot) second transmission period 7911_X_1_2 (X is set to 1) for frequency $1_1 is for a signal addressed to terminal #2 labeled 902_2" and "modulation signal (slot) third transmission period 7911_X_1_3 for frequency $1_1 is for a signal addressed to terminal #3 labeled 902_3".

In this manner, base station #1 labeled 901_1 can communicate with terminal #2 labeled 902_2 and terminal #3 labeled 902_3.

<Case 2>

Both "terminal #2 "sector sweep reference signal" 7701_2 transmitted by terminal #2 labeled 902_2" and "terminal #3 "sector sweep reference signal" 7701_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 7701_2 transmitted by terminal #2 labeled 902_2" by base station #1 labeled 901_1 interfere with the ""transmission panel antenna and parameter for beamforming of terminal #3 labeled 902_3" with high reception quality in receiving terminal #3 "sector sweep reference signal" 7701_3 transmitted by terminal #3 labeled 902_3" by base station #1 labeled 901_1.

<Case 2-1>

In some cases, base station #1 labeled 901_1 obtains either information included in "terminal #2 "sector sweep reference signal" 7701_2 transmitted by terminal #2 labeled 902_2" or information included in "terminal #3 "sector sweep reference signal" 7701_3 transmitted by terminal #3 labeled 902_3".

For example, base station #1 labeled 901_1 obtains the information included in "terminal #2 "sector sweep reference signal" 7701_2 transmitted by terminal #2 labeled 902_2".

In this case, in FIG. 78B for example, "feedback signal second transmission period 7811_X_1_3 for frequency $1_1 is for a signal addressed to terminal #2 labeled 902_2".

In addition, in FIG. 79B for example, "modulation signal (slot) second transmission period 7911_X_1_3 for frequency $1_i is for a signal addressed to terminal #2 labeled 902_2".

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIGS. 81A and 81B. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed again as in the cases described above, and terminal #3 labeled 902_3 communicate with base station #1 labeled 901_1. Note that the specific examples have been described in other embodiments.

<Case 2-2>

In some cases, base station #1 labeled 901_1 obtains neither information included in "terminal #2 "sector sweep reference signal" 7701_2 transmitted by terminal #2 labeled 902_2" nor information included in "terminal #3 "sector sweep reference signal" 7701_3 transmitted by terminal #3 labeled 902_3".

It is assumed that sector sweep reference signal 1851_1 in FIG. 18 has the states in FIGS. 81A and 81B, and base station #1 labeled 901_1 obtains neither information included in "terminal #2 "sector sweep reference signal" 7701_2 transmitted by terminal #2 labeled 902_2" nor information included in "terminal #3 "sector sweep reference signal" 7701_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #2 labeled 902_2, for example, estimates frequency band $1_1 as the "frequency (band)" with high reception quality and estimates "transmission panel antenna a2 and parameter b2" as the "transmission panel antenna and parameter".

In other cases, terminal #2 labeled 902_2, for example, estimates a frequency in frequency band $1_i, where i is not 1, as the "frequency (band)" with high reception quality and estimates "transmission panel antenna a2 and parameter b2" as the "transmission panel antenna and parameter".

In still other cases, terminal #2 labeled 902_2, for example, estimates a frequency in frequency band $X_i, where X is not 1, as the "frequency (band)" with high reception quality and estimates "transmission panel antenna a2 and parameter b2" as the "transmission panel antenna and parameter".

In any of the cases, the predetermined procedure is performed again as in the cases described above, and terminal #2 labeled 902_2 communicate with base station #1 labeled 901_1. Note that the specific examples have been described in other embodiments.

Likewise, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed again as in the cases described above, and terminal #3 labeled 902_3 communicate with base station #1 labeled 901_1. Note that the specific examples have been described in other embodiments.

In the manner described above, a collision of the sector sweep reference signals transmitted by the respective terminals can be further reduced. This produces an effect that the base station can receive more sector sweep reference signals and can communicate with more terminals.

Note that transmission panel antenna 1 of base station #1 labeled 901_1, that is, frequency band $1_i has been described in <Case 1> and <Case 2> described above, but it is merely an example. The same can be implemented with another transmission panel antenna, that is, frequency band $X_i, where X is from 2 to M (both inclusive).

As described above in Embodiment 10, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 73, 74, 75, 13, 77A, 77B, 15A, 15B, 78A, 78B, 78C, 78D, 79A, 79B, 79C, 79D, 18, 19, 80A, 80B, 80C, 80D, 80E, 80F, 81A, and 81B, but the names thereof are not limited to those in the drawings and the important part is the functions of the signals to be transmitted.

Embodiment 11

In Embodiment 11, a variation of Embodiment 2 will be descried. Note that the drawings used in Embodiment 2 are sometimes used in the following description of Embodiment 11.

FIGS. 1A, 1B, and 1C illustrate exemplary configurations of, for example, a base station, an access point, a terminal, and a repeater according to Embodiment 11, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 11. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a single-carrier scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 73 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 73. In the example of FIG. 73, the frequency is divided into frequency band $1, frequency band $2, . . . , frequency band $M as illustrated in FIG. 73 for base station #1 labeled 901_1 to transmit modulation signals based on OFDMA. Note that M is an integer equal to or greater than 1 or an integer equal to or greater than 2. In the following description, M is the number of transmission panel antennas included in base station #1 labeled 901_1 in FIG. 9 with the configuration in FIG. 1A, 1B, or 1C, but the present disclosure is not limited to this.

For example, sector sweep reference signal 7301_1 in transmission panel antenna 1 for frequency $1 is present in frequency band $1.

Thus, sector sweep reference signal 7301_X in transmission panel antenna X for frequency $X is present in frequency band $X. Note that X is an integer from 1 to M (both inclusive).

Note that sector sweep reference signal 7301_X in transmission panel antenna X for frequency $X is transmitted from transmission panel antenna X labeled 106_X of base station #1 labeled 901_1 with the configuration in FIG. 1A, 1B, or 1C.

FIG. 74 illustrates an exemplary configuration of "sector sweep reference signal 7301_X in transmission panel antenna X for frequency $X" in FIG. 73. Note that the vertical axis represents frequency and the horizontal axis represents time in FIG. 74.

Frequency band $X_1, frequency band $X_2, . . . , frequency band $X_M (X) are included in frequency $X where "sector sweep reference signal 7301_X in transmission panel antenna X for frequency $X" is present. Note that M (X) is an integer equal to or greater than 1 or an integer equal to or greater than 2.

Sector sweep reference signal 7401_X_i in transmission panel antenna X for frequency $X_i is present in frequency band $X_i. Note that i is an integer from 1 to M (X) (both inclusive).

Note that sector sweep reference signal 7401_X_i in transmission panel antenna X for frequency $X_i is transmitted from transmission panel antenna X labeled 106_X of base station #1 labeled 901_1 with the configuration in FIG. 1A, 1B, or 1C.

FIG. 75 illustrates an exemplary configuration of "sector sweep reference signal 7401_X_i in transmission panel antenna X for frequency $X_i" in FIG. 74. Note that the horizontal axis represents time in FIG. 75.

"Sector sweep reference signal 7401_X_i in transmission panel antenna X for frequency $X_i" in FIG. 74 is composed of reference signal 7501_1 according to first parameter in transmission panel antenna X for frequency $X_i, reference signal 7501_2 according to second parameter in transmission panel antenna X for frequency $X_i, reference signal 7501_3 according to second parameter in transmission panel antenna X for frequency $X_i, and reference signal 7501_4 according to second parameter in transmission panel antenna X for frequency $X_i.

Next, a description will be given of a method of transmitting "sector sweep reference signal 7401_X_i in transmission panel antenna X for frequency $X_i" that is configured as in FIGS. 74 and 75 and transmitted by base station #1 labeled 901_1 with the configuration in FIG. 1A, 1B, or 1C.

For example, base station #1 labeled 901_1 with the configuration in FIG. 1A, 1B, or 1C includes the configuration in FIG. 3 as transmission panel antenna i labeled 106_*i*.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, 1). When first transmission signal 303_1 of "reference signal 7501_1 according to first parameter in transmission panel antenna X for frequency $X_i" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, 1). When second transmission signal 303_2 of "reference signal 7501_1 according to first parameter in transmission panel antenna X for frequency $X_i" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, 1). When third transmission signal 303_3 of "reference signal 7501_1 according to first parameter in transmission panel antenna X for frequency $X_i" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, 1). When fourth transmission signal 303_4 of "reference signal 7501_1 according to first parameter in transmission panel antenna X for frequency $X_i" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 7501_*j* according to j-th parameter in transmission panel antenna X for frequency $X_i".

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, j). When first transmission signal 303_1 of "reference signal 7501_*j* according to j-th parameter in transmission panel antenna X for frequency $X_i" is tx1refj(t), multiplier 304_1 obtains tx1refj(t)×w1(i, j). Then, base station #1 labeled 901_1 transmits tx1refj(t)×w1(i, j) from antenna 306_1 in FIG. 3. Note that t represents time.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, j). When second transmission signal 303_2 of "reference signal 7501_*j* according to j-th parameter in transmission panel antenna X for frequency $X_i" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, j). When third transmission signal 303_3 of "reference signal 7501_*j* according to j-th parameter in transmission panel antenna X for frequency $X_i" is tx3refj(t), multiplier 304_3 obtains tx3refj(t)×w3(i, j). Then, base station #1 labeled 901_1 transmits tx3refj(t)×w3(i, j) from antenna 306_3 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, j). When fourth transmission signal 303_4 of "reference signal 7501_*j* according to j-th parameter in transmission panel antenna X for frequency $X_i" is tx4refj(t), multiplier 304_4 obtains tx4refj(t)×w4(i, j). Then, base station #1 labeled 901_1 transmits tx4refj(t)×w4(i, j) from antenna 306_4 in FIG. 3.

Note that j is an integer from 1 to 4 (both inclusive) in the case of FIG. 75. The number Z of parameter changes is four in FIG. 75, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 73, 74, and 75, when base station #1 labeled 901_1 transmits "sector sweep reference signal 7401_X_i in transmission panel antenna X for frequency $X_i", "reference signal 7501_*j* according to j-th parameter in transmission panel antenna X for frequency $X_i" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal 7501_*j* according to j-th parameter in transmission panel antenna X for frequency $X_i";

Information on the frequency band and/or frequency $X_i (information of the number of frequency divisions may also be included), which will be described later.

Transmission of the "identification number (ID) of the transmission panel antenna" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of time divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency $X_i" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 11, the description is based on a case where the terminals transmit signals using a single-carrier scheme and frequency (bands) used by the base station and frequency (bands) used by the terminals may partially overlap each other or may be different from each other, by way of example.

FIG. 23 illustrates an exemplary operation in the time period from time t1 to t2, which is the terminal response period. The horizontal axis represents time in FIG. 23. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 23, the components that operate in the same manner as in FIGS. 10 and 13 are denoted by the same reference signs.

As illustrated in FIGS. 10 and 23, for example, base station #1 labeled 901_1 transmits sector sweep reference signals in the time period from time t0 to t1. After that, the terminal response period, which is the time period from time t1 to t2, includes terminal "sector sweep reference signal" first transmission period 1301_1, terminal "sector sweep reference signal" second transmission period 1301_2, terminal "sector sweep reference signal" third transmission period 1301_3, terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8, as illustrated in FIG. 13.

Thus, in the case of FIG. 23, "the number of time divisions in which sector sweep reference signals can be transmitted when the terminals transmit the sector sweep reference signals" is set to eight by base station #1 labeled 901_1.

FIG. 76 illustrates an exemplary relationship between base station #1 labeled 901_1 and terminal #i labeled **902_*i* in Embodiment 11, and the components that operate in the same manner as in FIG. 9 are denoted by the same reference signs. As illustrated in FIGS. 1A, 1B, and 1C, base station #1 labeled 901_1 includes transmission panel antenna 1 labeled 7601_1, transmission panel antenna 2 labeled 7601_2, . . . , transmission panel antenna M labeled 7601**_M.

Base station #1 labeled 901_1 communicates with terminal #1 labeled 902_1, terminal #2 labeled 902_2, and terminal #3 labeled 902_3 using transmission panel antenna 1 labeled 7601_1.

In addition, base station #1 labeled 901_1 communicates with terminal #4 labeled 902_4, terminal #5 labeled 902_5, and terminal #6 labeled 902_6 using transmission panel antenna 2 labeled 7601_2.

Note that base station #1 labeled 901 may communicate with other terminals using transmission panel antenna 3 labeled 7601_3 to transmission panel antenna M labeled 7601_M, but a description on this point will be omitted for simplicity.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23. Note that the horizontal axis represents time in FIG. 24.

Terminal #1 labeled 902_1 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #1 labeled 902_1 estimates, for example, "transmission panel antenna a1 (=1) and parameter b1" as the "transmission panel antenna and parameter" with high reception quality. Terminal #1 labeled 902_1 also estimates frequency band $1_M1 as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal

#1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 2401_1 includes information of the "transmission panel antenna and parameter" with high reception quality obtained by terminal #1 labeled 902_1, that is, information of "transmission panel antenna a1 (=1) and parameter b1". Terminal #1 "sector sweep reference signal" 2401_1 also includes information of the "frequency domain", for example, information of "frequency band ♭$1_M1". This will be described later.

Likewise, terminal #2 labeled 902_2 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #2 labeled 902_2 estimates, for example, "transmission panel antenna a2 (=1) and parameter b2" as the "transmission panel antenna and parameter" with high reception quality. Terminal #2 labeled 902_2 also estimates frequency band $1_1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 24, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth (="5"+1) transmission period 1301_6" in FIG. 24.

Note that terminal #2 "sector sweep reference signal 2401_2" includes information of the "transmission panel antenna and parameter" with high reception quality obtained by terminal #2 labeled 902_2, that is, information of "transmission panel antenna a2 (=1) and parameter b2". Terminal #2 "sector sweep reference signal" 2401_2 also includes information of the "frequency domain", for example, information of "frequency band $1_1". This will be described later.

Thus, terminal #i labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency $X_i" included in sector sweep reference signal 1001** may be used for this estimation.

Terminal #i labeled **902_*i* estimates, for example, "transmission panel antenna ai and parameter bi" as the "transmission panel antenna and parameter" with high reception quality. Terminal #1 labeled 902_1** also estimates frequency band $X_i as the "frequency domain" with high reception quality.

In addition, while estimating the "transmission panel antenna and parameter" with high reception quality, terminal #i labeled **902_*i* simultaneously obtains information of "the number of time divisions in which sector sweep reference signals can be transmitted when the terminals transmit the sector sweep reference signals". In the case of FIG. 24, terminal #i labeled 902_1** obtains information indicating that "the number of time divisions in which sector sweep reference signals can be transmitted when the terminals transmit the sector sweep reference signals" is eight.

In this case, terminal #i labeled **902_*i* obtains, for example, any one of the values "0", "1", "2", "3", "4", "5", "6", and "7" using a random number. For example, terminal #i labeled 902_*i* obtains "yi" using a random number. Note that yi is any one of the values "0", "1", "2", "3", "4", "5", "6", and "7". In this case, terminal #i labeled 902_*i* transmits terminal #i "sector sweep reference signal" 2401_*i* using terminal "sector sweep reference signal" ("yi"+1)-th transmission period 1301_("yi"+1) in FIG. 24**.

Note that terminal #i "sector sweep reference signal" **2401_*i* includes information of the "transmission panel antenna and parameter" with high reception quality obtained by terminal #1 labeled 902_*i*, that is, information of "transmission panel antenna ai and parameter bi". Terminal #i "sector sweep reference signal" 2401_*i*** also includes information of the "frequency domain", for example, information of "frequency band $X_i". This will be described later.

Note that, in FIG. 24, it may be considered that terminal #i "sector sweep reference signals" **2401_*i* use a first frequency (band) regardless of i as a first method. In this case, terminal #i "sector sweep reference signals" 2401_*i*** are subjected to time division (time division multiple access (TDMA)). This is because the terminals transmit modulation signals using a single-carrier scheme.

As a second method, terminal #i "sector sweep reference signals" **2401_*i*** do not necessarily use the same frequency (band).

Both the first and second methods produce an effect of "reducing interference between terminal #i "sector sweep reference signals" 2401_*i*".

For example, in a case where base station #1 labeled 901_1 transmits modulation signals using "frequency band $1 to frequency band $M", a method can be considered in which terminal #i labeled 902_*i* transmits a modulation signal in a single-carrier scheme using "frequency band $1 to frequency band $M".

As another method, in a case where base station #1 labeled 901_1 transmits modulation signals using "frequency band $1 to frequency band $M", a method can be considered in which terminal #i labeled 902_*i* transmits a modulation signal in a single-carrier scheme using some of "frequency band $1 to frequency band $M".

Further, a method can be considered in which base station #1 labeled 901_1 transmits modulation signals using "frequency band $1 to frequency band $M" and terminal #i labeled 902_*i* transmits a modulation signal using a frequency (band) other than "frequency band $1 to frequency band $M".

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Terminal #i labeled 902_*i* transmits terminal #i "sector sweep reference signal" 2401_*i* as illustrated in FIG. 24. FIG. 15A illustrates an exemplary configuration of terminal #i "sector sweep reference signal" 2401_*i*. Note that the horizontal axis represents time in FIG. 15A. "Terminal #i "sector sweep reference signal" 1401_*i*" in FIG. 15A corresponds to an exemplary "sector sweep reference signal" 2401_*i* in FIG. 24.

As illustrated in FIG. 15A, terminal #i "sector sweep reference signal" 2401_*i* of terminal #i labeled 902_*i* is composed of "sector sweep reference signal 1501_1 in terminal #i transmission panel antenna 1, sector sweep reference signal 1501_2 in terminal #1 transmission panel antenna 2, . . . , sector sweep reference signal 1501_M in terminal #i transmission panel antenna M".

For example, terminal #1 labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example. "reference signal 1511_1 according to first parameter in transmission panel antenna xi", "reference signal 1511_2 according to second parameter in transmission panel antenna xi". "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #1 labeled 902_*i* transmits tx3refj(t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 24, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces an effect of enhancing data reception quality.

Further, as illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency $X_i" that has been used for transmission by terminal #i labeled 902_*i* or that terminal #i labeled 902_*i* desires base station #1 labeled 901_1 to use.

Transmission of the "information on the frequency band and/or frequency $X_i" by terminal #i labeled 902_*i* allows base station #1 labeled 901_1 to recognize the "information on the frequency band and/or frequency $X_i"; accordingly, terminal #i labeled 902_*i* and base station #1 labeled 901_1 can perform appropriate control. This produces an effect of enhancing data reception quality.

FIG. 78A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 78A. In this example, there are a first transmission period, a second transmission period, a third transmission period, and a fourth transmission period for feedback signal 1002 as illustrated in FIG. 78A. Note that Ω transmission periods may be configured to be present for feedback signal 1002, where Ω is an integer equal to or greater than 1 or an integer equal to or greater than 2.

In addition, there are frequency band $1, frequency band $2, . . . , frequency band $M for feedback signal 1002 in FIG. 78A.

Thus, the first transmission period includes feedback signal first transmission period 7801_11 in transmission panel antenna 1 for frequency $1, feedback signal first transmission period 7801_21 in transmission panel antenna 2 for frequency $2, . . . , feedback signal first transmission period 7801_M1 in transmission panel antenna M for frequency $M. Likewise, the second transmission period includes feedback signal second transmission period 7801_12 in transmission panel antenna 1 for frequency $1, feedback signal second transmission period 7801_22 in transmission panel antenna 2 for frequency $2, . . . , feedback signal second transmission period 7801_M2 in transmission panel antenna M for frequency $M. The third transmission period includes feedback signal third transmission period 7801_13 in transmission panel antenna 1 for frequency $1, feedback signal third transmission period 7801_23 in transmission panel antenna 2 for frequency $2, . . . , feedback signal third transmission period 7801_M3 in transmission panel antenna M for frequency $M. The fourth transmission period includes feedback signal fourth transmission period 7801_14 in transmission panel antenna 1 for frequency $1, feedback signal fourth transmission period 7801_24 in transmission panel antenna 2 for frequency $2, . . . , feedback signal fourth transmission period 7801_M4 in transmission panel antenna M for frequency $M.

One feature is that "feedback signals are transmitted from transmission panel antenna i in frequency band $i in FIG. 78A".

FIG. 78B illustrates an exemplary configuration of "feedback signal first transmission period 7801_X1 in transmission panel antenna X for frequency $X", "feedback signal second transmission period 7801_X2 in transmission panel antenna X for frequency $X", "feedback signal third transmission period 7801_X3 in transmission panel antenna X for frequency $X", and "feedback signal fourth transmission period 7801_X4 in transmission panel antenna X for frequency $X" in FIG. 78A. Note that the vertical axis represents frequency and the horizontal axis represents time in FIG. 78B.

Frequency band $X_1, frequency band $X_2, . . . , frequency band $X_M (X) are included in frequency $X where "feedback signal first transmission period 7801_X1 in transmission panel antenna X for frequency $X", "feedback signal second transmission period 7801_X2 in transmission panel antenna X for frequency $X", "feedback signal third transmission period 7801_X3 in transmission panel antenna X for frequency $X", and "feedback signal fourth transmission period 7801_X4 in transmission panel antenna X for frequency $X" are present. Note that M (X) is an integer equal to or greater than 1 or an integer equal to or greater than 2.

In frequency $X_i, feedback signal first transmission period 7811_X_i_1 in transmission panel antenna X for frequency $X_i, feedback signal second transmission period 7811_X_i_2 in transmission panel antenna X for frequency $X_i, feedback signal third transmission period 7811_X_i_3 in transmission panel antenna X for frequency $X_i, and feedback signal fourth transmission period 7811_X_i_4 in transmission panel antenna X for frequency $X_i are present. Note that i is an integer from 1 to M (X) (both inclusive).

Note that, in feedback signal first transmission period 7811_X_i_1 in transmission panel antenna X for frequency $X_i, feedback signal second transmission period 7811_X_i_2 in transmission panel antenna X for frequency $X_i, feedback signal third transmission period 7811_X_i_3 in transmission panel antenna X for frequency $X_i, and feedback signal fourth transmission period 7811_X_i_4 in transmission panel antenna X for frequency $X_i, signals are transmitted from transmission panel antenna X labeled 106_X of base station #1 labeled 901_1 with the configuration in FIG. 1A, 1B, or 1C.

FIG. 78C illustrates exemplary specific feedback signal assignment for feedback signal 1002 illustrated in FIGS. 78A and 78B. Note that FIG. 78C illustrates exemplary feedback signal assignment in feedback signal first transmission period 7811_1_*i*_1 in transmission panel antenna 1 for frequency $1_i, feedback signal second transmission period 7811_1_*i*_2 in transmission panel antenna 1 for frequency $1_i, feedback signal third transmission period 7811_1_*i*_3 in transmission panel antenna 1 for frequency $1_i, and feedback signal fourth transmission period 7811_1_*i*_4 in transmission panel antenna 1 for frequency $1_i.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, and terminal #3 labeled 902_3 transmits terminal #3 "sector sweep reference signal" 2401_3.

Terminal #1 "sector sweep reference signal" 2401_1 includes information indicating that "frequency band $1_M1 has high reception quality". Thus, base station #1 labeled 901_1 transmits terminal #1-addressed feedback signal 7821_1 from transmission panel antenna 1 using frequency band $1_M1 as in FIG. 78C.

Terminal #2 "sector sweep reference signal" 2401_2 includes information indicating that "frequency band $1_1 has high reception quality". Thus, base station #1 labeled

901_1 transmits terminal #2-addressed feedback signal 7821_2 from transmission panel antenna 1 using frequency band $1_1 as in FIG. 78C.

Terminal #3 "sector sweep reference signal" 2401_3 includes information indicating that "frequency band $1_1 and frequency band $1_2 have high reception quality". Thus, base station #1 labeled 901_1 transmits terminal #3-addressed feedback signal 7821_3 from transmission panel antenna 1 using frequency bands $1_1 and $1_2 as in FIG. 78C.

FIG. 78D illustrates exemplary specific feedback signal assignment for feedback signal 1002 illustrated in FIGS. 78A and 78B. Note that FIG. 78D illustrates exemplary feedback signal assignment in feedback signal first transmission period **7811_2_*i*_1 in transmission panel antenna 2 for frequency $2_i, feedback signal second transmission period 7811_2_*i*_2 in transmission panel antenna 2 for frequency $2_i, feedback signal third transmission period 7811_2_*i*_3 in transmission panel antenna 2 for frequency $2_i, and feedback signal fourth transmission period 7811_2_*i*_4** in transmission panel antenna 2 for frequency $2_i.

Although not illustrated in FIG. 24, for example, terminal #4 "sector sweep reference signal" 2401_4 transmitted by terminal #4 labeled 902_4, terminal #5 "sector sweep reference signal" 2401_5 transmitted by terminal #5 labeled 902_5, and terminal #6 "sector sweep reference signal" 2401_6 transmitted by terminal #6 labeled 902_6 are assumed to be present in FIG. 24.

Terminal #4 "sector sweep reference signal" 2401_4 includes information indicating that "frequency band $2_M2 has high reception quality". Thus, base station #1 labeled 901_1 transmits terminal #4-addressed feedback signal 7821_4 from transmission panel antenna 2 using frequency band $2_M2 as in FIG. 78D.

Terminal #5 "sector sweep reference signal" 2401_5 includes information indicating that "frequency band $2_2 has high reception quality". Thus, base station #1 labeled 901_1 transmits terminal #5-addressed feedback signal 7821_5 from transmission panel antenna 2 using frequency band $2_2 as in FIG. 78D.

Terminal #6 "sector sweep reference signal" 2401_6 includes information indicating that "frequency band $2_1 and frequency band $2_M2 have high reception quality". Thus, base station #1 labeled 901_1 transmits terminal #6-addressed feedback signal 7821_6 from transmission panel antenna 2 using frequency bands $2_1 and $2_M2 as in FIG. 78D.

Note that terminal-addressed feedback signals may be assigned to frequency band $3 to frequency band $M in the same manner as the above.

In this manner, obtaining terminal #i-addressed feedback signal **7821_*i* allows terminal #i labeled 902_*i* to know that communication with base station #1 labeled 901_1 is available and to know the frequency band to be used. Note that FIGS. 78C and 78D are merely examples. In a case where there is no terminal #1-addressed feedback signal 7821_1 as feedback signal 1002, for example, terminal #1 labeled 902_1 recognizes that the communication with base station #1 labeled 901_1** has not been established.

At this time, terminal #i-addressed feedback signal **7821_*i* includes, for example, information indicating that communication with terminal #i labeled 902_*i* is available (or indicating that data-symbol-included frame 1003 in FIG. 10 includes a symbol addressed to terminal #i labeled 902_*i***).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled **902_*i*, and base station #1 labeled 901_1 then transmits terminal #i-addressed feedback signal 7821_*i***.

Note that terminal #i-addressed feedback signal **7821_*i* in FIGS. 78C and 78D may be assigned to a plurality of frequency bands. At this time, terminal #i-addressed feedback signal 7821_*i* may be assigned to frequency bands discretely. (As a result, terminal #i-addressed feedback signal 7821_*i*** is assigned to one or more frequency bands.)

Further, terminal #i-addressed feedback signal **7821_*i* may be assigned to a plurality of time periods. At this time, terminal #i-addressed feedback signal 7821_*i* may be assigned to time periods discretely. (As a result, terminal #i-addressed feedback signal 7821_*i*** is assigned to one or more time periods.)

FIG. 79A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 79A. In this example, there are a first transmission period, a second transmission period, a third transmission period, and a fourth transmission period for data-symbol-included frame 1003 as illustrated in FIG. 79A. Note that Ω transmission periods may be configured to be present for data-symbol-included frame 1003, where Ω is an integer equal to or greater than 1 or an integer equal to or greater than 2.

In addition, there are frequency band $1, frequency band $2, . . . , frequency band $M for data-symbol-included frame 1003 in FIG. 79A.

Thus, the first transmission period includes modulation signal (slot) first transmission period 7901_11 in transmission panel antenna 1 for frequency $1, modulation signal (slot) fast transmission period 7901_21 in transmission panel antenna 2 for frequency $2, . . . , modulation signal (slot) first transmission period 7901_M1 in transmission panel antenna M for frequency $M. Likewise, the second transmission period includes modulation signal (slot) second transmission period 7901_12 in transmission panel antenna 1 for frequency $1, modulation signal (slot) second transmission period 7901_22 in transmission panel antenna 2 for frequency $2, . . . , modulation signal (slot) second transmission period 7901_M2 in transmission panel antenna M for frequency $M. The third transmission period includes modulation signal (slot) third transmission period 7901_13 in transmission panel antenna 1 for frequency $1, modulation signal (slot) third transmission period 7901_23 in transmission panel antenna 2 for frequency $2, . . . , modulation signal (slot) third transmission period 7901_M3 in transmission panel antenna M for frequency $M. The fourth transmission period includes modulation signal (slot) fourth transmission period 7901_14 in transmission panel antenna 1 for frequency $1, modulation signal (slot) fourth transmission period 7901_24 in transmission panel antenna 2 for frequency $2, . . . , modulation signal (slot) fourth transmission period 7901_M4 in transmission panel antenna M for frequency $M.

One feature is that "modulation signals (slots) are transmitted from transmission panel antenna i in frequency band $i in FIG. 79B".

FIG. 79B illustrates an exemplary configuration of "modulation signal (slot) first transmission period 7901_X1 in transmission panel antenna X for frequency $X", "modulation signal (slot) second transmission period 7901_X2 in transmission panel antenna X for frequency $X", "modulation signal (slot) third transmission period 7901_X3 in transmission panel antenna X for frequency $X", and "modulation signal (slot) fourth transmission period 7901_X4 in transmission panel antenna X for frequency $X" in FIG. 79A. Note that the vertical axis represents frequency and the horizontal axis represents time in FIG. 79B.

Frequency band $X_1, frequency band $X_2, . . . , frequency band $X_M (X) are included in frequency $X where "modulation signal (slot) first transmission period 7901_X1 in transmission panel antenna X for frequency $X", "modulation signal (slot) second transmission period 7901_X2 in transmission panel antenna X for frequency $X", "modulation signal (slot) third transmission period 7901_X3 in transmission panel antenna X for frequency $X", and "modulation signal (slot) fourth transmission period 7901_X4 in transmission panel antenna X for frequency $X" are present. Note that M (X) is an integer equal to or greater than 1 or an integer equal to or greater than 2.

In frequency $X_i, modulation signal (slot) first transmission period 7911_X_i_1 in transmission panel antenna X for frequency $X_i, modulation signal (slot) second transmission period 7911_X_i_2 in transmission panel antenna X for frequency $X_i, modulation signal (slot) third transmission period 7911_X_i_3 in transmission panel antenna X for frequency $X_i, and modulation signal (slot) fourth transmission period 7911_X_i_4 in transmission panel antenna X for frequency $X_i are present. Note that i is an integer from 1 to M (X) (both inclusive).

Note that, in modulation signal (slot) first transmission period 7911_X_i_1 in transmission panel antenna X for frequency $X_i, modulation signal (slot) second transmission period 7911_X_i_2 in transmission panel antenna X for frequency $X_i, modulation signal (slot) third transmission period 7911_X_i_3 in transmission panel antenna X for frequency $X_i, and modulation signal (slot) fourth transmission period 7911_X_i_4 in transmission panel antenna X for frequency $X_i, signals are transmitted from transmission panel antenna X labeled 106_X of base station #1 labeled 901_1 with the configuration in FIG. 1A, 1B, or 1C.

FIG. 79C illustrates exemplary specific modulation signal (slot) assignment for data-symbol-included frame 1003 illustrated in FIGS. 79A and 79B. Note that FIG. 79C illustrates exemplary modulation signal (slot) assignment in modulation signal (slot) first transmission period **7911_1_*i*_1 in transmission panel antenna 1 for frequency $1_i, modulation signal (slot) second transmission period 7911_1_*i*_2 in transmission panel antenna 1 for frequency $1_i, modulation signal (slot) third transmission period 7911_1_*i*_3 in transmission panel antenna 1 for frequency $1_i, and modulation signal (slot) fourth transmission period 7911_1_*i*_4** in transmission panel antenna 1 for frequency $1_i.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, and terminal #3 labeled 902_3 transmits terminal #3 "sector sweep reference signal" 2401_3.

Terminal #1 "sector sweep reference signal" 2401_1 includes information indicating that "frequency band $1_M1 has high reception quality". Thus, base station #1 labeled 901_1 transmits terminal #1-addressed modulation signal (slot) 7921_1 from transmission panel antenna 1 using frequency band $1_M1 as in FIG. 79C.

Terminal #2 "sector sweep reference signal" 2401_2 includes information indicating that "frequency band $1_1 has high reception quality". Thus, base station #1 labeled 901_1 transmits terminal #2-addressed modulation signal (slot) 7921_2 from transmission panel antenna 1 using frequency band $1_i as in FIG. 79C.

Terminal #3 "sector sweep reference signal" 2401_3 includes information indicating that "frequency band $1_1 and frequency band $1_2 have high reception quality". Thus, base station #1 labeled 901_1 transmits terminal #3-addressed modulation signal (slot) 7921_3 from transmission panel antenna 1 using frequency bands $1_1 and $1_2 as in FIG. 79C.

FIG. 79D illustrates exemplary specific modulation signal (slot) assignment for data-symbol-included frame 1003 illustrated in FIGS. 79A and 79B. Note that FIG. 79D illustrates exemplary modulation signal (slot) assignment in modulation signal (slot) first transmission period **7911_2_*i*_1 in transmission panel antenna 2 for frequency $2_i, modulation signal (slot) second transmission period 7911_2_*i*_2 in transmission panel antenna 2 for frequency $2_i, modulation signal (slot) third transmission period 7911_2_*i*_3 in transmission panel antenna 2 for frequency $2_i, and modulation signal (slot) fourth transmission period 7911_2_*i*_4** in transmission panel antenna 2 for frequency $2_i.

Although not illustrated in FIG. 24, for example, terminal #4 "sector sweep reference signal" 2401_4 transmitted by terminal #4 labeled 902_4, terminal #5 "sector sweep reference signal" 2401_5 transmitted by terminal #5 labeled 902_5, and terminal #6 "sector sweep reference signal" 2401_6 transmitted by terminal #6 labeled 902_6 are assumed to be present in FIG. 24.

Terminal #4 "sector sweep reference signal" 2401_4 includes information indicating that "frequency band $2_M2 has high reception quality". Thus, base station #1 labeled 901_1 transmits terminal #4-addressed modulation signal (slot) 7921_4 from transmission panel antenna 2 using frequency band $2_M2 as in FIG. 79D.

Terminal #5 "sector sweep reference signal" 2401_5 includes information indicating that "frequency band $2_2 has high reception quality". Thus, base station #1 labeled 901_1 transmits terminal #5-addressed modulation signal (slot) 7921_5 from transmission panel antenna 2 using frequency band $2_2 as in FIG. 79D.

Terminal #6 "sector sweep reference signal" 2401_6 includes information indicating that "frequency band $2_1 and frequency band $2_M2 have high reception quality". Thus, base station #1 labeled 901_1 transmits terminal #6-addressed modulation signal (slot) 7921_6 from transmission panel antenna 2 using frequency bands $2_1 and $2_M2 as in FIG. 79D.

Note that terminal-addressed modulation signals (slots) may be assigned to frequency band $3 to frequency band $M in the same manner as the above.

At this time, terminal #i-addressed modulation signal (slot) **7921_*i* includes, for example, a data symbol (data and/or information) addressed to terminal #1 labeled 902_*i***.

In this manner, obtaining terminal #i-addressed modulation signal (slot) **7921_*i* allows terminal #i labeled 902_*i* to know that communication with base station #1 labeled 901_1 is available and to know the frequency band to be used. Note that FIGS. 79C and 79D are merely examples. In a case where there is no terminal #1-addressed modulation signal (slot) 7921_1 as data-symbol-included frame 1003, for example, terminal #1 labeled 902_1 recognizes that the communication with base station #1 labeled 901_1** has not been established.

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled **902_*i*, and base station #1 labeled 901_1 then transmits terminal #i-addressed modulation signal (slot) 7921_*i***.

Note that, in FIGS. 78C and 78D, base station #1 labeled 901_1 may estimate the "frequency (band)" and the "transmission panel antenna and parameter" of terminal #i labeled 902_1 with high reception quality in receiving "terminal #i "sector sweep reference signal" **7701_*i* transmitted by terminal #i labeled 902_*i*", and the estimated information may be included in terminal #i-addressed feedback signal 7821_*i***.

Terminal #i labeled **902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1**.

Incidentally, in the time period from t3 to t4 in FIG. 10, terminal #i labeled **902_*i* may transmit, to base station #1 labeled 901_1, a modulation signal including information indicating successful reception of a signal from base station #1 labeled 901_1**, such as acknowledgement (ACK).

Note that, terminal #i-addressed modulation signal (slot) **7921_*i* in FIGS. 79C and 79**D may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

Terminal #i-addressed modulation signal (slot) **7921_*i* in FIGS. 79C and 79D may be assigned to a plurality of frequency bands. At this time, terminal #i-addressed modulation signal (slot) 7921_*i* may be assigned to frequency bands discretely. (As a result, terminal #i-addressed modulation signal (slot) 7921_*i*** is assigned to one or more frequency bands.)

Further, terminal #i-addressed modulation signal (slot) **7921_*i* may be assigned to a plurality of time periods. At this time, terminal #i-addressed modulation signal (slot) 7921_*i* may be assigned to time periods discretely. (As a result, terminal #i-addressed modulation signal (slot) 7921_*i*** is assigned to one or more time periods.)

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 76. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 23, 24, 15A, 15B, etc., and the description thereof will be thus omitted.

Base station #1 labeled 901_1 transmits feedback signal 1802_1. Note that this has already been described with reference to FIGS. 78A, 78B, 78C, and 78D, and the description thereof will be thus omitted.

After that, base station #1 labeled 901_1 transmits "data-symbol-included frame 1803_1". Note that this has already been described with reference to FIGS. 79A, 79B, 79C, and 79D, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIG. 25. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 79A, 79B, 79C, and 79D.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIG. 25.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 79A, 79B, 79C, and 79D.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIG. 25.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 23, 24, 15A, 15B, etc., and the description thereof will be thus omitted.

Base station #1 labeled 901_1 transmits feedback signal 1802_2. Note that this has already been described with reference to FIGS. 78A, 78B, 78C, and 78D, and the description thereof will be thus omitted.

After that, base station #1 labeled 901_1 transmits "data-symbol-included frame 1803_4". Note that this has already been described with reference to FIGS. 79A, 79B, 79C, and 79D, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIG. 25.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIG. 25. Note that i is an integer equal to or greater than 1, for example, and the horizontal axis represents time in FIG. 25.

As illustrated in FIG. 25, "data-symbol-included frame 1852_*i*" is composed of a first transmission period, a second transmission period, a third transmission period, a fourth transmission period, a fifth transmission period, a sixth transmission period, a seventh transmission period, and an eighth transmission period.

As illustrated in FIG. 25, for example, terminal #1 labeled 902_1 transmits terminal #1 transmission frame (including a data symbol) 2501_1 using the first transmission period.

Terminal #2 labeled 902_2 transmits terminal #2 transmission frame (including a data symbol) 2501_2 using the sixth transmission period.

Terminal #3 labeled 902_3 transmits terminal #3 transmission frame (including a data symbol) 2501_3 using the fourth transmission period.

Terminal #4 labeled 902_4 transmits terminal #4 transmission frame (including a data symbol) 2501_4 using the second transmission period.

Terminal #5 labeled 902_5 transmits terminal #5 transmission frame (including a data symbol) 2501_5 using the eighth transmission period.

Terminal #6 labeled 902_6 transmits terminal #6 transmission frame (including a data symbol) 2501_6 using the fifth transmission period.

Note that the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" uses a single-carrier transmission scheme. In addition, a plurality of terminals may use the same frequency (band).

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, time division and transmitted by each terminal, and base station #1 labeled 901_1 receives the frame transmitted by the terminal, thereby preventing interference and achieving high data reception quality.

Note that terminal #1 transmission frame 2501_1, terminal #2 transmission frame 2501_2, terminal #3 transmission frame 2501_3, terminal #4 transmission frame 2501_4, terminal #5 transmission frame 2501_5, and terminal #6 transmission frame 2501_6 in FIG. 25 may include, in addition to the data symbol, a "reference signal such as DMRS, PTRS, or SRS", a pilot symbol, a pilot signal, a preamble, and a symbol including control information, for example.

In FIG. 25, a description has been given of a case where the terminals perform time division on the frames to be transmitted, but the terminals may perform spatial division on the frames to be transmitted using multi user-multiple-input multiple-output (MU-MIMO).

FIG. 24 illustrates exemplary occupation by the terminals in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, a description will be given of exemplary occupation by terminals different from that in FIG. 24 in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, the components that operate in the same manner as in FIGS. 23 and 24 are denoted by the same reference signs, and the descriptions thereof will be omitted since they have already been described. In the following, the difference from the description in FIG. 24 will be described.

Terminal #2 labeled 902_2 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band ♭1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of time divisions in which sector sweep reference signals can be transmitted when the terminals transmit the sector sweep reference signals". In the case of FIG. 26, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth transmission period 1301_6" as in FIG. 26.

Note that terminal #2 "sector sweep reference signal" 2401_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 76 receives sector sweep reference signal 1001 transmitted by base station #1 labeled 901_1, obtains the "identification number (ID) of the transmission panel antenna" and "identification number (ID) of the parameter used for beamforming (directivity control)" with high reception quality, and then can communicate with base station #1 labeled 901_1.

Terminal #3 labeled 902_3, for example, estimates "transmission panel antenna a3 and parameter b3" as the "transmission panel antenna and parameter" with high reception quality.

In addition, while estimating the "frequency (band)" and "transmission panel antenna and parameter" with high reception quality, terminal #3 labeled 902_3 simultaneously obtains information of the "the number of time divisions in which sector sweep reference signals can be transmitted when the terminals transmit the sector sweep reference signals". In the case of FIG. 26, terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "5" using a random number. In this case, since "5"+1=6, terminal #3 labeled 902_3 transmits terminal #3 "sector sweep reference signal" 2601_3 using "terminal "sector sweep reference signal" sixth transmission period 1301_6" as in FIG. 26.

Note that terminal #3 "sector sweep reference signal" 2601_3 includes information of the "transmission panel antenna and parameter" with high reception quality obtained by terminal #3 labeled 902_3, that is, information of "transmission panel antenna a3 and parameter b3".

At this time, as illustrated in FIG. 26, the time period for "terminal #2 "sector sweep reference signal" 2401_2 transmitted by terminal #2 labeled 902_2" and the time period for "terminal #3 "sector sweep reference signal" 2601_3 transmitted by terminal #3 labeled 902_3" overlap each other.

Thus, base station #1 labeled 901_1 possibly simultaneously receives terminal #2 "sector sweep reference signal" 2401_2 and terminal #3 "sector sweep reference signal" 2601_3.

In this case, the following is two possible cases.

<Case 1>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 are different from the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1. Accordingly, base station #1 labeled 901_1 obtains information included in "terminal #2 "sector sweep reference signal" 2401_2 transmitted by terminal #2 labeled 902_2" and information included in "terminal #3 "sector sweep reference signal" 2601_3 transmitted by terminal #3 labeled 902_3".

In this case, in FIG. 78B for example, "feedback signal second transmission period 7811_X_1_2 (X is set to 1) for frequency $1_1 is for a signal addressed to terminal #2 labeled 902_2" and "feedback signal third transmission period 7811_X_1_3 for frequency $1_1 is for a signal addressed to terminal #3 labeled 902_3".

In addition, in FIG. 79B for example, "modulation signal (slot) second transmission period 7911_X_1_2 (X is set to 1) for frequency $1_1 is for a signal addressed to terminal #2 labeled 902_2" and "modulation signal (slot) third transmission period 7911_X_1_3 for frequency $1_1 is for a signal addressed to terminal #3 labeled 902_3".

In this manner, base station #1 labeled 901_1 can communicate with terminal #2 labeled 902_2 and terminal #3 labeled 902_3.

<Case 2>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 interfere with the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1.

<Case 2-1>

In some cases, base station #1 labeled 901_1 obtains either information included in "terminal #2 "sector sweep reference signal" 2401_2 transmitted by terminal #2 labeled 902_2" or information included in "terminal #3 "sector sweep reference signal" 2601_3 transmitted by terminal #3 labeled 902_3".

For example, base station #1 labeled 901_1 obtains the information included in "terminal #2 "sector sweep reference signal" 2401_2 transmitted by terminal #2 labeled 902_2".

In this case, in FIG. 78B for example, "feedback signal second transmission period 7811_X_1_3 for frequency $1_1 is for a signal addressed to terminal #2 labeled 902_2".

In addition, in FIG. 79B for example, "modulation signal (slot) second transmission period 7911_X_1_3 for frequency $1_1 is for a signal addressed to terminal #2 labeled 902_2".

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIG. 26. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed as in the cases described above, and terminal #3 labeled 902_3 communicate with base station #1 labeled 901_1. Note that the specific examples have been described in other embodiments.

<Case 2-2>

In some cases, base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3".

It is assumed that sector sweep reference signal 1851_1 in FIG. 18 has the states in FIG. 26, and base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #2 labeled 902_2, for example, estimates frequency band $1_1 as the "frequency (band)" with high reception quality and estimates "transmission panel antenna a2 and parameter b2" as the "transmission panel antenna and parameter".

In other cases, terminal #2 labeled 902_2, for example, estimates a frequency in frequency band $1_i, where i is not 1, as the "frequency (band)" with high reception quality and estimates "transmission panel antenna a2 and parameter b2" as the "transmission panel antenna and parameter".

In still other cases, terminal #2 labeled 902_2, for example, estimates a frequency in frequency band $X_i, where X is not 1, as the "frequency (band)" with high reception quality and estimates "transmission panel antenna a2 and parameter b2" as the "transmission panel antenna and parameter".

In any of the cases, the predetermined procedure is performed as in the cases described above, and terminal #2 labeled 902_2 communicate with base station #1 labeled 901_1. Note that the specific examples have been described in other embodiments.

Likewise, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed again as in the cases described above, and terminal #3 labeled 902_3 communicate with base station #1 labeled 901_1. Note that the specific examples have been described in other embodiments.

In the manner described above, a collision of the sector sweep reference signals transmitted by the respective terminals can be further reduced. This produces an effect that the base station can receive more sector sweep reference signals and can communicate with more terminals.

As described above in Embodiment 11, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 73, 74, 75, 23, 24, 15A, 15B, 78A, 78B, 78C, 78D, 79A, 79B, 79C, 79D, 18, 19, 25, and 26, but the names thereof are not limited to those in the drawings and the important part is the functions of the signals to be transmitted.

Embodiment 12

In Embodiment 12, a variation of Embodiment 10 will be descried. Note that the drawings used in Embodiment 10 are sometimes used in the following description of Embodiment 12.

FIGS. 1A, 1B, and 1C illustrate exemplary configurations of, for example, a base station, an access point, a terminal, and a repeater according to Embodiment 12, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 12. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a multi-carrier scheme such as the OFDM scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 58 illustrates an exemplary configuration of the time period from time t1 to t2 in FIG. 10, which is the terminal response period, and the horizontal axis represents time. Sector sweep reference signal 1001 transmitted by the base station is present in the time period from time t0 to t1.

Subsequently, a terminal "sector sweep reference signal" is present in the time period from time t1 to t2.

FIG. 73 illustrates examples of sector sweep reference signal 1001 in FIG. 10 transmitted by base station #1 labeled 901_1 in FIG. 9 with the configuration in FIG. 1A. 1B, or 1C, for example. Note that the horizontal axis represents time and the vertical axis represents frequency in FIG. 73. In the example of FIG. 73, the frequency is divided into frequency band $1, frequency band $2, . . . , frequency band $M as illustrated in FIG. 73 for base station #1 labeled 901_1 to transmit modulation signals based on OFDMA. Note that M is an integer equal to or greater than 1 or an integer equal to or greater than 2. In the following description, M is the number of transmission panel antennas included in base station #1 labeled 901_1 in FIG. 9 with the configuration in FIG. 1A, 1B, or 1C, but the present disclosure is not limited to this.

For example, sector sweep reference signal 7301_1 in transmission panel antenna 1 for frequency $1 is present in frequency band $1.

Thus, sector sweep reference signal 7301_X in transmission panel antenna X for frequency $X is present in frequency band $X. Note that X is an integer from 1 to M (both inclusive).

Note that sector sweep reference signal 7301_X in transmission panel antenna X for frequency $X is transmitted from transmission panel antenna X labeled 106_X of base station #1 labeled 901_1 with the configuration in FIG. 1A, 1B, or 1C.

FIG. 74 illustrates an exemplary configuration of "sector sweep reference signal 7301_X in transmission panel antenna X for frequency $X" in FIG. 73. Note that the vertical axis represents frequency and the horizontal axis represents time in FIG. 74.

Frequency band $X_1, frequency band $X_2, . . . , frequency band $X_M (X) are included in frequency $X where "sector sweep reference signal 7301_X in transmission panel antenna X for frequency $X" is present. Note that M (X) is an integer equal to or greater than 1 or an integer equal to or greater than 2.

Sector sweep reference signal 7401_X_i in transmission panel antenna X for frequency $X_i is present in frequency band $X_i. Note that i is an integer from 1 to M (X) (both inclusive).

Note that sector sweep reference signal 7401_X_i in transmission panel antenna X for frequency $X_i is transmitted from transmission panel antenna X labeled 106_X of base station #1 labeled 901_1 with the configuration in FIG. 1A, 1B, or 1C.

FIG. 75 illustrates an exemplary configuration of "sector sweep reference signal 7401_X_i in transmission panel antenna X for frequency $X_i" in FIG. 74. Note that the horizontal axis represents time in FIG. 75.

"Sector sweep reference signal 7401_X_i in transmission panel antenna X for frequency $X_i" in FIG. 74 is composed of reference signal 7501_1 according to first parameter in transmission panel antenna X for frequency $X_i, reference signal 7501_2 according to second parameter in transmission panel antenna X for frequency $X_i, reference signal 7501_3 according to second parameter in transmission panel antenna X for frequency $X_i, and reference signal 7501_4 according to second parameter in transmission panel antenna X for frequency $X_i.

Next, a description will be given of a method of transmitting "sector sweep reference signal 7401_X_i in transmission panel antenna X for frequency $X_i" that is configured as in FIGS. 74 and 75 and transmitted by base station #1 labeled 901_1 with the configuration in FIG. 1A, 1B, or 1C.

For example, base station #1 labeled 901_1 with the configuration in FIG. 1A, 1B, or 1C includes the configuration in FIG. 3 as transmission panel antenna i labeled 106_*i*.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, 1). When first transmission signal 303_1 of "reference signal 7501_1 according to first parameter in transmission panel antenna X for frequency $X_i" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, 1). When second transmission signal 303_2 of "reference signal 7501_1 according to first parameter in transmission panel antenna X for frequency $X_i" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, 1). When third transmission signal 303_3 of "reference signal 7501_1 according to first parameter in transmission panel antenna X for frequency $X_i" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, 1). When fourth transmission signal 303_4 of "reference signal 7501_1 according to first parameter in transmission panel antenna X for frequency $X_i" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 7501_*j* according to j-th parameter in transmission panel antenna X for frequency $X_i".

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, j). When first transmission signal 303_1 of "reference signal 7501_*j* according to j-th parameter in transmission panel antenna X for frequency $X_i" is tx1refj(t), multiplier 304_1 obtains tx1refj(t)×w1(i, j). Then, base station #1 labeled 901_1 transmits tx1refj(t)×w1(i, j) from antenna 306_1 in FIG. 3. Note that t represents time.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, j). When second transmission signal 303_2 of "reference signal 7501_*j* according to j-th parameter in transmission panel antenna X for frequency $X_i" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, j). When third transmission signal 303_3 of "reference signal 7501_*j* according to j-th parameter in transmission panel antenna X for frequency $X_i" is tx3refj(t), multiplier 304_3 obtains tx3refj(t)×w3(i, j). Then, base station #1 labeled 901_1 transmits tx3refj(t)×w3(i, j) from antenna 306_3 in FIG. 3.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, j). When fourth transmission signal 303_4 of "reference signal 7501_*j* according to j-th parameter in transmission panel antenna X for frequency $X_i" is tx4refj(t), multiplier 304_4 obtains tx4refj(t)×w4(i, j). Then, base station #1 labeled 901_1 transmits tx4refj(t)×w4(i, j) from antenna 306_4 in FIG. 3.

Note that j is an integer from 1 to 4 (both inclusive) in the case of FIG. 75. The number Z of parameter changes is four in FIG. 75, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 73, 74, and 75, when base station #1 labeled 901_1 transmits "sector sweep reference signal 7401_X_i in transmission panel antenna X for frequency $X_i", "reference signal 7501_*j* according to j-th parameter in transmission panel antenna X for frequency $X_i" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal 7501_*j* according to j-th parameter in transmission panel antenna X for frequency $X_i";

- Information on the frequency band and/or frequency $X_i (information of the number of frequency divisions may also be included), which will be described later.

Transmission of the "identification number (ID) of the transmission panel antenna" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of frequency divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency $X_i" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t to t2 in FIG. 10, which is the terminal response period. Note that, in Embodiment 12, the description is based on a case where the terminals transmit signals using a multi-carrier scheme such as the OFDM scheme and frequency (bands) used by the base station and frequency (bands) used by the terminals partially overlap each other, by way of example.

FIG. 58 illustrates an exemplary operation in the time period from time t1 to t2, which is the terminal response period. Note that the horizontal axis represents time in FIG. 58. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 58, the components that operate in the same manner as in FIG. 10 are denoted by the same reference signs.

As illustrated in FIGS. 10 and 58, for example, base station #1 labeled 901_1 transmits sector sweep reference signals in the time period from time t0 to t1. After that, the terminal response period, which is the time period from time t1 to t2, includes terminal "sector sweep reference signal" 5801_1 as illustrated in FIG. 13.

FIG. 76 illustrates an exemplary relationship between base station #1 labeled 901_1 and terminal #i labeled 902_*i* in Embodiment 12, and the components that operate in the same manner as in FIG. 9 are denoted by the same reference signs. As illustrated in FIGS. 1A, 1B, and 1C, base station #1 labeled 901_1 includes transmission panel antenna 1 labeled 7601_1, transmission panel antenna 2 labeled 7601_2, . . . , transmission panel antenna M labeled 7601_M.

Base station #1 labeled 901_1 communicates with terminal #1 labeled 902_1, terminal #2 labeled 902_2, and terminal #3 labeled 902_3 using transmission panel antenna 1 labeled 7601_1.

In addition, base station #1 labeled 901_1 communicates with terminal #4 labeled 902_4, terminal #5 labeled 902_5, and terminal #6 labeled 902_6 using transmission panel antenna 2 labeled 7601_2.

Note that base station #1 labeled 901 may communicate with other terminals using transmission panel antenna 3 labeled 7601_3 to transmission panel antenna M labeled 7601_M, but a description on this point will be omitted for simplicity.

FIGS. 82A and 83A illustrate exemplary configurations, in time and frequency, of terminal "sector sweep reference signal" 5801_1 illustrated in FIG. 58. FIG. 82A illustrates an exemplary configuration in "frequency band $1_1 to frequency band $1_M1" (frequency band $1), and FIG. 83A illustrates an exemplary configuration in "frequency band $2_1 to frequency band $2_M2" (frequency band $2). Note that terminal "sector sweep reference signal" 5801_1 may be present in frequency band $3 to frequency band $M, but to simplify the description, a configuration of terminal "sector sweep reference signal" 5801_1 in frequency band $3 to frequency band $M is not described here.

FIG. 82A illustrates an exemplary configuration, in time and frequency, of terminal "sector sweep reference signal" 5801_1 illustrated in FIG. 58, and the horizontal axis represents time and the vertical axis represents frequency. As illustrated in FIG. 82A, "sector sweep reference signal" 8201_1 for frequency $1_1 to "sector sweep reference signal" 8201_M1 for frequency $1_M1 are present in frequency band $1.

In FIG. 82B, the horizontal axis represents time and the vertical axis represents frequency, and exemplary specific assignment of "sector sweep reference signal" 8201_1 for frequency $1_1 to "sector sweep reference signal" 8201_M1 for frequency $1_M1 to the terminals is illustrated.

Since it is "frequency band $1_1 to frequency band $1_M1", a terminal that has received a "sector sweep reference signal (see FIGS. 74 and 75)" transmitted from transmission panel antenna 1 labeled 7601_1 by base station #1 labeled 901_1 transmits a "sector sweep reference signal" in "frequency band $1_1 to frequency band $1_M1". Thus, as illustrated in FIG. 76, terminal #1 labeled 902_1, terminal #2 labeled 902_2, and terminal #3 labeled 902_3 transmit "sector sweep reference signals" using "frequency band $1_1 to frequency band $1_M1".

Terminal #1 labeled 902_1 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #1 labeled 902_1 estimates, for example, "transmission panel antenna a1 (=1) and parameter b1" as the "transmission panel antenna and parameter" with high reception quality. Terminal #1 labeled 902_1 also estimates frequency band $1_M1 as the "frequency domain" with high reception quality. Terminal #1 labeled 902_1 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #1 labeled 902_1 may simultaneously obtain information of "the number of frequency divisions in which sector sweep reference signals can be transmitted when the terminals transmit the sector sweep reference signals".

Then, terminal #1 labeled 902_1, for example, transmits terminal #1 "sector sweep reference signal" 8211_1 using frequency band $1_M1 based on the above result. Although the description here is based on an example where terminal #1 labeled 902_1 uses "frequency band $1_M1" that is estimated to have the highest reception quality, a frequency band other than the frequency band estimated to have the highest reception quality may be used.

Note that terminal #1 "sector sweep reference signal" 8211_1 includes information of the "transmission panel antenna and parameter" with high reception quality obtained by terminal #1 labeled 902_1, that is, information of "transmission panel antenna a1 (=1) and parameter b1". Terminal #1 "sector sweep reference signal" 8211_1 also includes information of the "frequency domain", for example, information of "frequency band $1_M1". This will be described later.

Likewise, terminal #2 labeled 902_2 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #2 labeled 902_2 estimates, for example, "transmission panel antenna a2 (=1) and parameter b2" as the "transmission panel antenna and parameter" with high reception quality. Terminal #2 labeled 902_2 also estimates frequency band $1_1 as the "frequency domain" with high reception quality. Terminal #2 labeled 902_2 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #2 labeled 902_2 may simultaneously obtain information of "the number of frequency divisions in which sector sweep reference signals can be transmitted when the terminals transmit the sector sweep reference signals".

Then, terminal #2 labeled 902_2, for example, transmits terminal #2 "sector sweep reference signal" 8211_2 using frequency band $1_1 based on the above result. Although the description here is based on an example where terminal #2 labeled 902_2 uses "frequency band $1_1" that is estimated to have the highest reception quality, a frequency band other than the frequency band estimated to have the highest reception quality may be used.

Note that terminal #2 "sector sweep reference signal" 8211_2 includes information of the "transmission panel antenna and parameter" with high reception quality obtained by terminal #2 labeled 902_2, that is, information of "transmission panel antenna a2 (=1) and parameter b2". Terminal #2 "sector sweep reference signal" 8211_2 also includes information of the "frequency domain", for example, information of "frequency band $1_1". This will be described later.

Terminal #3 labeled 902_3 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #3 labeled 902_3 estimates, for example, "transmission panel antenna a3 (=1) and parameter b3" as the "transmission panel antenna and parameter" with high reception quality. Terminal #3 labeled 902_3 also estimates frequency bands $1_2 and $1_3 as the "frequency domain" with high reception quality. Terminal #3 labeled 902_3 may further estimate the frequency domain with second highest reception quality, the frequency domain with third highest reception quality, and so forth.

While estimating the "transmission panel antenna and parameter" with high reception quality, terminal #3 labeled 902_3 may simultaneously obtain information of "the number of frequency divisions in which sector sweep reference signals can be transmitted when the terminals transmit the sector sweep reference signals".

Then, terminal #3 labeled 902_3, for example, transmits terminal #3 "sector sweep reference signal" 8211_3 using frequency bands $1_2 and $1_3 based on the above result. Although the description here is based on an example where terminal #3 labeled 902_3 uses "frequency bands $1_2 and $1_3" that are estimated to have the highest reception quality, a frequency band other than the frequency bands estimated to have the highest reception quality may be used.

Note that terminal #3 "sector sweep reference signal" 8211_3 includes information of the "transmission panel antenna and parameter" with high reception quality obtained by terminal #3 labeled 902_3, that is, information of "transmission panel antenna a3 (=1) and parameter b3". Terminal #3 "sector sweep reference signal" 8211_3 also includes information of the "frequency domain", for example, information of "frequency bands $1_2 and $1_3". This will be described later.

Note that terminal #i "sector sweep reference signal" 8211_*i* may be assigned to a plurality of frequency bands as illustrated in FIG. 82B. At this time, terminal #i "sector sweep reference signal" 8211_*i* may be assigned to frequency bands discretely. (As a result, terminal #i "sector sweep reference signal" 8211_*i* is assigned to one or more frequency bands.)

FIG. 83A illustrates an exemplary configuration, in time and frequency, of terminal "sector sweep reference signal" 5801_1 illustrated in FIG. 58, and the horizontal axis represents time and the vertical axis represents frequency. As illustrated in FIG. 83A, "sector sweep reference signal" 8301_1 for frequency $2_1 to "sector sweep reference signal" 8301_M2 for frequency $2_M2 are present in frequency band $2.

In FIG. 83B, the horizontal axis represents time and the vertical axis represents frequency, and exemplary specific assignment of "sector sweep reference signal" 8301_1 for frequency $2_1 to "sector sweep reference signal" 8301_M2 for frequency $2_M2 to the terminals is illustrated.

Since it is "frequency band $2_1 to frequency band $2_M2", a terminal that has received a "sector sweep reference signal (see FIGS. 74 and 75)" transmitted from transmission panel antenna 2 labeled 7601_1 by base station #1 labeled 901_1 transmits a "sector sweep reference signal" in "frequency band $2_1 to frequency band $2_M2". Thus, as illustrated in FIG. 76, terminal #4 labeled 902_4, terminal #5 labeled 902_5, and terminal #6 labeled 902_6 transmit "sector sweep reference signals" using "frequency band $2_1 to frequency band $2_M2".

Terminal #4 labeled 902_4 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #4 labeled 902_4 estimates, for example, "transmission panel antenna a4 (=2) and parameter b4" as the "transmission panel antenna and parameter" with high reception quality. Terminal #4 labeled 902_4 also estimates frequency band $2_M2 as the "frequency domain" with high reception quality. Terminal #4 labeled 902_4 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #4 labeled 902_4 may simultaneously obtain information of "the number of frequency divisions in which sector sweep reference signals can be transmitted when the terminals transmit the sector sweep reference signals".

Then, terminal #4 labeled 902_4, for example, transmits terminal #4 "sector sweep reference signal" 8311_4 using frequency band $2_M2 based on the above result. Although the description here is based on an example where terminal #4 labeled 902_4 uses "frequency band $2_M2" that is estimated to have the highest reception quality, a frequency band other than the frequency band estimated to have the highest reception quality may be used.

Note that terminal #4 "sector sweep reference signal" 8311_4 includes information of the "transmission panel antenna and parameter" with high reception quality obtained by terminal #4 labeled 902_4, that is, information of "transmission panel antenna a4 (=2) and parameter b4". Terminal #4 "sector sweep reference signal" 8311_4 also includes information of the "frequency domain", for example, information of "frequency band $2_M2". This will be described later.

Likewise, terminal #5 labeled 902_5 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #5 labeled 902_5 estimates, for example, "transmission panel antenna a5 (=2) and parameter b5" as the "transmission panel antenna and parameter" with high reception quality. Terminal #5 labeled 902_5 also estimates frequency band $2_2 as the "frequency domain" with high reception quality. Terminal #5 labeled 902_5 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #5 labeled 902_5 may simultaneously obtain information of "the number of frequency divisions in which sector sweep reference signals can be transmitted when the terminals transmit the sector sweep reference signals".

Then, terminal #5 labeled 902_5, for example, transmits terminal #5 "sector sweep reference signal" 8311_5 using frequency band $2_2 based on the above result. Although the description here is based on an example where terminal #5 labeled 902_5 uses "frequency band $2_2" that is estimated to have the highest reception quality, a frequency band other than the frequency band estimated to have the highest reception quality may be used.

Note that terminal #5 "sector sweep reference signal" 8311_5 includes information of the "transmission panel antenna and parameter" with high reception quality obtained by terminal #5 labeled 902_5, that is, information of "transmission panel antenna a5 (=2) and parameter b5". Terminal #5 "sector sweep reference signal" 8311_5 also includes information of the "frequency domain", for example, information of "frequency band $2_2". This will be described later.

Terminal #6 labeled 902_6 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #6 labeled 902_6 estimates, for example, "transmission panel antenna a6 (=2) and parameter b6" as the "transmission panel antenna and parameter" with high reception quality. Terminal #6 labeled 902_6 also estimates frequency bands $2_1 and $2_4 as the "frequency domain" with high reception quality. Terminal #6 labeled 902_6 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #6 labeled 902_6 may simultaneously obtain information of "the number of frequency divisions in which sector sweep reference signals can be transmitted when the terminals transmit the sector sweep reference signals".

Then, terminal #6 labeled 902_6, for example, transmits terminal #6 "sector sweep reference signal" 8311_6 using frequency bands $2_1 and $2_4 based on the above result. Although the description here is based on an example where terminal #6 labeled 902_6 uses "frequency bands $2_1 and $2_4" that are estimated to have the highest reception quality, a frequency band other than the frequency bands estimated to have the highest reception quality may be used.

Note that terminal #6 "sector sweep reference signal" 8311_6 includes information of the "transmission panel antenna and parameter" with high reception quality obtained by terminal #6 labeled 902_6, that is, information of "transmission panel antenna a6 (=2) and parameter b6". Terminal #6 "sector sweep reference signal" 8311_6 also includes information of the "frequency domain", for example, information of "frequency bands $2_1 and $2_4". This will be described later.

Note that terminal #1 "sector sweep reference signal" **8311_*i* may be assigned to a plurality of frequency bands as illustrated in FIG. 83B. At this time, terminal #i "sector sweep reference signal" 8311_*i* may be assigned to frequency bands discretely. (As a result, terminal #i "sector sweep reference signal" 8311_*i*** is assigned to one or more frequency bands.)

In the manner described above, a collision of the sector sweep reference signals transmitted by the respective terminals can be further reduced. This produces an effect that the base station can receive more sector sweep reference signals and can communicate with more terminals.

A description will be given of a configuration of terminal #i "sector sweep reference signal" **8211_*i* transmitted by terminal #i labeled 902_*i* described with reference to FIG. 82B and a configuration of terminal #i "sector sweep reference signal" 8311_*i* transmitted by terminal #i labeled 902_*i* described with reference to FIG. 83B. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3**.

Note that FIGS. 82B and 83B illustrate exemplary communication with the terminals using transmission panel antenna 1 labeled 7601_1 and transmission panel antenna 2 labeled 7601_2 of base station #1 labeled 901_1, but communication with the terminals may be similarly performed using another transmission panel antenna.

Terminal #i labeled **902_*i* transmits terminal #i "sector sweep reference signals" 8211_*i* and 8311_*i*. FIG. 15A illustrates an exemplary configuration of terminal #i "sector sweep reference signals" 8211_*i* and 8311_*i*. Note that the horizontal axis represents time in FIG. 15**A.

In FIG. 15A, terminal #i "sector sweep reference signal" **1401_*i* of terminal #i labeled 902_*i* corresponds terminal #i "sector sweep reference signals" 8211_*i* and 8311_*i* in FIGS. 82B and 83B. Terminal #i "sector sweep reference signals" 8211_*i* and 8311_*i* are each composed of "sector sweep reference signal 1501_1 in terminal #i transmission panel antenna 1, sector sweep reference signal 1501_2 in terminal #i transmission panel antenna 2, . . . , sector sweep reference signal 1501**_M in terminal #i transmission panel antenna M".

For example, terminal #i labeled **902_*i* with the configuration in FIG. 1A, 1B, or 1C transmits "sector sweep reference signal 1501_1 in terminal #i transmission panel antenna 1" using transmission panel antenna 1 labeled 106_1**.

That is, terminal #i labeled **902_*i* with the configuration in FIG. 1A, 1B, or 1C transmits "sector sweep reference signal 1501_*k* in terminal #i transmission panel antenna k" using transmission panel antenna k labeled 106_*k***. Note that k is an integer from 1 to M (both inclusive).

Note that the number of transmission panel antennas included in terminal #i labeled **902_*i* is M in FIG. 15**A, but the number of transmission panel antennas is not limited to this and may be N, where N is an integer equal to or greater than 1.

FIG. 15B illustrates an exemplary configuration of "sector sweep reference signal **1501_*xi* in terminal #i transmission panel antenna xi" in FIG. 15A. Note that the horizontal axis represents time in FIG. 15**.

As illustrated in FIG. 15B, "sector sweep reference signal **1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4** according to fourth parameter in transmission panel antenna xi".

For example, terminal #i labeled **902_*i* with the configuration in FIG. 1A, 1B, or 1C includes the configuration in FIG. 3 as transmission panel antenna xi labeled 106_*xi***.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1 (t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1 (t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1 (t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1 (t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)× w1(xi, j). Then, terminal #i labeled 902_*i* transmits tx1refj (t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)× w2(xi, j). Then, terminal #i labeled 902_*i* transmits tx2refj (t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)× w3(xi, j). Then, terminal #i labeled 902_*i* transmits tx3refj (t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)× w4(xi, j). Then, terminal #i labeled 902_*i* transmits tx4refj (t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 82B, 83B, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled **902_*i*. Accordingly, base station #1 labeled 901_1 can transmit a modulation signal to terminal #1 labeled 902_*i* based on the "information of the "transmission panel antenna and parameter" of base station #1 labeled 901_1 with high reception quality", and terminal #i labeled 902_*i*** can receive the modulation signal with high reception quality.

In a case where a plurality of terminals transmit the sector sweep reference signals as in FIGS. 82B and 83B, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 82B, 83B, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

Identification number (ID) of the transmission panel antenna, which corresponds to xi here, for example; and Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled **902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1** can perform appropriate control. This produces an effect of enhancing data reception quality.

Further, as illustrated in FIGS. 82B, 83B, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

"Information on the frequency band and/or frequency $X_i" that has been used for transmission by terminal #i labeled **902_*i* or that terminal #i labeled 902_*i* desires base station #1 labeled 901_1** to use.

Transmission of the "information on the frequency band and/or frequency $X_i" by terminal #i labeled **902_*i* allows base station #1 labeled 901_1 to recognize the "information on the frequency band and/or frequency $X_i"; accordingly, terminal #i labeled 902_*i* and base station #1 labeled 901_1** can perform appropriate control. This produces an effect of enhancing data reception quality.

FIG. 84A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 84A. In this example, there are frequency band $1, frequency band $2, . . . , frequency band $M for feedback signal 1002 as illustrated in FIG. 84A.

Thus, feedback signal 1002 includes feedback signal 8401_1 in transmission panel antenna 1 for frequency $1, feedback signal 8401_2 in transmission panel antenna 2 for frequency $2, . . . , feedback signal 8401_M in transmission panel antenna M for frequency $M.

One feature is that "feedback signals are transmitted from transmission panel antenna i in frequency band $i in FIG. 84A".

FIG. 84B illustrates an exemplary configuration of "feedback signal 8401_X in transmission panel antenna X for frequency $X" in FIG. 84A. Note that the vertical axis represents frequency and the horizontal axis represents time in FIG. 64B.

Frequency band $X_1, frequency band $X_2, . . . , frequency band $X_M (X) are included in frequency $X where "feedback signal 8401_X in transmission panel antenna X for frequency $X" is present. Note that M (X) is an integer equal to or greater than 1 or an integer equal to or greater than 2.

Feedback signal **8402_*i*** in transmission panel antenna X for frequency $X_i is present in frequency band $X_i. Note that i is an integer from 1 to M (X) (both inclusive).

Note that, for feedback signal **8402_*i* in transmission panel antenna X for frequency $X_i, a signal is transmitted from transmission panel antenna X labeled 106_X of base station #1 labeled 901_1 with the configuration in FIG. 1A, 1B, or 1**C.

FIG. 84C illustrates exemplary specific feedback signal assignment for feedback signal 1002 illustrated in FIGS. 84A and 84B. Note that FIG. 84C illustrates exemplary feedback signal assignment for feedback signal **8411_*i*** in transmission panel antenna 1 for frequency $1_i.

As in FIG. 82B, for example, terminal #1 labeled 902_1 transmits terminal #1 "sector sweep reference signal" 8211_1, terminal #2 labeled 902_2 transmits terminal #2 "sector sweep reference signal" 8211_2, and terminal #3 labeled 902_3 transmits terminal #3 "sector sweep reference signal" 8211_3.

Terminal #1 "sector sweep reference signal" 8211_1 includes information indicating that "frequency band $1_M1 has high reception quality". Thus, base station #1 labeled 901_1 transmits terminal #1-addressed feedback signal 8411_1 from transmission panel antenna 1 using frequency band $1_M1 as in FIG. 84C.

Terminal #2 "sector sweep reference signal" 8211_2 includes information indicating that "frequency band $1_1 has high reception quality". Thus, base station #1 labeled 901_1 transmits terminal #2-addressed feedback signal 8411_2 from transmission panel antenna 1 using frequency band $1_1 as in FIG. 84C.

Terminal #3 "sector sweep reference signal" 8211_3 includes information indicating that "frequency band $1_2 and frequency band $1_3 have high reception quality". Thus, base station #1 labeled 901_1 transmits terminal #3-addressed feedback signal 8411_3 from transmission panel antenna 1 using frequency bands $1_2 and $1_3 as in FIG. 84C.

FIG. 84D illustrates exemplary specific feedback signal assignment for feedback signal 1002 illustrated in FIGS. 84A and 84B. Note that FIG. 84D illustrates exemplary feedback signal assignment for feedback signal **8421_*i*** in transmission panel antenna 2 for frequency $2_i.

As in FIG. 83B, for example, terminal #4 labeled 902_4 transmits terminal #4 "sector sweep reference signal"

8311_4, terminal #5 labeled 902_5 transmits terminal #5 "sector sweep reference signal" 8311_5, and terminal #6 labeled 902_6 transmits terminal #6 "sector sweep reference signal" 8311_6.

Terminal #4 "sector sweep reference signal" 8311_4 includes information indicating that "frequency band $2_M2 has high reception quality". Thus, base station #1 labeled 901_1 transmits terminal #4-addressed feedback signal 8421_4 from transmission panel antenna 2 using frequency band $2_M2 as in FIG. 84D.

Terminal #5 "sector sweep reference signal" 8311_5 includes information indicating that "frequency band $2_2 has high reception quality". Thus, base station #1 labeled 901_1 transmits terminal #5-addressed feedback signal 8421_5 from transmission panel antenna 2 using frequency band $2_2 as in FIG. 84D.

Terminal #6 "sector sweep reference signal" 8311_6 includes information indicating that "frequency band $2_1 and frequency band $2_4 have high reception quality". Thus, base station #1 labeled 901_1 transmits terminal #6-addressed feedback signal 8421_6 from transmission panel antenna 2 using frequency bands $2_1 and $2_4 as in FIG. 84D.

Note that terminal-addressed feedback signals may be assigned to frequency band $3 to frequency band $M in the same manner as the above.

In this manner, obtaining terminal #i-addressed feedback signal 8411_*i*, 8421_*i*, or the like allows terminal #i labeled 902_*i* to know that communication with base station #1 labeled 901_1 is available and to know the frequency band to be used.

Note that FIGS. 84C and 84D are merely examples. In a case where there is no terminal #1-addressed feedback signal 8411_1 as feedback signal 1002, for example, terminal #1 labeled 902_1 recognizes that the communication with base station #1 labeled 901_1 has not been established.

At this time, terminal #i-addressed feedback signals 8411_*i* and 8421_*i*, etc. include, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed feedback signals 8411_*i* and 8421_*i*, etc.

FIG. 85A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 85A. In this example, there are frequency band $1, frequency band $2, . . . , frequency band $M for data-symbol-included frame 1003 as illustrated in FIG. 85A.

Thus, data-symbol-included frame 1003 includes modulation signal (slot) 8501_1 in transmission panel antenna 1 for frequency $1, modulation signal (slot) 8501_2 in transmission panel antenna 2 for frequency $2, . . . , modulation signal (slot) 8501_M1 in transmission panel antenna M for frequency $M.

One feature is that "modulation signals (slots) are transmitted from transmission panel antenna i in frequency band $i in FIG. 85A".

FIG. 85B illustrates an exemplary configuration of "modulation signal (slot) 8501_X in transmission panel antenna X for frequency $X" in FIG. 85A. Note that the vertical axis represents frequency and the horizontal axis represents time in FIG. 85B.

Frequency band $X_1, frequency band $X_2, . . . , frequency band $X_M (X) are included in frequency $X where "modulation signal (slot) 8501_X in transmission panel antenna X for frequency $X" is present. Note that M (X) is an integer equal to or greater than 1 or an integer equal to or greater than 2.

Modulation signal (slot) 8502_*i* in transmission panel antenna X for frequency $X_i is present in frequency band $X_i. Note that i is an integer from 1 to M (X) (both inclusive).

Note that, for modulation signal (slot) 8502_*i* in transmission panel antenna X for frequency $X_i, a signal is transmitted from transmission panel antenna X labeled 106_X of base station #1 labeled 901_1 with the configuration in FIG. 1A, 1B, or 1C.

FIG. 85C illustrates exemplary specific modulation signal (slot) assignment for data-symbol-included frame 1003 illustrated in FIGS. 85A and 85B. Note that FIG. 85C illustrates exemplary modulation signal (slot) assignment for modulation signal (slot) 8511_*i* in transmission panel antenna 1 for frequency $1_i.

As in FIG. 82B, for example, terminal #1 labeled 902_1 transmits terminal #1 "sector sweep reference signal" 8211_1, terminal #2 labeled 902_2 transmits terminal #2 "sector sweep reference signal" 8211_2, and terminal #3 labeled 902_3 transmits terminal #3 "sector sweep reference signal" 8211_3.

Terminal #1 "sector sweep reference signal" 8211_1 includes information indicating that "frequency band $1_M1 has high reception quality". Thus, base station #1 labeled 901_1 transmits terminal #1-addressed modulation signal (slot) 8511_1 from transmission panel antenna 1 using frequency band $1_M1 as in FIG. 85C.

Terminal #2 "sector sweep reference signal" 8211_2 includes information indicating that "frequency band $1_1 has high reception quality". Thus, base station #1 labeled 901_1 transmits terminal #2-addressed modulation signal (slot) 8511_2 from transmission panel antenna 1 using frequency band $1_1 as in FIG. 85C.

Terminal #3 "sector sweep reference signal" 8211_3 includes information indicating that "frequency band $1_2 and frequency band $ i_3 have high reception quality". Thus, base station #1 labeled 901_1 transmits terminal #3-addressed modulation signal (slot) 8511_3 from transmission panel antenna 1 using frequency bands $1_2 and $1_3 as in FIG. 85C.

FIG. 85D illustrates exemplary specific modulation signal (slot) assignment for data-symbol-included frame 1003 illustrated in FIGS. 85A and 85B. Note that FIG. 85D illustrates exemplary modulation signal (slot) assignment for modulation signal (slot) 8521_*i* in transmission panel antenna 2 for frequency $2_i.

As in FIG. 83B, for example, terminal #4 labeled 902_4 transmits terminal #4 "sector sweep reference signal" 8311_4, terminal #5 labeled 902_5 transmits terminal #5 "sector sweep reference signal" 8311_5, and terminal #6 labeled 902_6 transmits terminal #6 "sector sweep reference signal" 8311_6.

Terminal #4 "sector sweep reference signal" 8311_4 includes information indicating that "frequency band $2_M2 has high reception quality". Thus, base station #1 labeled 901_1 transmits terminal #4-addressed modulation signal (slot) 8521_4 from transmission panel antenna 2 using frequency band $2_M2 as in FIG. 85D.

Terminal #5 "sector sweep reference signal" 8311_5 includes information indicating that "frequency band $2_2 has high reception quality". Thus, base station #1 labeled 901_1 transmits terminal #5-addressed modulation signal (slot) 8521_5 from transmission panel antenna 2 using frequency band $2_2 as in FIG. 85D.

Terminal #6 "sector sweep reference signal" 8311_6 includes information indicating that "frequency band $2_1 and frequency band $2_4 have high reception quality". Thus, base station #1 labeled 901_1 transmits terminal #6-addressed modulation signal (slot) 8521_6 from transmission panel antenna 2 using frequency bands $2_1 and $2_4 as in FIG. 85D.

Note that terminal-addressed modulation signals (slots) may be assigned to frequency band $3 to frequency band $M in the same manner as the above.

At this time, terminal #i-addressed modulation signals (slots) 8511_*i* and 8521_*i*, etc. include, for example, data symbols (data and/or information) addressed to terminal #i labeled 902_*i*.

In this manner, obtaining terminal #i-addressed modulation signal (slot) 8511_*i*, 8521_*i*, or the like allows terminal #i labeled 902_*i* to know that communication with base station #1 labeled 901_1 is available and to know the frequency band to be used.

Note that FIGS. 85C and 85D are merely examples. In a case where there is no terminal #1-addressed modulation signal (slot) 8511_1 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed modulation signals (slots) 8511_*i* and 8521_*i*, etc.

Note that, in FIGS. 84C and 84D, base station #1 labeled 901_1 may estimate the "frequency (band)" and the "transmission panel antenna and parameter" of terminal #i labeled 902_1 with high reception quality in receiving "terminal #i "sector sweep reference signals" 8301_*i* and 8311_*i*, etc. transmitted by terminal #i labeled 902_*i*", and the estimated information may be included in terminal #i-addressed feedback signals 8411_*i* and 8421_*i*, etc.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signals (slots) 8511_*i* and 8521_*i* in FIGS. 85C and 85D, etc. may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 76. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 58, 82B, 83B, 15A, 15B, etc., and the description thereof will be thus omitted.

Base station #1 labeled 901_1 transmits feedback signal 1802_1. Note that this has already been described with reference to FIGS. 84A, 84B, 84C, and 84D, and the description thereof will be thus omitted.

After that, base station #1 labeled 901_1 transmits "data-symbol-included frame 1803_1". Note that this has already been described with reference to FIGS. 85A, 85B, 85C, and 85D, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 86A, 86B, 86C, 86D, 86E, and 86F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 85A, 85B, 85C, and 85D.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 86A, 86B, 86C, 86D, 86E, and 86F.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 85A, 85B, 85C, and 85D.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIGS. 86A, 86B, 86C, 86D, 86E, and 86F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 58, 82B, 83B, 15A, 15B, etc., and the description thereof will be thus omitted.

Base station #1 labeled 901_1 transmits feedback signal 1802_2. Note that this has already been described with reference to FIGS. 84A, 84B, 84C, and 84D, and the description thereof will be thus omitted.

After that, base station #1 labeled 901_1 transmits "data-symbol-included frame 1803_4". Note that this has already been described with reference to FIGS. 85A, 85B, 85C, and 85D, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 86A, 86B, 86C, 86D, 86E, and 86F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 86A, 86B, 86C, 86D, 86E, and 86F. Note that i is an integer equal to or greater than 1, for example, and the horizontal axis represents time and the vertical axis represents frequency in FIGS. 86A, 86B, 86C, 86D, 86E, and 86F.

FIGS. 86A, 86B, and 86C illustrate an example in frequency band $1, and FIGS. 86D, 86E, and 86F illustrate an example in frequency band $2. Note that frequency band $1 and frequency band $2 will be described here. Although not described here for simplicity, the terminals may transmit transmission frames in frequency band $3 to frequency band $M in the same manner.

There are frequency band $1_1, frequency band $1_2, . . . , frequency band $1_M1 in FIGS. 86A, 86B, and 86C, and there are frequency band $2_1, frequency band $2_2, . . . , frequency band $2_M2 in FIGS. 86D, 86E, and 86F.

As illustrated in FIG. 86A, terminal #1 labeled 902_1 transmits terminal #1 transmission frame (including a data symbol) 8601_1 using frequency band $1_M1, for example.

"Terminal #1 labeled 902_1 transmits terminal #1 transmission frame (including a data symbol) 8601_1 using frequency band $1_M1" because "base station #1 labeled 901_1 transmits a modulation signal (slot) addressed to terminal #1 labeled 902_1 using frequency band $1_M1" as illustrated in FIG. 85C.

As illustrated in FIG. 86B, terminal #2 labeled 902_2 transmits terminal #2 transmission frame (including a data symbol) 8601_2 using frequency band $1_1, for example.

"Terminal #2 labeled 902_2 transmits terminal #2 transmission frame (including a data symbol) 8601_2 using frequency band $1_1" because "base station #1 labeled 901_1 transmits a modulation signal (slot) addressed to terminal #2 labeled 902_2 using frequency band $1_1" as illustrated in FIG. 85C.

As illustrated in FIG. 86C, terminal #3 labeled 902_3 transmits terminal #3 transmission frame (including a data symbol) 8601_3 using frequency bands $1_2 and $1_3, for example.

"Terminal #3 labeled 902_3 transmits terminal #3 transmission frame (including a data symbol) 8601_3 using frequency bands $1_2 and $1_3" because "base station #1 labeled 901_1 transmits a modulation signal (slot) addressed to terminal #3 labeled 902_3 using frequency bands $1_2 and $1_3" as illustrated in FIG. 85C.

As illustrated in FIG. 86D, terminal #4 labeled 902_4 transmits terminal #4 transmission frame (including a data symbol) 8601_4 using frequency band $2_M2, for example.

"Terminal #4 labeled 902_4 transmits terminal #4 transmission frame (including a data symbol) 8601_4 using frequency band $2_M2" because "base station #1 labeled 901_1 transmits a modulation signal (slot) addressed to terminal #4 labeled 902_4 using frequency band $2_M2" as illustrated in FIG. 85D.

As illustrated in FIG. 86E, terminal #5 labeled 902_5 transmits terminal #5 transmission frame (including a data symbol) 8601_5 using frequency band $2_2, for example.

"Terminal #5 labeled 902_5 transmits terminal #5 transmission frame (including a data symbol) 8601_5 using frequency band $2_2" because "base station #1 labeled 901_1 transmits a modulation signal (slot) addressed to terminal #5 labeled 902_5 using frequency band $2_2" as illustrated in FIG. 85D.

As illustrated in FIG. 86F, terminal #6 labeled 902_6 transmits terminal #6 transmission frame (including a data symbol) 8601_6 using frequency bands $2_1 and $2_4, for example.

"Terminal #6 labeled 902_6 transmits terminal #6 transmission frame (including a data symbol) 8601_6 using frequency bands $2_1 and $2_4" because "base station #1 labeled 901_1 transmits a modulation signal (slot) addressed to terminal #6 labeled 902_6 using frequency bands $2_1 and $2_4" as illustrated in FIG. 85D.

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, OFDMA and transmitted by each terminal, and base station #1 labeled 901_1 receives the frame transmitted by the terminal, thereby preventing interference and achieving high data reception quality.

Note that terminal #1 transmission frame 8601_1, terminal #2 transmission frame 8601_2, terminal #3 transmission frame 8601_3, terminal #4 transmission frame 8601_4, terminal #5 transmission frame 8601_5, and terminal #6 transmission frame 8601_6 in FIGS. 86A, 86B, 86C, 86D, 86E, and 86F may include, in addition to the data symbol, a "reference signal such as DMRS, PTRS, or SRS", a pilot symbol, a pilot signal, a preamble, and a symbol including control information, for example.

In FIGS. 86A, 86B, 86C, 86D, 86E, and 86F, a description has been given of a case where the terminals perform OFDMA on the frames to be transmitted, but the terminals may perform spatial division on the frames to be transmitted using multi user-multiple-input multiple-output (MU-MIMO).

FIGS. 82B and 83B illustrate exemplary occupation by the terminals in the "terminal "sector sweep reference signal"" illustrated in FIG. 58.

FIGS. 87A and 87B illustrate exemplary occupation by the terminals different from that in FIG. 82B in the "terminal "sector sweep reference signal"" illustrated in FIG. 58.

In FIGS. 87A and 87B, the components that operate in the same manner as in FIGS. 58 and 82B are denoted by the same reference signs, and the descriptions thereof will be omitted since they have already been described. In the following, the difference from the description in FIG. 82B will be described.

Terminal #2 labeled 902_2 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band $1_1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of frequency divisions in which sector sweep reference signals can be transmitted when the terminals transmit the sector sweep reference signals".

Terminal #2 labeled 902_2 transmits terminal #2 "sector sweep reference signal" 8211_2 using frequency band $1_1 as in FIG. 87A.

Note that terminal #2 "sector sweep reference signal" 8211_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #3 labeled 902_3, for example, estimates frequency band $1_1 as the "frequency (band)" with high reception quality and estimates "transmission panel antenna a3 and parameter b3" as the "transmission panel antenna and parameter".

In addition, while estimating the "transmission panel antenna and parameter" with high reception quality, terminal #3 labeled 902_3 simultaneously obtains information of the "the number of frequency divisions in which sector sweep reference signals can be transmitted when the terminals transmit the sector sweep reference signals".

Terminal #3 labeled 902_3 transmits terminal #3 "sector sweep reference signal" 8211_3 using frequency band $1_1 as in FIG. 87B.

Note that terminal #3 "sector sweep reference signal" 8211_3 includes information of the "transmission panel antenna and parameter" with high reception quality obtained by terminal #3 labeled 902_3, that is, information of "transmission panel antenna a3 and parameter b3".

At this time, as illustrated in FIGS. 87A and 87B, the time period for "terminal #2 "sector sweep reference signal" 8211_2 transmitted by terminal #2 labeled 902_2" and the time period for "terminal #3 "sector sweep reference signal" 8211_3 transmitted by terminal #3 labeled 902_3" overlap each other.

Thus, base station #1 labeled 901_1 possibly simultaneously receives terminal #2 "sector sweep reference signal" 8211_2 and terminal #3 "sector sweep reference signal" 8211_3.

In this case, the following is two possible cases.

<Case 1>

Both "terminal #2 "sector sweep reference signal" 8211_2 transmitted by terminal #2 labeled 902_2" and "terminal #3 "sector sweep reference signal" 8211_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 8211_2 transmitted by terminal #2 labeled 902_2" by base station #1 labeled 901_1 are different from the ""transmission panel antenna and parameter for beamforming of terminal #3 labeled 902_3" with high reception quality in receiving terminal #3 "sector sweep reference signal" 8211_3 transmitted by terminal #3 labeled 902_3" by base station #1 labeled 901_1. Accordingly, base station #1 labeled 901_1 obtains information included in "terminal #2 "sector sweep reference signal" 8211_2 transmitted by terminal #2 labeled 902_2" and information included in "terminal #3 "sector sweep reference signal" 8211_3 transmitted by terminal #3 labeled 902_3".

In this case, in FIG. 84C for example, a terminal #2-addressed feedback signal is assigned to frequency $1_1 and a terminal #3-addressed feedback signal is assigned to frequency $1_2.

In addition, in FIG. 85C for example, a terminal #2-addressed modulation signal (slot) is assigned to frequency $1_1 and a terminal #3-addressed modulation signal (slot) is assigned to frequency $1_2.

In this manner, base station #1 labeled 901_1 can communicate with terminal #2 labeled 902_2 and terminal #3 labeled 902_3.

<Case 2>

Both "terminal #2 "sector sweep reference signal" 8211_2 transmitted by terminal #2 labeled 902_2" and "terminal #3 "sector sweep reference signal" 8211_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 8211_2 transmitted by terminal #2 labeled 902_2" by base station #1 labeled 901_1 interfere with the ""transmission panel antenna and parameter for beamforming of terminal #3 labeled 902_3" with high reception quality in receiving terminal #3 "sector sweep reference signal" 8211_3 transmitted by terminal #3 labeled 902_3" by base station #1 labeled 901_1.

<Case 2-1

In some cases, base station #1 labeled 901_1 obtains either information included in "terminal #2 "sector sweep reference signal" 8211_2 transmitted by terminal #2 labeled 902_2" or information included in "terminal #3 "sector sweep reference signal" 8211_3 transmitted by terminal #3 labeled 902_3".

For example, base station #1 labeled 901_1 obtains the information included in "terminal #2 "sector sweep reference signal" 8211_2 transmitted by terminal #2 labeled 902_2".

In this case, in FIG. 84C for example, a terminal #2-addressed feedback signal is assigned to frequency $1_1.

In addition, in FIG. 85C for example, a terminal #2-addressed modulation signal (slot) is assigned to frequency $1_1.

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIGS. 87A and 87B. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed again as in the cases described above, and terminal #3 labeled 902_3 communicate with base station #1 labeled 901_1. Note that the specific examples have been described in other embodiments.

<Case 2-2>

In some cases, base station #1 labeled 901_1 obtains neither information included in "terminal #2 "sector sweep reference signal" 8211_2 transmitted by terminal #2 labeled 902_2" nor information included in "terminal #3 "sector sweep reference signal" 8211_3 transmitted by terminal #3 labeled 902_3".

It is assumed that sector sweep reference signal 1851_1 in FIG. 18 has the states in FIGS. 87A and 87B, and base station #1 labeled 901_1 obtains neither information included in "terminal #2 "sector sweep reference signal" 8211_2 transmitted by terminal #2 labeled 902_2" nor information included in "terminal #3 "sector sweep reference signal" 8211_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #2 labeled 902_2, for example, estimates frequency band $1_1 as the "frequency (band)" with high reception quality and estimates "transmission panel antenna a2 and parameter b2" as the "transmission panel antenna and parameter".

In other cases, terminal #2 labeled 902_2, for example, estimates a frequency in frequency band $1_i, where i is not 1, as the "frequency (band)" with high reception quality and estimates "transmission panel antenna a2 and parameter b2" as the "transmission panel antenna and parameter".

In still other cases, terminal #2 labeled 902_2, for example, estimates a frequency in frequency band $X_i, where X is not 1, as the "frequency (band)" with high reception quality and estimates "transmission panel antenna a2 and parameter b2" as the "transmission panel antenna and parameter".

In any of the cases, the predetermined procedure is performed again as in the cases described above, and terminal #2 labeled 902_2 communicate with base station #1 labeled 901_1. Note that the specific examples have been described in other embodiments.

Likewise, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed as in the cases described above, and terminal #3 labeled 902_3 communicate with base station #1 labeled 901_1. Note that the specific examples have been described in other embodiments.

In the manner described above, a collision of the sector sweep reference signals transmitted by the respective terminals can be further reduced. This produces an effect that the base station can receive more sector sweep reference signals and can communicate with more terminals.

Note that transmission panel antenna 1 of base station #1 labeled 901_1, that is, frequency band $1_i has been described in <Case 1> and <Case 2> described above, but it is merely an example. The same can be implemented with another transmission panel antenna, that is, frequency band $X_i, where X is from 2 to M (both inclusive).

As described above in Embodiment 12, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 58, 73, 74, 75, 76, 82A, 82B, 83A, 83B, 15A, 15B, 84A, 84B, 84C, 84D, 85A, 85B, 85C, 85D, 18, 86A, 86B, 86C, 86D, 86E, 86F, 87A, and 87B, but the names thereof are not limited to those in the drawings and the important part is the functions of the signals to be transmitted.

Embodiment 13

In Embodiment 13, a variation of Embodiment 11 will be descried. Note that the drawings used in Embodiments 11 and 12 are sometimes used in the following description of Embodiment 13.

FIGS. 1A, 1B, and 1C illustrate exemplary configurations of, for example, a base station, an access point, a terminal, and a repeater according to Embodiment 13, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 13. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a single-carrier scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t 1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

FIG. 73 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 73. In the example of FIG. 73, the frequency is divided into frequency band $1, frequency band $2, . . . , frequency band $M as illustrated in FIG. 73 for base station #1 labeled 901_1 to transmit modulation signals based on OFDMA. Note that M is an integer equal to or greater than 1 or an integer equal to or greater than 2. In the following description, M is the number of transmission panel antennas included in base station #1 labeled 901_1 in FIG. 9 with the configuration in FIG. 1A, 1B, or 1C, but the present disclosure is not limited to this.

For example, sector sweep reference signal 7301_1 in transmission panel antenna 1 for frequency $1 is present in frequency band $1.

Thus, sector sweep reference signal 7301_X in transmission panel antenna X for frequency $X is present in frequency band $X. Note that X is an integer from 1 to M (both inclusive).

Note that sector sweep reference signal 7301_X in transmission panel antenna X for frequency $X is transmitted from transmission panel antenna X labeled 106_X of base station #1 labeled 901_1 with the configuration in FIG. 1A, 1B, or 1C.

FIG. 74 illustrates an exemplary configuration of "sector sweep reference signal 7301_X in transmission panel antenna X for frequency $X" in FIG. 73. Note that the vertical axis represents frequency and the horizontal axis represents time in FIG. 74.

Frequency band $X_1, frequency band $X_2, . . . , frequency band $X_M (X) are included in frequency $X where "sector sweep reference signal 7301_X in transmission panel antenna X for frequency $X" is present. Note that M (X) is an integer equal to or greater than 1 or an integer equal to or greater than 2.

Sector sweep reference signal 7401_X_i in transmission panel antenna X for frequency $X_i is present in frequency band $X_i. Note that i is an integer from 1 to M (X) (both inclusive).

Note that sector sweep reference signal 7401_X_i in transmission panel antenna X for frequency $X_i is transmitted from transmission panel antenna X labeled 106_X of base station #1 labeled 901_1 with the configuration in FIG. 1A, 1B, or 1C.

FIG. 75 illustrates an exemplary configuration of "sector sweep reference signal 7401_X_i in transmission panel antenna X for frequency $X_i" in FIG. 74. Note that the horizontal axis represents time in FIG. 75.

"Sector sweep reference signal 7401_X_i in transmission panel antenna X for frequency $X_i" in FIG. 74 is composed of reference signal 7501_1 according to first parameter in transmission panel antenna X for frequency $X_i, reference signal 7501_2 according to second parameter in transmission panel antenna X for frequency $X_i, reference signal 7501_3 according to second parameter in transmission panel antenna X for frequency $X_i, and reference signal 7501_4 according to second parameter in transmission panel antenna X for frequency $X_i.

Next, a description will be given of a method of transmitting "sector sweep reference signal 7401_X_i in transmission panel antenna X for frequency $X_i" that is configured as in FIGS. 74 and 75 and transmitted by base station #1 labeled 901_1 with the configuration in FIG. 1A, 1B, or 1C.

For example, base station #1 labeled 901_1 with the configuration in FIG. 1A, 1B, or 1C includes the configuration in FIG. 3 as transmission panel antenna i labeled 106_*i*.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, 1). When first transmission signal 303_1 of "reference signal 7501_1 according to first parameter in transmission panel antenna X for frequency $X_i" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, 1). When second transmission signal 303_2 of "reference signal 7501_1 according to first parameter in transmission panel antenna X for frequency $X_i" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, 1). When third transmission signal 303_3 of "reference signal 7501_1 according to first parameter in transmission panel antenna X for frequency $X_i" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 7501_1 according to first parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, 1). When fourth transmission signal 303_4 of "reference signal 7501_1 according to first parameter in transmission panel antenna X for frequency $X_i" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 7501_*j* according to j-th parameter in transmission panel antenna X for frequency $X_i".

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_1 in transmission panel antenna i labeled 106_*i* as w1(i, j). When first transmission signal 303_1 of "reference signal 7501_*j* according to j-th parameter in transmission panel antenna X for frequency $X_i" is tx1refj(t), multiplier 304_1 obtains tx1refj(t)×w1(i, j). Then, base station #1 labeled 901_1 transmits tx1refj(t)×w1(i, j) from antenna 306_1 in FIG. 3. Note that t represents time.

When base station #1 labeled 901_1 transmits "reference signal 7501_*j* according to j-th parameter in transmission panel antenna X for frequency $X_i" illustrated in FIG. 75, base station #1 labeled 901_1 sets the multiplication coefficient in multiplier 304_2 in transmission panel antenna i labeled 106_*i* as w2(i, j). When second transmission signal 303_2 of "reference signal 7501_*j* according to j-th parameter in transmission panel antenna X for frequency $X_i" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal **7501_*j* according to j-th parameter in transmission panel antenna X for frequency $X_i" illustrated in FIG. 75, base station #1 labeled 901_1 sets the multiplication coefficient in multiplier 304_3 in transmission panel antenna i labeled 106_*i* as w3(i, j). When third transmission signal 303_3 of "reference signal 7501_*j* according to j-th parameter in transmission panel antenna X for frequency $X_i" is tx3refj(t), multiplier 304_3 obtains tx3refj(t)×w3(i, j). Then, base station #1 labeled 901_1 transmits tx3refj(t)×w3(i, j) from antenna 306_3 in FIG. 3**.

When base station #1 labeled 901_1 transmits "reference signal **7501_*j* according to j-th parameter in transmission panel antenna X for frequency $X_i" illustrated in FIG. 75, base station #1 labeled 901_1 sets the multiplication coefficient in multiplier 304_4 in transmission panel antenna i labeled 106_*i* as w4(i, j). When fourth transmission signal 303_4 of "reference signal 7501_*j* according to j-th parameter in transmission panel antenna X for frequency $X_i" is tx4refj(t), multiplier 304_4 obtains tx4refj(t)×w4(i, j). Then, base station #1 labeled 901_1 transmits tx4refj(t)×w4(i, j) from antenna 306_4 in FIG. 3**.

Note that j is an integer from 1 to 4 (both inclusive) in the case of FIG. 75. The number Z of parameter changes is four in FIG. 75, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 73, 74, and 75, when base station #1 labeled 901_1 transmits "sector sweep reference signal 7401_X_i in transmission panel antenna X for frequency $X_i", "reference signal **7501_*j*** according to j-th parameter in transmission panel antenna X for frequency $X_i" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

The following information may also be included in "reference signal **7501_*j*** according to j-th parameter in transmission panel antenna X for frequency $X_i";

- Information on the frequency band and/or frequency $X_i (information of the number of frequency divisions may also be included), which will be described later.

Transmission of the "identification number (ID) of the transmission panel antenna" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces an effect of enhancing data reception quality.

Note that "the number of frequency divisions in which sector sweep reference signals can be transmitted when the terminals transmit the sector sweep reference signals" may be changeable according to the frame and/or time, for example. This produces an effect of enhancing data transmission efficiency of a communication system.

Further, transmission of the "information on the frequency band and/or frequency $X_i" by base station #1 labeled 901_1 allows the terminals to obtain the information and transmit "information relative to a frequency that the terminals desire the base station to use for transmission". This allows the base station to perform appropriate control and produces an effect of enhancing data reception quality.

Next, a description will be given of an operation in the time period from time t1 to t2 in FIG. 10, which is the terminal response period. Note that, in Embodiment 13, the description is based on a case where the terminals transmit signals using a single-carrier scheme and frequency (bands) used by the base station and frequency (bands) used by the terminals partially overlap each other, by way of example.

FIG. 23 illustrates an exemplary operation in the time period from time t1 to t2, which is the terminal response period. The horizontal axis represents time in FIG. 23. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 23, the components that operate in the same manner as in FIGS. 10 and 13 are denoted by the same reference signs.

As illustrated in FIGS. 10 and 23, for example, base station #1 labeled 901_1 transmits sector sweep reference signals in the time period from time t0 to t1. After that, the terminal response period, which is the time period from time t1 to t2, includes terminal "sector sweep reference signal" first transmission period 1301_1, terminal "sector sweep reference signal" second transmission period 1301_2, terminal "sector sweep reference signal" third transmission period 1301_3, terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8, as illustrated in FIG. 13.

Thus, in the case of FIG. 23, "the number of time divisions in which sector sweep reference signals can be transmitted when the terminals transmit the sector sweep reference signals" is set to eight by base station #1 labeled 901_1.

FIG. 76 illustrates an exemplary relationship between base station #1 labeled 901_1 and terminal #i labeled **902_*i* in Embodiment 13, and the components that operate in the same manner as in FIG. 9 are denoted by the same reference signs. As illustrated in FIGS. 1A, 1B, and 1C, base station #1 labeled 901_1 includes transmission panel antenna 1 labeled 7601_1, transmission panel antenna 2 labeled 7601_2, . . . , transmission panel antenna M labeled 7601**_M.

Base station #1 labeled 901_1 communicates with terminal #1 labeled 902_1, terminal #2 labeled 902_2, and terminal #3 labeled 902_3 using transmission panel antenna 1 labeled 7601_1.

In addition, base station #1 labeled 901_1 communicates with terminal #4 labeled 902_4, terminal #5 labeled 902_5, and terminal #6 labeled 902_6 using transmission panel antenna 2 labeled 7601_2.

Note that base station #1 labeled 901 may communicate with other terminals using transmission panel antenna 3 labeled 7601_3 to transmission panel antenna M labeled 7601_M, but a description on this point will be omitted for simplicity.

FIG. 24 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8 illustrated in FIG. 23. Note that the horizontal axis represents time in FIG. 24.

Terminal #1 labeled 902_1 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #1 labeled 902_1 estimates, for example, "transmission panel antenna a1 (=1) and parameter b1" as the "transmission panel antenna and parameter" with high reception quality. Terminal #1 labeled 902_1 also estimates frequency band $1_M1 as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 24, terminal #1 labeled 902_1 obtains information indicating that "the number of time divisions in which sector sweep reference signals can be transmitted when the terminals transmit the sector sweep reference signals" is eight.

In this case, terminal #1 labeled 902_1 obtains, for example, any one of the values "0", "1", "2", "3", "4", "5", "6", and "7" using a random number. For example, terminal #1 labeled 902_1 obtains "0" using a random number. In this case, since "0"+1=1, terminal #1 labeled 902_1 transmits terminal #1 "sector sweep reference signal" 2401_1 using "terminal "sector sweep reference signal" first (="0"+1) transmission period 1301_1" in FIG. 24. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 2401_1 includes information of the "transmission panel antenna and parameter" with high reception quality obtained by terminal #1 labeled 902_1, that is, information of "transmission panel antenna a1 (=1) and parameter b1". Terminal #1 "sector sweep reference signal" 2401_1 also includes information of the "frequency domain", for example, information of "frequency band $1_M1". This will be described later.

Likewise, terminal #2 labeled 902_2 in FIG. 76 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency $X_i" included in sector sweep reference signal 1001 may be used for this estimation.

Terminal #2 labeled 902_2 estimates, for example, "transmission panel antenna a2 (=1) and parameter b2" as the "transmission panel antenna and parameter" with high reception quality. Terminal #2 labeled 902_2 also estimates frequency band $1_1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 24, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth (="5"+1) transmission period 1301_6" in FIG. 24.

Note that terminal #2 "sector sweep reference signal 2401_2" includes information of the "transmission panel antenna and parameter" with high reception quality obtained by terminal #2 labeled 902_2, that is, information of "transmission panel antenna a2 (=1) and parameter b2". Terminal #2 "sector sweep reference signal" 2401_2 also includes information of the "frequency domain", for example, information of "frequency band $1_1". This will be described later.

Thus, terminal #1 labeled **902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency $X_i" included in sector sweep reference signal 1001** may be used for this estimation.

Terminal #i labeled 902_*i* estimates, for example, "transmission panel antenna ai and parameter bi" as the "transmission panel antenna and parameter" with high reception quality. Terminal #1 labeled 902_1 also estimates frequency band $X_i as the "frequency domain" with high reception quality.

In addition, while estimating the "transmission panel antenna and parameter" with high reception quality, terminal #i labeled 902_*i* simultaneously obtains information of "the number of time divisions in which sector sweep reference signals can be transmitted when the terminals transmit the sector sweep reference signals". In the case of FIG. 24, terminal #i labeled 902_*i* obtains information indicating that "the number of time divisions in which sector sweep reference signals can be transmitted when the terminals transmit the sector sweep reference signals" is eight.

In this case, terminal #i labeled 902_*i* obtains, for example, any one of the values "0", "1", "2", "3", "4", "5", "6", and "7" using a random number. For example, terminal #i labeled 902_*i* obtains "yi" using a random number. Note that yi is any one of the values "0", "1", "2", "3", "4", "5", "6", and "7". In this case, terminal #i labeled 902_*i* transmits terminal #i "sector sweep reference signal" 2401_*i* using terminal "sector sweep reference signal" ("yi"+1)-th transmission period 1301_("yi"+1) in FIG. 24.

Note that terminal #i "sector sweep reference signal" 2401_*i* includes information of the "transmission panel antenna and parameter" with high reception quality obtained by terminal #i labeled 902_*i*, that is, information of "transmission panel antenna ai and parameter bi". Terminal #i "sector sweep reference signal" 2401_*i* also includes information of the "frequency domain", for example, information of "frequency band $X_i". This will be described later.

Note that, in FIG. 24, it may be considered that terminal #i "sector sweep reference signals" 2401_*i* use a first frequency (band) regardless of i as a first method. In this case, terminal #i "sector sweep reference signals" 2401_*i* are subjected to time division (time division multiple access (TDMA)). This is because the terminals transmit modulation signals using a single-carrier scheme.

As a second method, terminal #i "sector sweep reference signals" 2401_*i* do not necessarily use the same frequency (band).

Both the first and second methods produce an effect of "reducing interference between terminal #i "sector sweep reference signals" 2401_*i*".

For example, in a case where base station #1 labeled 901_1 transmits modulation signals using "frequency band $1 to frequency band $M", a method can be considered in which terminal #i labeled 902_*i* transmits a modulation signal in a single-carrier scheme using "frequency band $1 to frequency band $M".

As another method, in a case where base station #1 labeled 901_1 transmits modulation signals using "frequency band $1 to frequency band $M", a method can be considered in which terminal #i labeled 902_*i* transmits a modulation signal in a single-carrier scheme using some of "frequency band $1 to frequency band $M".

Further, a method can be considered in which base station #1 labeled 901_1 transmits modulation signals using "frequency band $1 to frequency band $M" and terminal #i labeled 902_*i* transmits a modulation signal using a frequency (band) other than "frequency band $1 to frequency band $M".

In the manner described above, a collision of the sector sweep reference signals transmitted by the respective terminals can be reduced. This produces an effect that the base station can receive more sector sweep reference signals and can communicate with more terminals.

A description will be given of a configuration of terminal #i "sector sweep reference signal" 2401_*i* transmitted by terminal #i labeled 902_*i* described with reference to FIG. 24. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Terminal #i labeled 902_*i* transmits terminal #i "sector sweep reference signal" 2401_*i* as illustrated in FIG. 24. FIG. 15A illustrates an exemplary configuration of terminal #i "sector sweep reference signal" 2401_*i*. Note that the horizontal axis represents time in FIG. 15A. "Terminal #i "sector sweep reference signal" 1401_*i*" in FIG. 15A corresponds to an exemplary "sector sweep reference signal" 2401_*i* in FIG. 24.

As illustrated in FIG. 15A, terminal #i "sector sweep reference signal" 2401_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1 (t)×w1(xi, 1). Then, terminal #i labeled 902_*i* transmits tx1ref1(t)×w1(xi, 1) from antenna 306_1 in FIG. 3**. Note that t represents time.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1 (t)×w2(xi, 1). Then, terminal #i labeled 902_*i* transmits tx2ref1(t)×w2(xi, 1) from antenna 306_2 in FIG. 3**.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1 (t)×w3(xi, 1). Then, terminal #i labeled 902_*i* transmits tx3ref1(t)×w3(xi, 1) from antenna 306_3 in FIG. 3**.

When terminal #i labeled **902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1 (t)×w4(xi, 1). Then, terminal #i labeled 902_*i* transmits tx4ref1(t)×w4(xi, 1) from antenna 306_4 in FIG. 3**.

A description will be given of "reference signal **1511_*j*** according to j-th parameter in transmission panel antenna xi".

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)× w1(xi, j). Then, terminal #i labeled 902_*i* transmits tx1refj (t)×w1(xi, j) from antenna 306_1 in FIG. 3**. Note that t represents time.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)× w2(xi, j). Then, terminal #i labeled 902_*i* transmits tx2refj (t)×w2(xi, j) from antenna 306_2 in FIG. 3**.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)× w3(xi, j). Then, terminal #i labeled 902_*i* transmits tx3refj (t)×w3(xi, j) from antenna 306_3 in FIG. 3**.

When terminal #i labeled **902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)× w4(xi, j). Then, terminal #i labeled 902_*i* transmits tx4refj (t)×w4(xi, j) from antenna 306_4 in FIG. 3**.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 24, 15A, and 15B, when terminal #i labeled **902_*i* transmits "sector sweep reference signal 1501_*xi* in terminal #i transmission panel antenna xi", "reference signal 1511_*j*** according to j-th parameter in transmission panel antenna xi" includes, for example, the following information:

Information of the "transmission panel antenna and parameter" of base station #1 labeled 901_1 with high reception quality, as described above.

Thus, terminal #i labeled **902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15**A.

In addition, terminal #i labeled **902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15**A".

In this case, base station #1 labeled 901_1 is more likely to receive, even with an omnidirectional antenna for example, any of ""sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmission beamforming (directivity control). This produces an effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #1 labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 24, base station #1 labeled 901_1 can obtain the "information of the "transmission panel antenna and parameter" of base station #1 labeled 901_1 with high reception quality" from the plurality of terminals. This produces an effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- Identification number (ID) of the transmission panel antenna, which corresponds to xi here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces an effect of enhancing data reception quality.

Further, as illustrated in FIGS. 24, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

- "Information on the frequency band and/or frequency $X_i" that has been used for transmission by terminal #i labeled 902_*i* or that terminal #i labeled 902_*i* desires base station #1 labeled 901_1 to use.

Transmission of the "information on the frequency band and/or frequency $X_i" by terminal #i labeled 902_*i* allows base station #1 labeled 901_1 to recognize the "information on the frequency band and/or frequency $X_i"; accordingly, terminal #i labeled 902_*i* and base station #1 labeled 901_1 can perform appropriate control. This produces an effect of enhancing data reception quality.

FIG. 84A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 84A. In this example, there are frequency band $1, frequency band $2, . . . , frequency band $M for feedback signal 1002 as illustrated in FIG. 84A.

Thus, feedback signal 1002 includes feedback signal 8401_1 in transmission panel antenna 1 for frequency $1, feedback signal 8401_2 in transmission panel antenna 2 for frequency $2, . . . , feedback signal 8401_M in transmission panel antenna M for frequency $M.

One feature is that "feedback signals are transmitted from transmission panel antenna i in frequency band $i in FIG. 84A".

FIG. 84B illustrates an exemplary configuration of "feedback signal 8401_X in transmission panel antenna X for frequency $X" in FIG. 84A. Note that the vertical axis represents frequency and the horizontal axis represents time in FIG. 64B.

Frequency band $X_1, frequency band $X_2, . . . , frequency band $X_M (X) are included in frequency $X where "feedback signal 8401_X in transmission panel antenna X for frequency $X" is present. Note that M (X) is an integer equal to or greater than 1 or an integer equal to or greater than 2.

Feedback signal 8402_*i* in transmission panel antenna X for frequency $X_i is present in frequency band $X_i. Note that i is an integer from 1 to M (X) (both inclusive).

Note that, for feedback signal 8402_*i* in transmission panel antenna X for frequency $X_i, a signal is transmitted from transmission panel antenna X labeled 106_X of base station #1 labeled 901_1 with the configuration in FIG. 1A, 1B, or 1C.

FIG. 84C illustrates exemplary specific feedback signal assignment for feedback signal 1002 illustrated in FIGS. 84A and 84B. Note that FIG. 84C illustrates exemplary feedback signal assignment for feedback signal 8411_*i* in transmission panel antenna 1 for frequency $1_i.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, and terminal #3 labeled 902_3 transmits terminal #3 "sector sweep reference signal" 2401_3.

Terminal #1 "sector sweep reference signal" 2401_1 includes information indicating that "frequency band $1_M1 has high reception quality". Thus, base station #1 labeled 901_1 transmits terminal #1-addressed feedback signal 8411_1 from transmission panel antenna 1 using frequency band $1_M1 as in FIG. 84C.

Terminal #2 "sector sweep reference signal" 2401_2 includes information indicating that "frequency band $1_1 has high reception quality". Thus, base station #1 labeled 901_1 transmits terminal #2-addressed feedback signal 8411_2 from transmission panel antenna 1 using frequency band $1_1 as in FIG. 84C.

Terminal #3 "sector sweep reference signal" 2401_3 includes information indicating that "frequency band $1_2 and frequency band $1_3 have high reception quality". Thus, base station #1 labeled 901_1 transmits terminal #3-addressed feedback signal 8411_3 from transmission panel antenna 1 using frequency bands $1_2 and $1_3 as in FIG. 84C.

FIG. 84D illustrates exemplary specific feedback signal assignment for feedback signal 1002 illustrated in FIGS.

84A and 84B. Note that FIG. 84D illustrates exemplary feedback signal assignment for feedback signal 8421_*i* in transmission panel antenna 2 for frequency $2_i.

At this time, terminal #4 labeled 902_4 transmits a terminal #4 "sector sweep reference signal", terminal #5 labeled 902_5 transmits a terminal #5 "sector sweep reference signal", and terminal #6 labeled 902_6 transmits a terminal #6 "sector sweep reference signal", according to the frame configuration in FIG. 23.

The terminal #4 "sector sweep reference signal" includes information indicating that "frequency band $2_M2 has high reception quality". Thus, base station #1 labeled 901_1 transmits terminal #4-addressed feedback signal 8421_4 from transmission panel antenna 2 using frequency band $2_M2 as in FIG. 84D.

The terminal #5 "sector sweep reference signal" includes information indicating that "frequency band $2_2 has high reception quality". Thus, base station #1 labeled 901_1 transmits terminal #5-addressed feedback signal 8421_5 from transmission panel antenna 2 using frequency band $2_2 as in FIG. 84D.

The terminal #6 "sector sweep reference signal" includes information indicating that "frequency band $2_1 and frequency band $2_4 have high reception quality". Thus, base station #1 labeled 901_1 transmits terminal #6-addressed feedback signal 8421_6 from transmission panel antenna 2 using frequency bands $2_1 and $2_4 as in FIG. 84D.

Note that terminal-addressed feedback signals may be assigned to frequency band $3 to frequency band $M in the same manner as the above.

In this manner, obtaining terminal #i-addressed feedback signal 8411_*i*, 8421_*i*, or the like allows terminal #i labeled 902_*i* to know that communication with base station #1 labeled 901_1 is available and to know the frequency band to be used.

Note that FIGS. 84C and 84D are merely examples. In a case where there is no terminal #1-addressed feedback signal 8411_1 as feedback signal 1002, for example, terminal #1 labeled 902_1 recognizes that the communication with base station #1 labeled 901_1 has not been established.

At this time, terminal #i-addressed feedback signals 8411_*i* and 8421_*i*, etc. include, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed feedback signals 8411_*i* and 8421_*i*, etc.

FIG. 85A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 85A. In this example, there are frequency band $1, frequency band $2, . . . , frequency band $M for data-symbol-included frame 1003 as illustrated in FIG. 85A.

Thus, data-symbol-included frame 1003 includes modulation signal (slot) 8501_1 in transmission panel antenna 1 for frequency $1, modulation signal (slot) 8501_2 in transmission panel antenna 2 for frequency $2, . . . , modulation signal (slot) 8501_M1 in transmission panel antenna M for frequency $M.

One feature is that "modulation signals (slots) are transmitted from transmission panel antenna i in frequency band $i in FIG. 85A".

FIG. 85B illustrates an exemplary configuration of "modulation signal (slot) 8501_X in transmission panel antenna X for frequency $X" in FIG. 85A. Note that the vertical axis represents frequency and the horizontal axis represents time in FIG. 85B.

Frequency band $X_1, frequency band $X_2, . . . , frequency band $X_M (X) are included in frequency $X where "modulation signal (slot) 8501_X in transmission panel antenna X for frequency $X" is present. Note that M (X) is an integer equal to or greater than 1 or an integer equal to or greater than 2.

Modulation signal (slot) 8502_*i* in transmission panel antenna X for frequency $X_i is present in frequency band $X_i. Note that i is an integer from 1 to M (X) (both inclusive).

Note that, for modulation signal (slot) 8502_*i* in transmission panel antenna X for frequency $X_i, a signal is transmitted from transmission panel antenna X labeled 106_X of base station #1 labeled 901_1 with the configuration in FIG. 1A, 1B, or 1C.

FIG. 85C illustrates exemplary specific modulation signal (slot) assignment for data-symbol-included frame 1003 illustrated in FIGS. 85A and 85B. Note that FIG. 85C illustrates exemplary modulation signal (slot) assignment for modulation signal (slot) 8511_*i* in transmission panel antenna 1 for frequency $1_i.

As in FIG. 24, for example, terminal #1 labeled 902_1 transmits terminal #1 "sector sweep reference signal" 2401_1, terminal #2 labeled 902_2 transmits terminal #2 "sector sweep reference signal" 2401_2, and terminal #3 labeled 902_3 transmits terminal #3 "sector sweep reference signal" 2401_3.

Terminal #1 "sector sweep reference signal" 2401_1 includes information indicating that "frequency band $1_M1 has high reception quality". Thus, base station #1 labeled 901_1 transmits terminal #1-addressed modulation signal (slot) 8511_1 from transmission panel antenna 1 using frequency band $1_M1 as in FIG. 85C.

Terminal #2 "sector sweep reference signal" 2401_2 includes information indicating that "frequency band $1_1 has high reception quality". Thus, base station #1 labeled 901_1 transmits terminal #2-addressed modulation signal (slot) 8511_2 from transmission panel antenna 1 using frequency band $1_1 as in FIG. 85C.

Terminal #3 "sector sweep reference signal" 2401_3 includes information indicating that "frequency band $1_2 and frequency band $1_3 have high reception quality". Thus, base station #1 labeled 901_1 transmits terminal #3-addressed modulation signal (slot) 8511_3 from transmission panel antenna 1 using frequency bands $1_2 and $1_3 as in FIG. 85C.

FIG. 85D illustrates exemplary specific modulation signal (slot) assignment for data-symbol-included frame 1003 illustrated in FIGS. 85A and 85B. Note that FIG. 85D illustrates exemplary modulation signal (slot) assignment for modulation signal (slot) 8521_*i* in transmission panel antenna 2 for frequency $2_i.

At this time, terminal #4 labeled 902_4 transmits a terminal #4 "sector sweep reference signal", terminal #5 labeled 902_5 transmits a terminal #5 "sector sweep reference signal", and terminal #6 labeled 902_6 transmits a terminal #6 "sector sweep reference signal", according to the frame configuration in FIG. 23.

The terminal #4 "sector sweep reference signal" includes information indicating that "frequency band $2_M2 has high reception quality". Thus, base station #1 labeled 901_1 transmits terminal #4-addressed modulation signal (slot) 8521_4 from transmission panel antenna 2 using frequency band $2_M2 as in FIG. 85D.

The terminal #5 "sector sweep reference signal" includes information indicating that "frequency band $2_2 has high reception quality". Thus, base station #1 labeled 901_1 transmits terminal #5-addressed modulation signal (slot) 8521_5 from transmission panel antenna 2 using frequency band $2_2 as in FIG. 85D.

The terminal #6 "sector sweep reference signal" includes information indicating that "frequency band $2_1 and frequency band $2_4 have high reception quality". Thus, base station #1 labeled 901_1 transmits terminal #6-addressed modulation signal (slot) 8521_6 from transmission panel antenna 2 using frequency bands $2_1 and $2_4 as in FIG. 85D.

Note that terminal-addressed modulation signals (slots) may be assigned to frequency band $3 to frequency band $M in the same manner as the above.

At this time, terminal #i-addressed modulation signals (slots) 8511_*i* and 8521_*i*, etc. include, for example, data symbols (data and/or information) addressed to terminal #i labeled 902_*i*.

In this manner, obtaining terminal #i-addressed modulation signal (slot) 8511_*i*, 8521_*i*, or the like allows terminal #i labeled 902_*i* to know that communication with base station #1 labeled 901_1 is available and to know the frequency band to be used.

Note that FIGS. 85C and 85D are merely examples. In a case where there is no terminal #1-addressed modulation signal (slot) 8511_1 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the ""frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed modulation signals (slots) 8511_*i* and 8521_*i*, etc.

Note that, in FIGS. 84C and 84D, base station #1 labeled 901_1 may estimate the "frequency (band)" and the "transmission panel antenna and parameter" of terminal #i labeled 902_1 with high reception quality in receiving "terminal #i "sector sweep reference signals" 8301_*i* and 8311_*i*, etc. transmitted by terminal #i labeled 902_*i*", and the estimated information may be included in terminal #i-addressed feedback signals 8411_*i* and 8421_*i*, etc.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces an effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signals (slots) 8511_*i* and 8521_*i* in FIGS. 85C and 85D, etc. may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 76. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 23, 24, 15A, 15B, etc., and the description thereof will be thus omitted.

Base station #1 labeled 901_1 transmits feedback signal 1802_1. Note that this has already been described with reference to FIGS. 84A, 84B, 84C, and 84D, and the description thereof will be thus omitted.

After that, base station #1 labeled 901_1 transmits "data-symbol-included frame 1803_1". Note that this has already been described with reference to FIGS. 85A, 85B, 85C, and 85D, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIG. 25. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 85A, 85B, 85C, and 85D.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIG. 25.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 85A, 85B, 85C, and 85D.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIG. 25.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 23, 24, 15A, 15B, etc., and the description thereof will be thus omitted.

Base station #1 labeled 901_1 transmits feedback signal 1802_2. Note that this has already been described with reference to FIGS. 84A, 84B, 84C, and 84D, and the description thereof will be thus omitted.

After that, base station #1 labeled 901_1 transmits "data-symbol-included frame 1803_4". Note that this has already been described with reference to FIGS. 85A, 85B, 85C, and 85D, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIG. 25.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmission beamforming. This produces an effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIG. 25. Note that i is an integer equal to or greater than 1, for example, and the horizontal axis represents time in FIG. 25.

As illustrated in FIG. 25, "data-symbol-included frame 1852_*i*" is composed of a first transmission period, a second transmission period, a third transmission period, a fourth transmission period, a fifth transmission period, a sixth transmission period, a seventh transmission period, and an eighth transmission period.

As illustrated in FIG. 25, for example, terminal #1 labeled 902_1 transmits terminal #1 transmission frame (including a data symbol) 2501_1 using the first transmission period.

Terminal #2 labeled 902_2 transmits terminal #2 transmission frame (including a data symbol) 2501_2 using the sixth transmission period.

Terminal #3 labeled 902_3 transmits terminal #3 transmission frame (including a data symbol) 2501_3 using the fourth transmission period.

Terminal #4 labeled 902_4 transmits terminal #4 transmission frame (including a data symbol) 2501_4 using the second transmission period.

Terminal #5 labeled 902_5 transmits terminal #5 transmission frame (including a data symbol) 2501_5 using the eighth transmission period.

Terminal #6 labeled 902_6 transmits terminal #6 transmission frame (including a data symbol) 2501_6 using the fifth transmission period.

Note that the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" uses a single-carrier transmission scheme. In addition, a plurality of terminals may use the same frequency (band).

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, time division and transmitted by each terminal, and base station #1 labeled 901_1 receives the frame transmitted by the terminal, thereby preventing interference and achieving high data reception quality.

Note that terminal #1 transmission frame 2501_1, terminal #2 transmission frame 2501_2, terminal #3 transmission frame 2501_3, terminal #4 transmission frame 2501_4, terminal #5 transmission frame 2501_5, and terminal #6 transmission frame 2501_6 in FIG. 25 may include, in addition to the data symbol, a "reference signal such as DMRS, PTRS, or SRS", a pilot symbol, a pilot signal, a preamble, and a symbol including control information, for example.

In FIG. 25, a description has been given of a case where the terminals perform time division on the frames to be transmitted, but the terminals may perform spatial division on the frames to be transmitted using multi user-multiple-input multiple-output (MU-MIMO).

FIG. 24 illustrates exemplary occupation by the terminals in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, a description will be given of exemplary occupation by terminals different from that in FIG. 24 in "terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, terminal "sector sweep reference signal" fifth transmission period 1301_5, terminal "sector sweep reference signal" sixth transmission period 1301_6, terminal "sector sweep reference signal" seventh transmission period 1301_7, and terminal "sector sweep reference signal" eighth transmission period 1301_8" illustrated in FIG. 23.

In FIG. 26, the components that operate in the same manner as in FIGS. 23 and 24 are denoted by the same reference signs, and the descriptions thereof will be omitted since they have already been described. In the following, the difference from the description in FIG. 24 will be described.

Terminal #2 labeled 902_2 in FIG. 76 receives sector sweep reference signal 1001 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

Terminal #2 labeled 902_2, for example, estimates frequency band $1_1 as the "frequency (band)" with high reception quality and estimates "transmission panel antenna a2 and parameter b2" as the "transmission panel antenna and parameter".

In addition, while estimating the "transmission panel antenna and parameter" with high reception quality, terminal #2 labeled 902_2 simultaneously obtains information of the "the number of time divisions in which sector sweep reference signals can be transmitted when the terminals transmit the sector sweep reference signals". In the case of FIG. 26, terminal #2 labeled 902_2 obtains information indicating that "the number of time divisions in which sector sweep reference signals can be transmitted when the terminals transmit the sector sweep reference signals" is eight.

In this case, terminal #2 labeled 902_2 obtains, for example, any one of the values "0", "1", "2", "3", "4", "5", "6", and "7" using a random number. For example, terminal #2 labeled 902_2 obtains "5" using a random number. In this case, since "5"+1=6, terminal #2 labeled 902_2 transmits terminal #2 "sector sweep reference signal" 2401_2 using "terminal "sector sweep reference signal" sixth transmission period 1301_6" as in FIG. 26.

Note that terminal #2 sector sweep reference signal 2401_2 includes information of the "transmission panel antenna and parameter" with high reception quality obtained by terminal #2 labeled 902_2, that is, information of "transmission panel antenna a2 and parameter b2".

Terminal #3 labeled 902_3 in FIG. 76 receives sector sweep reference signal 1001 transmitted by base station #1 labeled 901_1, obtains the "identification number (ID) of the transmission panel antenna" and "identification number (ID) of the parameter used for beamforming (directivity control)" with high reception quality, and then can communicate with base station #1 labeled 901_1.

Terminal #3 labeled 902_3, for example, estimates "transmission panel antenna a3 and parameter b3" as the "transmission panel antenna and parameter" with high reception quality.

In addition, while estimating the "frequency (band)" and "transmission panel antenna and parameter" with high reception quality, terminal #3 labeled 902_3 simultaneously obtains information of the "the number of time divisions in which sector sweep reference signals can be transmitted when the terminals transmit the sector sweep reference signals". In the case of FIG. 26, terminal #3 labeled 902_3 obtains information indicating that "the number of time divisions in which sector sweep reference signals can be transmitted when the terminals transmit the sector sweep reference signals" is eight.

In this case, terminal #3 labeled 902_3 obtains, for example, any one of the values "0", "1", "2", "3", "4", "5", "6", and "7" using a random number. For example, terminal #3 labeled 902_3 obtains "5" using a random number. In this case, since "5"+1=6, terminal #3 labeled 902_3 transmits terminal #3 "sector sweep reference signal" 2601_3 using "terminal "sector sweep reference signal" sixth transmission period 1301_6" as in FIG. 26.

Note that terminal #3 "sector sweep reference signal" 2601_3 includes information of the "transmission panel antenna and parameter" with high reception quality obtained by terminal #3 labeled 902_3, that is, information of "transmission panel antenna a3 and parameter b3".

At this time, as illustrated in FIG. 26, the time period for "terminal #2 "sector sweep reference signal" 2401_2 transmitted by terminal #2 labeled 902_2" and the time period for "terminal #3 "sector sweep reference signal" 2601_3 transmitted by terminal #3 labeled 902_3" overlap each other.

Thus, base station #1 labeled 901_1 possibly simultaneously receives terminal #2 "sector sweep reference signal" 2401_2 and terminal #3 "sector sweep reference signal" 2601_3.

In this case, the following is two possible cases.

<Case 1>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 are different from the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1. Accordingly, base station #1 labeled 901_1 obtains information included in "terminal #2 "sector sweep reference signal" 2401_2 transmitted by terminal #2 labeled 902_2" and information included in "terminal #3 "sector sweep reference signal" 2601_3 transmitted by terminal #3 labeled 902_3".

In this case, in FIG. 84C for example, a terminal #2-addressed feedback signal is assigned to frequency $1_1 and a terminal #3-addressed feedback signal is assigned to frequency $1_2.

In addition, in FIG. 85C for example, a terminal #2-addressed modulation signal (slot) is assigned to frequency $1_1 and a terminal #3-addressed modulation signal (slot) is assigned to frequency $1_2.

In this manner, base station #1 labeled 901_1 can communicate with terminal #2 labeled 902_2 and terminal #3 labeled 902_3.

<Case 2>

Both "terminal #2 "sector sweep reference signal" 2401_2 transmitted by terminal #2 labeled 902_2" and "terminal #3 "sector sweep reference signal" 2601_3 transmitted by terminal #3 labeled 902_3" have the configuration in FIGS. 15A and 15B.

Here, the ""transmission panel antenna and parameter for beamforming of terminal #2 labeled 902_2" with high reception quality in receiving terminal #2 "sector sweep reference signal" 2401_2 transmitted by terminal #2 labeled 902_2" by base station #1 labeled 901_1 interfere with the ""transmission panel antenna and parameter for beamforming of terminal #3 labeled 902_3" with high reception quality in receiving terminal #3 "sector sweep reference signal" 2601_3 transmitted by terminal #3 labeled 902_3" by base station #1 labeled 901_1.

<Case 2-1>

In some cases, base station #1 labeled 901_1 obtains either information included in "terminal #2 "sector sweep reference signal" 2401_2 transmitted by terminal #2 labeled 902_2" or information included in "terminal #3 "sector sweep reference signal" 2601_3 transmitted by terminal #3 labeled 902_3".

For example, base station #1 labeled 901_1 obtains the information included in "terminal #2 "sector sweep reference signal" 2401_2 transmitted by terminal #2 labeled 902_2".

In this case, in FIG. 84C for example, a terminal #2-addressed feedback signal is assigned to frequency $1_1.

In addition, in FIG. 85C for example, a terminal #2-addressed modulation signal (slot) is assigned to frequency $1_1.

In this manner, base station #1 labeled 901_1 can communicate with (terminal #1 labeled 902_1 and) terminal #2 labeled 902_2.

An operation of terminal #3 labeled 902_3 will be described.

It is assumed that sector sweep reference signal 1851_1 in FIG. 18 has the states in FIG. 26. That is, data-symbol-included frames 1803_1, 1803_2, and 1803_3 in FIG. 18 have no frame (slot) addressed to terminal #3 labeled 902_3.

In this case, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed again as in the cases described above, and terminal #3 labeled 902_3 communicate with base station #1 labeled 901_1. Note that the specific examples have been described in other embodiments.

<Case 2-2>

In some cases, base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3".

It is assumed that sector sweep reference signal 1851_1 in FIG. 18 has the states in FIG. 26, and base station #1 labeled 901_1 obtains neither information included in "terminal #2 "sector sweep reference signal" 2401_2 transmitted by terminal #2 labeled 902_2" nor information included in "terminal #3 "sector sweep reference signal" 2601_3 transmitted by terminal #3 labeled 902_3". In this case, data-symbol-included frames 1803_1, 1803_2, and 1803_3 in FIG. 18 have neither a frame (slot) addressed to terminal #2 labeled 902_2 nor a frame (slot) addressed to terminal #3 labeled 902_3.

In this case, terminal #2 labeled 902_2 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #2 labeled 902_2, for example, estimates frequency band $1_1 as the "frequency (band)" with high reception quality and estimates "transmission panel antenna a2 and parameter b2" as the "transmission panel antenna and parameter".

In other cases, terminal #2 labeled 902_2, for example, estimates a frequency in frequency band $1_i, where i is not 1, as the "frequency (band)" with high reception quality and estimates "transmission panel antenna a2 and parameter b2" as the "transmission panel antenna and parameter".

In still other cases, terminal #2 labeled 902_2, for example, estimates a frequency in frequency band $X_i, where X is not 1, as the "frequency (band)" with high reception quality and estimates "transmission panel antenna a2 and parameter b2" as the "transmission panel antenna and parameter".

In any of the cases, the predetermined procedure is performed again as in the cases described above, and terminal #2 labeled 902_2 communicate with base station #1 labeled 901_1. Note that the specific examples have been described in other embodiments.

Likewise, terminal #3 labeled 902_3 in FIG. 76 receives sector sweep reference signal 1801_2 in FIG. 19 transmitted by base station #1 labeled 901_1, obtains the "frequency (band)", "identification number (ID) of the transmission panel antenna", and "identification number (ID) of the parameter used for beamforming (directivity control)" with high reception quality, and then can communicate with base station #1 labeled 901_1.

In some cases, terminal #3 labeled 902_3, for example, estimates frequency band $1_1 as the "frequency (band)" with high reception quality and estimates "transmission panel antenna a3 and parameter b3" as the "transmission panel antenna and parameter".

In other cases, terminal #3 labeled 902_3, for example, estimates a frequency in frequency band $1_i, where i is not 1, as the "frequency (band)" with high reception quality and estimates "transmission panel antenna a3 and parameter b3" as the "transmission panel antenna and parameter".

In still other cases, terminal #3 labeled 902_3, for example, estimates a frequency in frequency band $X_i, where X is not 1, as the "frequency (band)" with high reception quality and estimates "transmission panel antenna a3 and parameter b3" as the "transmission panel antenna and parameter".

In any of the cases, the predetermined procedure is performed as in the cases described above, and terminal #3 labeled 902_3 communicate with base station #1 labeled 901_1. Note that the specific examples have been described in other embodiments.

In the manner described above, a collision of the sector sweep reference signals transmitted by the respective terminals can be further reduced. This produces an effect that the base station can receive more sector sweep reference signals and can communicate with more terminals.

Note that transmission panel antenna 1 of base station #1 labeled 901_1, that is, frequency band $1_i has been described in <Case 1> and <Case 2> described above, but it is merely an example. The same can be implemented with another transmission panel antenna, that is, frequency band $X_i, where X is from 2 to M (both inclusive).

As described above in Embodiment 13, an effect of improving communication capacity in a system composed of a base station and terminals can be obtained by the terminals transmitting sector sweep reference signals so as to cause less collision. Note that the configurations of the base station and the terminals are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 73, 74, 75, 23, 76, 24, 15A, 15B, 84A, 84B, 84C, 84D, 85A, 85B, 85C, 85D, 18, 25, and 26, but the names thereof are not limited to those in the drawings and the important part is the functions of the signals to be transmitted.

(Supplement 1)

It is needless to say that the embodiments described in the present specification may be implemented while combined with each other or combined with other contents.

Further, the embodiments and other contents are merely examples. For example, even though the "modulation scheme, error correction coding scheme (error correction code, code length, coding rate, and the like for use), control information, and the like" are illustrated as the examples, it is possible to implement the embodiments with a similar configuration even when a "modulation scheme, error correction coding scheme (error correction code, code length, coding rate, and the like for use), control information, and the like" different from those in the examples are applied.

Regarding the modulation scheme, the embodiments and other contents described in the present specification can be implemented also by using modulation schemes other than the modulation schemes described in the present specification. For example, amplitude phase shift keying (APSK) (e.g., 16APSK, 64APSK, 128APSK, 256APSK, 1024APSK, 4096APSK), pulse amplitude modulation (PAM) (e.g., 4PAM, 8PAM, 16PAM, 64PAM, 128PAM, 256PAM, 1024PAM, 4096PAM), phase shift keying (PSK) (e.g., BPSK, QPSK, 8PSK, 16PSK, 64PSK, 128PSK, 256PSK, 1024PSK, 4096PSK), quadrature amplitude modulation (QAM) (e.g., 4QAM, 8QAM, 16QAM, 64QAM, 128QAM, 256QAM, 1024QAM, 4096QAM), or the like may be applied, or uniform mapping and non-uniform mapping may be applied for each of the modulation schemes. The number of signal points in in-phase (I)-quadrature (phase) (Q) is not limited to those in the examples above, and may be an integer equal to or greater than 3.

In addition, the method of arranging signal points (e.g., 2, 4, 8, 16, 64, 128, 256, or 1024 signal points) on the I-Q plane (modulation scheme with 2, 4, 8, 16, 64, 128, 256, 1024, or other numbers of signal points) is not particularly limited to the signal point arrangement methods of the modulation schemes described in the present specification. Thus, the function of outputting an in-phase component and a quadrature component based on a plurality of bits is a function in a mapper, and performing a matrix operation (e.g., precoding) to perform MIMO transmission and phase changing for a baseband signal after the outputting function is one of the effective functions of the present invention.

In addition, when "∀" and "∃" are present in the present specification, "∀" represents a universal quantifier, and "∃" represents an existential quantifier.

Further, when the present specification describes a complex plane, the unit of phase, such as, e.g., an argument, is "radian".

The use of the complex plane allows representation of complex numbers in polar form as a representation of the complex numbers using polar coordinates. Letting a point (a, b) on the complex plane correspond to a complex number z=a+jb (where both of "a" and "b" are real numbers and "j" is an imaginary unit), a=r×cos θ and b=r×sin θ and

[1]

$$r=\sqrt{a^2+b^2} \qquad \text{(Equation 1)}$$

hold true when this point is expressed as [r, θ] with the polar coordinates. The character "r" is the absolute value of z (r=|z|) and θ is the argument. Then, z=a+jb is expressed as $r \times e^{j\theta}$.

In the present specification, the "terminal, base station, access point, gateway, etc." may each have a configuration in which a reception apparatus and an antenna of which are separate from each other. For example, the reception apparatus includes an interface for inputting, through a cable, a signal received by the antenna or a signal received by the antenna and subjected to frequency conversion, and the reception apparatus performs subsequent processing. Further, the data and information obtained by the reception apparatus are then converted into a video and sound, and displayed on a display (monitor), or outputted from a speaker in the case of sound. Further, the data and information obtained by the reception apparatus may be subjected to signal processing relevant to the video and sound (such signal processing does not have to be performed), and outputted from an RCA terminal (a video terminal and a sound terminal), universal serial bus (USB), high-definition multimedia interface (HDMI) (registered trademark), digital terminal, or the like provided in the reception apparatus.

It is contemplated herein that the transmission apparatus and/or transmitter is included in, for example, a broadcasting station, base station, access point, terminal, mobile phone, smartphone, tablet, laptop PC, server, PC, personal computer, television, home appliance (household electrical machinery equipment), factory apparatus, communication equipment/broadcasting equipment such as Internet of Things (IoT) equipment or the like, g Node B (gNB), repeater, node, car, bicycle, motorcycle, ship, satellite, airplane, drone, mobile equipment, or robot. Meanwhile, it is contemplated that the reception apparatus and/or receiver is included in a radio, terminal, personal computer, mobile phone, access point, communication equipment such as a base station, smartphone, tablet, laptop PC, server, PC, personal computer, television, home appliance (household electrical machinery equipment), factory apparatus, communication equipment/broadcasting equipment such as Internet of Things (IoT) equipment and the like, and g Node B (gNB), repeater, node, car, bicycle, motorcycle, ship, satellite, airplane, drone, mobile equipment, robot, or the like. Further, it is considered that the transmission apparatus and the reception apparatus in the present invention are devices having a communication function, and the devices are configured to be capable of connecting via a certain interface to an apparatus for executing an application of a television, a radio, a personal computer, a mobile phone, or the like. Further, it is considered that the communication apparatus in the present specification is included in, for example, a broadcasting station, base station, access point, terminal, mobile phone, smartphone, tablet, laptop PC, server, PC, personal computer, television, home appliance (household electrical machinery equipment), factory apparatus, communication equipment/broadcasting equipment such as an Internet of Things (IoT) equipment and the like, g Node B (gNB), repeater, node, car, bicycle, motorcycle, ship, satellite, airplane, drone, mobile equipment, or robot.

In addition, symbols other than a data symbol (for example, a reference signal (preamble, unique word, postamble, reference symbol, pilot symbol, pilot signal, and the like), a control information symbol, a sector sweep, etc.) may be mapped in any manner in a frame in the present embodiments. Although the present specification uses the terms "reference signal", "control information symbol", and "sector sweep", the important part is the function itself. The sector sweep may be replaced by a sector-level sweep, for example.

It is contemplated that the reference signal and/or a signal relevant to sector sweep are, for example, known symbols modulated using PSK modulation by the transmitter and receiver (alternatively, the receiver may be capable of knowing a symbol transmitted by the transmitter by synchronization by the receiver), non-zero power signals, zero power signals, signals known to the transmitter and receiver, or the like. The receiver performs, using these signals, frequency synchronization, time synchronization, channel estimation (estimation of channel state information (CSI)) (for each modulation signal), signal detection, estimation of a reception state, estimation of a transmission state, or the like.

Further, the control information symbol is a symbol for transmitting information (e.g., a modulation scheme, an error correction coding scheme, and a coding rate of the error correction coding scheme; configuration information in a higher layer; a modulation and coding scheme (MCS); a frame configuration; channel information; information on a using frequency band; information on the number of using channels; and the like used for communication) that needs to be transmitted to a communication counterpart to achieve communication (of an application or the like) other than data communication.

The transmission apparatus and/or reception apparatus sometimes need to be notified of a transmission method (MIMO, single-input single-output (SISO), multiple-input single-output (MISO), single-input multiple-output (SIMO), space-time block code, interleaving scheme, MCS, etc.), modulation scheme, and error correction coding scheme. This description may be omitted in some of the embodiments.

The terms such as "precoding", "precoding weight", etc. are sometimes used in the present specification, but they may be called in any manner and the important part is the signal processing itself in the present invention.

Regarding both the transmission panel antenna of the transmission apparatus and the reception panel antenna of the reception apparatus, a single antenna illustrated in the drawings may be composed of one antenna or a plurality of antennas.

Further, in the explanation of the embodiments and the like, the transmission panel antenna and the reception panel antenna may be described separately; however, a configuration of "transmission/reception panel antenna" serving as both of the transmission panel antenna and the reception panel antenna may be used.

In addition, the transmission panel antenna, reception panel antenna, and transmission/reception panel antenna may be referred to, for example, as an "antenna port." The transmission panel antenna, reception panel antenna, and transmission/reception panel antenna may be referred to as another name, and a method of configuring the transmission panel antenna with one or more antennas or a plurality of antennas is conceivable. Additionally, a method of configuring the reception panel antenna with one or more antennas or a plurality of antennas is conceivable. Also, a method of configuring the transmission/reception panel antenna with one or more antennas or a plurality of antennas is conceivable. Further, an apparatus may be configured for each transmission panel antenna, an apparatus may be configured for each reception panel antenna, and an apparatus may be configured for each transmission/reception panel antenna. That is, it may be regarded as a multiple transmitter (TX)/receiver (RX) point (TRP), i.e., multiple transmission/reception point.

The antenna port may be a logical antenna (antenna group) composed of one or more physical antennas. That is, the antenna port does not necessarily refer to one physical antenna, but may refer to an array antenna or the like composed of a plurality of antennas. For example, the number of physical antennas composing the antenna port is not specified, but the number of physical antennas may be specified as the minimum unit in which a terminal station is capable of transmitting a reference signal. Further, the antenna port may also be specified as a unit or a minimum unit for multiplication by a precoding vector or a weight of a preceding matrix.

There are a plurality of methods of generating a modulation signal by a single-carrier scheme in the present specification, and the present embodiments can be implemented by using any of the schemes. For example, examples of the single-carrier scheme include “discrete Fourier transform (DFT)-spread orthogonal frequency division multiplexing (OFDM)” (DFT-S OFDM), “trajectory constrained DFT spread OFDM”, “constrained DFT spread OFDM” (constrained DFT S OFDM). “OFDM based single carrier (SC)”, “single carrier (SC)-frequency division multiple access (FDMA)”, “guard interval DFT spread OFDM”, a time-domain implementation single carrier scheme (e.g., single carrier (SC)-QAM), and the like.

In the present specification, the ID of the transmission panel antenna and the ID of beamforming are described separately from each other; however, an ID may be assigned without distinguishing between the two.

For example, “ID 0 of beamforming by using transmission panel antenna #1” may be referred to as ID♭0, “ID 1 of beamforming by using transmission panel antenna #1” may be referred to as ID♭1, “ID 0 of beamforming by using transmission panel antenna #2” may be referred to as ID♭2, “ID 1 of beamforming by using transmission panel antenna #2” may be referred to as ID♭3, and so forth.

Thus, a signal for sector sweep may be generated based on the IDs, and the base station and the terminal may transmit information including the IDs.

It has been indicated above that the waveforms of the modulation signal transmitted by the communication apparatus herein may be either the single-carrier scheme or the multi-carrier scheme such as OFDM. In a case of using the multi-carrier scheme such as OFDM, a frame also includes a symbol on the frequency axis.

A “sector sweep reference signal transmitted by a base station” described in the embodiments and drawings such as FIGS. 10, 11, 12, 18, 19, and 27, for example, may be included in a “synchronization signal (SS) block”, “physical broadcast channel (PBCH) block”, or SS/PBCH block. In this case, it need not be called the “sector sweep reference signal”. In addition, a “feedback signal transmitted by a base station and feedback signal group transmitted by a base station” described in the embodiments and drawings such as FIGS. 10, 16A, 16B, 18, 19, and 27, for example, may be included in a “synchronization signal (SS) block”, “physical broadcast channel (PBCH) block”, or SS/PBCH block. In this case, it need not be called the “feedback signal and feedback signal group”.

Although it has been explained that a sector sweep reference signal includes the ID of a transmission panel antenna when a base station transmits the sector sweep reference signal, the sector sweep reference signal may include the ID of a sector antenna and/or information of an antenna port number as “the ID of a transmission panel antenna”. Likewise, although it has been explained that a sector sweep reference signal includes the ID of a transmission panel antenna when a terminal transmits the sector sweep reference signal, the sector sweep reference signal may include the ID of a sector antenna and/or information of an antenna port number as “the ID of a transmission panel antenna”.

The configurations of the transmission panel antenna and the reception panel antenna of the communication apparatus in the present invention are not limited to the configurations in FIGS. 3 and 4. The transmission panel antenna and the reception panel antenna may be composed of one or more antennas and/or antenna elements and may be composed of two or more antennas and/or antenna elements.

Additionally, the antennas illustrated in FIGS. 3 and 4 may be composed of one or more antennas and/or antenna elements or may be composed of two or more antennas and/or antenna elements.

In the present specification, the embodiments have been described using OFDM as an example of multi-carrier schemes, but the embodiments in the present specification can be similarly implemented using another multi-carrier scheme.

By way of example, multi-carrier transmission may be implemented by assigning a “single-carrier scheme using a single frequency band” and assigning a “single-carrier scheme using one or more frequency bands” to the frequency band described in the present specification.

As another example, multi-carrier transmission may be implemented by assigning one or more carriers or two or more carriers to the frequency band described in the present specification. Note that the multi-carrier transmission scheme is not limited to the above examples.

In some embodiments of the present specification, a frequency (band) of a signal transmitted by a base station is the same or partly the same as a frequency (band) of a signal transmitted by a terminal; however, such embodiments can be similarly implemented even though “a frequency (band) of a signal transmitted by a base station is different or partly different from a frequency (band) of a signal transmitted by a terminal”.

Although the embodiments have been described using OFDM and/or OFDMA in the present specification, the embodiments can be similarly implemented using a multi-carrier scheme instead of OFDM. The multi-carrier scheme such as OFDM may be cyclic prefix (CP)-OFDM.

Note that following frames may be transmitted by a base station although some frames are exemplified in Embodiment 1 to Embodiment 4, etc.

In FIG. 16B, “terminal #i-addressed feedback signal 1611_*i*” may be assigned to a plurality of transmission periods (in the time axis direction). For example, “terminal #1-addressed feedback signal 1611_1” may be assigned to the first transmission period and the second transmission period in frequency band♭K. In this case, the signal may be assigned to consecutive transmission periods (in the time axis direction) or may be discretely assigned, for example, to the first transmission period and the fourth transmission period.

In addition, “terminal #i-addressed feedback signal 1611_*i*” may be assigned to a plurality of frequency bands. For example, “terminal #1-addressed feedback signal 1611_1” may be assigned to frequency band♭(K−1) and frequency band♭K. In this case, the signal may be assigned to consecutive frequency bands or may be discretely assigned, for example, to frequency band♭1 and frequency band♭K.

Note that the above assignment of “terminal #i-addressed feedback signal 1611_*i*” to a plurality of transmission periods (in the time axis direction) and/or to a plurality of frequency bands may also be applied to the frames in FIGS. 16B, 28A, 28B, 30A, 30B, 32A, 32B, 34A, 34B, 36, 38, etc.

In FIG. 17B, “terminal #i-addressed modulation signal (slot) 171*i*” may be assigned to a plurality of transmission periods (in the time axis direction). For example, “terminal #1-addressed modulation signal (slot) 1711” may be assigned to the first transmission period and the second transmission period in frequency band♭K. In this case, the signal may be assigned to consecutive transmission periods (in the time axis direction) or may be discretely assigned, for example, to the first transmission period and the fourth transmission period.

In addition, "terminal #1-addressed modulation signal (slot) 171_i_" may be assigned to a plurality of frequency bands. For example, "terminal #1-addressed modulation signal (slot) 1711" may be assigned to frequency band ♭(K−1) and frequency band ♭K. In this case, the signal may be assigned to consecutive frequency bands or may be discretely assigned, for example, to frequency band ♭1 and frequency band ♭K.

Note that the above assignment of "terminal #1-addressed modulation signal (slot)" to a plurality of transmission periods (in the time axis direction) and/or to a plurality of frequency bands may also be applied to the frames in FIGS. 17B, 29A, 29B, 30A, 30B, 31A, 31B, 32A, 32B, 33A, 33B, 35A, 35B, 37, 39, 41, 49 etc.

Further, following frames may be transmitted by a terminal although some frames are exemplified in Embodiment 1 to Embodiment 4, etc.

In FIG. 14, terminal #i "sector sweep reference signal" 1401_*i* may be assigned to a plurality of transmission periods (in the time axis direction). For example, terminal #1 "sector sweep reference signal" 1401_1 may be assigned to the first transmission period and the second transmission period in frequency band ♭K. In this case, the signal may be assigned to consecutive transmission periods (in the time axis direction) or may be discretely assigned, for example, to the first transmission period and the fourth transmission period.

In addition, terminal #i "sector sweep reference signal" 1401_*i* may be assigned to a plurality of frequency bands. For example, terminal #1 "sector sweep reference signal" 1401_1 may be assigned to frequency band ♭(K−1) and frequency band ♭K. In this case, the signal may be assigned to consecutive frequency bands or may be discretely assigned, for example, to frequency band ♭1 and frequency band ♭K.

Note that the above assignment of terminal #i "sector sweep reference signal" 1401_*i* to a plurality of transmission periods (in the time axis direction) and/or to a plurality of frequency bands may also be applied to the frames in FIGS. 14, 21A, 21B, 22A, 22B, 24, 26, etc.

In FIG. 20A, terminal #i transmission frame 2001_*i* may be assigned to a plurality of transmission periods (in the time axis direction). For example, terminal #1 transmission frame 2001_1 may be assigned to the first transmission period and the second transmission period in frequency band ♭K. In this case, the signal may be assigned to consecutive transmission periods (in the time axis direction) or may be discretely assigned, for example, to the first transmission period and the fourth transmission period.

In addition, terminal #i transmission frame 2001_*i* may be assigned to a plurality of frequency bands. For example, terminal #1 transmission frame 2001_1 may be assigned to frequency band ♭(K−1) and frequency band ♭K. In this case, the signal may be assigned to consecutive frequency bands or may be discretely assigned, for example, to frequency band ♭1 and frequency band ♭K.

Note that the above assignment of terminal #i transmission frame 2001_*i* to a plurality of transmission periods (in the time axis direction) and/or to a plurality of frequency bands may also be applied to the frames in FIGS. 20A, 20B, 20C, 20D, 20E, 20F, 25, 44A, 44B, 45A, 45B, 46A, 46B, 47A, 47B, 48, 49, 50, 51A, 51B, 52A, 52B, 53, etc.

A "sector sweep reference signal transmitted by a base station" described in the embodiments and drawings such as FIGS. 10, 11, 12, 18, 19, and 27, for example, may be included in a "physical downlink control channel (PDCCH)". In this case, it need not be called the "sector sweep reference signal".

For example, information A is present as one of information portions in a PDCCH, and a "sector sweep reference signal subjected to beamforming #1", "sector sweep reference signal subjected to beamforming #2", . . . , "sector sweep reference signal subjected to beamforming #N" are present as the "sector sweep reference signals transmitted by a base station". Note that N is an integer equal to or greater than 1 or an integer equal to or greater than 2.

At this time, information A is included in the "sector sweep reference signal subjected to beamforming #1", "sector sweep reference signal subjected to beamforming #2", . . . , "sector sweep reference signal subjected to beamforming #N". This produces an effect that a terminal is more likely to obtain information A.

A "sector sweep reference signal transmitted by a terminal" described in the embodiments of the present specification may be included in a "physical uplink control channel (PUCCH)". In this case, it need not be called the "sector sweep reference signal".

For example, information B is present as one of information portions in a PUCCH, and a "sector sweep reference signal subjected to beamforming $1", "sector sweep reference signal subjected to beamforming $2", . . . , "sector sweep reference signal subjected to beamforming $M" are present as the "sector sweep reference signals transmitted by a terminal". Note that M is an integer equal to or greater than 1 or an integer equal to or greater than 2.

At this time, information B is included in the "sector sweep reference signal subjected to beamforming $1", "sector sweep reference signal subjected to beamforming $2", . . . , "sector sweep reference signal subjected to beamforming SM". This produces an effect that a base station is more likely to obtain information B.

In the present specification, a server may provide an application related to processing relevant to the reception apparatus and the receiver, and the terminal may implement the functions of the reception apparatus described in the present specification by installing this application. Note that the application may be provided to the terminal by connection of a communication apparatus including the transmission apparatus described in the present specification to the server via a network, or the application may be provided to the terminal by connection of a communication apparatus having another transmission function to the server via the network.

Likewise, in the present specification, a server may provide an application related to processing relevant to the transmission apparatus and the transmitter, and the communication apparatus may implement the functions of the transmission apparatus described in the present specification by installing this application. Note that a method can be envisaged in which this communication apparatus is provided with the application by connection of another communication apparatus to the server via the network.

Note that the present invention is not limited to the embodiments and can be implemented with various modifications. For example, the embodiments are performed by a communication apparatus in the description, but the present invention is not limited to this and the communication methods can be realized by software.

In addition, a program for performing the above communication methods may be stored in read only memory (ROM) in advance, for example, and the program may be executed by a central processor unit (CPU).

Further, a program for performing the communication method may be stored in a computer-readable storage medium, and the program stored in the storage medium may be recorded in a random access memory (RAM) of the computer so that the computer operates according to the program.

Each configuration in the each of the embodiments described above can be typically realized by a large scale integration (LSI), which is an integrated circuit. The LSI may be individually formed as chips, or one chip may be formed so as to include a part or all of the configurations in each embodiment. The LSI here may be referred to as an integrated circuit (IC), a system LSI, a super LSI, or an ultra LSI depending on a difference in the degree of integration. In addition, the technique of implementing an integrated circuit is not limited to the LSI and may be realized by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

Note that at least one of the FPGA and the CPU may be configured to download all or some of software required for implementing the communication methods described in the present disclosure by radio communication or wired communication. Further, at least one of the FPGA and the CPU may be configured to download all or some of software for updating by radio communication or wired communication. Then, the downloaded software may be stored in storage, and at least one of the FPGA and the CPU may be operated based on the stored software to execute the digital signal processing described in the present disclosure.

The device including at least one of the FPGA and the CPU may be connected to a communication modem by radio or wire, and the communication methods described in the present disclosure may be implemented by the device and the communication modem.

For example, a communication apparatus such as the base station, the AP, and the terminal described in the present specification may include at least one of the FPGA and the CPU, and the communication apparatus may include an interface for externally obtaining software for operating at least one of the FPGA and the CPU. Further, the communication apparatus may include storage for storing the externally-obtained software, and the FPGA and/or the CPU may be operated based on the stored software to implement the signal processing described in the present disclosure.

The "data", "data symbol", and "data frame" may be, for example, a physical downlink shared channel (PDSCH) or a physical uplink shared channel (PUSCH).

The unlicensed band may be referred to as a shared spectrum.

In a case where an apparatus of NR such as gNB and NR-UE transmits a synchronization signal block (SSB), the SSB may include the sector sweep reference signal described in the present specification.

In the present specification, gNB uses transmission beams in transmitting modulation signals, and NR-UE selects a suitable beam from the transmission beams used by the gNB in receiving the modulation signals transmitted by the gNB. At this time, the selection of a reception beam used by the NR-UE, which selects the transmission beam used by the gNB, may be referred to as beam switching.

Although the present specification provides specific values of frequency in the above, the contents described in the present specification can be similarly implemented by using a frequency other than the above specific frequencies. In addition, the contents described in the present specification can be applicable to not only an unlicensed band but also a licensed band.

For example, gNB transmits a plurality of data frames to first NR-UE as described in the present specification. At this time, the gNB may apply (downlink) spatial division multiplexing (SDM), which uses the same timing and the same frequency to transmit the plurality of data frames, for the first NR-UE. In addition, the gNB may apply (downlink) frequency division multiplexing (FDM), which uses "a plurality of frequencies or a plurality of carriers" to transmit the plurality of data frames, for the first NR-UE. Further, the gNB may apply (downlink) time division multiplexing (TDM), which uses a first frequency and divides the time into pluralities to transmit the plurality of data frames, for the first NR-UE.

Further, for example, second NR-UE transmits a plurality of data frames to gNB as described in the present specification. At this time, the second NR-UE may apply (uplink) SDM, which uses the same timing and the same frequency to transmit the plurality of data frames, for the gNB. In addition, the second NR-UE may apply (uplink) FDM, which uses "a plurality of frequencies or a plurality of carriers" to transmit the plurality of data frames, for the gNB. Further, the second NR-UE may apply (uplink) TDM, which uses a second frequency and divides the time into pluralities to transmit the plurality of data frames, for the gNB.

Note that "A and/or B" in the present specification may be interpreted as "A and B" or may also be interpreted as "A or B".

If future integrated circuit technology replaces LSIs as a result of the advancement of semiconductor technology or other derivative technology, the functional blocks could be integrated using the future integrated circuit technology. Biotechnology can also be applied.

The present invention is widely applicable to radio systems for respectively transmitting different modulation signals from a plurality of antennas. It is also applicable to a case of performing MIMO transmission in a wired communication system (e.g., a power line communication (PLC) system, an optical communication system, and a digital subscriber line (DSL) system) with a plurality of transmission points.

The disclosures of Japanese Patent Application No. 2020-112820, filed on Jun. 30, 2020 and Japanese Patent Application No. 2020-157453, filed on Sep. 18, 2020, including the specifications, drawings and abstracts, are incorporated herein by reference in their entirety.

INDUSTRIAL APPLICABILITY

The present invention is widely applicable to radio systems for transmitting modulation signals from one or more antennas, and is suitable for the application to, for example, a communication system using a single carrier and a communication system using a multi-carrier transmission scheme such as OFDM. The present invention is also applicable to wired communication systems such as a power line communication (PLC) system, an optical communication system, and a digital subscriber line (DSL) system.

REFERENCE SIGNS LIST

100 Control signal
**101_*i*** i-th data

102_*i* i-th transmitter
103_*i* i-th modulation signal
104 First processor
105_*j* j-th transmission signal
106_*j* Transmission panel antenna j
151_*i* Reception panel antenna i
152_*i* i-th received signal
153 Second processor
154 j-th signal-processing-subjected signal
155_*j* j-th receiver
156_*j* j-th control data
157_*j* j-th data
158 Third processor
200 Control signal
201 Data
202 Data symbol generator
203 Data symbol modulation signal
204 Sector sweep reference signal generator
205 Sector sweep reference signal
206 Other-signal generator
207 Other signals
251 Processor
252 Frame configuration-based modulation signal
300 Control signal
301 Transmission signal
302 Distributor
303_1 First transmission signal
303_2 Second transmission signal
303_3 Third transmission signal
303_4 Fourth transmission signal
304_1, 304_2, 304_3, 304_4 Multiplier
305_1 Coefficient-multiplication-subjected first transmission signal
305_2 Coefficient-multiplication-subjected second transmission signal
305_3 Coefficient-multiplication-subjected third transmission signal
305_4 Coefficient-multiplication-subjected fourth transmission signal
306_1, 306_2, 306_3, 306_4 Antenna
400 Control signal
401_1, 401_2, 401_3, 401_4 Antenna
402_1 First received signal
402_2 Second received signal
402_3 Third received signal
402_4 Fourth received signal
403_1, 403_2, 403_3, 403_4 Multiplier
404_1 Coefficient-multiplication-subjected first received signal
404_2 Coefficient-multiplication-subjected second received signal
404_3 Coefficient-multiplication-subjected third received signal
404_4 Coefficient-multiplication-subjected fourth received signal
405 Coupler/combiner
406 Modulation signal
501 Constellation mapper
502 Serial/parallel converter
503 IFFT
601 Rx FE processing
602 FFT
603 Parallel/serial converter
604 Demapper
701 Rx FE processing
702 CP removal
703 FFT
704 Tone demapping
705 FDE
706 DFT
707 Demapper
801 Rx FE processing
802 Down-sampling and match filtering
803 TDE
804 CP removal
805 Demapper
901_1 Base station #1
902_1 Terminal #1
902_2 Terminal #2
902_3 Terminal #3
1000 Modulation signal
1001, 1801_1, 1801_2, 1851_1, 1851_2 Sector sweep reference signal
1002, 1802_1 Feedback signal
1003, 1803_1, 1803_2, 1803_3, 1852_1, 1852_2, 1852_3 Data-symbol-included frame
1101_*pi* Sector sweep reference signal in transmission panel antenna i for frequency ♭p
1201_*j* Reference signal according to j-th parameter in transmission panel antenna i for frequency ♭p
1301_1 to 1301_8 Terminal "sector sweep reference signal" first transmission period to terminal "sector sweep reference signal" eighth transmission period
1401_*i* Terminal #i "sector sweep reference signal"
1501_*xi* Sector sweep reference signal in terminal #i transmission panel antenna xi
1511_*j* Reference signal according to j-th parameter in transmission panel antenna xi
1601_11 to 1601_K4 Feedback signal first transmission period for frequency ♭1 to feedback signal fourth transmission period for frequency ♭K
1611_*i* Terminal #i-addressed feedback signal
1701_11 to 1701_K4 Modulation signal (slot) first transmission period for frequency ♭1 to modulation signal (slot) fourth transmission period for frequency ♭K
1711 Terminal #1-addressed modulation signal (slot)
1712 Terminal #2-addressed modulation signal (slot)
1713 Terminal #3-addressed modulation signal (slot)
1714 Terminal #4-addressed modulation signal (slot)
1715 Terminal #5-addressed modulation signal (slot)
1716 Terminal #6-addressed modulation signal (slot)
1801_1, 1801_2 Sector sweep reference signal
1802_1, 1802_2 Feedback signal
1803_1, 1803_2, 1803_3, 1803_4 Data-symbol-included frame
1851_1, 1851_2, 2401_1 to 2401_3 Sector sweep reference signal
1852_1, 1852_2, 1852_3, 1852_4 Data-symbol-included frame
2001_1 to 2001_6 Terminal #1 transmission frame to terminal #6 transmission frame
2501_1 to 2501_6 Terminal #1 transmission frame to terminal #6 transmission frame
2702, 4201_1, 4202_2 Feedback signal group
2703, 4203_1 to 4203_4, 4252_1 to 4252_4 Data-symbol-included frame group
2811_11, 3011_11, 3211_11, 3411_11, 3611_11, 3811_11, 4011_11 Terminal #1-addressed feedback signal (1)
2811_12, 3011_12, 3211_12, 3411_12, 3611_12, 3811_12, 4011_12 Terminal #1-addressed feedback signal (2)
2911_11, 3111_11, 3311_11, 3511_11, 3711_11, 3911_11, 4111_11 Terminal #1-addressed modulation signal (slot) (1)

2911_12, 3111_12, 3311_12, 3511_12, 3711_12, 3911_12, 4111_12 Terminal #1-addressed modulation signal (slot) (2)
4411_11 to 5011_11, 5101_11 to 5301_11 Terminal #1 transmission frame (1)
4411_12 to 5011_12, 5101_12 to 5301_12 Terminal #1 transmission frame (2)
5401_1 to 5401_K Sector sweep reference signal for frequency ♭1 to sector sweep reference signal for frequency ♭K
5501_1 to 5501_H Reference signal according to first parameter for frequency ♭p to reference signal according to H-th parameter for frequency ♭p
5611_1 to 5611_G Reference signal according to first parameter to reference signal according to G-th parameter
5711_1 to 5711_F Reference signal according to first parameter to reference signal according to F-th parameter
5801_1 Terminal "sector sweep reference signal"
5901_1 to 5901_K "Sector sweep reference signal" for frequency ♭1 to "sector sweep reference signal" for frequency ♭K
5911_1 to 5911_6 Terminal #1 "sector sweep reference signal" to terminal #6 "sector sweep reference signal"
6001_1 to 6001_K Feedback signal for frequency ♭1 to feedback signal for frequency ♭K
6011_1 to 6011_6 Terminal #1-addressed feedback signal to terminal #6-addressed feedback signal
6101_1 to 6101_K Modulation signal (slot) for frequency ♭1 to modulation signal (slot) for frequency ♭K
6111_1 to 6111_6 Terminal #1-addressed modulation signal (slot) to terminal #6-addressed modulation signal (slot)
6211_1 to 6211_6 Terminal #1 transmission frame to terminal #6 transmission frame
6411_11, 6611_11, 6811_11 Terminal #1-addressed feedback signal (1)
6411_12, 6611_12, 6811_12 Terminal #1-addressed feedback signal (2)
6511_11, 6711_11, 6911_11 Terminal #1-addressed modulation signal (slot) (1)
6511_12, 6711_12, 6911_12 Terminal #1-addressed modulation signal (slot) (2)
7011_12, 7111_12, 7211_12 Terminal #1 transmission frame (1)
7301_1 to 7301_M Sector sweep reference signal in transmission panel antenna 1 for frequency $1 to sector sweep reference signal in transmission panel antenna M for frequency
$M
7301_X Sector sweep reference signal in transmission panel antenna X for frequency $X
7401_X_1 to 7301_X_M (X) Sector sweep reference signal in transmission panel antenna X for frequency $X_1 to sector sweep reference signal in transmission panel antenna X for frequency $X_M (X)
7401_X_i Sector sweep reference signal in transmission panel antenna X for frequency $X_i
7501_1 to 7501_4 Reference signal according to first parameter in transmission panel antenna X for frequency $X_i to reference signal according to fourth parameter in transmission panel antenna X for frequency $X_i
7601_1 to 7601_M Transmission panel antenna 1 to transmission panel antenna M
7701_1 to 7701_6 Terminal #1 "sector sweep reference signal" to terminal #6 "sector sweep reference signal"
7801_11 to 7801_M1 Feedback signal first transmission period in transmission panel antenna 1 for frequency $1 to feedback signal first transmission period in transmission panel antenna M for frequency $M
7801_12 to 7801_M2 Feedback signal second transmission period in transmission panel antenna 1 for frequency SI to feedback signal second transmission period in transmission panel antenna M for frequency $M
7801_13 to 7801_M3 Feedback signal third transmission period in transmission panel antenna 1 for frequency $1 to feedback signal third transmission period in transmission panel antenna M for frequency $M
7801_14 to 7801_M4 Feedback signal fourth transmission period in transmission panel antenna 1 for frequency $1 to feedback signal fourth transmission period in transmission panel antenna M for frequency $M
7811_X_1_1 to 7811_X_M (X)_1 Feedback signal first transmission period in transmission panel antenna 1 for frequency $X_1 to feedback signal first transmission period in transmission panel antenna X for frequency $X_M (X)
7811_X_1_2 to 7811_X_M (X)_2 Feedback signal second transmission period in transmission panel antenna 1 for frequency $X_1 to feedback signal second transmission period in transmission panel antenna X for frequency $X_M (X)
7811_X_1_3 to 7811_X_M (X)_3 Feedback signal third transmission period in transmission panel antenna 1 for frequency $X_1 to feedback signal third transmission period in transmission panel antenna X for frequency $X_M (X)
7811_X_1_4 to 7811_X_M (X)_4 Feedback signal fourth transmission period in transmission panel antenna 1 for frequency $X_1 to feedback signal fourth transmission period in transmission panel antenna X for frequency $X_M (X)
7821_1 to 7821_3 Terminal #1-addressed feedback signal to terminal #3-addressed feedback signal
7821_4 to 7821_6 Terminal #4-addressed feedback signal to terminal #6-addressed feedback signal
7901_11 to 7901_M1 Modulation signal (slot) first transmission period in transmission panel antenna 1 for frequency $1 to modulation signal (slot) first transmission period in transmission panel antenna M for frequency $M
7901_12 to 7901_M2 Modulation signal (slot) second transmission period in transmission panel antenna 1 for frequency $1 to modulation signal (slot) second transmission period in transmission panel antenna M for frequency $M
7901_13 to 7901_M3 Modulation signal (slot) third transmission period in transmission panel antenna 1 for frequency $1 to modulation signal (slot) third transmission period in transmission panel antenna M for frequency $M
7901_14 to 7901_M4 Modulation signal (slot) fourth transmission period in transmission panel antenna 1 for frequency $1 to modulation signal (slot) fourth transmission period in transmission panel antenna M for frequency $M
7911_X_1_1 to 7911_X_M (X)_1 Modulation signal (slot) first transmission period in transmission panel antenna X for frequency $X_1 to modulation signal (slot) first transmission period in transmission panel antenna X for frequency $X_M (X)

7911_X_1_2 to 7911_X_M (X)_2 Modulation signal (slot) second transmission period in transmission panel antenna X for frequency $X_1 to modulation signal (slot) second transmission period in transmission panel antenna X for frequency $X_M (X)

7911_X_1_3 to 7911_X_M (X)_3 Modulation signal (slot) third transmission period in transmission panel antenna X for frequency $X_1 to modulation signal (slot) third transmission period in transmission panel antenna X for frequency $X_M (X)

7911_X_1_4 to 7911_X_M (X)_4 Modulation signal (slot) fourth transmission period in transmission panel antenna X for frequency $X_1 to modulation signal (slot) fourth transmission period in transmission panel antenna X for frequency $X_M (X)

7921_1 to 7921_3 Terminal #1-addressed modulation signal (slot) to terminal #3-addressed modulation signal (slot)

7921_4 to 7921_6 Terminal #4-addressed modulation signal (slot) to terminal #6-addressed modulation signal (slot)

8001_1 to 8001_6 Terminal #1 transmission frame to terminal #6 transmission frame

8201_1 to 8201_M1 "Sector sweep reference signal" for frequency $1_1 to "sector sweep reference signal" for frequency $1_M1

8211_1 to 8211_3 Terminal #1 "sector sweep reference signal" to terminal #3 "sector sweep reference signal"

8301_1 to 8301_M2 "Sector sweep reference signal" for frequency $2_1 to "sector sweep reference signal" for frequency $2_M2

8311_4 to 8311_6 Terminal #4 "sector sweep reference signal" to terminal #6 "sector sweep reference signal"

8401_1 to 8401_M Feedback signal in transmission panel antenna 1 for frequency $1 to feedback signal in transmission panel antenna M for frequency $M

8402_1 to 8402_M (X) Feedback signal in transmission panel antenna X for frequency $X_1 to feedback signal in transmission panel antenna X for frequency $X_M (X)

8411_1 to 8411_3 Terminal #1-addressed feedback signal to terminal #3-addressed feedback signal

8421_4 to 8421_6 Terminal #4-addressed feedback signal to terminal #6-addressed feedback signal

8501_1 to 8501_M Modulation signal (slot) in transmission panel antenna 1 for frequency $1 to modulation signal (slot) in transmission panel antenna M for frequency $M

8502_1 to 8502_M (X) Modulation signal (slot) in transmission panel antenna X for frequency $X_1 to modulation signal (slot) in transmission panel antenna X for frequency $X_M (X)

8511_1 to 8511_3 Terminal #1-addressed modulation signal (slot) to terminal #3-addressed modulation signal (slot)

8521_4 to 8521_6 Terminal #4-addressed modulation signal (slot) to terminal #6-addressed modulation signal (slot)

8601_1 to 8601_6 Terminal #1 transmission frame to terminal #6 transmission frame

The invention claimed is:

1. A terminal, comprising:

circuitry, which, in operation, generates a first signal and a second signal; and a transmitter, which, in operation, transmits the first signal from a first panel antenna, and transmits the second signal from a second panel antenna based on a scheme selected from:

a first scheme with the first signal and the second signal mapped on different frequencies and with a same timing, a second scheme with the first signal and the second signal mapped on partially overlapping frequencies with a same timing, and a third scheme with the first signal and the second signal mapped on a same frequency with a same timing, wherein, the first signal transmitted from the first panel antenna is transmitted with a first beam, the second signal arranged in the same time and transmitted from the second panel antenna is transmitted with a second beam, in a first mode, information on the first beam is received from a first transmission panel and information on the second beam is received from a second transmission panel, and in a second mode, information on the first beam and information on the second beam are received from a single transmission panel.

2. The terminal according to claim 1, wherein when the third scheme is selected, the same frequency and the same time are indicated.

3. The terminal according to claim 1, wherein the first signal is transmitted by an orthogonal frequency-division multiplexing (OFDM), and the second signal is transmitted by a Discrete Fourier Transform-Spread-OFDM (DFT-S-OFDM).

4. The terminal according to claim 1, wherein the first signal and the second signal are separately transmitted to two transmission and reception points.

5. The terminal according to claim 1, wherein each of the first panel antenna and the second panel antenna consists of one or more than one antenna.

6. The terminal according to claim 1, wherein the first signal and the second signal include data and control information.

7. A communication method, comprising:

generating a first signal and a second signal; and transmitting the first signal from a first panel antenna, and transmitting the second signal from a second panel antenna based on a scheme selected from:

a first scheme with the first signal and the second signal mapped on different frequencies and with a same timing, a second scheme with the first signal and the second signal mapped on partially overlapping frequencies with a same timing, and a third scheme with the first signal and the second signal mapped on a same frequency with a same timing, wherein, the first signal transmitted from the first panel antenna is transmitted with a first beam, the second signal arranged in the same time and transmitted from the second panel antenna is transmitted with a second beam, in a first mode, information on the first beam is received from a first transmission panel and information on the second beam is received from a second transmission panel, and in a second mode, information on the first beam and information on the second beam are received from a single transmission panel.

8. The communication method according to claim 7, wherein when the third scheme is selected, the same frequency and the same timing are indicated.

9. The communication method according to claim 7, wherein the first signal is transmitted by an orthogonal frequency-division multiplexing (OFDM), and the second signal is transmitted by a Discrete Fourier Transform-Spread-OFDM (DFT-S-OFDM).

10. The communication method according to claim 7, wherein the first signal and the second signal are separately transmitted to two transmission and reception points.

11. The communication method according to claim 7, wherein each of the first panel antenna and the second panel antenna consists of one or more than one antenna.

12. An integrated circuit, comprising:

generation circuitry, which, in operation, controls generating a first signal and a second signal; and transmission circuitry, which, in operation, controls transmitting the first signal from a first panel antenna, and controls transmitting the second signal from a second panel antenna based on a scheme selected from:

a first scheme with the first signal and the second signal mapped on different frequencies and with a same timing, a second scheme with the first signal and the second signal mapped on partially overlapping frequencies with a same timing, and a third scheme with the first signal and the second signal mapped on a same frequency with a same timing, wherein, the first signal transmitted from the first panel antenna is transmitted with a first beam, the second signal arranged in the same time and transmitted from the second panel antenna is transmitted with a second beam, in a first mode, information on the first beam is received from a first transmission panel and information on the second beam is received from a second transmission panel, and in a second mode, information on the first beam and information on the second beam are received from a single transmission panel.

* * * * *